(12) United States Patent
Jonnala et al.

(10) Patent No.: US 10,216,511 B2
(45) Date of Patent: Feb. 26, 2019

(54) METHOD APPARATUS AND SYSTEMS FOR ENABLING DELIVERY AND ACCESS OF APPLICATIONS AND SERVICES

(71) Applicants: Premkumar Jonnala, Secunderabad (IN); Keertikiran Gokul, Secunderabad (IN)

(72) Inventors: Premkumar Jonnala, Secunderabad (IN); Keertikiran Gokul, Secunderabad (IN)

( * ) Notice: Subject to any disclaimer, the term of this patent is extended or adjusted under 35 U.S.C. 154(b) by 0 days.

(21) Appl. No.: 15/650,915

(22) Filed: Jul. 16, 2017

(65) Prior Publication Data
US 2017/0344359 A1 Nov. 30, 2017

Related U.S. Application Data

(63) Continuation of application No. 14/928,459, filed on Oct. 30, 2015, now abandoned, which is a
(Continued)

(51) Int. Cl.
*G06F 17/30* (2006.01)
*G06Q 30/00* (2012.01)
(Continued)

(52) U.S. Cl.
CPC .................. *G06F 8/65* (2013.01); *G06F 8/60* (2013.01); *G06F 8/61* (2013.01); *G06Q 30/02* (2013.01);
(Continued)

(58) Field of Classification Search
CPC ........ G06Q 30/02; G06Q 30/06; G06Q 30/04; G06Q 30/0603; G06Q 10/10; G06Q 10/02;
(Continued)

(56) References Cited

U.S. PATENT DOCUMENTS

| 5,081,667 A | 1/1992 | Drori et al. |
| 5,148,153 A | 9/1992 | Haymond |

(Continued)

FOREIGN PATENT DOCUMENTS

| CN | 1722132 A | 1/2006 |
| CN | 101400166 A | 4/2009 |

(Continued)

OTHER PUBLICATIONS

Anthony D. Joseph, Integrating User-Generated Content and Pervasive Communications, 2008, [Retrieved on Dec. 3, 2018 ]. Retrieved from the internet: <URL: https://ieeexplore.ieee.org/stamp/stamp.jsp?tp=&arnumber=4653473> 4 pages (58-61) (Year: 2008).*

(Continued)

Primary Examiner — Anibal Rivera

(57) ABSTRACT

The invention provides a system, a method and a computer program product that facilitate access to one or more applications by a computing device. The invention includes determining one or more contexts associated with at least one of the computing device and a user of the computing device, such that the one or more contexts describe at least one of an environment and an activity of the at least one of the user and the computing device. Thereafter at least one contextual tag corresponding to the one or more contexts is generated. Subsequently, the one or more applications associated with the at least one contextual tag are identified and the computing device is enabled to access the one or more applications.

14 Claims, 118 Drawing Sheets

Related U.S. Application Data continuation of application No. 14/468,350, filed on Aug. 26, 2014, now Pat. No. 9,210,214, which is a continuation of application No. 14/229,097, filed on Mar. 28, 2014, now Pat. No. 8,887,155, which is a continuation of application No. 13/193,380, filed on Jul. 28, 2011, now Pat. No. 8,732,697.

(60) Provisional application No. 61/370,472, filed on Aug. 4, 2010.

(51) Int. Cl.
| | | |
|---|---|---|
| *G06F 8/65* | (2018.01) | |
| *G06F 8/60* | (2018.01) | |
| *G06Q 30/02* | (2012.01) | |
| *H04L 29/08* | (2006.01) | |
| *G06F 8/61* | (2018.01) | |

(52) U.S. Cl.
CPC .............. *H04L 67/10* (2013.01); *H04L 67/34* (2013.01); *G06F 17/30861* (2013.01); *G06F 17/30905* (2013.01); *G06Q 30/0241* (2013.01)

(58) Field of Classification Search
CPC ............. G06Q 10/06375; G06Q 30/00; G06Q 30/0241; G06F 17/30749; G06F 17/30817; G06F 17/30867; G06F 17/30616; G06F 17/2211; G06F 17/3002; G06F 17/30864; G06F 8/60; G06F 17/30905; G06F 17/30241; G06F 17/30861
See application file for complete search history.

(56) References Cited

U.S. PATENT DOCUMENTS

| | | | |
|---|---|---|---|
| 5,497,508 A | 3/1996 | George | |
| 5,655,081 A | 8/1997 | Bonnell et al. | |
| 5,663,734 A | 9/1997 | Krasner | |
| 5,841,396 A | 11/1998 | Krasner | |
| 5,949,345 A | 9/1999 | Beckert et al. | |
| 6,122,682 A | 9/2000 | Andrews | |
| 6,131,067 A | 10/2000 | Girerd et al. | |
| 6,188,315 B1 | 2/2001 | Herbert et al. | |
| 6,438,545 B1 | 8/2002 | Beauregard et al. | |
| 6,519,241 B1 | 2/2003 | Theimer | |
| 6,526,335 B1 | 2/2003 | Treyz et al. | |
| 6,574,531 B2 | 6/2003 | Tan et al. | |
| 6,574,734 B1 | 6/2003 | Colson et al. | |
| 6,601,234 B1 | 7/2003 | Bowman-Amuah | |
| 6,647,267 B1 | 11/2003 | Britt et al. | |
| 6,668,221 B2 | 12/2003 | Harter, Jr. et al. | |
| 6,675,002 B1 | 1/2004 | Lipovski | |
| 6,728,542 B2 | 4/2004 | Meda | |
| 6,731,925 B2 | 5/2004 | Naboulsi | |
| 6,748,195 B1 | 6/2004 | Phillips | |
| 6,754,562 B2 | 6/2004 | Strege et al. | |
| 6,785,542 B1 | 8/2004 | Blight et al. | |
| 6,813,501 B2 | 11/2004 | Kinnunen et al. | |
| 6,845,251 B2 | 1/2005 | Everhart et al. | |
| 6,856,673 B1 | 2/2005 | Banks et al. | |
| 6,859,718 B2 | 2/2005 | Fritz et al. | |
| 6,928,615 B1 * | 8/2005 | Haitsuka ................ | G06Q 30/02 715/738 |
| 6,941,194 B1 | 9/2005 | Dauner et al. | |
| 6,944,679 B2 | 9/2005 | Parupudi | |
| 6,947,943 B2 | 9/2005 | DeAnna et al. | |
| 6,973,333 B1 | 12/2005 | O'Neil | |
| 7,054,352 B2 | 5/2006 | Hasegawa | |
| 7,058,895 B2 | 6/2006 | Kautto-Koivula et al. | |
| 7,062,778 B1 | 6/2006 | Pattersson | |
| 7,064,656 B2 | 6/2006 | Belcher et al. | |
| 7,072,749 B2 | 7/2006 | Kuragaki et al. | |
| 7,100,150 B2 | 8/2006 | Polk | |
| 7,102,496 B1 | 9/2006 | Ernst, Jr. et al. | |
| 7,119,716 B2 | 10/2006 | Horstemeyer | |
| 7,139,820 B1 * | 11/2006 | O'Toole, Jr. .......... | H04L 63/123 709/223 |
| 7,142,877 B2 | 11/2006 | Lipovski | |
| 7,203,738 B1 | 4/2007 | McGill et al. | |
| 7,215,743 B2 | 5/2007 | Creamer et al. | |
| 7,257,427 B2 | 8/2007 | Diedrich et al. | |
| 7,283,846 B2 | 10/2007 | Spriestersbach | |
| 7,296,258 B2 | 11/2007 | Beckert et al. | |
| 7,299,033 B2 | 11/2007 | Kjellberg | |
| 7,319,414 B2 | 1/2008 | Horstemeyer | |
| 7,336,223 B2 | 2/2008 | Franckart et al. | |
| 7,343,148 B1 | 3/2008 | O'Neil | |
| 7,366,892 B2 | 4/2008 | Spaur et al. | |
| 7,370,275 B2 | 5/2008 | Haluptzok et al. | |
| 7,417,645 B2 | 8/2008 | Beda et al. | |
| 7,421,486 B1 | 9/2008 | Parupudi | |
| 7,437,720 B2 | 10/2008 | Coker et al. | |
| 7,441,192 B2 | 10/2008 | Pisz | |
| 7,464,153 B1 | 12/2008 | Abbott et al. | |
| 7,471,283 B2 | 12/2008 | Kim et al. | |
| 7,478,089 B2 | 1/2009 | Henkin et al. | |
| 7,479,901 B2 | 1/2009 | Horstemeyer | |
| 7,484,008 B1 | 1/2009 | Gelvin et al. | |
| 7,505,784 B2 | 3/2009 | Barbera | |
| 7,536,437 B2 | 5/2009 | Zmolek | |
| 7,546,298 B2 | 6/2009 | Hulaj et al. | |
| 7,546,576 B2 | 6/2009 | Egli | |
| 7,570,943 B2 | 8/2009 | Sorvari | |
| 7,596,435 B1 | 9/2009 | Tripathi et al. | |
| 7,606,583 B2 | 10/2009 | Spriestersbach | |
| 7,623,648 B1 | 11/2009 | Oppenheim et al. | |
| 7,647,351 B2 | 1/2010 | Monsarrat | |
| 7,737,829 B2 | 6/2010 | Nishiyama | |
| 7,747,704 B2 | 6/2010 | Parupudi | |
| 7,751,810 B1 * | 7/2010 | Bernoske ............... | G06Q 10/02 455/41.2 |
| 7,756,602 B2 | 7/2010 | Koempel et al. | |
| 7,760,905 B2 | 7/2010 | Rhoads et al. | |
| 7,769,767 B2 | 8/2010 | Petersen | |
| 7,779,085 B2 | 8/2010 | Neil et al. | |
| 7,801,283 B2 | 9/2010 | Harwood et al. | |
| 7,823,146 B2 | 10/2010 | Surace | |
| 7,831,433 B1 | 11/2010 | Belvin et al. | |
| 7,844,491 B1 * | 11/2010 | Haitsuka ................ | G06Q 30/02 705/14.36 |
| 7,856,203 B2 | 12/2010 | Lipovski | |
| 7,860,450 B2 | 12/2010 | Rissanen | |
| 7,873,374 B1 | 1/2011 | O'Neil | |
| 7,898,428 B2 | 3/2011 | Dietz et al. | |
| 7,904,240 B2 | 3/2011 | Nortrup | |
| 7,966,025 B1 | 6/2011 | O'Neil | |
| 7,966,111 B2 | 6/2011 | Moinzadeh et al. | |
| 8,050,817 B2 | 11/2011 | Moinzadeh et al. | |
| 8,089,339 B2 | 1/2012 | Mikan et al. | |
| 8,108,252 B1 * | 1/2012 | Mhatre .................. | G06Q 30/02 705/14.1 |
| 8,108,497 B2 | 1/2012 | Biancardini et al. | |
| 8,127,304 B2 | 2/2012 | Wingfield et al. | |
| 8,136,138 B2 | 3/2012 | Jira et al. | |
| 8,159,456 B2 | 4/2012 | Kim et al. | |
| 8,175,651 B2 * | 5/2012 | Rios ..................... | G06F 3/04895 379/88.18 |
| 8,185,041 B2 | 5/2012 | Kirby | |
| 8,195,714 B2 | 6/2012 | McKibben et al. | |
| 8,232,864 B2 | 7/2012 | Kakiwaki | |
| 8,258,939 B2 | 9/2012 | Miller et al. | |
| 8,260,320 B2 | 9/2012 | Herz | |
| 8,280,922 B2 * | 10/2012 | Rakesh ............. | H04M 1/72583 370/517 |
| 8,295,811 B1 * | 10/2012 | Gailloux ........... | H04M 3/42144 455/411 |
| 8,326,486 B2 | 12/2012 | Moinzadeh et al. | |
| 8,352,933 B2 | 1/2013 | Amann et al. | |
| 8,363,807 B2 | 1/2013 | Baciu et al. | |
| 8,369,867 B2 | 2/2013 | van Os et al. | |
| 8,370,020 B2 | 2/2013 | Bauman | |

(56) References Cited

U.S. PATENT DOCUMENTS

| | | |
|---|---|---|
| 8,370,358 B2 | 2/2013 | Lin et al. |
| 8,397,212 B2 | 3/2013 | Chijiiwa |
| 8,405,670 B2 | 3/2013 | Mejdrich et al. |
| 8,429,604 B1 | 4/2013 | Blas et al. |
| 8,543,925 B2 | 9/2013 | Weitz et al. |
| 8,548,135 B1 | 10/2013 | Lavian et al. |
| 8,583,317 B2 | 11/2013 | Nishida |
| 8,587,454 B1* | 11/2013 | Dearworth ............ G07B 15/063 340/5.1 |
| 8,589,820 B2 | 11/2013 | Chu |
| 8,594,280 B1 | 11/2013 | Lavian et al. |
| 8,695,017 B2 | 4/2014 | Jeon et al. |
| 8,718,620 B2 | 5/2014 | Rosenblatt |
| 8,763,060 B2 | 6/2014 | Jerremy |
| 8,774,825 B2 | 7/2014 | Forstall et al. |
| 8,824,651 B2 | 9/2014 | Berner et al. |
| 8,831,823 B2 | 9/2014 | Moinzadeh et al. |
| 8,831,824 B2 | 9/2014 | Moinzadeh et al. |
| 8,838,332 B2 | 9/2014 | Moinzadeh et al. |
| 8,898,225 B2 | 11/2014 | Tasaka et al. |
| 9,004,353 B1 | 4/2015 | Block et al. |
| 2001/0037399 A1 | 11/2001 | Eylon et al. |
| 2002/0013852 A1 | 1/2002 | Janik |
| 2002/0031228 A1 | 3/2002 | Karkas et al. |
| 2002/0052207 A1 | 5/2002 | Hunzinger |
| 2002/0069405 A1 | 6/2002 | Chapin et al. |
| 2002/0096572 A1 | 7/2002 | Chene et al. |
| 2002/0133545 A1 | 9/2002 | Fano et al. |
| 2002/0198840 A1 | 12/2002 | Banka |
| 2003/0063756 A1 | 4/2003 | Geerlings et al. |
| 2003/0079123 A1 | 4/2003 | Mas Ribes |
| 2003/0132953 A1 | 7/2003 | Johnson et al. |
| 2003/0154293 A1 | 8/2003 | Zmolek |
| 2003/0220725 A1 | 11/2003 | Harter et al. |
| 2003/0231550 A1 | 12/2003 | MacFarlane |
| 2004/0002305 A1* | 1/2004 | Byman-Kivivuori ....................... G06Q 20/353 455/41.2 |
| 2004/0019411 A1 | 1/2004 | Kuragaki et al. |
| 2004/0075675 A1* | 4/2004 | Raivisto ............ H04M 1/72522 715/700 |
| 2004/0087273 A1* | 5/2004 | Perttila ................ G01S 13/751 455/41.2 |
| 2004/0088084 A1 | 5/2004 | Geisler et al. |
| 2004/0123242 A1 | 6/2004 | McKibben et al. |
| 2004/0139480 A1* | 7/2004 | Delpuch ............ H04N 7/17318 725/135 |
| 2004/0168121 A1* | 8/2004 | Matz ................ G06F 17/30867 715/255 |
| 2005/0022157 A1 | 1/2005 | Brendle et al. |
| 2005/0037760 A1 | 2/2005 | Maruyama |
| 2005/0125771 A1 | 6/2005 | Vitanov et al. |
| 2005/0148376 A1 | 7/2005 | Kucera |
| 2005/0149395 A1 | 7/2005 | Henkin et al. |
| 2005/0197767 A1 | 9/2005 | Nortrup |
| 2005/0273839 A1 | 12/2005 | Mikkonen |
| 2005/0289469 A1 | 12/2005 | Chandler et al. |
| 2005/0289483 A1 | 12/2005 | Kwon et al. |
| 2006/0031181 A1 | 2/2006 | Abbott et al. |
| 2006/0041373 A1 | 2/2006 | Rowe |
| 2006/0053378 A1 | 3/2006 | Fano et al. |
| 2006/0099931 A1 | 5/2006 | Trujillo |
| 2006/0129974 A1 | 6/2006 | Brendle et al. |
| 2006/0142917 A1 | 6/2006 | Goudy |
| 2006/0149632 A1 | 7/2006 | Register et al. |
| 2006/0149813 A1 | 7/2006 | Janik |
| 2006/0150197 A1 | 7/2006 | Werner |
| 2006/0154713 A1 | 7/2006 | Sunazuka et al. |
| 2006/0156315 A1 | 7/2006 | Wood et al. |
| 2006/0195816 A1 | 8/2006 | Grandcolas et al. |
| 2006/0293813 A1 | 12/2006 | Nou |
| 2007/0005206 A1 | 1/2007 | Zhang |
| 2007/0033531 A1 | 2/2007 | Marsh |
| 2007/0041552 A1 | 2/2007 | Moscato |
| 2007/0061242 A1* | 3/2007 | Ramer ................. G06Q 10/10 705/37 |
| 2007/0072616 A1 | 3/2007 | Irani |
| 2007/0094042 A1* | 4/2007 | Ramer ............ G06F 17/30867 705/1.1 |
| 2007/0100514 A1 | 5/2007 | Park |
| 2007/0100806 A1* | 5/2007 | Ramer ............ G06F 17/30905 |
| 2007/0113243 A1 | 5/2007 | Brey |
| 2007/0143162 A1 | 6/2007 | Keever et al. |
| 2007/0143798 A1 | 6/2007 | Jira et al. |
| 2007/0165554 A1 | 7/2007 | Jefferson et al. |
| 2007/0180432 A1 | 8/2007 | Gassner et al. |
| 2007/0192294 A1* | 8/2007 | Ramer ................. G06Q 30/02 |
| 2007/0198485 A1* | 8/2007 | Ramer ............ G06F 17/30867 |
| 2007/0198506 A1 | 8/2007 | Rezaei et al. |
| 2007/0239724 A1* | 10/2007 | Ramer ............ G06F 17/30864 |
| 2007/0282907 A1 | 12/2007 | Chambers |
| 2007/0288427 A1* | 12/2007 | Ramer ............ G06F 17/30864 |
| 2008/0005067 A1 | 1/2008 | Dumais et al. |
| 2008/0039017 A1 | 2/2008 | Kim |
| 2008/0057942 A1 | 3/2008 | Woods et al. |
| 2008/0070616 A1 | 3/2008 | Yun |
| 2008/0104246 A1* | 5/2008 | Katz ................... G06Q 30/00 709/226 |
| 2008/0109653 A1 | 5/2008 | Yokohama |
| 2008/0109796 A1 | 5/2008 | Kosche |
| 2008/0126961 A1 | 5/2008 | Naaman et al. |
| 2008/0183757 A1* | 7/2008 | Dorogusker ....... G06Q 30/0241 |
| 2008/0188209 A1 | 8/2008 | Dorogusker et al. |
| 2008/0201201 A1* | 8/2008 | Pousti ..................... G06F 8/60 705/7.29 |
| 2008/0214211 A1 | 9/2008 | Lipovski |
| 2008/0228600 A1 | 9/2008 | Treyz et al. |
| 2008/0238610 A1* | 10/2008 | Rosenberg ............ G06Q 20/20 340/5.7 |
| 2008/0242279 A1* | 10/2008 | Ramer ............ G06F 17/30864 455/414.2 |
| 2008/0254780 A1 | 10/2008 | Kuhl |
| 2008/0275604 A1 | 11/2008 | Perry et al. |
| 2008/0288582 A1* | 11/2008 | Pousti .................... G06Q 30/04 709/203 |
| 2008/0293387 A1* | 11/2008 | Conn ................ G06F 17/30817 455/414.1 |
| 2008/0302871 A1* | 12/2008 | Rehman ............... G06Q 10/06 235/385 |
| 2009/0015379 A1* | 1/2009 | Rosenberg ............ G06Q 30/02 340/10.1 |
| 2009/0023432 A1 | 1/2009 | Macinnis et al. |
| 2009/0023433 A1 | 1/2009 | Walley et al. |
| 2009/0024614 A1 | 1/2009 | Pousti et al. |
| 2009/0045984 A1 | 2/2009 | Tunnell et al. |
| 2009/0076915 A1 | 3/2009 | Tighe |
| 2009/0089288 A1 | 4/2009 | Petersen |
| 2009/0094635 A1 | 4/2009 | Aslin et al. |
| 2009/0113346 A1 | 4/2009 | Wickramasuriya et al. |
| 2009/0158239 A1 | 6/2009 | McColgan et al. |
| 2009/0184800 A1 | 7/2009 | Harris |
| 2009/0187300 A1 | 7/2009 | Everitt |
| 2009/0195370 A1 | 8/2009 | Huffman et al. |
| 2009/0224867 A1 | 9/2009 | O'Shaughnessy et al. |
| 2009/0224931 A1 | 9/2009 | Dietz et al. |
| 2009/0234861 A1* | 9/2009 | Ramer ............ G06F 17/30749 |
| 2009/0240464 A1 | 9/2009 | Dietz et al. |
| 2009/0240569 A1 | 9/2009 | Ramer et al. |
| 2009/0248700 A1* | 10/2009 | Amano ............ G06F 17/30616 |
| 2009/0254971 A1* | 10/2009 | Herz .................... G06Q 10/10 726/1 |
| 2009/0275281 A1 | 11/2009 | Rosen |
| 2009/0298474 A1 | 12/2009 | George |
| 2009/0298482 A1 | 12/2009 | Yen et al. |
| 2010/0013596 A1 | 1/2010 | Kakiwaki |
| 2010/0023393 A1 | 1/2010 | Costy et al. |
| 2010/0037057 A1 | 2/2010 | Shim |
| 2010/0042560 A1 | 2/2010 | Vukovic et al. |
| 2010/0049626 A1 | 2/2010 | Hong |
| 2010/0053069 A1 | 3/2010 | Tricoukes et al. |
| 2010/0062788 A1 | 3/2010 | Nagorniak |
| 2010/0075655 A1 | 3/2010 | Howarter et al. |

(56) References Cited

U.S. PATENT DOCUMENTS

| | | | |
|---|---|---|---|
| 2010/0082431 A1* | 4/2010 | Ramer | G06Q 30/02 705/14.52 |
| 2010/0083131 A1* | 4/2010 | You | G06F 17/30861 715/745 |
| 2010/0088029 A1 | 4/2010 | Hu | |
| 2010/0095265 A1 | 4/2010 | Ewing et al. | |
| 2010/0106406 A1 | 4/2010 | Hille | |
| 2010/0120450 A1 | 5/2010 | Herz | |
| 2010/0121705 A1* | 5/2010 | Ramer | G06Q 30/02 705/14.46 |
| 2010/0138271 A1 | 6/2010 | Henkin et al. | |
| 2010/0157989 A1 | 6/2010 | Krzyzanowski et al. | |
| 2010/0192212 A1* | 7/2010 | Raleigh | G06Q 10/06375 726/7 |
| 2010/0198626 A1 | 8/2010 | Cho et al. | |
| 2010/0214133 A1 | 8/2010 | Becker | |
| 2010/0216509 A1 | 8/2010 | Riemer et al. | |
| 2010/0227629 A1 | 9/2010 | Cook et al. | |
| 2010/0241689 A1* | 9/2010 | Davis | G01C 21/3682 709/203 |
| 2010/0241944 A1 | 9/2010 | Athsani et al. | |
| 2010/0262449 A1* | 10/2010 | Monteforte | G06Q 30/02 705/7.34 |
| 2010/0273443 A1 | 10/2010 | Forutanpour | |
| 2010/0293033 A1 | 11/2010 | Hall et al. | |
| 2010/0294835 A1* | 11/2010 | Bam | G06Q 20/28 235/382 |
| 2010/0299152 A1 | 11/2010 | Batchu et al. | |
| 2010/0311345 A1 | 12/2010 | Santori et al. | |
| 2010/0312572 A1* | 12/2010 | Ramer | G06Q 30/02 705/1.1 |
| 2010/0321203 A1 | 12/2010 | Tieman et al. | |
| 2010/0325687 A1 | 12/2010 | Iverson et al. | |
| 2010/0332315 A1 | 12/2010 | Kamar et al. | |
| 2011/0009107 A1 | 1/2011 | Guba et al. | |
| 2011/0016421 A1 | 1/2011 | Krupka et al. | |
| 2011/0029608 A1 | 2/2011 | Harple et al. | |
| 2011/0040757 A1* | 2/2011 | Kossi | G06F 17/3002 707/737 |
| 2011/0041076 A1* | 2/2011 | Sinn | G06Q 30/02 715/745 |
| 2011/0043652 A1* | 2/2011 | King | G06F 17/2211 348/222.1 |
| 2011/0055351 A1* | 3/2011 | Boldyrev | G06Q 10/10 709/219 |
| 2011/0081967 A1 | 4/2011 | Butcher et al. | |
| 2011/0093846 A1 | 4/2011 | Moinzadeh et al. | |
| 2011/0102146 A1 | 5/2011 | Giron | |
| 2011/0105097 A1 | 5/2011 | Tadayon et al. | |
| 2011/0106333 A1 | 5/2011 | Scheider | |
| 2011/0137960 A1 | 6/2011 | Price et al. | |
| 2011/0143668 A1 | 6/2011 | Farrell et al. | |
| 2011/0143779 A1* | 6/2011 | Rowe | G06Q 30/02 455/456.3 |
| 2011/0154287 A1 | 6/2011 | Mukkamala et al. | |
| 2011/0166748 A1 | 7/2011 | Schneider et al. | |
| 2011/0173602 A1 | 7/2011 | Togami et al. | |
| 2011/0187511 A1* | 8/2011 | Boldyrev | H04Q 5/22 340/10.51 |
| 2011/0187745 A1* | 8/2011 | Kang | G06F 17/30241 345/633 |
| 2011/0215921 A1 | 9/2011 | Ayed et al. | |
| 2011/0264246 A1 | 10/2011 | Pantoja et al. | |
| 2011/0275321 A1 | 11/2011 | Zhou et al. | |
| 2011/0291834 A1* | 12/2011 | Boldyrev | G06F 12/1416 340/572.1 |
| 2011/0294520 A1 | 12/2011 | Zhou et al. | |
| 2011/0321118 A1* | 12/2011 | Boldyrev | G06F 21/35 726/1 |
| 2012/0015696 A1 | 1/2012 | Tuerk et al. | |
| 2012/0139760 A1 | 6/2012 | Bevacqua et al. | |
| 2012/0173551 A1 | 7/2012 | Haddorp et al. | |
| 2012/0239173 A1* | 9/2012 | Laikari | A61B 5/1112 700/91 |
| 2012/0284702 A1 | 11/2012 | Ganapathy et al. | |
| 2012/0313768 A1 | 12/2012 | Campbell et al. | |
| 2014/0274137 A1 | 9/2014 | Carlsson et al. | |
| 2016/0075016 A1* | 3/2016 | Laurent | B25J 13/006 700/47 |

FOREIGN PATENT DOCUMENTS

| | | |
|---|---|---|
| EP | 449471 A2 | 10/1991 |
| JP | 2007172487 A | 7/2007 |
| JP | 2008195253 A | 8/2008 |
| JP | 2008303630 A | 12/2008 |
| KR | 1020070114419 A | 12/2007 |
| WO | WO2008008574 A2 | 1/2008 |
| WO | WO2008121345 A1 | 10/2008 |
| WO | WO2009027121 A1 | 3/2009 |
| WO | WO2011046823 A2 | 4/2011 |
| WO | WO2011046823 A3 | 4/2011 |
| WO | WO2011047037 A1 | 4/2011 |
| WO | WO2011047045 A1 | 4/2011 |
| WO | WO2011047052 A1 | 4/2011 |
| WO | WO2011047056 A1 | 4/2011 |
| WO | WO2011086180 A1 | 7/2011 |
| WO | WO2011114354 A1 | 9/2011 |
| WO | WO2011132148 A1 | 10/2011 |

OTHER PUBLICATIONS

M. Anwar Hossain et al., A Framework for Human-Centered Provisioning of Ambient Media Services, May 12, 2009, [Retrieved on Dec. 3, 2018]. Retrieved from the internet: <URL: https://link.springer.com/content/pdf/10.1007%2Fs11042-009-0285-9.pdf> 25 pages (407-431) (Year: 2009).*

Driver Focus—Telematics Working Group, Procedures on Driver Interactions with Advanced In-Vehicle Systems, Jun. 2006.

Kermit Whitfield, "A hitchhiker's guide to the telematics ecosystem", Oct. 2003.

Ford Motor Company, MyFord Touch/MyLincoln Touch Handbook, (Jun. 2010).

Ford Motor Company, Sync Handbook, Powered by Microsoft, Tips for getting started with Sync.

Ford Motor Company, Sync Handbook, Quick Access to Frequently used features and services, (Apr. 2009).

Ford Motor Company, Sync Owners Manual, Powered by Microsoft.

Ford Motor Company, Sync Handbook, 2008 Supplement, Understanding 911 Assist and VHR.

Ford Motor Company, Navigation System, Sync Powered by Microsoft, (Jul. 2007).

Ford Motor Company, Navigation System, Sync Powered by Microsoft, (Oct. 2007).

Ford Motor Company, Navigation System, Sync Powered by Microsoft, (Mar. 2008).

Ford Motor Company, Navigation System, Sync Powered by Microsoft, (Oct. 2008).

Ford Motor Company, Navigation System, Sync Powered by Microsoft, (Jul. 2009).

Ford Motor Company, Navigation System, Sync Powered by Microsoft, for Ford Explorer 2010 (Oct. 2008).

Ford Motor Company, Sync Powered by Microsoft, Supplemental Guide (Jul. 2007).

Ford Motor Company, Sync Powered by Microsoft, Supplemental Guide (Nov. 2007).

Ford Motor Company, Sync Powered by Microsoft, Supplemental Guide (Apr. 2008).

Ford Motor Company, Sync Powered by Microsoft, Supplemental Guide (Oct. 2008).

Ford Motor Company, Sync Powered by Microsoft, Supplemental Guide (Aug. 2009).

Ford Motor Company, Rear Seat DVD Entertainment System, User Manual (Apr. 2002).

(56) References Cited

OTHER PUBLICATIONS

Invision Automotive Systems, Revolution Series, Rear Seat Entertainment System, Owners Manual (2010).
Ford Motor Company, User Guide, MyFord Touch With Optional Navigation System. (2010-2011).
Ford Motor Company, MyFord Touch MyLincoln Touch Supplement (May 2010).
Ford Motor Company, Ford Touch Supplement (2010).
Ford Motor Company, Sync Supplemental Guide, (2010).
Windows CE for Auto, Oct. 16, 2010.
Ford Sync, https://en.wikipedia.org/wiki/Ford_Sync.
Windows Embedded Automotive, https://en.wikipedia.org/wiki/Windows_Embedded_Automotive.
Auto PC, https://news.microsoft.com/1998/12/04/drivers-keep-hands-on-wheel-eyes-on-road-as-auto-pc-provides-easy-access-to-information-and-entertainment/.
Clarion Auto PC 310c Owners Manual.
AutoPC, PC Companion powered by Windows CE 2.0, http://www.prnewswire.com/news-releases/microsoft-announces-auto-pc-pc-companion-powered-by-windows-ce-20-76195167.html.
SYNC Applink, http://www.prnewswire.com/news-releases/sync-applink-to-launch-on-2011-fiesta-making-ford-first-to-deliver-voice-control-of-smartphone-apps-91569534.html.
The cooltown user experiences, http://www.hpl.hp.com/techreports/2001/HPL-2001-22.pdf Feb. 1, 2001.
Ben Y Zhao, Tapestry—A Resilient Global-Scale Overlay for Service Deployment, IEEE Journal on Selected Areas in Communications, Jan. 2004, vol. 22 Issue:1, pp. 41-53.
Luca Vassena, Context-aware retrieval going social, 2009, Retrieved from URL: http://www.bcs.org/upload/pdf/ewic_fdia09_s1paper10.pdf.
Stefano Mizzaro et al., Collaborative annotation for context aware retrieval, 2009 http://dl.acm.org/citation.cfm?id=1506260 and http://citeseerx.ist.psu.edu/viewdoc/download?doi=10.1.1.169.2417&rep=rep1&type=pdf.
Contactless Communication API, 2005, JSR 257, Version 0.85 http://download.oracle.com/otndocs/jcp/contactlesscomm-0.8-pr-spec-oth-JSpec/.
MIDP Push Registry http://vecchio.iet.unipi.it/vecchio/files/2010/03/jme-9-push-wma.pdf.
NFC in Mobile Commerce, Jan. 2008 http://www.slideshare.net/c.enrique.ortiz/nfc-in-mobile-commerce-presentation.
Matthias Bohmer, Moritz Prinz, and Gernot Bauer, Contextualizing mobile applications for context-aware recommendation, Pervasive 2010, Retrieved from URL: http://www.dfki.de/~mabo04/publications/Boehmer-PERVASIVE10-ContextualizingMobileApps.pdf.
Centralized Management of Motor Vehicle Software Applications and Services, Oct. 15 2009, U.S. Appl. No. 61/252,066.
Centralized Management of Motor Vehicle Software Applications and Services, U.S. Appl. No. 61/260,781.
Collin Mulliner, Attacking NFC Mobile Phones, May 2008, Retrieved from URL: http://www.mulliner.org/nfc/feed/collin_mulliner_eusecwest08_attacking_nfc_phones.pdf.

* cited by examiner

| | Context Type | Context Class | Description (Core Information) |
|---|---|---|---|
| 1 | Groceries | Static | List of, Groceries, and their Price, Quality Rating, Nutritional Information, available at the store. |
| 2 | Clothes | Static | Age-group of clothes (such as kids, teens, adults), Clothing Brand, Clothing Category (such as Jeans, Shirts, Tops, etc.) available near to the place customer is located. |
| 3 | HospitalCounter | Static | Information needed to fill out forms at hospital counters, and the form filler recipient contact information. |
| 4 | WebForm | Dynamic | Information needed to fill form in a web page, and the form filler recipient contact information. |
| 5 | Temperature | Dynamic | Current Temperature a minimum temperature, a maximum temperate and average temperature as measured by a sensor. |
| 6 | Acceleration | Dynamic | Acceleration as measured by a sensor, time the reading was taken, and name of device containing sensor. |
| 7 | Orientation | Dynamic | Orientation (azimuth, pitch and roll) as measured by a sensor, and name of device containing sensor. |
| 8 | ParkingLot | Dynamic | Information about occupancy in parking lot – maximum occupancy, number of free parking spots, location (latitude, longitude and level) of and occupancy status (free/occupied) of spaces in lot, and time the information was determined. |
| 9 | DerivedMediaInfo | Dynamic | Information about media derived by devices. Information can include one or more of channel identifier, channel frequency, location where media is being delivered (device location or TV/radio location), channel name, day and time, service provider name. |
| 10 | SampleMedia | Dynamic | Sample of media (audio, video, etc.). |
| 11 | TvLiveVoting | Dynamic | Contestant names, rating selection for each contestant, and location where the results can be submitted. |

FIG. 4A

|    | Context Type | Context Class | Description (Core Information) |
|----|--------------|---------------|--------------------------------|
| 12 | SaleSchedule | Dynamic | Information related to a sale – Sale category of product (electronics, clothing, toys, etc.), sale amount (10%, $5 off, etc.), Date of sale, Time of sale, Location of nearby store. |
| 13 | ProgramSchedule | Dynamic | Schedule of a media program (movie, TV episode, game, etc.). Date, time, channel name and channel number. |
| 14 | ProgramInfo | Dynamic | Information about program currently being telecast (audio or video). Name of program, actors names, rating (kids, teens, etc.), mode (live/recorded), information on item of interest (eg., URL providing information on the car currently being telecast), start time, and end time. |
| 15 | Feedback | Transaction | Information for providing feedback for a service that involves placing an order in a store. Consumer ID, Order ID, List of questions and location where the ratings can be submitted. |
| 16 | UserOrderInStore | Transaction | Information providing details (such as nutritional info on items purchased at a restaurant) on items purchased with an order. Consumer ID, order ID, number of items ordered, and information for each item. |
| 17 | DerivedRating | Dynamic | Rating as provided by a group of customers related to the customer receiving the info. Group ID, consumer ID, consumer ID in group, list of items, and average rating for each item (as provided by members of the group) |
| 18 | AddressInfo | Static | Address associated with the owner of provider device. |
| 19 | NearMe | Dynamic | Locations of friends that are near to me (location of consumer device) within a certain distance. Number of friends, list of friends, and locations of friends. |
| 21 | MultiType | Multiple Contexts | List of context tags – each of a different type. Type, association type, consumer ID and core information for each tag. |

FIG. 4B

|   | Field name | Description |
|---|---|---|
| 1 | provId | Identifier associated with a provider device. Identifies a provider device among all provider devices. |
| 2 | assocType | One of Unicast, Multicast and Broadcast. Specifies if the context tag is intended to be consumed by one consumer, a group of consumers, or all consumers respectively. |
| 3 | consumerId | Identifier associated with a consumer device. Identifies a consumer device among all consumer devices. |
| 4 | Type | Type of information associated with context tag. Application specific. A sample set of types are illustrated in FIG. 4A and FIG. 4B. |
| 5 | genId | Identifier associated with a generator device. Identifies a generator device among all generator devices. |
| 6 | Version | Version of information specified by the context tag. |
| 7 | appLocation | Location where the application is available. Can be a URL, or a store name where the application can be bought, or the like. |
| 8 | additionalInfo | Information relating to the application. The structure and content of information is specific to the type of context tag. |
| 9 | additionalInfoUrl | URL (uniform resource locator) where additional information related to the tag can be accessed. |
| 10 | autoRun | Indicates that the application associated with this tag can be run automatically. |

FIG. 5

|   | Field name | Description |
|---|---|---|
| 1 | version | Version of information included in this content. |
| 2 | appLocation | Location where the application is available. Can be a URL, or a store name where the application can be bought, or the like. |
| 3 | additionalInfo | Information relating to the application. The structure and content of information is specific to the type of context tag. |
| 4 | additionalInfoUrl | URL (uniform resource locator) where additional information related to the tag can be accessed. |

FIG. 6

|   | Field Name | Type | Description |
|---|---|---|---|
| 1 | mediaInfo | Array of Bytes | A sample of media. Format can be specific to embodiment. Eg., mp3, mp4, mp7, or the like. |

FIG. 7

|   | Transport Type | Description |
|---|---|---|
| 1 | SingleDest | Message addressed to only a single entity, while sent on the transmission medium. |
| 2 | MultiDest | Message addressed to more than one entity, while sent on the transmission medium. |

FIG. 8

|   | Association Type | Description |
|---|---|---|
| 1 | Broadcast | When associated with a context tag, the context tag can be used by anyone who receives it. |
| 2 | Multicast | When associated with a context tag, the context tag can be used by a receiver only if the receiver belongs to a group. |
| 3 | Unicast | When associated with a context tag, the context tag can be used only by a particular receiver. |

FIG. 9

|    | Message Type | Description |
|----|---|---|
| 1  | GetConsumerInfo | Type of Message sent to a receiver to get information related to a consumer device. |
| 2  | ConsumerInfo | Type of Message sent to a receiver containing information related to a consumer device. |
| 3  | DeleteConsumerInfo | Type of Message sent to a receiver to delete information related to a consumer device. |
| 4  | GetProviderInfo | Type of Message sent to a receiver to get information related to a provider device. |
| 5  | ProviderInfo | Type of Message sent to a receiver containing information related to a provider device |
| 6  | DeleteProviderInfo | Type of Message sent to a receiver to delete information related to a provider device |
| 7  | GetGeneratorInfo | Type of Message sent to a receiver to get information related to a generator device. |
| 8  | GeneratorInfo | Type of Message sent to a receiver containing information related to a generator device |
| 9  | DeleteGeneratorInfo | Type of Message sent to a receiver to delete information related to a generator device |
| 10 | GeneratedInfo | Type of Message containing TRI(s), sent to provider devices by generator devices. |

FIG. 10

|   | Field Name | Description |
|---|---|---|
| 1 | type | Type of the message. A sample set of message types are illustrated in FIG. 10 |
| 2 | senderContact | The contact information of the message sender. Can include information such as IP address, port number, protocol type, Ethernet MAC address, among others. |
| 3 | info | Information whose structure and content can be specific to the type of the message. |

FIG. 11

|   | ID Provider | Description |
|---|---|---|
| 1 | Consumer | Consumer Device provides the consumer ID (identifier) |
| 2 | Provider | Provider Device provides the consumer ID (identifier) |
| 3 | None | Neither consumer nor provider provide the consumer ID (identifier) |

FIG. 12

|   | Field Name | Description |
|---|---|---|
| 1 | consumerId | Identifier of the consumer device |
| 2 | contact | Contact information of consumer device. Messages can be sent to the consumer device using contact information. |

FIG. 13

|   | Name | Description |
|---|---|---|
| 1 | myConsumerId | Consumer identifier as determined by consumer device. |
| 2 | contact | Contact information of consumer device. Messages can be sent to the consumer device using contact information. |
| 3 | consumerId | List of consumer identifiers as provided by providers associated with consumer device. |
| 4 | provs | List of, providers information, as provided by each provider associated with consumer device. |
| 5 | numProvs | Number of providers that the consumer device is associated with. |

FIG. 14

|   | Field Name | Description |
|---|---|---|
| 1 | provId | Identifier of provider device. |
| 2 | genId | Identifier of generator device. |
| 3 | mcastConsumerId | Identifier of the group of consumers, that context tags provided by provider device can be associated with. |
| 4 | contact | Contact information of provider device. Messages can be sent to the provider device using contact information. |
| 5 | type | Type of context tags provided by provider. |
| 6 | assocType | Association type of context tags provided by provider. |
| 7 | idProvider | The device that provides consumer identifier – one of Consumer, Provider, None. |

FIG. 15

|   | Field Name | Description |
|---|---|---|
| 1 | pInfo | Information associated with provider device. |
| 2 | consumerInfo | A list of, information associated with consumer devices which are associated with the provider device. |
| 3 | numInfo | Number of consumer devices associated with the provider. |
| 4 | generatorInfo | Information of generator device associated with the provider device. |
| 5 | core | Information provided by generator device to the provider device. Can be provided by provider device to consumer devices. |

FIG. 16

|   | Field Name | Description |
|---|---|---|
| 1 | genId | Identifier of generator device. |
| 2 | mcastConsumerId | Identifier of the group of consumers that can use the context tags associated with information generated by generator device. |
| 3 | contact | Contact information of generator device. Messages can be sent to the generator device using contact information. |
| 4 | type | Type of context tags that the information generated by generator device, can be associated with. |
| 5 | assocType | Association Type of context tags that the information generated by generator device, can be associated with. |
| 6 | idProvider | The device that provides consumer identifier – one of Consumer, Provider, None. |

FIG. 17

|   | Field Name | Description |
|---|---|---|
| 1 | gInfo | Information associated with generator device. |
| 2 | providerInfo | The list of information provided by provider devices associated with generator device. |
| 3 | numInfo | Number of providers associated with generator device. |
| 4 | core | Information provided by generator device to provider devices. |

FIG. 18

|   | Name | Description |
|---|---|---|
| 1 | downloadWhileRunning | Indicates if the application needs to be downloaded in parallel with execution of application. |
| 2 | execProgram | The executable application. |

FIG. 19

|   | Field Name | Description |
|---|---|---|
| 1 | assocType | Association Type |
| 2 | Type | Tag Type |
| 3 | consumerId | Consumer ID |
| 4 | core | Core Information |

FIG. 20

|   | Field Name | Description |
|---|---|---|
| 1 | channelId | Identifier for TV channel |
| 2 | channelFrequency | The frequency information of TV channel |
| 3 | location | Location information of generator device |
| 4 | dayAndTime | Day And Time the information is generated |
| 5 | serviceProviderName | Name of Service Provider |

FIG. 21

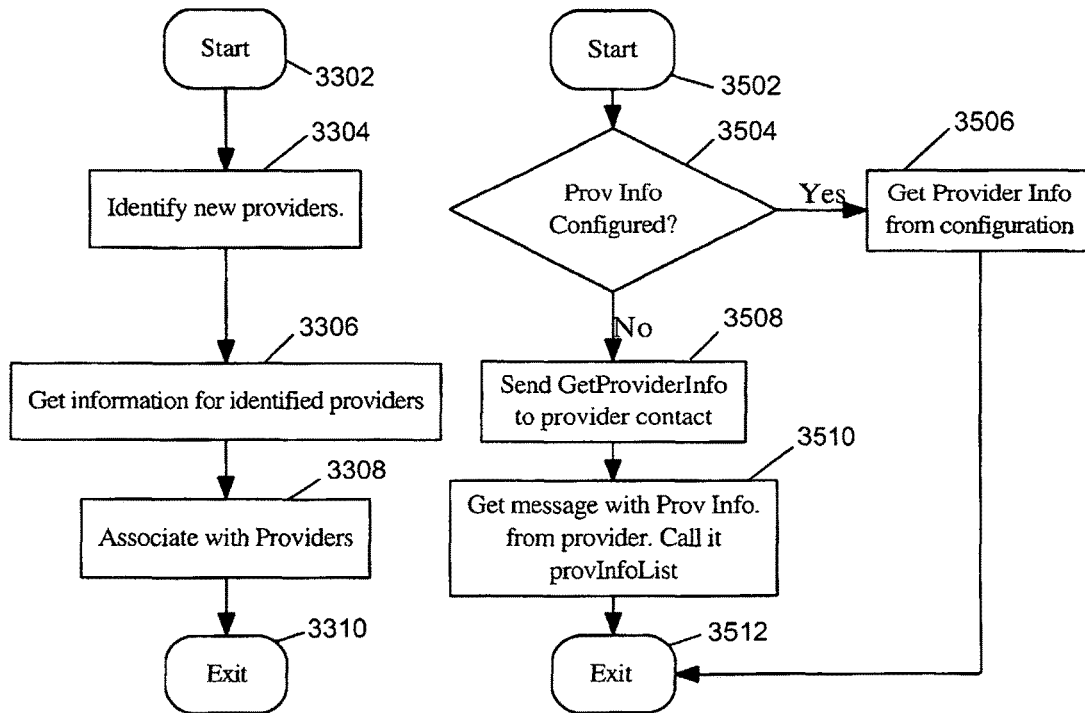
FIG. 33
FIG. 35
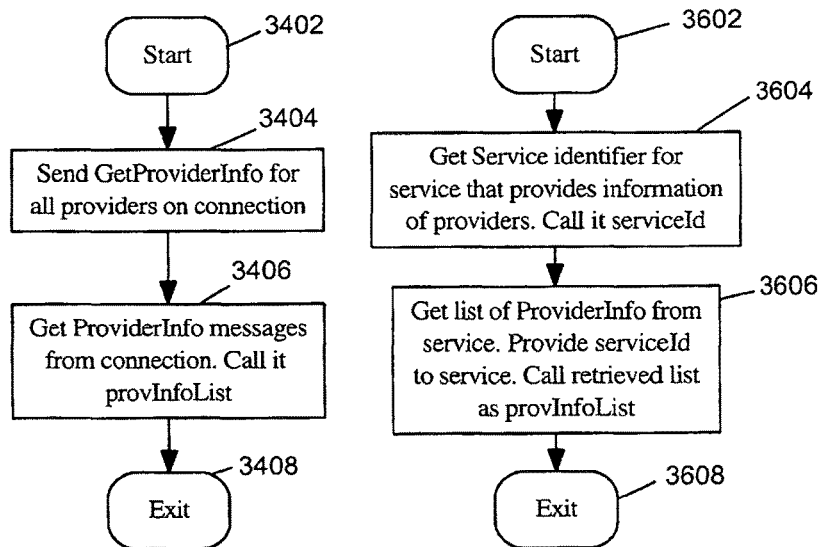
FIG. 34
FIG. 36

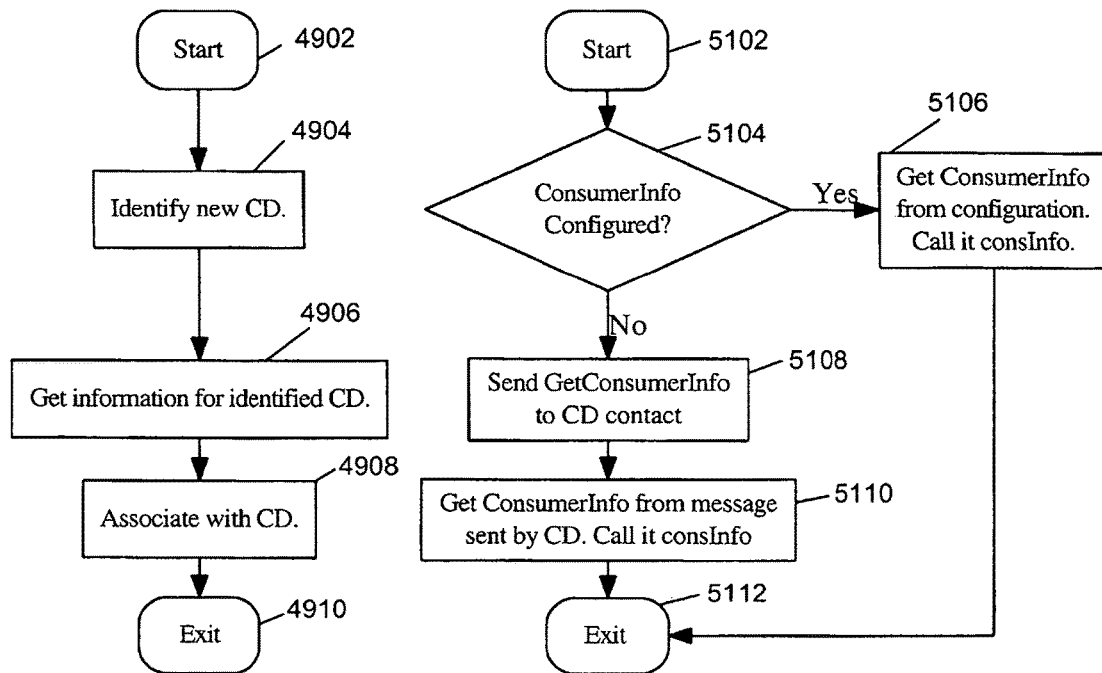
FIG. 49
FIG. 51
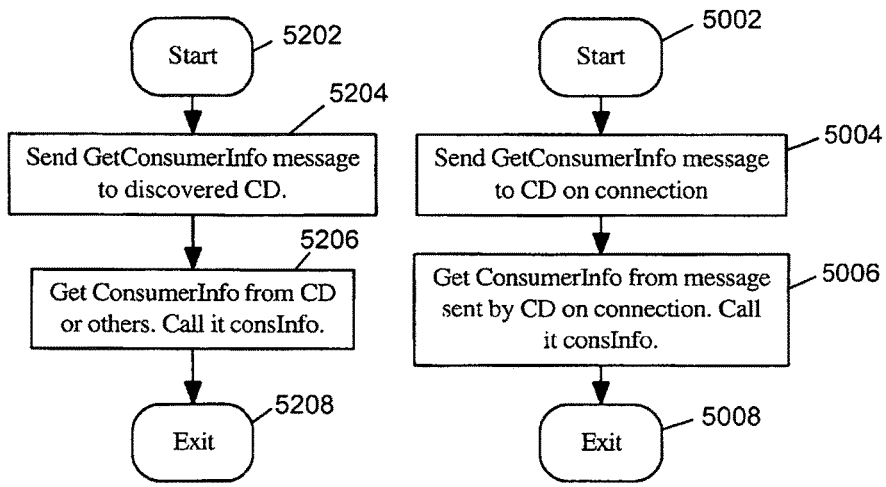
FIG. 52
FIG. 50

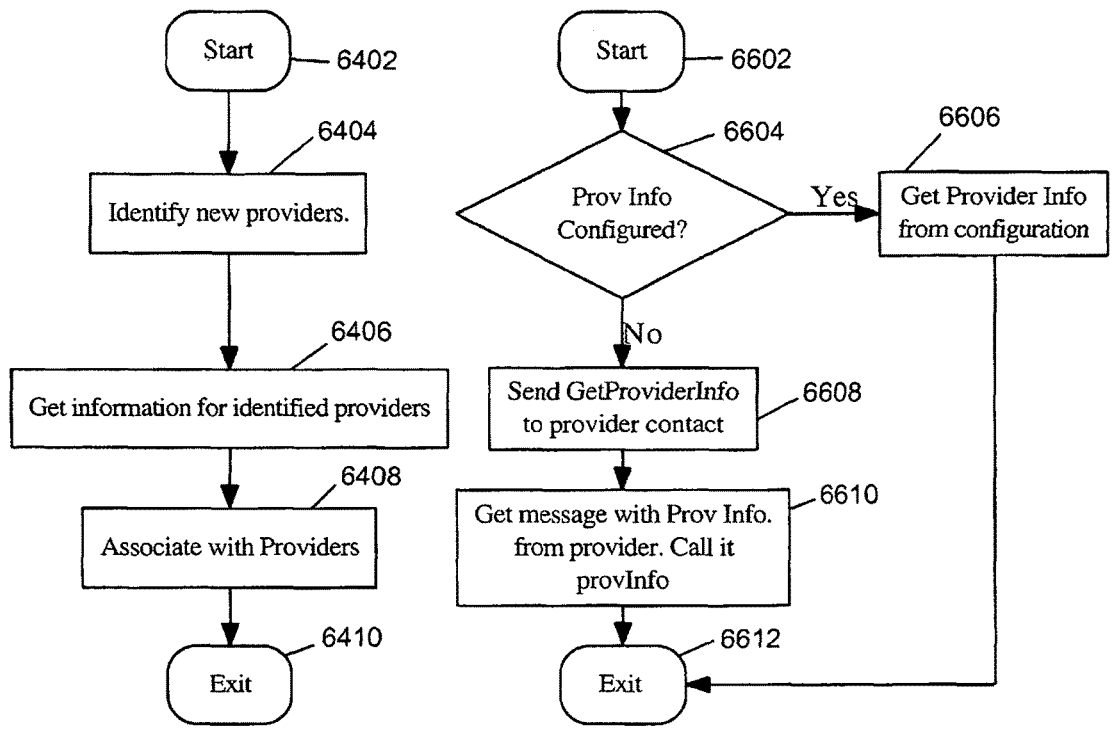
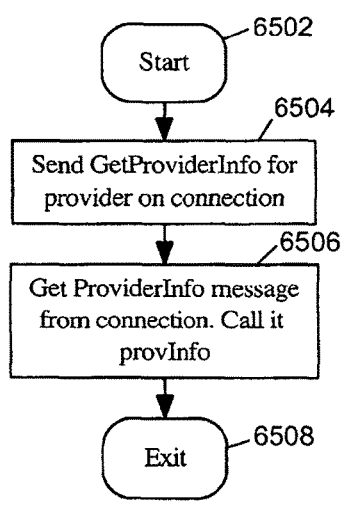
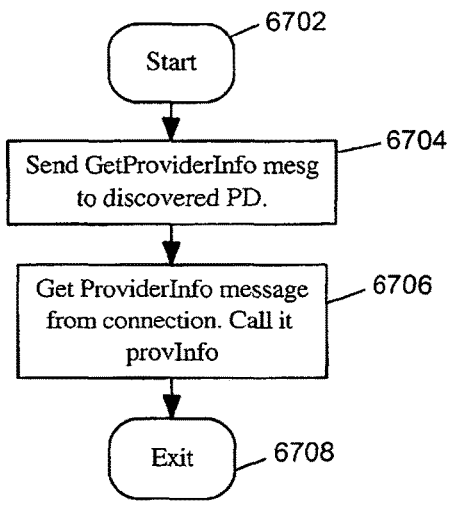
FIG. 64
FIG. 66
FIG. 65
FIG. 67

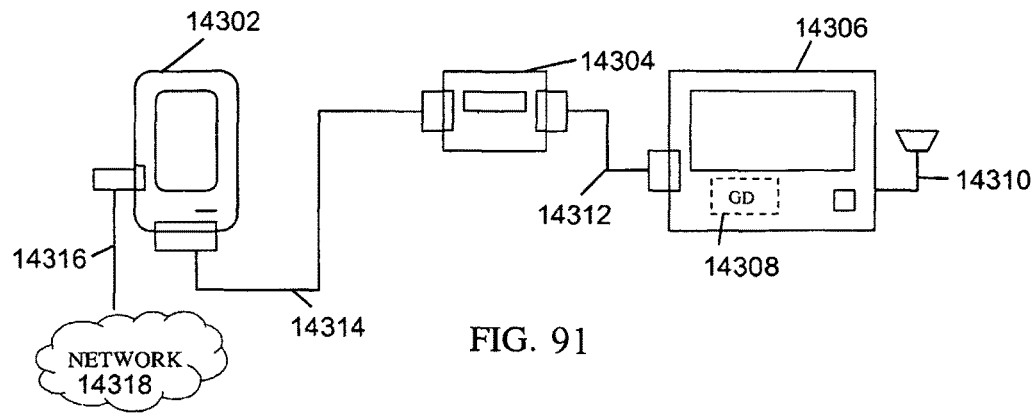
FIG. 91
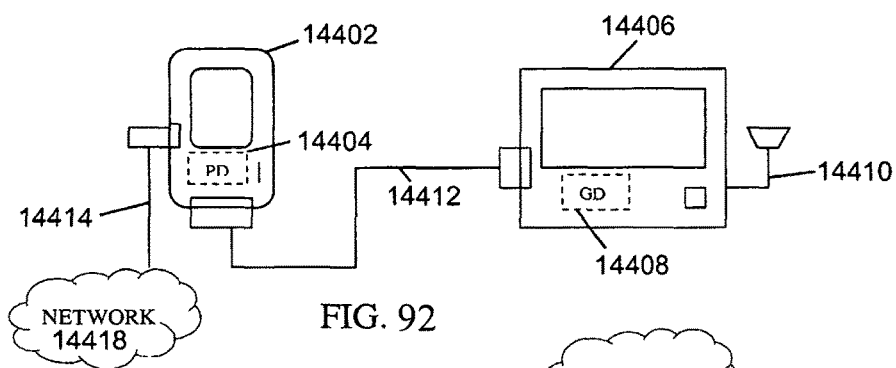
FIG. 92
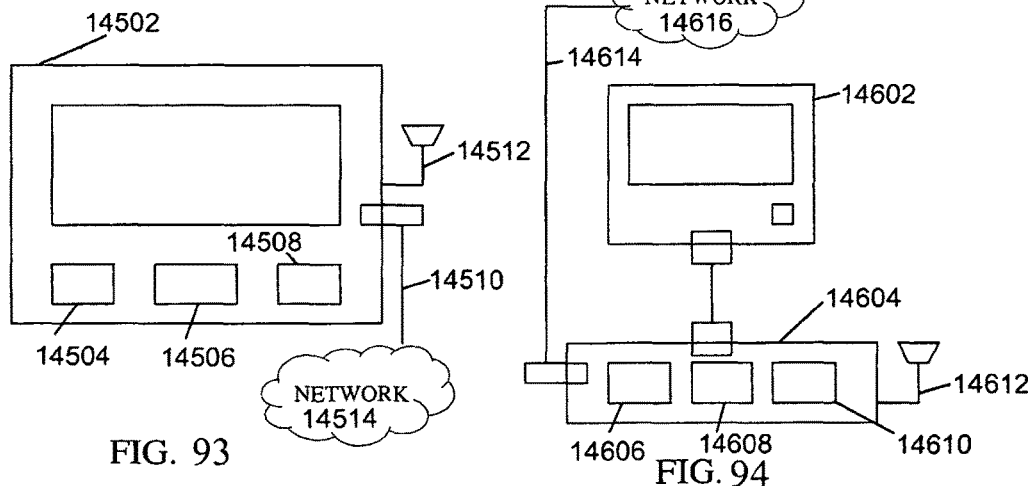
FIG. 93
FIG. 94

|   | Field Name | Description |
|---|---|---|
| 1 | currTemp | Current Temperature as determined by sensor |
| 2 | minTemp | Minimum Temperature |
| 3 | maxTemp | Maximum Temperature |
| 4 | avgTemp | Average Temperature |

FIG. 99

|   | Field Name | Description |
|---|---|---|
| 1 | acceleration | Acceleration as determined by sensor |
| 2 | timeCaptured | Time Acceleration captured |
| 3 | deviceName | Name of the device |

FIG. 100

|   | Field Name | Description |
|---|---|---|
| 1 | azimuth | Azimuth as determined by sensor |
| 2 | pitch | Pitch as determined by sensor |
| 3 | roll | Roll as determined by sensor |
| 4 | deviceName | Name of the device |

FIG. 101

|   | Field Name | Description |
|---|---|---|
| 1 | numSpotsTotal | Number of total parking spaces |
| 2 | numSpotsFree | Number of spaces free or available for parking |
| 3 | spotLatitude | List of latitudes for each parking space |
| 4 | spotLongitude | List of longitudes for each parking space |
| 5 | level | Floor level of each parking space |
| 6 | spotFree | List of information indicating the occupied or free status of each parking space |
| 7 | timeDetermined | Time the occupied/free status of the space is determined |

FIG. 102

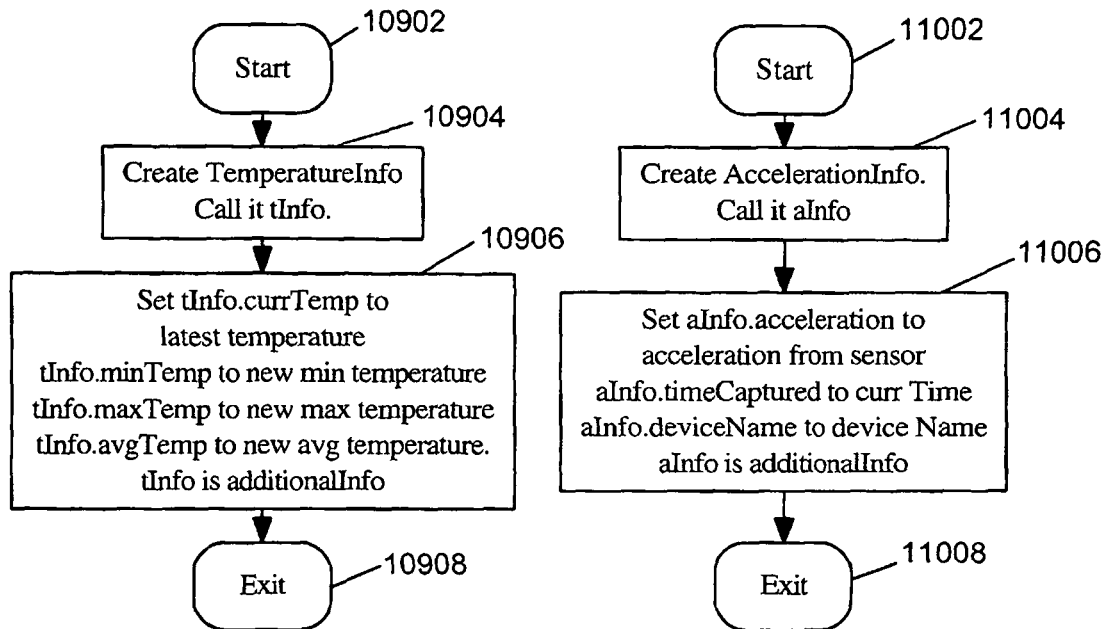
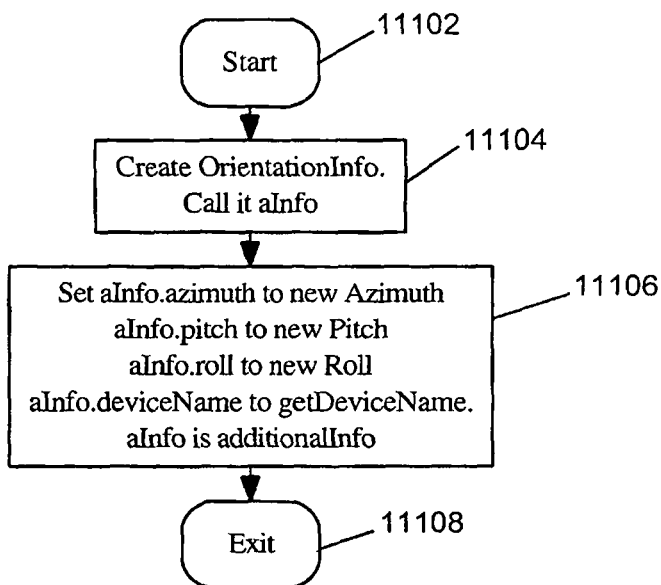
FIG. 109
FIG. 110
FIG. 111

|   | Field | Description |
|---|-------|-------------|
| 1 | tag   | The tag itself. |
| 2 | app   | Application related data.  See FIG. 19 for structure of this field. |

FIG. 112

|   | Field Name | Description |
|---|---|---|
| 1 | consumerId | ID of user |
| 2 | orderId | ID of placed order |
| 3 | Questions | Set of questions and possible Ratings |
| 4 | submissionLocation | Location on network (such as URL) where results can be submitted |

FIG. 118

|   | Field Name | Description |
|---|---|---|
| 1 | consumerId | ID of user |
| 2 | orderId | ID of placed order |
| 3 | numItems | Number of items in itemInfo field |
| 4 | itemInfo | A list of items and their information |

FIG. 119

|   | Field Name | Description |
|---|---|---|
| 1 | groupId | ID of group |
| 2 | consumerId | ID of user |
| 3 | consIdInGroup | ID of user in group |
| 4 | itemId | List of items |
| 5 | groupAvgRating | Average rating of items in itemId list as determined by members of group identified by groupId |

FIG. 120

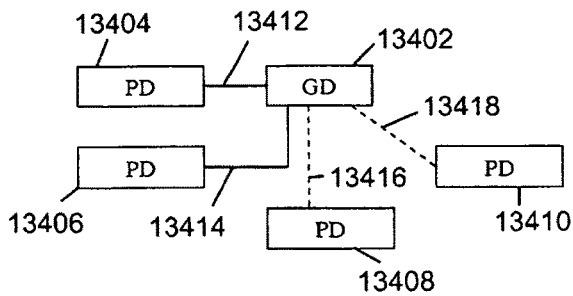
FIG. 126
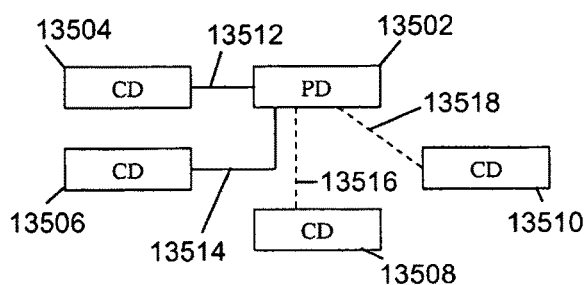
FIG. 127
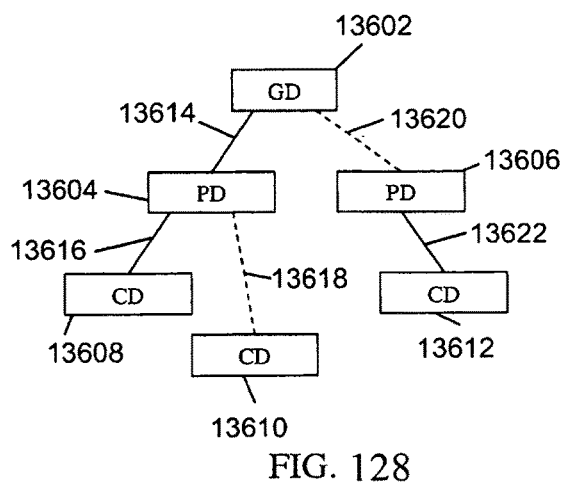
FIG. 128
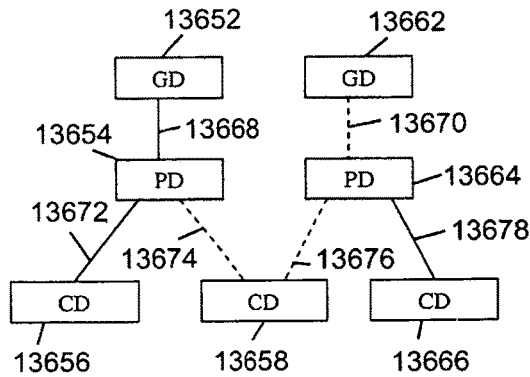
FIG. 129
FIG. 130
FIG. 131
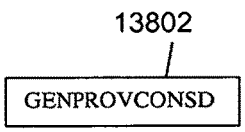

METHOD APPARATUS AND SYSTEMS FOR ENABLING DELIVERY AND ACCESS OF APPLICATIONS AND SERVICES

CROSS-REFERENCE TO RELATED APPLICATIONS

The present application claims the benefit of U.S. (Provisional) Application No. 61/370,472, filed Aug. 4, 2010, the contents of which are incorporated herein by reference in their entirety.

This is a continuation of application Ser. No. 14/928,459 filed on Oct. 30, 2015, now abandoned, which is a continuation of application Ser. No. 14/468,350, filed Aug. 26, 2014, now U.S. Pat. No. 9,210,214 issued on Dec. 8, 2015, which is a continuation of application Ser. No. 14/229,097, filed Mar. 28, 2014, now U.S. Pat. No. 8,887,155 issued on Nov. 11, 2014, which is a continuation of application Ser. No. 13/193,380, filed Jul. 28, 2011, now U.S. Pat. No. 8,732,697, issued on May 20, 2014, which is a non-provisional of U.S. Provisional Application No. 61/370,472 filed Aug. 4, 2010, each of which is herein incorporated by reference in its entirety.

FIELD OF INVENTION

The present invention relates generally to management of applications and/or services, and in particular to systems, methods and apparatus for provisioning and/or managing applications and/or services, based on contextual information.

BACKGROUND

With advent of portable computing such as smart phones, tablet computers, wearable PCs, e-book readers, personal digital assistants (PDAs), etc. users of these devices have access to a large number of applications, with each application used for one or more tasks. The Android™ platform of Google, Inc., and supported by Open Handset Alliance (OHA), for example supports tens of thousands of applications in different areas that include health, lifestyle, entertainment, games, shopping, social, tools, productivity, etc. among others. The applications for Android platform are generally made available to consumer devices on Android Market of Google, Inc. Similarly, the App Store™ of Apple, Inc., provides tens of thousands of applications in various areas of interest, which can be run on devices such as iPhone™, iPad™, iPod Touch™, etc. of Apple, Inc.

To help users choose applications for installation and use on their devices, Android Market, App Store, other distribution platforms and websites classify applications into various categories such as social, productivity, tools, finance, etc. In some cases, the applications are sorted based on factors such as popularity, user reviews, staff reviews, featured applications or the like. Determining an application to be installed and/or used for a given task can be tedious in such distribution platforms. Examples of specific tasks include providing feedback on a service provided at a given store, recording the schedule (such as date and time) of a sale described in a media advertisement, etc. The classification of applications on distribution platforms and/or websites is based on general factors/categories and choosing an application for a given task can be tedious and/or difficult and/or time consuming.

In some cases, users of consumer devices are made aware of applications using a bar-code, and/or uniform resource locator (URL) which can be used to download/install the application. The bar code and/or URL can be made available on websites, or on paper prints that are posted on areas such as walls, posted on billboards, etc. These methods of communicating applications have some disadvantages. These methods for example require that users scan a bar code using a camera or bar code scanner on the consumer device, or have users type in the URL manually to an application manager on the consumer device. The process needs to be repeated once for each application (made available using this scheme) installed by the user, which can be tedious or not very user-friendly. The user needs to first locate the bar code and/or URL. Once the user has located the bar-code and/or URL, the user needs to make a decision of installing the application, and then launch the application manager or bar-code scanner to help with installation. This process is therefore not very practical and/or user-friendly.

If the tasks managed by the user is changing wherein each task is managed by different application, having the user determine the applications for each task, and installing them for each use is not practical. An example of such scenario is the case of applications in context of media consumption. Having a user install applications for each ask he/she needs to accomplish can be tedious and/or impractical because locating application for each task can involve one or more of looking up distribution platforms, web sites, identifying bar-codes and/or urls of applications, etc. This process can discourage a user from installing or using applications.

Consider scenario wherein a user can interact with a media that's being telecast, using an application on a consumer device. A TV show can, for example, accept ratings from users based on performance by a set of candidates using an application on consumer devices. A TV advertisement for a food product can, for example, provide nutritional information about the product using a "nutrition application"—while the advertisement is telecast. Each track/segment of media can be associated with different applications.

Another situation where the application changes, is when user goes from one store to other. In situations where each store can provide services using consumer devices with applications specific to each store, a user is required to install applications for different stores in order to access their services. Having a user install applications for each store he/she visits can be tedious and/or impractical because locating each application can involve one or more of looking up distribution platforms, web sites, identifying bar-codes and/or urls of applications, etc. This process can discourage a user from installing applications. The applications provided by a store may not be popular on distribution platforms such as Android Market, Apple, Inc.'s App Store, etc., but can help achieve a specific task for a user while he/she is at the store. An example of such case is an application provided by a restaurant that recommends items from the restaurants menu, based on user preferences. The application can be supported only by a specific restaurant in which case, a user can be discouraged from locating the application and installing it just to address a one-time need of determining suggested menu items. Applications that have a short use-time such as these can therefore not be used very much. This can result in users not leveraging advantages associated with these applications.

A simplification in the management of applications on consumer devices can help various entities (such as stores, web sites, libraries, offices, restaurants, media services, or the like) in providing services to users, using applications on consumer devices. Changing services and/or conditions can help in providing different services to users using applications that can be specific to the new service and/or condition. For example, the services (using applications on CDs) provided by a store can change on a holiday or when the store is running a sale event. A different set of services can be provided by a store for example, by new applications. Improved techniques in regard to application management on consumer devices can help in providing new services to users by deploying the new applications for use on CDs.

In some scenarios, users have a number of applications installed on their consumer devices. Users select an application for a task by browsing through the list of installed applications. An increase in the number of applications installed on the consumer device can make it difficult for the user to search and/or determine the application to use for a task at hand.

It would therefore be desirable to provide improved techniques, methods, systems and apparatus to facilitate provisioning and/or managing of applications associated with consumer devices.

SUMMARY

In accordance with some embodiments of the present invention, a system is provided for facilitating access to a set of applications by a computing device. The system includes a context module configured to determine contexts associated with either or both of the computing device and a user of the computing device. The context describes an environment and/or an activity of the user and/or the computing device and helps generate at least a first portion of one or more contextual tags. In other words the context module can act as a generating device that generates contextual tags or a portion of the contextual tags in addition to determining contexts. Accordingly, for the purpose of easy understanding by persons skilled in the art, some embodiments explained hereinafter, refer to the context module as generating device. Also, the terms "computing device" and "consumer device" may be interchangeably used during description of the invention for ease of understanding of exemplary embodiments.

The system also includes at least one processor communicatively associated with the context module, and configured to at least one of: generate a second portion of the contextual tags, and provide the contextual tags to the computing device, thereby enabling the computing device to identify one or more applications associated with the one or more contextual tags. The one or more applications are identified according to context based information contained in the one or more contextual tags, and thereafter the one or more applications are received by the computing device. In such embodiments the processor acts as the providing device, and is accordingly referred to in some exemplary embodiments in the subsequent description for easy understanding.

Also, the applications, as described according to the various embodiments of the invention are content that can be accessed or viewed or processed using a computing device like a mobile phone, tablet computer, portable compute devices such as book readers, portable audio/video devices, laptop computers, desktop computers, and the like. Examples of applications, include but are not limited to, mobile applications, plugins, applets, scripts, URLs providing a link to different applications, web pages, web content, audio, video, images, applications based on various platforms such as Android and iOS, and other similar services.

In some embodiments, after identifying the one or more applications according to the context based information the computing device can access the one or more applications. In an embodiment, the one or more applications can be accessed from a service such as a website. In some embodiments, the applications can also be retrieved from other systems, databases, devices, etc. In yet other embodiments, the applications present on the compute device can be enabled and/or activated and/or provided to the user.

The contextual tag, in accordance with some embodiments of the present invention, can include at least one of a manual tag, a dial-an-app tag, a static tag, a dynamic tag, an extracted tag, a derived info tag, a web based tag, a transaction driven tag, and a social aspect tag. These types of tags are explained in detail in the detailed description section of the application. In an embodiment, once the one or more applications have been identified, the processor enables the computing device to access the one or more applications. For example, the processor may enable the computing device to initiate a download of the one or more applications on the computing device.

In some embodiments, the one or more applications are activated on the computing device as soon as they are downloaded. Further, in some embodiments only some of the one or more applications are automatically activated.

In a further embodiment, at least a portion of a contextual tag may be stored in one or more intermediate devices before the one or more applications are associated with the contextual tag. For example, in an embodiment, the contextual tag after being generated may be stored in a providing device or a generating device or other devices on a network like a set-top box or a router, before being transferred to the computing device.

In some embodiments, the one or more applications identified corresponding to the one or more contextual tags may be already present on the computing device.

In further embodiments, determination of context is triggered manually or scheduled to be repeated regularly after a predefined time interval.

In some embodiments, the one or more applications are identified based on only a portion of the contextual tag and not the complete contextual tag.

In some embodiments, a URL can be determined using at least a portion of the one or more contextual tags. The computing device is, thereafter, enabled to access and activate an application configured to utilize the URL.

In further embodiment of the present invention, the user can select one or more applications. The selected applications can then be accessed and/or activated by the computing device.

In another embodiment, the computing device is allowed to access the one or more applications associated with a phone number being dialed by the user of the computing device.

In yet another embodiment, cleaning up of the one or more applications can be performed, i.e. the one or more applications on the computing device in case a change in the one or more contexts is determined, or the user is found to be not interacting with an earlier executed application for a predefined time, or the one or more applications is inactive, or there has been a lapse of a predefined time spent during or after accessing the one or more applications.

We describe various elements separately for ease of understanding and to describe logical differences in the functions performed by each element. However, that the elements may be physically separate. Rather, a skilled person will appreciate, in light of this disclosure, that two elements described herein can be combined into a single element that performs functions of both the elements described herein. Conversely, the functionality of a single element described herein can be divided and performed by multiple elements. For example, in some embodiments a processor and a context module may perform the functions of the generating device and the provider device, while being two separate devices. While in some embodiments the system may have a single system including both the context module and the processor, thereby allowing a single system to perform both the functions of the generating device and the functions of the providing device. In yet other embodiments, the generating device and the provider device can be a embedded in the computing device and can be implemented as a part of the computing device, such that the computing device is enabled to perform the functions of both the provider device and the generating device.

Further, those skilled in the art will appreciate that the term "one or more context" is also referred to as "context information" or "information" during the subsequent description for easy understanding. Similarly, the term "computing device" is also referred as "consumer device", the term "contextual tag" is referred to as "tag" and the term "memory module" is referred to as "store".

To better summarize the system for facilitating access of a set of applications by the computing device in accordance with the present invention, some exemplary embodiments are described in the subsequent paragraphs.

In accordance with some embodiments of the present invention, a consumer device (CD) communicatively coupled to one or more provider device (PD) can be used to provision and/or manage applications using contextual information provided by one or more PDs. The contextual information referred to herein as a "tag" can encompass any type of data that facilitates determination of an application (app). One or more instances of Tag related information (TRI) are generated by Generator Device (GD). GD communicatively coupled to (or associated with) one or more PD can communicate TRIs to the PD. PDs can communicate tags that can include some/all of TRI received from GD, to CD. In one embodiment of the invention, each instance of TRI generated by a GD is used by a PD to generate/provide an instance of a tag. The content of TRIs can be determined by GD using methods that are specific to each embodiment. Various methods of determining the content are possible.

In one embodiment, a tag can include a URL. In some embodiments, the URL included in a tag can be used identify a location on internet where the application can be downloaded from.

In other embodiments, the tag can include a tag-type. Tag type can be a value from a set that can include values such as GroceryInfo, ClothesInfo, WebForm, ParkingLot, Video, Audio, DerivedMediaInfo, SampledMedia, TvLiveVoting, SaleSchedule, Feedback, UserOrderinStore, or the like. In some embodiments, the tag type can be used to determine an application and/or a URL. The URL in such embodiments can identify an application or a location on internet where the application can be downloaded from.

In some embodiments, a tag can include information that can be used by the application determined using or associated with the tag. A TvLiveVoting tag, for example, can be associated with a Voting application. The Voting application in one embodiment can interact with a user to determine the user's vote. The TvLiveVoting tag in such embodiments can include a URL where the results determined by Voting application can be submitted.

In accordance with some embodiments of the present invention, a method is disclosed for facilitating access to a set of applications by a computing device. The method includes a step of determining contexts associated with either or both the computing device and a user of the computing device. The context describes an environment and/or an activity of the user and/or the computing device and helps generate one or more contextual tags.

The method also includes identifying one or more applications associated with the one or more contextual tags. The one or more applications are identified according to context based information contained in the one or more contextual tags and the one or more applications are thereafter received by the computing device.

To better summarize the method for facilitating access to a set of applications by the computing device in accordance with the present invention, some exemplary embodiments are described in the subsequent paragraphs.

One aspect of an embodiment of the present invention relates to a method performed by a CD in determining an application associated with a tag. In embodiments where a tag can include an app URL, a CD can determine the application based on the app URL in the tag. The app URL in some embodiments can represent the URL where the application can be downloaded from. In embodiments where a tag can include a tagType, a CD can determine an application, or a URL where the application can be downloaded from, based on the tagType. In other embodiments, the tag can itself include the application associated with the tag. When a URL specifying the location of application is determined, a CD can download the application from the URL and install it on the CD, for use by the user. Other methods of determining applications associated with the tag are possible in various embodiments.

In some embodiments, a CD can also maintain a set of applications along with their associated app URLs or tag-Types, in a store on the CD. The set of applications downloaded by the CD 102 as a result of processing the tags received by the CD can also be stored in the store. When such a set is maintained, a CD can use an application from that store, instead of downloading the application from a network. The set of applications maintained in the store can be made available for use by the user of CD when a tag for the application is not available. The applications can also be made available for use by the user, when the CD is not associated with a PD.

Another aspect of an embodiment of the present invention relates to the association of a CD with one or more PDs. In some embodiments a CD can be communicatively coupled or associated with one PD. At other times, the CD can be communicatively associated to more than one PD. When a CD is coupled to more than one PD, the CD can receive tags from some or all of the PDs. The association of a CD with a PD can be established by a user connecting an interface on a CD to an interface on a PD using a wire, for example. In some embodiments, a wireless communication channel can be used to associate a CD with some PDs. Example of wireless communication channels can include technologies such as Bluetooth, wifi, 802.11b, 802.11a, RF, other custom communication technologies or the like The association can be established using other means such as configuration on CD and/or PDs.

Another aspect of an embodiment of the present invention relates to a CD determining PDs that it can associate with, using a service. A CD can connect to a service say over the internet, to determine a list of PDs. The CD in such embodiments can provide some information to the service to help determine the list of PDs. In some embodiments, this can include the physical location co-ordinates (such as latitude, longitude, elevation). In other embodiments, the information can include information such as a telephone number associated with the PDs. The information provided to the service can include other information. Other types of services are possible in other embodiments. Such services can also use methods not described here.

In some embodiments, a CD can exchange messages with PDs identified using different schemes such as wires, wireless, configuration, services, etc. described earlier, before the association can be considered successful. In such embodiments, an unsuccessful message exchange between a CD and a given PD can result in a CD not using and/or receiving the tags from the PD.

In some embodiments, a CD can interact with the user once the CD has determined a set of PDs. The interaction with the user can determine the set of PDs that the CD can associate with. The set of PDs to associate with can also be determined by the CD, without interacting with the user. In some non-interactive embodiments, a set of rules associated with/configured on the CD can be used to determine the set of PDs that the CD can associate with. In some embodiments, the rules can specify that a CD can associate with PDs when the PD provides tags whose tagType matches one of a set of tagTypes. In some embodiments, the set of tagTypes used for selection of providers can be configured by a user. Other methods of associating CDs with PDs can be used in various embodiments.

Another aspect of embodiments of present invention relates to the disassociation of a CD with one or more PDs. A CD, after associating with some PDs can disassociate with some/all of the PDs. The disassociation results in CD not processing and/or receiving tags from the disassociated PDs. The disassociation can be due to user interaction. The disassociation can also be due to other events such as loss of communication (e.g., wireless communication) due to a user walking away with the CD, from the proximity of a PD. Other methods of disassociation can be used.

Another aspect of embodiments of the present invention relates to the assocType of a tag. A tag in some embodiments can include information related to assocType. The assocType can be one of Unicast, Multicast or Broadcast. An assocType of value Unicast can imply that the tag is meant to be received and/or processed only by one CD. An assocType of value Multicast can imply that the tag can be processed by some set of CDs. An assocType of value Broadcast can imply that the tag can be processed by any CD receiving the tag. For tags of assocType Unicast, the tag can include a consumerId that can identify the CD which can receive and/or process the tag. A consumerId can include one of many types of identifiers such as MAC address, IP address, a telephone number or the like.

Other aspects of embodiments of present invention relates to processing of tags by a CD. A CD can receive tags from one or more PDs, and can run the applications associated with the received tags. In some embodiments, the applications associated with received tags can be presented to the user of CD. In such embodiments, an application can be run based on a decision made by the user's interaction with the CD (such as selection of an application using the user interface of CD). In other embodiments, a CD can receive tags from PDs as a result of user interaction with the CD. In one embodiment, user interaction can involve user selecting a PD (using the user interface of CD) to receive the tags from. In yet other embodiments, a CD can receive tags from a PD as a result of a user interaction with the PD. User interactions with CD and/or PD can be implemented using one or more of touch screens, mouse, keyboard, etc. or the like. Tags received by CD as a result of user interaction with CD and/or PD can be processed in the same way as the tags received by CD without user interaction.

Other aspects of embodiments of the present invention relates to processing of tags received by a CD. A CD in some embodiments can store the tag and/or the associated application in a set of tags and/or applications maintained in a store on the CD. When the set of tags and/or applications are maintained in a store, a user interface can be used to present the stored tags and/or applications to the user using the user interface of CD. The application associated with stored set can be run based on a decision made by user interaction. In some embodiments, the tag (and/or associated application) stored by a CD in its store can be received by the CD as a result of user interaction with the CD. In yet other embodiments, the tag (and/or associated application) stored by a CD in its store can be received by the CD as a result of user interaction with a PD. User interactions with CD and/or PD can be implemented using one or more of touch screens, mouse, keyboard, etc. or the like. Other methods of processing the tags are possible in various embodiments.

In yet other embodiments of the present invention, tags provided by a PD can be stored in a store associated with the PD. The set of tags stored in the PD's store can be determined either based on user interaction with PD or CD or automatically. When the tags are stored in a PD, the tags can be transferred to a CD, when the CD is associated with PD. In other embodiments, the PD can also download applications associated with tags, and store them along with tags, in its store. In such embodiments, the tags and associated applications can later be transferred from PD to CD. Other methods of storing the tags in PD and/or communicating the stored tags to PD are possible in various embodiments.

Other aspects of embodiments of the present invention relates to a method of receiving contexts and/or downloading applications. In some embodiments, contexts and/or applications are received using traditional client server models with CD acting as a client. The PD can act as a server of tag, while a computer system in a network can act as a server of the application. Other embodiments of application providing servers such as Desktops, Laptops, a network of computers, etc. can be used. In yet other embodiments, systems such as peer to peer networks, distributed hash tables, tracker-less peer to peer systems, BitTorrent, GnuTella, Tapestry, Pastry or the like can be used by CD and/or PD to download/retrieve applications. Such systems can also be used by PD to provide tags and/or CD to receive tags. Peer to peer networks, distributed hash tables, tracker-less peer to peer systems, BitTorrent, GnuTella, Tapestry, Pastry or the like, can help with supporting application downloads for a large number of CDs. Other methods of providing applications and/or tags to CDs can be used.

In other embodiments, a CD and/or PD can use more than one networks to download parts of application. Different networks can include technologies such as WiFi, Cellular, Bluetooth, Ethernet, other custom communication technologies or the like. Among other advantages, the method of downloading over multiple networks can provide with faster download of an application. When using multiple networks to download application, CD and/or PD can use more than one networks of the same type. In some embodiments, one or more networks can be virtual—such as virtual private networks. CD and PD can use similar methods (associated with multiple networks) for receiving and providing tags respectively.

Another aspect of an embodiment of the present invention relates to a CD. The CD can include a storage medium (STORE), a storage interface (SI), among others. The SI along with STORE can be used by CD to store and/or manage tags and/or applications, along with storing other aspects associated with the CD. A CD can also include a tag processor (TP), a provider manager (PM), an application (app) manager (AM), a state store (STATE), an application processor (APPP), a user interface engine (UIE), a set of audio/video/user interfaces among others. The PM can help in managing associations with PDs, while the TP can help manage the receipt and/or processing of tags from PDs, sending requests for tags to PDs, etc. The AM can help with managing the applications according to various methods described earlier. STATE can be used by the CD to maintain some state associated with managing tags, applications or the like. STATE can be associated with storage that can store information while the STATE can be provided with electrical power. An example of STATE can include RAM. A CD can also include one or more network interface (NI)s. A CD can receive messages/tags from PDs, send messages to PDs, download applications from networks using NIs. In some embodiments the NI meant for associating with or receiving tags from PDs can be different from NI associated with downloading applications. In other embodiments the association with PDs, receipt of tags from PDs, sending/receiving messages to/from PDs, downloading applications can all use the same NI. Some NIs on associated with a CD can use wired technologies such as Ethernet, cable modem, firewire, USB, other custom technologies or the like. Some other NIs associated with a CD can use wireless technologies like Bluetooth, wifi, 802.11b, 802.11a, RF, or the like.

Another aspect of embodiments of the present invention relates to the methods performed by a PD. Among various methods performed by PD, the PD can associate/disassociate with CDs and communicate tags to CDs. The PD can be communicatively coupled or associated with one or more Generator Device (GD)s. A TRI generated by a GD can be communicated to one or more PDs by the GD. The PD can then communicate the tag including TRI to CDs. A PD can be associated with one or more GDs using various forms of communication that can be setup using physical wires, or wireless connectivity. A PD can be associated with GDs over a network—such an intranet, internet, or the like. A PD can be configured with information that can help associate the PD with the GDs. Information related to the configuration can include IP addresses of GD, DNS addresses of GDs, or the like. The association can also be established using services wherein the information related to identification of GDs can be retrieved from a service. When a service is used to retrieve the identification of GDs, the PD can provide an identification of the PD to the service. The identification of PD can include MAC address, IP address, DNS address, or the like. In some embodiments, PDs can exchange messages with GDs, after the GDs have been identified. A successful exchange of messages between a PD and GD can imply that the PD and GD are associated with each other for exchanging TRI. Other methods of association can be used in various embodiments.

Another aspect of an embodiment of the present invention relates to the method followed by a PD in sending tags to CDs. In some embodiments, a PD can send tags to CDs as soon as the PD receives TRI from GD. In one embodiment, a tag sent by a PD to CDs can include the TRI provided by a GD to the PD. In other embodiments, a PD can store the TRIs that it receives from GD in its STORE and communicate tags including the TRIs to CDs when the CDs request tags using a message. In other embodiments, a PD can store only one TRI it last received from GD. In such embodiments, the PD can provide only a tag associated with latest TRI upon receiving a request from CD(s). In other embodiments, a PD can store many TRIs it receives from GDs in its local STORE and communicate tags associated with the stored TRIs to CDs once every time interval. In such embodiments, the PD can remove the TRIs from its STORE once it sends the tags associated with TRIs to the CDs. In yet other embodiments, a request for a tag from a CD can be handled by a PD, by retrieving a latest TRI from GD and communicating tag associated with latest TRI to CD. In some embodiments, a PD can retrieve a latest TRI from GD by sending a RequestLatestTag message to GD. Other methods of communicating tags to CDs, receiving TRIs from GDs are possible in various embodiments.

Another aspect of an embodiment of the present invention relates to a PD. The PD can include a storage (STORE), a storage interface (SI), among others. The SI along with STORE can be used by PD to store and/or manage tags/TRIs and/or applications, along with storing other aspects associated with the PD. A PD can also include a tag processor (TP), a generator manager (GM), a consumer manager (CM), a user interface engine (UIE), a set of audio/video/user interfaces among others. The GM can help in managing associations with GDs, while the TP can help manage the receipt/processing of TRIs from GDs, and transmission of tags to CDs. The CM can help with managing the associations with CDs. A PD can also include one or more network interface (NI)s. A PD can receive messages/TRIs from GDs, send tags to CDs, receive messages from CDs, send messages to CDs and GDs, and download applications from networks using NIs. In some embodiments the NI meant for associating with or receiving TRIs from GDs can be different from NI associated sending tags to or associating with CDs, or NI associated with downloading applications. In other embodiments the association with GDs, association with CDs, receipt of TRIs from GDs, sending tags to CDs, sending/receiving messages to/from CDs and GDs, downloading applications can all use the same NI. Some NIs on PD associated with a CD can use wired technologies such as Ethernet, cable modem, firewire, USB, other custom technologies or the like. Some other NIs associated with a PD can use wireless technologies like Bluetooth, wifi, 802.11b, 802.11a, RF, or the like. In yet other embodiments, an instance of PD can include an instance of GD in the PD such that the combination of PD and GD is used as a single device.

Other aspects an embodiment of the present invention relates to the methods/apparatus of a GD. Various forms of GDs can be used. In some embodiments, GDs communicate pre-provisioned information in TRIs. In other embodiments, GDs extract information from systems such as media and communicate that information in the TRIs. In yet other embodiments, GDs can generate the TRI using sensors such as acceleration sensor, orientation sensor, etc. In yet other embodiments, GDs can generate TRI as a result of processing performed using a combination of software, firmware and hardware. Examples of such generators include a system that can take pictures of a parking lot regularly to determine the spaces that are available for parking. The parking lot generator can use various image processing techniques to compare different images to determine the free/available parking spaces. In yet other embodiments, GDs can generate information for TRI based on the information that is provided to GD. For example, a GD can generate a feedbackId for a purchase made by a customer at a store. The purchase in such embodiments can be associated with a purchaseId. The feedbackId can be used by a CD to provide feedback associated with a purchase (that is associated with purchaseId). In this example, the GD can lookup a database with the purchaseId along with any other information to determine the feedbackId. Other embodiments of GDs and interactions with GDs are possible in various embodiments.

An aspect of an embodiment of the present invention relates to a GD sending a TRI to one or more PDs. In some embodiments, a TRI can be sent by a GD to all the PDs associated with the GD. The GD can send the TRI whenever a new TRI is generated by the GD, or upon expiry of certain time interval. The GD can also send the TRI to a PD that requests the latest TRI. The events that cause the GD to send the TRIs and/or PDs to which the TRIs are sent, can be specific to each embodiment.

An aspect of an embodiment of the present invention relates to method followed by a GD in determining some or all of the information included in a TRI. In some embodiments, the TRI sent by a GD can include pre-provisioned content. GDs can be associated with user interface that can allow setting and/or changing of some or all of the content included in TRIs. An embodiment which uses such GD includes a store's aisle where a GD can send TRIs which can include information related to the products in the aisle. The GD can include in the TRIs, the category of products such as BeautyProducts, Groceries, Clothes, or the like. The GD can also include sub categories in each tag, such as Men, Women, Teens, Toddlers, Girls, Boys, etc. for the Clothes tag. The GD can also include in TRIs, a URL wherein detailed information associated with products in the aisle can be accessed. A GD such as the one described in this embodiment can send the same information in TRIs over a period of time. The GD can send the information regularly, once every time interval. Some or all of information included in TRIs by the GD can be changed using the user interface of GD. Other methods of changing the information included in TRIs are possible. Other events that trigger sending of TRIs are possible in different embodiments.

Another aspect of an embodiment of the present invention relates to method followed by a GD in determining some or all of the information included in a TRI. In some embodiments, the TRI sent by GDs can include information retrieved from sensors associated with the GD. Examples of sensors include a temperature sensor, an acceleration sensor, an orientation sensor or the like. The TRI sent by a GD can include information retrieved from one or more sensors associated with the GD. The GD can send the TRI regularly, once every time interval. The GD can send TRIs with information from some sensors (say acceleration or orientation) with low time intervals. The GD can send TRIs with information for some sensors (such as temperature) with high time intervals. The GD can send TRIs that can include information from more than one sensor. When a TRI is sent by GD, the GD can include the latest information retrieved from the sensors. The GD can also send TRIs at different rates based on some configuration, or request by a PD. Other events that trigger sending of TRIs are possible in different embodiments.

Another aspect of an embodiment of the present invention relates to method followed by a GD in determining some or all of the information included in a TRI. In some embodiments, the TRI sent by GDs can include information that is a result of some transaction performed external to the system described in this embodiment. An example of such embodiment is a GD that can include a feedbackId in a TRI, which can be used by an application in submitting feedback. The feedbackId included in a TRI can be associated with an orderId which can identify the services received or products purchased by a customer. In this embodiment, the GD can determine the feedbackId for a given orderId by looking up a database system that can provide a feedbackId for a given orderId. The GD can lookup the database by providing the orderId (along with any other information) to determine the feedbackId. The GD can then generate a TRI that can include the feedbackId and orderId. The GD can generate a TRI when it is provided with a message that includes a request for generating the TRI. A message with a request for generating the TRI can include an orderId that can be used to determine the feedbackId in the TRI. Other events that trigger sending of TRIs are possible in different embodiments.

Another aspect of an embodiment of the present invention relates to method followed by a GD in determining some or all of the information included in a TRI. In some embodiments, the TRI sent by GDs can include information extracted from a media stream. In some embodiments, media can be tagged with a variety of information. An example of such media stream is video stream in MPEG-47 format. In this embodiment, the TRI generated by a GD can include information extracted from MPEG-47 media stream. MPEG-47 media stream can be tagged with information that can include information such as app URL, tag type, appData, or the like. In some embodiments, MPEG-47 media stream can be classified into tracks. Each track can include a media stream that is produced separately or considered logically separate from other tracks. Examples of tracks include an advertisement, a song, an episode of a TV program, or the like. In some embodiments, each track can be tagged with information that can help determine the content included in a single TRI. A track can also be tagged with information that can help determine information included in multiple TRIs. The information extracted from media stream can be included in the TRI generated by GD. The GD can also include other information derived by GD, in a TRI. Example of such information includes the channel number, channel frequency, the time TRI is generated, channel name, or the like. The derived information can help a CD in determining information associated with the media that is not encoded in the media stream. The GD can also include a sample of the media in the TRI generated by the GD. TRIs can be generated by a GD, once for each track. TRIs can also be generated by a GD regularly once every time interval. When a TRI is generated by GD, the TRI can include one or more of last retrieved, last derived or last sampled-media information. Other methods of determining the information related-to or extracted-from media streams are possible in different embodiments. Other events that trigger sending of TRIs are possible in different embodiments.

Another aspect of an embodiment of the present invention relates to method followed by a GD in determining some or all of the information included in a TRI. In some embodiments, the TRI sent by GDs can include information extracted or derived from web content. An example of such embodiment includes a GD that is associated with a web browser on a personal computer or a computer system. GD in some embodiments can be implemented entirely in software. The GD in this example can help generate TRIs that can include information about the fields that need to be filled on a form in the web page currently displayed by the browser. Information about the fields can include First Name, Last Name, Address, User ID, etc. among others. The TRI in this example embodiment can also include information about the method of communicating the values associated with fields back to the browser—such as an IP address and port number. When a tag including the information about the fields in a form is received by a CD, an application associated with this tag on the CD can retrieve the information from CD's STORE and convey the information back to the browser. In this example, a CD maintains the information that can be filled in web forms in the STORE. The TRIs generated by GD for each web page/web site can be different and/or handled by different applications on CDs. The notion of web page or web content can be extended to pages/content handled in localized networks such as intranets. The form filler GD for example can be used along with a CD of a patient, to fill forms on a computer associated with a hospital. Different types of tags can be used for different web pages and/or content. The trigger for sending the TRIs by GD can also be different for different web pages and/or content. For some web pages, the trigger can be the completion of display by a web browser, while for some other web pages the trigger can be a selection associated a user interface element such as a click of a button. Other events that trigger sending of TRIs are possible in different embodiments.

Another aspect of an embodiment of the present invention relates to method followed by a GD in determining some or all of the information included in a TRI. In some embodiments, the TRI sent by GDs can include information derived due to processing by a combination of software, firmware and hardware. An example of such an embodiment includes a ParkingLot GD. The GD in this example can be associated with one or more cameras that take pictures of a parking lot at regular time intervals—such as 5 seconds. A set of processes that can include a combination of software, firmware and hardware, on GD can compare pictures from one or more cameras to determine the spaces that are available for parking in the parking lot. The GD can generate a TRI that includes information about the spaces that are free in the parking lot, along with the location (such as latitude, longitude, elevation, building, floor, parking lot area number, etc.) of those free spaces. The tag when received by a CD can be associated with an application that provides directions to free parking spaces. The method of using a combination of software, firmware and hardware to determine some or all of the content of tags can be used in other embodiments too. The tag associated with ParkingLot example embodiment can be generated once every time interval. Other events that trigger sending of tags/TRIs are possible in different embodiments.

Another aspect of an embodiment of the present invention relates to method followed by a GD in determining some or all of the information included in a TRI. In some embodiments, the TRI sent by GDs can include information determined using a combination of information from CD, information from some service, and information specific to the embodiment in which the GD is used. An example of such embodiment is a GD at a restaurant that provides TRIs which can include ratings of items at the restaurant as provided by the friends of a user associated with a CD. In this embodiment, a GD can generate a TRI in response to a request message from a CD. The request message can include a userId of the user of CD. The GD can associate with social networking services such as facebook, twitter, etc. to determine the list of friends associated with the userId. The GD can then determine the ratings of products served at the restaurant, as provided by friends of users retrieved from external service (facebook, twitter, etc.) The TRI generated by GD can include these ratings. Different methods of using information from a combination of devices and/or services to determine information that can be included in a TRI can be used in other embodiments. Other events that trigger sending of TRIs are possible in different embodiments.

Another aspect of an embodiment of the present invention relates to the GD. The GD can be implemented using a hardware device as in pre-provisioning embodiments. In these embodiments, a GD can be implemented using RF devices, plug computers such as Sheeva Plug, or the like. In other embodiments such as ParkingLot described earlier, the GD can be implemented using a computer system such as a personal computer (PC), Desktop, Laptop, or the like. The GD in the sensor embodiments can be associated with sensors internal or external to the GD. When external to the GD, the sensors can be communicatively coupled with GD using a combination of wired/wireless connectivity. In embodiments such as where information is extracted from media, the GD can be a separate hardware device that can include a combination of hardware, firmware and software to extract data from media stream. Some embodiments of GD, as in case of those driven by transactions, can be interfaced with other elements of the system—such as transaction system using a combination of software and/or hardware interfaces. Software interfaces such as CORBA, RPC, message passing, etc. can be used. Hardware interfaces such as Ethernet, firewire, USB, custom hardware, etc. can be used as well. In some embodiments, the GD can be associated with external services using a combination of software, firmware and hardware. Example of such embodiment is the SocialRating restaurant rating embodiment described earlier. Some embodiments of GD can include a STORE coupled to a storage interface (SI). The SI can be used to store information in or retrieve information from the STORE. In some embodiments GD can be associated with a provider manager (PM) that can be used to associate the GD with one or more PDs. Some instances of GD can also be associated with user interfaces that can allow configuration of GD based on the embodiment. In some embodiments, GD can be integrated into a device along with a PD, such that the combination of PD and GD is available as a single hardware device. For example, the extractor GD and PD for media can be integrated into devices such as set top box, televisions, or the like. Aspects of GD, or the entire GD, can be implemented completely in software. An example of a software version of GD is the web page extractor described earlier. Parts of GD can be implemented in software, parts in firmware and parts in hardware. The GD can also have a variety of wired interfaces such as USB, firewire, Ethernet, other custom wired technologies etc. and/or wireless interfaces such as USB, firewire, wifi, 802.11b, other custom wireless technologies or the like. Other embodiments of GD are also possible in various embodiments.

In yet another embodiment of present invention a computer program product is provided for facilitating access of a computing device to a set of applications. The computer program product includes instructions for determining contexts associated either or both the computing device and a user of the computing device. The context describes an environment and/or an activity of the user and/or the computing device and helps generate one or more contextual tags.

The computer program product also includes instructions for identifying one or more applications associated with the one or more contextual tags. The one or more applications are identified according to context based information contained in the one or more contextual tags and the one or more applications are thereafter received by the computing device.

It will be appreciated that embodiments of the invention described herein may include one or more conventional processors and unique stored program instructions that control the system of the invention to implement, in conjunction with certain non-processor circuits, some, most, or all of the functions of application identification described herein. The non-processor circuits may include, but are not limited to, a radio receiver, a radio transmitter, signal drivers, clock circuits, power source circuits, and user input devices. As such, these functions may be interpreted as steps of a method to enable a computing device to access to a set of applications. Methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The following detailed description together with accompanying drawings will provide a better understanding of the nature and advantages of aspects of various embodiments associated with the present invention.

BRIEF DESCRIPTION OF FIGURES

The features and aspects of the present invention, which are believed to be novel, are set forth with particularity in the appended claims. The invention may best be understood by reference to the following description, taken in conjunction with the accompanying drawings. These drawings and the associated description are provided to illustrate some embodiments of the invention, and not to limit the scope of the invention.

FIG. 4A-B illustrates a list of types, one of which can be associated with a tag according to an embodiment of the present invention;

FIG. 5 illustrates types of fields/content associated with a tag according to an embodiment of the present invention;

FIG. 6 illustrates some of the fields generated and/or provided by GDs, and which can be included in a tag according to an embodiment of the present invention;

FIG. 7 illustrates fields associated with a sample of media included in tags and TRIs according to an embodiment of the present invention;

FIG. 8 illustrates a list of types, one of which can be associated with an interface of CD according to an embodiment of the present invention;

FIG. 9 illustrates a list of association types, one of which can be associated with a tag according to an embodiment of the present invention;

FIG. 10 illustrates a list of types, one of which can be associated with a message that is exchanged among various devices according to an embodiment of the present invention;

FIG. 11 illustrates a list of fields that can be included in messages exchanged among various devices according to an embodiment of the present invention;

FIG. 12 illustrates a list of values, one of which can be associated with an idProvider field used in messages according to an embodiment of the present invention;

FIG. 13 illustrates fields associated with (ConsumerInfo or CI) that can be associated with a CD according to an embodiment of the present invention;

FIG. 14 illustrates fields associated with state maintained by a CD according to an embodiment of the present invention;

FIG. 15 illustrates fields associated with (ProviderInfo or PI) that can be associated with a PD according to an embodiment of the present invention;

FIG. 16 illustrates fields associated with state maintained by a PD according to an embodiment of the present invention;

FIG. 17 illustrates fields associated with (GeneratorInfo or GI) that can be associated with a GD according to an embodiment of the present invention;

FIG. 18 illustrates fields associated with state maintained by a GD according to an embodiment of the present invention;

FIG. 19 illustrates fields that can be associated with an application according to an embodiment of the present invention;

FIG. 20 illustrates fields determined by a GD and which can be carried in a tag of type MultiType according to an embodiment of the present invention;

FIG. 21 illustrates fields associated with information determined by a GD according to an embodiment of the present invention;

FIG. 33 illustrates the flow diagram of a process followed by a CD in determining the PDs and associating with them according to an embodiment of the present invention;

FIG. 34 illustrates the flow diagram of a process followed by a CD in determining the PD and the PI associated with PD, when PD is connected to CD, according to an embodiment of the present invention;

FIG. 35 illustrates the flow diagram of a process followed by a CD in determining the PD and the PI associated with PD, when CD is configured with information of PD, according to an embodiment of the present invention;

FIG. 36 illustrates the flow diagram of a process followed by a CD in determining the PDs and the PI associated with PDs, when CD is configured with service related information, according to an embodiment of the present invention;

FIG. 49 illustrates the flow diagram of a process followed by a PD in associating with a CD, according to an embodiment of the present invention;

FIG. 50 illustrates the flow diagram of a process followed by a PD in getting CI associated with a CD that is connected to the PD, according to an embodiment of the present invention;

FIG. 51 illustrates the flow diagram of a process followed by a PD in getting CI associated with a CD, where PD is configured with information associated with the CD, according to an embodiment of the present invention;

FIG. 52 illustrates the flow diagram of a process followed by a PD in getting CI associated with a CD that is discovered by the PD, according to an embodiment of the present invention;

FIG. 64 illustrates the flow diagram of a process followed by a GD in associating with a PD according to an embodiment of the present invention;

FIG. 65 illustrates the flow diagram of a process followed by a GD in getting PI from a PD, when the GD is connected physically to the PD, according to an embodiment of the present invention;

FIG. 66 illustrates the flow diagram of a process followed by a GD in getting PI from a PD, when the GD is configured with information associated with the PD, according to an embodiment of the present invention;

FIG. 67 illustrates the flow diagram of a process followed by a GD in getting PI from a PD, when the GD discovers the PD, according to an embodiment of the present invention;

FIG. 91 illustrates a system showing association between a CD, a PD, and a media device that includes aspects of GD, according to an embodiment of the present invention;

FIG. 92 illustrates a system showing association between a CD that includes aspects of PD, and a media device that includes aspects of a GD, according to an embodiment of the present invention;

FIG. 93 illustrates a system showing a device that includes aspects of a CD, a PD and a GD according to an embodiment of the present invention;

FIG. 94 illustrates a system showing a media device associated with a device that includes aspects of a CD, a PD and a GD, according to an embodiment of the present invention;

FIG. 99 illustrates fields associated with information determined by a GD in association with temperature sensors, according to an embodiment of the present invention;

FIG. 100 illustrates fields associated with information determined by a GD in association with acceleration sensors, according to an embodiment of the present invention;

FIG. 101 illustrates fields associated with information determined by a GD in association with orientation sensors, according to an embodiment of the present invention;

FIG. 102 illustrates fields associated with information determined by a GD in association with ParkingLot sensors, according to an embodiment of the present invention;

FIG. 109 illustrates the flow diagram of a process followed by a GD in determining TRI wherein GD is associated with temperature sensors, according to an embodiment of the present invention;

FIG. 110 illustrates the flow diagram of a process followed by a GD in determining TRI wherein GD is associated with acceleration sensors, according to an embodiment of the present invention;

FIG. 111 illustrates the flow diagram of a process followed by a GD in determining TRI wherein GD is associated with orientation sensors, according to an embodiment of the present invention;

FIG. 112 illustrates fields associated with a structure of information referred to as ContextApp (CA) according to an embodiment of the present invention;

FIG. 116 illustrates a GD for generating tags according to a yet another embodiment of the present invention;

FIG. 117 illustrates a GD for generating tags according to a yet another embodiment of the present invention;

FIG. 118 illustrates fields associated with TRI determined by a GD, and some/all of which can be included in a tag associated with Feedback type, according to an embodiment of the present invention;

FIG. 119 illustrates fields associated with TRI determined by a GD, and some/all of which can be included in a tag associated with OrderInfo type, according to an embodiment of the present invention;

FIG. 120 illustrates fields associated with TRI determined by a GD, and some/all of which can be included in a tag associated with DerivedRating type, according to an embodiment of the present invention;

FIG. 121 illustrates the flow diagram of a process followed by a GD in initializing gState associated with the GD according to an embodiment of the present invention;

FIG. 122 illustrates the flow diagram of a process followed by a GD in determining TRI, and communicating TRI according to an embodiment of the present invention;

FIG. 123 illustrates the flow diagram of a process followed by a GD in determining part of information that can be included in tags associated with Feedback type, according to an embodiment of the present invention;

FIG. 124 illustrates the flow diagram of a process followed by a GD in determining part of information that can be included in tags associated with OrderInfo type, according to an embodiment of the present invention;

FIG. 125 illustrates a system showing the usage of a GD, PDs and CDs wherein tags are generated for transactions that occur in the system, according to an embodiment of the present invention;

FIG. 126 illustrates a GD associated with PDs according to an embodiment of the present invention;

FIG. 127 illustrates a PD associated with CDs according to an embodiment of the present invention;

Figure 132:
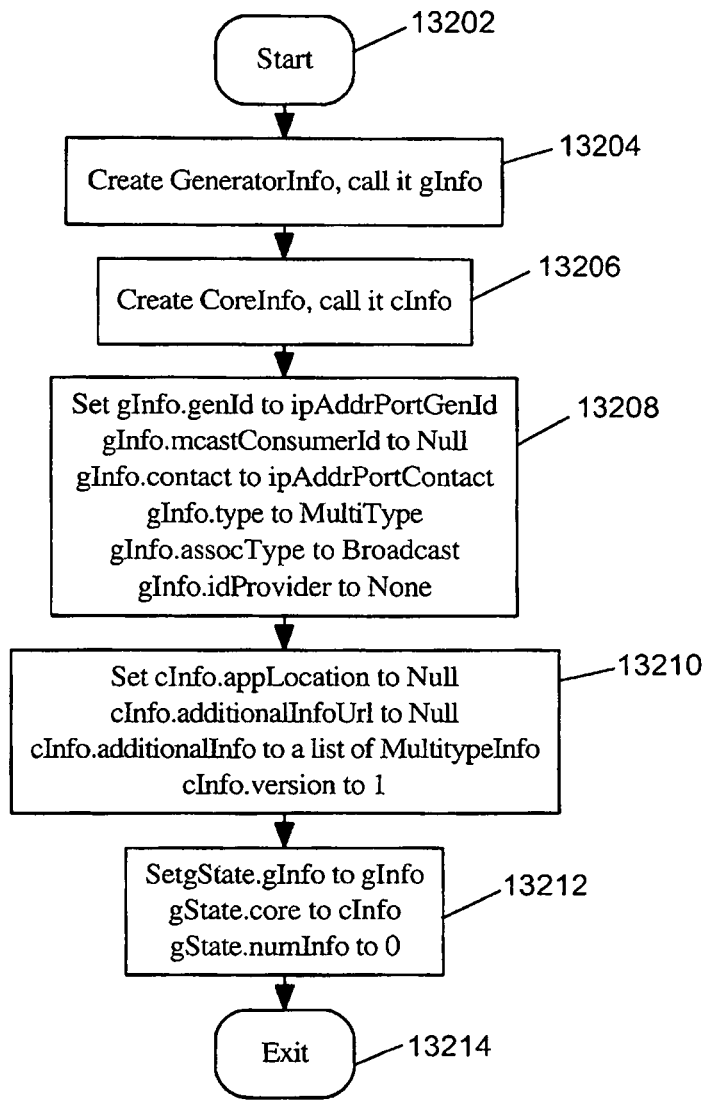
Figure 133:
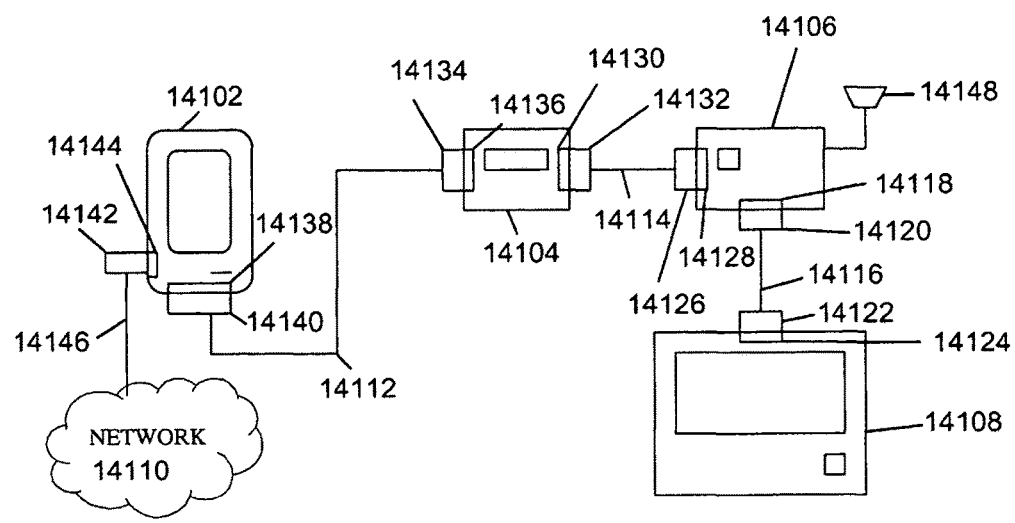
Figure 134:
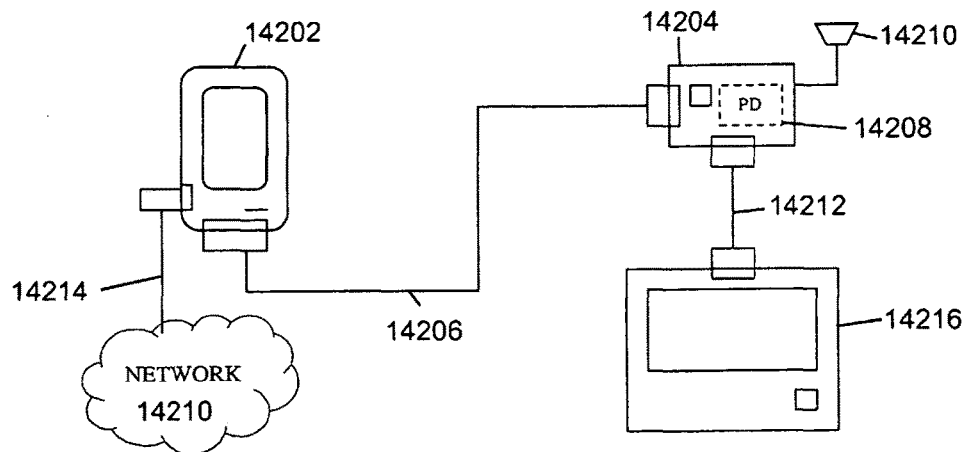

FIG. 128 illustrates associations among GDs, PDs and CDs according to an embodiment of the present invention;

FIG. 129 illustrates associations among GDs, PDs and CDs according to yet another embodiment of the present invention;

FIG. 130 illustrates association between, a device that includes aspects of a GD and a PD, and CDs according to an embodiment of the present invention;

FIG. 131 illustrates a device that includes aspects of a GD, a PD and a CD according to an embodiment of the present invention;

FIG. 132 illustrates the flow diagram of a process followed by a GD in initializing part of state (gState) associated with the GD according to an embodiment of the present invention;

FIG. 133 illustrates a system showing associations between a CD, a PD and a GD, wherein GD generates TRIs using information extracted from media according to an embodiment of the present invention; and FIG. 134 illustrates a system showing association between a CD, and a GD that includes aspects of PD, according to an embodiment of the present invention;

Those with ordinary skill in the art will appreciate that the elements in the figures are illustrated for simplicity and clarity and are not necessarily drawn to scale. For example, the dimensions of some of the elements in the figures are not in proportion relative to other elements, in order to improve the understanding of the present invention.

There may be additional structures described in the foregoing application that are not depicted on one or more of the described drawings. In the event such a structure is described, but not depicted in a drawing, the absence of such a drawing should not be considered as an omission of such design from the specification.

DETAILED DESCRIPTION OF THE EXEMPLARY EMBODIMENTS

First Embodiment

Before describing the embodiments of the present invention in detail, it should be observed that the embodiments of the present invention utilize a combination of method steps, system components and a computer program product related to a method that facilitates a computing device to access a set of applications by determining contexts such as an environment and/or activity of the computing device and/or a user of the computing device. Accordingly the apparatus components and the method steps have been represented where appropriate by conventional symbols in the drawings, showing only specific details that are pertinent for an understanding of the embodiments of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

An instance 'x' is also used in various methods, flow diagrams, figures, or the like, to associate a means of communicating certain values to another methods, flow diagrams, or the like. For example, a flow diagram or a method A interested in communicating values v1, v2 and v3, to a flow diagram or a method B can associate v1, v2 and v3 with an instance x. Similarly the method B can associate some values with an instance x to communicate back with method A. One of the examples wherein an instance x can be used is when values are passed to "functions" as modeled in C programming language. Instance x can also be used to return values from "functions". The use of functions and C programming language is illustrative only, and other forms of exchanging information between processes can be used.

Structure of First Embodiment

In one embodiment of the present invention, a system is provided for facilitating access to one or more applications by a computing device. The system includes a context module configured to determine one or more contexts associated with at least one of the computing device and a user of the computing device. The context describes an environment and/or an activity of the user and/or the computing device and helps generate at least a first portion of the one or more contextual tags corresponding to the one or more contexts. The context includes a set of data that provides any information relating to the environment of the user and/or the computing device, including but not limited to conditions, background, internal features of computing device (like other applications, operating systems, sensors, components, etc.), data from the internal features, external features (like WiFi devices, physical signs, bar codes, location, some third party devices, third party systems, or the like), data from the external features (WiFi scan, signals from a satellite, signals from a device such as Bluetooth or other devices, NFC device, data over networks such as intranet/internet, or the like), data from external systems and/or services (including data provided by a service over networks such as internet/intranet), settings and situation of the user and/or the computing device. Also, the context can include a set of data that provides any information relating to the activity of the user and/or the computing device, including, interaction between the user and the computing device, interaction between the user/the computing device and a third party device and/or service, state of the user/the computing device, internal operations of the computing device, or the like.

The system also includes a processor communicatively associated with the context module, and configured to at least one of: generating a second portion of the contextual tags, and providing the contextual tags to the computing device, thereby enabling the computing device to identify one or more applications associated with the one or more contextual tags. The one or more applications are identified according to context based information contained in the one or more contextual tags and the one or more applications are thereafter received by and/or accessed by and/or activated on the computing device. In other words, the processor generates the second portion of the contextual tag if the context module generates only the first portion of the contextual tag, else if the context module generates the complete contextual tag, then the processor relays the contextual tag to the computing device, thereby enabling the computing device to access the one or more applications corresponding to the contextual tag.

The system includes two elements (a processor and a context module) that are described herein. In an embodiment, the two elements can be combined into a single device that includes both the elements. Conversely, the functionality of the two elements described herein can be performed by two different devices. For example, in some embodiments a processor and a context module may perform the functions of the providing device and the generating device respectively, while being two separate devices. Whereas in some embodiments the system may be just a single device that includes both the context module and the processor, thereby allowing the single device to perform both the functions of the generating device and the functions of the providing device. In yet other embodiments, the generating device and the provider device can be a embedded in the computing device and can be implemented as a part of the computing device, such that the computing device is enabled to perform the functions of both the provider device and the generating device. Other combinations of generator device, provider device and computing device are possible.

Moving on, once the contextual tag is generated in the form of any one or more of a manual tag, a dial-an-app tag, a static tag, a dynamic tag, an extracted tag, a derived info tag, a web based tag, a transaction driven tag, a social aspect tag or other tags, then one or more applications corresponding to the contextual tag are identified. In an embodiment, the processor, by relaying the contextual tag to the computing device, enables the computing device to access the one or more applications.

In some embodiment, the applications are activated simultaneously while being downloaded, whereas in other embodiments, some of the applications are automatically activated on the computing device. In yet other embodiments, the one or more applications identified corresponding to the one more contextual tags may already be present on the computing device and may be accessed from there.

Further, according to an embodiment of the invention, at least a part of the contextual tag may be stored in one or more intermediate devices before the one or more applications are associated with the contextual tag. For example in an embodiment, the contextual tag after being generated may be stored in the providing device or the generating device or other devices connected to a network like a set top box or a router, before being transferred to the computing device. In some cases, the one or more applications are identified based on only a portion of the contextual tag and not the complete contextual tag.

As discussed, there could be various types of contextual tags that are generated and there could be various ways of identifying the one or more contexts. For example, in an embodiment, a URL can be determined using at least a portion of the contextual tag and thereafter, the computing device can be enabled to access and activate an application that can utilize/access the URL. In another scenario, the computing device can be allowed to access the one or more applications associated with a phone number being dialed by the user of the computing device.

Further, according to an embodiment of the invention, the user is also given an option to select one or more applications. The selected applications can then be accessed and/or activated by the computing device.

In further embodiments, the one or more contexts are determined when a user selects to do so manually or in other cases the determination of the one or more contexts can be scheduled to be repeated regularly after a predefined time interval. However, it should be appreciated by the person skilled in the art that other methods of determining contexts are also possible.

Some embodiments of the invention also provide an option of cleaning up or removing of the one or more applications from the computing device. This can be possible in case of one or more of a change in the one or more contexts is determined, or the user is found to be not interacting with an earlier activated/accessed application for a predefined time, or the one or more applications is inactive, or there has been a lapse of a predefined time spent during or after accessing the one or more applications.

Going forward, we describe various elements separately for ease of understanding and to describe logical differences in the functions performed by each element. In this regard, the term "processor" has been also mentioned as a "providing device" and the term "context module" has been referred to as "generating device" in some embodiments for easier description of the invention. Also, the term "one or more context" is mentioned as "context information" or "information" or alike. Similarly, the term "computing device" is also referred as "consumer device" and the term "contextual tag" and "tag" have been interchangeably used in description of the embodiments of the present invention. Also, the term "memory module" and "store" have been interchangeably used in description of some embodiments of the present invention.

The system according to the present invention for facilitating access of a computing device to a set of applications is defined herein with the help of exemplary embodiments.

Figure 1A:
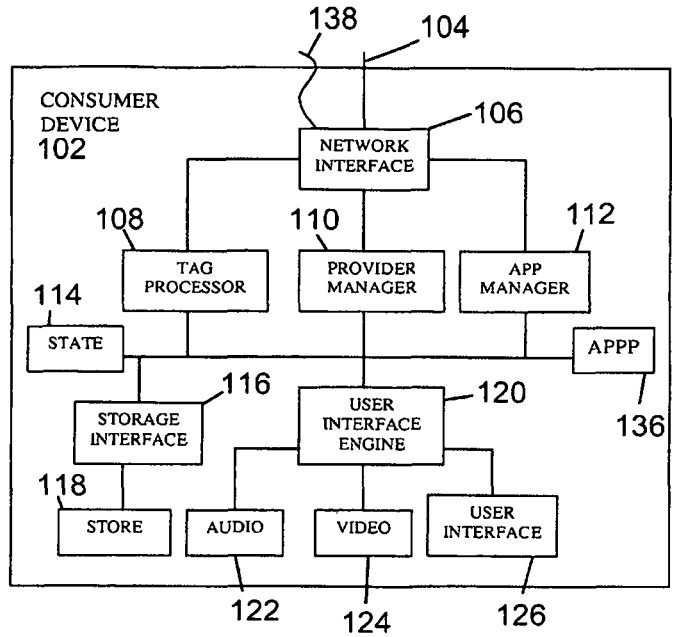
FIG. 1A illustrates a Consumer Device (CD) for managing applications according to an embodiment of the present invention.

Referring now to drawings FIG. 1A illustrates a computing device. Computing device is referred here as a consumer Device (CD) 102 for managing applications according to an embodiment of the present invention.

In this embodiment CD 102 can include tag processor (TAGP) 108, provider manager (PMAN) 110, application manager (AMAN) 112, application (APP) 136, state (STATE) 114, storage interface (STI) 116, storage (STORE) 118, user interface engine (UIE) 120, audio output device 122, video output device 124, user interface 126, network interface 106, antenna 104 and network cable 138. In one embodiment, audio device 122 can include, e.g., a conventional headphones jack and/or one or more speakers. Video Output 124 can include, e.g., an LCD screen. User Interface 126 can include, e.g., one or more buttons, touch pads, touch screens, scroll wheels, click wheels, or any other control(s) capable of generating electrical signals corresponding to manipulations of the control(s) by a user. Embodiments of CD 102 can be associated with portable media devices (PMD), personal digital assistants (PDA), media servers, devices such as mobile phones, PCs, server computers, laptops, set top boxes such as those associated with television sets, or the like. An instance of CD 102 can be static and not moving physically like a desktop computer, or can be a mobile device—such as a laptop or a mobile phone. In some embodiments, instances of CD 102 can be connected to other entities of the system by a variety of network technologies that can include wired and/or wireless communications, such as Ethernet, USB, modems, cable modems, firewire, wifi, cellular communication networks, or the like.

User Interface Engine 120 can include any combination of circuitry and/or instructions that enables a user to control operation of CD 102. In one embodiment, user interface engine 120 receives user inputs from user interface 126 and provides commands to AMAN 112 and/or PMAN 110 and/or APP 136. User interface engine 120 can also receive data from AMAN 112 and/or PMAN 110 and/or APP 136, and provide output to user via audio output device 122 and/or video output device 124.

Further, APP 136 can include any combination of firmware and/or instructions and/or circuitry that can allow the CD 102 in providing one or more services to a user of CD 102. An instance of CD 102 can be associated with one or more instances of APP 136. In one embodiment, APP 136 can interact with user using audio device 122, video output device 124 and/or user interface 126, with help from user interface engine 120. In one embodiment APP 136 can allow the user to purchase a product. Other examples of APP 136 can allow the user to make stock transactions online, search for an item among a set maintained by a server, update personal information associated with a user at a server, providing a rating/vote related to participants in a live reality TV show, get information related to items in an aisle of a grocery store, provide information regarding availability of spaces in a parking lot, record the schedule related to a sale that is currently advertised on a TV, get information related to items purchased at a store, mall or online; provide feedback related to a service/purchase received/made by the user, among others. APP 136 can be associated with graphical interfaces in some embodiments.

In some embodiments, some or all aspects of APP 136 can be retrieved by AMAN 112 from a network using NI 106. In some embodiments, some or all aspects of APP 136 can be stored in STORE 118. An instance of APP 136 can be made available for providing services to users of CD 102 by AMAN 112. AMAN 112 can retrieve an APP 136 from network using NI 106 or from STORE 118 before making the APP 136 provide services to user of CD 102. Examples of APP 136 can include Applications (that can include Activity, Service, etc.) associated with Android Operating System, Applications associated with iOS such as the one related to the operating system running on iPhone, iPad, iPod Touch, or the like; or applications associated with other operating systems, platforms, or the like. In one embodiment, Applications related to Android Operating system can be associated with APP 136. In this example, android application can be downloaded from network by AMAN 112 using NI 106 or stored in STORE 118. An application can be made active (or made to run) by AMAN 112 by retrieving the application from STORE 118, retrieving the application from NI 106, or the like. In some embodiments, one or more instances of APP 136 can be dormant and/or not providing services to user of CD 102. In such embodiments, APP 136 can be made active or provide services to user of CD 102, by AMAN 112 using mechanisms that can be specific to the embodiment (such as using Intents on Android Operating System).

In some embodiments, there can be more than one instance of APP 136 running on CD 102, each providing a different service to the user. APP 136 can use NI 106 in communicating with devices or services in the network. In some embodiments, APP 136 does not interact with a user. An instance of APP 136 in such embodiments can be providing services to another application associated with CD 102. Instances of APP 136 can be providing services to more than one application associated with CD 102.

Network interface 106 can include any combination of circuitry and/or instructions that can allow CD 102 and/or aspects of CD 102 in communicating with other devices in a network. Network interface 106 can include components such as TCP sockets, UDP sockets, etc. Network interface 106 can also include components such as NICs, Network interface 106 can also include a connector (not shown) providing mechanical and/or electrical coupling to connect to antenna 104 capable of sending/receiving messages over a network. Network interface 106 can also include a connector (not shown) providing mechanical and/or electrical coupling to cable 138 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. Network interface 106 can be connected to antenna 104 and/or cable 138 with or without a connector.

Storage 118 can be used to store information that can include one or more of APP 136 retrieved from network, media assets (e.g, music, video, podcasts, photos, or other still images, etc.) as well as tags provided by PDs. Storage device 118 can include, e.g., magnetic or optical disk, flash memory, or any other storage medium that supports storage of data for an arbitrary period of time (e.g., until deleted by a user). Storage Interface 116 can include any combination of circuitry and/or instructions that manages access to storage 118. In one embodiment, SI 116 supports reading from and writing to STORE 118.

STATE 114 can be used to store information that can include information related to one or more PDs that CD 102 can be associated with, identifiers related to CD 102 that can be related to associations with PDs, or the like. Various entities of information can be stored in STATE 114 in a way such that different entities can be accessed separately. In one embodiment, information illustrated in FIG. 14 can be stored in STATE 114. Information described in FIG. 14 stored in STATE 114, is referred to as cState for use in the description of other apparatus, methods and systems. Other information related to APP 136 can be stored in STATE 114. STATE 114 can include e.g., SRAM, DRAM, RAM, NVRAM or any other medium that supports storage. In some embodiments, STATE 114 can maintain information as long as electrical power can be provided to STATE 114. In some embodiments, information stored in STATE 114 can instead be stored in STORE 118. In such embodiments, STATE 114 can not be included in the CD.

TAGP 108 can include any combination of circuitry and/or instructions that can allow CD 102, to receive and process tags. In one embodiment of the invention, TAGP 108 can receive tags from PDs. TAGP 108 can determine if the received tag can be used by the CD 102. In embodiments where cState as illustrated in FIG. 14 is stored in STATE 114, TAGP 108 can use information related to cState in determining if a tag received by the CD 102 can be used by the CD. TAGP 108 can also communicate received tags to AMAN 112.

PMAN 110 can include any combination of circuitry and/or instructions that can allow CD 102, in associating with instances of PD 202. In one embodiment of the invention PMAN 110 can include a detection aspect and an association aspect. The detection aspect of PMAN 110 can include various methods of detecting instances of PD 202 that the PMAN 110 can associate with. In one embodiment, PMAN 110 can use mechanisms that can be made available by NI 106 in detecting new instances of PD 202. In embodiments wherein NI 106 is related to USB interface, PMAN 110 can communicate with USB in determining if NI 106 detected new instances of PD 202. PMAN 110 can also send/receive messages to/from instances of PD 202 using NI 106. PMAN 110 can send/receive messages when (dis)associating with instances of PD 202. PMAN 110 can also use/update information related to cState stored in STATE 114. In one embodiment, PMAN 110 can interact with UIE 120 to present a list of PD 202 instances detected by PMAN 110. In such embodiment, a user of CD 102 can select one or more instances of PD 202 using UI 126. PMAN 110 can associate with instances of PD 202 selected by the user, in such embodiments.

AMAN 112 can include any combination of circuitry and/or instructions that can allow CD 102, in managing one or more instances of APP 136. In one embodiment of the invention, AMAN 112 can manage more than one instance of APP 136. AMAN 112 can receive tags from TAGP 108. AMAN 112 can associate tags to instances of APP 136 that are active and providing services to users of CD 102, or can associate tags to instances of APP 136 that can be retrieved from network or STORE 118. When tags can be associated with instances of APP 136 from network or STORE 118, AMAN 112 can retrieve APP 136 from network or STORE 118. The retrieved APP 136 can be activated, which can result in APP 136 starting to provide services.

In embodiments wherein some/all aspects of CD 102 can be included in devices such as smart phone supporting Android operating system, AMAN 112 can be implemented using an application on Android operating system. AMAN 112 in such embodiment can be associated with one or more aspects of Android operating system such as Activity, Service, Intents, including others.

Instances of APP 136 retrieved from network by AMAN 112 can be stored in STORE 118 in a way that the instances of APP 136 stored by AMAN 112 can be differentiated from instances of APP 136 that are not stored by AMAN 112. In the example embodiment of smart phone running Android operating system, a user of CD 102 can choose to download applications by browsing the applications provided by Android Market. The set of applications download by the user using Android Market, in such embodiments can be maintained separately from the applications downloaded and stored in STORE 118 by AMAN 112. The set of APP 136 instances stored in STORE 118 due to methods that can not involve AMAN 112 is referred to as manualAppStore for use in apparatus, methods and systems of the invention and related embodiments. The set of APP 136 instances stored in STORE 118 by AMAN 112 is referred to as appStore for use in apparatus, methods and systems of the invention and related embodiments. In some embodiments where a file system can be available to manage STORE 118, appStore and manualAppStore can be implemented using different directories in the file system. Examples of file systems include FAT-16, JFFS, EXT2, or the like, supported by various operating systems that can include Windows from Microsoft Corporation, Linux, Android, or the like.

Aspects of NI 106, TAGP 108, PMAN 110, AMAN 112, APP 136, STATE 114, STI 116, STORE 118, UIE 120, audio device 122, video device 124, UI 126 can be implemented e.g., using instructions of the computer program product executing on one or more suitably configured microprocessors or microcontrollers (not explicitly shown). Other implementations are also possible.

CD 102 can also include other aspects in addition to or instead of those shown here. For example, CD 102 can include a camera that can allow CD 102 to be used in taking still/motion pictures. Camera on CD 102 can be associated with some of instances of APP 136 that can provide services to users of CD 102.

Figure 1B:
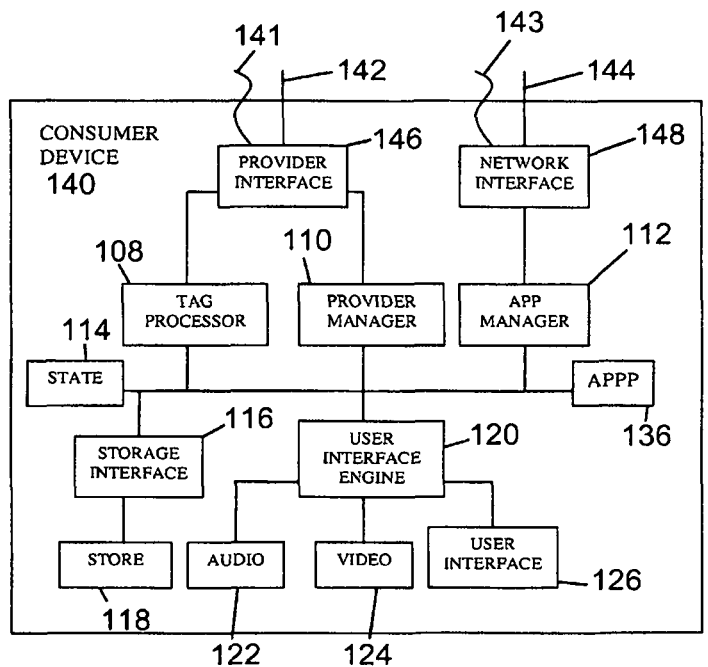
FIG. 1B-E illustrate CDs for managing applications according to other embodiments of the present invention.

Now referring to FIG. 1B a Consumer Device (CD) 140, an embodiment of CD 102 is shown, for managing applications according to an embodiment of the present invention. In this embodiment CD 140 can include tag processor (TAGP) 108, provider manager (PMAN) 110, application manager (AMAN) 112, application (APP) 136, state (STATE) 114, storage interface (STI) 116, storage (STORE) 118, user interface engine (UIE) 120, audio output device 122, video output device 124, user interface 126, network interface (NI) 148, antenna 144, network cable 143, provider interface (PINT) 146, antenna 142, and network cable 141. Aspects of CD 140 such as TAGP 108, PMAN 110, AMAN 112, APP 136, STATE 114, STI 116, STORE 118, UIE 120, audio output device 122, video output device 124, and user interface 126 can be similar to the respective aspects associated with CD 102. An embodiment of CD 140 can allow using PINT 146 for communication with PDs, while using NI 148 for retrieving instances of APP 136 from network. NI 148 can also be used by instances of APP 136 in communicating with other devices/services in the network. In some embodiments, PINT 146 can be associated with networks such as wifi, while NI 148 can be associated with cellular communication networks.

PINT 146 can include any combination of circuitry and/or instructions that can allow CD 140 and/or aspects of CD 140 in communicating with other PDs. PINT 146 can include components such as TCP sockets, UDP sockets, etc. PINT 146 can also include components such as NICs, USB interface, or the like. PINT 146 can also include a connector (not shown) providing mechanical and/or electrical coupling to connect to antenna 142 capable of sending/receiving messages over a network. PINT 146 can also include a connector (not shown) providing mechanical and/or electrical coupling to cable 143 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. PINT 146 can be connected to antenna 142 and/or cable 143 with or without a connector. PINT 146 can be used by PMAN 110 in detecting and/or associating with instances of PDs. PINT 146 can also be used by TAGP 108 in receiving tags from PDs that can be associated with the CD. In one embodiment, PINT 146 can be associated with an interface related to wifi networks.

NI 148 can include any combination of circuitry and/or instructions that can allow CD 140 and/or aspects of CD 140 in communicating with devices and/or services in a network. NI 148 can include components such as TCP sockets, UDP sockets, etc. NI 148 can also include components such as NICs, USB interface, or the like. NI 148 can also include a connector (not shown) providing mechanical and/or electrical coupling to connect to antenna 144 capable of sending/receiving messages over a network. NI 148 can also include a connector (not shown) providing mechanical and/or electrical coupling to cable 143 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. NI 148 can be connected to antenna 144 and/or cable 143 with or without a connector. In the embodiment described here, NI 148 can be used by AMAN 112 in retrieving APP 136 from the network. NI 148 can also be used by instances of APP 136 in communicating with other devices and/or services in the network. In one embodiment NI 148 can be associated with an interface related to cellular communication networks.

Other aspects of TAGP 108, PMAN 110, AMAN 112, APP 136, STATE 114, STI 116, STORE 118, UIE 120, audio device 122, video device 124, UI 126, PINT 146, NI 148 can be implemented e.g., using instructions of the computer program product executing on one or more suitably configured microprocessors or microcontrollers (not explicitly shown). Other implementations are also possible.

CD 140 can also include other aspects in addition to or instead of those shown here. For example, CD 102 can include a camera that an allow CD 140 to be used in taking still/motion pictures. Camera on CD 140 can be associated with some of instances of APP 136 that can provide services to users of CD 102.

Figure 1C:
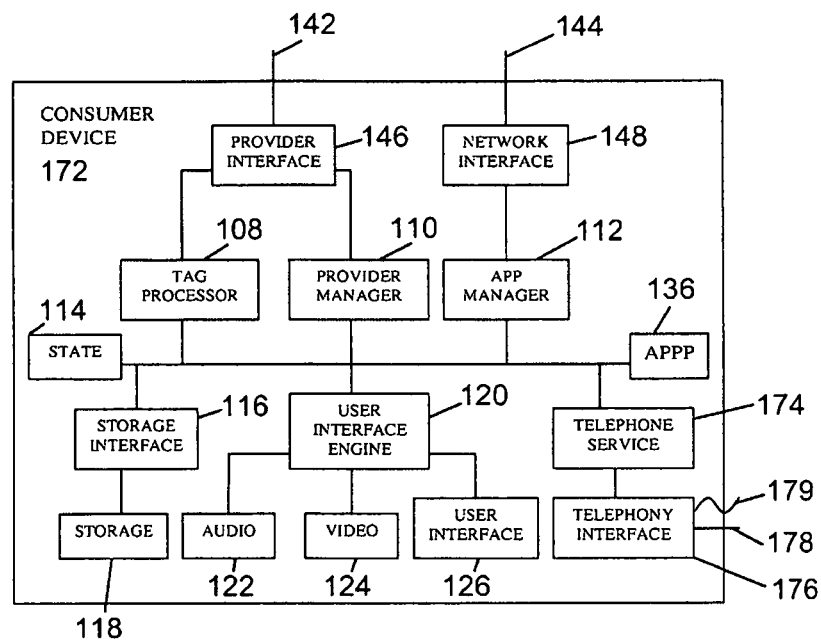
Figure 1D:
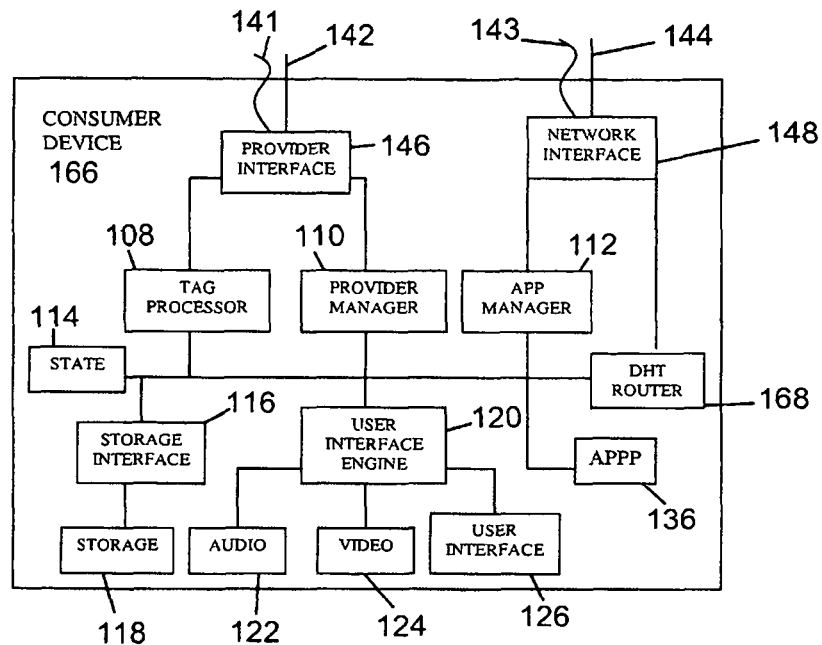

The Consumer Device (CD) 166 as illustrated in FIG. 1D, is an embodiment of CD 140, for managing applications according to an embodiment of the present invention. In this embodiment CD 166 can include tag processor (TAGP) 108, provider manager (PMAN) 110, application manager (AMAN) 112, application (APP) 136, DHT Router (DHTR) 168, state (STATE) 114, storage interface (STI) 116, storage (STORE) 118, user interface engine (UIE) 120, audio output device 122, video output device 124, user interface 126, network interface (NI) 148, antenna 144, network cable 143, provider interface (PINT) 146, antenna 142, and network cable 141. Aspects of CD 166 such as PINT 146, antenna 142, network cable 141, NI 148, antenna 144, network cable 143, TAGP 108, PMAN 110, AMAN 112, APP 136, STATE 114, STI 116, STORE 118, UIE 120, audio output device 122, video output device 124, and user interface 126 can be similar to the respective aspects associated with CD 140. An embodiment of CD 166 can allow using of DHTR 168 by AMAN 112 in retrieving instances of APP 136 from network. In some embodiments, use of DHT based network access can result in being able to retrieve data from a network at a faster rate when compared to retrieving data where in DHT based schemes are not used. Instances of APP 136 can also use DHTR 168 in communicating with services and/or devices on the network. Embodiments of APP 136 can access data from network using DHTR 168 that can result in faster retrieval of data accessed by the APP. While AMAN 112 can retrieve applications, and APP 136 can access data over network using DHTR 168, DHTR 168 can be used for other purposes as well. AMAN 112 and/or APP 136 can also use NI 148 in communicating with devices/services over the network in a way that can not use DHTR 168.

Now the DHT Router (DHTR) 168 can include any combination of circuitry and/or instructions that can allow sending/receiving messages to store/retrieve values for a given key in a distributed hash table (DHT). In one embodiment, AMAN 112 can retrieve instances of APP 136 using DHT. Methods of storing/retrieving values from a DHT based system can allow for advantages that can include faster retrieval of data from network, load balancing of data retrieval among others. AMAN 112 can use DHTR 168 in retrieving instances of APP 136 in order to enable a faster retrieval of APP 136. AMAN 112 can use DHTR 168 for other functionality as well.

APP 136 can also use DHT to store/retrieve/communicate values using a DHT. Instances of APP 136 can provide a variety of services to users of CD 102, and in embodiments where APP 136 can wish to take advantages presented by DHT based communication schemes (such as downloading large amounts of data from network), APP 136 can use DHTR 168.

AMAN 112 and instances of APP 136, while using functionality associated with DHTR 168, can continue to communicate with some devices/services on the network using mechanisms that do not include use of DHTR 168.

DHTs can be implemented using several widely known schemes such as Tapestry, Pastry, Chord, etc. Information regarding Tapestry, an implementation of DHT is described generally in the article 'Tapestry—A Resilient Global-Scale Overlay for Service Deployment by Zhao (2004)'. This article is incorporated by reference herein. DHTR 168 can send (or receive) messages over a network by interacting with network interface 148. In some embodiments, DHTR 168 can be used to receive and/or send messages from other aspects of the system as part of DHTR functionality, and such messages are not meant for use by the CD that the DHTR is associated with.

Aspects of TAGP 108, PMAN 110, AMAN 112, APP 136, DHTR 168, STATE 114, STI 116, STORE 118, UIE 120, audio device 122, video device 124, UI 126, PINT 146, NI 148 can be implemented e.g., using instructions of the computer program product executing on one or more suitably configured microprocessors or microcontrollers (not explicitly shown). Other implementations are also possible.

CD 140 can also include other aspects in addition to or instead of those shown here. For example, CD 140 can include a camera that an allow CD 140 to be used in taking still/motion pictures. Camera on CD 140 can be associated with some of instances of APP 136 that can provide services to users of CD 140.

Figure 1E:
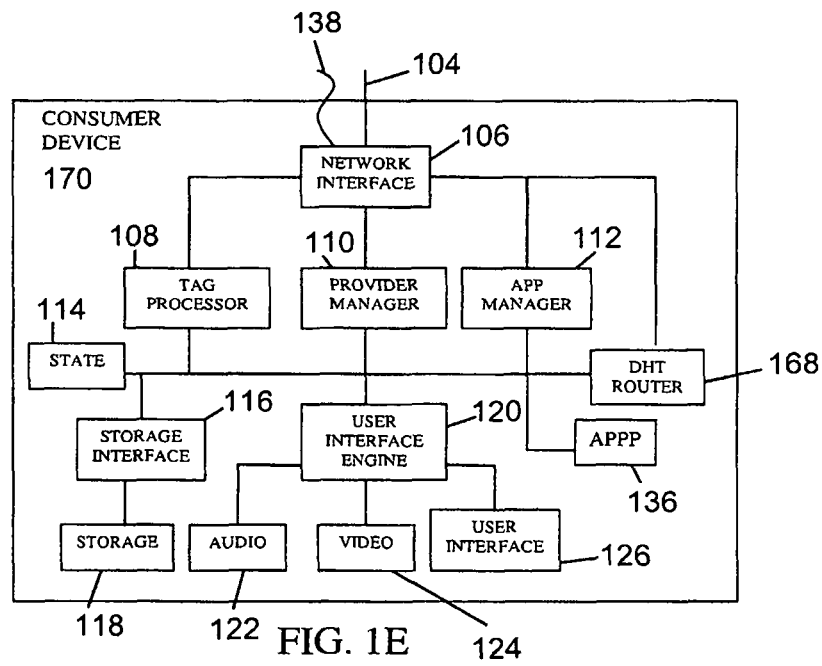

Now considering FIG. 1E a Consumer Device (CD) 170, for managing applications according to an embodiment of the present invention. This embodiment of CD includes aspects related to CD 102 and CD 166. In this embodiment CD 170 can include tag processor (TAGP) 108, provider manager (PMAN) 110, application manager (AMAN) 112, application (APP) 136, DHT Router (DHTR) 168, state (STATE) 114, storage interface (STI) 116, storage (STORE) 118, user interface engine (UIE) 120, audio output device 122, video output device 124, user interface 126, network interface (NI) 106, antenna 104, and network cable 138. Aspects of CD 170 such as NI 106, antenna 104, network cable 138, TAGP 108, PMAN 110, AMAN 112, APP 136, STATE 114, STI 116, STORE 118, UIE 120, audio output device 122, video output device 124, and user interface 126 can be similar to the respective aspects associated with CD 102. Aspects of CD 170 such as DHTR 168 can be similar to the respective aspects associated with CD 166. In the embodiment of CD 170 illustrated in FIG. 1E, NI 106 can be used by TAGP 108, PM 110, AMAN 112 and APP 136 in ways that are similar to the embodiment of CD 102. AMAN 112 and/or APP 136 can use DHTR 168 in ways similar to the embodiment of CD 166.

TAGP 108 can use DHTR 168 in communicating tags from PDs. Some embodiments can be associated with tags that can have large amount of associated data. Receiving a tag by TAGP 108 in such embodiments can use DHTR 168. The use of DHTR 168 can help in faster retrieval of data associated with tags. An embodiment of a tag can be associated with core.additionalInfo field as illustrated in FIG. 5 and FIG. 6. In some embodiments, core.additionalInfo field can be an instance of APP 136. In such embodiments, receiving a tag can include retrieval of an instance of APP 136. When APP 136 associated with a tag is very large, retrieval of tags can include using DHTR 168. Other embodiments wherein data associated with a tag can be large can include tags associated with media. Tags associated with media can include core.additionalInfo that can represent a sample or all of media that can be represented by the tag. In such embodiments, DHTR 168 can be used by TAGP 108 to receive the tag.

PMAN 110 can use DHTR 168 in communicating with PDs. PMAN 110 can communicate with PDs to have CD 166 associate or disassociate with the PDs. Information exchanged during association/disassociation can include information related to CD 166 and/or PD. An example of information that can be exchanged during association between CDs and PDs is illustrated in FIG. 13 and FIG. 15. In some embodiments, CDs and PDs can choose to include information not illustrated in FIG. 13 and FIG. 15, in messages during (dis)association. An example of such information can include still/motion pictures related to the CD and/or PD. In such embodiments, PMAN 110 can use DHTR 168 in communicating values with PDs, or exchanging messages with PDs.

Aspects of TAGP 108, PMAN 110, AMAN 112, APP 136, DHTR 168, STATE 114, STI 116, STORE 118, UIE 120, audio device 122, video device 124, UI 126, NI 106 can be implemented e.g., using instructions of the computer program product executing on one or more suitably configured microprocessors or microcontrollers (not explicitly shown). Other implementations are also possible.

CD 170 can also include other aspects in addition to or instead of those shown here. For example, CD 170 can include a camera that an allow CD 170 to be used in taking still/motion pictures. Camera on CD 170 can be associated with some of instances of APP 136 that can provide services to users of CD 170.

FIG. 1C illustrates a Consumer Device (CD) 172, for managing applications and providing services according to an embodiment of the present invention. This embodiment of the invention illustrates aspects of CD that can include providing services that can not be associated with services provided by APP 136. In this embodiment, CD 172 can provide a telephony service to a user of CD 172. The telephony service provided by CD 172 can not be related to association of CD 172 with PDs, processing of tags by TAGP 108, management of APP 136 by AMAN 112, or the like. CD 172 can provide telephony services to a user of CD 172. CD 172 at the same time can be associated/communicating with PDs using PMAN 110, processing tags by TAGP 108, managing applications by AMAN 112 and providing services related to APP 136. CD 172 can provide telephony services, while CD 172 is not associated with any active instances of app 136. The use of telephony service in this embodiment is illustrative only. Other embodiments can choose to provide one or more services that can be managed in a way that can not be related to management of APP 136. An example embodiment of the invention can include a smart phone such as the G1 phone from HTC running Android Operating System. The G1 phone can be providing telephony service, along with an Android application (an embodiment of AMAN 112) that can be can be managing other Android applications (APP 136).

Telephony Service (TSER) 174 any combination of circuitry and/or instructions that can allow CD 102 in providing services related to telephony. A telephony service can be provided by TSER in association with various communication technologies/networks such as cellular communication networks, GSM technology, CDMA technology, VoIP technology, or any other technologies. TSER 174 can provide telephony service in association with a telephony interface (TINT) 176. TINT 176 can be used for associating the CD 172 with one or more service providers. TSER 174 can allow for user interaction using UI 126 in association with UIE 120. TSER 174 can interact with user to allow for methods that can allow a user providing a telephone number to dial, accepting a telephone call, switching between more than one active call, establishing conference calls or the like. Aspects of TSER 174 can be associated with an application on CD 172. An example of such an embodiment includes G1 phone from HTC running Android Operating System. TSER 174 can provide telephony service and interact with user using a combination of one or more physical buttons on the device, or using a Dialer application in combination with the touch screen on the device, or a combination of the above.

TINT 176 can include any combination of circuitry and/or instructions that can allow CD 172 and/or aspects of CD 172 in communicating with a telephony network. TINT 176 can include components such as those associated with POTS (plain old telephone service) or NICs (as in case of VoIP phones with Ethernet connectivity). TINT 176 can also include a connector (not shown) providing mechanical and/or electrical coupling to connect to antenna 179 capable of communicating with a telephony network. TINT 176 can also include a connector (not shown) providing mechanical and/or electrical coupling to cable 122 capable of communicating with a telephony network. The network can include wired communication medium such as Ethernet (as in case of VoIP technology), POTS, or the like. The network can also include wireless medium such as WiFi, cellular communication network or the like. TINT 176 can be connected to antenna 178 and/or cable 179 with or without a connector.

Aspects of TAGP 108, PMAN 110, AMAN 112, APP 136, STATE 114, STI 116, STORE 118, UIE 120, audio device 122, video device 124, UI 126, NI 148, PI 146, TSER 174, TINT 176 can be implemented e.g., using instructions of the computer program product executing on one or more suitably configured microprocessors or microcontrollers (not explicitly shown). Other implementations are also possible.

CD 172 can also include other aspects in addition to or instead of those shown here. For example, CD 172 can include a camera that an allow CD 172 to be used in taking still/motion pictures. Camera on CD 172 can be associated with some of instances of APP 136 that can provide services to users of CD 172.

Figure 2A:
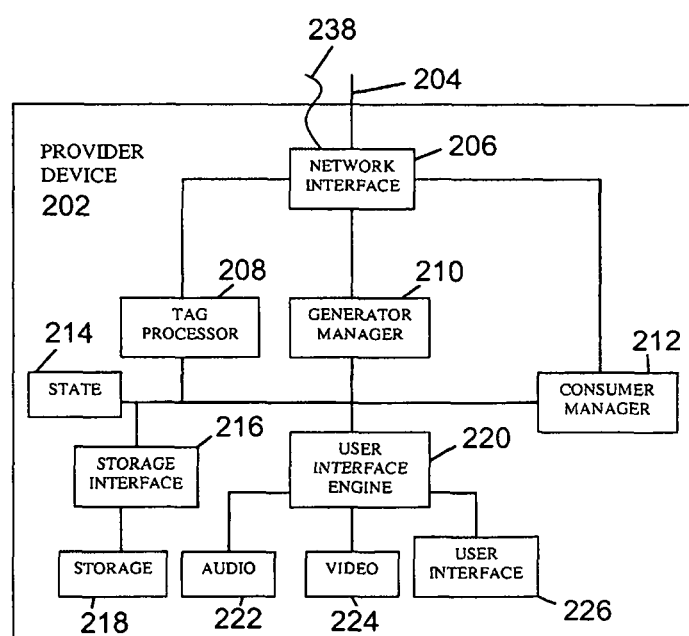
FIG. 2A illustrates a Provider Device (PD) for providing tags to CDs according to an embodiment of the present invention.

FIG. 2A illustrates a Provider Device (PD) 202 for providing tags to CDs according to an embodiment of the present invention. In this embodiment PD 202 can include tag processor (TAGP) 208, generator manager (GMAN) 210, consumer manager (CMAN) 212, state (STATE) 214, storage interface (STI) 216, storage (STORE) 218, user interface engine (UIE) 220, audio output device 222, video output device 224, user interface 226, network interface 206, antenna 204 and network cable 238. In one embodiment, audio device 122 can include, e.g., a conventional headphones jack and/or one or more speakers. Video Output 124 can include, e.g., an LCD screen. User Interface 126 can include, e.g., one or more buttons, touch pads, touch screens, scroll wheels, click wheels, or any other control(s) capable of generating electrical signals corresponding to manipulations of the control(s) by a user. Embodiments of PD 202 can be associated with set top boxes such as those associated with television sets, media servers, PCs, server computers, laptops, wifi routers such as those associated with providing wireless network connectivity including 802.11b, 802.11n, 802.11g; audio receivers such as those associated with music systems, plug computers such as sheeva plug, or the like devices. An instance of PD 202 can be static and not moving physically like a desktop computer or a set top box, or can be a mobile device—such as a laptop. In some embodiments, instances of PD 202 can be connected to other entities of the system by a variety of network technologies that can include wired and/or wireless communications, such as Ethernet, USB, modems, cable modems, firewire, wifi, cellular communication networks, or the like.

PD 202 can associate with instances of CD 102. In some embodiments, a PD can associate with more than one CD. Tags can be provided by a PD to instances of CD associated with the PD. In the embodiment described here, PD can associate with instances of CD using messages. Messages can be exchanged between a PD and a CD for association using NI 206. Messages can also be exchanged between a PD and a CD for disassociation using NI 206.

PD 202 can associate with instances of GD 302. In the embodiment described here, an instance of PD 202 can associate with up to one instance of GD 302. Tag related information generated by a GD can be communicated by GD to instances of PD associated with the GD. Tag related information can be communicated by GD to instances of PD in messages that can be received by PD using NI 206. In the embodiment described here, PD can associate with an instance of GD using messages. Messages can be exchanged between a PD and a GD for association using NI 206. Messages can also be exchanged between a PD and a GD for disassociation using NI 206.

User Interface Engine 220 can include any combination of circuitry and/or instructions that enables a user to control operation of PD 202. In one embodiment, user interface engine 220 receives user inputs from user interface 226 and provides commands to CMAN 212 and/or GMAN 210. User interface engine 220 can also receive data from CMAN 212 and/or GMAN 210, and provide output to user via audio output device 222 and/or video output device 224.

Network interface 206 can include any combination of circuitry and/or instructions that can allow PD 202 and/or aspects of PD 202 in communicating with other devices in a network. Network interface 206 can include components such as TCP sockets, UDP sockets, etc. Network interface 206 can also include components such as NICs, Network interface 206 can also include a connector (not shown) providing mechanical and/or electrical coupling to connect to antenna 204 capable of sending/receiving messages over a network. Network interface 206 can also include a connector (not shown) providing mechanical and/or electrical coupling to cable 238 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. Network interface 206 can be connected to antenna 204 and/or cable 238 with or without a connector.

Storage 218 can be used to store information that can include tag related information communicated to PD 202 from an instance of GD 302. In some embodiments, tag related information provided by a GD can include an instance of APP 136 of CD 102. In other embodiments, tag related information can include a sample of media. Some or all of tag related information provided by GD 302 in such embodiments can be stored in STORE 218. Storage 218 can include, e.g., magnetic or optical disk, flash memory, or any other storage medium that supports storage of data for an arbitrary period of time (e.g., until deleted by a user). Storage Interface 216 can include any combination of circuitry and/or instructions that manages access to storage 218. In one embodiment, SI 216 supports reading from and writing to STORE 218.

STATE 214 can be used to store information that can include information related to one or more CDs that PD 202 can be associated with, information related to a GD 302 that the PD can be associated with, tag related information that can be provided by a GD, or the like. Various entities of information can be stored in STATE 214 in a way such that different entities can be accessed separately. In one embodiment, information illustrated in FIG. 16 can be stored in STATE 214. Information described in FIG. 16 stored in STATE 214, is referred to as pState for use in the description of other apparatus, methods and systems. STATE 214 can include e.g., SRAM, DRAM, RAM, NVRAM or any other medium that supports storage. In some embodiments, STATE 214 can maintain information as long as electrical power can be provided to STATE 214. In some embodiments, information stored in STATE 214 can instead be stored in STORE 218. In such embodiments, STATE 214 can not be included in the PD.

TAGP 208 can include any combination of circuitry and/or instructions that can allow PD 202 to receive tag related information from GD 302, provide tags to one or more CDs, and process tag related information including others. In one embodiment, TAGP 208 can receive messages from GD 302 that can include tag related information. TAGP 208 can extract tag related information from messages sent by GD, and associate the information with pState stored in STATE 214. TAGP 208 can use the information related to pState stored in STATE 214 and/or, messages including tag related received from GD 302, to generate tags that can be communicated to one or more instances of CD 102 associated with the PD. In one embodiment, functionality associated with CD 102 can be included in smart phones capable of Wi-Fi communication, running Android operating system; functionality associated with PD 202 can be included in a wifi capable provider device such as a Sheeva Plug; and functionality associated with GD 302 can be included in a set top box such as those associated with television sets. In such embodiment, the set top box can communicate tag related information extracted from media processed by the set top box, to TAGP 208 associated with Sheeva plug. TAGP 208 of Sheeva plug can provide tags to one or more instances of smart phones associated with Sheeva plug GMAN 210 can include any combination of circuitry and/or instructions that can allow PD 202 to associate/disassociate with GD 302. In one embodiment of the invention GMAN 210 can include a detection aspect and an association aspect. The detection aspect of GMAN 210 can include various methods of detecting instances of GD 302 that the GMAN 210 can associate with. In one embodiment, GMAN 210 can use mechanisms that can be made available by NI 206 in detecting new instances of PD 202. In embodiments wherein NI 206 is related to USB interface, GMAN 210 can communicate with USB in determining if NI 206 detected new instances of GD 302. GMAN 210 can also send/receive messages to/from instances of GD 302 using NI 206. GMAN 210 can send/receive messages when (dis)associating with instances of GD 302. GMAN 210 can also use/update information related to pState stored in STATE 214 when disassociating/associating with GD 302. In one embodiment, GMAN 210 can interact with UIE 220 to present a list of GD 302 instances detected by GMAN 210. In such embodiment, a user associated with PD 202 can select an instance of GD 302 using UI 226. GMAN 210 can associate with instances of GD 302 selected by the user, in such embodiments. Messages sent by CMAN 212 for (dis)associating with GD 302 can include some or all of information illustrated in FIG. 15. Information illustrated in FIG. 15 is referred to as ProviderInfo (PI) in methods, apparatus and systems associated with embodiments of the invention.

CMAN 212 can include any combination of circuitry and/or instructions that can allow PD 202 to associate/disassociate with one or more instances of CD 102. In one embodiment of the invention CMAN 212 can include a detection aspect and an association aspect. The detection aspect of CMAN 212 can include various methods of detecting instances of CD 102 that the CMAN 212 can associate with. In one embodiment, CMAN 212 can use mechanisms that can be made available by NI 206 in detecting new instances of CD 102. In embodiments wherein NI 206 is related to USB interface, CMAN 212 can communicate with USB in determining if NI 206 detected new instances of CD 102. CMAN 212 can also send/receive messages to/from instances of CD 102 using NI 206. CMAN 212 can send/receive messages when (dis)associating with instances of CD 102. CMAN 212 can also use/update information related to pState stored in STATE 214 when disassociating/associating with instances of CD 102. In one embodiment, CMAN 212 can associate with any instance of CD 102 that can be detected by NI 206. In other embodiments, CMAN 212 can interact with UIE 220 to present a list of CD 102 instances detected by CMAN 212 in association with NI 206. In such embodiment, a user associated with PD 202 can select one or more instances of CD 102 using UI 226. CMAN 212 can associate with instances of CD 102 selected by the user, in such embodiments. Messages sent by CMAN 212 for (dis)associating with one or more CD 102 can include some or all of information illustrated in FIG. 15.

Information illustrated in FIG. 15 is referred to as ConsumerInfo (CI) in relation to apparatus, methods and systems associated with embodiments of the invention.

In the embodiment of smart phones and Sheeva plug described in relation to TAGP 208, smart phones related to any user can be associated with the Sheeva plug, when Sheeva plug is providing tags at public places such as Coffee Shop, Restaurant, Library, or the like. When Sheeva plug is providing tags related to media that is played at a home, a UI 322 associated with the Sheeva Plug can be used to control the set of smart phones that can associate and/or receive the tags provided by the Sheeva plug. UI 322 can be supported by Sheeva Plug using a web service that can be accessed using either a smart phone (that can access web services), a laptop computer, a desk top computer, or any other computer system. UI 322 can be made available by Sheeva plug using other mechanisms.

Aspects of TAGP 208, GMAN 210, CMAN 212, STATE 214, STI 216, STORE 218, UIE 220, audio device 222, video device 224, UI 226, NI 206 can be implemented e.g., using instructions of the computer program product executing on one or more suitably configured microprocessors or microcontrollers (not explicitly shown). Other implementations are also possible.

PD 202 can also include other aspects in addition to or instead of those shown here. For example, an embodiment of PD 202 such as a Sheeva Plug, can associate with smart phones for providing tags, while at the same time can provide other services such as a multimedia server to a DLNA enabled player.

Figure 2B:
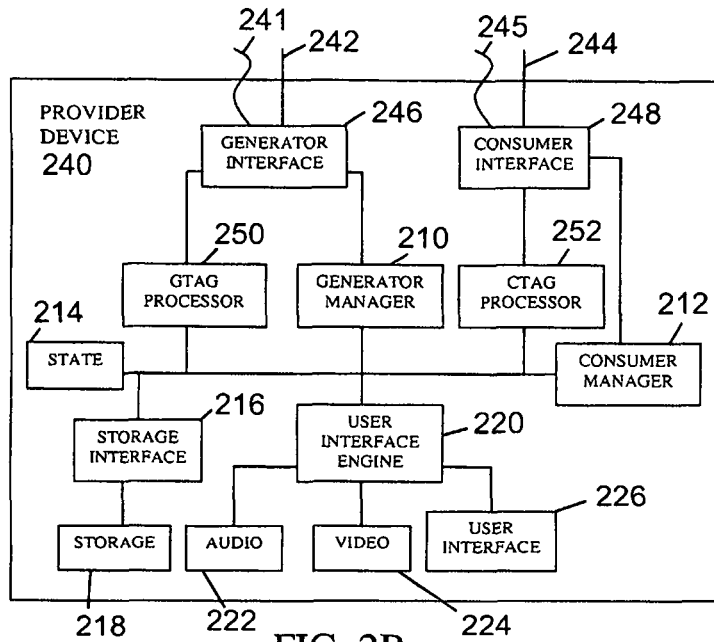
FIG. 2B-C illustrate PDs for providing tags to CDs according to other embodiments of the present invention.

FIG. 2B illustrates a Provider Device (PD) 240, an embodiment of PD 202, that can be used for providing tags to CDs according to an embodiment of the present invention. In this embodiment PD 240 can include generator tag processor (GTAGP) 250, generator manager (GMAN) 210, consumer tag processor (CTAGP) 252, consumer manager (CMAN) 212, state (STATE) 214, storage interface (STI) 216, storage (STORE) 218, user interface engine (UIE) 220, audio output device 222, video output device 224, user interface 226, generator interface (GINT) 246, antenna 242, network cable 241, consumer interface (CINT) 248, antenna 244 and network cable 245. Aspects of PD 240 such as GMAN 210, CMAN 212, STATE 214, STI 216, STORE 218, UIE 220, audio output device 222, video output device 224, and user interface 226 can be related to respective aspects associated with PD 202. An embodiment of PD 240 can allow for using GINT 246 by GTAGP in processing messages including tag related information sent by GD that the PD can be associated with. GINT 246 can also be used by GMAN 210 in exchanging messages with GDs during (dis)association. CINT 248 can be used by CTAGP 252 in communicating or providing tags to instances of CD 102. CINT 248 can also be used by CMAN in associating with instances of CD 102. In one embodiment of the invention, a Sheeva Plug can be used as an instance of PD 240. Sheeva plug can be associated with a set top box including GD 302 using USB connectivity. Sheeva plug in such embodiment can be associated with smart phones including CD 102, using wifi connectivity.

CINT 248 can include any combination of circuitry and/or instructions that can allow PD 240 and/or aspects of PD 240 in communicating with CDs. CINT 248 can include components such as TCP sockets, UDP sockets, etc. CINT 248 can also include components such as NICs, USB interface, or the like. CINT 248 can also include a connector (not shown) providing mechanical and/or electrical coupling to connect to antenna 244 capable of sending/receiving messages over a network. CINT 248 can also include a connector (not shown) providing mechanical and/or electrical coupling to cable 245 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. CINT 248 can be connected to antenna 244 and/or cable 245 with or without a connector. CINT 248 can be used by CTAGP 252 in providing tags to instances of CD that can be associated with the PD. CINT 248 can also be using by CMAN 212 in sending/receiving messages for associating/disassociating with instances of CD.

GINT 246 can include any combination of circuitry and/or instructions that can allow PD 240 and/or aspects of PD 240 in communicating with an instance of GD 302. GINT 246 can include components such as TCP sockets, UDP sockets, etc. GINT 246 can also include components such as NICs, USB interface, or the like. GINT 246 can also include a connector (not shown) providing mechanical and/or electrical coupling to connect to antenna 242 capable of sending/receiving messages over a network. GINT 246 can also include a connector (not shown) providing mechanical and/or electrical coupling to cable 241 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. GINT 246 can be connected to antenna 242 and/or cable 241 with or without a connector. In the embodiment described here, GINT 246 can be used by GTAGP 250 in receiving messages that can include tag related information from GD 302 associated with the PD. GINT 246 can also be used by GMAN 210 in sending/receiving messages for associating/disassociating with an instance of GD.

GTAGP 250 can include any combination of circuitry and/or instructions that can allow PD 202 to receive tag related information from GD 302, and process tag related information including others. In one embodiment, GTAGP 250 can receive messages from GD 302 that can include tag related information. GTAGP 250 can extract tag related information from messages sent by GD, and associate the information with pState stored in STATE 214. In one embodiment, functionality associated with CD 102 can be included in smart phones capable of Wi-Fi communication, running Android operating system; functionality associated with PD 240 can be included in a wifi capable provider device such as a Sheeva Plug; and functionality associated with GD 302 can be included in a set top box such as those associated with television sets. In such embodiment, the set top box can communicate tag related information extracted from media processed by the set top box, to GTAGP 250 associated with Sheeva plug.

CTAGP 252 can include any combination of circuitry and/or instructions that can allow PD 202 to provide tags to one or more CDs, and process tag related information including others. CTAGP 252 can use the information related to pState stored in STATE 214 and/or, messages including tag related information received by GTAGP 250 from GD 302, to generate tags that can be communicated to one or more instances of CD 102 associated with the PD. In one embodiment, functionality associated with CD 102 can be included in smart phones capable of Wi-Fi communication, running Android operating system; functionality associated with PD 202 can be included in a wifi capable provider device such as a Sheeva Plug; and functionality associated with GD 302 can be included in a set top box such as those associated with television sets. In such embodiment, CTAGP 252 of Sheeva plug can provide tags to one or more instances of smart phones associated with Sheeva plug. CTAGP 252 can communicate with GTAGP 250 and/or use information associated with pState stored in STATE 214 in generating tags.

Aspects of GTAGP 250, GMAN 210, CTAGP 252, CMAN 212, STATE 214, STI 216, STORE 218, UIE 220, audio device 222, video device 224, UI 226, GINT 246, CINT 248 can be implemented e.g., using instructions of the computer program product executing on one or more suitably configured microprocessors or microcontrollers (not explicitly shown). Other implementations are also possible.

PD 240 can also include other aspects in addition to or instead of those shown here. For example, an embodiment of PD 240 such as a Sheeva Plug, can associate with smart phones for providing tags, while at the same time can provide other services such as a multimedia server to a DLNA enabled player.

Figure 2C:
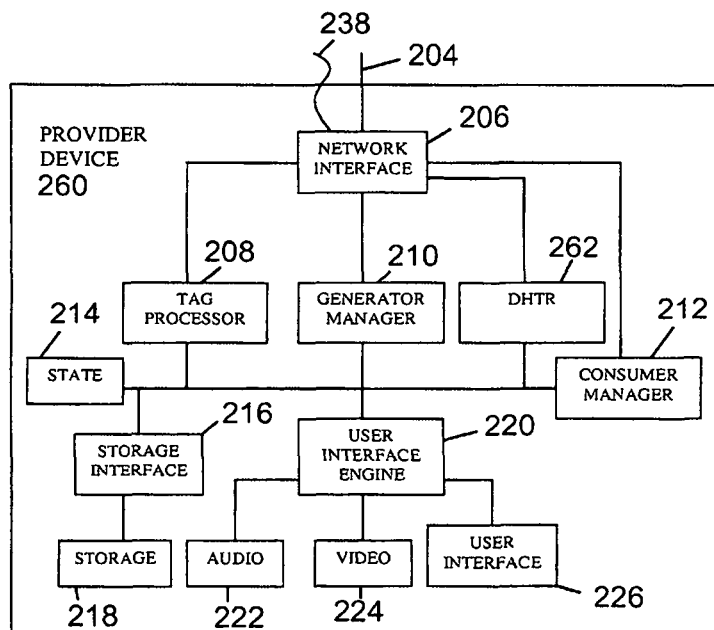

FIG. 2C illustrates a Provider Device (PD) 260, an embodiment of PD 202, for providing tags to CDs according to an embodiment of the present invention. In this embodiment PD 260 can include tag processor (TAGP) 208, generator manager (GMAN) 210, consumer manager (CMAN) 212, DHT Router (DHTR) 262, state (STATE) 214, storage interface (STI) 216, storage (STORE) 218, user interface engine (UIE) 220, audio output device 222, video output device 224, user interface 226, network interface 206, antenna 204 and network cable 238. Aspects of PD 260 such as TAGP 208, GMAN 210, CMAN 212, STATE 214, STI 216, STORE 218, UIE 220, audio output device 222, video output device 224, user interface 226, network interface 206, antenna 204 and network cable 238 can be similar to respective aspects associated with PD 202.

In some embodiments, information related to tags can include fields such as additionalInfoUrl and additionalInfo such as the ones illustrated in FIG. 6 and associated with fields in FIG. 5. In some embodiments, additionalInfoUrl can refer to information that can be very large such as a media clip. In such embodiments, PD 202 can retrieve information represented by additionalInfoUrl and associate the retrieved information with additionalInfo field. This can be done in some embodiments to support instances of CD 102 that can take a long time to retrieve information represented by additionalInfoUrl. In one embodiment, functionality associated with CD 102 can be included in smart phones capable of Wi-Fi communication, running Android operating system; functionality associated with PD 202 can be included in a wifi capable provider device such as a Sheeva Plug; and functionality associated with GD 302 can be included in a set top box such as those associated with television sets. In such embodiment, Sheeva plug can be connected to a network using gigabit Ethernet connectivity, which can provide faster speeds of retrieval/downloads as compared to the amount of time taken by an instance of CD 102. In embodiments where PD 260 can retrieve large amount of information, PD 260 can use DHTR 262 to retrieve the information. PD 260 can use DHTR 262 to retrieve information not described here.

DHT Router (DHTR) 262 can include any combination of circuitry and/or instructions that can allow sending/receiving messages to store/retrieve values for a given key in a distributed hash table (DHT). In one embodiment, TAGP 208 can use DHTR 262 to retrieve some information from network that can be associated with tags provided by the PD. Methods of storing/retrieving values from a DHT based system can allow for advantages that can include faster retrieval of data from network, load balancing of data retrieval among others. TAGP 208 can use DHTR 262 in retrieving information related to tags in order to enable faster retrieval. Aspects of PD 260 can use DHTR 168 for other functionality as well.

DHTs can be implemented using several widely known schemes such as Tapestry, Pastry, Chord, etc. Information regarding Tapestry, an implementation of DHT is described generally in the article 'Tapestry—A Resilient Global-Scale Overlay for Service Deployment by Zhao (2004)'. DHTR 262 can send (or receive) messages over a network by interacting with network interface 206. In some embodiments, DHTR 262 can be used to receive and/or send messages from other aspects of the system as part of DHTR functionality, and such messages are not meant for use by the CD that the DHTR is associated with.

Aspects of TAGP 208, GMAN 210, DHTR 262, CMAN 212, STATE 214, STI 216, STORE 218, UIE 220, audio device 222, video device 224, UI 226, NI 206 can be implemented e.g., using instructions of the computer program product executing on one or more suitably configured microprocessors or microcontrollers (not explicitly shown). Other implementations are also possible.

PD 260 can also include other aspects in addition to or instead of those shown here. For example, an embodiment of PD 260 such as a Sheeva Plug, can associate with smart phones for providing tags, while at the same time can provide other services such as a multimedia server to a DLNA enabled player.

Figure 3A:
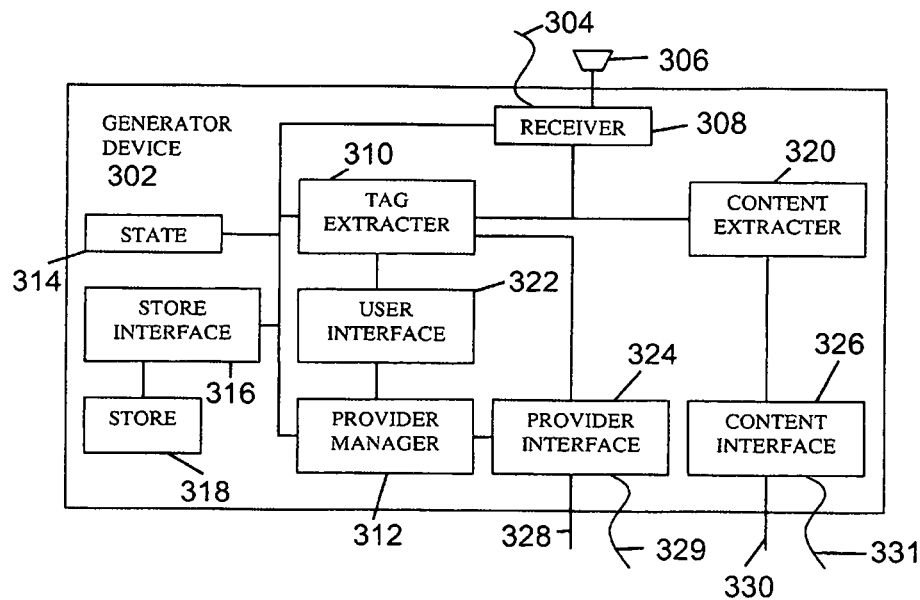
FIG. 3A illustrates a Generator Device (GD) for generating TRIs according to an embodiment of the present invention.

Referring to FIG. 3A a Generator Device (GD) 302 for generating tags is illustrated according to an embodiment of the present invention. GD 302 can be any device capable of receiving and/or processing media. GD 302 can be used to generate tag related information associated with media received and/or processed by the GD. In the embodiment of FIG. 3A, GD 302 includes state (STATE) 314, store interface (SINT) 316, store (STORE) 318, tag extractor (TEXT) 310, user interface (UI) 322, provider manager (PMAN) 312, provider interface (PINT) 324, provider antenna 328, provider cable 329, content interface (CONINT) 326, content antenna 330, content cable 331, content extractor (CEXT) 320, receiver 308, antenna 306 and cable 304.

GD 302 can be used to receive broadcasts via one or more media; any broadcast medium or combination of media can be supported. In this example, receiver 308 can connect to antenna 306, which can be capable of detecting broadcasts via a wireless medium (e.g., FM or AM radio in standard and/or HD formats, over the air TV, satellite TV or radio, WiFi, cellular communication network, etc.). Receiver 308 can also connect to cable 304 and thus be capable of receiving broadcasts via a wired medium (e.g., cable TV service, wired internet connection, or the like). Receiver 308 can include any hardware and/or instructions elements usable to extract broadcast data from wired and/or wireless media as desired; the particular components can depend on the medium (or media) supported. Any combination or sub-combination of wired and/or wireless media can be supported.

Receiver 308 can deliver signals corresponding to received broadcasts to CEXT 320 to deliver media content. CEXT 320 can include appropriate decoding and processing components to extract audio and/or video signals from received broadcast; these components can generate analog and/or digital signals suitable for driving video and/or audio output devices (not explicitly shown in FIG. 3A), such as display devices and/or speakers. Such output devices can be integrated into GD 302 or supplied as external components coupled to GD 302 via suitable connections. In one embodiment, such external components can be coupled to GD 302 using CONINT 326. External components can be associated with CONINT 326 by means of antenna 330 or content cable 331.

User interface 322 of GD 302 can provide input and/or output devices to allow a user to control the operation of GD 302, CEXT 320, and/or TEXT 310. For example UI 322 can include a button that a user can operate to instruct TEXT 310 to capture or record tag related information for a currently playing track. Other buttons can allow the user to select broadcast sources and/or channels for receiver 308, adjust volume and/or picture settings, allow for GD 302 to associate and/or disassociate with instances of PD 302, and so on.

TEXT 310 can include any combination of circuitry and/or instructions that can help GD 302 in generating tag related information associated with media that is processed by GD 302. In embodiments where media received by RECEIVER 308 and provided to TEXT 310 is tagged, TEXT 310 can extract information from tagged media. Examples of such embodiments can include mpeg-47 video, HD Radio PSD, HD Radio SIS, or the like. An exampled of structure and content of information that can be extracted from media is illustrated in FIG. 6. In some embodiments, TEXT 310 can generate tag related information that can include information related to media such as time of generation, channel name, channel frequency, channel number, location of broadcast, service provider name, or the like. An example of information derived by an instance of GD 302 is illustrated in FIG. 21. In some embodiments, such information can be used to determine information related to the media by presenting the generated information to a service. A service on the internet can provide information about media, given the channel name, channel number, channel frequency and location of telecast. Information such as this can also be generated by instances of GD 302. In some embodiments of GD 302, information related to tags that can be generated by the GD can include a sample of media as determined/captured by TEXT 310 and/or CEXT 320 of FIG. 3A. An example structure of information related to media samples is illustrated in FIG. 7.

PMAN 312 can include any combination of circuitry and/or instructions that can allow GD 302, in associating with instances of PD 202. In one embodiment of the invention PMAN 312 can include a detection aspect and an association aspect. The detection aspect of PMAN 312 can include various methods of detecting instances of PD 202 that the PMAN 312 can associate with. In one embodiment, PMAN 312 can use mechanisms that can be made available by PINT 324 in detecting new instances of PD 202. In embodiments wherein PINT 324 is related to USB interface, PMAN 312 can communicate with USB in determining if PINT 324 detected new instances of PD 202. PMAN 312 can also send/receive messages to/from instances of PD 202 using PINT 324. PMAN 312 can send/receive messages when (dis)associating with instances of PD 202. PMAN 312 can also use/update information related to gState stored in STATE 314. In one embodiment, PMAN 312 can interact with UI 322 to present a list of PD 202 instances detected by PMAN 312. In such embodiment, a user of GD 302 can select one or more instances of PD 202 using UI 126. PMAN 312 can associate with instances of PD 202 selected by the user, in such embodiments.

PINT 324 can include any combination of circuitry and/or instructions that can allow GD 302 and/or aspects of GD 302 in communicating with other PDs. PINT 324 can include components such as TCP sockets, UDP sockets, etc. PINT 324 can also include components such as NICs, USB interface, or the like. PINT 324 can also include a connector (not shown) providing mechanical and/or electrical coupling to connect to antenna 328 capable of sending/receiving messages over a network. PINT 324 can also include a connector (not shown) providing mechanical and/or electrical coupling to cable 329 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. PINT 324 can be connected to antenna 328 and/or cable 329 with or without a connector. PINT 324 can be used by PMAN 312 in detecting and/or associating with instances of PDs. In one embodiment, PINT 324 can be associated with an interface related to wifi networks.

TEXT 310 can store the generated tag related information in STORE 318. STI 316 can be used for storing the information in STORE 318. In some embodiments, GD 302 can be operating in a standalone mode when it is not associated with any instances of PD 202. In such mode, a user can choose to have GD 302 store the generated tag related information in STORE 318. STORE 318 can be implemented using nonvolatile storage (e.g., magnetic or optical disk, flash memory or other storage media) and can thus store tags indefinitely, regardless of whether power is continuously supplied to GD 302. As described below, in some embodiments, tag related information that a user opts to capture while GD 302 is in standalone mode can be stored in STORE 318 until such time as GD 302 is next associated with, a PD 202. At that point, PINT 324 of GD 302 can deliver the stored set of tag related information to PD 202 via NI 206. In other embodiments, GD 302 might not include non-volatile tag storage and preservation of tags may not be possible when GD 302 is operating in standalone mode.

Aspects of STATE 314, SINT 316, STORE 318, TEXT 310 UI 322, PMAN 312, PINT 324, CONINT 326, content antenna 330, content cable 331, CEXT 320, RECEIVER 308 can be implemented e.g., using instructions of the computer program product executing on one or more suitably configured microprocessors or microcontrollers (not explicitly shown). Other implementations are also possible.

GD 302 can also include other aspects in addition to or instead of those shown here. For example, an embodiment of GD 302 can be associated with a set top box that can allow for playing DVDs or storing media. Embodiments of GD 302 can also include digital video recorder (DVR), or a Tivo Premier produced by Tivo, Inc that can allow for storing media to be allowed to played back on demand as requested by a user. Other functionality associated with embodiments of GD 302 can include playing media that can be retrieved from internet.

Figure 3B:
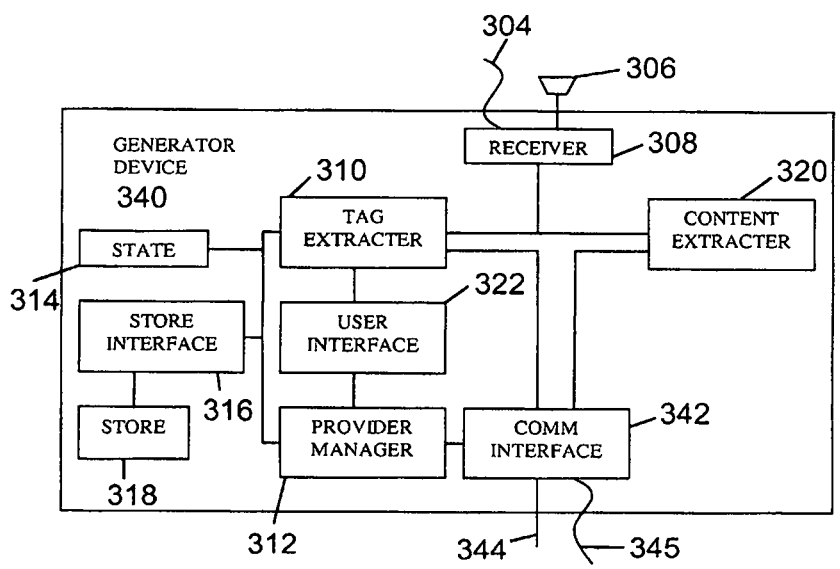
FIG. 3B-C illustrate GDs for generating TRIs according to other embodiments of the present invention.

FIG. 3B illustrates a Generator Device (GD) 340, an embodiment of GD 302, for generating tag relating information according to an embodiment of the present invention. In the embodiment of FIG. 3B, GD 340 includes state (STATE) 314, store interface (SINT) 316, store (STORE) 318, tag extractor (TEXT) 310, user interface (UI) 322, provider manager (PMAN) 312, communication interface (COMINT) 342, antenna 344, cable 345, content extractor (CEXT) 320, receiver 308, antenna 306 and cable 304. In some embodiments, the mechanism of communicating tag related information generated by TEXT 310, and the context extracted by CEXT 320 can use a single communication interface as illustrated by COMINT 342 of FIG. 3B. An example of such embodiment can include a CD 102 such as G1 smart phone developed by HTC, running the Android operating system. In this embodiment, the G1 phone can also include functionality associated with PD 202. G1 smart phone can communicate with GD 340 using wifi technology. Tags generated by GD 340 can be communicated to PD 202 of G1 smart phone using wifi connectivity. The content as extracted by CEXT 320 can be provided to G1 using wifi connectivity, which can be played by a media player application associated with G1 smart phone. COMINT 342 in this embodiment can be associated with wifi connectivity. Other embodiments of GD 340 are possible.

Aspects of GD 340 including STATE 314, SINT 316, STORE 318, TEXT 310, UI 322, PMAN 312, CEXT 320, receiver 308, antenna 306 and cable 304 are similar to the respective aspects associated with GD 302 of FIG. 3A.

COMINT 342 can include any combination of circuitry and/or instructions that can allow GD 340 and/or aspects of GD 340 in communicating with PDs and media content consumers. COMINT 342 can include components such as TCP sockets, UDP sockets, etc. COMINT 342 can also include components such as NICs, USB interface, or the like. COMINT 342 can also include a connector (not shown) providing mechanical and/or electrical coupling to connect to antenna 344 capable of sending/receiving messages over a network. COMINT 342 can also include a connector (not shown) providing mechanical and/or electrical coupling to cable 345 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. COMINT 342 can be connected to antenna 344 and/or cable 345 with or without a connector. COMINT 342 can be used by TEXT 310 in providing tag related information to instances of PD that can be associated with the GD. COMINT 342 can also be using by CEXT 320 in communicating the content to a content consumer that can include devices such as television sets, media players, media player software associated with various devices, or the like.

Aspects of STATE 314, SINT 316, STORE 318, TEXT 310, UI 322, PMAN 312, CEXT 320, COMINT 342, receiver 308 can be implemented e.g., using instructions of the computer program product executing on one or more suitably configured microprocessors or microcontrollers (not explicitly shown). Other implementations are also possible.

GD 340 can also include other aspects in addition to or instead of those shown here. For example, an embodiment of GD 340 can be associated with a set top box that can allow for playing DVDs or storing media. Embodiments of GD 340 can also include digital video recorder (DVR), or a Tivo Premier produced by Tivo, Inc that can allow for storing media to be allowed to played back on demand as requested by a user. Other functionality associated with embodiments of GD 340 can include playing media that can be retrieved from internet.

Figure 3C:
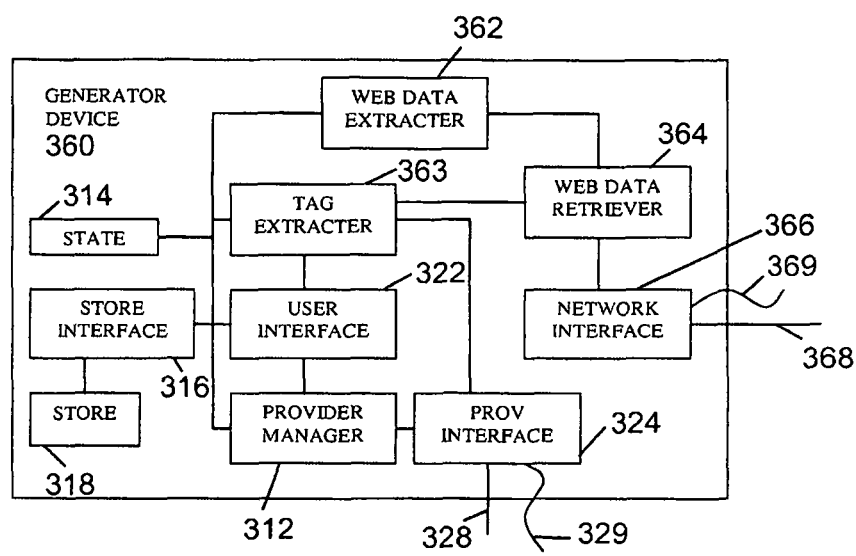

FIG. 3C illustrates a Generator Device (GD) 360 for generating tags according to an embodiment of the present invention. GD 360 can be any device capable of receiving and/or processing web related content. GD 360 can be used to generate tag related information associated with web content received and/or processed by the GD. In the embodiment of FIG. 3C, GD 360 includes state (STATE) 314, store interface (SINT) 316, store (STORE) 318, tag extractor (TEXT) 363, user interface (UI) 322, provider manager (PMAN) 312, provider interface (PINT) 324, provider antenna 328, provider cable 329, network interface (NI) 366, antenna 368, cable 369, web data retriever (WRET) 364, web data extractor (WEXT) 362. Aspects of GD 360 such as STATE 314, SINT 316, STORE 318, UI 322, PMAN 312, PINT 324 can be similar to the respective aspects associated with GD 302.

In the embodiment of GD 360, tag related information can be generated by GD 360 using information that can include extracting information from web content. As described earlier, tag related information can be generated automatically without user interaction or can be generated due to interaction that can involve UI 322. TEXT 363 of GD 360 can be used in generating tag related information. TEXT 363 can include any combination of circuitry and/or instructions that can enable generating tag related information using information extracted from web content.

In one embodiment TEXT 363 can be implemented using a plug-in for a browser. In some embodiments, web content such as web pages including html content can associate tag related information using one or more EMBED tags. The browser plugin and EMBED tags can, in such case be associated with the same mime type. The mime type associated with EMBED tags and browser plugin in this embodiment can be tag/embed. A HTML page containing an advertisement indicating a sale, can for example include a html EMBED tag that can be associated with information specific to SaleSchedule tag. In such a case, the EMBED tag can be associated with a mime type of tag/embed, a TAGTYPE attribute with a value of 'SaleSchedule', an APPLICATION attribute specifying a URL where an application can be downloaded from, and, DATE, and TIME attributes that can specify the date and time of sale.

In some embodiments, all information extracted from web content (such as html, java scripts, audio, video, etc.) can be made available for associating with one or more tags. In the HTML web page embodiment described earlier, information extracted from each (one or more) EMBED html tag included in the web page and associated with tag/embed mime type can be made available for associating with a tag.

In some embodiments, tag related information generated by TEXT 363 can include providing information related to the web content—such as the URL from where the web content is retrieved, the time at which the web content is retrieved, or the like. CD 102 (or any other aspects of the system) can use such information in association with a service or system to determine tag related information related to web content. In some embodiments, tag related information is not included in the web content, and a service or system can be used to associate information related to web content, with tag related information of the content. An example of such a service can be a service over internet that can provide tag related information, when the service is provided with information that can include a URL, time at which web content is retrieved, or any other related information. Other methods of determining tag related information using information related to web content are possible.

In other embodiments, tag related information generated by TEXT 363 can include some/all of the web content.

TEXT 363 can be provided with web content by WRET 364. The functionality associated with TEXT 363 can be controlled using UI 322. For example, UI 322 can be used to disable generation of tag related information by TEXT 363 temporarily for some amount of time, or disable generation for web content related to one or more web sites, or the like. Generation of tag related information can be disabled for web content related to some websites due to interests that can include one or more of privacy, security, or the like. In embodiments where TEXT 363 can be implemented as part of a browser that can include Internet Explorer™ from Microsoft Corporation, Google Chrome™ from Google, Inc., and Mozilla Firefox™ from Mozilla Foundation, etc., aspects of UI 322 related to controlling TEXT 363 can be provided by the user interface associated with the browser. Tag related information generated by TEXT 363 can be provided to one or more instances of PD 202 that can be associated with the GD. It can be noted that while the example embodiment illustrates TEXT 363 as a plug-in associated with a browser, TEXT 363 can be implemented using other aspects in other embodiments.

WRET 364 can include any combination of circuitry and/or instructions that can allow GD 360 in retrieving web related content, according to an embodiment of the present invention. WRET 364 can retrieve web related content from networks such as internet, intranet, or the like. WRET 364 can use NI 366 in retrieving web content. Web content retrieved by WRET can include content such as html web pages, audio content, video content, or the like. The web content retrieved by WRET can include other aspects such as Java Script, CGI scripts, or other information associated with web content. In one embodiment, WRET 364 can be implemented in a web browser such as Internet Explorer, Mozilla, Chrome, or the like. Web content can be retrieved by WRET 364 due to events that can include user interaction (such as a user typing a URL in a web browser, user clicking on a link or button associated with a web page). Web content can be retrieved by WRET 364 due to events that cannot include user interaction. Web content can be retrieved automatically due to expiry of a timer interval (such as URL redirects associated with html web pages), or due to a script (such as a perl script) retrieving web content due to events that can be specific to the embodiment. Web content retrieved by WRET can be provided to WEXT 362 and/or TEXT 363. It can be noted that while the example embodiment illustrates the association of WRET 364 with a web browser, WRET 364 can be implemented in other forms in other embodiments. For example WRET 364 can be included in accessories such as set top boxes that can allow browsing of web on a television set.

WEXT 362 can include any combination of circuitry and/or instructions that can allow GD 360 in extracting content from data retrieved by WRET 364, in allowing the extracted content to be usable. A variation of the web page embodiment with EMBED tags illustrated earlier, can allow tag related information to be included in html pages using tags that are not recognized by web browsers. An example of such tag can be MYOWNTAG tag. In such embodiments, information included in the html web page, associated with MYOWNTAG can be removed from the web page before using the web page for presenting to the user. In this example embodiment, all MYOWNTAG tags can be removed as well, before the web page is used for processing by the browser. In the example embodiment of web browser, the web browser can use WEXT 362 to remove information that can be related to tags, before using the content for processing (such as displaying on the browser window). It can be noted that while the example embodiment illustrates the association of WEXT 362 with a web browser, WEXT 362 can be implemented in other forms in other embodiments. For example WEXT 362 can be included in accessories such as set top boxes that can allow removing of tag related information, before using the content for displaying on a television set.

Network interface 366 can include any combination of circuitry and/or instructions that can allow GD 360 and/or aspects of GD 360 in communicating with other devices or services in a network. Network interface 366 can include components such as TCP sockets, UDP sockets, etc. Network interface 366 can also include components such as NICs, Network interface 366 can also include a connector (not shown) providing mechanical and/or electrical coupling to connect to antenna 368 capable of sending/receiving messages over a network. Network interface 366 can also include a connector (not shown) providing mechanical and/ or electrical coupling to cable 369 capable of receiving/ sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. Network interface 366 can be connected to antenna 368 and/or cable 369 with or without a connector.

Aspects of STATE 314, SINT 316, STORE 318, UI 322, PMAN 312, PINT 324, TEXT 363, WEXT 362, WRET 364, NI 366 can be implemented e.g., using instructions of the computer program product executing on one or more suitably configured microprocessors or microcontrollers (not explicitly shown). Other implementations are also possible.

Aspects of GD 360 can be implemented in different ways. In some embodiments, NI 366 and PINT 324 can be implemented using a single interface such as a wifi interface. In some embodiments, WEXT 362, WRET 364, TEXT 363, UI 322 and PMAN 312 can all be part of a browser. In such embodiments, there can be multiple browsers each associated with an instance of WEXT 362, WRET 364, TEXT 363, UI 322 and PMAN 312. In some embodiments, multiple browsers can share an instance of PMAN 312. Other embodiments are also possible.

GD 340 can also include other aspects in addition to or instead of those shown here. For example, an embodiment of GD 340 can be associated with a set top box that can allow for playing DVDs or storing media. Embodiments of GD 340 can also include digital video recorder (DVR), or a Tivo Premier produced by Tivo, Inc that can allow for storing media to be allowed to played back on demand as requested by a user. Other functionality associated with embodiments of GD 340 can include playing media that can be retrieved from internet.

Content of Information/Contexts

FIG. 4A-B illustrates a list of types, one of which can be associated with a tag according to an embodiment of the present invention. The type associated with tag can be used to differentiate one set of tags from other set of tags, wherein all tags in a set can be associated with same tag type. In some embodiments, the type of the tag can be used to determine the structure and content of information exchanged in the tags. In some embodiments, the type associated with tags can be used to determine the application associated with the tag. The list of types illustrated in FIG. 4A-B is illustrative only. Other embodiments can use types that are not described in FIG. 4A-B. The list of types in FIG. 4A-B are illustrative only and are not meant to limit the scope of the invention or any of its embodiments. Each tag received by a CD can be associated with a different tag type. In some embodiments, a CD can associate an application for only some tag types. The set of types that a CD can associate an application with can vary with each embodiment. The type of a tag can be represented in various forms that can include—an enumeration in "C" programming language, a string in Java programming language, an integer value, the value of an XML TYPE node, or the like Moving on, each tagType/ContextType can also be associated with one or more properties referred to as ContextClass(es) or Class(es). The ContextClass of tags illustrated in FIG. 4A-B is indicated in column titled 'Context Class'. Various Classes of tags are possible, various examples of tags include, but are not limited to, manual tag, static tag, dynamic tag, extracted tag, derived info tag, web based tag, transaction driven tag, and social aspect tags, among others. The class of the tag is determined based on type of content carried in the tag, how the content is determined, and so on. A tagType can also be classified into multiple classes based on the nature of information carried in the tag. It should be appreciated that other classes of tags can also exist in other embodiments.

For example, static class (also referred to herein as the static tag) carries information that does not change over a period of time. The information carried in the static tag can be changed by manual intervention—such as programming the GD and/or the PD. When the GD and/or the PD are programmed with new information, the static tags generated can include new information. Examples of the static tags include, but are not limited to, groceries tag, clothes tag, hospital counter tag and address info tag, from the list of tags illustrated in FIG. 4A-B.

Similarly, a tagType of manual class (also referred to herein as a manual tag) includes information that has been manually provided. An example of such a tag is a dial-an-app tag wherein, the tag includes a phone number dialed by a user of a phone. In some embodiments, the dial-an-app tag is used to determine one or more applications associated with the phone number, and activate corresponding application(s) on the phone used to dial the phone number.

A tagType of dynamic class (also referred to herein as a dynamic tag) includes information that changes over time. Examples of such tags include, but are not limited to, temperature, acceleration, orientation, etc. among the list of tags illustrated in FIG. 4A-B.

A tagType of extracted class (also referred to herein as an extracted tag) includes information that is extracted from media content, or extracted from devices associated with media. Examples of such tags include, but are not limited to, sampleMedia, TvLiveVoting, etc. from the list of tags illustrated in FIG. 4A-B. Some of the extracted tags are also dynamic tags because the information contained in such tags can change.

A tagType of derived info class (also referred to herein as a derived info tag) can include information that is generated based on processing of some information. Examples of such tags include DerivedRating tag as illustrated in FIG. 4A-B. A derived info tag can also be a dynamic tag because the information provided in such tags can change over time.

A tagType of web based class (also referred to herein as a web based tag) can include information that is derived from data on the web (or traversing the internet). Information included can be content filled out by a user in a web form, a URL typed by a user, content from a web page, and so on. Examples of such tag include a WebForm tag as illustrated in FIG. 4A-B. A web based tag can also be dynamic tag because the information provided in such tags can change over time.

A tagType of transaction driven class (also referred to herein as a transaction driven tag) can include information derived from a transaction being performed. Transactions include purchases, bank transactions, electronic payments, electronic reservations, order placements, bookings, etc. A transaction driven tag can also be a dynamic tag because the information provided in such tags can change over time. Example of the transaction driven tags include, but are not limited to, UserOrderinStore and Feedback tags as illustrated in FIG. 4A-B.

A tagType of social aspect class (also referred to herein as a social aspect tag) can include information determined using data from social networks. Examples of such tag include DerivedRating and NearMe tags as illustrated in FIG. 4A-B.

It can be noted that a given tagType can be associated with one or more classes. The set of classes described here is illustrative only, and is not meant to limit the scope of the invention or its embodiments. Other embodiments can have tagTypes that can be associated with classes not described herein.

FIG. 5 illustrates fields included in a tag according to an embodiment of the present invention. Some fields of the tag such as provId, assocType, consumerId, type, genId, version, appLocation and autoRun can be represented using structures or forms that are same across tags of different types. The additionalInfo field associated with tag can carry information whose structure and content can be specific to the type associated with the tag. A tag can be represented in various forms that can include a struct in C programming language, class in Java, an XML document, XML node or the like. Other forms of representation are also possible. Tags can be carried in messages exchanged over networks such as the internet, intranet, peer to peer networks, or the like. Tags can be stored in transient memories such as DRAM. Tags can also be stored in a storage media such as flash, hard drive, a CDROM, or the like. Tags can be sent or included in emails. Tags can also be represented in documents—such as a HTML document, an XML document or the like. Other uses and/or representation of tags are possible in various embodiments.

TRIs are generated by GDs. GDs can communicate TRIs to PDs. PDs can communicate the tags including/containing, TRIs received from GDs, to CDs. The content of TRIs can be determined by GDs using methods that are specific to each embodiment. GDs can generate TRIs due to events that are specific to each embodiment. In the embodiment described herein, GD 302 can generate TRI under various conditions, which can include the availability of data in the media received by the RX 308.

With reference to FIG. 6 fields associated with information that can be included in a tag provided by PDs, and/or TRI generated by GDs. The information as represented by FIG. 6 is referred to as CoreInfo (CRI). The version field associated with CRI can be used to represent the version number associated with other fields of CRI. In some embodiments, the version field is set to 1 on an instance of CRI when the CRI instance is initialized, and is incremented when one or more fields associated with the CRI instance are changed. The appLocation field of CRI can be used to represent a URL (Uniform Resource Locator) associated with an application referred to by the CRI. The additionalInfo field associated with CRI can be used to represent information that can be specific to the embodiment. In some embodiments, a CRI generated by GD can have only the additionalInfo field changed as compared to an instance of CRI generated by the GD at an earlier point of time. The additionalInfoUrl field associated with CRI can be used to provide URL (such as a URL on internet) associated with other information that is not included in CRI. It can be noted that the structure and/or contents of CRI as represented here are illustrative and meant for use according to the embodiments illustrated here. Other embodiments can choose to include other information and/or exclude some/all of the information illustrated in FIG. 6. The structure and/or contents associated with FIG. 6 are not meant to limit the scope of the invention or any of its embodiments.

FIG. 7 illustrates fields associated with a sample of media such as audio or video, according to an embodiment of the present invention. In the embodiment described herein, a sample of media can be represented using a list or an array of bytes. A sample of media, as described in FIG. 7 can be carried in tags for use by the CD. A sample of media can have a structure in the array of bytes. In some embodiments, the list of bytes can represent an MPEG (Moving Picture Experts Group)4 media stream. When the list of bytes represents an MPEG4 media stream, some bytes can represent the header associated with MPEG4 format, while some other bytes can represent the sample of the media as indicated by MPEG4 format. Other representations of media sample are also possible. The media sample can be a sampling of a video stream, sampling of an audio stream, or a mix of both. When different types of media can be included in the sample, additional information identifying type of sample can be included along with the sample. The structure and content of the media samples described herein are illustrative, for use in the embodiment described here, and are not meant to limit the scope of the invention and its embodiments. Other structures can be used, and other types of media can be sampled in various embodiments.

FIG. 8 illustrates a list of types, one of which can be associated with an interface on which a CD can receive tags, according to an embodiment of the present invention. In embodiment of FIG. 1A, NI 106 of CD 102 can be associated with a type. In some embodiments, the type of an interface on which a CD receives a tag can be used in determining if the tag is meant for use by the CD. An interface can be a SingleDest interface or a MultiDest interface. Tags received on a SingleDest interface are associated with the CD receiving the tag. SingleDest interfaces are associated with connectivity wherein there can be only two interfaces involved in the connectivity. One of the two interfaces can be associated with a PD and the other associated with a CD. A CD receiving a tag on a SingleDest interface can use the tag for processing. MultiDest interfaces on the other hand can be used for connecting more than two devices. Connectivity among MultiDest interfaces can involve more than one interface. Example of such an interface is Ethernet. More than two interfaces can be connected to each other at any time using Ethernet interfaces by means of an Ethernet bridge, an Ethernet hub, or the like. On such MultiDest interfaces, a tag received by a device need not be meant for use by the device. The Tags in such connectivity can be associated with an identifier that identifies the recipient device. Each interface on a device can be associated with an identifier and the device can compare the identifiers of its interfaces with the identifier included in the tag to determine if the tag is meant for use by the device. Other examples of MultiDest interfaces include USB, FireWire, IEEE 1394, or the like. The examples of SingleDest and MultiDest interfaces, and the method for determining if a tag can be used by a CD described herein are illustrative, for use in the embodiment described here, and are not meant to limit the scope of the invention or any of its embodiments. Other custom interfaces and/or custom methods can be used as well in various embodiments.

FIG. 9 illustrates a list of tag association types, one of which can be associated with a tag according to an embodiment of the present invention. In some embodiments, the association type associated with a tag, can be included in the tag. Tags associated with a Unicast association type can be used only by one CD that can be independent of the number of CDs receiving the tag. Tags associated with a Broadcast association type can be used by any CD that receives the tag. Tags associated with a Multicast association type on the other hand can be used by a subset of CDs receiving the tag. The set of association types associated with a tag is specific to this embodiment and is not meant to limit the scope of the invention or any of its embodiments. Other embodiments can define and/or use other association types not described herein. In some other embodiments, the association type can be implicit and is not included in the tag in such embodiments.

FIG. 10 illustrates a list of types, one of which can be associated with a message according to an embodiment of the present invention. In the embodiment described herein, the type associated with a message can be included in the message. In the embodiment described herein, some devices in the system can be associated with exchanging messages of only some types. A CD for example does not exchange messages of type GeneratedInfo, GetGeneratorInfo, GeneratorInfo, and DeleteGeneratorInfo. In some embodiments, new types can be defined that are not described herein. In some other embodiments, the type associated with a message is not included in the message. When the type associated with a message is not included in the message, the type can be determined using mechanisms implicit to the embodiment. In some embodiments, the type associated with a message can also be derived using some other fields in the message. Some embodiments can choose to use only a subset of the messages described in FIG. 10. The list of types described in FIG. 10 is illustrative only, for use in the embodiment described here, and is not meant to limit the scope of the invention or any of its embodiments.

FIG. 11 is a table illustrating various aspects of information that can be included in a message exchanged among various aspects (CDs, PDs and GDs), according to an embodiment of the present invention. The messages exchanged among instances of CD 102, PD 202 and GD 302 can include a subset or entirety of all fields described in FIG. 11. In some embodiments, the structure and content of "info" field of the message can be specific to the type associated with the message. A message of type ConsumerInfo can associate ConsumerInfo information illustrated in FIG. 13, with the info field, while a message of type ProviderInfo can associate ProviderInfo information illustrated in FIG. 15 with the info field. Other types can associate other information with the field. The senderContact field associated with the message can be used by a receiver of the message to respond with a different message, if needed. When the receiver of a message sends a message back to the sender, the response message can be sent to the address identified by senderContact field of the received message. The senderContact field can carry the contact information in a variety of forms. In one embodiment, the senderContact can include a combination of IP address, port number and a protocol which can be TCP or UDP. In other embodiments, an Ethernet MAC address can be used. Other embodiments can choose to use other addresses for sender-Contact field of the message. Other embodiments of the invention can choose to include fields in the message, not described here, or choose to exclude some or all fields illustrated in FIG. 11. Fields can be included in the message using a variety of representation mechanisms such as TLV (type-length-value) format, XML format, or the like. Other custom representations are also possible in various embodiments.

FIG. 12 illustrates a list of values, one of which can be associated with an idProvider field used in some messages exchanged among aspects (GDs, PDs and CDs) according to an embodiment of the present invention. In the embodiment of the invention described here, identifiers can be associated with the devices in the system. An identifier associated with a CD that is associated with a PD, can be determined either by the CD or the PD. The idProvider field exchanged in some messages can help determine if the PD provides the identifier for CD, or CD uses his own identifier, or that an identifier is not associated with CD in context of the PD. The determination of ID provider can be specific to the embodiment described herein. Some embodiments can choose to assign identifiers in a manner different from what is described in this embodiment. In some other embodiments, identifiers need not be used. The notion of idProvider, and the list of values described in FIG. 12 is illustrative only, for use in the embodiment described here, and is not meant to be limiting the scope of the invention or any of its embodiments.

FIG. 13 illustrates fields associated with information that can be associated with a CD according to an embodiment of the present invention. The information associated with a CD is referred to herein as ConsumerInfo (CI). In the embodiment described herein, CI can be associated with consumerId and contact fields. The consumerId field of CI can be used to identify a CD among instances of CDs, PDs and GDs. The contact field of CI can be used to represent an address to which messages meant for the CD can be sent. The contact field can include a combination of IP address, port number and a protocol which can be TCP or UDP. In other embodiments, an Ethernet MAC address can be used. Other embodiments can choose to use other addresses for contact field of CI. Other embodiments of the invention can choose to include fields in CI, not described here, or choose to exclude some or all fields illustrated in FIG. 13. The set of fields described in FIG. 13 is illustrative, for use in the embodiment described here, and is not meant to be limiting the scope of the invention or any of its embodiments.

FIG. 14 illustrates a list of fields associated with state maintained by a CD according to an embodiment of the present invention. The state maintained by a CD is referred to as ConsumerState (cState). cState can be stored in STATE 114 associated with CD 102. The description of each of the fields maintained in cState is described in FIG. 14. For every PD that a CD is associated with, the PD can provide a ProviderInfo (PI) to the CD. The PI provided by the PD can be maintained in provs field associated with cState, the provs field being a list of instances of PI. If a PD provides an identifier for CD, the identifier can be maintained in consumerId field of cState, the consumerId field being a list of identifiers. In the embodiment described here, the list of consumerIds and the list of provs maintained in cState are implemented using arrays as explained in programming languages such as C, Java, etc. The first numProvs elements of provs and consumerId lists are valid elements according to this embodiment of the invention. Other embodiments can choose to include fields not described herein, and/or exclude some or all of the fields described in FIG. 14. The list of fields described here is illustrative, for use in the embodiment described here, and is not meat to be limiting the scope of the invention or any of its embodiments.

FIG. 15 illustrates fields associated with information that can be associated with a PD according to an embodiment of the present invention. The information associated with a PD is referred to herein as ProviderInfo (PI). The description of each of the fields maintained in PI is described in FIG. 15. The PI associated with PD can maintain, among other fields, the type associated with the tags provided by PD. The PI can also maintain the association type of the tags provided by PD. The PI can also maintain the idProvider field the value of which can be used to determine if it's the PD or CD that provides an identifier for CDs associated with the PD. In one embodiment, this can be used along with mcastConsumerId to assign mcastConsumerId to CDs associated with PD. In such embodiments, the association type field of PI can be set to Multicast. The contact field of PI can be used to represent an address to which messages meant for the PD can be sent. The contact field can include a combination of IP address, port number and a protocol which can be TCP or UDP. In other embodiments, an Ethernet MAC address can be used. Other embodiments can choose to use other addresses for contact field of PI. Other embodiments of the invention can choose to include fields in PI, not described here, or choose to exclude some or all fields illustrated in FIG. 15. The set of fields and semantics associated with them as described in FIG. 15 is illustrative, for use in the embodiment described here, and is not meant to be limiting the scope of the invention or any of its embodiments.

FIG. 16 illustrates fields associated with state maintained by a PD according to an embodiment of the present invention. The state maintained by a PD is referred to as ProviderState (pState). pState can be stored in STATE 214 associated with PD 202. The description of each of the fields maintained in pState is described in FIG. 16. In the embodiment described herein, pState can include, among others, a list of CI maintained in consumerInfo field, one for each CD that is associated with the PD. pState can also include a generatorInfo field that can be used to store the GeneratorInfo (GI) received from a GD that the PD can be associated with. Some embodiments can choose to include fields not described in FIG. 16, while others can choose to exclude a subset or all of the fields described in FIG. 16. In embodiments wherein a PD can include aspects of GD, the generatorInfo can be implicit and/or hardcoded. In other embodiments, other fields associated with pState can be implicit. The set of fields described in FIG. 16 is illustrative, for use in the embodiment described here, and is not meant to limit the scope of the invention or any of its embodiments.

FIG. 17 illustrates fields associated with information that can be associated with a GD according to an embodiment of the present invention. The information associated with a GD is referred to herein as GeneratorInfo (GI). The description of each of the fields maintained in GI is described in FIG. 17. GI can include a contact field that can specify the address wherein the GD that GI is associated with, can have messages sent to. The address specified by contact field can be represented a variety of forms. In one embodiment, the contact can include a combination of IP address, port number and a protocol which can be TCP or UDP. In other embodiments, an Ethernet MAC address can be used. Other embodiments can choose to use other addresses for contact field of GI. Some embodiments can choose to include fields in GI, not described herein. Some other embodiments can choose to exclude some or all of the fields described in FIG. 17. In embodiments wherein a PD can include some or all aspects of GD, the entire GI can be implicit and/or pre-determined. In embodiments wherein the GD associated with PD is pre-determined, the genId field associated with GI is not used. An example of such embodiment is where a PD can be associated with only one GD at any time, such as the embodiment illustrated in FIG. 2A. The set of fields described in FIG. 17 is illustrative, for use in the embodiment described here, and is not meant to limit the scope of the invention or any of its embodiments.

FIG. 18 illustrates fields associated with state maintained by a GD according to an embodiment of the present invention. The state maintained by a GD is referred to as GeneratorState (gState). gState can be stored in STATE 314 associated with GD 302. The description of each of the fields maintained in gState is described in FIG. 18. In the embodiment described herein, gState can include, among others, a list of PI maintained in providerInfo field, one for each PD that is associated with the GD. The list of PI can be maintained as an array of PI. The notion of arrays is similar to the arrays as described in programming languages such as C and Java. gState can also include a gInfo field that can be used to store the GeneratorInfo (GI) that the GD can be associated with. The core field associated with gState of FIG. 18 can include some of the information included by GD when a TRI is generated by the GD. The core field of the GD can also be updated by the GD due to events that can be specific to the embodiment. In the embodiment described herein, some state associated with core can be updated by GD when a TRI is extracted from the media by tag extractor 310 associated with GD 302. In other embodiments, core can be updated due to other events. Some embodiments can choose to include fields not described in FIG. 18, while others can choose to exclude a subset or all of the fields described in FIG. 18. In embodiments wherein a PD can include aspects of GD, the providerInfo can be implicit and/or hard coded. In other embodiments, other fields associated with pState can be implicit. The set of fields described in FIG. 18 is illustrative, for use in the embodiment described here, and is not meant to limit the scope of the invention or any of its embodiments.

FIG. 19 illustrates fields associated with an application according to an embodiment of the present invention. One of the fields, execProgram that is associated with an application can be an executable program. The execProgram can be a sequence of bytes that can represent some instructions that can be processed or executed using a combination of a CPU and/or firmware and/or hardware. Examples of such instructions are executable on various CPUs such as Intel's Pentium, Samsung's 32-bit RISC ARM 1176JZ (F)-S, Samsung's S5PC100 ARM cortex-A8, or the like. In some embodiments, a given execProgram can be processed or executed by a variety of CPUs and/or hardware that can share a given architecture (such as x86). In some other embodiments, the execProgram can be associated with a platform such as iOS® from Apple, Inc. that runs on iPhone, iPad, etc.; Android Operating System from Google, Inc., Windows 7, Windows Mobile, etc. from Microsoft Corp.; Linux, or the like. In some embodiments, the execProgram can be interpreted by virtual machines such as a Java Virtual Machine. In other embodiments, execProgram can be a script such as a Perl script that can be interpreted using some software. The execProgram can interact with other entities that can include components such as flash, clocks, disks, or the like.

In some embodiments, the downloadWhileRunning field associated with an application as described in FIG. 19, can be used to indicate that the execProgram field associated with the application does not include an entire executable program. In such embodiments, execProgram can be used to represent only part of executable instructions. When such an execProgram is processed and/or executed, the environment responsible for processing and/or executing the execProgram can provide methods and/or mechanisms that can allow the remaining portions of execProgram to be downloaded while the execProgram is being processed and/or executed. An example of such embodiment is a java virtual machine executable set of java classes, represented using java byte code. The execProgram, in this embodiment, does not include all the classes required by the execProgram to complete processing. Java programming language environment supports ClassLoader classes that can allow execProgram to download java classes while the execProgram is processed/executed. The downloaded classes can also be executed or interpreted by the java virtual machine as part of execProgram.

In some other embodiments, execProgram can include some parts that are executable or interpretable, while others are not. An example of such embodiment is a web page that can includes html content, and java script. The html content can be used for example, for some display on a browser, while the java script can be interpreted or executed. In some other embodiments, the execProgram can be provided as input to some software. An example of such embodiment is a web page that does not include any executable content. In such case, the web page can be input to a browser or some software that can display the content.

In some other embodiments, the execProgram can include portions that act as firmware. The firmware in such embodiments can be used to program devices such as FPGA. The execProgram in such embodiments can also include portions that are executed, and/or portions that are provided as input to some software.

Some embodiments can choose to include fields not described here, while some other embodiments can choose to exclude some or all of the fields described in FIG. 19. The set of fields associated with an application as described in FIG. 19 and their usage is illustrative—for use in the embodiment described here, and is not meant to limit the scope of the invention or any of its embodiments.

FIG. 20 illustrates fields that can be determined by a GD and which can be carried in a TRI according to an embodiment of the present invention. The instance of GD described in FIG. 3A can be used to determine fields described in FIG. 20. When the TEXT 310 of GD 302 can be used to extract data from tagged media, the extracted data can be used to determine the type field of FIG. 20. In such embodiments, assocType and consumerId fields described in FIG. 20 can also be determined using information extracted from tagged media. Other information can also be determined using data extracted from tagged media. The core field associated with FIG. 20 can be used to carry other extracted information. The structure and content of core field described in FIG. 20 can be specific to the value of type field of FIG. 20. The set of fields described in FIG. 20 is referred to as MultitypeInfo (MI). One or more instances of MI information can be carried in a TRI generated by the GD. When more than one instance of MI is carried in a TRI, each instance of MI can be used for providing a tag. A PD that can receive such TRI can extract each instance of MI and use each extracted instance in providing a tag to instances of CD 102. In such embodiments, the type field associated with MI instance can be used as type of this newly determined tag provided by the PD. In some embodiments, a PD can receive the TRI containing one or more instances of MI, in a message of type GeneratedInfo.

An example of an embodiment is when an advertisement associated with a tagged media track is used to determine a MI with type of SaleSchedule, followed by a TV show that can be used to determine a MI of type VotingApplication. In such cases, a TRI can be used to carry two instances of MI—one of type SaleSchedule and one of type VotingApplication. When a PD receives this TRI, it can extract the first SaleSchedule MI and use it to determine information related to a tag of type SaleSchedule before providing the tag of type SaleSchedule. The PD can then extract the VotingApplication MI and use it to determine information related to a tag of type VotingApplication before providing the tag of type VotingApplication.

It can be noted that while the examples illustrate use of MI determined using data extracted from tagged media, MI determined using other means can be included in a TRI. MI can be used in TRI in other embodiments wherein a GD is capable of providing instances of data of different types (each instance of data can be an instance of MI), in which each data instance can be used to provide a tag of type based on type of MI. Some embodiments can choose to include fields not described here, while some other embodiments can choose to exclude some or all of the fields described in FIG. 20. The set of fields associated with an MI as described in FIG. 20 is illustrative—for use in the embodiment describe here, and is not meant to limit the scope of the invention or any of its embodiments.

FIG. 21 illustrates fields associated with information determined by a GD according to an embodiment of the present invention. The set of information described in FIG. 21 is referred to as DerivedInfo (DI). In the embodiment described herein, DI can be used to carry information determined by an instance of GD 302 described in FIG. 3A. The information described by DI can be used to identify media, without extracting data from tagged media. In embodiments wherein media is not tagged, an instance of DI can be used in combination with a service to determine the media identified by the DI, and any associated information. A service can maintain an association of different instances of DI to the media and any associated information represented by the respective DI and/or media. For example, given a channelName (such as "CNN News Channel", "Discovery Main Channel", etc.), day, time of telecast, a service can provide the media (including Name of the Program, the production company, artists, etc.) that was/is played on the channel at a given day and time. The service can be provided using a system over the internet. Other methods of providing the service are also possible.

In some embodiments, an instance of DI can be associated with the 'core' field of an MI instance. In such case, the type field of MI can be set to DerivedMediaInfo. The instance of MI can then be carried in a TRI. A TRI can carry more than one instance of MI of type DerivedMediaInfo. Instances of DerivedMediaInfo MI can be intermixed with instances of MI of other types (such as VotingApplication, SaleSchedule, etc.) when the instances are carried in a TRI.

Some embodiments can choose to include fields not described in FIG. 21, while some other embodiments can choose to exclude some or all of the fields described in FIG. 21. The set of fields associated with a DI as described in FIG. 21 is illustrative—for use in the embodiment describe here, and is not meant to limit the scope of the invention or any of its embodiments.

FIG. 112 illustrates fields associated with a structure of information referred to as ContextApp (CA) according to an embodiment of the present invention. The structure can be used to associate an application with a tag. The structure consists of two fields—tag and app. The tag field of CA is a tag, the structure of which is illustrated in FIG. 5. The app field can be an application. An app can be associated with a structure as indicated in FIG. 19. In some embodiments, a list or an array of instances of CA can be used to associate a set of tags—each with an application. An example of such use can be the learntAppSet. learntAppSet can be maintained in STATE 114 of CD 102 in FIG. 1A. In some embodiments, learntAppSet can be used to maintain a list of tags for which an application has been selected or determined in the past. The selection or determination can be made in an interactive or non-interactive manner. In an interactive selection, a user can select an application for a given tag when the tag is received by CD 102. When such a selection is made an association between the tag and the application can be added to learntAppSet, in some embodiments. The learntAppSet can be used in some embodiments to associate an application for a received tag, by comparing the type associated with the received tag, with the type of each CA, and using the application of the CA whose type matches the type of the received tag.

In some embodiments, a list or array of instances of CA can be used to associate a set of tags—each with an application. An example of such use can be the cfgAppSet. cfgAppSet can be maintained in STORE 118 of CD 102 in FIG. 1A. In some embodiments, cfgAppSet can be used to maintain a list of tags for which an application is associated by means of configuration by user interaction or some other provisioning mechanisms. The associations can be setup by a user in an interactive manner using UI 126. One method of user interaction can involve providing tags and application information using UI 126. The associations can be stored in STORE 118 and made available for use by processes of FIG. CD 102. The set of CAs in cfgAppSet can be modified or deleted as determined using user interaction or some other provisioning mechanisms. In some embodiments, the set of CAs maintained in learntAppSet can be managed automatically without a user of CD 102 being aware of or managing associations in learntAppSet. Addition, removal or management of CAs in cfgAppSet on the other hand can require user interaction, in some embodiments.

In some embodiments, the tag maintained in an instance of CA in cfgAppSet can, include only part of all the information that can be represented by/in the tag. For example, the tag in an instance of CA of cfgAppSet can have valid values only for the type field associated with the tag. Other fields associated with the tag in such embodiments are not used. Other embodiments can choose to use only some or all fields of tag, for instances of CA in cfgAppSet, in a manner not described here.

Messaging Scheme

Messages can be sent using a variety of mechanisms. In embodiments where in the devices are associated with IP addresses, messages can be sent using UDP datagrams with a destination IP address matching with the contact of the device to which the message is sent. The contact can also be associated with a port number that can be used as the destination port associated with UDP datagram. Other methods of sending a message are possible. Messages can be sent in various embodiments using mechanisms that can include messages over TCP, messages implemented using electrical signaling, or any other custom mechanisms.

The messages allow interaction between the CD, the PD and the GD. Further, the messages also allow the method to be processed in order to provide the computing device or the CD with access to the one or more applications. In the description provided below various embodiments and steps of the method for facilitating the computing device to access a set of applications is described.

The method includes a step of determining contexts associated with either or both the computing device and a user of the computing device. The context describes an environment and/or an activity of the user and/or the computing device and helps generate one or more contextual tags. The context includes a set of data that provides any information relating to the environment of the user and/or the computing device, including but not limited to conditions, background, internal features of computing device (like other applications, operating systems, sensors, components, etc.), data from those internal features, external features (like WiFi devices, physical signs, bar codes, location, some third party devices, third party systems, or the like), data from those external features (WiFi scan, signals from a satellite, signals from a device such as Bluetooth or other devices, NFC device, data over networks such as intranet/internet, or the like), data from external systems and/or services (including data provided by a service over networks such as internet/intranet), settings and situation of the user and/or the computing device. Also, the context can include a set of data that provides any information relating to the activity of the user and/or the computing device, including, interaction between the user and the computing device, interaction between the user/the computing device and a third party device (or system or service), state of the user/the computing device, internal operations of the computing device, or the like.

The method also includes identifying one or more applications associated with the one or more contextual tags. The one or more applications are identified according to context based information contained in the one or more contextual tags and the one or more applications are thereafter received/accessed by the computing device.

Moving on, once the contextual tag is generated in the form of any one or more of a manual tag, a dial-an-app tag, a static tag, a dynamic tag, an extracted tag, a derived info tag, a web based tag, a transaction driven tag, a social aspect tag, and other tags, then one or more applications corresponding to the contextual tag is identified. Thereafter, the computing device is enabled to access the one or more applications corresponding to the contextual tag.

In some embodiments, the applications are activated simultaneously while being downloaded, whereas in other embodiments, some of the applications are automatically activated on the computing device. In yet other embodiments, the one or more applications identified corresponding to the one more contextual tags may already be present on the computing device and may be accessed from there.

Further, according to the invention, the context or the contextual tag may be stored in one or more intermediate devices before the one or more applications are associated with the contextual tag. For example, the contextual tag after being generated may be stored in the providing device or the generating device, or other devices on a network like a set-top box or a router, before being transferred to the computing device. In some cases, the one or more applications are identified based on only a portion of the contextual tag and not the complete contextual tag.

As discussed, there could be various types of contextual tags that are generated and there could be various ways of identifying the one or more contexts. For example, in an embodiment, a URL can be determined using at least a portion of the contextual tag and thereafter, the computing device can be enabled to access and activate an application configured to utilize/access the URL. In another scenario, the computing device can be allowed to access the one or more applications associated with a phone number being dialed by the user of the computing device.

Further, according to the invention, the user is also given an option to select one or more applications. The selected applications can then be accessed and/or activated by the computing device.

In further embodiments, the one or more contexts are determined when a user selects to do so manually or in other cases the determination of the one or more contexts can be scheduled to be repeated regularly after a predefined time interval. However, it should be appreciated by the people skilled in the art that other methods to determine contexts are also possible in other embodiments.

In some embodiments, the invention also provides an option of cleaning up of the one or more applications from the computing device. This can be possible in case of one or more of a change in the one or more contexts is determined, or the user is found to be not interacting with an earlier activated/accessed application for a predefined time interval, or the one or more applications is inactive, or there has been a lapse of a predefined time spent during or after activating/accessing the one or more applications.

Going forward, various aspects linked to method of the present invention are described for ease of understanding. In this regard, the term "processor" has been also mentioned as a "providing device" and the term "context module" has been referred to as "generating device" in some embodiments for easier description of the invention. Also, the term "one or more context" is mentioned as "context information" or "information" or alike. Similarly, the term "computing device" is also referred as "consumer device" and the term "contextual tag" and "tag" have been interchangeably used in description of the present invention. Also, the term "memory module" and "store" have been interchangeably used in description of some embodiments of the present invention.

The invention also provides a computer program product that includes instructions that enables the execution of the method described as per the invention.

To better summarize the method for facilitating access to a set of applications by the computing device in accordance with the present invention, some exemplary embodiments are described in the subsequent paragraphs. However, it is understood that the various methods described below are not limited to the order in which the steps are listed. Further, it will also be apparent to those ordinarily skilled in the art that the methods may include one or more additional steps for further enhancement of the effectiveness of the methods, however, are not essential to the methods, in accordance with the embodiments of the present invention.

Figure 22:
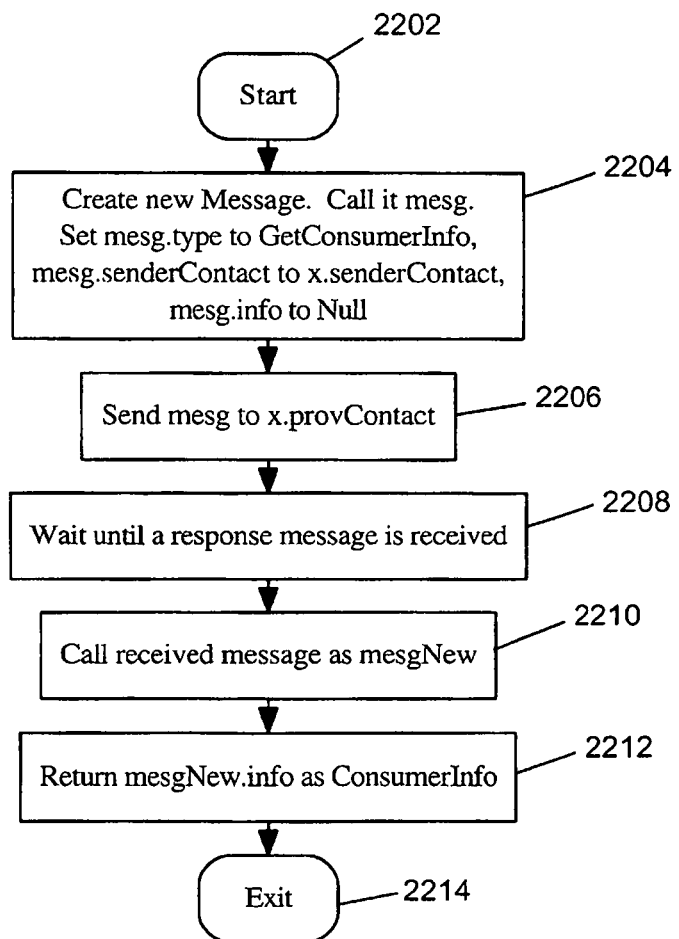
FIG. 22 illustrates the flow diagram of a process followed in getting CI according to an embodiment of the present invention.

FIG. 22 illustrates the flow diagram of a process for followed in getting CI from a device associated with a contact, according to an embodiment of the present invention. In the embodiment described here, an instance of CD 102 can use this process to get a CI from an instance of PD 202. The process illustrated in FIG. 22 can be used by an instance of CD 102 to get CI from one or more instances of PD 202. The process of getting a CI from multiple instances can be performed in parallel, or in a serial fashion. Other methods of getting CI are possible.

Instance 'x' associated with this process can be provided with information that can include senderContact and provContact. senderContact can be used to specify the contact associated with the sender device of the message. When an instance of CD 102 uses this process to send a message, the contact associated with CD 102 is used for senderContact. provContact can be used to specify the contact associated with a device that the message is meant to be sent to. In embodiments where an instance of CD 102 sends a message using this process to an instance of PD 202, the contact associated with the PD is used for provContact. The values associated with instance 'x' can be provided by processes that use the process described here and shown in FIG. 22.

The process for sending a message starts in step 2202 and moves on to step 2204. At step 2204, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2204, mesg.type is set o GetConsumerInfo, mesg.senderContact to x.senderContact and mesg.info to Null. The process can then move to step 2206.

At step 2206, the message is sent to the contact represented by x.provContact. In embodiments where messages are sent using UDP, the datagram containing the message can be sent to the destination at this step. The process can then move to step 2208. At step 2208, the process can wait to receive a message from the device associated with x.provContact contact. In embodiments where the process associated with FIG. 22 is implemented using instructions of the computer program product executing in a UNIX OS related process, this step suggests that the UNIX process can sleep at this time, until a message is received by the UNIX process. Once a response message is received, the process can move to step 2210. At step 2210, the response message is named as mesgNew. This name is used to refer to the received message in subsequent steps of the process. The process can then move to step 2212.

Step 2212 indicates mesgNew.info can be used as a CI. Embodiments/Processes that use the process of FIG. 22 to get a CI can be provided with a CI using mesgNew.info. The process can then move to step 2214. The process of getting a CI completes in step 2214.

Figure 23:
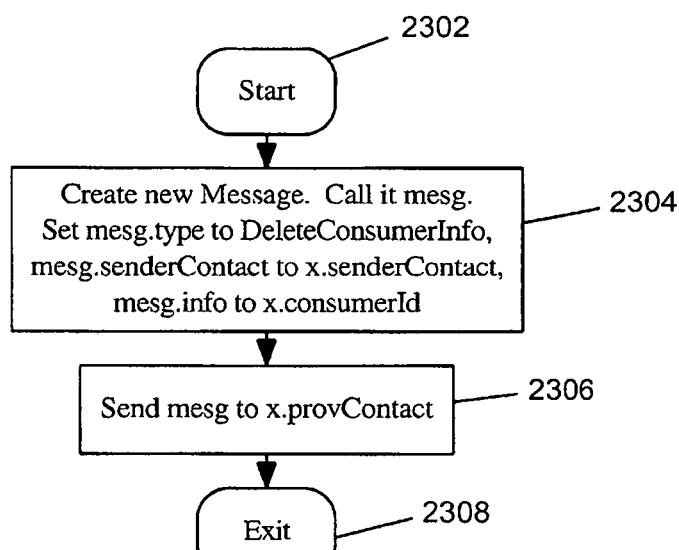
FIG. 23 illustrates the flow diagram of a process followed in sending a message associated with a type of DeleteConsumerInfo according to an embodiment of the present invention.

FIG. 23 illustrates the flow diagram of a process followed in sending a message associated with a type of DeleteConsumerInfo, according to an embodiment of the present invention. In the embodiment described here, an instance of CD 102 can use this process to send a message to an instance of PD 202. The process illustrated in FIG. 23 can be used by an instance of CD 102 to send messages to one or more instances of PD 202. The process of sending messages to multiple instances can be performed in parallel, or in a serial fashion. Other methods of sending messages are possible.

Instance 'x' associated with this process can be provided with information that can include senderContact, provContact and consumerId. x.senderContact can be used to specify the contact associated with the sender device of the message. When an instance of CD 102 uses this process to send a message, the contact associated with CD 102 is used for x.senderContact. x.provContact can be used to specify the contact associated with a device that the message is meant to be sent to. In embodiments where an instance of CD 102 sends a message using this process to an instance of PD 202, the contact associated with the PD is used for x.provContact. x.consumerId can be used to specify an identifier associated with CD 102 when an instance of CD 102 sends the message. In some embodiments, myConsumerId field associated with cState can be associated with x.consumerId. In other embodiments, one among the list of consumerId associated with cState can be associated with x.consumerId. The values associated with instance 'x' can be provided by processes that use the process described here and shown in FIG. 23.

The process for sending a message starts in step 2302 and moves on to step 2304. At step 2304, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2304, mesg.type is set to DeleteConsumerInfo, mesg.senderContact to x.senderContact and mesg.info to x.consumerId. The process can then move to step 2306.

At step 2306, the message mesg can be sent to the contact represented by x.provContact. In embodiments where messages are sent using UDP, the datagram containing the message can be sent to the destination at this step. The process can then move to step 2308. Step 2308 indicates the completion of process shown in FIG. 23.

Figure 24:
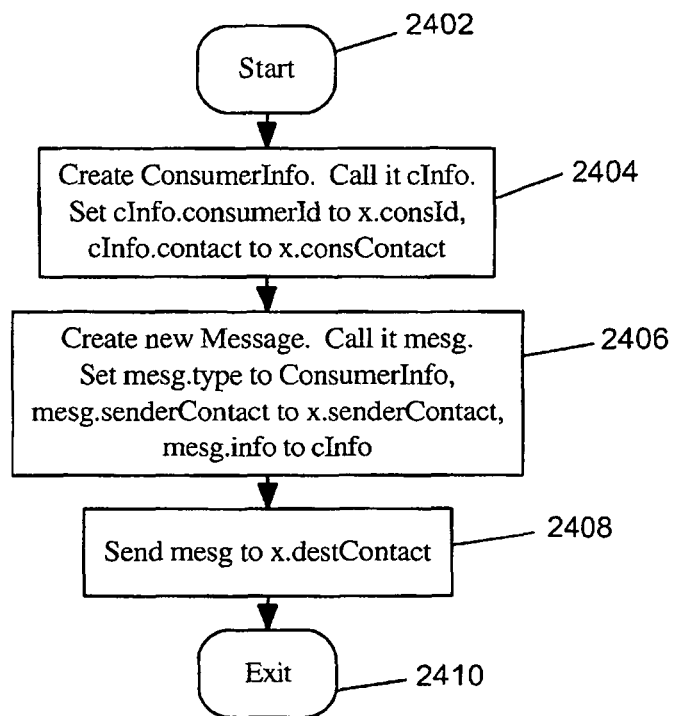
FIG. 24 illustrates the flow diagram of a process followed in sending a message associated with a type of ConsumerInfo according to an embodiment of the present invention.

FIG. 24 illustrates the flow diagram of a process followed in sending a message associated with a type of ConsumerInfo according to an embodiment of the present invention. In the embodiment described here, an instance of CD 102 can use this process to send a message to an instance of PD 202. An instance of PD 202 can also use this process to send a message to an instance of CD 102. The message of type ConsumerInfo can also be sent in response to a message associated with type GetConsumerInfo. The process illustrated in FIG. 24 can be used by an instance of CD 102 to send messages to one or more instances of PD 202. The process can also be used by an instance of PD 202 to send messages to one or more instances of CD 102. The process of sending messages to multiple instances can be performed in parallel, or in a serial fashion. Other methods of sending messages are possible.

Instance 'x' associated with this process can be provided with information that can include senderContact, destContact, consId and consContact. x.senderContact can be used to specify the contact associated with the sender device of the message. When an instance of CD 102 uses this process to send a message, the contact associated with CD 102 is used for x.senderContact. x.destContact can be used to specify the contact associated with a device that the message is meant to be sent to. In embodiments where an instance of CD 102 sends a message using this process to an instance of PD 202, the contact associated with the PD can be used for x.destContact. x.consId can be used to specify an identifier associated with CD 102. In embodiments where an instance of CD 102 can use this process, myConsumerId associated with cState can be associated with x.consId. In embodiments where an instance of PD 202 can use this process, pInfo.

mcastConsumerId associated with pState can be associated with x.consId. x.consContact can be associated with the contact of CD 102, when CD 102 uses this process. The values associated with instance 'x' can be provided by processes that use the process described here and shown in FIG. 24.

The process for sending a message starts in step 2402 and moves on to step 2404. At step 2404 a new instance of CI can be created. This instance can be referred to as cInfo. In some embodiments of the invention, the creation of an instance of CI can involve allocation of memory, control data structures, message handles, or the like. cInfo.consumerId can be set to x.consId, and cInfo.contact can be set to x.consContact. The process can then move to step 2406.

At step 2406, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2406, mesg.type is set to ConsumerInfo, mesg.senderContact to x.senderContact and mesg.info to cInfo created in step 2404. In some embodiments, the setting of mesg.info to cInfo can involve copying of content associated with cInfo to mesg.Info. In some embodiments, this can involve copying of data from one location in memory to other location in memory, when memory is implemented using hardware components/devices such as RAM, DRAM, SRAM or the like. The process can then move to step 2408.

At step 2408, the message mesg can be sent to the contact represented by x.destContact. In embodiments where messages are sent using UDP, the datagram containing the message can be sent to the destination at this step. The process can then move to step 2410. Step 2410 indicates the completion of process shown in FIG. 24.

Figure 25:
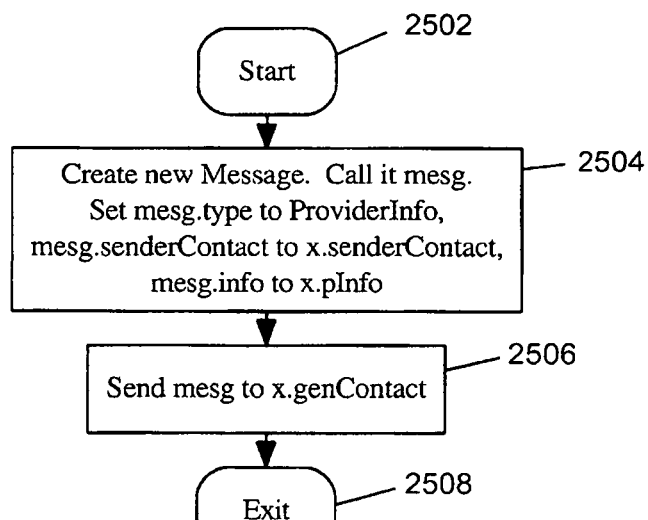
FIG. 25 illustrates the flow diagram of a process followed in sending a message associated with a type of ProviderInfo according to an embodiment of the present invention.

FIG. 25 illustrates the flow diagram of a process followed in sending a message associated with a type of ProviderInfo according to an embodiment of the present invention. In the embodiment described here, an instance of PD 202 can use this process to send a message to instances of CD 102 and/or GD 302. The message of type ProviderInfo can also be sent in response to a message associated with type GetProviderInfo. The process can also be used by an instance of PD 202 to send messages to one or more instances of CD 102 and/or GD 302. The process of sending messages to multiple instances can be performed in parallel, or in a serial fashion. Other methods of sending messages are possible.

Instance 'x' associated with this process can be provided with information that can include senderContact, pInfo, and genContact. x.senderContact can be used to specify the contact associated with the sender device of the message. When an instance of PD 202 uses this process to send a message, the contact associated with PD 202 is used for x.senderContact. x.genContact can be used to specify the contact associated with a device that the message is meant to be sent to. In embodiments where an instance of PD 202 sends a message using this process to an instance of GD 302, the contact associated with the GD can be used for x.genContact. x.pInfo can be associated with, pInfo which is an instance of PI, associated with pState of PD 202. In some embodiments, the association of x.pInfo to pInfo associated with pState can involve copying of content associated with pState.pInfo to x.pInfo. In some embodiments, this can involve copying of data from one location in memory to other location in memory, when memory is implemented using hardware components/devices such as RAM, DRAM, SRAM or the like. The values associated with instance 'x' can be provided by processes that use the process described here and shown in FIG. 25.

The process for sending a message starts in step 2502 and moves on to step 2504. At step 2504, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2504, mesg.type is set to ProviderInfo, mesg.senderContact to x.senderContact and mesg.info to x.pInfo. In some embodiments, the setting of mesg.info to x.pInfo can involve copying of content associated with x.pInfo to mesg.Info. In some embodiments, this can involve copying of data from one location in memory to other location in memory, when memory is implemented using hardware components/devices such as RAM, DRAM, SRAM or the like. The process can then move to step 2506.

At step 2506, the message mesg can be sent to the contact represented by x.genContact. In embodiments where messages are sent using UDP, the datagram containing the message can be sent to the destination at this step. The process can then move to step 2508. Step 2508 indicates the completion of process shown in FIG. 25.

Figure 26:
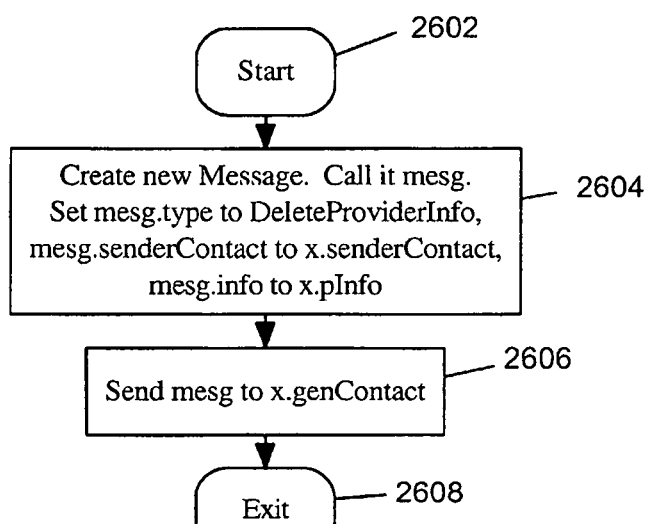
FIG. 26 illustrates the flow diagram of a process followed in sending a message associated with a type of DeleteProviderInfo according to an embodiment of the present invention.

FIG. 26 illustrates the flow diagram of a process followed in sending a message associated with a type of DeleteProviderInfo, according to an embodiment of the present invention. In the embodiment described here, an instance of PD 202 can use this process to send a message to an instance of GD 302. The process illustrated in FIG. 26 can be used by an instance of PD 202 to send messages to one or more instances of GD 302. The process of sending messages to multiple instances can be performed in parallel, or in a serial fashion. Other methods of sending messages are possible.

Instance 'x' associated with this process can be provided with information that can include senderContact, genContact and pInfo. x.senderContact can be used to specify the contact associated with the sender device of the message. When an instance of PD 202 uses this process to send a message, the contact associated with PD 202 is used for x.senderContact. x.genContact can be used to specify the contact associated with a device that the message is meant to be sent to. In embodiments where an instance of PD 202 sends a message using this process to an instance of GD 302, the contact associated with the GD is used for x.genContact. x.pInfo can be set to an instance of PI, such as pState.pInfo associated with an instance of PD 202. The values associated with instance 'x' can be provided by processes that use the process described here and shown in FIG. 26.

The process for sending a message starts in step 2602 and moves on to step 2604. At step 2604, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2604, mesg.type is set to DeleteProviderInfo, mesg.senderContact to x.senderContact and mesg.info to x.pInfo. The process can then move to step 2606.

At step 2606, the message mesg can be sent to the contact represented by x.genContact. In embodiments where messages are sent using UDP, the datagram containing the message can be sent to the destination at this step. The process can then move to step 2608. Step 2608 indicates the completion of process shown in FIG. 26.

Figure 27:
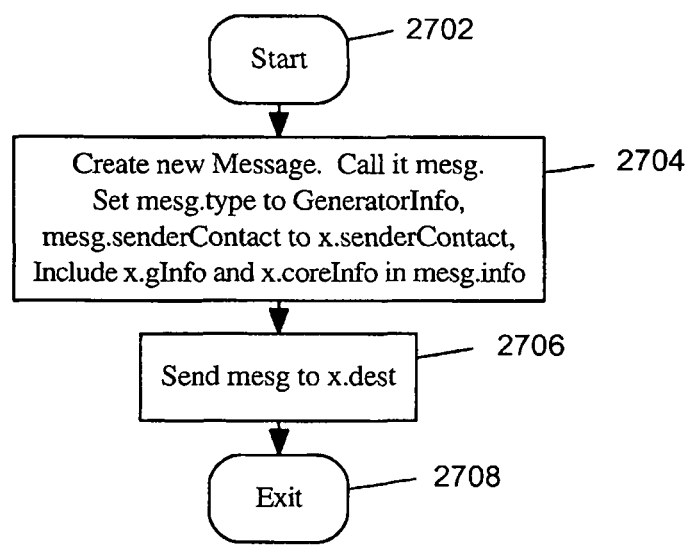
FIG. 27 illustrates the flow diagram of a process followed in sending a message associated with a type of GeneratorInfo according to an embodiment of the present invention.

FIG. 27 illustrates the flow diagram of a process followed in sending a message associated with a type of GeneratorInfo according to an embodiment of the present invention. In the embodiment described here, an instance of GD 302 can use this process to send a message to instances of PD 202. The message of type GeneratorInfo can also be sent in response to a message associated with type GetGeneratorInfo. The process can also be used by an instance of GD 302 to send messages to one or more instances of PD 202. The process of sending messages to multiple instances can be performed in parallel, or in a serial fashion. Other methods of sending messages are possible.

Instance 'x' associated with this process can be provided with information that can include senderContact, cInfo, gInfo and dest. x.senderContact can be used to specify the contact associated with the sender device of the message. When an instance of GD 302 uses this process to send a message, the contact associated with GD 302 can be used for x.senderContact. x.dest can be used to specify the contact associated with a device that the message is meant to be sent to. In embodiments where an instance of GD 302 sends a message using this process to an instance of PD 202, the contact associated with the PD can be used for x.dest. x.gInfo can be associated with, gState.gInfo of GD 302, which is an instance of GI. In some embodiments, the association of x.gInfo to gInfo associated with gState can involve copying of content associated with gState.gInfo to x.gInfo. In some embodiments, this can involve copying of data from one location in memory to other location in memory, when memory is implemented using hardware components/devices such as RAM, DRAM, SRAM or the like. In some embodiments, x.cInfo can be associated with gState.core of GD 302, which is an instance of CRI. The values associated with instance 'x' can be provided by processes that use the process described here and shown in FIG. 27.

The process for sending a message starts in step 2702 and moves on to step 2704. At step 2704, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2704, mesg.type is set to GeneratorInfo and mesg.senderContact to x.senderContact. x.gInfo and x.cInfo can both be associated with mesg.info. In some embodiments, this can be done using a TLV (type, length, value) structure wherein, more than one TLV can be associated with mesg.info. The type and length fields associated with a TLV structure can be 2 bytes each, in an embodiment of the invention. The first TLV can be associated with x.gInfo and second TLV with x.cInfo. A value of '1' for type, the size of x.gInfo in bytes for length, and x.gInfo for value can be used for the first TLV. A value of '2' for type, the size of x.cInfo in bytes for length, and x.cInfo for value can be used for the second TLV. In one embodiment wherein mesg.info can be associated with a sequence of bytes in DRAM (or other memory devices), the first TLV can be copied to mesg.info. Starting at location in memory that follows the last byte of first TLV in mesg.info, the second TLV can be copied. The first TLV followed in memory by second TLV, together can represent mesg.info. Other methods of associating x.gInfo and x.cInfo with mesg.info can be used. The association can be made in a way such that x.gInfo and x.cInfo can be extracted from mesg.info after the association is made. The extracted gInfo and cInfo are respectively same as the x.gInfo and x.cInfo that are associated with mesg.info. The process can then move to step 2706.

At step 2706, the message mesg can be sent to the contact represented by x.dest. In embodiments where messages are sent using UDP, the datagram containing the message can be sent to the destination at this step. The process can then move to step 2708. Step 2708 indicates the completion of process shown in FIG. 27.

Figure 28:
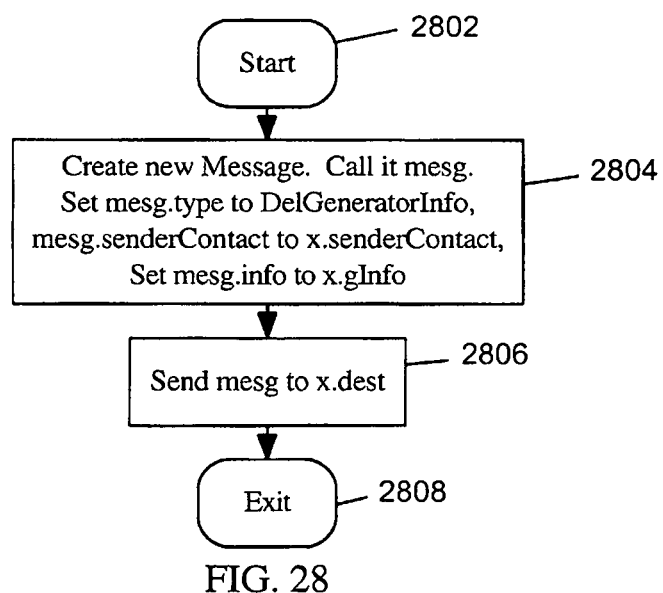
FIG. 28 illustrates the flow diagram of a process followed in sending a message associated with a type of DelGeneratorInfo according to an embodiment of the present invention.

FIG. 28 illustrates the flow diagram of a process followed in sending a message associated with a type of DeleteGeneratorInfo, according to an embodiment of the present invention. In the embodiment described herein, the process illustrated in FIG. 28 can be used by an instance of GD 302 to send messages to one or more instances of PD 202. The process of sending messages to multiple instances can be performed in parallel, or in a serial fashion. Other methods of sending messages are possible.

Instance 'x' associated with this process can be provided with information that can include senderContact, dest and gInfo. x.senderContact can be used to specify the contact associated with the sender device of the message. When an instance of GD 302 uses this process to send a message, the contact associated with GD 302 can be used for x.senderContact. x.dest can be used to specify the contact associated with a device that the message is meant to be sent to. In embodiments where an instance of GD 302 sends a message using this process to an instance of PD 202, the contact associated with the PD is used for x.dest. x.gInfo can be set to an instance of GI, such as gState.gInfo associated with an instance of GD 302. The values associated with instance 'x' can be provided by processes that use the process described here and shown in FIG. 28.

The process for sending a message starts in step 2802 and moves on to step 2804. At step 2804, a new message can be created. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The message created in this step is referred to as mesg in subsequent steps of this process/flow-diagram. At step 2804, mesg.type is set to DeleteGeneratorInfo, mesg.senderContact to x.senderContact and mesg.info to x.gInfo. The process can then move to step 2806.

At step 2806, the message mesg can be sent to the contact represented by x.dest. In embodiments where messages are sent using UDP, the datagram containing the message can be sent to the destination at this step. The process can then move to step 2808. Step 2808 indicates the completion of process shown in FIG. 28.

Operation of First Embodiment

Figure 29:
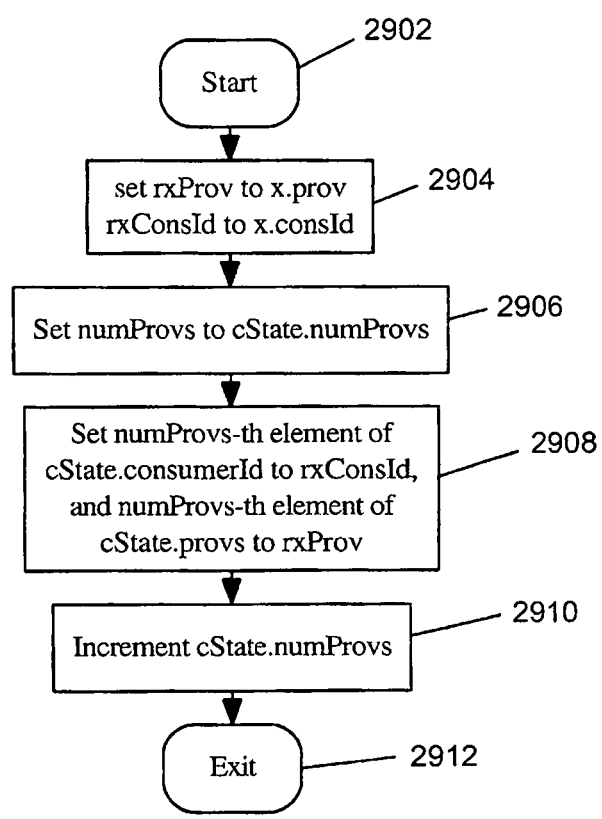
FIG. 29 illustrates the flow diagram of a process followed by a CD when a PD is selected for association with the CD according to an embodiment of the present invention.

FIG. 29 illustrates the flow diagram of a process followed by a CD, when a PD is selected for association with the CD according to an embodiment of the present invention. In the embodiment described here, the process illustrated by FIG. 29 is followed by an instance of CD 102 in updating cState, when the CD is associated with an instance of PD 202. The process indicated in FIG. 29 can be followed after the CD is associated with a PD 202, and before the CD starts to process tags provided by the PD. The process can also be followed once for every PD 202 that the CD associates with. The process illustrated in FIG. 29 is illustrative only. Other embodiments can maintain/update state beyond what is indicated in FIG. 29. Other embodiments can also choose to perform actions or process not indicated in FIG. 29. The process associated with FIG. 29 is illustrative only, meant for use by the embodiment described here, and is not meant to be limiting the scope of the invention or any of its embodiments.

The process starts at step 2902 and moves to step 2904. The process is provided with instance 'x' that can be associated with fields prov and consId. The values associated with instance 'x' can be provided by a process that uses the method illustrated by FIG. 29. In this embodiment, x.prov is an instance of PI, and x.consId indicates an identifier that can be associated with a CD. At step 2904, values associated with 'x' are extracted and a local copy made for use by subsequent steps of the process. A local copy rxProv is associated with the value of x.prov, and a local copy rxConsId is associated with the value of x.consId. The process can then move to step 2906. At step 2906, numProvs can be set to cState.numProvs. In the embodiment described here, numProvs can indicate the number of PDs that the CD 102 is associated with. The process can then move to step 2908.

At step 2908, rxProv is added to cState.provs list, and rxConsId is added to cState.consumerId list and an association is made between rxProv in cState.provs list and rxConsId in cState.consumerId list. In the embodiment described here, this is done by setting the numProvs-th element of cState.consumerId to rxConsId and numProvs-th element of cState.provs to rxProv. The process can then move to step 2910. At step 2910, cState.numProvs is incremented to indicate that an additional element of cState.consumerId and cState.provs lists is valid. The process can then move to step 2912. Step 2912 indicates that the process associated with FIG. 29 is complete.

Figure 30:
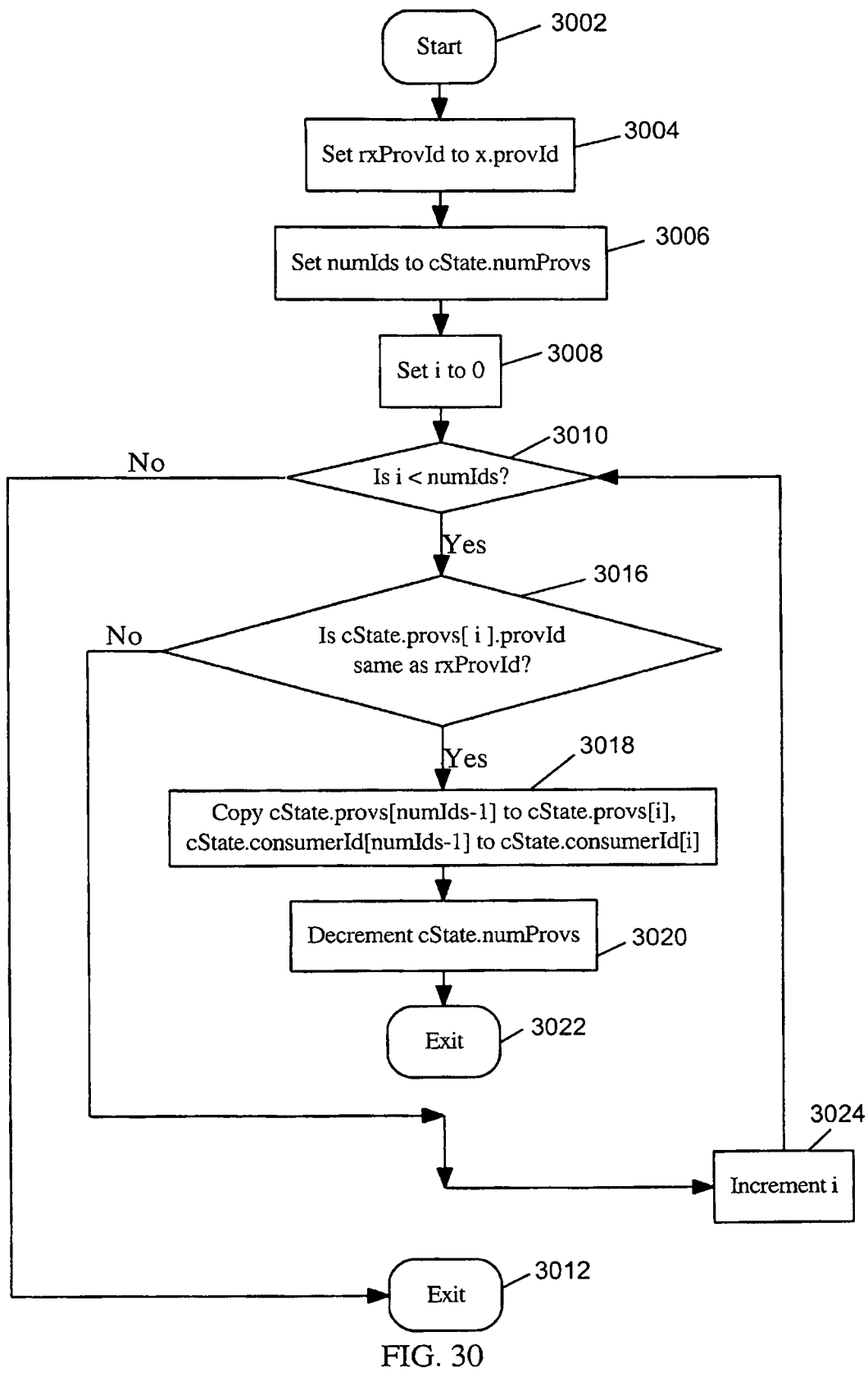
FIG. 30 illustrates the flow diagram of a process followed by a CD when a PD is selected for disassociation with the CD according to an embodiment of the present invention.

FIG. 30 illustrates the flow diagram of a process followed by a CD in updating cState when the CD is disassociating with a PD, according to an embodiment of the present invention. In the embodiment described here, the process associated with FIG. 30 can be used by CD 102 in updating cState associated with the CD when the CD is disassociating with an instance of PD 202. The update of cState can include removing PI of the PD that is being disassociated, from cState.provs list. The removal of the PI from cState.provs can be accomplished by identifying the PI in cState.provs list. The identification can be accomplished by finding an element of PI in cState.provs whose provId matches the provId of the PI associated with the PD. cState.numProvs can indicate the number of elements of cState.provs array that are valid. Along with removing the PI from cState.provs, the consumerId that can be provided by the PD when the PD is associated to the CD and stored in cState.consumerId list can be removed. In other embodiments, other methods of maintaining a set of PI can be used. Mechanisms can include hash tables, linked lists or the like. The completion of process illustrated in FIG. 30 can indicate that the disassociation of CD with the PD is complete.

The process starts at step 3002 and moves to step 3004. The process is provided with instance 'x' that can be associated with provId field. The values associated with instance 'x' can be provided by a process that uses the method illustrated by FIG. 30. x.provId is an identifier associated with the PD 202 instance that the CD is disassociating with. A local copy of x.provId is made in step 3004. The local copy is referred to as rxProvId for use in subsequent steps of the process. The process can then move to step 3006. At step 3006, numIds is set to cState.numProvs. The process then moves to step 3008. At step 3008, i is set to 0. The process can then move to step 3010. At step 3010 a check is made to determine if i is less than numIds. If the check succeeds, the process can move to step 3016. If not, the process can move to step 3012. Step 3012 indicates that the process associated with FIG. 30 is complete.

Returning to step 3016, a check is made to determine if the rxProvId determined in step 3004 matches the provId associated with i-th element of cState.provs. If the check succeeds, the process can move to step 3018. If not, the process can move to step 3024. At step 3024, i is incremented and the process moves to step 3010. The incremented value of i can be used to access/retrieve the next element of cState.provs, if possible. Returning to step 3018, the element at index i can indicate that the PI that needs to be removed has been found in cState.provs array. The element of cState.provs at index (numIds−1) is copied to element at index i of cState.provs. Also, the element of cState.consumerId at index (numIds−1) is copied to element at index i of cState.consumerId. The process can then move to step 3020. At step 3020, cState.numProvs is decremented. This can indicate that the number of valid PI elements in cState.provs is reduced by 1. The process can then move to step 3022. Step 3022 indicates that the process associated with FIG. 30 is complete.

Figure 31:
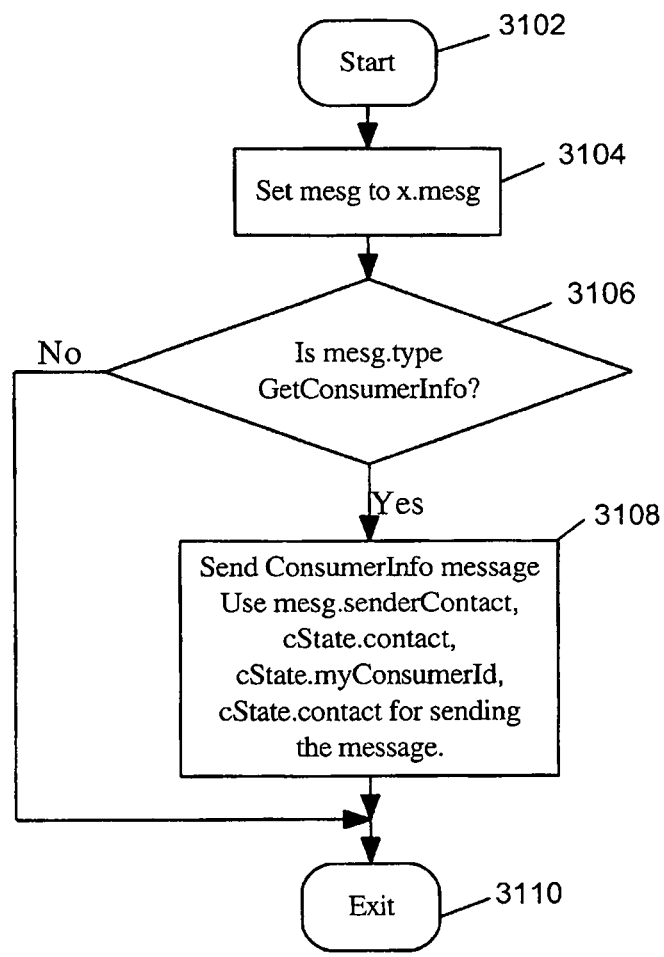
FIG. 31 illustrates the flow diagram of a process followed by a CD in handling messages received by the CD, according to an embodiment of the present invention.

FIG. 31 illustrates the flow diagram of a process followed by a CD in handling messages received by the CD, according to an embodiment of the present invention. In the embodiment described here, an instance of CD 102 can use the process illustrated in FIG. 31 to handle messages received by the CD. The flow diagram illustrated in FIG. 31 can be used to handle messages that are received due to reasons that cannot include responses to messages sent by the CD, in the embodiment described here. An example of such a case is messages of type GetConsumerInfo received by the CD. In some embodiments instances of PD 202 can send messages of type GetConsumerInfo to CD 102 to get CI from instances of CD 102 detected by PD 202. Other methods can include handling of messages associated with types beyond the ones illustrated in FIG. 31. Other methods of handling messages received by CD 102 can be used in other embodiments of the invention.

The process starts at step 3102 and moves to step 3104. The process is provided with instance 'x' that can be associated with mesg field. The values associated with instance 'x' can be provided by a process that uses the method illustrated by FIG. 31. In one embodiment, the process associated with FIG. 31 can be used when NI 106 of CD 102 detects receipt of a message and there is no other method followed by CD 102 that is expecting to handle received message. x.mesg can refer to the message received by CD 102. At step 3104, a local copy of x.mesg is made for use by subsequent steps of the process. This local copy is referred to as 'mesg' in the other steps associated with this process. The process can then move to step 3106. At step 3106, a check is made to determine if the type associated with mesg is GetConsumerInfo. If the type associated with mesg is not GetConsumerInfo, the process moves to step 3110, by taking the "No" path indicated at step 3106. If the type is indeed GetConsumerInfo, the process moves to step 3108.

At step 3108, a message associated with type ConsumerInfo is sent. In embodiment of the invention described here, the process associated with FIG. 24 can be used to send the message. Instance 'x' associated with FIG. 24 can be provided with information such that x.destContact is set to mesg.senderContact, x.senderContact is set to cState.contact, x.consId is set to cState.myConsumerId and x.consContact is set to cState.contact. Instance 'x' can be used by process associated with FIG. 24 to send the message. When FIG. 24 is used to send the message at step 3108, the completion of process associated with FIG. 24 can indicate that the process of FIG. 31 can move to step 3110. Step 3110 indicates the completion of process associated with FIG. 31.

Figure 32:
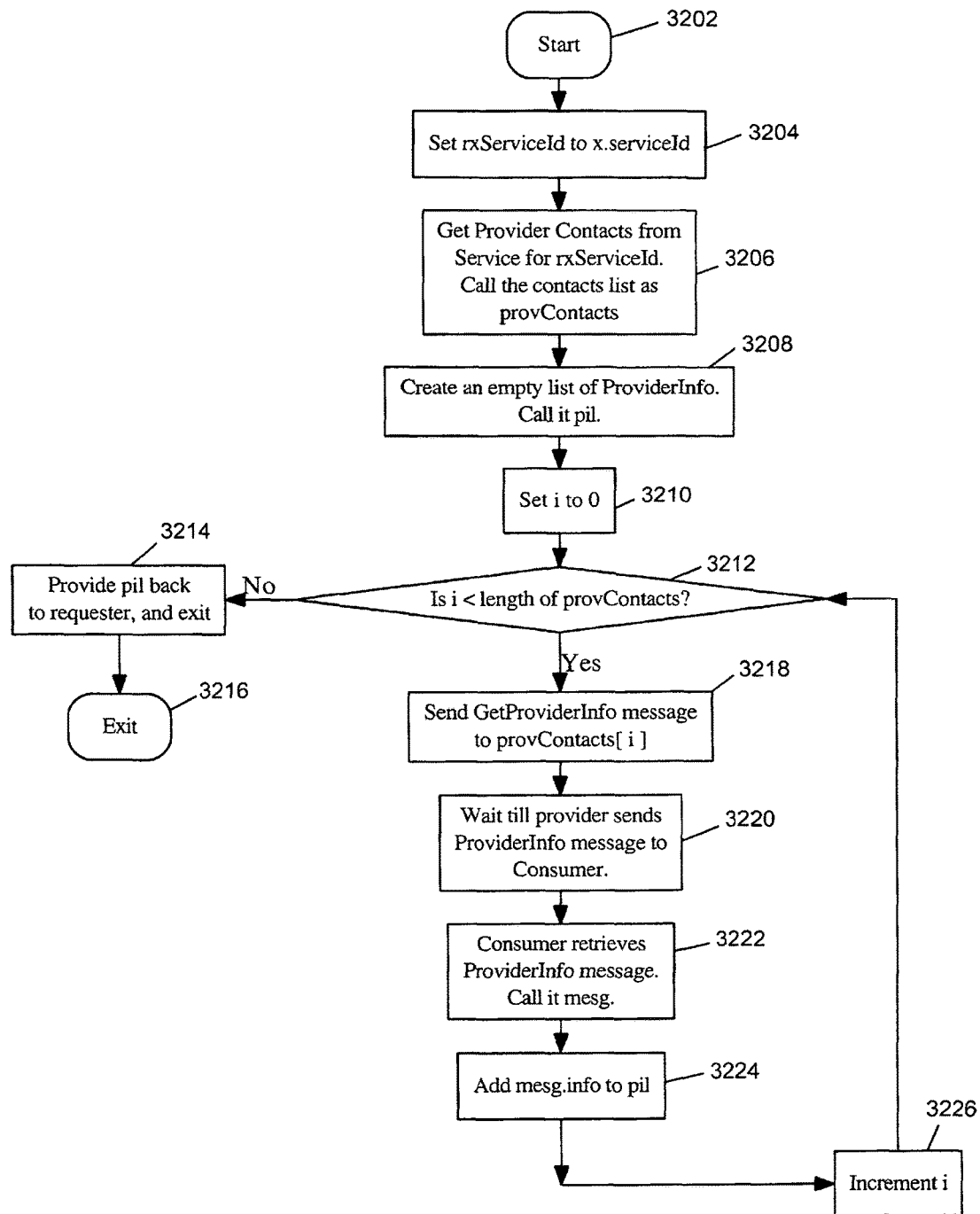
FIG. 32 illustrates the flow diagram of a process followed by a CD in determining PIs for PDs associated with a service identifier, according to an embodiment of the present invention.

FIG. 32 illustrates the flow diagram of a process followed by a CD in determining PIs for PDs associated with a service identifier, according to an embodiment of the present invention. In one embodiment of the present invention, an instance of CD 102 can use the process illustrated in FIG. 32 to determine PIs for PDs associated with a given serviceId. The process works by determining the list of PDs associated with a given serviceId, using a service, and then determining the PI associated with each of the determined PD. Other methods of determining PI are possible. For example, the service can instead provide the PI for the PDs associated with a given serviceId. The method described in FIG. 32 is illustrative only, meant for use in one embodiment, and is not meant to limit the scope of the invention or any of its embodiments.

The process illustrated in FIG. 32 starts at step 3202 and moves to step 3204. The process is provided with instance 'x' that can be associated with a serviceId field. The values associated with instance 'x' can be provided by a process that uses the method illustrated by FIG. 32. At step 3204, a local copy of x.serviceId is made. The local copy is referred to as rxServiceId for use in subsequent steps of the process. The process can then move to step 3206.

At step 3206, a service is contacted for determining the contact of a list of PD 202 instances associated with rxServiceId. The service is provided with information that can include rxServiceId. The service can return a list (an array in this embodiment) of contacts. Each contact of the list can be associated with an instance of PD 202. The list of contacts is referred to as provContacts for use in subsequent steps of the process. The process can then move to step 3208.

At step 3208, a list of PI is created. The creation of a list of PI can involve allocation of memory, control data structures, state handles, or the like. In some embodiments, the creation of a PI can involve just allocation of memory. In yet other embodiments, the creation of a PI can involve allocating state handles in addition to allocating sufficient memory for the PI. The list of PI created is referred to as pil for use in subsequent steps of the process. The process can then move to step 3210. At step 3210, an i is set to 0. The process can then move to step 3212.

At step 3212 a check is made to determine if i is less than the length of provContacts determined in step 3206. If the check succeeds, the process can move to step 3218. If not, the process can move to step 3214. At step 3214, the set of PIs stored in pil can be used as the result of the process associated with FIG. 32. The process can then move to step 3216. Step 3216 indicates that the process associated with FIG. 32 is complete.

Returning to step 3218, a GetProviderInfo message is sent to an instance of PD 202 that is associated with contact stored in i-th element of provContacts. The process can then move to step 3220. The sending of a GetProviderInfo message to PD 202 can result in PD 202 responding with a ProviderInfo message. CD 102 waits in step 3220 for the ProviderInfo message from the PD. Once the CD receives the ProviderInfo message, the process can move to step 3222. At step 3222, the message is retrieved. The message is referred to as mesg. The process can then move to step 3224. At step 3224, the info field retrieved from mesg is added to pil. The info field of mesg can be used as an instance of PI. The process can then move to step 3226. At step 3226, i is incremented and the process moves to step 3212.

FIG. 33 illustrates the flow diagram of a process followed by a CD in associating with a PD according to an embodiment of the present invention. In the embodiment of the invention described here, an instance of CD 102 uses the process illustrated in FIG. 33 to associate with an instance of PD 202. Each instance of CD 102 can be associated with one or more instances of PD 202. When associated with more than one PD, CD 102 can receive tags from one or all of the PDs associated with the CD. When associated with more than one instance of PD 202, CD 102 can receive messages and tags from one or all of the associated PD 202 instances on NI 106. CD 102 can send messages to one or more instances of PD 202 on NI 106. An instance of CD 102 can repeat the process illustrated in FIG. 33 once for each detected PD 202.

In some other embodiments, CD 102 can be associated with more than one instance of NI 106. When an instance of CD 102 is associated with more than one instance of NI 106, instances of NI 106 can be of same or different types. For example one instance of NI 106 on an instance of CD 102 can be a wifi interface, while another instance of NI 106 on the CD can be a USB interface, and yet other instance of NI 106 on the CD can be an Ethernet interface. An instance of CD 102 can be associated with more than one instance of PD 202 such that some instances of PD 202 can be associated via one instance of NI 106, and some other instances of PD 202 can be associated via another instance of NI 106 on the CD. When a CD 102 is associated with more than one PD 202 across more than one instance of NI 106 of CD 102, the CD can be receiving tags and/or messages from some or all of the instances of PD 202 across multiple instances of NI 106. The CD 102 instance can also be sending messages to instances of PD 202 using different instances of NI 106 on CD 102.

The process starts at step 3302 and moves to step 3304. At step 3304, CD 102 can identify or detect new instances of PD 202. The availability of new instances of PD 202 can be determined in ways that can be specific to the embodiment. For example in an embodiment wherein a PD can be connected to a CD using Ethernet cable, one end of which is associated with NI 206 of PD 202 and other end with NI 106 of CD 102, the presence of a PD can be determined by CD 102 when the link associated with the NI 106 of CD 102 indicates that it is connected to a neighbor device (i.e., link comes up). Another example is an embodiment wherein a CD can be configured using information associated with PD 202. CD 102 can be configured or provided with contact information associated with PD 202 using UI 126 of CD 102. The configuration event wherein the contact information associated with PD 202 is available can indicate the presence of a new PD. In other embodiments, the presence of a new PD can be detected using discovery mechanisms such as the ones used by Bluetooth technology. In yet other embodiments, the contact information associated with instances of PD 202 can be provided by a service. A service over the internet for example can provide contacts of a list of PD 202 instances. The method of communicating tags and/or messages between instances of CD 102 and PD 202 can also be specific to each embodiment. For example, tags and/or messages can be enclosed in Ethernet frames when an instance of CD 102 is connected to an instance of PD 202 using Ethernet. In yet other embodiment, tags and/or messages can also be provided using an embodiment independent mechanism. An example of such mechanism is UDP (User Datagram Protocol). When UDP is used to exchange tags and/or messages, each tag and/or message can be enclosed in a UDP datagram before sending the datagram. In some embodiments, the detection of instances of PD 202 can also be associated with determining the contact associated with the PD 202. If an instance of CD 102 is associated with an instance of PD 202 using Ethernet, the contact information of PD 202 can be provided to CD 202 in LLDP (Link Layer Discovery Protocol) messages. Other methods of determining contact associated with PD 202 instances can be used. The methods of detecting new instances of PD 202, the associated contact information of PD 202 instances, usage of multiple instances of NI 106, etc. described here are illustrative only and other methods can be used. Once CD 102 detects a new PD and determines contact associated with detected PD, the process can move to step 3306.

At step 3306, PI associated with the detected PD can be determined. The method of determining PI associated with the PD can be specific to each embodiment. In one embodiment, a GetProviderInfo message can be sent by the CD to the PD using the contact information associated with the PD that is determined in step 3306. In other embodiments, other mechanisms can be used. FIG. 34-36 illustrates among other aspects, the mechanism of determining PI associated with PD in different embodiments. The process can then move to step 3308.

Figure 39A:
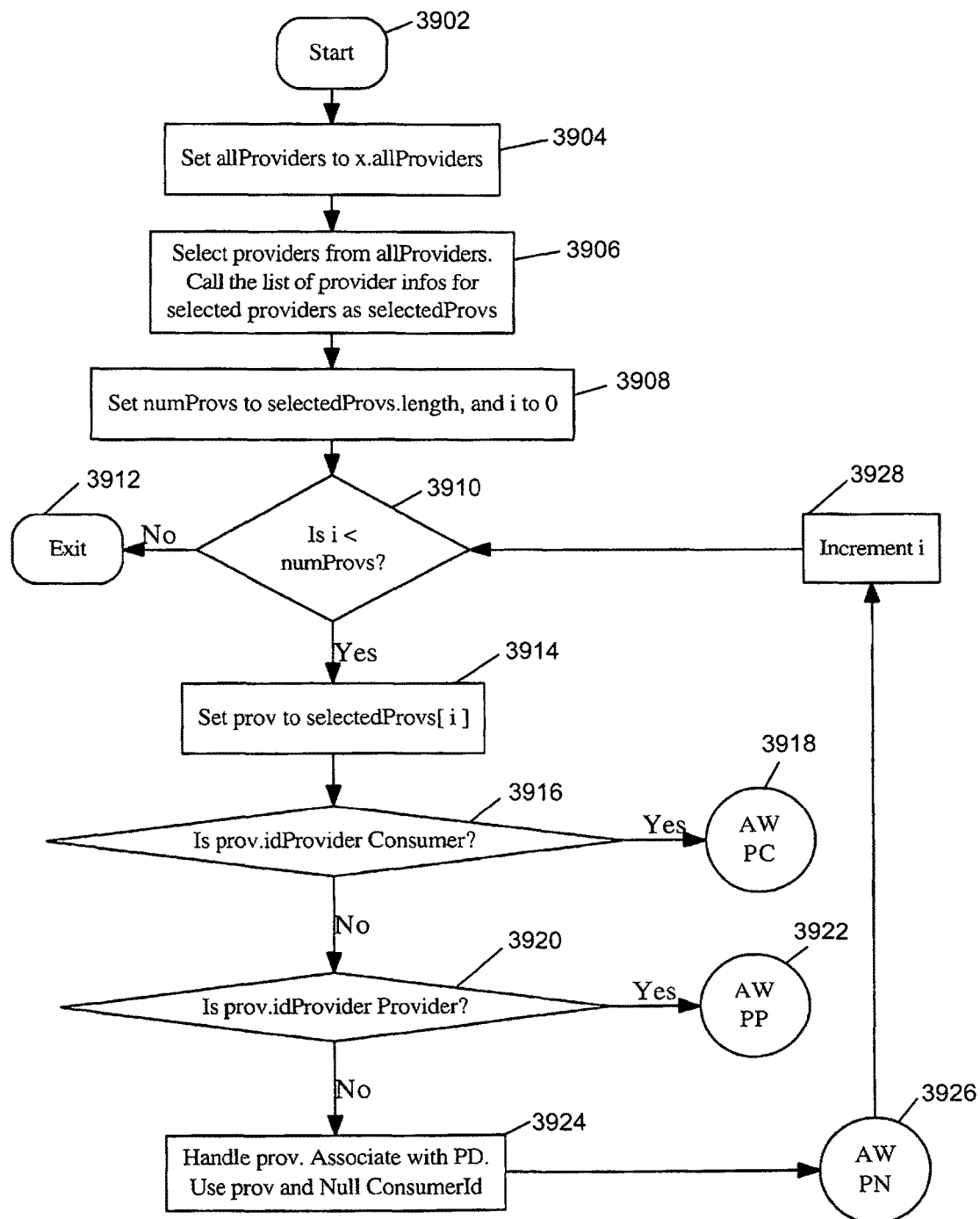
FIG. 39A-C illustrate the flow diagrams of a process followed by a CD in associating with a list of PDs according to an embodiment of the present invention.

At step 3308, the CD can associate with the PD. The association can be performed using the process illustrated in FIG. 39A-C. Instance 'x' can be provided to process of FIG. 39A. Instance 'x' can be associated with a 'allProviders' field. 'x.allProviders' indicates an array of PIs. PI determined in step 3306 can be copied to the first element of x.allProviders. The process illustrated in FIG. 33 can move to step 3310 once the process associated with FIG. 39A is complete. Step 3310 indicates that the process associated with FIG. 33 is complete.

FIG. 34 illustrates the flow diagram of a process followed by a CD in getting PI from a PD, when the CD is connected using physical means to the PD, according to an embodiment of the present invention. In one embodiment of invention an instance of PD 202 is physically connected using wires to an instance of CD 102. An example of such wiring is Ethernet. The physical wiring and associated technology can help in detecting the connection of a partner device. In Ethernet technology, this can be accomplished by a device if the link associated with the Ethernet interface on the device comes up. In other embodiments, an instance of CD 102 can be connected to an instance of PD 202 when CD 102 is "docked" to PD 202. An example of such docking can be implemented when NI 206 of PD 202 and NI 106 of CD 102 are implemented using USB such that CD 102 can be plugged into PD 202. A similar form of connectivity exists when a thumb drive is plugged into a laptop's USB port. In this embodiment, physical wires are not present, but a direct connection between PD 202 and CD 102 is established. Other methods of connecting CD 102 with PD 202 are possible.

The process starts at step 3402 and moves to step 3404. At step 3404, CD 102 sends a GetProviderInfo message to the PD that the CD is connected to. The method of associating the message to the PD can be specific to each embodiment. USB for example provides a mechanism to address messages to the connected partner device. The process can then move to step 3406. The sending of a GetProviderInfo message to PD 202 can result in PD 202 responding with a ProviderInfo message. CD 102 waits in step 3406 for the ProviderInfo message from the PD. Once the CD receives the ProviderInfo message from the PD, the info field associated with the received message can be used as the PI associated with the PD. The process can then move to step 3408. Step 3408 indicates that the process associated with FIG. 34 is complete.

FIG. 35 illustrates the flow diagram of a process followed by a CD in getting PI from a PD, when the CD is configured with information associated with the PD, according to an embodiment of the present invention. In some embodiments, an instance of CD 102 can be provisioned with information that can include contact associated with PD 202. An example of such an embodiment is when the CD 102 and PD 202 can communicate with each other using a network such as the Internet. In such embodiments, CD 102 can be configured with an IP address and port number associated with PD 202. CD 102 can also be configured with a DNS name of PD 202, while the port number can be implicit. In such embodiments, the presence of configuration information can indicate the presence of instances of PD 202 that the CD can associate with. The method of connectivity, the configuration information that are described here are illustrative only. Other forms of connectivity and configuration are possible. In some embodiments, CD 102 can be configured with information that can contain PI of PD 202. Other methods or configurations are possible.

The process starts at step 3502 and moves to step 3504. At step 3504, the CD can determine if PI associated with a PD 202 can be determined from the configured information. If the CD is provisioned with information from which PI associated with the PD can be determined, the process can move to step 3506. If not, the process can move to step 3508. At step 3506, PI associated with PD 202 can be determined from the provisioned information. The process can then move to step 3512.

Returning to step 3508, CD 102 can sends a GetProviderInfo message to the PD that the CD is configured with. The configuration in this case includes the contact associated with PD 202. In embodiments wherein IP address and port number of PD 202 are included in configuration, the IP address and port number from configuration can be used for the contact of PD 202. The sending of a GetProviderInfo message to PD 202 can result in PD 202 responding with a ProviderInfo message. CD 102 waits in step 3510 for the ProviderInfo message from the PD. Once the CD receives the ProviderInfo message from PD, the info field associated with the received message can be used as the PI associated with the PD. The process can then move to step 3512. Step 3512 indicates that the process associated with FIG. 35 is complete.

FIG. 36 illustrates the flow diagram of a process followed by a CD in determining the PDs and the PI associated with PDs, according to an embodiment of the present invention. In the embodiment of the invention described for this process, an instance of CD 102 can use a service to determine PIs associated with one or more instances of PD 202.

A service can be associated with instances of CD 102 to help determine a list of PDs. An example of such a service is a service that can be provided over the internet. An instance of CD 102 can provide information that can be used by the service to determine a list of PDs that can be associated with the provided information. The service can then provide the list of determined PDs to the CD. Information related to the PDs provided in the response to a request from an instance of CD 102 can include information such as the contact information of each PD. Other information included in the list can include PI associated with each PD. Other information can be included in the response list.

Information presented to the service by an instance of CD 102 can include a variety of information that can be specific to each embodiment. In one embodiment, CD 102 can provide a telephone number associated with a location or store or home or the like. that CD 102 wishes to determine the list of PD 202 instances for. The method of using telephone number to determine the list of PDs can have advantages in some embodiments. For example, a CD 102 instance can associate with PD 202 instances associated with a store, while the CD 102 is located remotely (not at the store). This can allow a method of associating with PD 202 instances at a store, by remote instances of CD 102, when the telephone number associated with the store is known to CD 102 (say by user input, or retrieved from "Contacts" list which can be maintained in STORE 118 of CD 102). The association with instances of PD 202 remotely, can help in running applications as determined using the tags provided by the instances of PD. The applications can be used to provide services to users of CD 102.

In other embodiment, CD 102 can provide an identifier that can be used to identify a list of PD 202 instances. The identifier and association of the identifier to a set of instances of PD 202 can be determined using mechanisms specific to each embodiment. In one embodiment, the identifier can be a 16 digit PIN determined for use with a home. The set of PD 202 instances at the home can be associated with this 16-digit PIN, by the service. In one embodiment, this can allow for determining the list of PDs associated with a home using an identifier that is not available to instances of CD 102 unless provided explicitly. The embodiment of using telephone number to determine the list of PDs is not preferred in some cases because any instance of CD 102 that is provided with the telephone number of a home can determine the list of PDs associated with the home. Using a 16-digit PIN can be used to limit the instances of CD 102 that can determine the list of PDs associated with the home. The identifier can be provided to instances of CD 102 using a variety of methods. In one embodiment, the identifier associated with a set of PD 202 instances can be provisioned on the CD 102 instance using UI 126. In other embodiment, the identifier can be provided using Bluetooth technology. In other embodiment, the identifier can be printed on a paper using a bar-code format which can be scanned by instances of CD 102 to determine the identifier. In other embodiments, the identifier associated with a location such as a store, home, etc. can be provided on wifi network(s). The identifier can also be provided as part of mechanisms that provide an IP address, such as DHCP. The methods of determining a list of PD 202 instances as described here is illustrative, for use in the embodiment described here and is not meant to be limiting the scope of invention or any of its embodiments. Other methods of providing the identifier are possible. Other forms of services are also possible. For example a service can be provided that is not accessed over the internet. An example of such a service includes a database system on an instance of CD 102 that can store information related to a list of PD 202 instances and provide information related to a list of PD 202 instances associated with a request. Another example of a service includes a database system over an intranet.

The process associated with FIG. 36 starts at step 3602 and moves to step 3604. At step 3604, an identifier associated can be determined. This determination can be specific to the embodiment. In embodiment where the identifier is provisioned using configuration information, the identifier can be retrieved from the configuration. Such configuration can be stored on STORE 118 of CD 102. This identifier is referred to as serviceId for use in subsequent steps of the process. The process can then move to step 3606.

At step 3606, a list of PI for the PDs associated with serviceId is determined. In the embodiment described here, the CD can use the process illustrated in FIG. 32 in determining a list of PIs for a list of PDs associated with the serviceId. Instance 'x' can be associated with a field serviceId. 'x.serviceId' can be set to the serviceId as determined in earlier steps of FIG. 32, for use by process of FIG. 32. The process associated with FIG. 36 can move to step 3608, once the process associated with FIG. 32 is complete. Step 3608 indicates that the process associated with FIG. 36 is complete.

Figure 37:
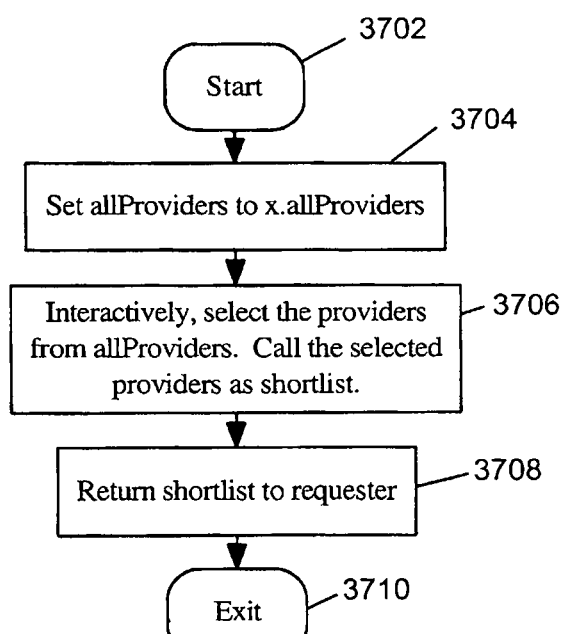
FIG. 37 illustrates the flow diagram of a process followed by a CD in selecting a list of PDs using an interactive method, according to an embodiment of the present invention.

FIG. 37 illustrates the flow diagram of a process followed by a CD in selecting a list of PDs using an interactive method, according to an embodiment of the present invention. In the embodiment described here, an instance of CD 102 can use the method illustrated in FIG. 37 to select a list of instances of PD 202 that the CD can associate with or receive tags from. An instance of CD 102 can detect a number of instances of PD 202 that can provide tags which can be used by CD 102. In some embodiments, the list of PD 202 instances that the CD 102 can receive tags from can be restricted to a subset of all the detected PDs. The subset of PDs that the instance of CD 102 can associate with and/or process tags from can be determined in an interactive fashion as described using the process illustrated in FIG. 37.

The process starts in step 3702 and moves to step 3704. The process is provided with instance 'x' that can be associated with allProviders. The values associated with instance 'x' can be provided by a process that uses the method illustrated by FIG. 37. At step 3704, a copy of x.allProviders is made and stored in allProviders for use in subsequent steps of the process. x.allProviders and allProviders are each a list of instances of PI. Each instance of PI associated with allProviders can be associated with an instance of PD 202 detected by CD 102. The process then moves to step 3706.

At step 3706, the list of PDs as indicated by allProviders can be presented on UI 126 of CD 102 using UIE 120. A user of CD 102 can select the list of PDs that the CD 102 can associate with and/or receive tags from using the UI 126. For example, a list of PDs can be provided on the UI 126 along with some information associated with each PD (that can be derived from PI associated with the PD or any other external means) to assist the user in the selection of PDs. Mechanisms such as placing most recently associated PD, most frequently used PD, etc. with a higher priority on the UI 126 can be used to help the user with selection of PDs. A user can choose to select one or more PDs that the CD can associate with/receive tags from. The user can also choose to not select any of the PDs presented on UI 126.

An example wherein a user can choose to select a subset of PDs is an embodiment wherein an instance of CD 102 detects more than one instance of PD 202. Each instance of PD 202 in this case is associated with a separate instance of GD 302. Each instance of GD 302 is again associated with separate television sets. Each instance of PD 202 is therefore associated with a separate television set. Each instance of PD 202 can be provisioned with the address, location, model number, etc. related to the television set that the PD is associated with. This information can be relayed in the PI of each PD (not shown). One of the instances of PD 202 can be related to a television owned by the user of CD 102, while the other instances of PD 202 can be related to televisions associated with the user's neighbors. In this embodiment, the user can choose to associate with the instance of PD 202 that is associated with the user's television set. The decision can be made by the user, using the information provided in UI 126. In this embodiment, the information presented via UI 126 can include an address, a model number, location that are associated with the PI of each PD 202.

Returning to step 3706, the user selects some or all or none of the PDs associated with the information provided via UI 126. The set of selected PDs is referred to as shortlist, for use in subsequent steps of the process. The process can then move to step 3708. If the process associated with FIG. 37 is used by other processes, then the shortlist as determined in step 3706 can be returned to the process that uses FIG. 37. The process in FIG. 37 can then move to step 3710. Step 3710 indicates that the process associated with FIG. 37 is complete.

Figure 38:
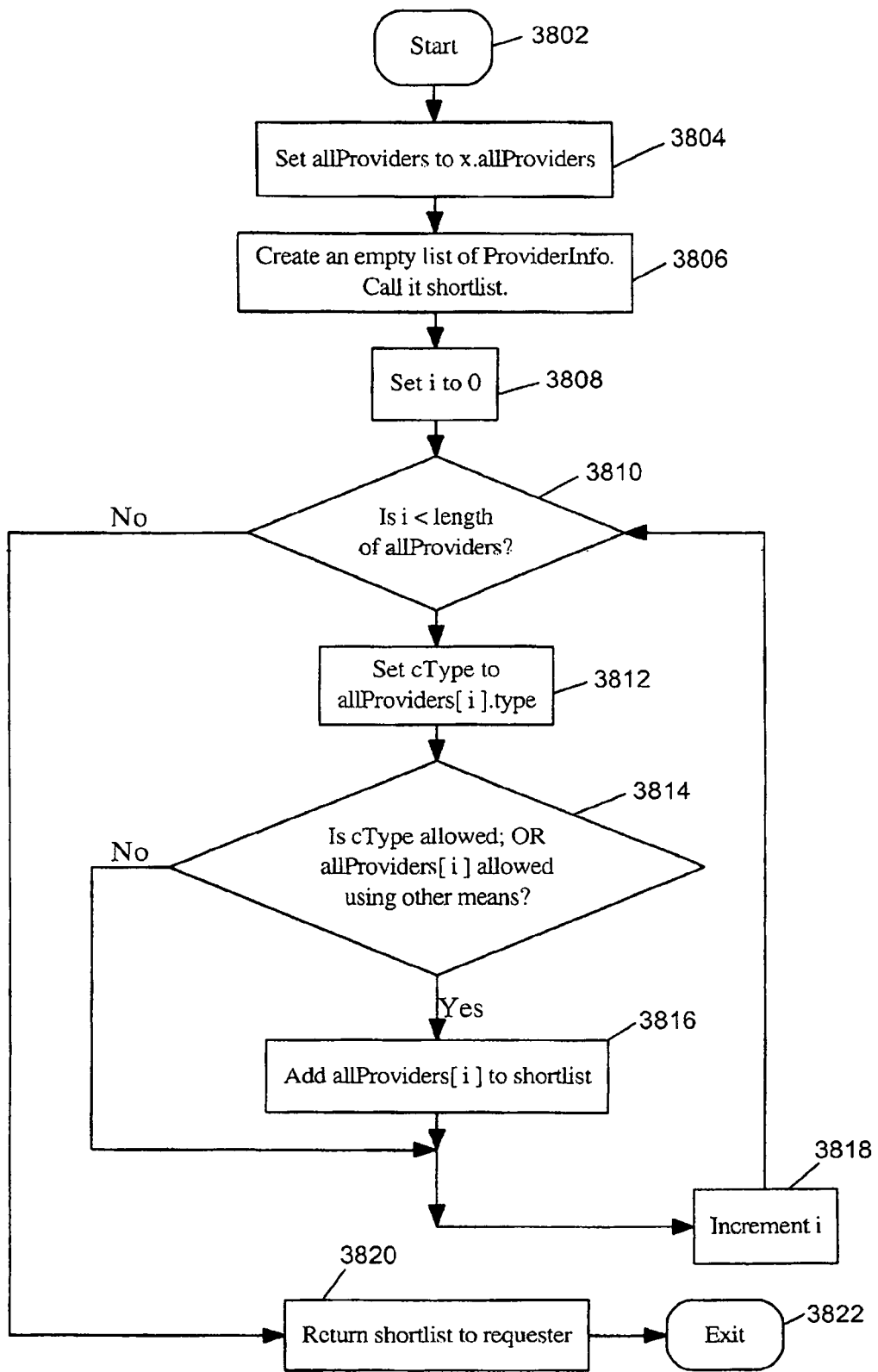
FIG. 38 illustrates the flow diagram of a process followed by a CD in selecting a list of PDs using a non-interactive method, according to an embodiment of the present invention.

FIG. 38 illustrates the flow diagram of a process followed by a CD in selecting a list of PDs using a non-interactive method, according to an embodiment of the present invention. In the embodiment described here, the process associated with FIG. 38 can be used by an instance of CD 102 in selecting instances of PD 202 from a list of determined instances of PD 202, in a non-interactive manner Instances of CD 102 can detect instances of PD 202 using a variety of mechanisms that can be specific to the embodiment. Once the list of instances of PD 202 is determined, a selection can be made to determine the list of PD 202 instances that the CD 102 can choose to associate with. For example, an instance of CD 102 can choose to not associate with instances of PD 202 that can provide tags associated with type Groceries. In other embodiments, an instance of CD 102 can choose to not associate with instances of PD 202 wherein the association type of tags generated by the PD is Broadcast. In embodiments wherein a CD 102 can detect a large number of instances of PD 202, it can be convenient to have CD 102 determine the list of PD 202 instances that it can associate with, in a non-interactive manner. In other embodiments, an instance of CD 102 can be detecting instances of PD 202 when the CD 102 is mobile. For example, a mobile phone (embodiment of CD 102) can be detecting PD 202 instances as the user carrying the mobile phone is walking in a mall or in a store. In such embodiments, user can choose to have the mobile phone in a mode whereby the mobile phone can choose to associate with some PD 202 instances in a non-interactive manner. The method of making decision to choose the PD 202 instance for association, the rules for making the decision (checking the type associated with tags, in the method described here) described here, is illustrative only. Other embodiments can choose to have rules not described here or can choose to exclude some or all of the rules described here. In some other embodiments, the methods for making the decision can be different from what is described here. The methods and/or rules illustrated in FIG. 38 is illustrative only and is not meant to be limiting the scope of the invention or any of its embodiments.

The process starts at step 3802 and moves to step 3804. The process is provided with instance 'x' that can be associated with allProviders field. The values associated with instance 'x' can be provided by a process that uses the method illustrated by FIG. 38. x.allProviders is an array of instances of PI. A local copy of x.allProviders is made in step 3804. The local copy is referred to as allProviders for use in subsequent steps of the process. The process can then move to step 3806.

At step 3806, an array of PI is created. The array does not hold any valid instances of PI upon creation. The array is referred to as shortlist for use in subsequent steps of the process. The creation of an array of PI instances can involve allocation of memory, control data structures, state handles, or the like. In some embodiments, the creation of a PI instance array can involve just allocation of memory. In yet other embodiments, the creation of a PI instance array can involve allocating state handles in addition to allocating sufficient memory for the PI instance array. The process can then move to step 3808. At step 3808, an i is set to 0. The process can then move to step 3810.

At step 3810, a check is made to determine if i is less than the lengths of allProviders array. If the check succeeds, the process can move to step 3812. If the check fails, the process can move to step 3820. At step 3820, the shortlist can contain the PI associated with instances of PD 202 that have been chosen for association with the CD. This shortlist can be provided to any process that uses FIG. 38 to determine the instances of PD 202. The process can then move to step 3822. Step 3822 indicates that the process associated with FIG. 38 is complete.

Returning to step 3812, a cType is set to the type field associated with i-th element of allProviders. The process can then move to step 3814. At step 3814, a check is made to determine if the CD can associate with the PD that is referred to by the PI stored at i-th element of allProviders. An instance of CD 102 can be configured or provided with a list of types that the CD 102 can use to determine the instances of PD 202 to associate with. If the type associated with the tag generated by a PD 202, is present in the list, the CD can choose to associate with the PD. This list can be provided to the CD via the UI 126 of CD 102. In other embodiments, the list of types can be hard coded in CD 102. In other embodiments, a configuration file stored in the STORE 118 of CD 102 can contain the list of types. The cType as determined at step 3812 can be compared with the list of types as known to CD 102 to see if cType is in the list. If cType is in the list, the process moves to step 3816. If not, the process can move to step 3818. At step 3818, i is incremented. The process can then move to step 3810. Returning to step 3816, the PI associated with i-th element of allProviders can be added to the shortlist. The process can then move to step 3818.

It can be noted that at step 3814, the CD 102 has chosen to include PD 202 for association (by adding the PI to shortlist) if the type associated with tags provided by PD 202 is present in the list of types maintained by CD 102. In other embodiments, the CD can choose to not associate with a PD 202 that can provide a tag of type that is present in the list maintained by the CD. In other embodiments, each type in the list of types maintained by CD can be associated with an "accept" or "deny" value. A value of "accept" associated with a type present in the list of types maintained by CD can specify that the CD can accept association with a PD that can provide tags of this type. A value of "deny" associated with a type present in the list of types maintained by CD can specify that the CD can not accept association with a PD that can provide tags of this type. The use of types associated with tags to determine if a PD can be associated with the CD, is specific to the method illustrated here. Other methods can choose to use other mechanisms that can include one or more of, using the location of PD 202 device, using the location of CD 102 device, using the contact associated with PD 202 device, or the like. Other values that can be associated with PD 202 and/or CD 102 devices not described here can be used. Other values and/or methods and/or rules not described here can be used as well. The set of values and the methods described here are illustrative only and is not meant to be limiting the scope of the invention or any of its embodiments.

Figure 39B:
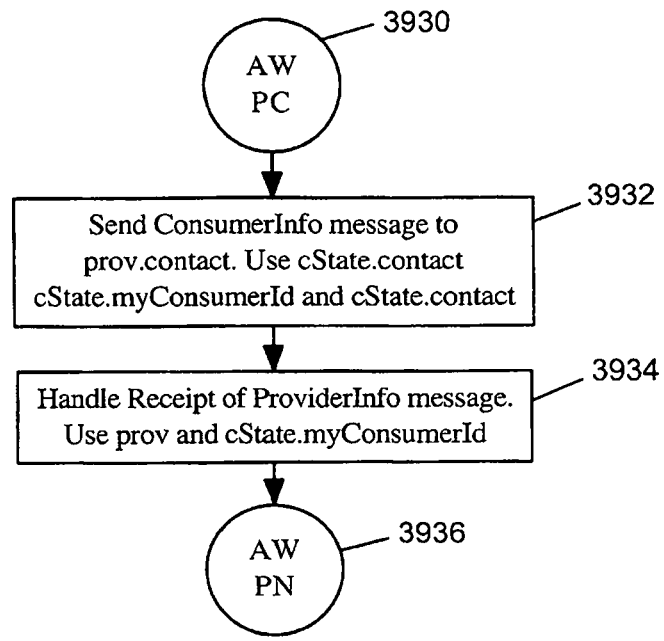
Figure 39C:
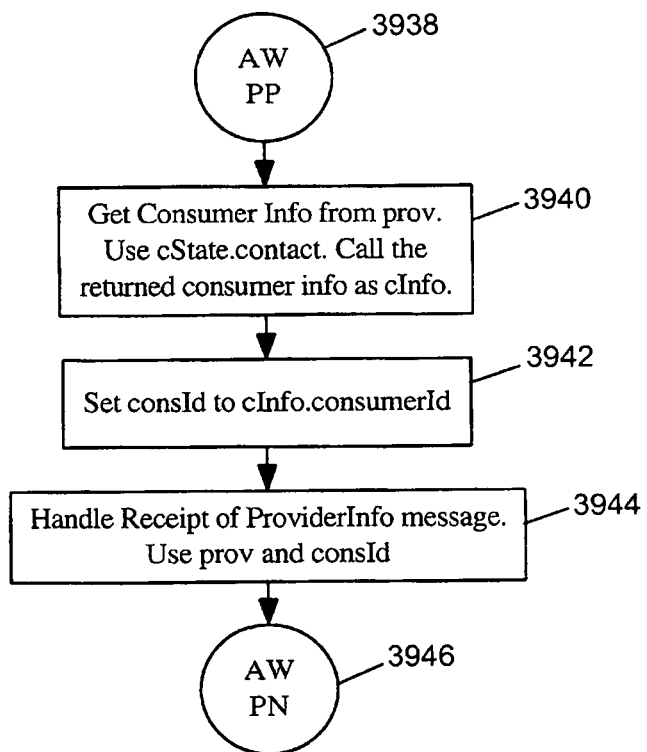

FIG. 39A-C illustrate the flow diagrams of a process followed by a CD in associating with a list of PDs according to an embodiment of the present invention. In the embodiment of the invention described here, the process can be used by an instance of CD 102 in associating with instances of PD 202. The instances of PD 202 can be detected by CD 102 in some embodiments. The process can be provided with a list of PI instances associated with instances of PD 202. The process can first select a set of PD 202 instances. After the selection, the CD can start associating with one instance of PD 202 followed by another, from the list of selected PD instances. In embodiments where the assocType of tag provided by an instance of PD 202 is Multicast, the identifier associated with CD 102 when it is associated with the PD (that can provide tags of association type Multicast) can be provided by the PD. In other embodiments, the CD 102 can choose the identifier for the CD 102 when it is associated with the PD. In some embodiments, the CD 102 can send a CI to the PD 202 that it is associating with. In some embodiments, the CD 102 does not send a CI to PD 202. An example of such embodiments is when the association type associated with a tag is of Broadcast. In such embodiments, instances of PD 202 can, not maintain a list of CI in pState. The method of association between CD 102 and instances of PD 202 described here is illustrative only. Other embodiments can choose to have other methods of association, and the method described here is not meant to limit the scope of the invention or any of its embodiments.

The process starts at step 3902 and moves to step 3904. The process is provided with instance 'x' that can be associated with allProviders field. The values associated with instance 'x' can be provided by a process that uses the method illustrated by FIG. 39A-C. x.allProviders is an array of instances of PI. A local copy of x.allProviders is made in step 3904. The local copy is referred to as allProviders for use in subsequent steps of the process. The process can then move to step 3906.

At step 3906, a list of instances of PI from allProviders is selected. The selection can be done to determine the list of instances of PD 202 that the CD can associate with. The list/array of selected PIs is referred to as selectedProvs for use in subsequent steps of the process. The CD can associate with instances of PD 202 that are referred to by instances of PI in selectedProvs list. The selection can be done in a variety of ways. In some embodiments, the selection can be done in an interactive manner Information related to PD 202, extracted from allProviders can be presented to the user using UI 126. The user can select the list of PD 202 instances to associate with. In some embodiments, the process associated with FIG. 37 can be used to determine the selectedProvs list. The selection can also be done in a non-interactive manner. In some embodiments, the process associated with FIG. 38 can be used to determine the selectedProvs list. Other methods not described here can be used to determine the selectedProvs list. The process can then move to step 3908. At step 3908, numProvs is set to the number of valid PI instances in selectedProvs, and i is set to 0. The process can then move to step 3910.

At step 3910, a check is made to determine if i is less than numProvs. If the check succeeds, the process can move to step 3914. If the check fails, the process can move to step 3912. Step 3912 indicates that the process associated with FIG. 39 is complete. Returning to step 3914, a prov is set to i-th element of selectedProvs. The process can then move to step 3916. At step 3916, the idProvider field of prov is checked to see if it indicates Consumer. The idProvider field can be associated with one of the values described in FIG. 12. if the check succeeds, the process can move to step 3918. If the check fails, the process can move to step 3920. Step 3918 indicates that the process can move to step 3930 associated with FIG. 39B. Returning to step 3916, a value of Consumer for idProvider field of prov can indicate that the identifier for CD 102 when it is associated with the PD represented by prov, can be determined by the CD.

Returning to step 3920, a check is made to determine if the idProvider field associated with prov indicates a value of Provider. If the check succeeds, the process can move to step 3922. If the check fails, the process can move to step 3924. Step 3922 indicates that the process can move to step 3938 of FIG. 39C. Returning to the check of step 3920, a value of Provider for idProvider field of prov can indicate that the identifier for CD 102 when it is associated with the PD referred to by prov, is provided by the PD. This can be used in embodiments where the association type for the tag provided by the PD is Multicast. For tags of association type Multicast, a group of CD 102 instances can be identified by a single identifier.

At step 3924, the CD 102 can associate with the PD 202 referred to by prov. In some embodiments, the process illustrated by FIG. 29 can be used to update cState associated with the CD. Instance 'x' can be provided to process of FIG. 29. Instance 'x' can be associated with a prov field and consId field. x.prov can be set to the prov and x.consId can be set to a Null value before initiating the process of FIG. 29. The process can then move to step 3926. Step 3926 indicates that the process can move to step 3928. At step 3928, i is incremented. The process can then move to step 3910.

Referring to step 3930 of FIG. 39B, step 3930 indicates that the process can move to step 3932. At step 3932, CD 102 can send a ConsumerInfo message to the PD 202 associated with prov. In some embodiments, the process associated with FIG. 24 can be used to send the message. Instance 'x' can be provided to process of FIG. 24. Instance 'x' can be associated with fields destContact, senderContact, consId and consContact. x.destContact can be set to contact associated with i-th element of selectedProvs, x.senderContact can be set to cState.contact, x.consId can be set to cState.myConsumerId, and x.consContact can be set to cState.contact before the process associated with FIG. 24 can be initiated. The process can move to step 3934, after the process associated with FIG. 24 is complete.

At step 3934, cState of CD 102 can then be updated. The process illustrated by FIG. 29 can be used to update cState associated with the CD. Instance 'x' can be provided to process of FIG. 29. Instance 'x' can be associated with a prov field and consId field. x.prov can be set to the prov and x.consId can be set to a cState.myConsumerId value before initiating the process of FIG. 29. The process associated with FIG. 39A-C can move to step 3936, after the process associated with FIG. 29 is complete. Step 3936 indicates that the process can move to step 3926 of FIG. 39A.

Referring to step 3938 of FIG. 39C, step 3938 indicates that the process can move to step 3940. At step 3940, CD 102 can get an instance of CI from the PD referred to by prov. The instance of CI provided by the PD can include information related to the identifier that the CD 102 can use for association with the PD 202. In some embodiments of the invention, the process associated with FIG. 22 can be used to request CI from the PD. Instance 'x' can be provided to process of FIG. 22. Instance 'x' can be associated with provContact and senderContact fields. x.provContact can be set to prov.contact and x.senderContact can be set to cState. contact before initiating the process illustrated in FIG. 22. The process associated with FIG. 39A-C can return to step 3942 after process associated with FIG. 22 is complete. The value returned by FIG. 22 can be referred to as cInfo. cInfo is an instance of CI. At step 3942, consId is set to cInfo. consumerId. consId is the identifier for CD 102 as provided by the PD that the CD is associating with. The process can then move to step 3944.

At step 3944, cState of CD 102 can then be updated. The process illustrated by FIG. 29 can be used to update cState associated with the CD. Instance 'x' can be provided to process of FIG. 29. Instance 'x' can be associated with a prov field and consId field. x.prov can be set to the prov and x.consId can be set to a consId value before initiating the process of FIG. 29. The process associated with FIG. 39A-C can move to step 3946 after the process associated with FIG. 29 is complete. Step 3946 indicates that the process can move to step 3926 of FIG. 39A.

Figure 40A:
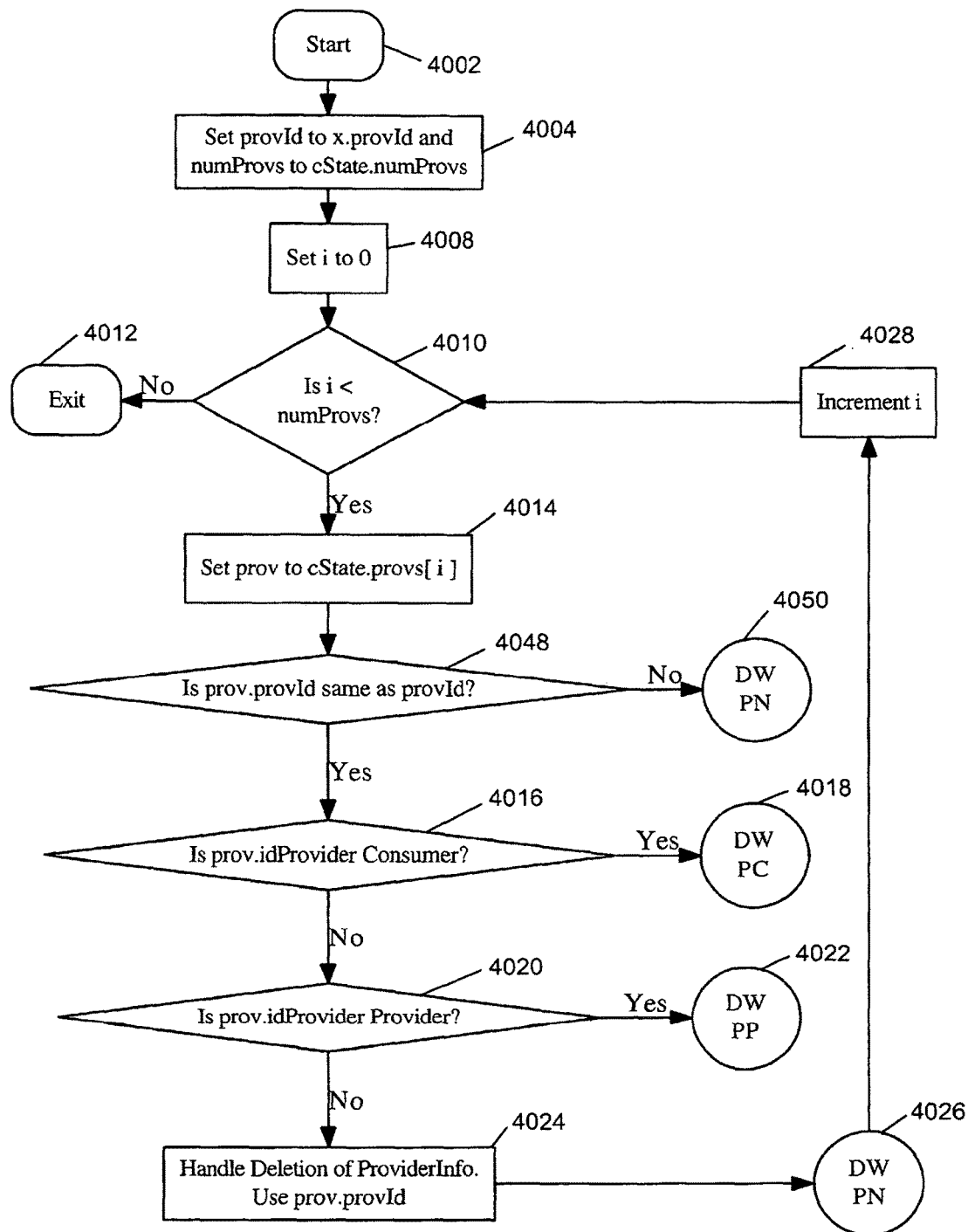
FIG. 40A-C illustrate the flow diagram of a process followed by a CD in disassociating with a PD according to an embodiment of the present invention.
Figure 40B:
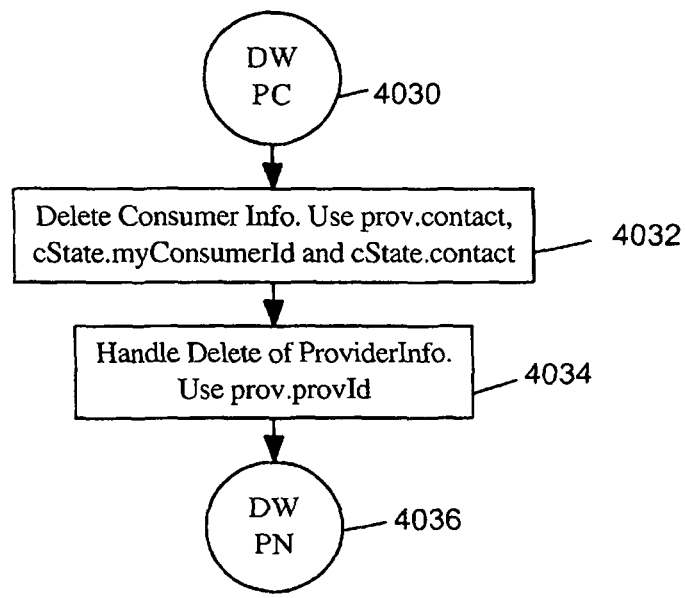
Figure 40C:
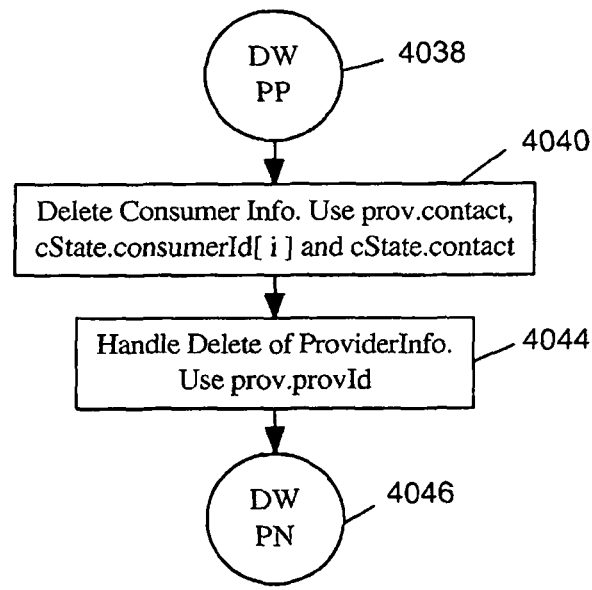

FIG. 40A-C illustrate the flow diagrams of a process followed by a CD in disassociating with a PD according to an embodiment of the present invention. In the embodiment of the invention described here, the process can be used by an instance of CD 102 in disassociating with an instance of PD 202. The disassociation can be initiated by an instance of CD 102 due to reasons that can be specific to the embodiment. In one embodiment, the disassociation can be initiated because of an event that can involve user interaction via UI 126. A user of CD 102 can request using UI 126, that CD 102 stop communicating with an instance of PD 202. This can happen in embodiments where CD 102 can be capable of presenting information on UI 126 related to instances of PD 202 that the CD is associated with. In other embodiments, an instance of CD 102 can initiate disassociation due to events that can be non-interactive in nature. An example of such event can include reaching usage limits on CD 102. For example, each instance of CD 102 can be limited in the amount of information exchanged using NI 106 on a monthly basis. This can be due to limits that can be put by a service provider. For example, the amount of data that can be downloaded by an iPhone can be limited to 2 GBytes by AT&T which provides data service to iPhone. In such embodiments, an instance of CD 102 can stop using NI 106 for exchanging messages, receiving tags, or downloading applications in context of this invention or its embodiments, when the monthly usage reaches some threshold level (say, 1.8 GB in case of the iPhone example illustrated above). Other events not described here can also result in an instance of CD 102 initiating disassociation with one or more instances of PD 202. The events that can trigger disassociation of CD 102 with an instance of PD 202 can be different from events that can trigger disassociation of the CD with other instances of PD 202. The events that trigger the association, the method of disassociation described here are illustrative only. Other embodiments can choose to use other methods not described here for disassociating with instances of PD 202. Other embodiments can also trigger disassociation due to events not described here. The method and events described here are not meant to be limiting the scope of the invention or any of its embodiments.

The process starts at step 4002 and moves to step 4004. The process is provided with instance 'x' that can be associated with provId field. The values associated with instance 'x' can be provided by a process that uses the method illustrated by FIG. 40A-C. x.provId is an identifier associated with instance of PD 202 that the CD chooses to disassociate with. A local copy of x.provId is made in step 4004. The local copy is referred to as provId for use in subsequent steps of the process. At step 4004, numProvs is set to cState.numProvs. The process can then move to step 4008. At step 4008, i is set to 0. The process can then move to step 4010.

At step 4010, a check is made to determine if i is less than numProvs. If the check succeeds, the process can move to step 4014. If the check fails, the process can move to step 4012. Step 4012 indicates that the process associated with FIG. 40 is complete. Returning to step 4014, a prov is set to i-th element of cState.provs. The process can then move to step 4048. At step 4048 a check is made to determine if the provId as determined in step 4004 is same as the provId field of prov. If the check succeeds the process can move to step 4016. If the check fails the process can move to step 4050. Step 4050 indicates that the process can move to step 4026. Returning to step 4048, the check associated with this step can be used to determine if the i-th element of cState.provs is an instance of PI that can refer to PD 202 that the CD is disassociating with. This can be determined by a matching provId.

At step 4016, the idProvider field of prov is checked to see if it indicates Consumer. The idProvider field can be associated with one of the values described in FIG. 12. if the check succeeds, the process can move to step 4018. If the check fails, the process can move to step 4020. Step 4018 indicates that the process can move to step 4030 associated with FIG. 40B. Returning to step 4016, a value of Consumer for idProvider field of prov can indicate that the identifier for CD 102 when it is associated with the PD represented by prov, can be determined by the CD.

Returning to step 4020, a check is made to determine if the idProvider field associated with prov indicates a value of Provider. If the check succeeds, the process can move to step 4022. If the check fails, the process can move to step 4024. Step 4022 indicates that the process can move to step 4038 of FIG. 40C. Returning to the check of step 4020, a value of Provider for idProvider field of prov can indicate that the identifier for CD 102 when it is associated with the PD referred to by prov, is provided by the PD. This can be used in embodiments where the association type for the tag provided by the PD is Multicast. For tags of association type Multicast, a group of CD 102 instances can be identified by a single identifier.

At step 4024, the CD 102 can disassociate with the PD 202 referred to by prov. In some embodiments, the process illustrated by FIG. 30 can be used to update cState associated with the CD. Instance 'x' can be provided to process of FIG. 30. Instance 'x' can be associated with a provId field. x.provId can be set to the prov.provId before initiating the process of FIG. 30. The process can then move to step 4026 after the process associated with FIG. 30 is complete. Step 4026 indicates that the process can move to step 4028. At step 4028, i is incremented. The process can then move to step 4010.

Referring to step 4030 of FIG. 40B, step 4030 indicates that the process can move to step 4032. At step 4032, CD 102 can send a DeleteConsumerInfo message to the PD 202 associated with prov. In some embodiments, the process associated with FIG. 23 can be used to send the message.

Instance 'x' can be provided to process of FIG. 23. Instance 'x' can be associated with fields provContact, consumerId, and senderContact. x.provContact can be set to contact associated with prov, x.senderContact can be set to cState.contact, x.consumerId can be set to cState.myConsumerId before the process associated with FIG. 23 can be initiated. The process can move to step 4034, after the process associated with FIG. 23 is complete.

At step 4034, cState of CD 102 can then be updated. The process illustrated by FIG. 30 can be used to update cState associated with the CD. Instance 'x' can be provided to process of FIG. 30. Instance 'x' can be associated with a provId field. x.provId can be set to the prov.provId before initiating the process of FIG. 30. The process associated with FIG. 40A-C can move to step 4036, after the process associated with FIG. 30 is complete. Step 4036 indicates that the process can move to step 4026 of FIG. 40A.

Referring to step 4038 of FIG. 40C, step 4038 indicates that the process can move to step 4040. At step 4040, CD 102 can send a DeleteConsumerInfo message to the PD 202 associated with prov. In some embodiments, the process associated with FIG. 23 can be used to send the message. Instance 'x' can be provided to process of FIG. 23. Instance 'x' can be associated with fields provContact, consumerId, and senderContact. x.provContact can be set to contact associated with prov, x.senderContact can be set to cState.contact, x.consumerId can be set to i-th element of cState.consumerId array, before the process associated with FIG. 23 can be initiated. The process can move to step 4044, after the process associated with FIG. 23 is complete.

At step 4044, cState of CD 102 can then be updated. The process illustrated by FIG. 30 can be used to update cState associated with the CD. Instance 'x' can be provided to process of FIG. 30. Instance 'x' can be associated with a provId field. x.provId can be set to the prov.provId before initiating the process of FIG. 30. The process associated with FIG. 40A-C can move to step 4046 after the process associated with FIG. 30 is complete. Step 4046 indicates that the process can move to step 4026 of FIG. 40A.

Figure 41:
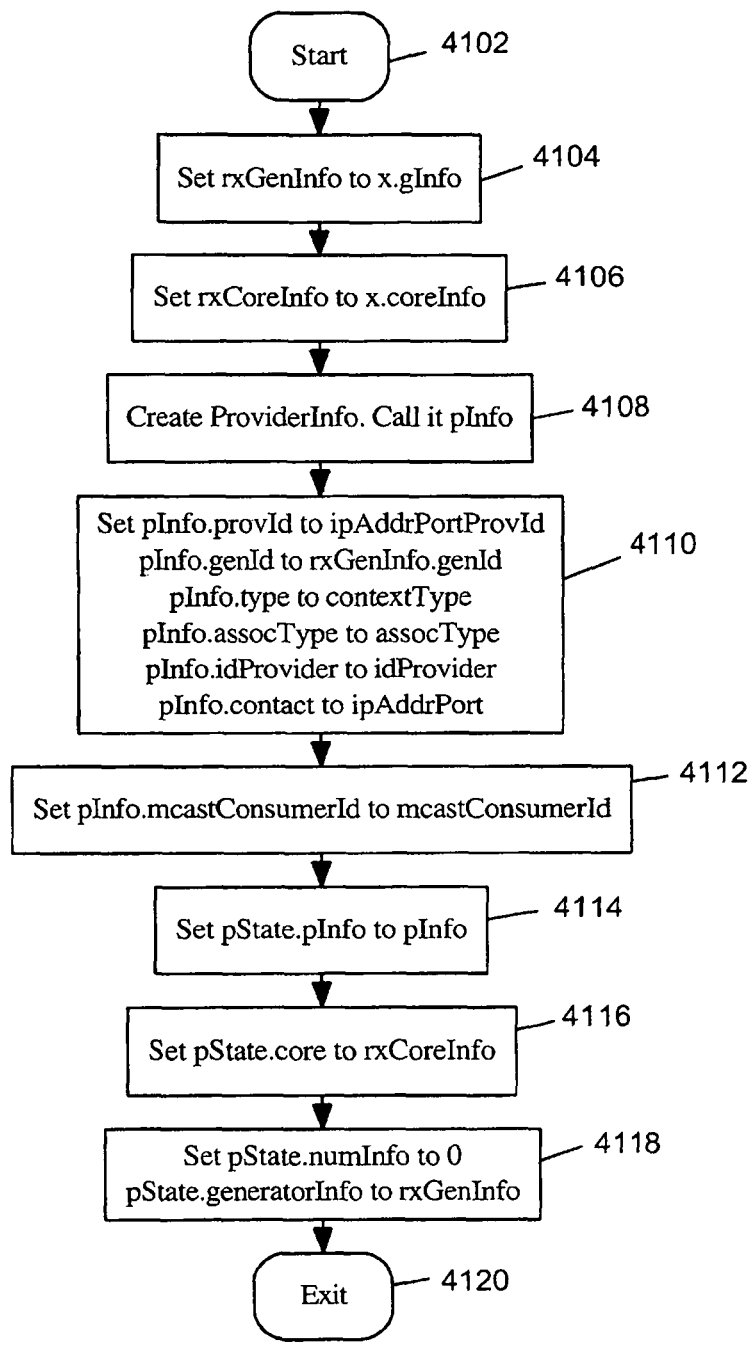
FIG. 41 illustrates the flow diagram of a process followed by a PD in initializing part of the state (ProviderState-pState) maintained by the PD according to an embodiment of the present invention.

FIG. 41 illustrates the flow diagram of a process followed by a PD in initializing part of the state (ProviderState—pState) maintained by the PD according to an embodiment of the present invention. In the embodiment described here, an instance of PD 202 can use the process described in FIG. 41 to initialize some of pState maintained by the PD, when PD 202 associates with an instance of GD 302. In the embodiment described here, the process associated with FIG. 41 can be used after PD 202 chooses to associate with a GD 302, and before PD starts processing the tags generated by the GD. In the embodiment described here, an instance of PD 202 can be associated with only one GD 302 at any time. pState associated with PD 202 can be stored in STATE 214 of PD 202. Other embodiments can maintain/update state beyond what is indicated in FIG. 41. Other embodiments can also choose to perform actions or process not indicated in FIG. 41. The process associated with FIG. 41 is illustrative only, meant for use by the embodiment described here, and is not meant to be limiting the scope of the invention or any of its embodiments.

Figure 59:
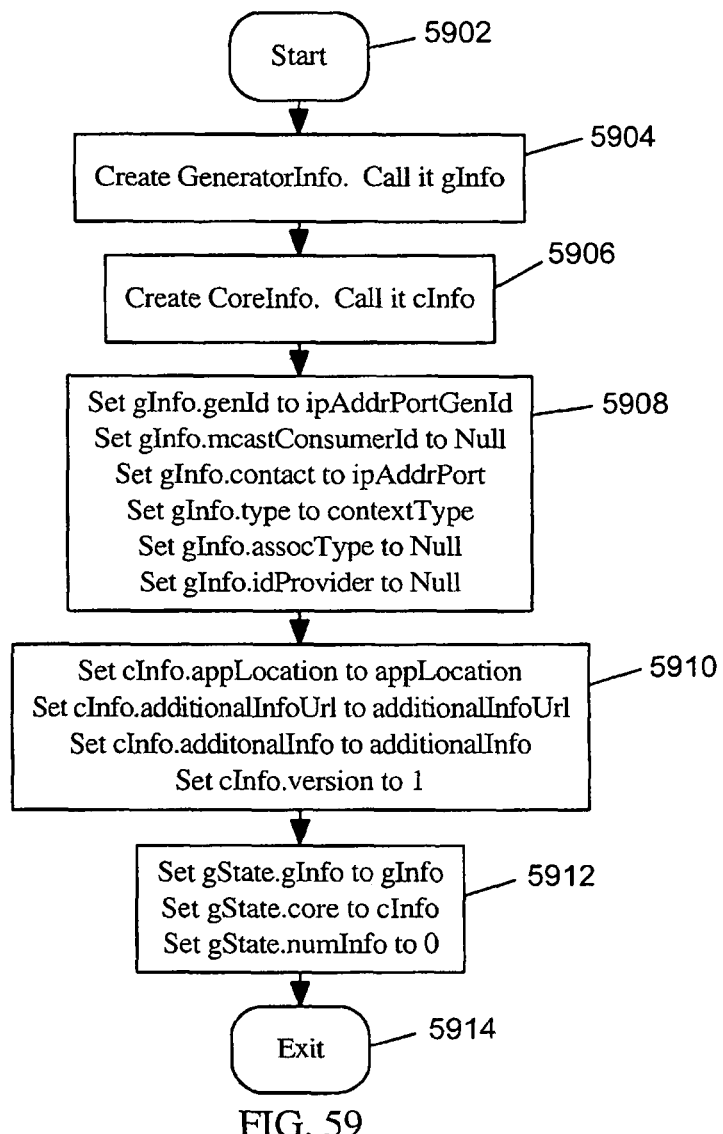
FIG. 59 illustrates the flow diagram of a process followed by a GD in initializing part of state (gState) maintained by the GD according to an embodiment of the present invention.

In the embodiment described here, an instance of PD 202 can use the process illustrated in FIG. 41 to initialize part of pState, in combination with an instance of GD 302 that can use the process illustrated in FIG. 59 to initialize part of gState associated with the GD. In the embodiment described here, a yet another method of initializing part of state associated with pState and/or gState can be used. An instance of PD 202 can use the process illustrated in FIG. 42 to initialize part of pState, in combination with an instance of GD 302 that can use the process illustrated in FIG. 60 to initialize part of gState associated with the GD.

The process illustrated in FIG. 41 starts at step 4102 and moves to step 4104. The process is provided with instance 'x' that can be associated with fields gInfo and coreInfo. The values associated with instance 'x' can be provided by a process that uses the method illustrated by FIG. 41. x.gInfo can be associated with an instance of GI, while x.coreInfo can be associated with an instance of CRI. At step 4104, a local copy of x.gInfo is made, and the local copy is referred to as rxGenInfo for use in subsequent steps of the process. The process can then move to step 4106. At step 4106, a local copy of x.coreInfo is made, and the local copy is referred to as rxCoreInfo for use in subsequent steps of the process. The process then moves to step 4108. At step 4108, an instance of PI is created. The creation of an instance of PI can involve allocation of memory, control data structures, state handles, or the like. In some embodiments, the creation of a PI can involve just allocation of memory. In yet other embodiments, the creation of a PI can involve allocating state handles in addition to allocating sufficient memory for the PI. The instance of PI created is referred to as pInfo. The process can then move to step 4110.

At step 4110, pInfo.provId is set to ipAddrPortProvId. pInfo.provId is an identifier that can be used to identify an instance of PD 202 among all PDs. In the embodiment of the present invention described here, the communication between the PD and GD happens using messages sent using UDP. In such embodiment, pInfo.provId can be set to a combination of the IP address and port number associated with the UDP port. The IP address and port number can be the IP address and port number of UDP port associated with PD 202. An ipAddrPortProvId can be determined by multiplying the IP address with 65536 and adding portId to the resulting value. The method of determining ipAddrPortProvId described here is illustrative only. Other methods can be used to determine pInfo.provId. Methods specific to the embodiments can also be used.

At step 4110, pInfo.type can be set to a type associated with the tags that PD 202 can provide to instances of CD 102. In the embodiment described here, pInfo.type is set to MultiType at step 4110. In an embodiment wherein PD 202 is constructed to provide tags of only a given type, the pInfo.type can be set to that type. An example of such embodiment is a PD that always provides tags of type Groceries. In such embodiments, pInfo.type can be set to Groceries. pInfo.type can be set to different values based on the embodiment. In other embodiments, the tag provided by the PD 202 can be programmable. In such case, the type determined based on programmed values can be used to determine pInfo.type. The methods of determining the type described here is illustrative only. Other methods of determining the type of tags provided by PD 202 are possible.

At step 4110, pInfo.assocType can be set to one of the values related to association type as illustrated in FIG. 9. In the embodiment described here, pInfo.assocType can be set to Broadcast. In other embodiments other values of association type can be used to set pInfo.assocType. At step 4110, pInfo.idProvider can be set to one of the values related to ID provider as illustrated in FIG. 12. In the embodiment described here, pInfo.idProvider can be set to None. At step 4110, pInfo.contact can be set to information that can be used to send messages to the PD that is associated with the pInfo. In the embodiment described here, pInfo.contact can be set to a combination of IP address and port number that the PD uses to communicate messages with instances of CD 102 and GD 302.

At step 4110, pInfo.genId can be set to rxGenInfo.genId. pInfo.genId is an identifier that can be associated with GD 302 that the instance of GI rxGenInfo is associated with. The process can then move to step 4112.

At step 4112, pInfo.mcastConsumerId can be set to the mcastConsumerId associated with the embodiment. In the embodiment described here, mcastConsumerId is Null. pInfo.mcastConsumerId can be used in embodiment wherein pInfo.assocType can be set to Multicast. The process can then move to step 4114.

At step 4114, pState.pInfo is set to pInfo determined in earlier steps of the process. The process can then move to step 4116. At step 4116, pState.core is set to rxCoreInfo. The process can then move to step 4118. At step 4118, pState.generatorInfo is set to rxGenInfo. pState numInfo is set to 0, which can indicate that the PD is not associated with any instances of CD 102, while the PD is at step 4118. The process can then move to step 4120. Step 4120 indicates that the process associated with FIG. 41 is complete.

Figure 42:
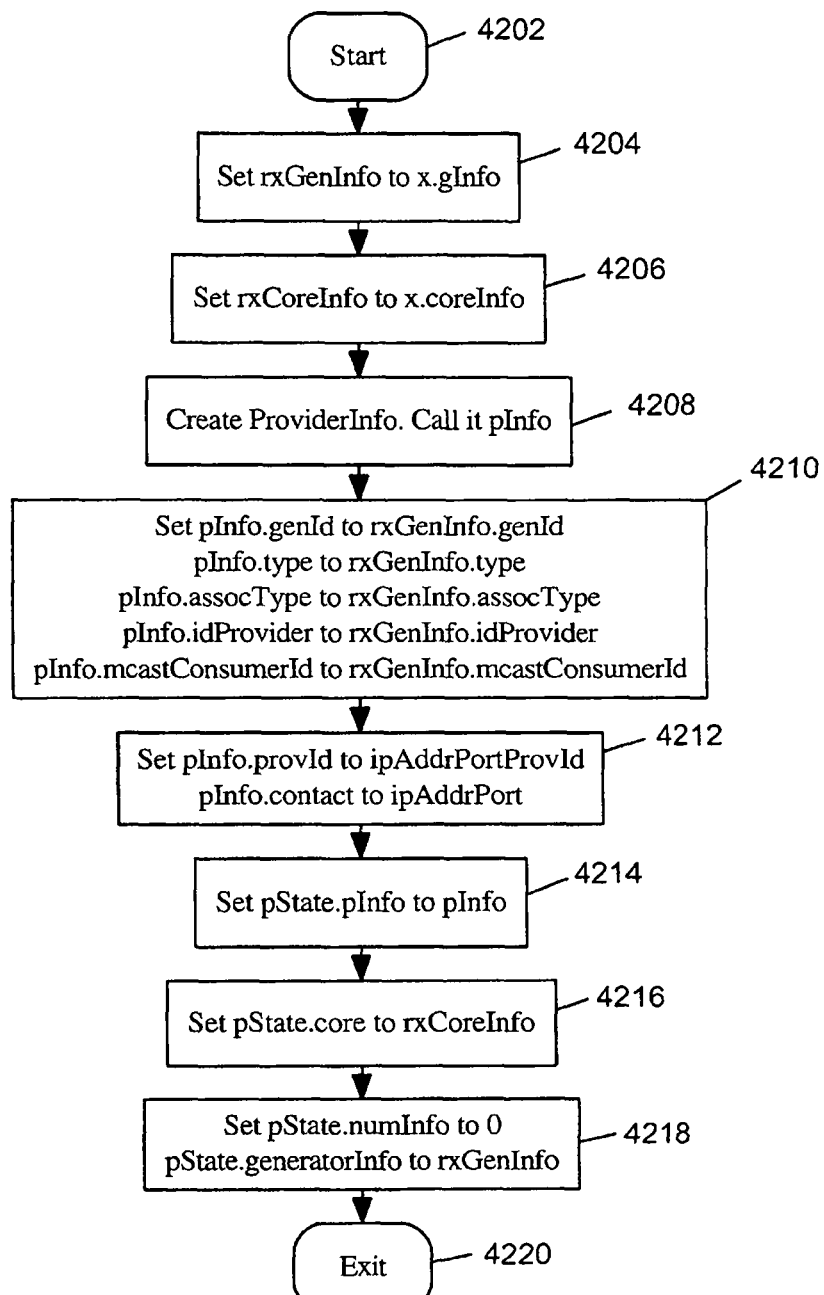
FIG. 42 illustrates the flow diagram of a process followed by a PD in initializing part of pState maintained by the PD according to a yet another embodiment of the present invention.

FIG. 42 illustrates the flow diagram of a process followed by a PD in initializing part of the state (ProviderState—pState) maintained by the PD according to a yet another embodiment of the present invention. In the embodiment described here, an instance of PD 202 can use the process described in FIG. 42 to initialize some of pState maintained by the PD, when PD 202 associates with an instance of GD 302. In the embodiment described here, the process associated with FIG. 42 can be used after PD 202 chooses to associate with a GD 302, and before PD starts processing the tags generated by the GD. In the embodiment described here, an instance of PD 202 can be associated with only one GD 302 at any time. pState associated with PD 202 can be stored in STATE 214 of PD 202. Other embodiments can maintain/update state beyond what is indicated in FIG. 42. Other embodiments can also choose to perform actions or process not indicated in FIG. 42. The process associated with FIG. 42 is illustrative only, meant for use by the embodiment described here, and is not meant to be limiting the scope of the invention or any of its embodiments.

In the embodiment described here, an instance of PD 202 can use the process illustrated in FIG. 42 to initialize part of pState, in combination with an instance of GD 302 that can use the process illustrated in FIG. 132 to initialize part of gState associated with the GD.

The process illustrated in FIG. 42 starts at step 4202 and moves to step 4204. The process is provided with instance 'x' that can be associated with fields gInfo and coreInfo. The values associated with instance 'x' can be provided by a process that uses the method illustrated by FIG. 42. x.gInfo can be associated with an instance of GI, while x.coreInfo can be associated with an instance of CRI. At step 4204, a local copy of x.gInfo is made, and the local copy is referred to as rxGenInfo for use in subsequent steps of the process. The process can then move to step 4206. At step 4206, a local copy of x.coreInfo is made, and the local copy is referred to as rxCoreInfo for use in subsequent steps of the process. The process then moves to step 4208. At step 4208, an instance of PI is created. The creation of an instance of PI can involve allocation of memory, control data structures, state handles, or the like. In some embodiments, the creation of a PI can involve just allocation of memory. In yet other embodiments, the creation of a PI can involve allocating state handles in addition to allocating sufficient memory for the PI. The instance of PI created is referred to as pInfo. The process can then move to step 4210.

The process associated with FIG. 42 differs from process associated with FIG. 41 in that some of the values used to initialize part of pState can be determined using rxGenInfo in process associated with FIG. 42. The values used to initialize pInfo.type, pInfo.assocType, pInfo.idProvider and pInfo.mcastConsumerId can be determined using values associated with rxGenInfo, in the process of FIG. 42. The values for these fields in process of FIG. 41 are determined without using the values from rxGenInfo (Compare steps 4110/4112 with steps 4210/4212).

At step 4210, pInfo.genId is set to rxGenInfo.genId, pInfo.type to rxGenInfo.type, pInfo.assocType to rxGenInfo.assocType, pInfo.idProvider to rxGenInfo.idProvider, and pInfo.mcastConsumerId to rxGenInfo.mcastConsumerId. In some embodiments, the method of determining values for pState using values provided by GI can help in PD associating with more than one class of GD 302 devices. For example, a PD 202 using the process of FIG. 42 can be used to associate with an instance of GD 302 that can provide tags of type MultiType. The same PD can also be used to associate with an instance of GD 302 that can provide tags of type Feedback. Other advantages are also possible. The process can then move to step 4212.

At step 4212, pInfo.provId is set to ipAddrPortProvId. pInfo.provId is an identifier that can be used to identify an instance of PD 202 among all PDs. In the embodiment of the present invention described here, the communication between the PD and GD happens using messages sent using UDP. In such embodiment, pInfo.provId can be set to a combination of the IP address and port number associated with the UDP port. The IP address and port number can be the IP address and port number of UDP port associated with PD 202. An ipAddrPortProvId can be determined by multiplying the IP address with 65536 and adding portId to the resulting value. The method of determining ipAddrPortProvId described here is illustrative only. Other methods can be used to determine pInfo.provId. Methods specific to the embodiments can also be used.

At step 4212, pInfo.contact can be set to information that can be used to send messages to the PD that is associated with the pInfo. In the embodiment described here, pInfo.contact can be set to a combination of IP address and port number that the PD uses to communicate messages with instances of CD 102 and GD 302. The process can then move to step 4214.

At step 4214, pState.pInfo is set to pInfo determined in earlier steps of the process. The process can then move to step 4216. At step 4216, pState.core is set to rxCoreInfo. The process can then move to step 4218. At step 4218, pState.generatorInfo is set to rxGenInfo. pState numInfo is set to 0, which can indicate that the PD is not associated with any instances of CD 102, while the PD is at step 4218. The process can then move to step 4220. Step 4220 indicates that the process associated with FIG. 42 is complete.

Figure 43:
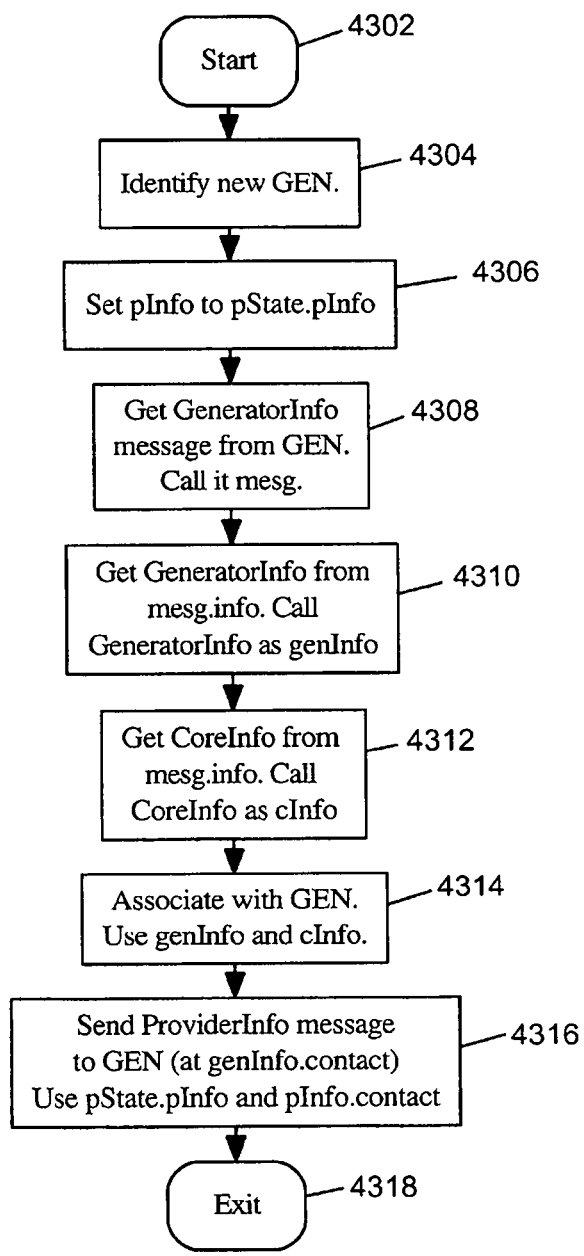
FIG. 43 illustrates the flow diagram of a process followed by a PD in determining GDs and associating with them according to an embodiment of the present invention.

FIG. 43 illustrates the flow diagram of a process followed by a PD in associating with a GD according to an embodiment of the present invention. In the embodiment of the invention described here, an instance of PD 202 uses the process illustrated in FIG. 43 to associate with an instance of GD 302. PD 202 can send messages to the instance of GD 302 on NI 206. PD 202 can start processing tags generated by GD 302 after PD is associated with the GD.

In some other embodiments, PD 202 can be associated with more than one instance of NI 206. When an instance of PD 202 is associated with more than one instance of NI 206, instances of NI 206 can be of same or different types. For example one instance of NI 206 on an instance of PD 202 can be a wifi interface, while another instance of NI 206 on the PD can be a USB interface, and yet other instance of NI 206 on the PD can be an Ethernet interface. An instance of PD 202 can be associated with more than one instance of GD 302 such that some instances of GD 302 can be associated via one instance of NI 206, and some other instances of GD 302 can be associated via another instance of NI 206 on the PD. When a PD 202 is associated with more than one GD 302 across more than one instance of NI 206 of PD 202, the PD can be receiving tags and/or messages from some or all of the instances of GD 302 across multiple instances of NI 206. The PD 202 instance can also be sending messages to instances of GD 302 using different instances of NI 206 on PD 202.

The process starts at step 4302 and moves to step 4304. At step 4304, PD 202 can identify or detect new instances of GD 302. The availability of new instances of GD 302 can be determined in ways that can be specific to the embodiment. For example in an embodiment wherein a GD can be connected to a PD using Ethernet cable, one end of which is associated with PINT 324 of GD 302 and other end with NI 206 of PD 202, the presence of a GD can be determined by PD 202 when the link associated with the NI 206 of PD 202 indicates that it is connected to a neighbor device (i.e., link comes up). Another example is an embodiment wherein a PD can be configured using information associated with GD 302. PD 202 can be configured or provided with contact information associated with GD 302 using UI 126 of PD 202. The configuration event wherein the contact information associated with GD 302 is available can indicate the presence of a new GD. In other embodiments, the presence of a new GD can be detected using discovery mechanisms such as the ones used by Bluetooth technology. In yet other embodiments, the contact information associated with instances of GD 302 can be provided by a service. A service over the internet for example can provide contacts of a list of GD 302 instances. The method of communicating tags and/or messages between instances of PD 202 and GD 302 can also be specific to each embodiment. For example, tags and/or messages can be enclosed in Ethernet frames when an instance of PD 202 is connected to an instance of GD 302 using Ethernet. In yet other embodiment, tags and/or messages can also be provided using an embodiment independent mechanism. An example of such mechanism is UDP (User Datagram Protocol). When UDP is used to exchange tags and/or messages, each tag and/or message can be enclosed in a UDP datagram before sending the datagram. In some embodiments, the detection of instances of GD 302 can also be associated with determining the contact associated with the GD 302. If an instance of PD 202 is associated with an instance of GD 302 using Ethernet, the contact information of GD 302 can be provided to PD 302 in LLDP (Link Layer Discovery Protocol) messages. Other methods of determining contact associated with GD 302 instances can be used. The methods of detecting new instances of GD 302, the associated contact information of GD 302 instances, usage of multiple instances of NI 206, etc. described here are illustrative only and other methods can be used. Once PD 202 detects a new GD and determines contact associated with detected GD, the process can move to step 4306.

At step 4306, a pInfo is set to pState.pInfo. The process can then move to step 4308. At step 4308, message of type GeneratorInfo sent by the GD can be processed by the PD. The method used in receiving the message from GD can be specific to the embodiment. The embodiments illustrated in FIG. 44-47 illustrate some example methods. Other methods can be used in receiving a message from GD. A message of type GeneratorInfo can include a GI and a CI, in the embodiment described here. The message received by the GD is referred to as mesg for use in subsequent steps of the process. The process can then move to step 4310.

At step 4310, GI from mesg.info is retrieved. The retrieved GI is referred to as genInfo for use in subsequent steps of the process. The process can then move to step 4312. At step 3212, CI from mesg.info is retrieved. The retrieved CI is referred to as cInfo for use in subsequent steps of the process. The process can then move to step 4314.

At step 4314, the PD can associate with the GD that sent the mesg. In the embodiment of the invention described here, the PD can use the method illustrated in FIG. 57 in associating with the GD. genInfo and cInfo retrieved in earlier steps can be provided to the process of FIG. 57 using instance 'x'. The process can then move to step 4316.

At step 4316, the PD can send a message of type ProviderInfo to the GD that the PD is associating with. The message can be sent to the GD at the address specified by genInfo.contact. In the embodiment of the invention described here, the process associated with FIG. 25 can be used to send the message. genInfo.contact, pState.pInfo and pInfo.contact can be provided to the process of FIG. 25 via instance 'x'. The PD can start receiving information related to tags generated by the GD once the PD has sent the message. The process can then move to step 4318. Step 4318 indicates that the process associated with FIG. 43 is complete.

Figure 44:
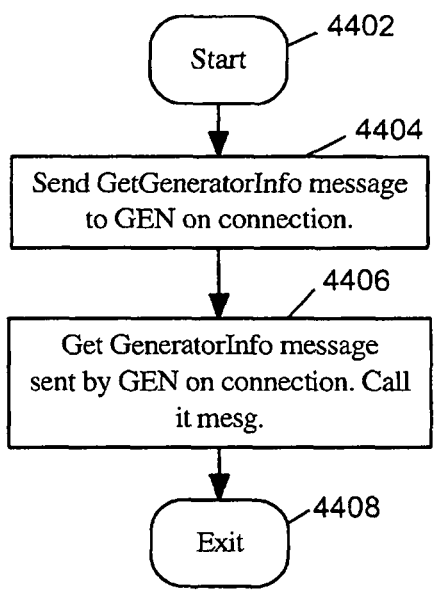
FIG. 44 illustrates the flow diagram of a process followed by a PD in getting GeneratorInfo message from GD, when the PD is connected to the GD, according to an embodiment of the present invention.

FIG. 44 illustrates the flow diagram of a process followed by a PD in getting message of type GeneratorInfo from a GD, when the PD is connected using physical means to the GD, according to an embodiment of the present invention. In one embodiment of invention an instance of GD 302 is physically connected (say using a cable) to an instance of PD 202. An example of such wiring is Ethernet. The physical wiring and associated technology can help in detecting the connection of a partner device. In Ethernet technology, this can be accomplished by a device if the link associated with the Ethernet interface on the device comes up. In other embodiments, an instance of PD 202 can be connected to an instance of GD 302 when PD 202 is "docked" to GD 302. An example of such docking can be implemented when PINT 324 of GD 302 and NI 206 of PD 202 are implemented using USB such that PD 202 can be plugged into GD 302. A similar form of connectivity exists when a thumb drive is plugged into a laptop's USB port. In this embodiment, physical wires are not present, but a direct connection between GD 302 and PD 202 is established. Other methods of connecting PD 202 with GD 302 are possible.

The process starts at step 4402 and moves to step 4404. At step 4404, PD 202 sends a GetGeneratorInfo message to the GD that the PD is connected to. The method of associating the message to the GD can be specific to each embodiment. USB for example provides a mechanism to address messages to the connected partner device. The process can then move to step 4406. The sending of a GetGeneratorInfo message to GD 302 can result in GD 302 responding with a message of type GeneratorInfo. PD 202 waits in step 4406 for the GeneratorInfo message from the GD. Once the PD receives the GeneratorInfo message, the process can then move to step 4408. Step 4408 indicates that the process associated with FIG. 44 is complete.

In some embodiments, a PD associating with a GD using the process of FIG. 43 can use the process illustrated in FIG. 44 as part of step 4308 for getting the message of type GeneratorInfo from GD 302. Once the process associated with FIG. 44 is complete, the process can then move to step 4308, and continue with the process of FIG. 43.

Figure 45:
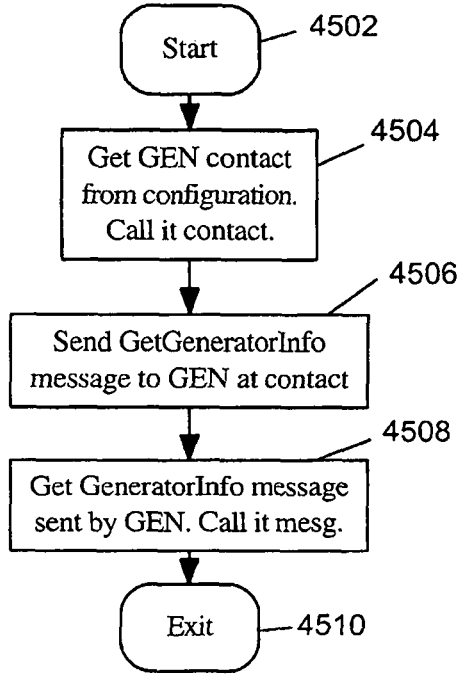
FIG. 45 illustrates the flow diagram of a process followed by a PD in getting GeneratorInfo message from GD, when the PD is configured with information associated with the GD, according to an embodiment of the present invention.

FIG. 45 illustrates the flow diagram of a process followed by a PD in getting message of type GeneratorInfo from a GD, when the PD is configured with information associated with the GD, according to an embodiment of the present invention. In some embodiments, an instance of PD 202 can be provisioned with information that can include contact associated with GD 302. An example of such an embodiment is when the PD 202 and GD 302 can communicate with each other using a network such as the Internet. In such embodiments, PD 202 can be configured with an IP address and port number associated with GD 302. In some other embodiments, PD 202 can be configured with a DNS name of GD 302, and the port number can be implicit. In such embodiments, the presence of configuration information can indicate the presence of instances of GD 302 that the PD can associate with. The method of connectivity, the configuration information that are described here are illustrative only. Other forms of connectivity and configuration are possible.

The process starts at step 4502 and moves to step 4504. At step 4504, the PD can determine contact associated with GD 302 from the provisioned information. In some embodiments, this can include retrieving configuration (provisioned) information from STORE 218 associated with PD 202, and parsing the configuration to extract and/or determine the contact from the configuration. In embodiments wherein IP address and port number of GD 302 are included in configuration, the IP address and port number from configuration can be used for the contact of GD 302. The process can then move to step 4506.

At step 4506, the PD can send a message of type GetGeneratorInfo to GD 302 using the contact determined in step 4504. The sending of a GetGeneratorInfo message to GD 302 can result in GD 302 responding with a GeneratorInfo message. PD 202 waits in step 4508 for the GeneratorInfo message from the GD. Once the PD receives the GeneratorInfo message from GD, the process can then move to step 4510. Step 4510 indicates that the process associated with FIG. 45 is complete.

In some embodiments, a PD associating with a GD using the process of FIG. 43 can use the process illustrated in FIG. 45 as part of step 4308 for getting the message of type GeneratorInfo from GD 302. Once the process associated with FIG. 45 is complete, the process can then move to step 4308, and continue with the process of FIG. 43.

Figure 46:
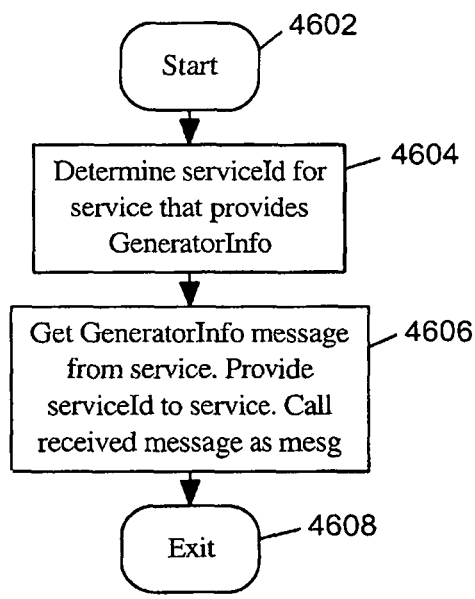
FIG. 46 illustrates the flow diagram of a process followed by a PD getting GeneratorInfo message from GD, when the PD is configured with service related information, according to an embodiment of the present invention.

FIG. 46 illustrates the flow diagram of a process followed by a PD in retrieving a message of type GeneratorInfo, according to an embodiment of the present invention. In the embodiment of the invention described for this process, an instance of PD 202 can use a service to get message of type GeneratorInfo associated with an instance of GD 302.

A service can be associated with instances of PD 202 to help retrieve messages of type GeneratorInfo. An example of such a service is a service that can be provided over the internet. An instance of PD 202 can provide information that can be used by the service to determine GeneratorInfo message that can be associated with the provided information. The service can then provide the message to the PD. Other information can be included in the response sent by the service.

In one embodiment, PD 202 can provide an identifier that can be used by a service to determine a message of type GeneratorInfo that can be associated with an instance of GD 302. The service can send the message (that can be associated with the GD) in response, to the PD. The identifier and association of the identifier to an instance of GD 302 can be determined using mechanisms specific to each embodiment. In one embodiment, the identifier can be one among a list of 16 digit PINs determined for use with a home. An instance of GD 302 at the home can be associated with the 16-digit PIN, by the service. In one embodiment, this can allow for determining a GD associated with a home using an identifier that is not available to instances of PD 202 unless provided explicitly. The identifier can be provided to instances of PD 202 using a variety of methods. In one embodiment, the identifier associated with an instance of GD 302 can be provisioned on the PD 202 instance using UI 226. In other embodiment, the identifier can be provided using Bluetooth technology. In other embodiment, the identifier can be printed on a paper using a bar-code format which can be scanned by instances of PD 202 to determine the identifier. In other embodiments, the identifiers associated with a location such as a store, home, etc. can be provided on wifi network(s). The identifier can also be provided as part of mechanisms that provide an IP address, such as DHCP. The methods of determining the identifiers as described here is illustrative, for use in the embodiment described here and is not meant to be limiting the scope of invention or any of its embodiments. Other methods of providing the identifier are possible. Other forms of services are also possible. For example a service can be provided that is not accessed over the internet. An example of a service includes a service over an intranet.

The process associated with FIG. 46 starts at step 4602 and moves to step 4604. At step 4604, an identifier can be determined. This determination can be specific to the embodiment. In embodiment where the identifier is provisioned using configuration information, the identifier can be retrieved from the configuration. Such configuration can be stored on STORE 218 of PD 202. This identifier is referred to as serviceId for use in subsequent steps of the process. The process can then move to step 4606.

At step 4606, the PD can provide the serviceId determined in step 4604, to the service. The provisioning of a serviceId to a service can result in service responding with a GeneratorInfo message. PD 202 waits in step 4606 for the GeneratorInfo message from the service. Once the PD receives the GeneratorInfo message from service, the process can then move to step 4608. Step 4608 indicates that the process associated with FIG. 46 is complete.

In some embodiments, a PD associating with a GD using the process of FIG. 43 can use the process illustrated in FIG. 46 as part of step 4308 for getting the message of type GeneratorInfo. Once the process associated with FIG. 46 is complete, the process can then move to step 4308, and continue with the process of FIG. 43.

Figure 47:
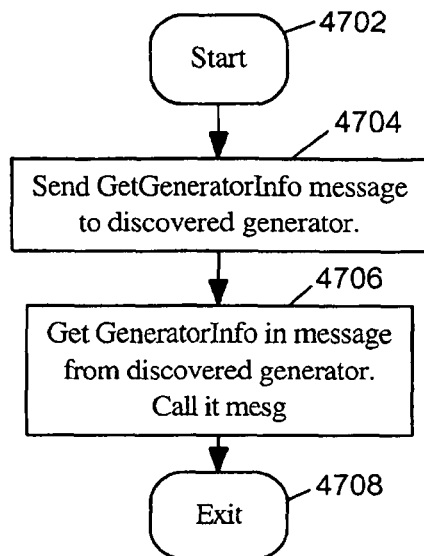
FIG. 47 illustrates the flow diagram of a process followed by a PD in getting GeneratorInfo message from GD, wherein the PD discovers the GDs, according to an embodiment of the present invention.

FIG. 47 illustrates the flow diagram of a process followed by a PD in getting message of type GeneratorInfo from a GD, when the PD discovers the GD, according to an embodiment of the present invention. An example of such embodiment is when PINT 324 of GD 302 and NI 206 of PD 302 can include support for Bluetooth connectivity. PD 202 can detect GD 302 using mechanisms provided by Bluetooth technology.

The process starts at step 4702 and moves to step 4704. The GD, at step 4704 can send a GetGeneratorInfo message to the GD that has been discovered using Bluetooth. The sending of a GetGeneratorInfo message to GD 302 can result in GD 302 responding with a GeneratorInfo message. The PD can then move to step 4706. PD 202 waits in step 4706 for the GeneratorInfo message from the GD. Once the PD receives the GeneratorInfo message from GD, the process can move to step 4708. Step 4708 indicates that the process associated with FIG. 47 is complete.

In some embodiments, a PD associating with a GD using the process of FIG. 43 can use the process illustrated in FIG. 47 as part of step 4308 for getting the message of type GeneratorInfo. Once the process associated with FIG. 47 is complete, the process can then move to step 4308, and continue with the process of FIG. 43.

FIG. 48A-D illustrate the flow diagrams of a process followed by a PD in handling messages received by the PD, according to an embodiment of the present invention. In one embodiment of the present invention, the process associated with FIG. 48A-D can be used by an instance of PD 202 in handling messages received by the PD. The messages handled by the PD as illustrated in FIG. 48A-D can be related to messages exchanged between the PD and an instance of CD 102 and/or GD 302. The flow diagram illustrated in FIG. 48A-D can be used to handle messages that are received due to reasons that cannot include responses to messages sent by the PD, in the embodiment described here. Other methods can include handling of messages associated with types beyond the ones illustrated in FIG. 48A-D. Other methods of handling messages received by PD 202 can be used in other embodiments of the invention.

The process starts at step 4802 and moves to step 4804. The process is provided with instance 'x' that can be associated with mesg field. The values associated with instance 'x' can be provided by a process that uses the method illustrated by FIG. 48A-D. In one embodiment, the process associated with FIG. 48A-D can be used when NI 206 of PD 202 detects receipt of a message and there is no other method followed by PD 202 that is expecting to handle received message. x.mesg can refer to the message received by PD 202. At step 4804, a local copy of x.mesg is made for use by subsequent steps of the process. This local copy is referred to as 'mesg' in the other steps associated with this process. At step 4804, a local copy of pState.pInfo is also made. This local copy is referred to as pInfo for use by subsequent steps of the process. The process can then move to step 4806.

At step 4806, a check is made to determine if the type associated with mesg is GetConsumerInfo. If the check fails, the process can move to step 4810. If the check passes, the process can move to step 4808. Step 4808 indicates that the process can move to step 4828 of FIG. 48B. An instance of PD 202 can receive a message of type GetConsumerInfo from an instance of CD 102 that is requesting the PD provide a CI. This can happen in embodiments where the association type of tag provided by the PD is Multicast.

Returning to step 4810, a check is made at this step to determine of mesg.type is ConsumerInfo. If the check fails, the process can move to step 4816. If the check passes, the process can move to step 4812. An instance of PD 202 can receive a ConsumerInfo message from an instance of CD 102 that is associating with the PD.

Figure 54:
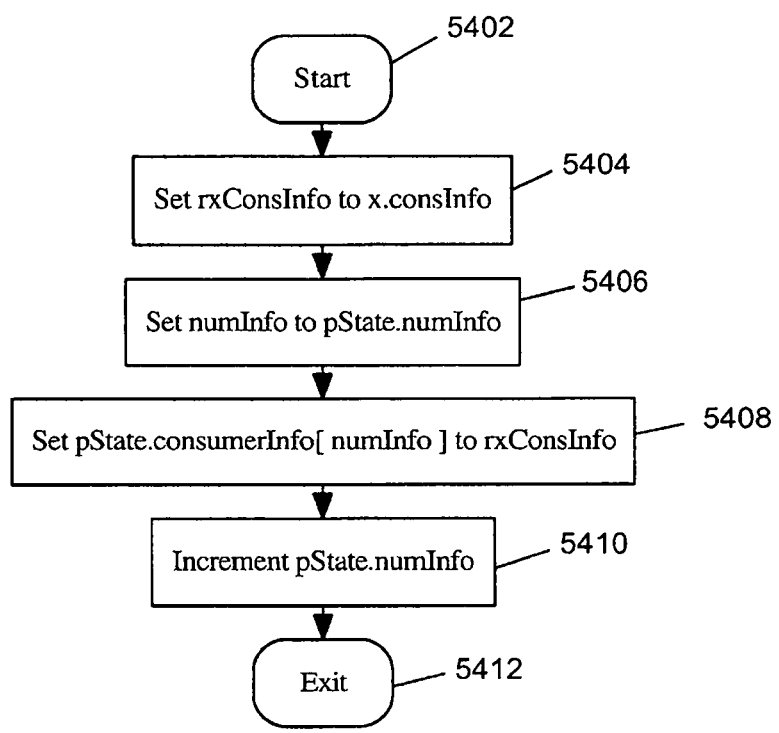
FIG. 54 illustrates the flow diagram of a process followed by a PD in updating pState when the PD is associated with a CD according to an embodiment of the present invention.

At step 4812, the PD can associate with the CD that sent the message by updating pState of the PD 202. The process illustrated by FIG. 54 can be used to update pState associated with the PD. Instance 'x' can be provided to process of FIG. 54. Instance 'x' can be associated with a consumer field that is an instance of CI. x.consumer can be set to the mesg.info before initiating the process of FIG. 54. The process associated with FIG. 48A-D can move to step 4814 after the process associated with FIG. 54 is complete. Step 4814 indicates that the process associated with FIG. 48A-D is complete.

At step 4816, a check is made to determine if the type associated with mesg is DeleteConsumerInfo. If the check fails, the process can move to step 4820. If the check passes, the process can move to step 4818. Step 4818 indicates that the process associated with FIG. 48A-D can move to step 4838 of FIG. 48C. In the embodiment of the invention described here, a message of type DeleteConsumerInfo can be sent by an instance of CD 102 to a PD 202 that the CD is associated with. The CD can send the message when it is disassociating with the PD.

Returning to step 4820, a check is made at this step to determine if the type associated with mesg is GetProviderInfo. If the check passes, the process can move to step 4822. If the check fails, the process can move to step 4824. Step 4824 indicates that the process associated with FIG. 48A-D can move to step 4846 of FIG. 48D. In the embodiment described here, an instance of CD 102 and/or GD 302 can send a message of type GetProviderInfo. The message can be sent by an instance of CD 102 during association with the PD. The message can be sent by an instance of GD 302 during association with the PD.

At step 4822, PD 202 can send a ProviderInfo message to the CD or GD that sent the message. The process associated with FIG. 25 can be used to send a ProviderInfo message. Instance 'x' can be provided to process of FIG. 25. Instance 'x' can be associated with fields genContact, pInfo and senderContact. x.genContact can be set to mesg.senderContact, x.pInfo to pState.pInfo and x.senderContact to pInfo.contact before using the process associated with FIG. 25. Step 4822 indicates that the process associated with FIG. 48A-D moves to step 4826, after the process associated with FIG. 25 is complete. Step 4826 indicates that the process associated with FIG. 48A-D is complete.

Referring to step 4828, the step indicates that the process can move to step 4830. At step 4830 a ConsumerInfo message is sent as response to the GetConsumerInfo message. In one embodiment of the invention the process associated with FIG. 24 can be used to send the message. Instance 'x' can be provided to process of FIG. 24. Instance 'x' can be associated with fields destContact, senderContact, consId and consContact. x.destContact can be set to mesg.senderContact, x.senderContact can be set to pInfo.contact, x.consId can be set to pInfo.mcastConsumerId, and x.consContact can be set to IpAddrNull (which can be 0 in some embodiments) before the process associated with FIG. 24 can be initiated. The process can move to step 4832, after the process associated with FIG. 24 is complete.

At step 4832, an instance of CI is created. The creation of an CI instance can involve allocation of memory, control data structures, state handles, or the like. In some embodiments, the creation of a CI instance can involve just allocation of memory. In yet other embodiments, the creation of a CI instance can involve allocating state handles in addition to allocating sufficient memory for the CI instance. The created CI instance is referred to as cInfo. At step 4832, cInfo.consumerId is set to pInfo.mcastConsumerId and cInfo.contact is set to mesg.senderContact. The process can then move to step 4834.

At step 4834, the PD can complete association with the CD that sent the message. The process illustrated by FIG. 54 can be used to update pState associated with the PD. Instance 'x' can be provided to process of FIG. 54. Instance 'x' can be associated with a consumer field that is an instance of CI. x.consumer can be set to the cInfo (created in step 4832) before initiating the process of FIG. 54. The process associated with FIG. 48A-D can move to step 4836 after the process associated with FIG. 54 is complete. Step 4836 indicates that the process associated with FIG. 48A-D is complete.

Returning to step 4838, the step indicates that the process can move to step 4840. At step 4840 an instance of CI is created. The instance is referred to as cInfo3 for use in subsequent steps of the process. The creation of a CI instance can involve allocation of memory, control data structures, state handles, or the like. In some embodiments, the creation of a CI instance can involve just allocation of memory. In yet other embodiments, the creation of a CI instance can involve allocating state handles in addition to allocating sufficient memory for the CI instance. At step 4840, cInfo.consumerId is set to mesg.info and cInfo.contact is set to mesg.senderContact. The process can then move to step 4842

Figure 55:
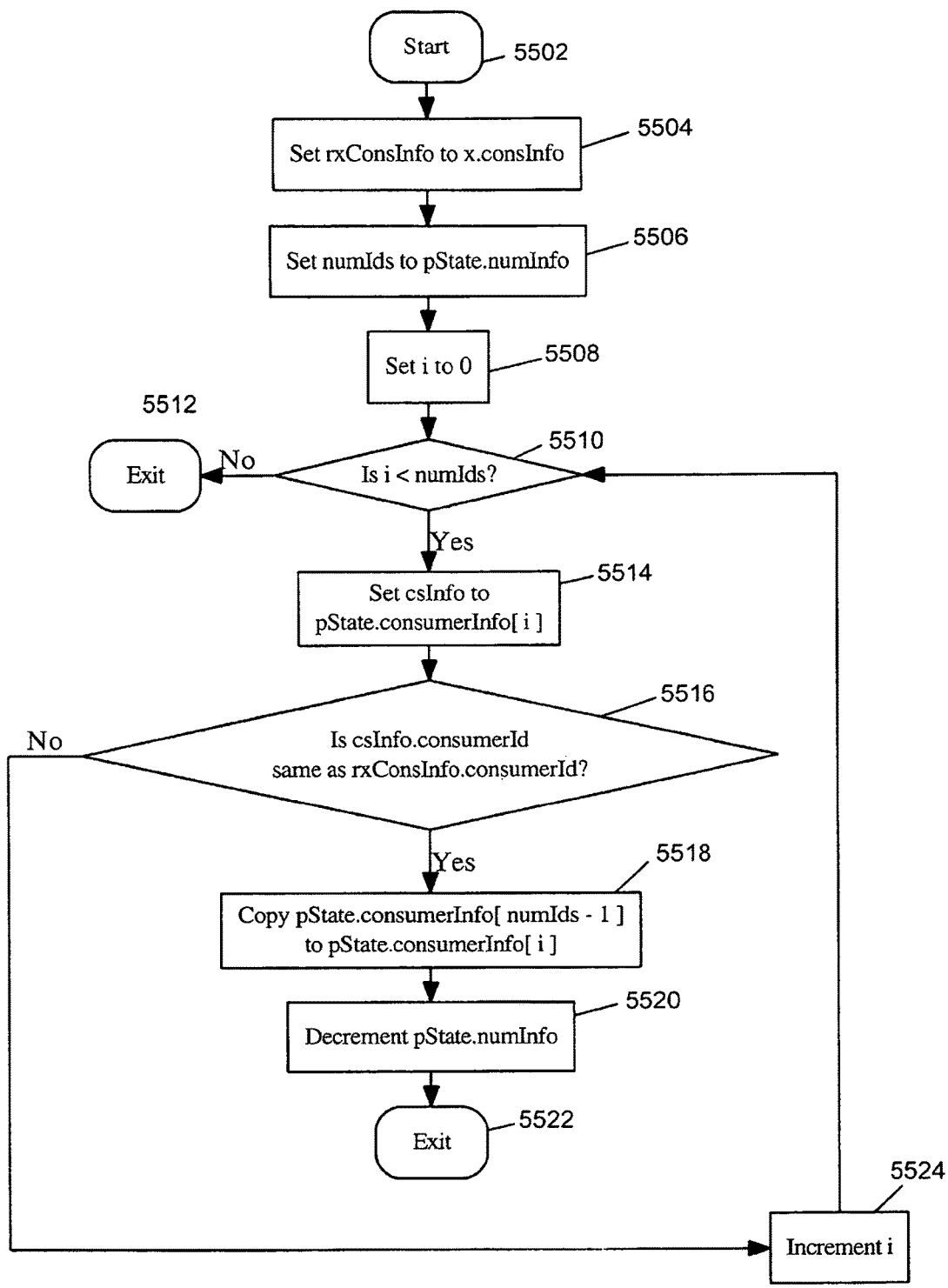
FIG. 55 illustrates the flow diagram of a process followed by a PD in updating pState when the PD is disassociated with a CD according to an embodiment of the present invention.

At step 4842, the PD can complete disassociation with the CD that sent the message. In one embodiment, the process associated with FIG. 55 can be used to update pState that can help complete the disassociation. Instance 'x' can be prepared with field cInfo for use by the process of FIG. 55. x.cInfo is set to cInfo3 determined in step 4840 before process of FIG. 55 is initiated. The process associated with FIG. 48C can move to step 4844 after the process associated with FIG. 55 is complete. Step 4844 indicates that the process associated with FIG. 48A-D is complete.

Step 4846 of the process indicates that the process can move to step 4848. At step 4848, a check is made to determine if mesg.type is GeneratedInfo. If the check fails, the process can move to step 4852. If the check succeeds, the process can move to step 4850. In some embodiments, a message associated with type GeneratedInfo can be sent by the GD 302 that the PD is associated with. A message of type GeneratedInfo can include information related to a tag that can be generated by the GD. At step 4850, mesg can be processed. In the embodiment of the invention described here, the process associated with FIG. 86 can be used to process mesg. Instance 'x' can be prepared with field mesg for use by the process of FIG. 86. x.mesg is set to mesg determined in step 4804 before process of FIG. 86 is initiated. The process associated with FIG. 48D can move to step 4856 after the process associated with FIG. 86 is complete. Step 4856 indicates that the process associated with FIG. 48A-D is complete. In other embodiments of the invention, the process associated with FIG. 85 can be used at step 4850 in processing mesg. Other methods of processing mesg (at step 4850) can be used in different embodiments.

Returning to step 4852, a check is made at this step to determine if mesg.type is GeneratorInfo. If the check succeeds, the process can move to step 4858. If the check fails, the process can move to step 4854. Step 4854 indicates that the process associated with FIG. 48A-D is complete. A message of type GeneratorInfo can be sent by an instance of GD 302 that is associating with the PD.

The mesg.info associated with a message of type GeneratorInfo can include an instance of GI and an instance of CRI as illustrated by the process associated with FIG. 27. In embodiments where TLV structures can be used to include an instance of GI and an instance of CRI in mesg.info, the two instances can be determined using mesg.info. In the embodiment as described in FIG. 27, some first sequence of bytes from mesg.info can be used for the firstTlv. The value field associated with first TLV (that is of firstTlv.length bytes, into offset of 4 bytes of mesg.info) can be used as an instance of GI. The sequence of bytes that start after (firstTlv.length+4) bytes into mesg.info can be used to represent the second TLV. The length field associated with first tlv (firstTlv.length) can represent the size of GI instance in bytes. The type and length fields can each be 2 bytes long. The second TLV can be used to determine an instance of CRI. The value field associated with the second TLV can represent an instance of CRI. The secondTlv.length set of bytes into offset (firstTlv.length+4+4) of mesg.info can be used as an instance of CRI.

Step 4858 indicates that the instance of GI can be extracted from mesg.info. The extracted instance is referred to as gInfo for use by subsequent steps of the process. The process can then move to step 4860. Step 4860 indicates that the instance of CRI can be extracted from mesg.info. The extracted instance is referred to as cInfo for use by subsequent steps of the process. The process can then move to step 4862.

Figure 57:
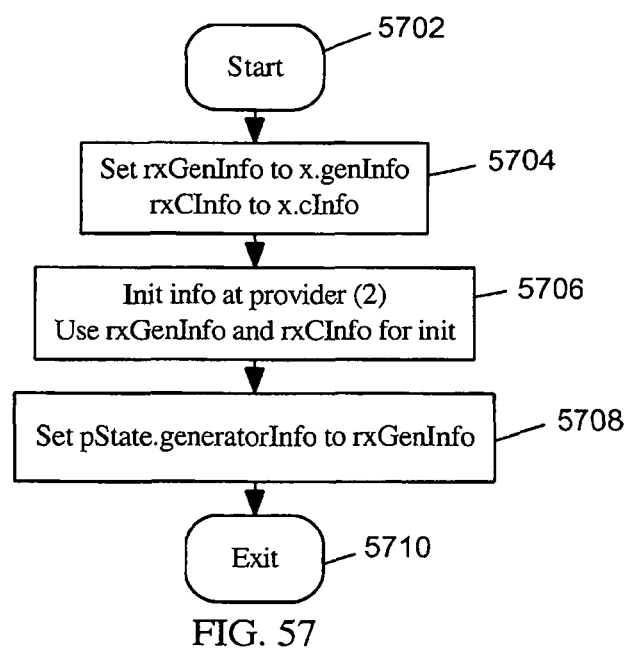
FIG. 57 illustrates the flow diagram of a process followed by a PD when it is associating with a GD according to an embodiment of the present invention.

At step 4862, the PD can begin the process of completing association with the GD that sent the message. This can include updates to pState. In some embodiments, the process associated with FIG. 57 can be used. Instance 'x' can be associated with fields genInfo and cInfo. x.cInfo is set to cInfo determined in step 4860, and x.genInfo is set to gInfo determined in step 4858 before process of FIG. 57 is initiated. The process associated with FIG. 48D can move to step 4864 after the process associated with FIG. 57 is complete.

Step 4864 indicates that the PD can send a message of type ProviderInfo to the GD that sent the message. The process associated with FIG. 25 can be used to send a ProviderInfo message. Instance 'x' can be provided to process of FIG. 25. Instance 'x' can be associated with fields genContact, pInfo and senderContact. x.genContact can be set to mesg.senderContact, x.pInfo to pState.pInfo and x.senderContact to pInfo.contact before using the process associated with FIG. 25. Step 4864 indicates that the process associated with FIG. 48A-D moves to step 4866, after the process associated with FIG. 25 is complete. Step 4866 indicates that the process associated with FIG. 48A-D is complete. The completion of sending a message of type ProviderInfo at step 4864 can indicate that the PD is associated to the GD that sent mesg.

FIG. 49 illustrates the flow diagram of a process followed by a PD in associating with a CD according to an embodiment of the present invention. The process associated with FIG. 39A-C illustrates methods of association between instances of CD 102 and instances of PD 202 that involves CD initiating association by requesting ProviderInfo message from PD 202 and providing/requesting ConsumerInfo message to/from PD 202 without PD requesting for ConsumerInfo message. FIG. 49 illustrates another method of association of a CD 102 to an instance of PD 202 wherein the CD does not send/request a ConsumerInfo message automatically upon receipt of a ProviderInfo message.

The process starts at step 4902 and moves to step 4904. At step 4904, PD 202 can identify or detect new instances of CD 102. The availability of new instances of CD 102 can be determined in ways that can be specific to the embodiment. For example in an embodiment wherein a CD can be associated to a PD using Ethernet cable one end of which is associated with NI 106 of CD 102 and other end with NI 206 of PD 202, the presence of a CD can be determined by PD 202 when the link associated with the NI 206 of PD 202 indicates that it is connected to a neighbor device (i.e., link comes up). Another example is an embodiment wherein a PD can be configured with information associated with CD 102. PD 202 can be configured or provided with contact information associated with CD 102 using UI 226 of PD 202. The configuration event wherein the contact information associated with CD 102 is available to PD 202 can indicate the presence of a new CD. In other embodiments, the presence of a new CD can be detected using discovery mechanisms such as the ones used by Bluetooth technology. The methods of detecting new instances of CD 102 described here are illustrative only and other methods of detecting instances of CD 102 can be used. Once PD 202 detects a new CD, the process can move to step 4906.

At step 4906, CI associated with the detected CD can be determined. The method of determining CI associated with CD can be specific to each embodiment. As illustrated in the process of FIG. 39A-C, a GetConsumerInfo message can be sent to the CD. In other embodiments, other mechanisms can be used. FIG. 50-52 illustrates among other aspects, the mechanism of determining CI associated with CD in different embodiments. The process can then move to step 4908.

At step 4908, the PD can associate with the CD. The association can be performed using the process illustrated in FIG. 54. Instance 'x' can be provided to process of FIG. 54. Instance 'x' can be associated with a 'cInfo' field. 'x.cInfo' can be set to the CI determined in step 4906. The process illustrated in FIG. 49 can move to step 4910 once the process associated with FIG. 54 is complete. Step 4910 indicates that the process associated with FIG. 49 is complete.

FIG. 50 illustrates the flow diagram of a process followed by a PD in getting CI from a CD, when the PD is connected using physical means to the CD, according to an embodiment of the present invention. In one embodiment of invention an instance of CD 102 is physically connected using wires to an instance of PD 202. An example of such wiring is Ethernet. The physical wiring and associated technology can help in detecting the connection of a partner device. In Ethernet technology, this can be accomplished by a device if the link associated with the Ethernet interface on the device comes up. In other embodiments, an instance of PD 202 can be connected to an instance of CD 102 when PD 202 is "docked" to CD 102. An example of such docking can be implemented when NI 106 of CD 102 and NI 206 of PD 202 are implemented using USB such that PD 202 can be plugged into CD 102. A similar form of connectivity exists when a thumb drive is plugged into a laptop's USB port. In this embodiment, physical wires are not present, but a direct connection between CD 102 and PD 202 is established. Other methods of associating PD 202 with CD 102 are possible.

The process starts at step 5002 and moves to step 5004. At step 5004, PD 202 sends a GetConsumerInfo message to the CD that the PD is connected to. The method of associating the message to the CD can be specific to each embodiment. USB for example provides a mechanism to address messages to the connected partner device. The process can then move to step 5006. The sending of a GetConsumerInfo message to CD 102 can result in CD 102 responding with a ConsumerInfo message. PD 202 waits in step 5006 for the ConsumerInfo message from the CD. Once the PD receives the ConsumerInfo message from CD, the info field associated with the received message can be used as the CI associated with the CD. The process can then move to step 5008. Step 5008 indicates that the process associated with FIG. 50 is complete.

FIG. 51 illustrates the flow diagram of a process followed by a PD in getting CI from a CD, when the PD is configured with information associated with the CD, according to an embodiment of the present invention. In some embodiments, an instance of PD 202 can be provisioned with information that can include contact associated with an instance of CD 102. An example of such an embodiment is when the PD 202 and CD 102 can communicate with each other using a network such as the Internet. In such embodiments, PD 202 can be configured with an IP address and port number associated with CD 102. PD 202 can also be configured with a DNS name of CD 102, while the port number can be implicit. In such embodiments, the presence of configuration information can indicate the presence of instances of CD 102 that the PD can associate with. The method of connectivity, the configuration information that are described here are illustrative only. Other forms of connectivity and configuration are possible. In some embodiments, PD 202 can be configured with information that can contain CI of CD 102. Other methods or configurations are possible.

The process starts at step 5102 and moves to step 5104. At step 5104, the PD can determine if CI associated with a CD 102 can be determined from the configured information. If the PD is provisioned with information from which CI associated with the CD can be determined, the process can move to step 5106. If not, the process can move to step 5108. At step 5106, CI associated with CD 102 can be determined from the provisioned information. The process can then move to step 5112.

Returning to step 5108, PD 202 can send a GetConsumerInfo message to the CD that the PD is configured with. The configuration in this case includes the contact associated with CD 102. In embodiments wherein IP address and port number of CD 102 are included in configuration, the IP address and port number from configuration can be used for the contact of CD 102. The sending of a GetConsumerInfo message to CD 102 can result in CD 102 responding with a ConsumerInfo message. PD 202 waits in step 5110 for the ConsumerInfo message from the CD. Once the PD receives the ConsumerInfo message from CD, the info field associated with the received message can be used as the CI associated with the CD. The process can then move to step 5112. Step 5112 indicates that the process associated with FIG. 51 is complete.

FIG. 52 illustrates the flow diagram of a process followed by a PD in getting CI from a CD, when the PD discovers the CD, according to an embodiment of the present invention. An example of such embodiment is when NI 206 of PD 202 and NI 106 of CD 102 can include support for Bluetooth connectivity. PD 202 can detect CD 102 using mechanisms provided by Bluetooth technology.

The process starts at step 5202 and moves to step 5204. The PD, at step 5204 can send a GetConsumerInfo message to the CD that has been discovered using Bluetooth. The sending of a GetConsumerInfo message to CD 102 can result in CD 102 responding with a ConsumerInfo message. PD 202 waits in step 5206 for the ConsumerInfo message from the CD. Once the PD receives the ConsumerInfo message from CD, the info field associated with the received message can be used as the CI associated with the CD. The process can then move to step 5208. Step 5208 indicates that the process associated with FIG. 52 is complete.

Figure 53:
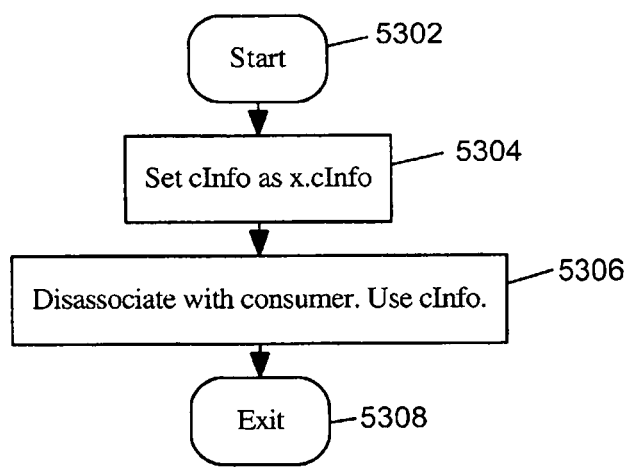
FIG. 53 illustrates the flow diagram of a process followed by a PD in disassociating with a CD according to an embodiment of the present invention.

FIG. 53 illustrates the flow diagram of a process followed by a PD in disassociating with a CD according to an embodiment of the present invention. The process associated with FIG. 53 can be used by an instance of PD 202 in disassociating with an instance of CD 102. The process associated with FIG. 53 can be used by the PD when the association setup between CD 102 and PD 202 is not terminated using messages sent by CD 102. This can happen for example, when the communication media associated with sending messages is faulty or if the media no longer exists. If the communication media for association between an instance of CD 102 and PD 202 is a cable that is plugged into both CD 102 and PD 202, the method illustrated in FIG. 53 can be used when the cable is unplugged from PD 202. The method can also be used if the PD 202 can determine that the cable indicates a faulty or unusable status, after the association between CD 102 and PD 202 is complete. The disassociation can also happen due to other reasons, in various embodiments.

The process starts at step 5302 and moves to step 5304. The process is provided with instance 'x' that can be associated with field cInfo. The values associated with instance 'x' can be provided by a process that uses the method illustrated by FIG. 53. x.cInfo is instance of CI related to CD 102 that the PD chose to disassociate with. x.cInfo can be one of the values maintained in pState.consumerInfo list. A local copy of x.cInfo is made for use by subsequent steps of the process. The local copy is referred to as cInfo. The process then moves to step 5306. At step 5306, the PD can initiate disassociation. The process associated with FIG. 55 can be used for disassociation. Instance 'x' can be prepared with field cInfo for use by the process of FIG. 55. x.cInfo is set to cInfo determined in step 5304 before process of FIG. 55 is initiated. The process associated with FIG. 53 can move to step 5308 after the process of FIG. 55 is complete. Step 5308 indicates that the process associated with FIG. 53 is complete.

FIG. 54 illustrates the flow diagram of a process followed by a PD in updating pState when the PD is associated with a CD according to an embodiment of the present invention. In the embodiment of the invention described here, an instance of PD 202 can use this process to update a list of CI that is maintained in pState associated with the PD. This process can be used by the PD when the PD is associated with an instance of CD 102. Instance 'x' associated with this process can be provided with consInfo. x.consInfo is an instance of CI.

The process starts at step 5402 and moves to step 5404. At step 5404, a local copy of x.consInfo is made. This local copy is referred to as rxConsInfo in the process shown in FIG. 54. The process then moves to step 5406. At step 5406, the number of instances of CI maintained by the PD can be determined. The number of instances of CI maintained can be represented using pState.numInfo A copy of pState.numInfo is made in step 5406. The copy of pState numInfo is referred to as numInfo in the process shown in FIG. 54. In the embodiment described here, the PD maintains a list of instances of CI in pState.consumerInfo. In the embodiment where pState can be represented using the "struct" aspect of C programming language, pState.consumerInfo is an array of instances of CI. Other methods of maintaining a list of CI in pState can be used. The process can then move to step 5408. At step 5408, rxConsInfo determined in step 5404 can be added to pState.consumerInfo. In embodiments as in the one described here, where pState.consumerInfo is an array of CI, rxConsInfo can be stored at index numInfo of pState.consumerInfo list. The process can then move to step 5410. At step 5410, pState.numInfo can be incremented to indicate that the number of elements maintained in pState.consumerInfo is increased by 1. In the embodiment described here, pState.consumerInfo array maintains a list of instances of CI. The first pState.numInfo instances of CI maintained in pState.consumerInfo are the list of valid CI instances maintained by the PD. Instances of CI beyond pState numInfo index of pState.consumerInfo are considered unused elements. New instances of CI can be placed in unused elements of pState.consumerInfo. The process can then move to step 5412. Step 5412 indicates the completion of process illustrated by FIG. 54.

FIG. 55 illustrates the flow diagram of a process followed by a PD in updating pState when the PD is disassociating with a CD according to an embodiment of the present invention. In the embodiment described here, the process associated with FIG. 55 can be used by PD 202 in updating pState associated with the PD when the PD is disassociating with an instance of CD 102. The update of pState can include removing CI of the CD that is being disassociated from pState.consumerInfo list. The removal of the CI from pState.consumerInfo can be accomplished by identifying the CI in pState.consumerInfo list. The identification can be accomplished by finding an element of CI in pState.consumerInfo whose consumerId matches the consumerId of the CI associated with the CD. pState numInfo can indicate the number of elements of pState.consumerInfo array that are valid. In other embodiments, other methods of maintaining a set of CI can be used. Mechanisms can include hash tables, linked lists or the like. The completion of process illustrated in FIG. 55 can indicate that the disassociation of CD with the PD is complete.

The process starts at step 5502 and moves to step 5504. The process is provided with instance 'x' that can be associated with consInfo field. The values associated with instance 'x' can be provided by a process that uses the method illustrated by FIG. 55. x.consInfo is an instance of CI. A local copy of x.consInfo is made in step 5504. The local copy is referred to as rxConsInfo for use in subsequent steps of the process. The process can then move to step 5506. At step 5506, numIds is set to pState.numInfo. The process then moves to step 5508. At step 5508, i is set to 0. The process can then move to step 5510. At step 5510 a check is made to determine if i is less than numIds. If the check succeeds, the process can move to step 5514. If not, the process can move to step 5512. Step 5512 indicates that the process associated with FIG. 55 is complete.

Returning to step 5514, i-th element of pState.consumerInfo is retrieved and csInfo is set to the retrieved CI. The process can then move to step 5516. At step 5516, a check is made to determine if the consumerId associated with rxConsInfo matches the consumerId associated with csInfo. If the check succeeds, the process can move to step 5518. If not, the process can move to step 5524. At step 5524, i is incremented and the process moves to step 5510. The incremented value of i can be used to access/retrieve the next element of pState.consumerInfo, if possible. Returning to step 5518, the element at index i can indicate that the CI that needs to be removed has been found in pState.consumerInfo array. The element of pState.consumerInfo at index (numIds−1) is copied to element at index i. The process can then move to step 5520. At step 5520, pState.numInfo is decremented. This can indicate that the number of valid CI elements in pState.consumerInfo is reduced by 1. The process can then move to step 5522. Step 5522 indicates that the process associated with FIG. 55 is complete.

FIG. 57 illustrates the flow diagram of a process followed by a PD during association with a GD according to an embodiment of the present invention. In the embodiment of the present invention, an instance of PD 202 follows the process illustrated in FIG. 57 in updating pState when the PD is associating with an instance of GD 302. The process starts at step 5702 and moves to step 5704. The process is provided with instance 'x' that can be associated with fields genInfo and cInfo. The values associated with instance 'x' can be provided by a process that uses the method illustrated by FIG. 57. x.genInfo can be associated with an instance of GI, while x.cInfo can be associated with an instance of CRI. At step 5704, a local copy of x.genInfo is made, and the local copy is referred to as rxGenInfo for use in subsequent steps of the process. At step 5704, a local copy of x.cInfo is made, and the local copy is referred to as rxCInfo for use in subsequent steps of the process. The process then moves to step 5706.

At step 5706, the PD can initialize part of the pState. In the embodiment described here, PD 202 can use the process illustrated in FIG. 42. Field gInfo of instance 'x' is associated with rxGenInfo and field coreInfo of instance 'x' is associated with rxCInfo for providing instance 'x' to the process of FIG. 42. The process associated with FIG. 57 moves to step 5708 after the process of FIG. 42 completes. At step 5708, pState.generatorInfo is set to rxGenInfo. The process can then move to step 5710. Step 5710 indicates that the process associated with FIG. 57 is complete.

Figure 58:
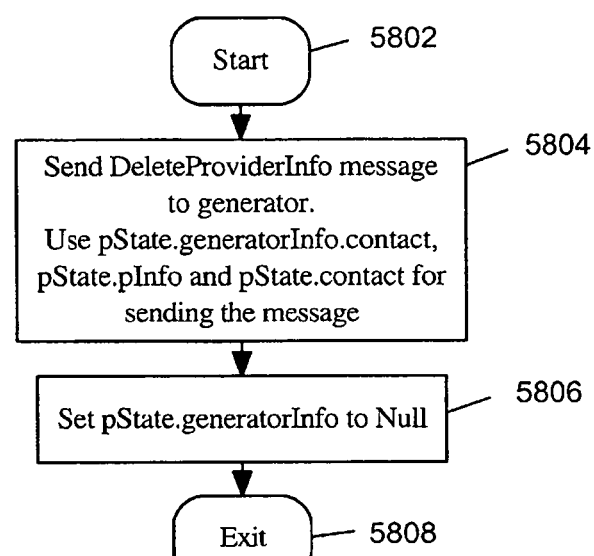
FIG. 58 illustrates the flow diagram of a process followed by a PD in disassociating with a GD according to an embodiment of the present invention.

FIG. 58 illustrates the flow diagram of a process followed by a PD in disassociating with a GD according to an embodiment of the present invention. In the embodiment described here, an instance of PD 202 can use the process described in FIG. 58 in disassociating with an instance of GD 302 that the PD is associated with. The instance of PD 202 can no longer process the tags generated by the GD once the disassociation is complete. The process starts in step 5802 and moves to step 5804. At step 5804, PD 202 can send a DeleteProviderInfo message to the instance of GD 302 that the PD chooses to disassociate with. In the embodiment described here, the process associated with FIG. 26 can be used to send the message. Instance 'x' can be prepared for providing to the process of FIG. 26. In preparation of instance 'x', x.genContact can be set to pState.generatorInfo.contact, x.pInfo to pState.pInfo and x.senderContact to pState.contact. The process associated with FIG. 58 moves to step 5806 after the process associated with FIG. 26 completes. At step 5806, pState.generatorInfo can be set to NULL that can indicate that pState.generatorInfo is not valid any longer. The process can then move to step 5808. Step 5808 indicates that the process associated with FIG. 58 is complete.

FIG. 59 illustrates the flow diagram of a process followed by a GD in initializing part of state (gState) maintained by GD according to an embodiment of the present invention. In an embodiment of the invention, the process illustrated in FIG. 59 can be used to initialize part of gState maintained by GD 302. In the embodiment described here, gState can be maintained by GD 302 in STATE 314. The process illustrated by FIG. 59 can be performed by an instance of GD 302 before the GD can associate with instances of PD 202. The process illustrated in FIG. 59 can be used in association with a PD 202 that can use process of FIG. 41 to initialize part of pState. The process associated with FIG. 59 can be used by GD that does not determine some values associated with GI such as mcastConsumerId, assocType, and idProvider. In such embodiments, the PD 202 can determine mcastConsumerId, assocType and idProvider for pState as described in FIG. 41 and related description. The process illustrated in FIG. 59 is illustrative, and is not meant to limit the scope of the invention or any of its embodiments. Other embodiments can choose to not initialize additional fields associated with gState, or can choose to initialize only gState.core. Other embodiments can choose to initialize the gState of GD 302 and/or pState of PD 202 in ways not described here.

The process starts at step 5902 and moves to step 5904. At step 5904, an instance of GI is created. The created GI is referred to as gInfo for use in subsequent steps of the process. The process can then move to step 5906. At step 5906, an instance of CRI is created. The created CRI is referred to as cInfo for use in subsequent steps of the process. The creation of an instance of GI and/or CRI can involve allocation of memory, control data structures, state handles, or the like. In some embodiments, the creation of a GI and/or CRI can involve just allocation of memory. In yet other embodiments, the creation of a GI and/or CRI can involve allocating state handles in addition to allocating sufficient memory for the GI and/or CRI. The process can then move to step 5908.

At step 5908, some fields associated with gInfo are set to Null and some other fields are initialized to some values. The fields initialized to Null include gInfo.mcastConsumerId, gInfo.assocType and gInfo.idProvider. At step 5908, gInfo.genId is set to ipAddrPortGenId. gInfo.genId is an identifier that can be used to identify an instance of GD 302 among all GDs. In the embodiment of the present invention described here, the communication between the PD and GD happens using messages sent using UDP. In such embodiment, gInfo.genId can be set to a combination of the IP address and port number associated with the UDP port. The IP address and port number can be the IP address and port number of UDP port associated with GD 302. An ipAddrPortGenId can be determined by multiplying the IP address with 65536 and adding portId to the resulting value. The method of determining ipAddrPortGenId described here is illustrative only. Other methods can be used to determine gInfo.genId. Methods specific to the embodiments can also be used.

At step 5908, gInfo.contact can be set to information that can be used to send messages to the GD that is associated with the gInfo. In the embodiment described here, gInfo.contact can be set to a combination of IP address and port number that the GD uses to communicate messages with instances of PD 202.

At step 5908, gInfo.type can be set to a type associated with the tags that GD 302 can generate. In an embodiment wherein GD 302 is constructed to provide tags of only a given type, the gInfo.type can be set to that type. An example of such embodiment is a GD that always provides tags of type Groceries. In such embodiments, gInfo.type can be set to Groceries. gInfo.type can be set to different values based on the embodiment. In other embodiments, the tag provided by the GD 302 can be programmable. In such case, the type determined based on programmed values can be used to determine gInfo.type. The methods of determining the type described here is illustrative only. Other methods of determining the type of tags provided by GD 302 are possible. The process can then move to step 5910.

At step 5910, fields associated with cInfo are initialized. Field cInfo.version is set to 1. Field cInfo.appLocation is set to an appLocation that can be specific to the embodiment. Field cInfo.additionalInfoUrl is set to a URL that can be specific to the embodiment. Field cInfo.additionalInfo is set to additionalInfo that can be specific to the embodiment. cInfo can be used to determine values in tags when tags are generated by the GD, and values associated with initializing cInfo can vary based on the embodiment in which the GD is used. While the GD is active (and/or generating tags), the values associated with cInfo can be static and not changing, determined using a programmed value, can be determined from sensors, extracted from media, determined using some software and/or hardware processing, determined using a system that involves transactions, or the like. Various embodiments have different methods of initializing cInfo. The method of determining these values for various embodiments will become obvious by examining the methods associated with different embodiments described in FIG. 132, FIG. 103-107, FIG. 121, and FIG. 126. The method described here in FIG. 59 can be extended to other embodiments where embodiment specific values can be used. The process can then move to step 5912.

At step 5912, gState.gInfo is set to gInfo, gState.core is set to cInfo and gState.numInfo is set to 0. The value of 0 for gState numInfo is used to indicate that the GD is not yet associated with any instances of PD 202. The process can then move to step 5914. Step 5914 indicates that the process associated with FIG. 59 is complete.

Figure 60:
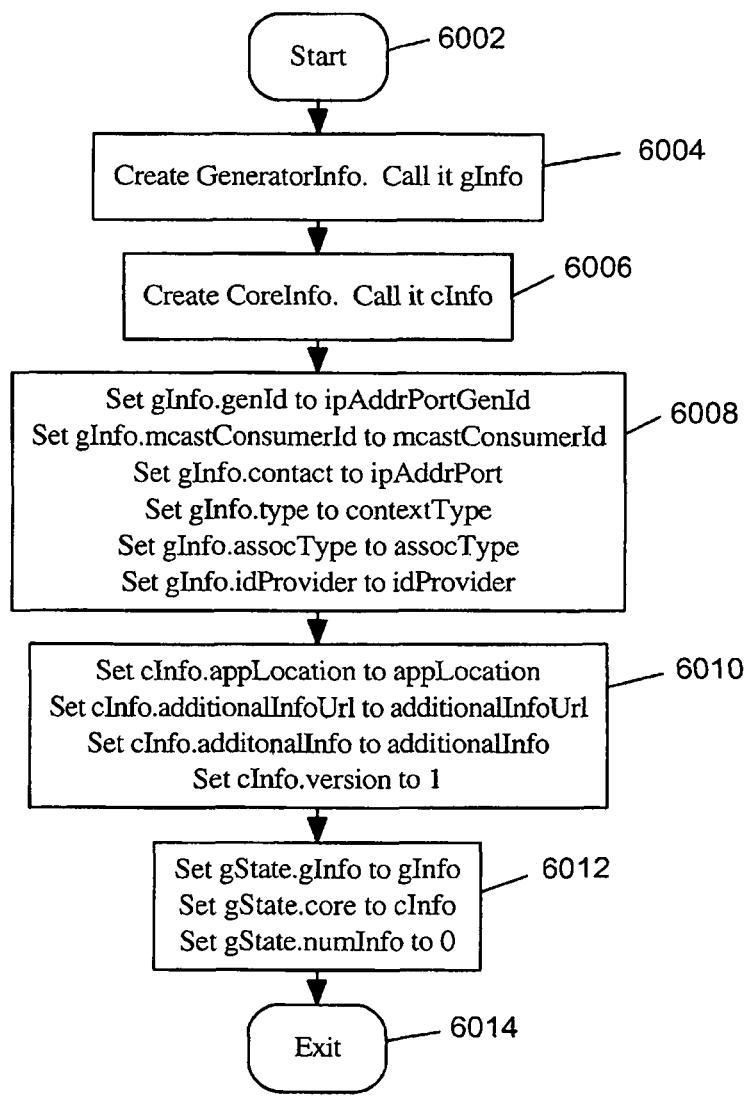
FIG. 60 illustrates the flow diagram of a process followed by a GD in initializing part of state (gState) maintained by the GD according to another embodiment of the present invention.

FIG. 60 illustrates the flow diagram of a process followed by a GD in initializing part of state (gState) maintained by GD according to an embodiment of the present invention. In an embodiment of the invention, the process illustrated in FIG. 60 can be used to initialize part of gState maintained by GD 302. In the embodiment described here, gState can be maintained by GD 302 in STATE 314. The process illustrated by FIG. 60 can be performed by an instance of GD 302 before the GD can associate with instances of PD 202. The process illustrated in FIG. 60 can be used in association with a PD 202 that can use process of FIG. 42 to initialize part of pState. The process associated with FIG. 60 can be used by GD that can determine values of mcastConsumerId, assocType and idProvider associated with GI. This is in contrast to the process illustrated in FIG. 59 wherein these values are not determined by the GD. The process illustrated in FIG. 60 is illustrative, and is not meant to limit the scope of the invention or any of its embodiments. Other embodiments can choose to initialize the gState of GD 302 and/or pState of PD 202 in ways not described here. A variation and/or embodiment of the process described by FIG. 60 is illustrated by FIG. 132. The embodiment described here uses the process described in FIG. 132 for initializing part of gState maintained by the GD. FIG. 132 can be used by GD 302 for initialization in embodiments where PD 202 can use the process illustrated in FIG. 42 for initializing part of pState associated with the PD.

The process starts at step 6002 and moves to step 6004. At step 6004, an instance of GI is created. The created GI is referred to as gInfo for use in subsequent steps of the process. The process can then move to step 6006. At step 6006, an instance of CRI is created. The created CRI is referred to as cInfo for use in subsequent steps of the process. The creation of an instance of GI and/or CRI can involve allocation of memory, control data structures, state handles, or the like. In some embodiments, the creation of a GI and/or CRI can involve just allocation of memory. In yet other embodiments, the creation of a GI and/or CRI can involve allocating state handles in addition to allocating sufficient memory for the GI and/or CRI. The process can then move to step 6008.

At step 6008, some fields associated with gInfo are initialized. At step 6008, gInfo.genId is set to ipAddrPortGenId. gInfo.genId is an identifier that can be used to identify an instance of GD 302 among all GDs. In the embodiment of the present invention described here, the communication between the PD and GD happens using messages sent using UDP. In such embodiment, gInfo.genId can be set to a combination of the IP address and port number associated with the UDP port. The IP address and port number can be the IP address and port number of UDP port associated with GD 302. An ipAddrPortGenId can be determined by multiplying the IP address with 65536 and adding portId to the resulting value. The method of determining ipAddrPortGenId described here is illustrative only. Other methods can be used to determine gInfo.genId. Methods specific to the embodiments can also be used.

At step 6008, gInfo.contact can be set to information that can be used to send messages to the GD that is associated with the gInfo. In the embodiment described here, gInfo.contact can be set to a combination of IP address and port number that the GD uses to communicate messages with instances of PD 202.

At step 6008, gInfo.type can be set to a type associated with the tags that GD 302 can generate. In an embodiment wherein GD 302 is constructed to provide tags of only a given type, the gInfo.type can be set to that type. An example of such embodiment is a GD that always provides tags of type Groceries. In such embodiments, gInfo.type can be set to Groceries. gInfo.type can be set to different values based on the embodiment. In other embodiments, the tag provided by the GD 302 can be programmable. In such case, the type determined based on programmed values can be used to determine gInfo.type. The methods of determining the type described here is illustrative only. Other methods of determining the type of tags provided by GD 302 are possible. The process can then move to step 6010.

At step 6008, other fields associated with gInfo such as mcastConsumerId, assocType and idProvider are initialized. The values associated with these fields are embodiment specific. The method of determining these values for various embodiments will become obvious by examining the methods associated with different embodiments described in FIG. 132, FIG. 103-107, FIG. 121, and FIG. 126. The method described here in FIG. 60 can be extended to other embodiments where embodiment specific values can be used.

At step 6010, fields associated with cInfo are initialized. Field cInfo.version is set to 1. Field cInfo.appLocation is set to an appLocation that can be specific to the embodiment. Field cInfo.additionalInfoUrl is set to a URL that can be specific to the embodiment. Field cInfo.additionalInfo is set to additionalInfo that can be specific to the embodiment. cInfo can be used to determine values in tags when tags are generated by the GD, and values associated with initializing cInfo can vary based on the embodiment in which the GD is used. While the GD is active (and/or generating tags), the values associated with cInfo can be static and not changing, determined using a programmed value, can be determined from sensors, extracted from media, determined using some software and/or hardware processing, determined using a system that involves transactions, or the like. Various embodiments have different methods of initializing cInfo. The method of determining these values for various embodiments will become obvious by examining the methods associated with different embodiments described in FIG. 132, FIG. 103-107, FIG. 121, and FIG. 126. The method described here in FIG. 60 can be extended to other embodiments where embodiment specific values can be used. The process can then move to step 6012.

At step 6012, gState.gInfo is set to gInfo, gState.core is set to cInfo and gState.numInfo is set to 0. The value of 0 for gState numInfo is used to indicate that the GD is not yet associated with any instances of PD 202. The process can then move to step 6014. Step 6014 indicates that the process associated with FIG. 60 is complete.

Figure 61:
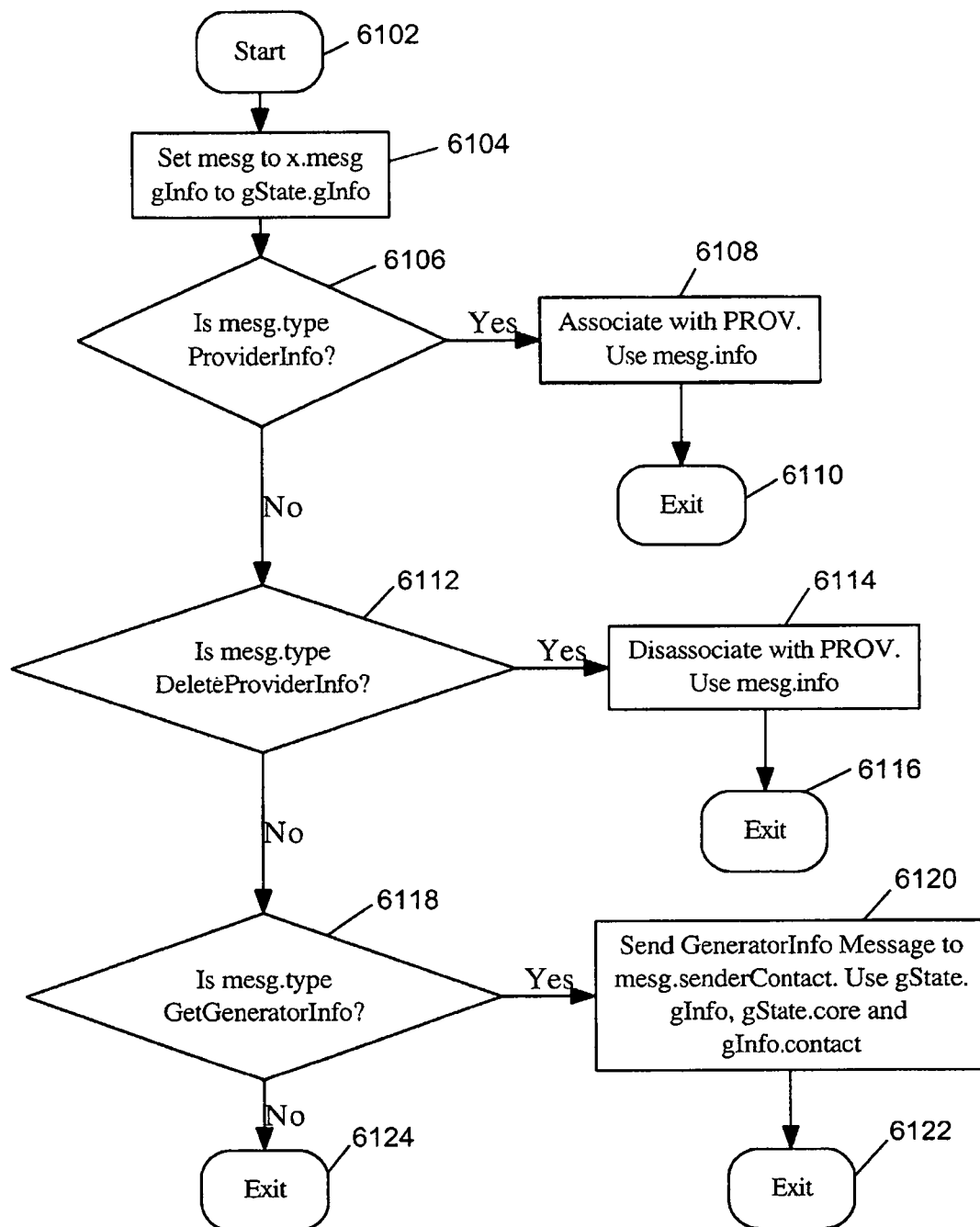
FIG. 61 illustrates the flow diagram of a process followed by a GD in handling messages received by the GD, according to an embodiment of the present invention.

FIG. 61 illustrates the flow diagram of a process followed by a GD in handling messages received by the GD, according to an embodiment of the present invention. In the embodiment described here, an instance of GD 302 can use the process illustrated in FIG. 61 to handle messages received by the GD. The flow diagram illustrated in FIG. 61 can be used to handle messages that are received due to reasons that cannot include responses to messages sent by the GD, in the embodiment described here. Other methods can include handling of messages associated with types beyond the ones illustrated in FIG. 61. Other methods of handling messages received by GD 302 can be used in other embodiments of the invention.

The process starts at step 6102 and moves to step 6104. The process is provided with instance 'x' that can be associated with mesg field. The values associated with instance 'x' can be provided by a process that uses the method illustrated by FIG. 61. In one embodiment, the process associated with FIG. 61 can be used when PINT 328 of GD 302 detects receipt of a message and there is no other method followed by GD 302 that is expecting to handle received message. x.mesg can refer to the message received by GD 302. At step 6104, a local copy of x.mesg is made for use by subsequent steps of the process. This local copy is referred to as 'mesg' in the other steps associated with this process. At step 6104, a local copy of gState.gInfo is also made. This local copy is referred to as gInfo for use by subsequent steps of the process. The process can then move to step 6106.

Figure 62:
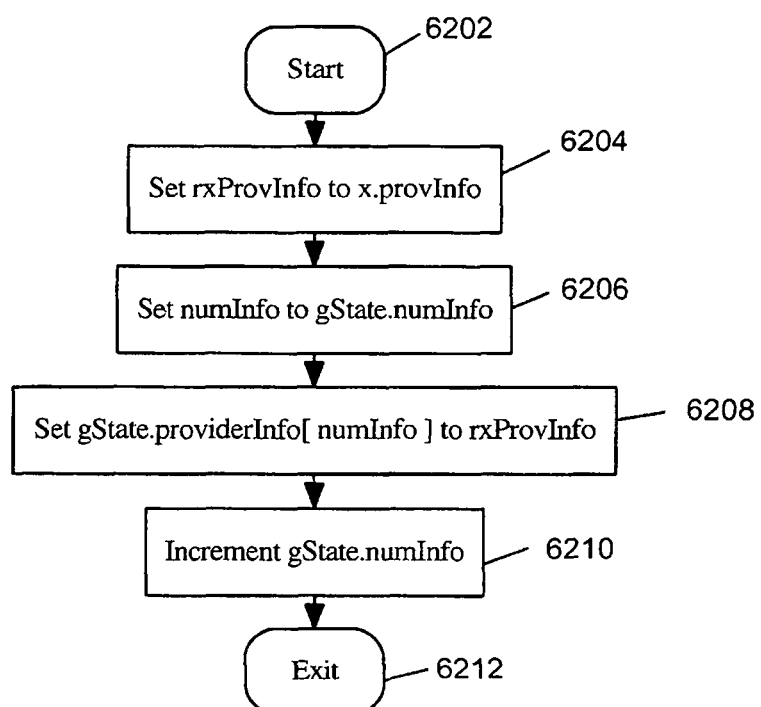
FIG. 62 illustrates the flow diagram of a process followed by a GD in updating gState when the GD is associating with a PD according to an embodiment of the present invention.

At step 6106, a check is made to determine if the type associated with message is ProviderInfo. If the type is ProviderInfo, the process moves to step 6108. If not, the process moves to step 6112. At step 6108, the GD can associate with the PD that sent the message that is being processed. The process associated with FIG. 62 can be used for the association. Instance 'x' can be provided to process of FIG. 62. The instance 'x' can be associated with a field 'prov'. x.prov can be set to the content of mesg.info, for use by process of FIG. 62. The process associated with FIG. 61 can move to step 6110 after the process associated with FIG. 62 is complete. Step 6110 indicates that the process associated with FIG. 61 is complete.

Figure 63:
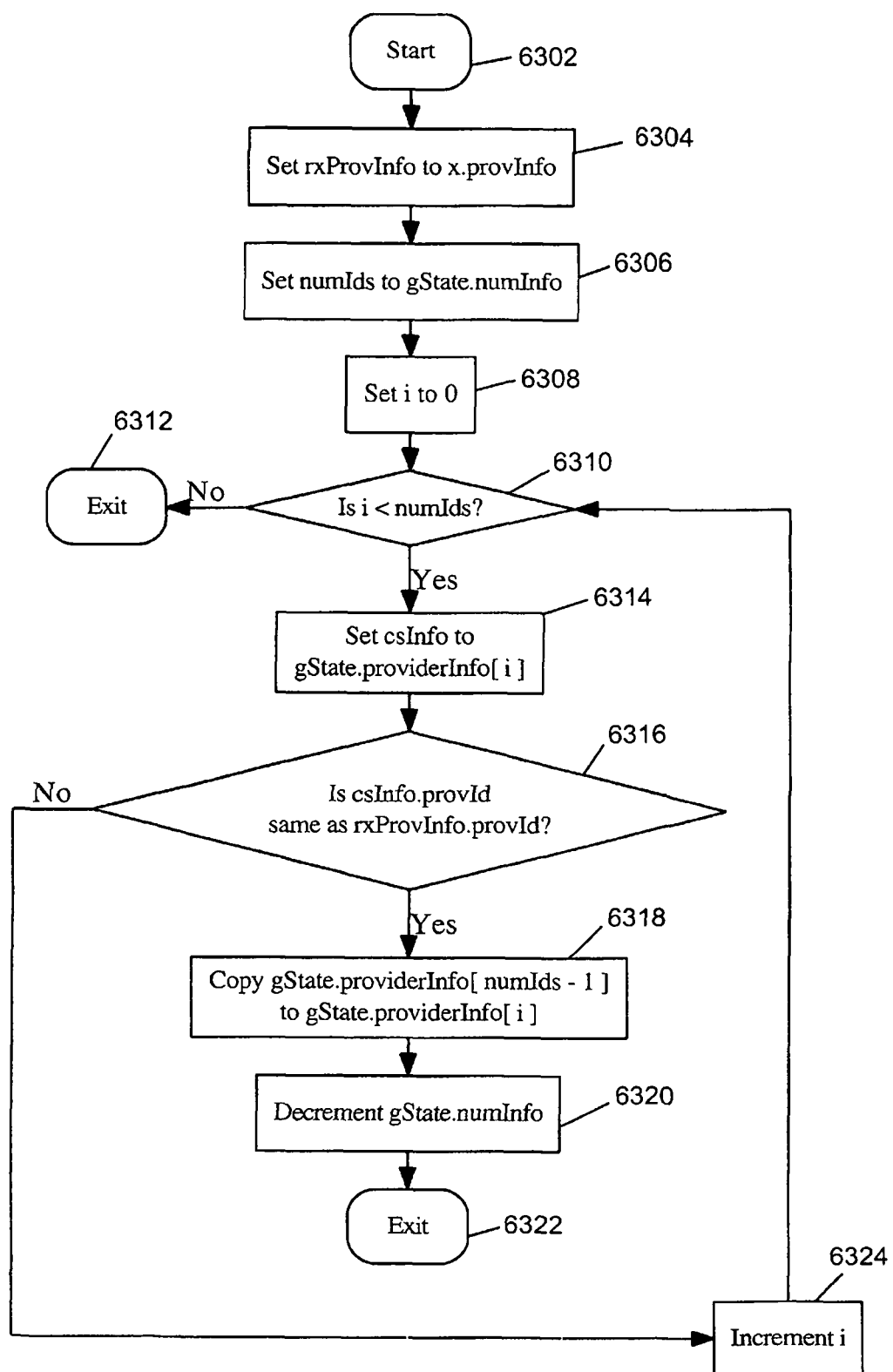
FIG. 63 illustrates the flow diagram of a process followed by a GD in updating gState when the GD is disassociating with a PD according to an embodiment of the present invention.

At step 6112, a check is made to determine if the type associated with message is DeleteProviderInfo. If the type is DeleteProviderInfo, the process moves to step 6114. If not, the process moves to step 6118. At step 6114, the GD can disassociate with the PD that sent the message that is being processed. The process associated with FIG. 63 can be used for disassociation. Instance 'x' can be provided to process of FIG. 63. The instance 'x' can be associated with a field 'pInfo'. x.pInfo can be set to the content of mesg.info, for use by process of FIG. 63. The process associated with FIG. 61 can move to step 6116 after the process associated with FIG. 63 is complete. Step 6116 indicates that the process associated with FIG. 61 is complete.

At step 6118, a check is made to determine if the type associated with message is GetGeneratorInfo. If the type is GetGeneratorInfo, the process moves to step 6120. If not, the process moves to step 6124. Step 6124 indicates that the process associated with FIG. 61 is complete. Returning to step 6120, the GD can send GeneratorInfo message to the sender of the message that is being processed. According to one aspect of the embodiment, a GetGeneratorInfo message can be sent by an instance of PD 202 that is in the process of associating with an embodiment of GD 302. The process associated with FIG. 27 can be used for sending the message. Instance 'x' can be provided to process of FIG. 27. The instance 'x' can be associated with fields dest, gInfo, coreInfo and senderContact. x.dest can be set to mesg.senderContact, x.gInfo can be set to gState.gInfo, x.coreInfo can be set to gState.core and x.senderContact can be set to gInfo.contact for use by process of FIG. 27. The process associated with FIG. 61 can move to step 6122 after the process associated with FIG. 27 is complete. Step 6122 indicates that the process associated with FIG. 61 is complete.

FIG. 62 illustrates the flow diagram of a process followed by a GD in updating gState when the GD is associating with a PD according to an embodiment of the present invention. In the embodiment described here, the process associated with FIG. 62 can be used by GD 302 in updating gState associated with the GD. The update of gState can include adding PI of the PD that is being associated, to gState.providerInfo list. gState.numInfo can indicate the number of elements of gState.providerInfo array that are valid. In other embodiments, other methods of maintaining a set of PI can be used. Mechanisms can include hash tables, linked lists or the like. The completion of process illustrated in FIG. 62 can indicate that the association of PD to the GD is complete.

The process starts at step 6202 and moves to step 6204. The process is provided with instance 'x' that can be associated with provInfo field. The values associated with instance 'x' can be provided by a process that uses the method illustrated by FIG. 62. x.provInfo is an instance of PI. A local copy of x.provInfo is made in step 6204. The local copy is referred to as rxProvInfo for use in subsequent steps of the process. The process can then move to step 6206. At step 6206, numInfo is set to gState.numInfo. The process then moves to step 6208. At step 6208, rxProvInfo is added to gState.providerInfo. rxProvInfo is added by copying rxProvInfo to numInfo-th element of gState.providerInfo array. The process then moves to step 6210. At step 6210, gState.numInfo is incremented. This can indicate that an additional element of gState.providerInfo is valid. The process then moves to step 6212. Step 6212 indicates that the process associated with FIG. 62 is complete.

FIG. 63 illustrates the flow diagram of a process followed by a GD in updating gState when the GD is disassociating with a PD according to an embodiment of the present invention. In the embodiment described here, the process associated with FIG. 63 can be used by GD 302 in updating gState associated with the GD when the GD is disassociating with an instance of PD 202. The update of gState can include removing PI of the PD that is being disassociated from gState.providerInfo list. The removal of the PI from gState.providerInfo can be accomplished by identifying the PI in gState.providerInfo list. The identification can be accomplished by finding an element of PI in gState.providerInfo whose provId matches the provId of the PI associated with the PD. gState.numInfo can indicate the number of elements of gState.providerInfo array that are valid. In other embodiments, other methods of maintaining a set of PI can be used. Mechanisms can include hash tables, linked lists or the like. The completion of process illustrated in FIG. 63 can indicate that the disassociation of PD with the GD is complete.

The process starts at step 6302 and moves to step 6304. The process is provided with instance 'x' that can be associated with provInfo field. The values associated with instance 'x' can be provided by a process that uses the method illustrated by FIG. 63. x.provInfo is an instance of PI. A local copy of x.provInfo is made in step 6304. The local copy is referred to as rxProvInfo for use in subsequent steps of the process. The process can then move to step 6306. At step 6306, numIds is set to gState.numInfo. The process then moves to step 6308. At step 6308, i is set to 0. The process can then move to step 6310. At step 6310 a check is made to determine if i is less than numIds. If the check succeeds, the process can move to step 6314. If not, the process can move to step 6312. Step 6312 indicates that the process associated with FIG. 63 is complete.

Returning to step 6314, i-th element of gState.providerInfo is retrieved and csInfo is set to the retrieved PI. The process can then move to step 6316. At step 6316, a check is made to determine if the provId associated with rxProvInfo matches the provId associated with csInfo. If the check succeeds, the process can move to step 6318. If not, the process can move to step 6324. At step 6324, i is incremented and the process moves to step 6310. The incremented value of i can be used to access/retrieve the next element of gState.providerInfo, if possible. Returning to step 6318, the element at index i can indicate that the PI that needs to be removed has been found in gState.providerInfo array. The element of gState.providerInfo at index (numIds−1) is copied to element at index i. The process can then move to step 6320. At step 6320, gState numInfo is decremented. This can indicate that the number of valid PI elements in gState.providerInfo is reduced by 1. The process can then move to step 6322. Step 6322 indicates that the process associated with FIG. 63 is complete.

FIG. 64 illustrates the flow diagram of a process followed by a GD in associating with a PD according to an embodiment of the present invention. The first embodiment of the invention illustrated methods of association between instances of PD 202 and instances of GD 302 that involves PD initiating association by requesting GeneratorInfo message from GD 302 and providing ProviderInfo message to GD 302 without GD requesting for ProviderInfo message. FIG. 64 illustrates a method of association of a PD 202 to an instance of GD 302 wherein the PD does not send a ProviderInfo message automatically upon receipt of a GeneratorInfo message.

The process starts at step 6402 and moves to step 6404. At step 6404, GD 302 can identify or detect new instances of PD 202 that the GD can associate with. The availability of new instances of PD 202 can be determined in ways that can be specific to the embodiment. For example in an embodiment wherein a PD can be associated to a GD using Ethernet cable one end of which is associated with NI 206 of PD 202 and other end with PINT 324 of GD 302, the presence of a PD can be determined by GD 302 when the link associated with the PINT 324 of GD 302 indicates that it is connected to a neighbor device (i.e., link comes up). Another example is an embodiment wherein a GD can be configured using information associated with PD 202. GD 302 can be configured or provided with contact information associated with PD 202 using UI 322 of GD 302. The configuration event wherein the contact information associated with PD 202 is available can indicate the presence of a new PD. In other embodiments, the presence of a new PD can be detected using discovery mechanisms such as the ones used by Bluetooth technology. The methods of detecting new instances of PD 202 described here are illustrative only and other methods of detecting instances of PD 202 can be used. Once GD 302 detects a new PD, the process can move to step 6406.

At step 6406, PI associated with the detected PD can be determined. The method of determining PI associated with PD can be specific to each embodiment. As illustrated in the first embodiment, a GetProviderInfo message can be sent to the PD. In other embodiments, other mechanisms can be used. FIG. 65-67 illustrates among other aspects, the mechanism of determining PI associated with PD in different embodiments. The process can then move to step 6408.

At step 6408, the GD can associate with the PD. The association can be performed using the process illustrated in FIG. 62. Instance 'x' can be provided to process of FIG. 62. Instance 'x' can be associated with a 'prov' field. 'x.prov' can be set to the PI determined in step 6406. The process illustrated in FIG. 64 can move to step 6410 once the process associated with FIG. 62 is complete. Step 6410 indicates that the process associated with FIG. 64 is complete.

FIG. 65 illustrates the flow diagram of a process followed by a GD in getting PI from a PD, when the GD is connected using physical means to the PD, according to an embodiment of the present invention. In one embodiment of invention an instance of PD 202 is physically connected using wires to an instance of GD 302. An example of such wiring is Ethernet. The physical wiring and associated technology can help in detecting the connection of a partner device. In Ethernet technology, this can be accomplished by a device if the link associated with the Ethernet interface on the device comes up. In other embodiments, an instance of GD 302 can be connected to an instance of PD 202 when GD 302 is "docked" to PD 202. An example of such docking can be implemented when NI 206 of PD 202 and PINT 324 of GD 302 are implemented using USB such that GD 302 can be plugged into PD 202. A similar form of connectivity exists when a thumb drive is plugged into a laptop's USB port. In this embodiment, physical wires are not present, but a direct connection between PD 202 and GD 302 is established. Other methods of associating GD 302 with PD 202, are possible.

The process starts at step 6502 and moves to step 6504. At step 6504, GD 302 sends a GetProviderInfo message to the PD that the GD is connected to. The method of associating the message to the PD can be specific to each embodiment. USB for example provides a mechanism to address messages to the connected partner device. The process can then move to step 6506. The sending of a GetProviderInfo message to PD 202 can result in PD 202 responding with a ProviderInfo message. GD 302 waits in step 6506 for the ProviderInfo message from the PD. Once the GD receives the ProviderInfo message from PD, the info field associated with the received message can be used as the PI associated with the PD. The process can then move to step 6508. Step 6508 indicates that the process associated with FIG. 65 is complete.

FIG. 66 illustrates the flow diagram of a process followed by a GD in getting PI from a PD, when the GD is configured with information associated with the PD, according to an embodiment of the present invention. In some embodiments, an instance of GD 302 can be provisioned with information that can include contact associated with PD 202. An example of such an embodiment is when the GD 302 and PD 202 can communicate with each other using a network such as the Internet. In such embodiments, GD 302 can be configured with an IP address and port number associated with PD 202. GD 302 can also be configured with a DNS name of PD 202, while the port number can be implicit. In such embodiments, the presence of configuration information can indicate the presence of instances of PD 202 that the GD can associate with. The method of connectivity, the configuration information that are described here are illustrative only. Other forms of connectivity and configuration are possible. In some embodiments, GD 302 can be configured with information that can contain PI of PD 202. Other methods or configurations are possible.

The process starts at step 6602 and moves to step 6604. At step 6604, the GD can determine if PI associated with a PD 202 can be determined from the configured information. If the GD is provisioned with information from which PI associated with the PD can be determined, the process can move to step 6606. If not, the process can move to step 6608.

At step 6606, PI associated with PD 202 can be determined from the provisioned information. The process can then move to step 6612.

Returning to step 6608, GD 302 can sends a GetProviderInfo message to the PD that the GD is configured with. The configuration in this case includes the contact associated with PD 202. In embodiments wherein IP address and port number of PD 202 are included in configuration, the IP address and port number from configuration can be used for the contact of PD 202. The sending of a GetProviderInfo message to PD 202 can result in PD 202 responding with a ProviderInfo message. GD 302 waits in step 6610 for the ProviderInfo message from the PD. Once the GD receives the ProviderInfo message from PD, the info field associated with the received message can be used as the PI associated with the PD. The process can then move to step 6612. Step 6612 indicates that the process associated with FIG. 66 is complete.

FIG. 67 illustrates the flow diagram of a process followed by a GD in getting PI from a PD, when the GD discovers the PD, according to an embodiment of the present invention. An example of such embodiment is when PINT 324 of GD 302 and NI 206 of PD 302 can include support for Bluetooth connectivity. GD 302 can detect PD 302 using mechanisms provided by Bluetooth technology.

The process starts at step 6702 and moves to step 6704. The GD, at step 6704 can send a GetProviderInfo message to the PD that has been discovered using Bluetooth. The sending of a GetProviderInfo message to PD 202 can result in PD 202 responding with a ProviderInfo message. GD 302 waits in step 6706 for the ProviderInfo message from the PD. Once the GD receives the ProviderInfo message from PD, the info field associated with the received message can be used as the PI associated with the PD. The process can then move to step 6708. Step 6708 indicates that the process associated with FIG. 67 is complete.

Figure 68A:
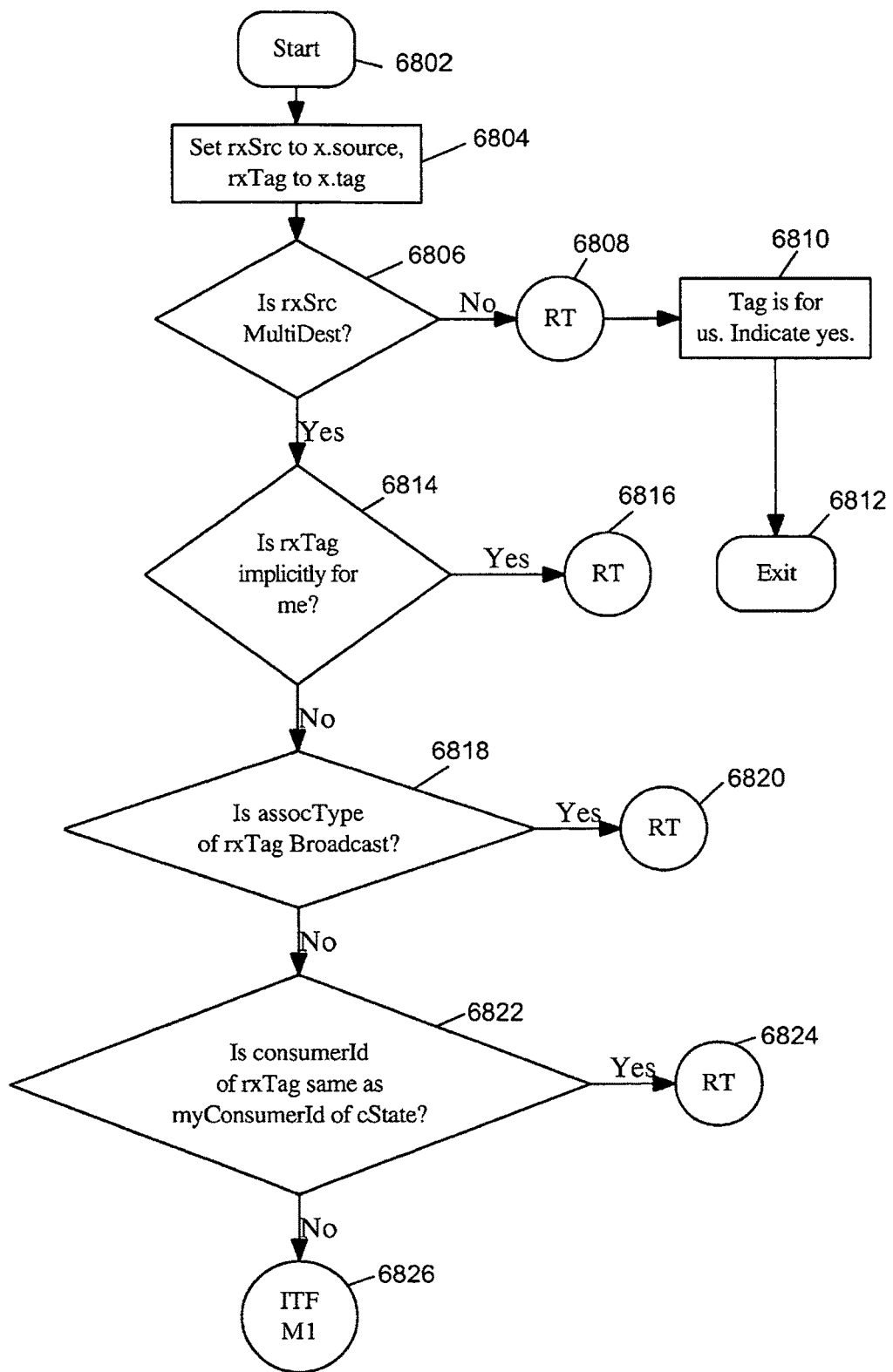
FIG. 68A-B illustrate the flow diagrams of a process followed by a CD to determine if a tag received by the CD can be used by the CD, according to an embodiment of the present invention.
Figure 68B:
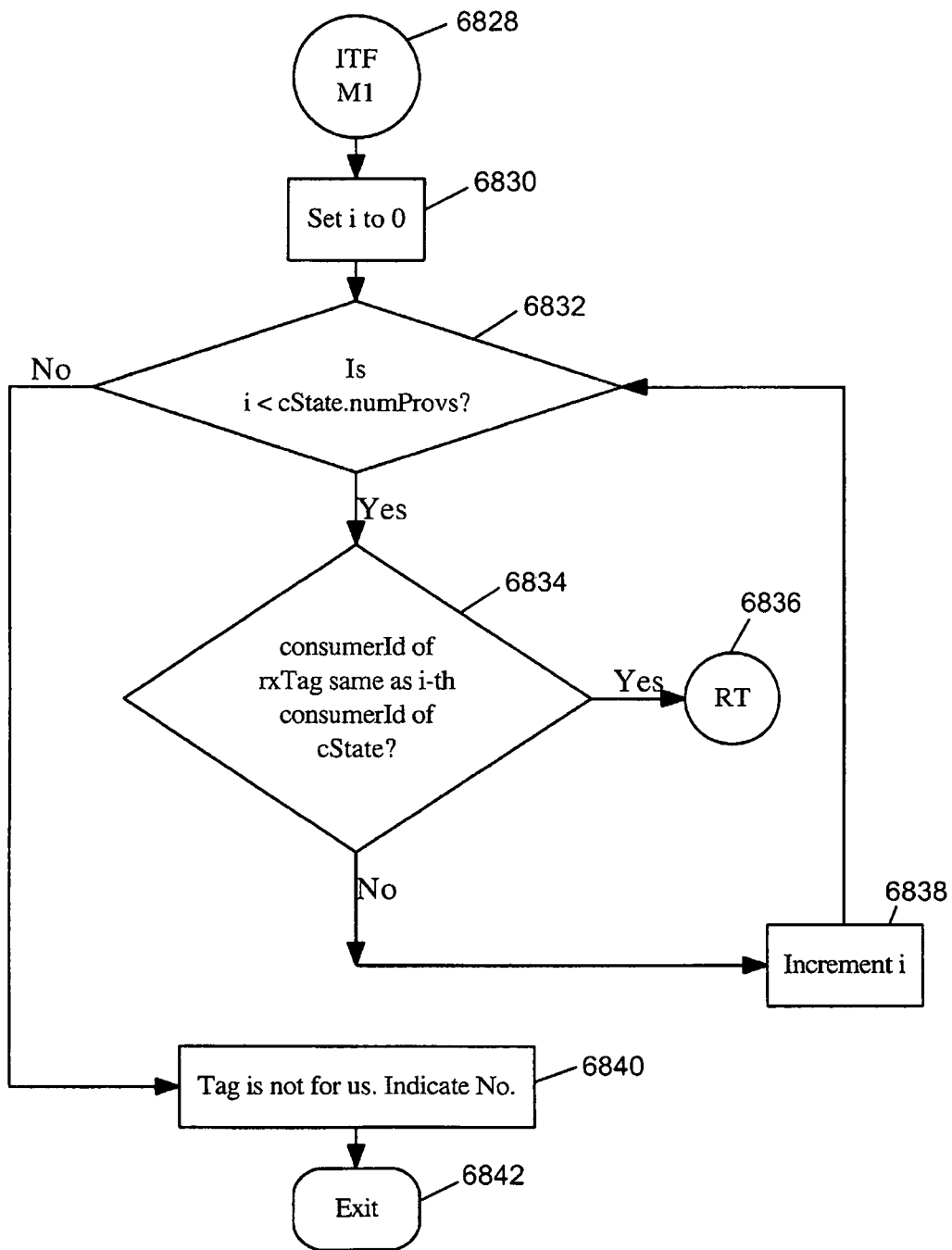

FIG. 68A-B illustrate the flow diagrams of a process followed by a CD to determine if a tag received by a CD can be used by the CD, according to an embodiment of the present invention. In one embodiment of the invention, an instance of CD 102 can use the process associated with FIG. 68A-B in determining if a tag received by the CD can be used by it. In some embodiments, tags can be used by a CD in starting applications on the CD, downloading applications by the CD, and updating any state associated with the CD, among others. Instances of CD can use tags in ways not described here. The process associated with FIG. 68A-B can determine if a tag received by a CD is meant for use by the CD using a variety of information. Information used can include assocType associated with tag, the instance of NI 106 on which the tag is received, the type of NI 106 on which the tag is received, including others. The method of determining if a tag can be used by the CD, as illustrated in FIG. 68A-B is illustrative only and meant for use by the embodiment of the invention described here. Other embodiments can use other information and/or other methods to determine if a tag received by a CD can be used by the CD. The methods, information used, etc. as described in FIG. 68A-B is not meant to be limiting the scope of the invention or any of its embodiments.

The process starts at step 6802 and moves to step 6804. The process is provided with instance 'x' that can be associated with fields source and tag. The values associated with instance 'x' can be provided by a process that uses the method illustrated by FIG. 68A-B. x.source is an instance of ContextTransport (CT) and x.tag is an instance of Tag. At step 6804, a local copy of x.source is made. The local copy is referred to as rxSrc for use in subsequent steps of the process. A local copy of x.tag is also made. The local copy is referred to as rxTag for use in subsequent steps of the process. The process can then move to step 6806.

At step 6806, a check is done to determine if the rxSrc holds a value of MultiDest. If the check succeeds the process can move to step 6814. If not, the process can move to step 6808. Step 6808 indicates that the process can move to step 6810. A value of MultiDest for rxSrc can indicate that the tag can be received by multiple instances of CD 102 because of the nature of NI 106. An example of such an interface can be based on Ethernet or Wifi, or the like. Ethernet frames sent on an Ethernet cable can be received by any device that is attached to the cable. A SingleDest value for rxSrc associated with an instance of NI 106 can imply that the CD receiving the tag is the only recipient of the tag. This can indicate that the tag is meant for use by the CD. An example of such an interface is an Ethernet interface wherein the NI 106 of CD 102 is connected directly to NI 206 of a PD. There can be no other instance of CD 102 that can receive the tag provided by the PD in this embodiment. Other SingleDest interface can include a custom interface that can use hardware signaling to communicate the tag provide by a PD to a CD. The interface (and related connectivity—wired or wireless) can be designed to support only two devices—one PD and one CD.

Returning to step 6808, step 6808 can imply that the tag received by the CD can be used by the CD. The process can move to step 6810. Step 6810 can indicate that the tag is meant for use by the CD. The process can move to step 6812. Step 6812 indicates that the process associated with FIG. 68A-B is complete.

Returning to step 6814, a check is done to determine if the tag received by the CD is meant for the CD due to reasons that can be specific to the embodiment. In some embodiments, a tag can be meant for use by the CD implicitly due to reasons that can be specific to the embodiment. An example of such a reason is when a tag is received by a CD 102 on an instance of NI 106 which supports Bluetooth. Bluetooth technology can help associate the NI 106 interface of CD 102 with an interface of NI 206 of PD 202 (which supports Bluetooth). In such embodiments, PD 202 can send a tag to the CD 102 by using Bluetooth addressing scheme. In such case, the receipt of a tag can indicate that the tag was addressed to CD 102 using Bluetooth addressing scheme. Another example is when an interface NI 106 is of type Ethernet. In such embodiments, a tag can be addressed to an instance of CD 102 using an Ethernet frame with the destination Ethernet address in Ethernet frame matching the Ethernet address of NI 106 on which the Ethernet frame containing the tag is received. CD 102 receiving a tag on such interface can imply that the tag can be used by the CD. In some embodiments of CD 102, tags received on a NI 106 interface of type wifi, can be meant for use by any CD that can receive the tags using wifi. The implicit reasons mentioned here are illustrative only. Other embodiments can have other methods of determining if a tag can be used by a CD that receives it. The reasons and/or methods can be specific to the embodiment. If the tag is meant for use by the CD according to the embodiment, the process can move to step 6816. Step 6816 indicates that the process can move to step 6808. If the check at step 6814 fails, the process can move to step 6818.

At step 6818, a check can be made to determine if assocType associated with rxTag holds a value of Broadcast. If the check succeeds, the process can move to step 6820. Step 6820 indicates that the process can move to step 6808.

If the check at step 6818 fails, the process can move to step 6822. An assocType holding a value of Broadcast can indicate that the tag can be used by any instance of CD 102 that receives the tag, according to this embodiment of the invention.

Returning to step 6822, a check is made at this step to determine if the consumerId associated with rxTag is same as cState.myConsumerId. A successful check can indicate that the tag is addressed to the CD 102 that is processing the tag. If the check is success, the process can move to step 6824. Step 6824 can indicate that the process can move to step 6808. If the check at step 6822 fails, the process can move to step 6826. Step 6826 indicates that the process can move to step 6828 of FIG. 68B.

Step 6828 indicates that the process can move to step 6830. The portion of the process starting at step 6830 can be used to determine if the consumerId associated with rxTag matches any of the values as maintained by cState.consumerId list. At step 6830, an i is set to 0. The process can then move to step 6832. At step 6832, a check is made to determine if i is less than cState.numProvs If the check succeeds, the process can move to step 6834. If the check fails, the process can move to step 6840. At step 6840, a determination can be made that the tag is not meant for use by the CD. The process can then move to step 6842. Step 6842 indicates that the process associated with FIG. 68A-B is complete.

Returning to step 6834, a check can be made at this step to determine if consumerId associated with rxTag matches the i-th element of State.consumerId array. If the check fails, the process can move to step 6838. At step 6838, i is incremented and the process can move to step 6832. If the check at step 6834 is a success, it can indicate that the consumerId associated with rxTag matches the consumerId as provided by an instance of PD referred to by i-th element of cState.provs array. This can happen if the assocType of tag generated by the PD associated with i-th element of cState.provs is Multicast. A successful check at step 6834 can cause the process to move to step 6836. Step 6836 indicates that the process can move to step 6808 of FIG. 68A.

Figure 69A:
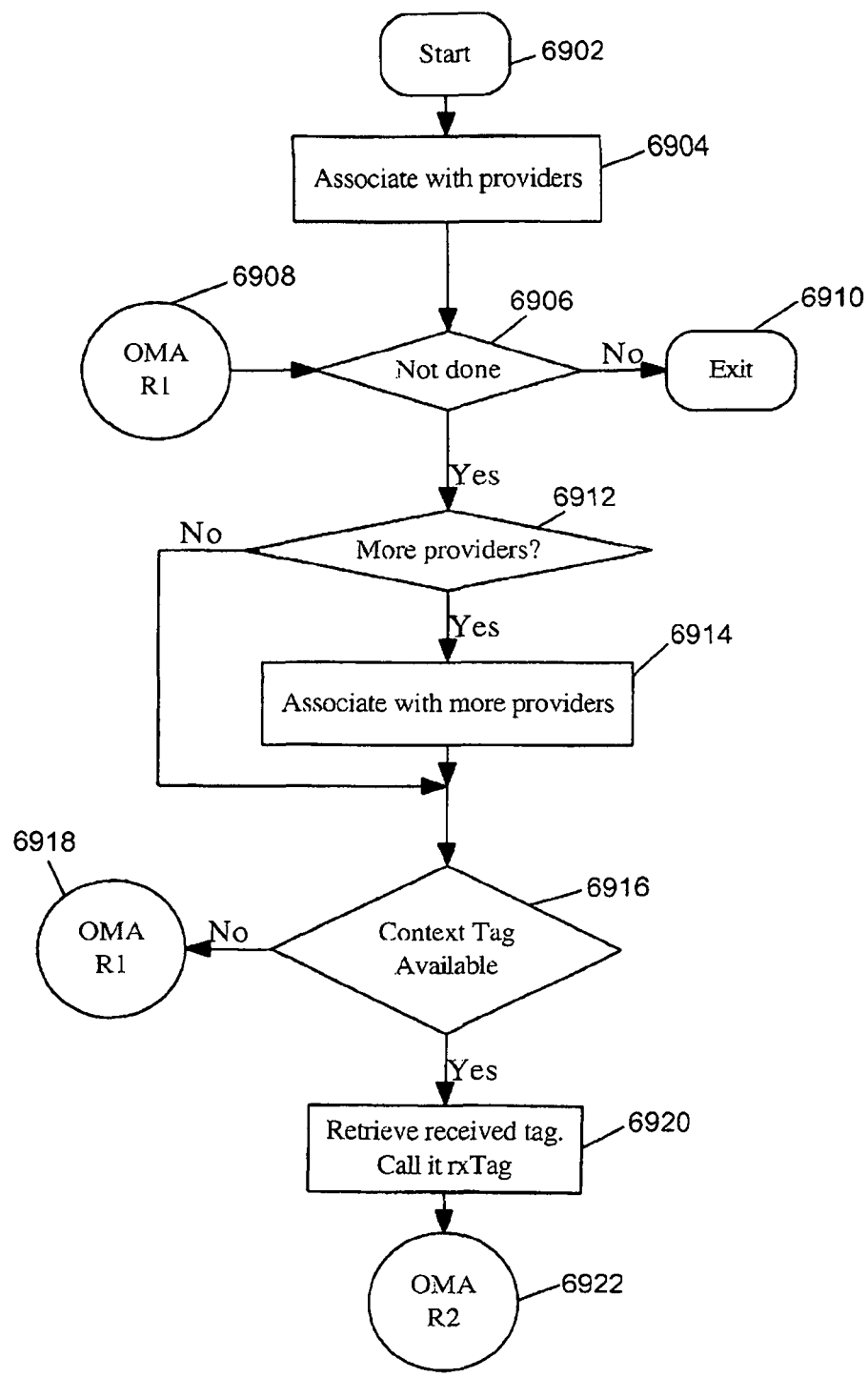
FIG. 69A-B illustrate the flow diagrams of a process followed by a CD in associating with PDs and handling tags received by the CD according to an embodiment of the present invention.
Figure 69B:
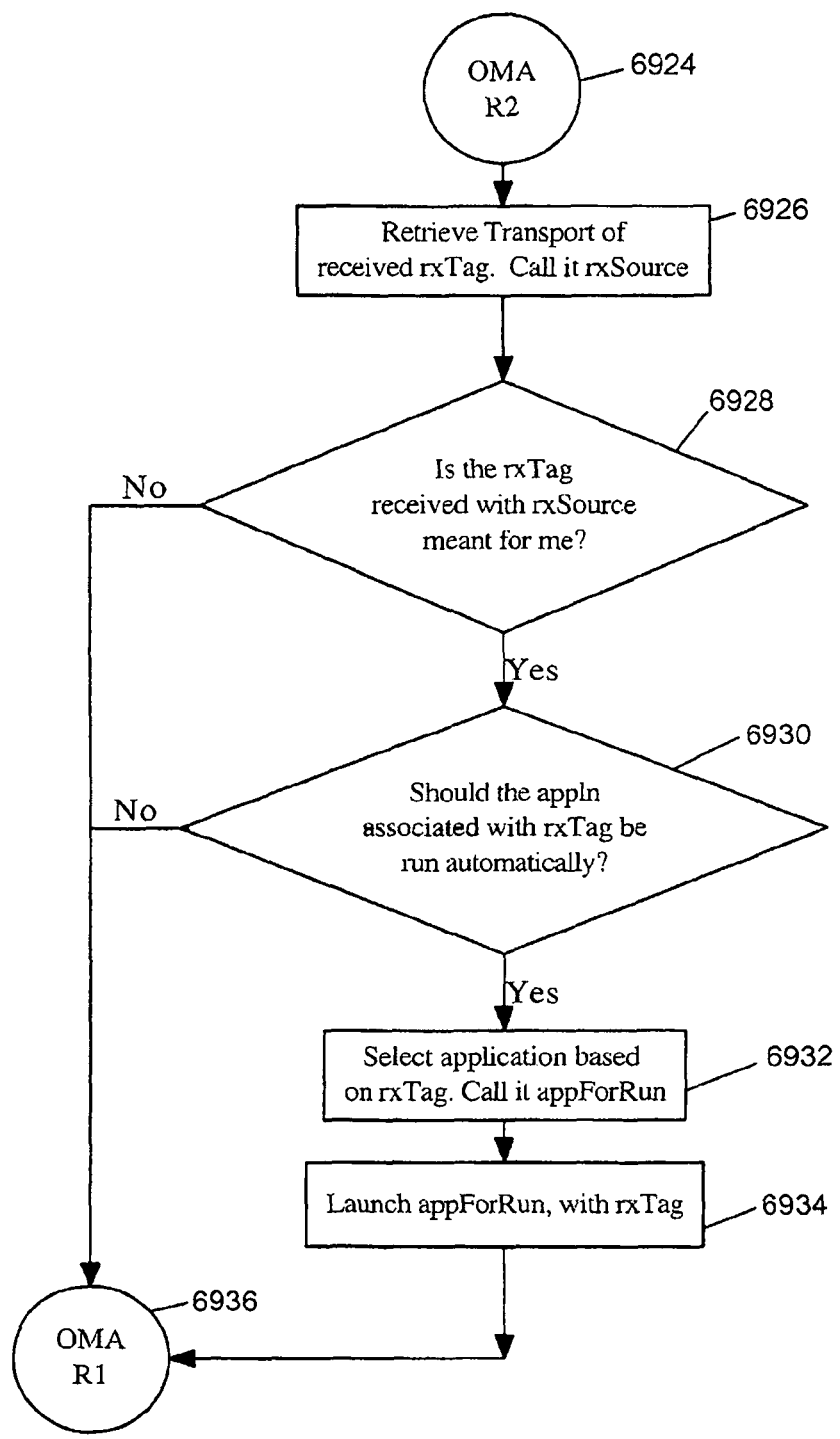

FIG. 69A-B illustrate the flow diagrams of a process followed by a CD in associating with PDs and handling tags received by the CD according to an embodiment of the present invention. In an embodiment of the invention, an instance of CD 102 can use the method illustrated in FIG. 69A-B to perform functions that can include association of a CD 102 with instances of PD 202, processing of tags received by the CD, running applications associated with the received tags, among others. In the embodiment described here, a CD 102 can associate tags received by the CD with applications, determine if the application can be run, and run the application, in addition to performing other functionality. The method followed in processing the tags, handling of applications associated with tags, association with instances of PD, and other functionality as illustrated in FIG. 69A-B is illustrative and meant for use by the embodiment described here. Other embodiments can choose to perform the functions differently, and can choose to not include some or all of the steps illustrated here. The methods and processes illustrated in FIG. 69A-B are not meant to be limiting the scope of the invention or any of its embodiments.

The process starts at step 6902 and moves to step 6904. At step 6904, the CD 102 can first associate with any instances of PD 202. The method(s) illustrated in FIG. 33-36 can be used by an instance of CD 102 in detecting instances of PD 202 and/or associating with them. The process associated with FIG. 69A-B can then move to step 6906. At step 6906 a determination can be done if the process associated with FIG. 69A-B needs to be terminated. If the process needs to be terminated, the process can move to step 6910. Step 6910 indicates that the process associated with FIG. 69A-B is complete. In some embodiments as in case of smart phones or tablet computers running Android operating system, the process associated with FIG. 69A-B can be used when an Android service is activated. The process associated with FIG. 69A-B can be stopped when the Android service is stopped.

If the check at step 6906 determines that the process does not need to be terminated, the process can move to step 6912. At step 6912, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 69A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 69A-B is implemented on a device such as a smart phone or tablet computer running Android operating system, a user of the device can choose to disable interfaces associated with the devices such as Wifi interfaces, or Bluetooth devices, or the like, while the service associated with FIG. 69A-B is running.

If the check at step 6912 determines that the CD can associate with new instances of PD 202, the process can move to step 6914. At step 6914, the CD can detect and associate with any new instances of PD 202. The method(s) illustrated in FIG. 33-36 can be used by an instance of CD 102 in detecting instances of PD 202 and/or associating with them. The process can then move to step 6916. If the check at step 6912 determines that the CD cannot detect/associate with new instances of PD 202, the process can move to step 6916.

At step 6916, a check is made to determine if CD 102 has any new tags available for processing. In one embodiment, new tags can be received by an instance of CD 102 when the tags can be provided by instances of PD 202 that the CD 102 can be associated with. In one embodiment, where tags can be provided by instances of PD 202 using wifi network, tags can be included in an Ethernet frame that can be associated with a well known protocol type. In such embodiment, the receipt of an Ethernet frame associated with the well known protocol type on the wifi interface can indicate the availability of new tag for processing by FIG. 69A-B. In another embodiment wherein the process associated with FIG. 69A-B can be implemented as a service on Android operating system, tags can be provided to the process using Intent mechanism of Android. Other methods can be used to provide tags to the process of FIG. 69A-B. If the check at step 6916 determines that the process has new tags for processing, the process can move to step 6920. If not, the process can move to step 6918. Step 6918 indicates that the process can move to step 6908. Step 6908 indicates that the process can move to step 6906.

Returning to step 6920, the tag available for processing by the process can be retrieved at this step. The retrieved tag is referred to as rxTag for use in subsequent steps of the process. The method of retrieving a tag can be specific to the embodiment. In embodiments wherein the tags are provided in Ethernet frames on wifi networks, on devices running Android operating system, the method of retrieving the tag can involve the process making a system call or calling an API of Android operating system to retrieve the Ethernet frame. The tag can then be retrieved from the frame. The process can then move to step 6922. Step 6922 indicates that the process associated with FIG. 69A-B can then move to step 6924 of FIG. 69B. Step 6924 indicates that the process can move to step 6926.

At step 6926, the transport associated with rxTag can be determined. The transport determined at this step is referred to as rxSource for use in subsequent steps of the process. rxSource can take one of the values as illustrated in FIG. 8. The method of determining rxSource can be specific to the embodiment. In embodiments wherein the tag is received using an Ethernet frame on wifi interface with a destination Ethernet address of Broadcast Ethernet address, rxSource can be determined to be MultiDest. If the Ethernet frame has a destination Ethernet address matching the address of wifi interface, rxSource can be set to SingleDest. If the tag is provided using the Intent mechanism of Android operating system, tags associated with Implicit Intents can be associated with MultiDest, whereas tags associated with Explicit Intents can be associated with SingleDest transport. Other methods of determining rxSource can be possible in other embodiments. The process can then move to step 6928.

At step 6928, a check is done to determine if the rxTag that can be associated with rxSource is meant for use by the CD. In one embodiment of the invention, the process associated with FIG. 68A-B can be used to make the determination. rxTag and rxSource can be provided to the methods of FIG. 68A-B via instance 'x'. 'x.source' can be set to rxSource and x.tag can be set to rxTag before the process associated with FIG. 68A-B can be used. If it is determined that rxTag can be used by the CD, the process can move to step 6930. If not, the rxTag can be ignored (not used/not processed) and process can move to step 6936. Step 6936 indicates that the process can move to step 6908 of FIG. 69A.

Returning to step 6930, a determination can be made at this step to check if application that can be associated with rxTag can be run. In the embodiment described here, an autoRun field associated with rxTag as illustrated in FIG. 5 can be used to determine if the application associated with rxTag can be run. In other embodiments, CD 102 can be associated with a configuration that can specify a set of types associated with tags for which associated applications can be run automatically. Other embodiments can use other methods of determining if an application associated with a given tag can be run automatically. If the check at step 6930 indicates that application associated with rxTag can be run automatically, the process can move to step 6932. If not, the process can move to step 6936.

Referring to step 6932, an application can be selected for association with rxTag at this step. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 6934.

At step 6934, appForRun application can be launched or run. The launch or run of an application can involve starting a program associated with the application, in some embodiments. The starting of program can include one or more of reading a program from storage, creating a process for the program, and transferring control to the program. In other embodiments, as in case of Android, launching of an application can include starting an activity, starting a service, or the like. Launching an activity can include sending of a message. The launching/run of an application can include providing parameters to the application. The parameters include options that can be specific to the application. The parameters can also include options that can be specific to the embodiment (as in environment variables as described in Linux Operating System). It can be noted that the launch/run of an application as described here is illustrative and other methods of launching/running an application are possible in other embodiments. rxTag can be provided as input to the run of appForRun. Other rxTag specific data, or any other embodiment specific data can be provided as input to the run of appForRun. In an environment that can support run of multiple applications at any time (such as the Android operating system/platform), the process can move to step 6936 while appForRun is running. If the environment associated with CD 102 that can include the operating system which does not support run of multiple applications, the process associated with FIG. 69A-B can wait in step 6934 for completion of run of appForRun. In such embodiments, the process can move to step 6936 after the run of appForRun is complete. Other embodiments can choose to move to step 6936 after appForRun is launched in step 6934. It can be noted that in some embodiments, there cannot be an application that can be associated with rxTag at step 6932. In some embodiments, this can be indicated by a Null value for appForRun. Under such conditions, an application is not launched and/or run at step 6934.

Figure 70A:
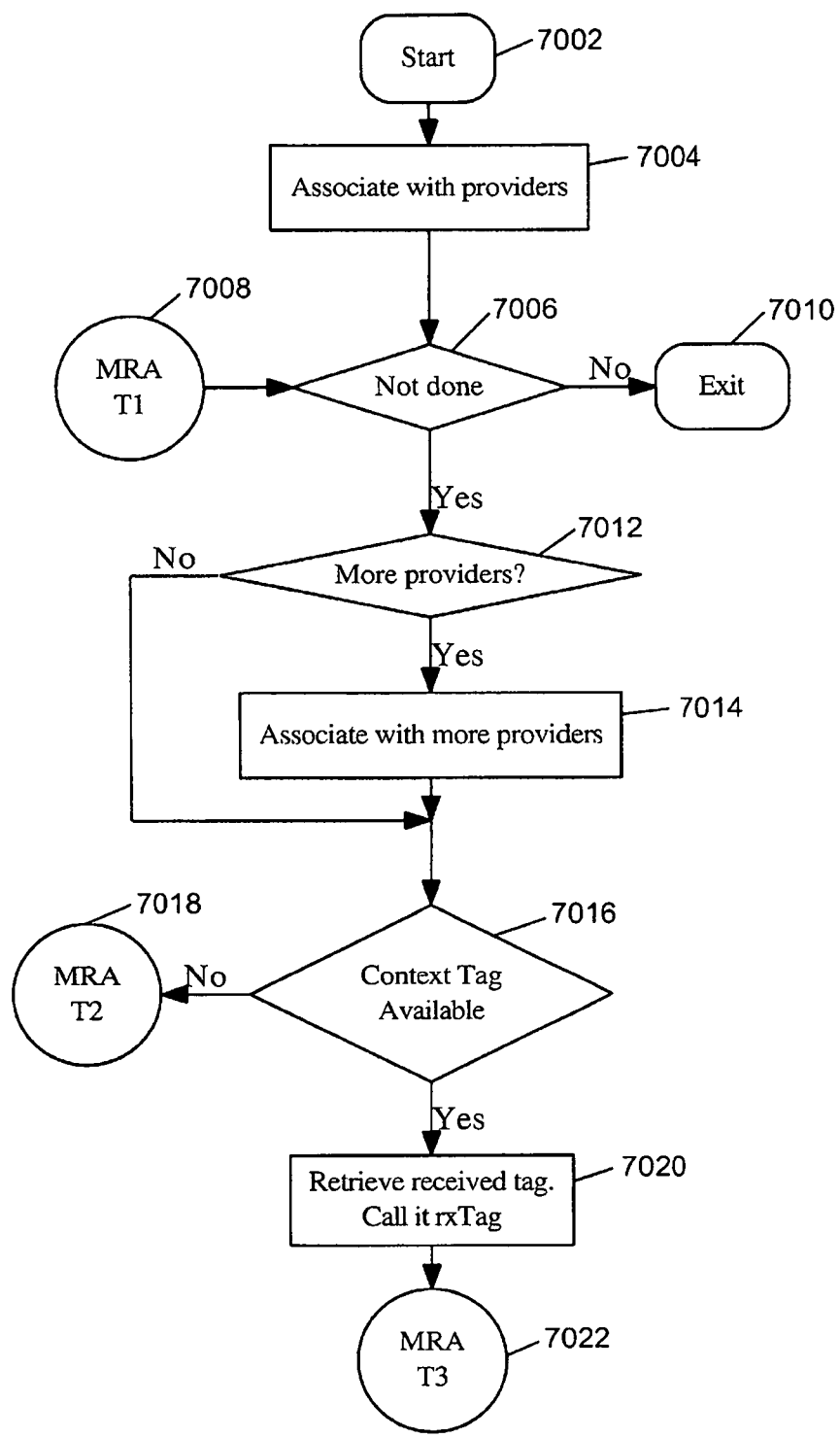
FIG. 70A-B illustrates the flow diagram of a process followed by a CD in associating with PDs and handling tags received by the CD according to another embodiment of the present invention.
Figure 70B:
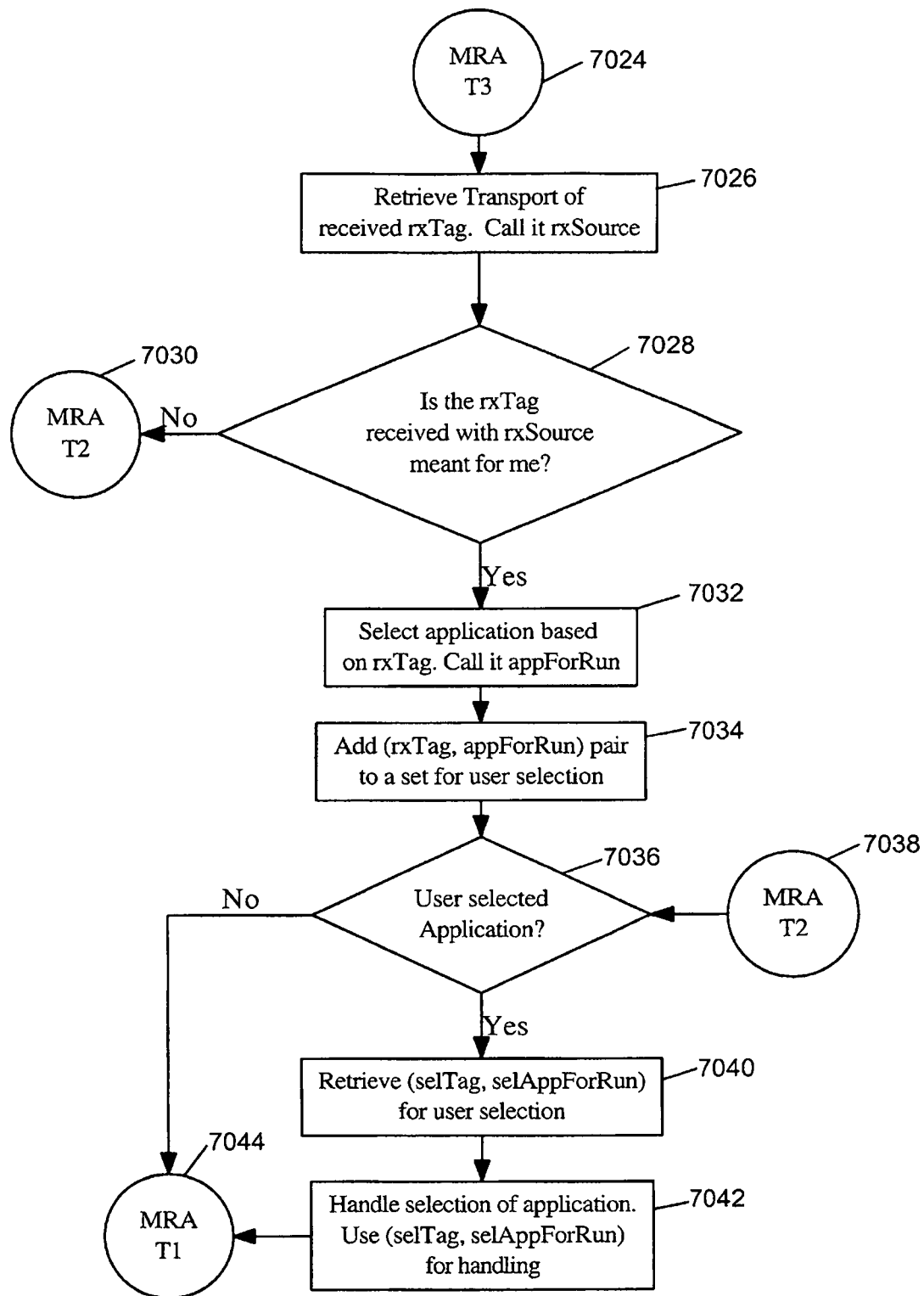

FIG. 70A-B illustrate the flow diagrams of a process followed by a CD in associating with PDs and handling tags received by the CD according to a yet another embodiment of the present invention. In an embodiment of the invention, an instance of CD 102 can use the method illustrated in FIG. 70A-B to perform functions that can include association of a CD 102 with instances of PD 202, processing of tags received by the CD, selection of applications interactively, running applications (based on a selection by a user) associated with the received tags, among others. In the embodiment described here, a CD 102 can associate tags received by the CD with applications, interactively determine if the application can be run, and run the application, in addition to performing other functionality. The method followed in processing the tags, handling of applications associated with tags, association with instances of PD, and other functionality as illustrated in FIG. 70A-B is illustrative and meant for use by the embodiment described here. Other embodiments can choose to perform the functions differently, and can choose to not include some or all of the steps illustrated here. The methods and processes illustrated in FIG. 70A-B are not meant to be limiting the scope of the invention or any of its embodiments.

The process illustrated by FIG. 70A-B differs from the process in FIG. 69A-B in that the process as illustrated with FIG. 70A-B can include a method to allow for a user (of CD 102) to launch the applications, after tag(s) is/are associated with application(s). The methods of FIG. 69A-B on the other hand can determine if an application can be run/launched using method(s) that can not include user interaction. In an embodiment where CD 102 can be implemented on devices such as smart phones/tablet computers running Android operating system, an Activity of Android can be used to present tags and associated applications as a list using UI 126 of CD 102. An event that can include a selection of an application from the list by a user of CD 102 can result in the application being launched/run by CD 102. The list of tags and applications can be presented after the tags can be associated with applications, in some embodiments.

In other embodiments, UI 126 can be used to present a list of tags. A selection of tags on UI 126 can be used to determine an application that can be associated with the selected tag(s). The application(s) associated with selected tags can be presented to user. A selection of the application presented to the user can result in CD 102 launching/running the selected application(s). In some embodiments, the applications determined for selected tags can not be presented to user via UI 126. Rather, the applications can be launched/run once the applications can be determined for the selected tags. The method illustrated in FIG. 70A-B includes the association of tags to applications, and includes presenting of applications for user selection via UI 126. It can be noted that the method of using user interaction to determine a selected set of tags and/or applications as indicated here is illustrative, meant for use by the embodiments described here. Other methods of involving user interaction in determining the applications to be launched, tags to be used, PDs that the CD can associate with, can be used. The methods, processes and information used here are not meant to be limiting the scope of the invention or any of its embodiments.

The process starts at step 7002 and moves to step 7004. At step 7004, the CD 102 can first associate with any instances of PD 202. The method(s) illustrated in FIG. 33-36 can be used by an instance of CD 102 in detecting instances of PD 202 and/or associating with them. The process associated with FIG. 70A-B can then move to step 7006. At step 7006 a determination can be done if the process associated with FIG. 70A-B needs to be terminated. If the process needs to be terminated, the process can move to step 7010. Step 7010 indicates that the process associated with FIG. 70A-B is complete. In some embodiments as in case of smart phones or tablet computers running Android operating system, the process associated with FIG. 70A-B can be used when an Android service is activated. The process associated with FIG. 70A-B can be stopped when the Android service is stopped.

If the check at step 7006 determines that the process does not need to be terminated, the process can move to step 7012. At step 7012, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 70A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 70A-B is implemented on a device such as a smart phone or tablet computer running Android operating system, a user of the device can choose to disable interfaces associated with the devices such as Wifi interfaces, or Bluetooth devices, or the like, while the service associated with FIG. 70A-B is running.

If the check at step 7012 determines that the CD can associate with new instances of PD 202, the process can move to step 7014. At step 7014, the CD can detect and associate with any new instances of PD 202. The method(s) illustrated in FIG. 33-36 can be used by an instance of CD 102 in detecting instances of PD 202 and/or associating with them. The process can then move to step 7016. If the check at step 7012 determines that the CD cannot detect/associate with new instances of PD 202, the process can move to step 7016.

At step 7016, a check is made to determine if CD 102 has any new tags available for processing. In one embodiment, new tags can be received by an instance of CD 102 when the tags can be provided by instances of PD 202 that the CD 102 can be associated with. In one embodiment, where tags can be provided by instances of PD 202 using wifi network, tags can be included in an Ethernet frame that can be associated with a well known protocol type. In such embodiment, the receipt of an Ethernet frame associated with the well known protocol type on the wifi interface can indicate the availability of new tag for processing by FIG. 70A-B. In another embodiment wherein the process associated with FIG. 70A-B can be implemented as a service on Android operating system, tags can be provided to the process using Intent mechanism of Android. Other methods can be used to provide tags to the process of FIG. 70A-B. If the check at step 7016 determines that the process has new tags for processing, the process can move to step 7020. If not, the process can move to step 7018. Step 7018 indicates that the process can move to step 7008. Step 7008 indicates that the process can move to step 7006.

Returning to step 7020, the tag available for processing by the process can be retrieved at this step. The retrieved tag is referred to as rxTag for use in subsequent steps of the process. The method of retrieving a tag can be specific to the embodiment. In embodiments wherein the tags are provided in Ethernet frames on wifi networks, on devices running Android operating system, the method of retrieving the tag can involve the process making a system call or calling an API of Android operating system to retrieve the Ethernet frame. The tag can then be retrieved from the frame. The process can then move to step 7022. Step 7022 indicates that the process associated with FIG. 70A-B can then move to step 7024 of FIG. 70B. Step 7024 indicates that the process can move to step 7026.

At step 7026, the transport associated with rxTag can be determined. The transport determined at this step is referred to as rxSource for use in subsequent steps of the process. rxSource can take one of the values as illustrated in FIG. 8. The method of determining rxSource can be specific to the embodiment. In embodiments wherein the tag is received using an Ethernet frame on wifi interface with a destination Ethernet address of Broadcast Ethernet address, rxSource can be determined to be MultiDest. If the Ethernet frame has a destination Ethernet address matching the address of wifi interface, rxSource can be set to SingleDest. If the tag is provided using the Intent mechanism of Android operating system, tags associated with Implicit Intents can be associated with MultiDest, whereas tags associated with Explicit Intents can be associated with SingleDest transport. Other methods of determining rxSource can be possible in other embodiments. The process can then move to step 7028.

At step 7028, a check is done to determine if the rxTag that can be associated with rxSource is meant for use by the CD. In one embodiment of the invention, the process associated with FIG. 68A-B can be used to make the determination. rxTag and rxSource can be provided to the methods of FIG. 68A-B via instance 'x'. 'x.source' can be set to rxSource and x.tag can be set to rxTag before the process associated with FIG. 68A-B can be used. If it is determined that rxTag can be used by the CD, the process can move to step 7032. If the rxTag cannot be used by the CD, the process can move to step 7030. Step 7030 indicates that the process can move to step 7038. Step 7038 indicates that the process can move to step 7036.

Referring to step 7032, an application can be selected for association with rxTag at this step. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 7034.

At step 7034, the rxTag and appForRun pair can be associated with a list of (tag, application) pairs that can allow for selection of a pair by a user of CD 102. The set of (tag, application) pairs can be presented to user using UI 126 of CD 102. The process can then move to step 7036.

At step 7036, a determination is made to see if a user has selected an application from the list presented using UI 126. If the user has made a selection that can be associated with a (tag, application) pair from the list, the process can move to step 7040. If not, the process can move to step 7044. Step 7044 indicates that the process can move to step 7008 of FIG. 70A. Returning to step 7040, the (tag, application) pair associated with a user selection can be retrieved. The tag of selected pair can be referred to as selTag, and application of selected pair can be referred to as selAppForRun for use in subsequent steps of the process. The process can then move to step 7042.

At step 7042, the selected pair can be handled. In one embodiment, selAppForRun can be launched/run at this step. selTag can be provided as input to the run of selApp-ForRun. Other selTag specific data, or any other embodiment specific data can be provided as input to the run of selAppForRun. In an environment that can support run of multiple applications at any time (such as the Android operating system/platform), the process can move to step 7044 while selAppForRun is running. If the environment associated with CD 102 that can include an operating system, does not support run of multiple applications, the process associated with FIG. 70A-B can wait in step 7042 for completion of run of selAppForRun. In such embodiments, the process can move to step 7044 after the run of selAppForRun is complete. Other embodiments can choose to move to step 7044 after selAppForRun is launched in step 7042.

It can be noted that in some embodiments, there cannot be an application that can be associated with rxTag at step 7034. In some embodiments, this can be indicated by a Null value for appForRun. Under such conditions, a (rxTag, appForRun) pair is not added to the list for user selection, and the process can move to step 7008.

Figure 71A:
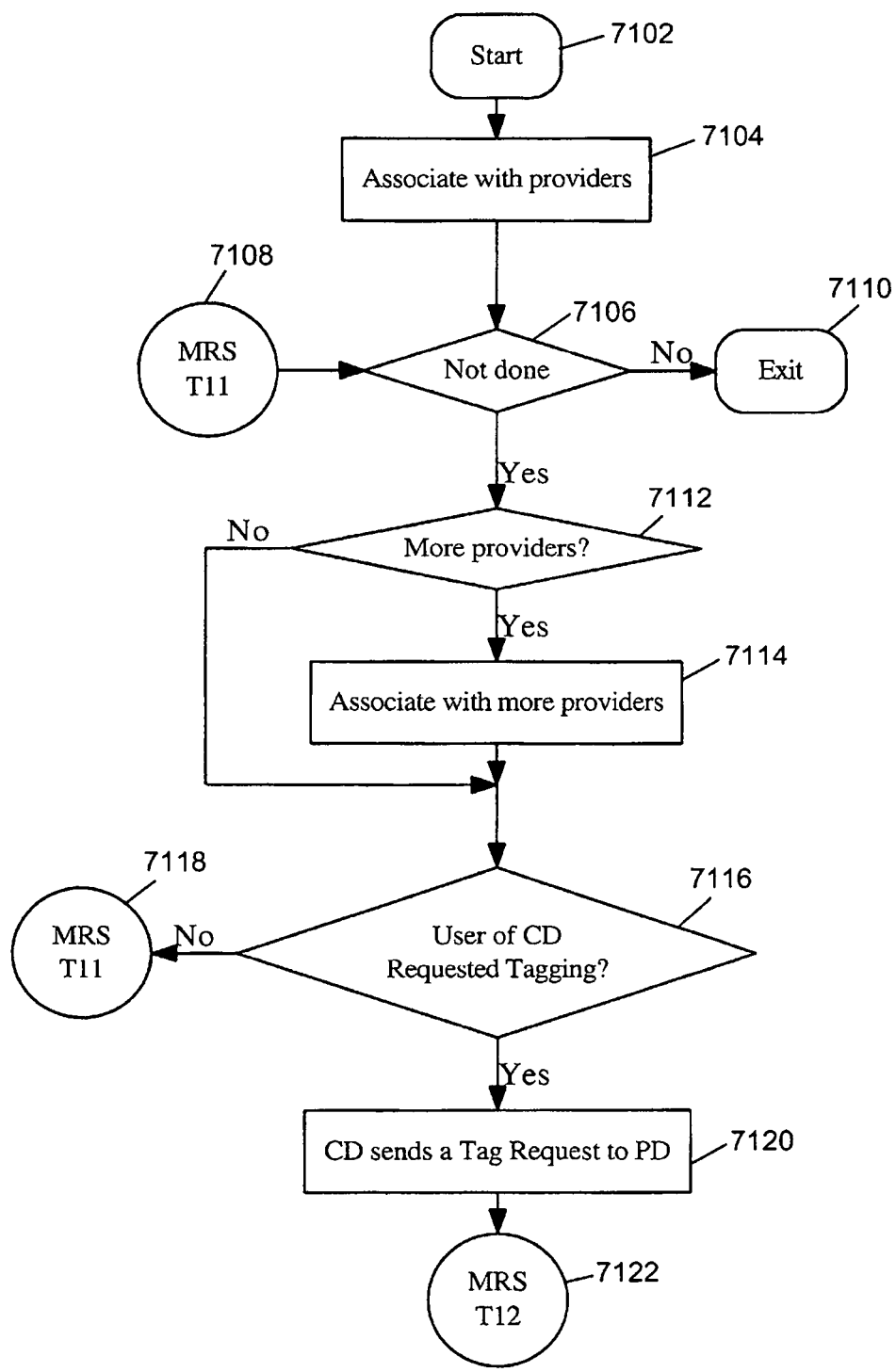
FIG. 71A-B illustrate the flow diagrams of a process followed in handling association of PDs with CDs, communication of tags between PDs and CDs, and handling of tags by CDs according to an embodiment of the present invention.
Figure 71B:
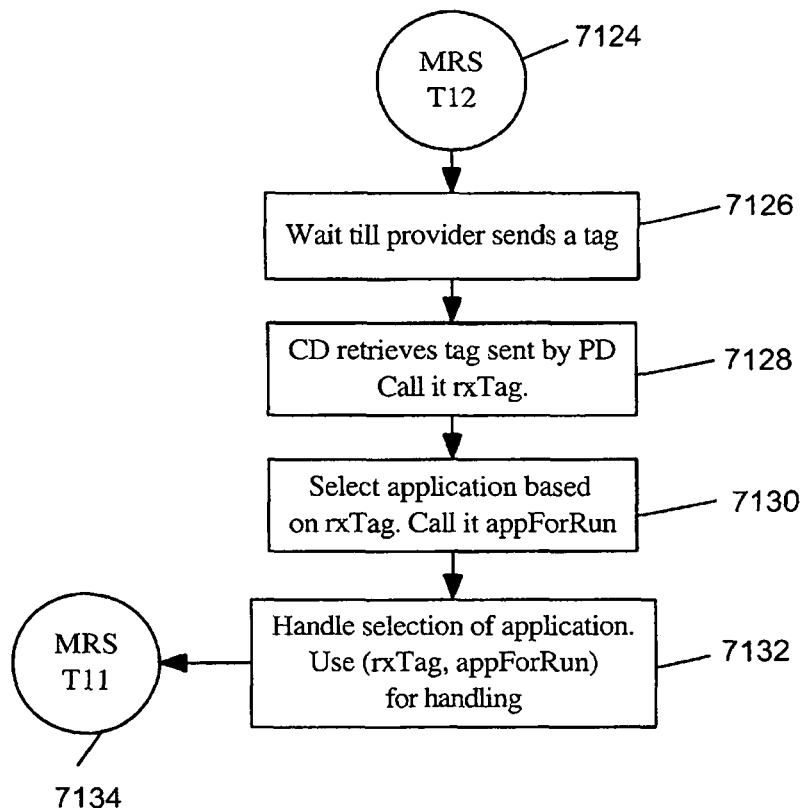

FIG. 71A-B illustrate the flow diagrams of a process followed in handling association of PDs with CDs, communication of tags between PDs and CDs, and handling of tags by CDs according to an embodiment of the present invention. In an embodiment of the invention, an instance of CD 102 and any associated instances of PD 202, can use the method illustrated in FIG. 71A-B to perform functions that can include association of a CD 102 with instances of PD 202, processing of tags received by the CD, communication of tag requests and tags between PD and CD, running applications associated with the received tags, among others. In the embodiment described here, a PD 202 can provide a tag to an instance of CD 102 upon receiving a request for a tag sent by the CD. CD 102 can request PD 202 to provide a tag to the CD, due to events that can include user interaction on UI 126 of CD 102. In some embodiments, PD 202 can send tags to instances of CD 102 when CD 102 requests for the tag(s). In embodiments wherein CD 102 can request tags from PD 202 due to an interactive selection, the availability of tags with the associated PD(s) can be indicated on UI 126 of CD 102 and/or UI 226 of PD 202. In embodiments wherein a CD 102 can be implemented using a device such as a smart phone or tablet computer running Android operating system, the availability of tags can be indicated by placing an icon on the Notification Bar associated with the user interface of the device. UI 126 of CD 102 can also allow for differentiating the availability of tags from multiple instances of PD 202 that the CD can be associated with. In some embodiments, UI 226 of PD 202 can indicate the availability of tags. In embodiments wherein a PD 202 can be implemented using a set-top box, an LED on the front panel of the set top box can be lit up, set to a specific color, or the like, when the set top box can provide a tag. Other methods of indicating the availability of tags are possible. The method followed in processing the tags, handling of applications associated with tags, association with instances of PD, requesting tags by the CD, and other functionality as illustrated in FIG. 71A-B is illustrative and meant for use by the embodiment described here. Other embodiments can choose to perform the functions differently, and can choose to not include some or all of the steps illustrated here. The methods and processes illustrated in FIG. 71A-B are not meant to be limiting the scope of the invention or any of its embodiments.

In the embodiment described here, an instance of CD 102 can request tag(s) from one or more instances of PD 202 that the CD can be associated with. The request can be sent by CD 102 due to an event that can include user interaction using UI 126 of CD 102. User interaction with CD 102 can involve user pushing down a physical key on CD 102, selecting a button displayed on a touch screen associated with CD 102 or the like. In embodiments where a CD 102 can be associated with more than one PD 202 instances, each instance of PD 202 can be related to a separate user interface element associated with CD 102, such as a number of soft buttons—each associated with a PD 202 instance. When the user interface element associated with a PD 202 is selected, CD 102 can request a tag from the PD 202 corresponding to the selected user interface element. An instance of CD 102 can also be associated with user interface elements that can allow a user to initiate the CD requesting tags from all instances of PD 202 that the CD 102 can be associated with.

In another embodiment of the invention, CD 102 can initiate requests for all associated PD 202 instances in a way that can not involve user interaction. In this embodiment, a CD 102 can request tags from instances of PD 202 once every time interval. Other methods of initiating requests for PD 202 instances, by the CD are possible.

The process starts at step 7102 and moves to step 7104. At step 7104, the CD 102 can first associate with any instances of PD 202. The method(s) illustrated in FIG. 33-36 can be used by an instance of CD 102 in detecting instances of PD 202 and/or associating with them. The process associated with FIG. 71A-B can then move to step 7106. At step 7106 a determination can be done if the process associated with FIG. 71A-B needs to be terminated. If the process needs to be terminated, the process can move to step 7110. Step 7110 indicates that the process associated with FIG. 71A-B is complete. In some embodiments as in case of smart phones or tablet computers running Android operating system, the process associated with FIG. 71A-B can be used when an Android service is activated. The process associated with FIG. 71A-B can be stopped when the Android service is stopped.

If the check at step 7106 determines that the process does not need to be terminated, the process can move to step 7112. At step 7112, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 71A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 71A-B is implemented on a device such as a smart phone or tablet computer running Android operating system, a user of the device can choose to disable interfaces associated with the devices such as Wifi interfaces, or Bluetooth devices, or the like, while the service associated with FIG. 71A-B is running.

If the check at step 7112 determines that the CD can associate with new instances of PD 202, the process can move to step 7114. At step 7114, the CD can detect and associate with any new instances of PD 202. The method(s) illustrated in FIG. 33-36 can be used by an instance of CD 102 in detecting instances of PD 202 and/or associating with them. The process can then move to step 7116. If the check at step 7112 determines that the CD cannot detect/associate with new instances of PD 202, the process can move to step 7116.

At step 7116, a check is made to determine if the user of the CD 102 has requested for getting tags from instances of PD 202. If the user did not indicate a need for getting tags, the process can move to step 7118. Step 7118 indicates that the process can move to step 7108. Returning to step 7116, if it is determined that the user has indicated to get tags from an instance of PD 202, the process can move to step 7120. At step 7120, CD 102 can send a message to the PD that can be associated with user selection, indicating that the CD 102 needs a copy of the tag from the PD 202. The contact information associated with PI of the PD 202 can be used by the CD to send a message. The process can then move to step 7122. Step 7122 indicates that the process can then move to step 7124 of FIG. 71B. Step 7124 indicates that the process can move to step 7126. At step 7126, the CD 102 waits for a tag from the PD. A PD 202 receiving a request for a tag from a CD 102 can provide the tag to the CD. CD 102 at step 7126 moves to step 7128 when it receives a tag from the PD.

At step 7128, the tag sent by the PD is retrieved. The retrieved tag is referred to as rxTag for use in subsequent steps of the process. The process can then move to step 7130.

At step 7130, an application can be selected for association with rxTag. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 7132.

At step 7132, the application appForRun can be handled. In one embodiment, appForRun can be launched/run at this step. rxTag can be provided as input to the run of appForRun. Other rxTag specific data, or any other embodiment specific data can be provided as input to the run of appForRun. In an environment that can support run of multiple applications at any time (such as the Android operating system/platform), the process can move to step 7134 while appForRun is running. If the environment associated with CD 102 that can include an operating system, does not support run of multiple applications, the process associated with FIG. 71A-B can wait in step 7132 for completion of run of appForRun. In such embodiments, the process can move to step 7134 after the run of appForRun is complete. Other embodiments can choose to move to step 7134 after appForRun is launched in step 7132.

It can be noted that in some embodiments, there can not be an application that can be associated with rxTag at step 7130. In some embodiments, this can be indicated by a Null value for appForRun. Under such conditions, appForRun is not launched in step 7132 and the process can move to step 7134.

Figure 72A:
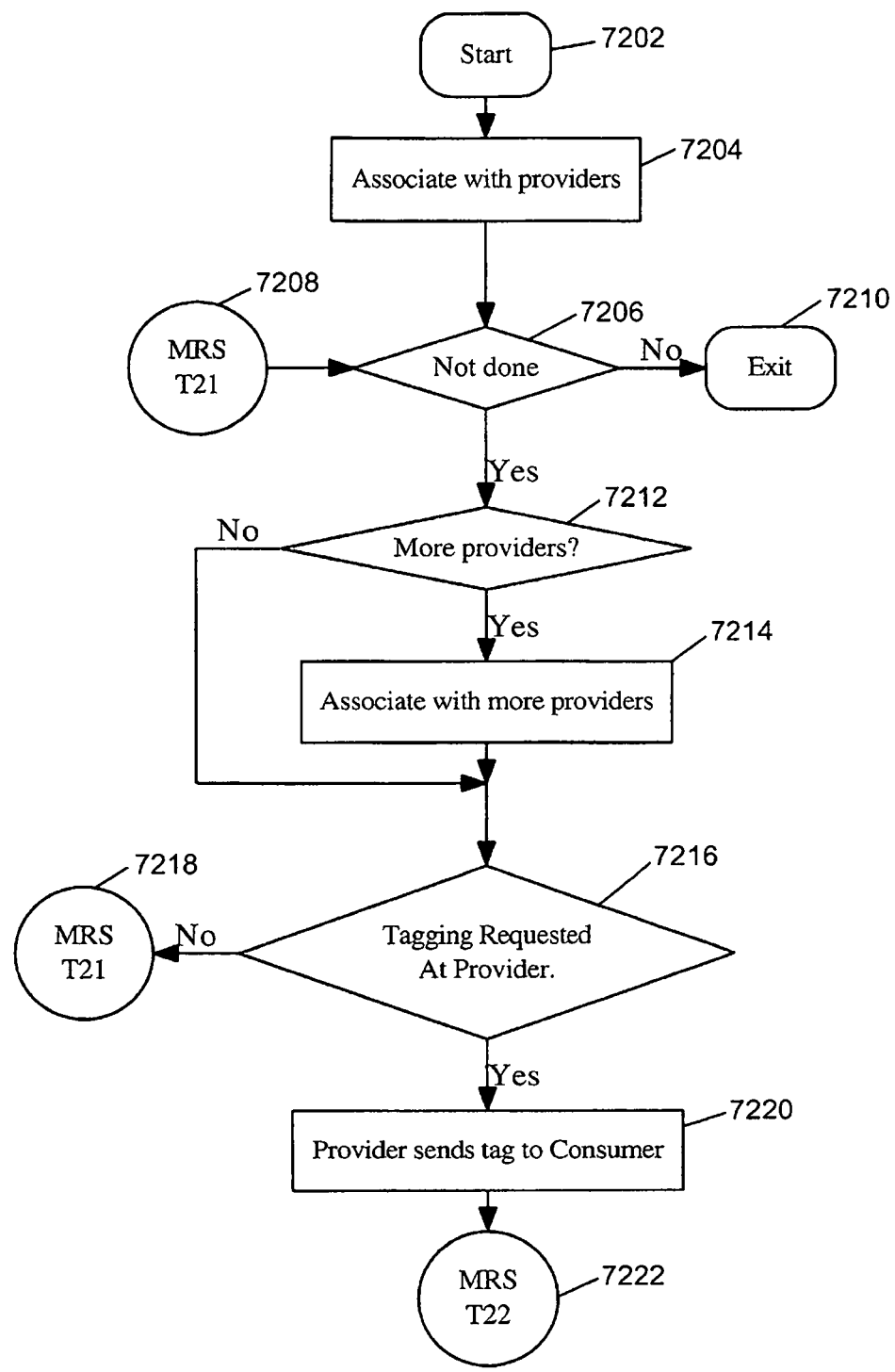
FIG. 72A-B illustrate the flow diagrams of a process followed in handling association of PDs with CDs, communication of tags between PDs and CDs, and handling of tags by CDs according to another embodiment of the present invention.
Figure 72B:
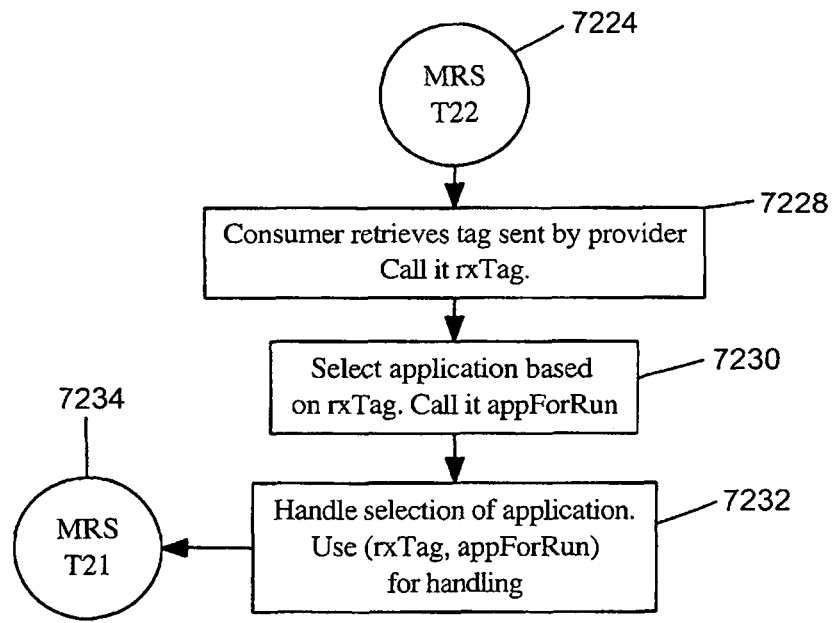

FIG. 72A-B illustrate the flow diagrams of a process followed in handling association of PDs with CDs, communication of tags between PDs and CDs, and handling of tags by CDs according to a yet another embodiment of the present invention. In an embodiment of the invention, an instance of CD 102 and any associated instances of PD 202, can use the method illustrated in FIG. 72A-B to perform functions that can include association of a CD 102 with instances of PD 202, processing of tags received by the CD, communication of tags between PD and CD, running applications associated with the received tags, among others. In the embodiment described here, a PD 202 can provide a tag to an instance of CD 102 upon a request made to PD 202. Requests for sending tags can be provided to PD 202 by means that can include an interactive selection associated with UI 226 of PD 202. In embodiments wherein PD 202 can provide tags due to an interactive selection, the availability of tags with the associated PD(s) can be indicated on UI 226 of PD 202. In embodiments wherein a PD 202 can be implemented using a set-top box, an LED on the front panel of the set top box can be lit up, set to a specific color, or the like, when the set top box can provide a tag. Other methods of indicating the availability of tags are possible. The method followed in processing the tags, handling of applications associated with tags, association with instances of PD, requesting tags from the PD, and other functionality as illustrated in FIG. 72A-B is illustrative and meant for use by the embodiment described here. Other embodiments can choose to perform the functions differently, and can choose to not include some or all of the steps illustrated here. The methods and processes illustrated in FIG. 72A-B are not meant to be limiting the scope of the invention or any of its embodiments.

In the embodiment described here, an instance of PD 202, upon request, can provide tag(s) to one or more instances of CD 102 that the PD can be associated with. The request can be associated with PD 202 due to an event that can include user interaction using UI 226 of PD 202. User interaction with PD 202 can involve user pushing down a physical key on PD 202. User interaction with PD 202 can also involve user selection involving pushing down a key on a remote device associated with PD 202. The remote device and PD 202 can communicate with each other using technologies that can include infrared technology, RF technology, or the like. This can be similar to pressing a key on the remote associated with a set top box.

In embodiments where a PD 202 can be associated with more than one CD 102 instances, each instance of CD 102 can be associated with a separate user interface element of PD 202, such as a number of buttons on the remote—each associated with a separate CD 102 instance. When the user interface element associated with the PD and related to a CD 102 is selected, PD 202 can provide a tag to a CD 102 corresponding to the selected user interface element. An instance of PD 202 can also be associated with user interface elements that can allow a user to initiate the PD providing tags to all instances of CD 102 that the PD 202 can be associated with.

In another embodiment of the invention, PD 202 can provide tags for all associated CD 102 instances in a way that can not involve user interaction. In this embodiment, a PD 202 can provide tags to instances of CD 102 once every time interval. Other methods of providing tags to CD 102 instances by the PD are possible.

The process starts at step 7202 and moves to step 7204. At step 7204, the CD 102 can first associate with any instances of PD 202. The method(s) illustrated in FIG. 33-36 can be used by an instance of CD 102 in detecting instances of PD 202 and/or associating with them. The process associated with FIG. 72A-B can then move to step 7206. At step 7206 a determination can be done if the process associated with FIG. 72A-B needs to be terminated. If the process needs to be terminated, the process can move to step 7210. Step 7210 indicates that the process associated with FIG. 72A-B is complete. In some embodiments as in case of smart phones or tablet computers running Android operating system, the process associated with FIG. 72A-B can be used when an Android service is activated. The process associated with FIG. 72A-B can be stopped when the Android service is stopped.

If the check at step 7206 determines that the process does not need to be terminated, the process can move to step 7212. At step 7212, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 72A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 72A-B is implemented on a device such as a smart phone or tablet computer running Android operating system, a user of the device can choose to disable interfaces associated with the devices such as Wifi interfaces, or Bluetooth devices, or the like, while the service associated with FIG. 72A-B is running.

If the check at step 7212 determines that the CD can associate with new instances of PD 202, the process can move to step 7214. At step 7214, the CD can detect and associate with any new instances of PD 202. The method(s) illustrated in FIG. 33-36 can be used by an instance of CD 102 in detecting instances of PD 202 and/or associating with them. The process can then move to step 7216. If the check at step 7212 determines that the CD cannot detect/associate with new instances of PD 202, the process can move to step 7216.

At step 7216, a check is made by a PD to determine if a request has been made by a user for providing tags. If the user did not indicate a need for providing tags, the process can move to step 7218. Step 7218 indicates that the process can move to step 7208. Returning to step 7216, if it is determined by the PD that the user has indicated a request to provide tag(s), the process can move to step 7220. At step 7220, PD 202 can provide a tag to the CD that can be associated with user selection. The contact information associated with CI of the CD 102 can be used by the PD to send a tag. The process can then move to step 7222. Step 7222 indicates that the process can then move to step 7224 of FIG. 72B. Step 7224 indicates that the process can move to step 7228.

At step 7228, the tag sent by the PD is retrieved by the CD. The retrieved tag is referred to as rxTag for use in subsequent steps of the process. The process can then move to step 7230. At step 7230, an application can be selected for association with rxTag, by the CD. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 7232.

At step 7232, the application appForRun can be handled. In one embodiment, appForRun can be launched/run at this step. rxTag can be provided as input to the run of appForRun. Other rxTag specific data, or any other embodiment specific data can be provided as input to the run of appForRun. In an environment that can support run of multiple applications at any time (such as the Android operating system/platform), the process can move to step 7234 while appForRun is running. If the environment associated with CD 102 that can include an operating system, does not support run of multiple applications, the process associated with FIG. 72A-B can wait in step 7232 for completion of run of appForRun. In such embodiments, the process can move to step 7234 after the run of appForRun is complete. Other embodiments can choose to move to step 7234 after appForRun is launched in step 7232.

It can be noted that in some embodiments, there cannot be an application that can be associated with rxTag at step 7230. In some embodiments, this can be indicated by a Null value for appForRun. Under such conditions, appForRun is not launched in step 7232 and the process can move to step 7234.

Figure 73A:
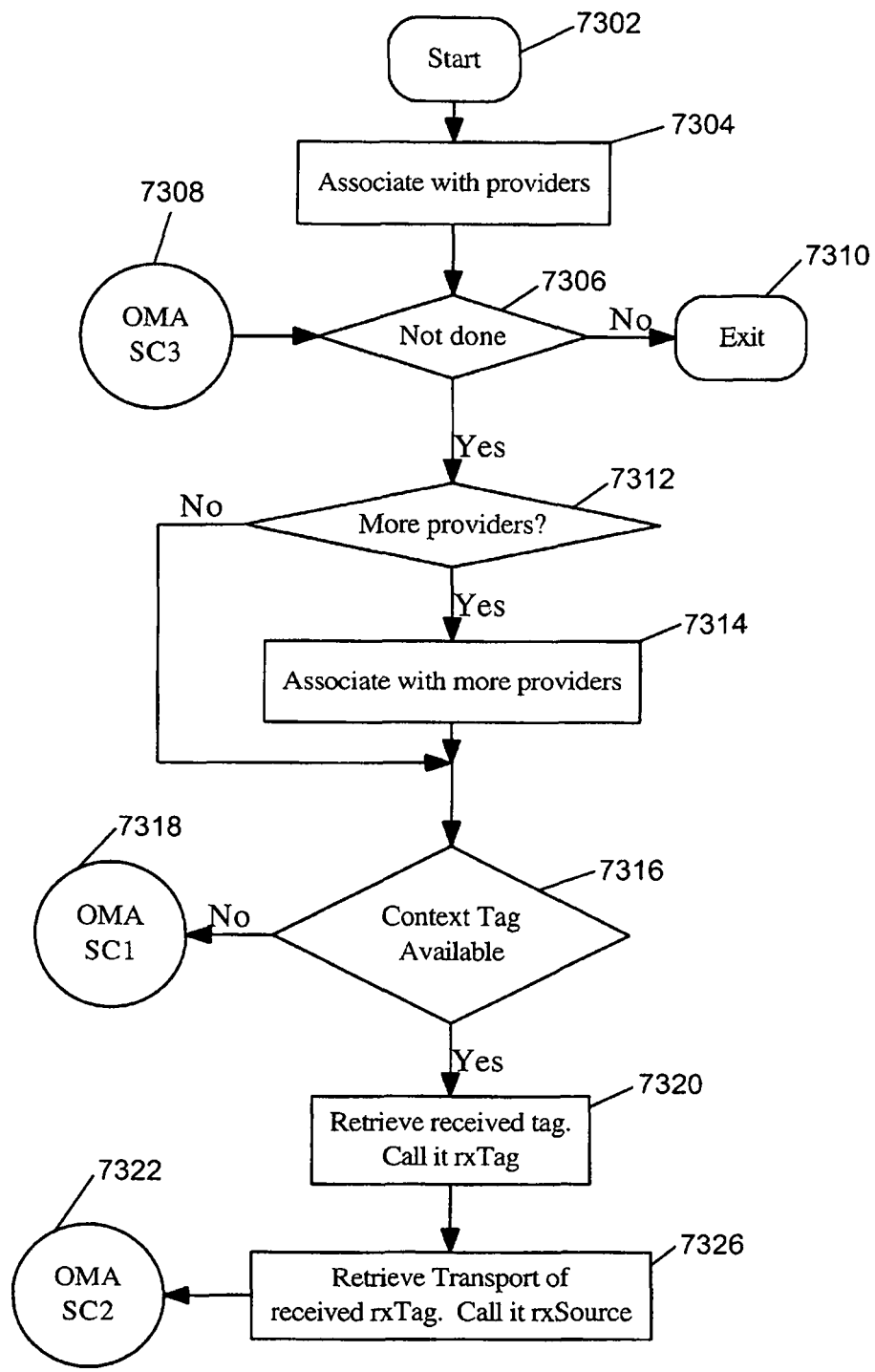
FIG. 73A-B illustrates the flow diagram of a process followed by a CD in associating with PDs and handling of tags received by the CD according to an embodiment of the present invention.
Figure 73B:
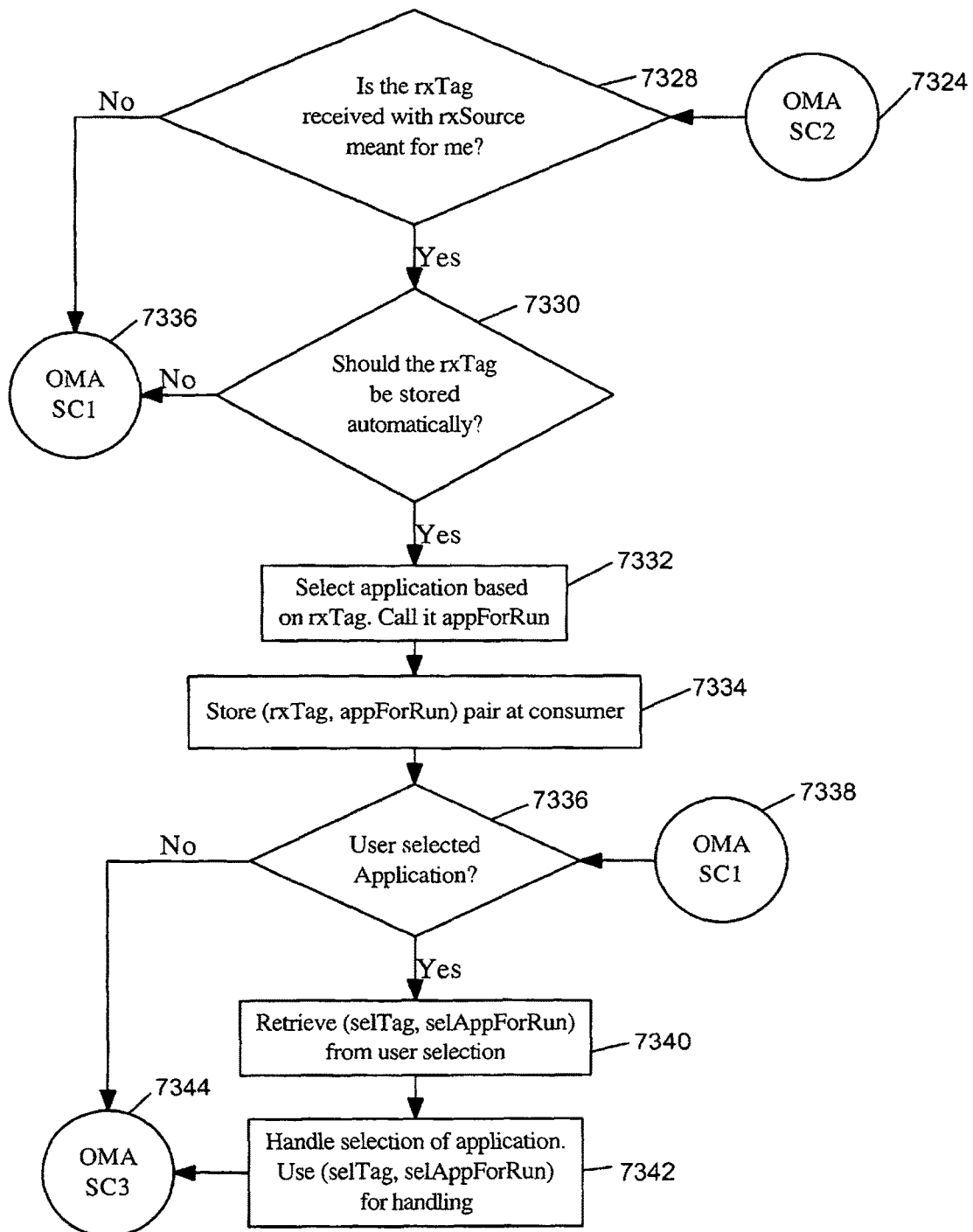

FIG. 73A-B illustrate the flow diagrams of a process followed by a CD in associating with PDs and handling tags received by the CD according to an embodiment of the present invention. In an embodiment of the invention, an instance of CD 102 can use the method illustrated in FIG. 73A-B to perform functions that can include association of a CD 102 with instances of PD 202, processing of tags received by the CD, running applications associated with the tags, managing tags in STORE 118, among others. In the embodiment described here, a CD 102 can associate tags received by the CD with applications, store the tags and information related to application associated with the tags, determine if the application can be run, and run the application, in addition to performing other functionality. The method followed in processing the tags, handling of applications associated with tags, storing of tags and information related to associated applications, association with instances of PD, and other functionality as illustrated in FIG. 73A-B is illustrative and meant for use by the embodiment described here. Other embodiments can choose to perform the functions differently, and can choose to not include some or all of the steps illustrated here. The methods and processes illustrated in FIG. 73A-B are not meant to be limiting the scope of the invention or any of its embodiments.

The process associated with FIG. 73A-B differs from processes associated with FIG. 69A-B, FIGS. 70A-B and other related embodiments, in that the process of FIG. 73A-B can store the tags received by an instance of CD 102 in STORE 118. In some embodiments, as the one described here, each tag handled by the process can be stored by CD 102 in STORE 118. Information related to the application that can be associated with the tag, can also be stored along with the tag in STORE 118 by CD 102. This can be useful in some embodiments wherein a user can not be interacting with CD 102 at the time the tag(s) is/are received by CD 102. The tags and associated applications stored in STORE 118 can be presented to the user using UI 126. The application associated with the tag stored in STORE 118 can be launched/run upon an event that can include selection of an application and/or tag using UI 126. An example of such an embodiment can include smart phones or tablet computers running Android operating system. The CD 102 running Android can implement an Android Service that can be associated with process illustrated in FIG. 73A-B. The Android Service can store the tags and related applications in the STORE 118 associated with the device. The CD 102 running Android can also provide an Android Activity (that can be started at a later point of time as compared to the time at which the tags and/or application information can be stored) that can allow a user to view the list of tags and/or applications received by CD 102 and stored in STORE 118. The Android Activity can also allow the user to launch applications from the list of tags/applications presented using UI 126.

The process starts at step 7302 and moves to step 7304. At step 7304, the CD 102 can first associate with any instances of PD 202. The method(s) illustrated in FIG. 33-36 can be used by an instance of CD 102 in detecting instances of PD 202 and/or associating with them. The process associated with FIG. 73A-B can then move to step 7306. At step 7306 a determination can be done if the process associated with FIG. 73A-B needs to be terminated. If the process needs to be terminated, the process can move to step 7310. Step 7310 indicates that the process associated with FIG. 73A-B is complete. In some embodiments as in case of smart phones or tablet computers running Android operating system, the process associated with FIG. 73A-B can be used when an Android service is activated. The process associated with FIG. 73A-B can be stopped when the Android service is stopped.

If the check at step 7306 determines that the process does not need to be terminated, the process can move to step 7312. At step 7312, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 73A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 73A-B is implemented on a device such as a smart phone or tablet computer running Android operating system, a user of the device can choose to disable interfaces associated with the devices such as Wifi interfaces, or Bluetooth devices, or the like, while the service associated with FIG. 73A-B is running.

If the check at step 7312 determines that the CD can associate with new instances of PD 202, the process can move to step 7314. At step 7314, the CD can detect and associate with any new instances of PD 202. The method(s) illustrated in FIG. 33-36 can be used by an instance of CD 102 in detecting instances of PD 202 and/or associating with them. The process can then move to step 7316. If the check at step 7312 determines that the CD cannot detect/associate with new instances of PD 202, the process can move to step 7316.

At step 7316, a check is made to determine if CD 102 has any new tags available for processing. In one embodiment, new tags can be received by an instance of CD 102 when the tags can be provided by instances of PD 202 that the CD 102 can be associated with. In one embodiment, where tags can be provided by instances of PD 202 using wifi network, tags can be included in an Ethernet frame that can be associated with a well known protocol type. In such embodiment, the receipt of an Ethernet frame associated with the well known protocol type on the wifi interface can indicate the availability of new tag for processing by FIG. 73A-B. In another embodiment wherein the process associated with FIG. 73A-B can be implemented as a service on Android operating system, tags can be provided to the process using Intent mechanism of Android. Other methods can be used to provide tags to the process of FIG. 73A-B. If the check at step 7316 determines that the process has new tags for processing, the process can move to step 7320. If not, the process can move to step 7318. Step 7318 indicates that the process can move to step 7338. Step 7338 indicates that the process can move to step 7336.

Returning to step 7320, the tag available for processing by the process can be retrieved at this step. The retrieved tag is referred to as rxTag for use in subsequent steps of the process. The method of retrieving a tag can be specific to the embodiment. In embodiments wherein the tags are provided in Ethernet frames on wifi networks, on devices running Android operating system, the method of retrieving the tag can involve the process making a system call or calling an API of Android operating system to retrieve the Ethernet frame. The tag can then be retrieved from the frame. The process can then move to step 7326.

At step 7326, the transport associated with rxTag can be determined. The transport determined at this step is referred to as rxSource for use in subsequent steps of the process. rxSource can take one of the values as illustrated in FIG. 8. The method of determining rxSource can be specific to the embodiment. In embodiments wherein the tag is received using an Ethernet frame on wifi interface with a destination Ethernet address of Broadcast Ethernet address, rxSource can be determined to be MultiDest. If the Ethernet frame has a destination Ethernet address matching the address of wifi interface, rxSource can be set to SingleDest. If the tag is provided using the Intent mechanism of Android operating system, tags associated with Implicit Intents can be associated with MultiDest, whereas tags associated with Explicit Intents can be associated with SingleDest transport. Other methods of determining rxSource can be possible in other embodiments. The process can then move to step 7322. Step 7322 indicates that the process associated with FIG. 73A-B can then move to step 7324 of FIG. 73B. Step 7324 indicates that the process can move to step 7328.

At step 7328, a check is done to determine if the rxTag that can be associated with rxSource is meant for use by the CD. In one embodiment of the invention, the process associated with FIG. 68A-B can be used to make the determination. rxTag and rxSource can be provided to the methods of FIG. 68A-B via instance 'x'. 'x.source' can be set to rxSource and x.tag can be set to rxTag before the process associated with FIG. 68A-B can be used. If it is determined that rxTag can be used by the CD, the process can move to step 7330. If not, the rxTag can be ignored (not used/not processed) and process can move to step 7336. Step 7336 indicates that the process can move to step 7338.

Returning to step 7330, a determination can be made at this step to check if rxTag can be stored. In the embodiment described here, CD 102 can be associated with a configuration that can specify a set of types associated with tags, each type can be associated with information that can specify if a tag associated with the type can be stored automatically. Other embodiments can use other methods of determining if a tag can be stored. If the check at step 7330 indicates that rxTag can be stored automatically, the process can move to step 7332. If not, the process can move to step 7336.

Referring to step 7332, an application can be selected for association with rxTag at this step. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 7334.

At step 7334, the (rxTag, appForRun) pair can be stored in STORE 118, adding to the list of (tag, application) pairs that can be already stored in STORE 118. If there are no (tag, application) pairs stored in STORE 118, the (rxTag, appForRun) pair can be stored in STORE 188. The (tag, application) pairs can be stored in STORE 118 in various formats. In some embodiments, application can be stored in STORE 118 as a file in a file system, and the path/filename of the application file can be stored along with the tag. The tag and path/filename pairs can be stored in an XML file in STORE 118. In other embodiments, (tag, application) pair can be stored as a record in a relational database such as SQL table. Other methods and/or formats/structures of storing (tag, application) pairs are possible in other embodiments. The process can then move to step 7336.

The set of (tag, application) pairs stored in STORE 118 can be presented as a list to user using UI 126 of CD 102.

At step 7336, a determination is made to see if a user has made a selection from the list presented using UI 126. If the user has made a selection that can be associated with a (tag, application) pair from the list, the process can move to step 7340. If not, the process can move to step 7344. Step 7344 indicates that the process can move to step 7308 of FIG. 73A. Returning to step 7340, the (tag, application) pair associated with a user selection can be retrieved. The tag of selected pair can be referred to as selTag, and application of selected pair can be referred to as selAppForRun for use in subsequent steps of the process. The process can then move to step 7342.

At step 7342, the selected pair can be handled. In one embodiment, selAppForRun can be launched/run at this step. selTag can be provided as input to the run of selAppForRun. Other selTag specific data, or any other embodiment specific data can be provided as input to the run of selAppForRun. In an environment that can support run of multiple applications at any time (such as the Android operating system/platform), the process can move to step 7344 while selAppForRun is running. If the environment associated with CD 102 that can include an operating system, does not support run of multiple applications, the process associated with FIG. 73A-B can wait in step 7342 for completion of run of selAppForRun. In such embodiments, the process can move to step 7344 after the run of selAppForRun is complete. Other embodiments can choose to move to step 7344 after selAppForRun is launched in step 7342.

It can be noted that in some embodiments, there cannot be an application that can be associated with rxTag at step 7332. In some embodiments, this can be indicated by a Null value for appForRun. Under such conditions, a (rxTag, appForRun) pair is not stored in STORE 118, and the process can move to step 7308.

Figure 74A:
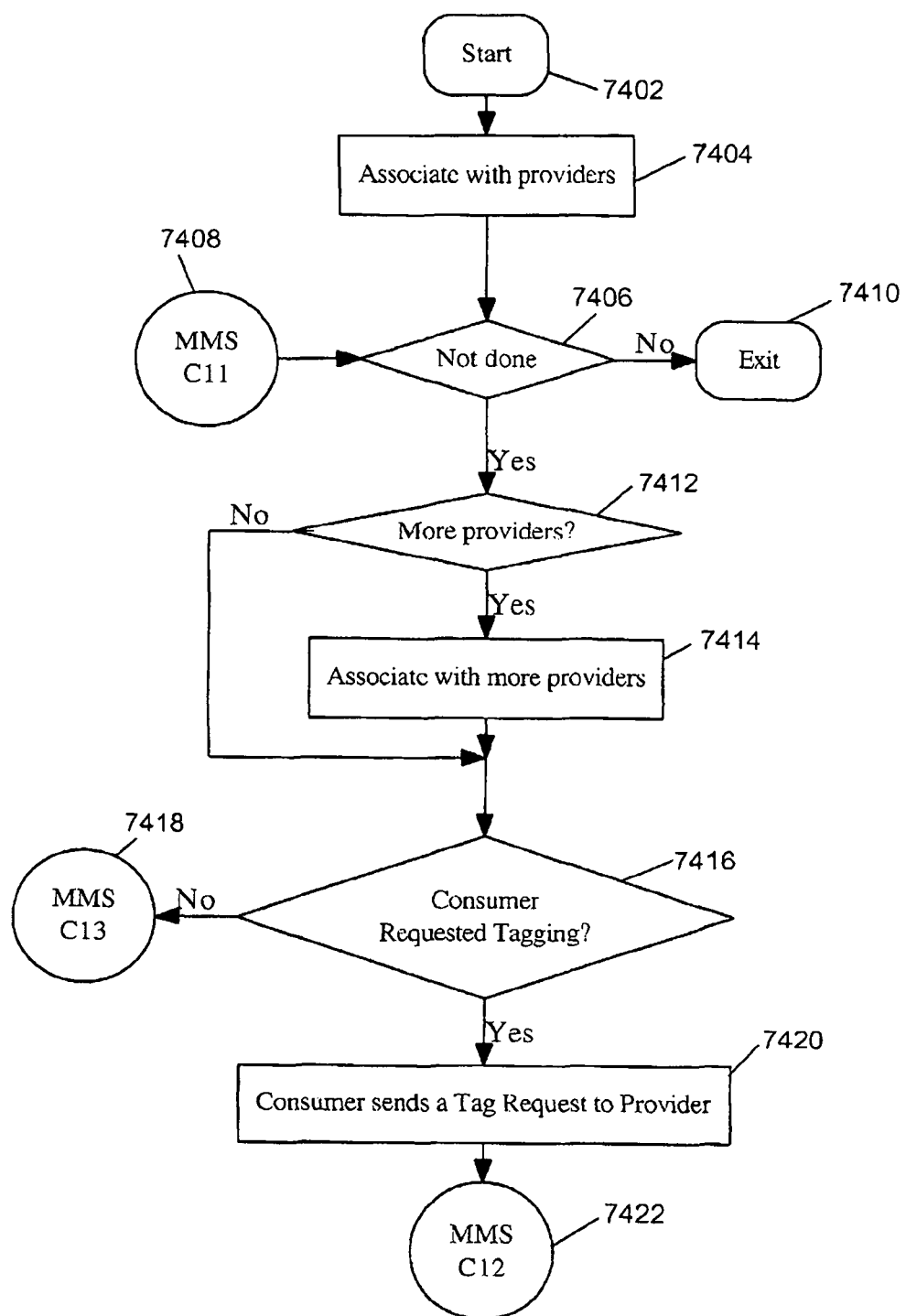
FIG. 74A-B illustrate the flow diagrams of a process followed in handling association of PDs with CDs, communication of tags between PDs and CDs, and handling of tags by CDs according to another embodiment of the present invention.
Figure 74B:
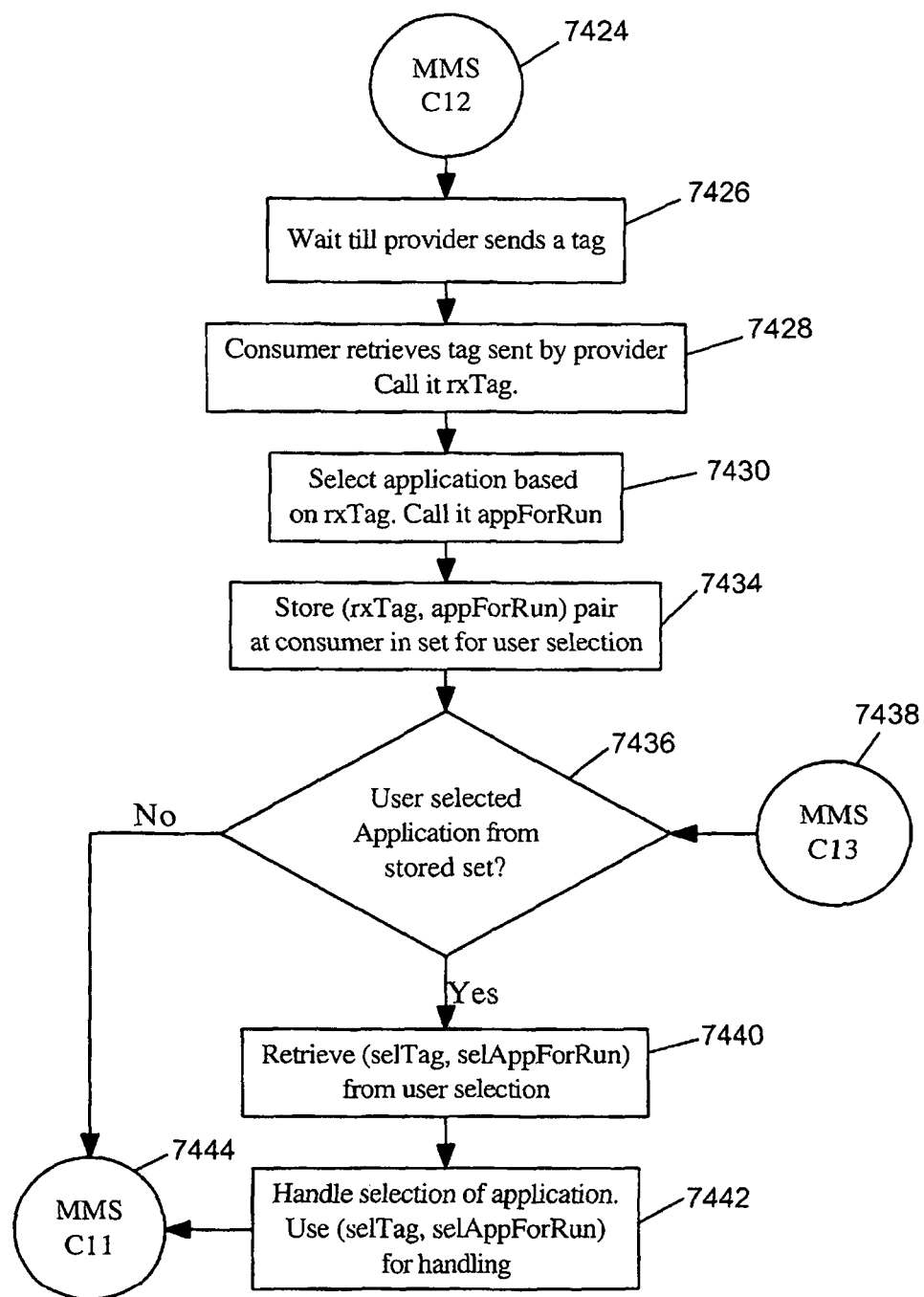

FIG. 74A-B illustrate the flow diagrams of a process followed in handling association of PDs with CDs, communication of tags between PDs and CDs, and handling of tags by CDs according to an embodiment of the present invention. In an embodiment of the invention, an instance of CD 102 and any associated instances of PD 202, can use the method illustrated in FIG. 74A-B to perform functions that can include association of a CD 102 with instances of PD 202, processing of tags received by the CD, communication of tag requests and tags between PD and CD, storing tags and any information related to applications associated with tags, running applications associated with the tags, among others. In the embodiment described here, a PD 202 can provide a tag to an instance of CD 102 upon receiving a request for a tag that can be sent by the CD. CD 102 can request PD 202 to provide a tag to the CD, due to events that can include user interaction on UI 126 of CD 102. In some embodiments, PD 202 can send tags to instances of CD 102 when CD 102 requests for the tag(s). In embodiments wherein CD 102 can request tags from PD 202 due to an interactive selection, the availability of tags with the associated PD(s) can be indicated on UI 126 of CD 102 and/or UI 226 of PD 202. In embodiments wherein a CD 102 can be implemented using a device such as a smart phone or tablet computer running Android operating system, the availability of tags can be indicated by placing an icon on the Notification Bar associated with the user interface of the device. UI 126 of CD 102 can also allow for differentiating the availability of tags from multiple instances of PD 202 that the CD can be associated with. In some embodiments, UI 226 of PD 202 can indicate the availability of tags. In embodiments wherein a PD 202 can be implemented using a set-top box, an LED on the front panel of the set top box can be lit up, set to a specific color, or the like, when the set top box can provide a tag. Other methods of indicating the availability of tags are possible. The method followed in processing the tags, handling of applications associated with tags, association with instances of PD, requesting tags by the CD, storing of tags and applications by CD, and other functionality as illustrated in FIG. 74A-B is illustrative and meant for use by the embodiment described here. Other embodiments can choose to perform the functions differently, and can choose to not include some or all of the steps illustrated here. The methods and processes illustrated in FIG. 74A-B are not meant to be limiting the scope of the invention or any of its embodiments.

In the embodiment described here, an instance of CD 102 can request tag(s) from one or more instances of PD 202 that the CD can be associated with. The request can be sent by CD 102 due to an event that can include user interaction using UI 126 of CD 102. User interaction with CD 102 can involve user pushing down a physical key on CD 102, selecting a button displayed on a touch screen associated with CD 102 or the like. In embodiments where a CD 102 can be associated with more than one PD 202 instances, each instance of PD 202 can be related to a separate user interface element associated with CD 102, such as a number of soft buttons—each associated with a PD 202 instance. When the user interface element associated with the CD 102, and related to a PD 202 is selected, CD 102 can request a tag from the PD 202 corresponding to the selected user interface element. An instance of CD 102 can also be associated with user interface elements that can allow a user to initiate the CD requesting tags from all instances of PD 202 that the CD 102 can be associated with.

In another embodiment of the invention, CD 102 can initiate requests for all associated PD 202 instances in a way that can not involve user interaction. In this other embodiment, a CD 102 can request tags from instances of PD 202 once every time interval. Other methods of initiating requests for PD 202 instances, by the CD are possible.

In some embodiments, as the one described here, each tag handled by the process can be stored in STORE 118. Information related to the application that can be associated with the tag, can also be stored along with the tag in STORE 118 by CD 102. This can be useful in some embodiments wherein a user can request tags from instances of PD 202 associated with the CD, and store them for later use. When tags are stored by instances of CD 102 in STORE 118, applications associated with the tags can be launched/run at a later point of time (as compared to the time at which the tag(s) is/are received/stored).

The tags and associated applications stored in STORE 118 can be presented to the user using UI 126. The application associated with the tag stored in STORE 118 can be launched/run upon an event that can include selection of an application and/or tag using UI 126. An example of such an embodiment can include smart phones or tablet computers running Android operating system. The CD 102 running Android can implement an Android Service and a related Android activity which can be associated with process illustrated in FIG. 73A-B. The Android Service can store the tags and related applications in the STORE 118 associated with the device. The Android Activity can be used to help request tags from PD(s) associated with the CD, provide the list of tags stored in STORE 118 using UI 126 for user selection, among others. The Android Activity can also allow the user to launch applications from the list of tags/applications presented using UI 126.

The process starts at step 7402 and moves to step 7404. At step 7404, the CD 102 can first associate with any instances of PD 202. The method(s) illustrated in FIG. 33-36 can be used by an instance of CD 102 in detecting instances of PD 202 and/or associating with them. The process associated with FIG. 74A-B can then move to step 7406. At step 7406 a determination can be done if the process associated with FIG. 74A-B needs to be terminated. If the process needs to be terminated, the process can move to step 7410. Step 7410 indicates that the process associated with FIG. 74A-B is complete. In some embodiments as in case of smart phones or tablet computers running Android operating system, the process associated with FIG. 74A-B can be used when an Android service is activated. The process associated with FIG. 74A-B can be stopped when the Android service is stopped.

If the check at step 7406 determines that the process does not need to be terminated, the process can move to step 7412. At step 7412, a determination can be made if the CD 102 can detect and/or associate with any new instances of PD 202. Some embodiments of CD 102 can be detecting and/or associating with new instances of PD 202 along with processing tags and/or running applications associated with tags. In some other embodiments, it can be possible to stop detection and/or association with new instances of PD 202. In an embodiment wherein the process associated with FIG. 74A-B can be implemented using Android service mechanism, an Activity in Android, associated with the service can notify the service to stop associations with new instances of PD 202. In some other embodiments, new instances of PD 202 cannot be detected because of other reasons that can include disabling of NI 106 on CD 102. A disable of NI 106 of CD 102 can result in CD 102 not being able to detect and/or associate with new instances of PD 202. In some embodiments, a disable of NI 106 can be achieved using UI 126 of CD 102. When the process associated with FIG. 74A-B is implemented on a device such as a smart phone or tablet computer running Android operating system, a user of the device can choose to disable interfaces associated with the devices such as Wifi interfaces, or Bluetooth devices, or the like, while the service associated with FIG. 74A-B is running.

If the check at step 7412 determines that the CD can associate with new instances of PD 202, the process can move to step 7414. At step 7414, the CD can detect and associate with any new instances of PD 202. The method(s) illustrated in FIG. 33-36 can be used by an instance of CD 102 in detecting instances of PD 202 and/or associating with them. The process can then move to step 7416. If the check at step 7412 determines that the CD cannot detect/associate with new instances of PD 202, the process can move to step 7416.

At step 7416, a check is made to determine if the user of the CD 102 has requested for getting tags from instances of PD 202. If the user did not indicate a need for getting tags, the process can move to step 7418. Step 7418 indicates that the process can move to step 7438. Returning to step 7416, if it is determined that the user has indicated to get tags from an instance of PD 202, the process can move to step 7420. At step 7420, CD 102 can send a message to the PD that can be associated with user selection, indicating that the CD 102 needs a copy of the tag from the PD 202. The contact information associated with PI of the PD 202 can be used by the CD to send a message. The process can then move to step 7422. Step 7422 indicates that the process can then move to step 7424 of FIG. 74B. Step 7424 indicates that the process can move to step 7426. At step 7426, the CD 102 waits for a tag from the PD. A PD 202 receiving a request for a tag from a CD 102 can provide the tag to the CD. CD 102 at step 7426 moves to step 7428 when it receives a tag from the PD.

At step 7428, the tag sent by the PD is retrieved. The retrieved tag is referred to as rxTag for use in subsequent steps of the process. The process can then move to step 7430.

At step 7430, an application can be selected for association with rxTag. The application associated with rxTag can be referred to as appForRun, for use in subsequent steps of the process. In some embodiments of the invention, the process associated with FIG. 76A-C can be used to select an application. In other embodiments, the process associated with FIG. 77 can be used to select an application. The process can then move to step 7434.

At step 7434, the (rxTag, appForRun) pair can be stored in STORE 118, adding to the list of (tag, application) pairs that can be already stored in STORE 118. If there are no (tag, application) pairs stored in STORE 118, the (rxTag, appForRun) pair can be stored in STORE 188. The (tag, application) pairs can be stored in STORE 118 in various formats. In some embodiments, application can be stored in STORE 118 as a file in a file system, and the path/filename of the application file can be stored along with the tag. The tag and path/filename pairs can be stored in an XML file in STORE 118. In other embodiments, (tag, application) pair can be stored as a record in a relational database such as SQL table. Other methods and/or formats/structures of storing (tag, application) pairs are possible in other embodiments. The process can then move to step 7436.

The set of (tag, application) pairs stored in STORE 118 can be presented as a list to user using UI 126 of CD 102.

At step 7436, a determination is made to see if a user has made a selection from the list presented using UI 126. If the user has made a selection that can be associated with a (tag, application) pair from the list, the process can move to step 7440. If not, the process can move to step 7444. Step 7444 indicates that the process can move to step 7408 of FIG. 74A. Returning to step 7440, the (tag, application) pair associated with a user selection can be retrieved. The tag of selected pair can be referred to as selTag, and application of selected pair can be referred to as selAppForRun for use in subsequent steps of the process. The process can then move to step 7442.

At step 7442, the selected pair can be handled. In one embodiment, selAppForRun can be launched/run at this step. selTag can be provided as input to the run of selAppForRun. Other selTag specific data, or any other embodiment specific data can be provided as input to the run of selAppForRun. In an environment that can support run of multiple applications at any time (such as the Android operating system/platform), the process can move to step 7444 while selAppForRun is running. If the environment associated with CD 102 that can include an operating system, does not support run of multiple applications, the process associated with FIG. 74A-B can wait in step 7442 for completion of run of selAppForRun. In such embodiments, the process can move to step 7444 after the run of selAppForRun is complete. Other embodiments can choose to move to step 7444 after selAppForRun is launched in step 7442.

It can be noted that in some embodiments, there can not be an application that can be associated with rxTag at step 7430. In some embodiments, this can be indicated by a Null value for appForRun. Under such conditions, a (rxTag, appForRun) pair is not stored in STORE 118, and the process can move to step 7436.

Figure 75A:
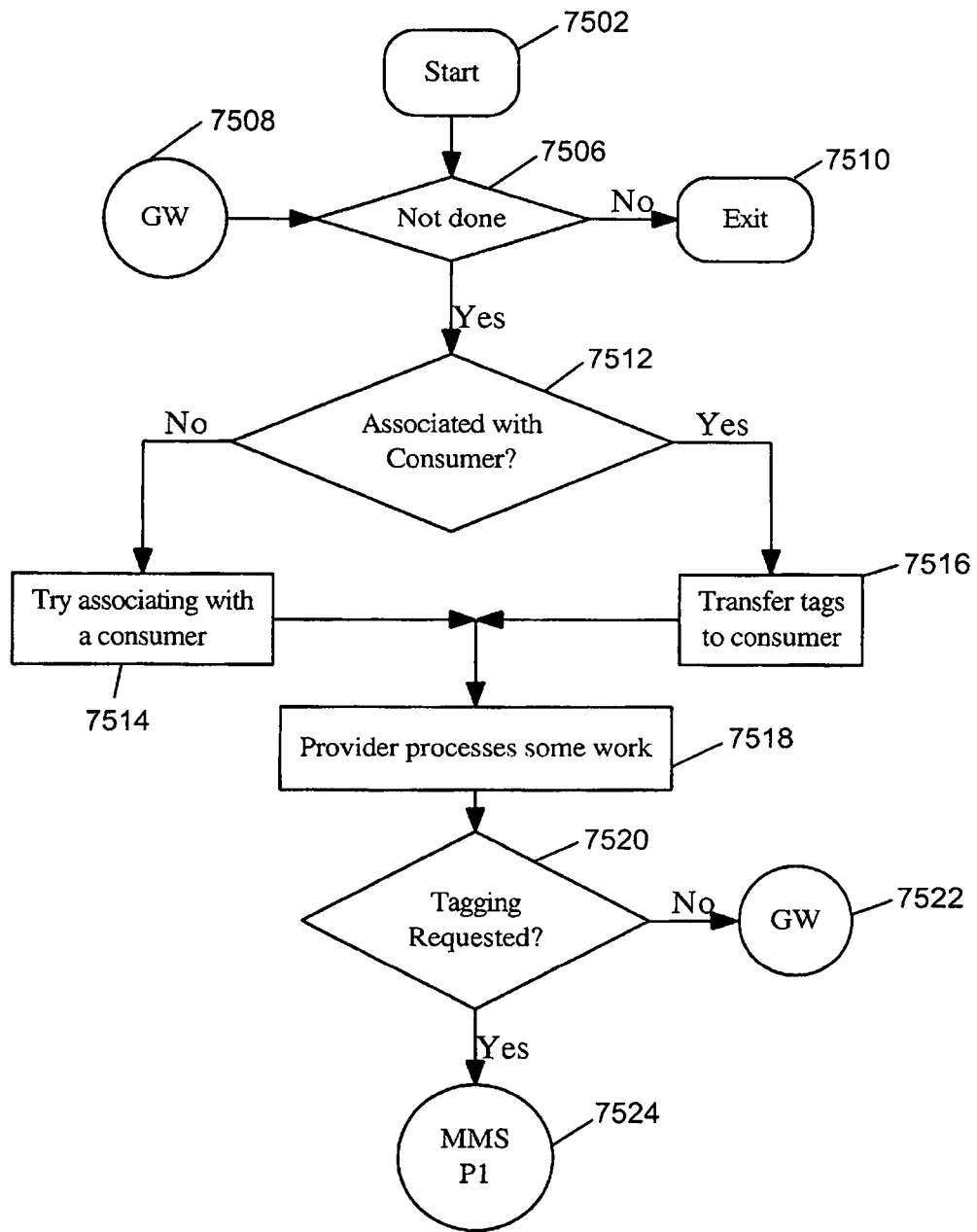
FIG. 75A-B illustrates the flow diagram of a process followed by a PD in associating with CDs, and managing tags according to an embodiment of the present invention.
Figure 75B:
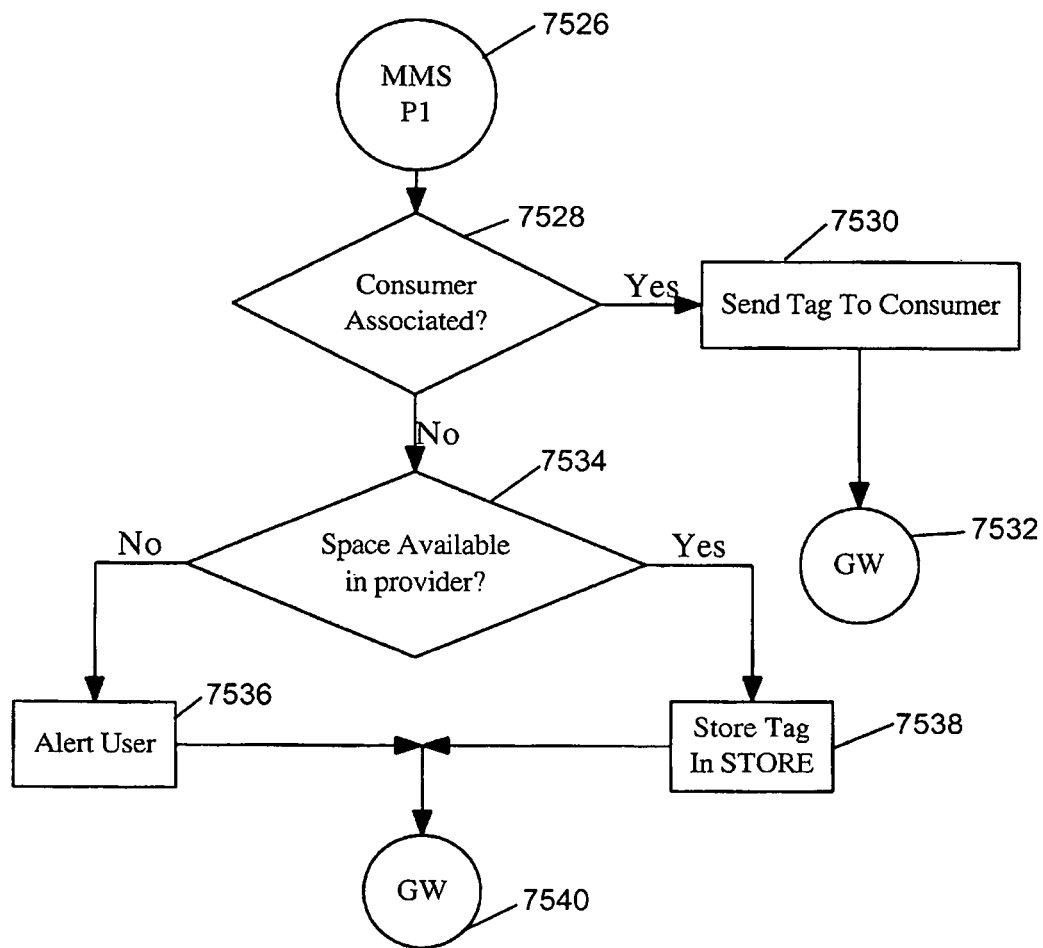

FIG. 75A-B illustrates the flow diagram of a process followed by a PD in associating with CDs, and managing tags according to an embodiment of the present invention. In the embodiment of the invention described here, the process illustrated in FIG. 75A-B can be used by an instance of PD 202 in associating with CD 102 instances, managing tags that can include storing tags in PD, and communicating tags to associated CD 102 instances, among others. In some embodiments of the invention PD 202 can allow for storing tags in STORE 218 of PD 202. PD 202 can also allow for providing tags to instance(s) of CD 102 associated with the PD. In the embodiment described here, request for tags can result in storing the tags in STORE 218 by PD 202 when there can be no instance of CD 102 associated with the PD. When one or more instances of CD 102 can be associated with the PD, request for tags can be handled by the PD by providing tags to the instances of CD 102 associated with the PD.

Requests for tags can be provided to PD 202 by means that can include an interactive selection associated with UI 226 of PD 202. In embodiments wherein PD 202 can provide/store tags due to an interactive selection, the availability of tags with the PD can be indicated on UI 226 of PD 202. In embodiments wherein functionality associated with PD 202 can be included in a set-top box, an LED on the front panel of the set top box can be lit up, set to a specific color, or the like, when a tag is available with the set top box. Other methods of indicating the availability of tags are possible. The method followed in processing the tags, association with instances of CD, requesting tags with the PD, storing tags in PD, providing tags to CD(s), transfer of tags from PD to CDs, and other functionality as illustrated in FIG. 75A-B is illustrative and meant for use by the embodiment described here. Other embodiments can choose to perform the functions differently, and can choose to not include some or all of the steps illustrated here. The methods and processes illustrated in FIG. 75A-B are not meant to be limiting the scope of the invention or any of its embodiments.

In the embodiment described here, an instance of PD 202, upon request, can either store tags in STORE 118 when the PD is not associated with any CD(s), or, provide tag(s) to one or more instances of CD 102 that the PD can be associated with. The request can be associated with PD 202 due to an event that can include user interaction using UI 226 of PD 202. User interaction with PD 202 can involve user pushing down a physical key associated with PD 202. User interaction with PD 202 can also involve user selection involving pushing down a key on a remote device associated with PD 202. The remote device and PD 202 can communicate with each other using technologies that can include infrared technology, RF technology, or the like. This can be similar to pressing a key on the remote associated with a set top box.

In another embodiment of the invention, PD 202 can provide tags for all associated CD 102 instances in a way that can not involve user interaction. In some embodiments, the instance of PD 202 can also store tags in STORE 218 of PD 202 in a way that does not involve user interaction. In some embodiments, a PD 202 can provide tags to instances of CD 102 or store tags in STORE 218, once every time interval. Other methods of providing tags to CD 102 instances or storing tags in STORE 218 by the PD are possible.

In embodiments of the present invention, tags that can be stored by PD 202 in STORE 218 can be provided by the PD to instance(s) of CD 102 when they become associated with the PD. In the embodiment described here, tags stored in STORE 218 can be transferred/provided to the first CD 102 that is associated with the PD 202 after PD 202 has stored tags in STORE 218. In this embodiment, PD 202 can be providing tags instead of storing them, while PD 202 can be associated with at least one CD 102 instance.

The process starts at step 7502 and moves to step 7506. At step 7506, a determination can be done to see if PD 202 needs to stop the processing associated with FIG. 75A-B. If the process needs to be stopped, the process can move to step 7510. Step 7510 indicates that the process associated with FIG. 75A-B is complete. If the process does not need to be stopped, the process can move to step 7512.

In embodiments wherein functionality associated with PD 202 can be included in a set-top box, the set top box can be associated with a user interface element such as a button that can allow for stopping the storage/providing of tags. This can be done due to a user preference in not communicating the information related to the media consumed by the user.

At step 7512, a check is made to determine if the PD is associated with any instances of CD 102. This can be determined by checking the value of pState.numInfo A non-zero value of pState.numInfo can indicate that the PD is associated with at least one instance of CD. In such case, the process can move to step 7516. At step 7516, tags that are stored in STORE 218 can be provided to one of the CDs associated with PD. Once the tags have been provided to a CD, they can be deleted/removed from STORE 218. The process can then move to step 7518.

Returning to step 7512, if it is determined that the PD is not associated with any instance of CD, the process can move to step 7514. At step 7514, the PD can try associating with a CD. This can be accomplished in some embodiments using the process illustrated in FIG. 49-52. The process can then move to step 7518.

At step 7518, the process can perform anything that can be specific to the embodiment. The process can then move to step 7520. At step 7520, PD can determine if there is a request for a tag. If there is no request for a tag, the process can move to step 7522. Step 7522 indicates that the process can move to step 7508. Step 7508 indicates that the process can move to step 7506. If the check at step 7520 indicates that there is a request for a tag, the process can move to step 7524. Step 7524 indicates that the process can move to step 7526 of FIG. 75B. Step 7526 indicates that the process can move to step 7528.

At step 7528, a check can be done to determine if the PD is associated with at least one CD. This can be determined by checking the value of pState.numInfo A non-zero value can indicate that the PD is associated with at least one CD. If the check is successful, the process can move to step 7530. At step 7530, the tag available at PD can be provided to the CD(s) associated with the PD. The process can then move to step 7532. Step 7532 indicates that the process can move to step 7508 of FIG. 75A.

Returning to step 7528, if the check associated with this step fails, the process can move to step 7534. At step 7534, a check is done to determine if there is space available in STORE 218 for storing the tag. If space is available, the process can move to step 7538, wherein the tag can be stored in STORE 218 of PD 202. If a set/list of tags are already stored in STORE 218, the new tag can be added/appended to the set/list of tags in STORE 218. The process can then move to step 7540. Step 7540 indicates that the process can move to step 7508 of FIG. 75A.

If the check at step 7534 fails, the process can move to step 7536. At step 7536, an alert can be indicated on UI 226 of PD 202 indicating that the PD does not have space available to store the tag. In embodiments wherein the functionality of PD 202 can be included in a set top box, an LED on the front panel of the set-top box can be set to a specific color—like orange. The process can then move to step 7540.

Figure 76A:
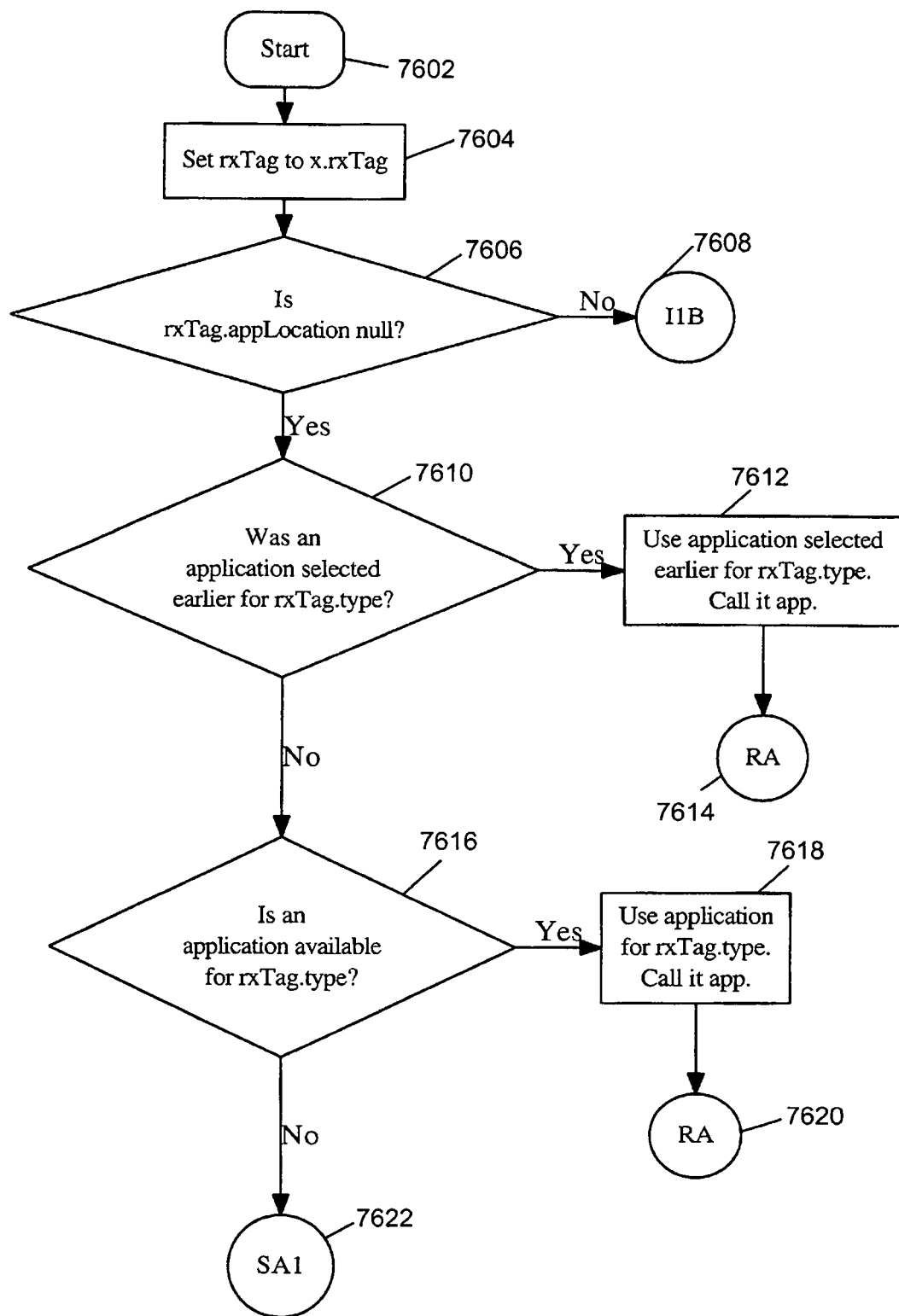
FIG. 76A-C illustrate the flow diagram of a process followed by a CD in determining an application that can be associated with a tag according to an embodiment of the present invention.
Figure 76C:
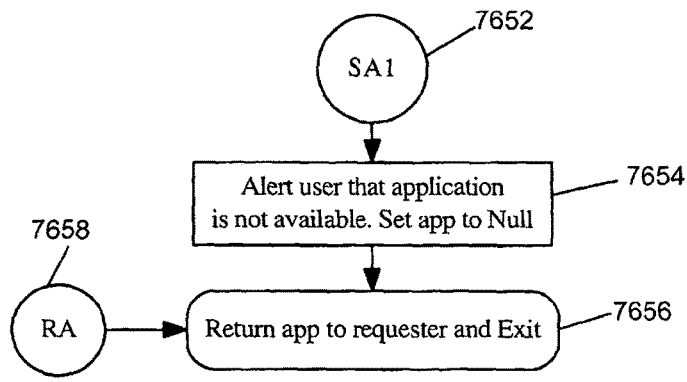
Figure 76B:
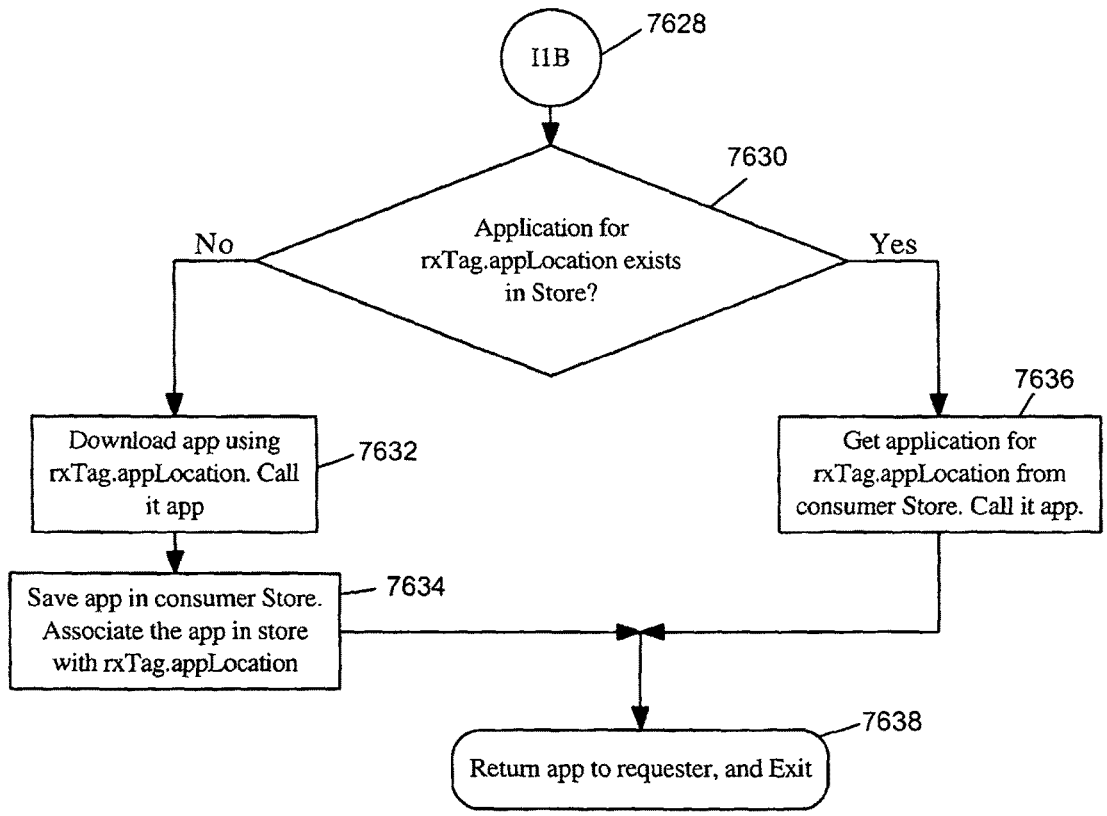

FIG. 76A-C illustrate the flow diagram of a process followed by a CD in determining the application that can be associated with a tag according to an embodiment of the present invention. In an embodiment of the invention, the process associated with FIG. 76A-C can be used by an instance of CD 102 in associating a tag with an application.

The process starts at step 7602 and moves to step 7604. At step 7604, rxTag associated with instance x is extracted and a local copy made. The local copy is referred to as rxTag for use in subsequent steps of the process. The process can then move to step 7606. At step 7606, a check is made to determine if rxTag.appLocation is Null. rxTag.appLocation can represent a URL in some embodiments. A Null rxTag.appLocation can indicate that the rxTag.appLocation does not provide a URL. In some embodiments, rxTag.appLocation can specify a URL from where an application can be downloaded. If rxTag.appLocation is Null, the process can move to step 7610. If rxTag.appLocation is not Null, it can imply that rxTag.appLocation can be used as a URL from where an application can be downloaded. The process can in such embodiments move to step 7608. Step 7608 indicates that the process can move to step 7628 of FIG. 76B. Step 7628 indicates that the process can move to step 7630.

At step 7630, a check can be made to determine if the application that can be downloaded from rxTag.appLocation is already present and/or available to the CD. If the application is already available, an instance of CD 102 can choose to not download the application from rxTag.appLocation URL. In some embodiments, the availability/presence of an application with CD 102 can be determined using the process illustrated in FIG. 81. Instance 'x' can be provided to process of FIG. 81. Instance 'x' can be associated with field appLocation. x.appLocation can be set to rxTag.appLocation, before using the process associated with FIG. 81. The process associated with FIG. 76A-C can use the result of FIG. 81. If the result associated with FIG. 81 indicates that an application is available with CD 102, the process can move to step 7636. If not, the process can move to step 7632. Step 7632 indicates that the CD 102 can download the application from rxTag.appLocation URL. The downloaded application can be referred to as an app. Various methods of downloads are possible. Methods of download can use protocols such as http, ftp or the like. In some embodiments, downloads can also be based on peer to peer technologies such as BitTorrent, GnuTella, etc. In some other embodiments, downloads can also be based on trackerless peer to peer technologies. Other methods of downloads not described here can also be used. The downloads can use the instance of NI 106 of CD 102 which can also be used in receiving tags by the CD, or any other instance of NI 106 on CD 102 can be used for the downloads. Downloads can use wired and/or wireless technologies. Downloads can also use technologies such as Wifi, cellular communications, or the like.

Figure 82:
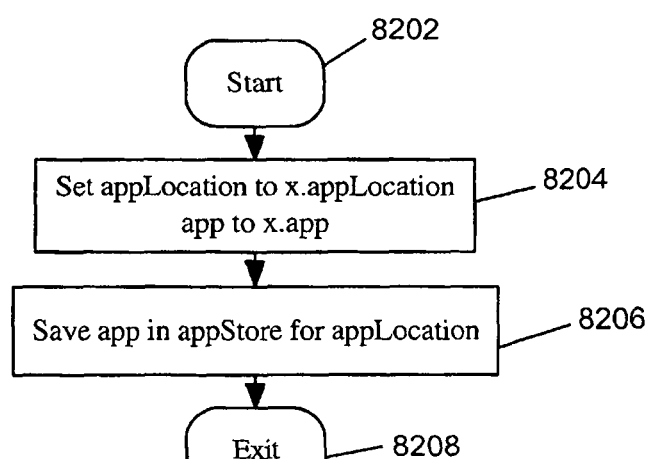
FIG. 82 illustrates the flow diagram of a process followed by a CD in storing an application in the storage medium associated with the CD, according to an embodiment of the present invention.

The process at step 7632 can then move to step 7634. At step 7634, the downloaded app can be saved in STORE 118 of CD 102. In some embodiments, the process associated with FIG. 82 can be used for saving app in STORE 118. Instance 'x' can be provided to process of FIG. 82. Instance 'x' can be associated with fields appLocation and app. x.appLocation can be set to rxTag.appLocation, and x.app can be set to app, before using the process associated with FIG. 82. The process associated with FIG. 76A-C can move to step 7638 after the process associated with FIG. 82 is complete. Step 7638 indicates that the process associated with FIG. 76A-C is complete. The process can also provide the 'app' to the process that uses process associated with FIG. 76A-C.

Returning to step 7636, the application associated with rxTag.appLocation can be retrieved from STORE 118. In some embodiments, this can be determined using the process illustrated in FIG. 81. Instance 'x' can be provided to process of FIG. 81. Instance 'x' can be associated with field appLocation. x.appLocation can be set to rxTag.appLocation, before using the process associated with FIG. 81. The process associated with FIG. 76A-C can use the application returned by process illustrated in FIG. 81. The result provided by process of FIG. 81 can be referred to as app. The process can then move to step 7638.

Returning to step 7610 of FIG. 76A, a check can be made at this step to determine if an application can be determined based on a selection in the past, based on the type associated with rxTag. In some embodiments, this can be determined using the process illustrated in FIG. 78. Instance 'x' can be provided to process of FIG. 78. Instance 'x' can be associated with a field 'type'. x.type can be set to rxTag.type, before using the process associated with FIG. 78. The process associated with FIG. 76A-C can use the result of FIG. 78. If the result associated with FIG. 78 indicates that an application associated with the given type can be determined based on an earlier selection, the process can move to step 7612. If not, the process can move to step 7616.

Figure 78:
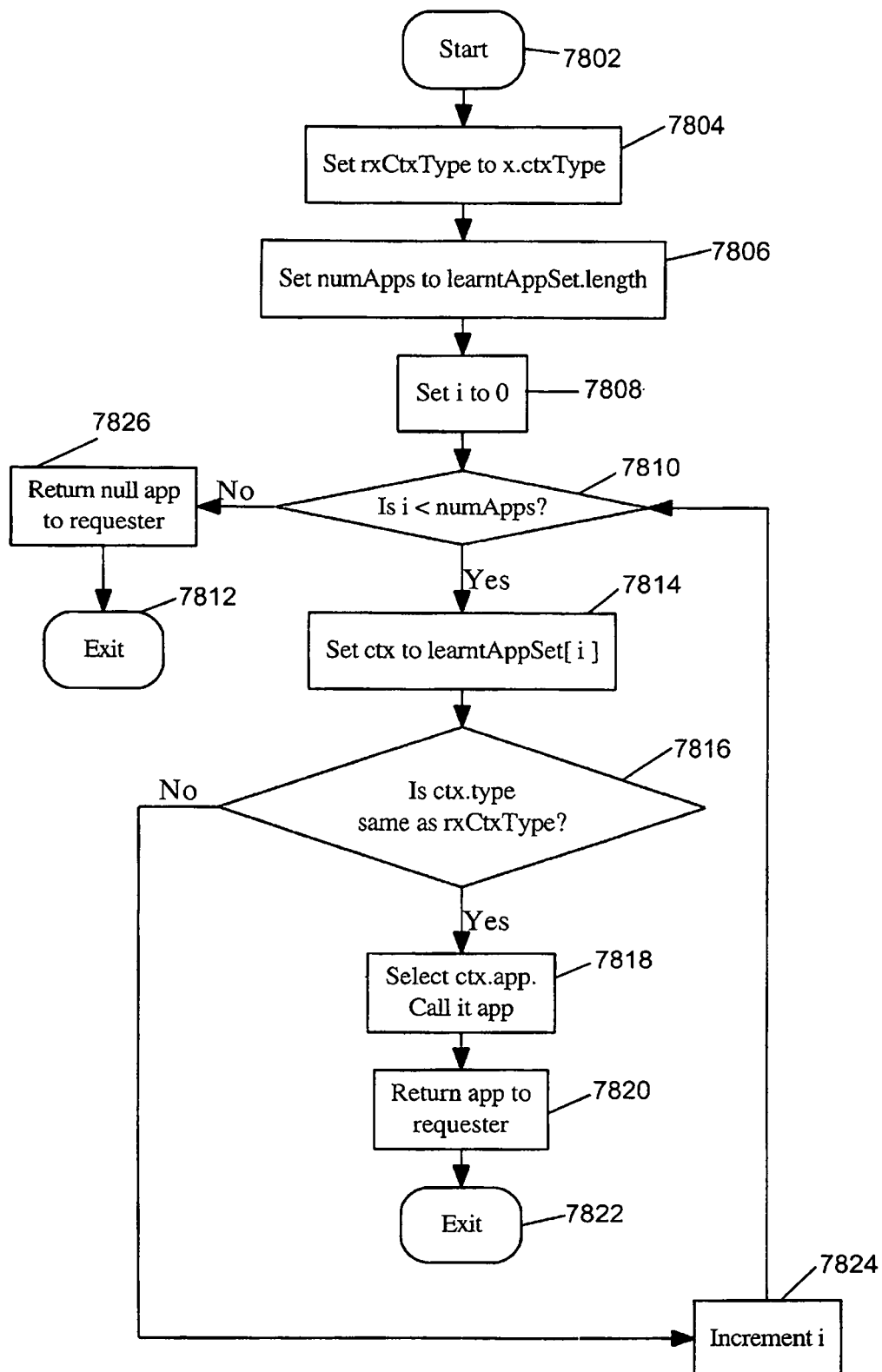
FIG. 78 illustrates the flow diagram of a process followed by a CD in determining the application that has been selected in the past, according to an embodiment of the present invention.

At step 7612, an application can be determined based on a selection that has been made in the past. The selection can be made due to various forms of interactions with a user via UI 126 of CD 102. The interactions can involve user selecting an application from a list of applications, in some embodiments. In other embodiments, the interactions can involve user selection of one or more tags from a list of tags. In some embodiments, the interaction can also involve UI 226 of PD 202. In some embodiments an application can be determined using the process illustrated in FIG. 78. Instance 'x' can be provided to process of FIG. 78. Instance 'x' can be associated with a field 'type'. x.type can be set to rxTag.type, before using the process associated with FIG. 78. The process associated with FIG. 76A-C can use the result of FIG. 78. The result provided by process of FIG. 78 can be referred to as app, for use in subsequent steps of the process. The process can move to step 7614, after the process associated with FIG. 78 is complete. Step 7614 indicates that the process can move to step 7658 of FIG. 76C. Step 7658 indicates that the process can move to step 7656. Step 7656 indicates that the 'app' as determined in earlier steps can be provided as a result of the process illustrated in FIG. 76A-C. Step 7656 also indicates that the process associated with FIG. 76A-C is complete.

Returning to step 7616 of FIG. 76A, a check can be made at this step to see if an application can be determined based on the type associated with rxTag. In some embodiments, this can be determined using the process illustrated in FIG. 80. Instance 'x' can be provided to process of FIG. 80. Instance 'x' can be associated with a field 'type'. x.type can be set to rxTag.type, before using the process associated with FIG. 80. The process associated with FIG. 76A-C can use the result of FIG. 80. If the result associated with FIG. 80 indicates that an application associated with the given type can be determined, the process can move to step 7618. If not, the process can move to step 7622.

Figure 80:
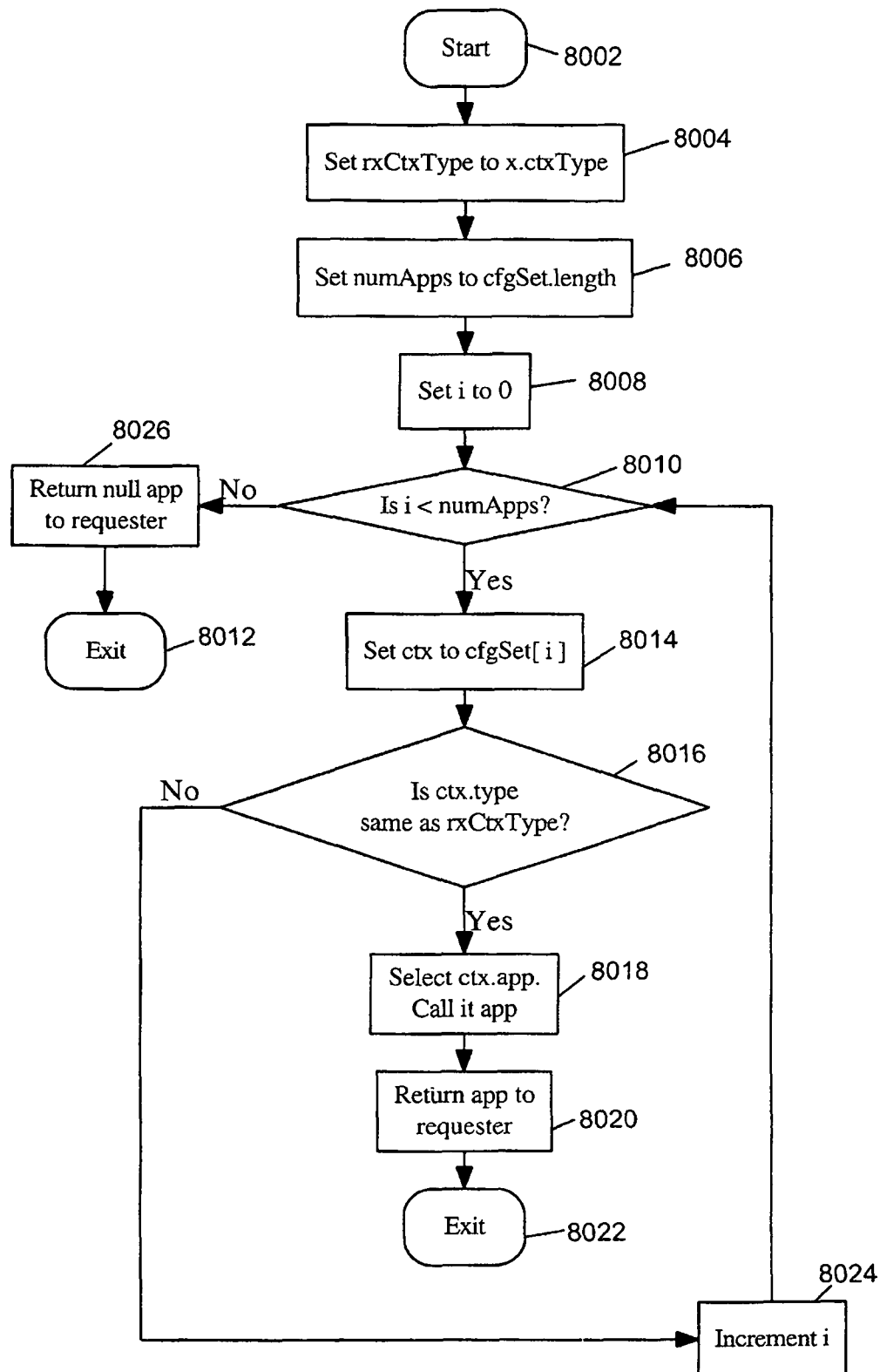
FIG. 80 illustrates the flow diagram of a process followed by a CD in determining an application that can be associated with a given tag type, according to an embodiment of the present invention.

At step 7618, an application can be determined based on the type associated with rxTag. In some embodiments, the determination of an application can be made on some configuration. The configuration can be provided by user via UI 126 of CD 102 at an earlier point of time. The configuration can also be provided using some other provisioning mechanisms. The configuration in some embodiments can help determine an application based on the type associated with a tag. In some embodiments an application can be determined using the process illustrated in FIG. 80. Instance 'x' can be provided to process of FIG. 80. Instance 'x' can be associated with a field 'type'. x.type can be set to rxTag.type, before using the process associated with FIG. 80. The process associated with FIG. 76A-C can use the result of FIG. 80. The result provided by process of FIG. 80 can be referred to as app, for use in subsequent steps of the process. The process can move to step 7620, after the process associated with FIG. 80 is complete. Step 7620 indicates that the process can move to step 7658 of FIG. 76C.

Returning to step 7622, this step indicates that the process can move to step 7652 of FIG. 76C. Step 7652 indicates that the process can move to step 7654. At step 7654, an alert can be provided to user of CD 102 indicating that an application could not be determined for rxTag. 'app' can be set to Null which can indicate that an application is not available. In some embodiments, an alert that can be provided in this step can include mechanisms such as displaying a message on VIDEO 124 of CD 102. In other embodiments, the alert can include making an audio beep using AUDIO 122. In other embodiments, a small icon can be placed on UI 126 indicating that some tags could not be resolved into applications. In some other embodiments, an alert cannot be provided. The process can then move to step 7656.

The method of determining an application for a given tag, as illustrated in FIG. 76A-C is illustrative only, and meant for use by the embodiment of the invention described here. Other embodiments can choose to include methods not described here, exclude some or all of the methods described in FIG. 76A-C. The methods and the information used by the methods of FIG. 76A-C, are not meant to be limiting the scope of the invention or any of its embodiments.

Figure 77:
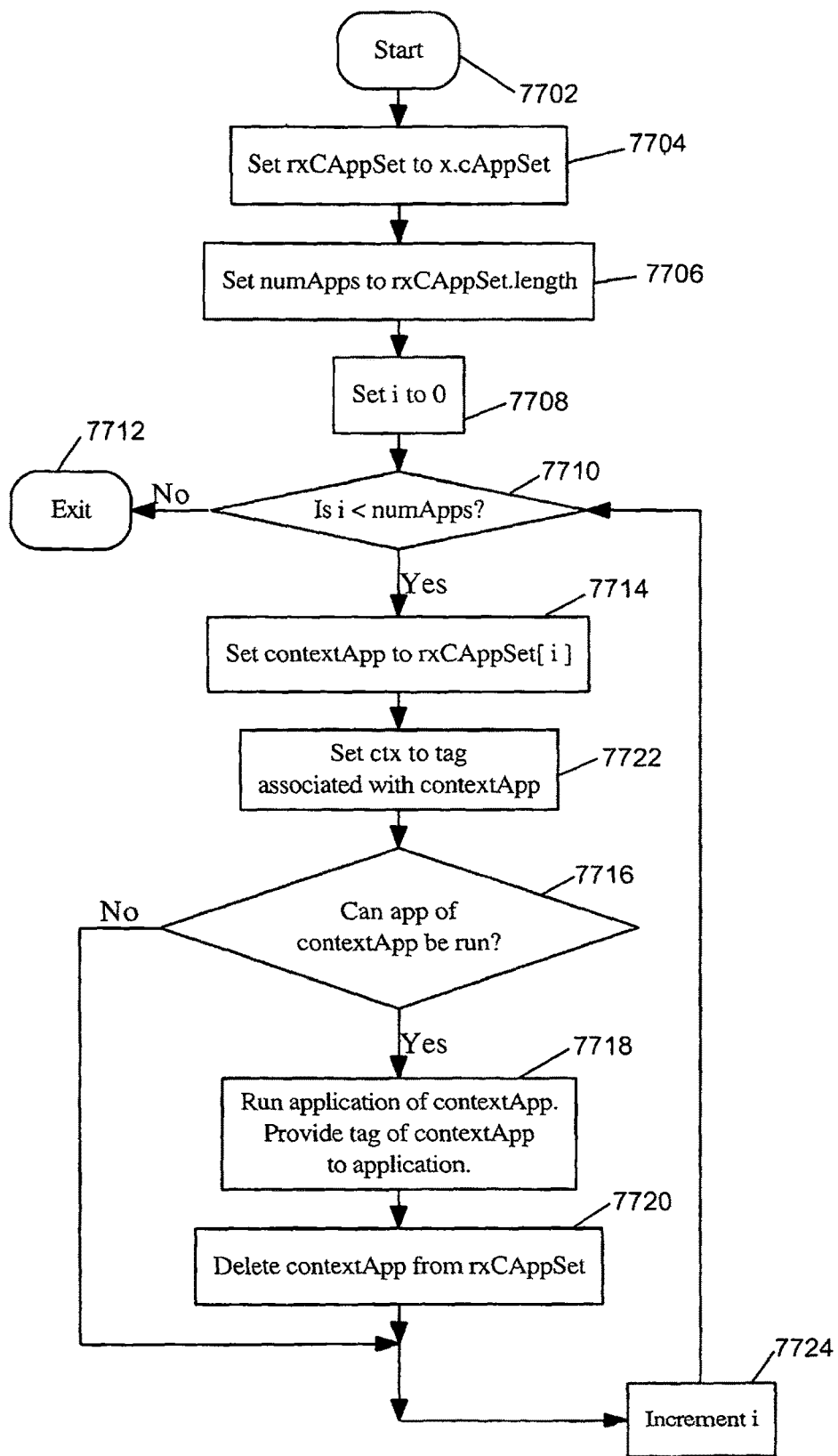
FIG. 77 illustrates the flow diagram of a process followed by a CD in handling applications associated with tags in a non-interactive manner according to an embodiment of the present invention.

FIG. 77 illustrates the flow diagram of a process followed by a CD in handling applications associated with tags in a non-interactive manner according to an embodiment of the present invention. In one embodiment of the present invention, an instance of CD 102 can use the process illustrated in FIG. 77 to run applications associated with some tags received by the CD. In some embodiments, applications for some tags can be run in a non-interactive manner. The applications that can be run in such embodiments can not involve user interacting with the application. An example of such an embodiment is a tag of type SaleSchedule. A tag of such type can be associated with an application that can update the calendar of user associated with CD 102 with the schedule of a sale as can be indicated by the tag. The application for this tag type can be run automatically when the tag is received, without involving user interaction. Various methods can be used in determining if an application associated with a tag can be run in a in a non-interactive manner. In the embodiment described here, an autoRun field associated with AppData as illustrated in FIG. 19 can be used to determine if the application can be run without user interaction. In other embodiments, CD 102 can be associated with a configuration that can specify a set of types associated with tags for which applications can be run without user interaction. Other embodiments can use other methods of determining if an application for a given tag can be run non-interactively. The methods and information as illustrated in FIG. 77 is meant for use according to the embodiment of the invention described here, and is not meant to be limiting the scope of the invention or any of its embodiments.

The process starts at step 7702 and moves to step 7704. At step 7704, cAppSet associated with instance x is extracted and a local copy made. The local copy is referred to as rxCAppSet for use in subsequent steps of the process. rxCAppSet is an array of instances of type CA. Each instance of a CA can be associated with a tag and an application. The process can then move to step 7706. At step 7706, numApps can be set to rxCAppSet.length—the number of valid CA instances available in rxCAppSet. The process can then move to step 7708.

At step 7708, i is set to 0. The process can then move to step 7710. At step 7710 a check is made to determine if i is less than numApps. If the check succeeds, the process can move to step 7714. If not, the process can move to step 7712. Step 7712 indicates that the process associated with FIG. 77 is complete.

Returning to step 7714, i-th element of rxCAppSet is retrieved and contextApp is set to the retrieved CA instance. The process can then move to step 7722. At step 7722, a ctx is set to tag associated with contextApp. The process can then move to step 7716. At step 7716, a check is made to determine if the app associated with contextApp can be run in a non-interactive manner. In the embodiment described here, the autoRun field associated with contextApp.app can be checked. If contextApp.app.autoRun indicates true, the check at step 7716 can indicate a success of check. If the check succeeds, the process can move to step 7718. If not, the process can move to step 7724. At step 7724, i is incremented and the process moves to step 7710. The incremented value of i can be used to access/retrieve the next element of rxCAppSet, if possible. Returning to step 7718, the element at index i can indicate that the application associated with it can be run. The application contextApp.app can be run at this step. contextApp.tag can be provided as input to the run of contextApp.app. Other contextApp.tag specific data, or any other embodiment specific data can be provided as input to the run of contextApp.app. In an environment that can support run of multiple applications at any time (such as the Android operating system/platform), the process can move to step 7720. If the environment associated with CD 102, that can include the operating system, does not support run of multiple applications, the process associated with FIG. 77 waits in step 7718 for completion of run of contextApp.app. In such embodiments, the process can move to step 7720 after the run of contextApp.app is complete. Step 7720 indicates that the contextApp can be deleted from rxCAppSet. The process can then move to step 7724.

FIG. 78 illustrates the flow diagram of a process followed by a CD in determining an application that has been selected in the past, according to an embodiment of the present invention. In the embodiment of the invention described here, the process associated with FIG. 78 can be used by an instance of CD 102 in determining an application that can be associated with a given tag type. The determination can be done based on the selection of an application in the past for another tag associated with a type which matches the type provided to the process of FIG. 78. Other methods of associating a given type with an application based on events in the past can be used. The method of associating a type (or a tag) to an application based on selections made on CD 102 in the past, as described in FIG. 78 is illustrative only. Other embodiments can choose to use other events associated with CD 102 to help associate a given tag type to an application.

The process starts at step 7802 and moves to step 7804. The process is provided with instance 'x' that can be associated with ctxType field. The values associated with instance 'x' can be provided by a process that uses the method illustrated by FIG. 78. x.ctxType is an instance of type that can be associated with a tag, as illustrated in FIG. 4A-B. A local copy of x.ctxType is made in step 7804. The local copy is referred to as rxCtxType for use in subsequent steps of the process. The process can then move to step 7806. At step 7806, numApps is set to number of valid elements in learntAppSet. The process then moves to step 7808. At step 7808, i is set to 0. The process can then move to step 7810. At step 7810 a check is made to determine if i is less than numApps. If the check succeeds, the process can move to step 7814. If not, the process can move to step 7826. Step 7826 indicates that the process associated with FIG. 78 is unable to determine an application for the given type. The process can then move to step 7812. Step 7812 indicates that the process associated with FIG. 78 is complete.

Returning to step 7814, i-th element of learntAppSet is retrieved and ctx is set to the retrieved CA. The process can then move to step 7816. At step 7816, a check is made to determine if the type associated with ctx matches rxCtxType. If the check succeeds, the process can move to step 7818. If not, the process can move to step 7824. At step 7824, i is incremented and the process moves to step 7810. The incremented value of i can be used to access/retrieve the next element of learntAppSet, if possible. Returning to step 7818, the element at index i can indicate that the application selected in the past for a tag type matching rxCtxType has been found in learntAppSet array. ctx.app is then associated with app. The process can then move to step 7820. At step 7820, a determination is made that 'app' as determined in step 7818 is the result of the process associated with FIG. 78. The process can then move to step 7822. Step 7822 indicates that the process associated with FIG. 78 is complete.

Figure 79A:
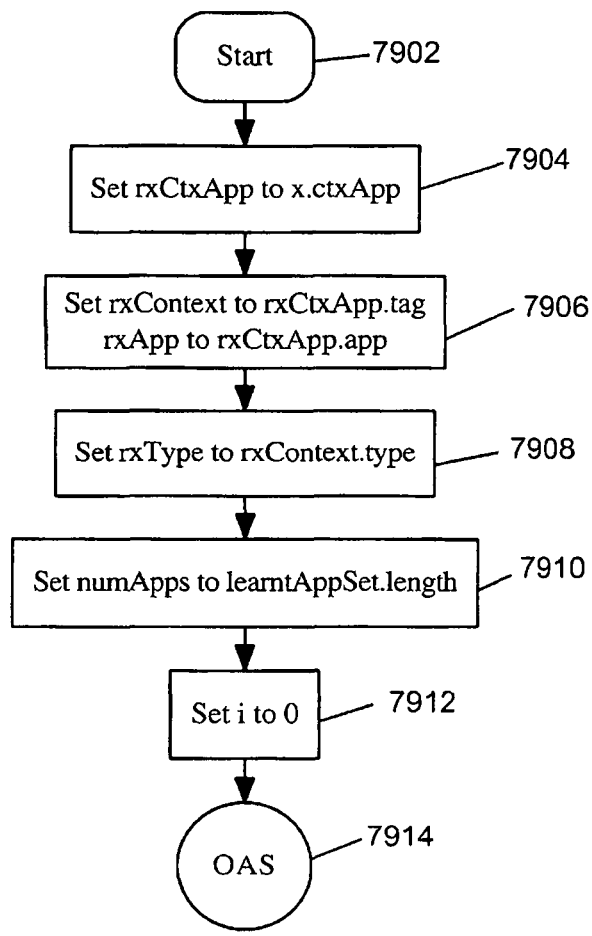
FIG. 79A-B illustrate the flow diagrams of a process followed by a CD in handling the selection of an application for a given tag according to an embodiment of the present invention.
Figure 79B:
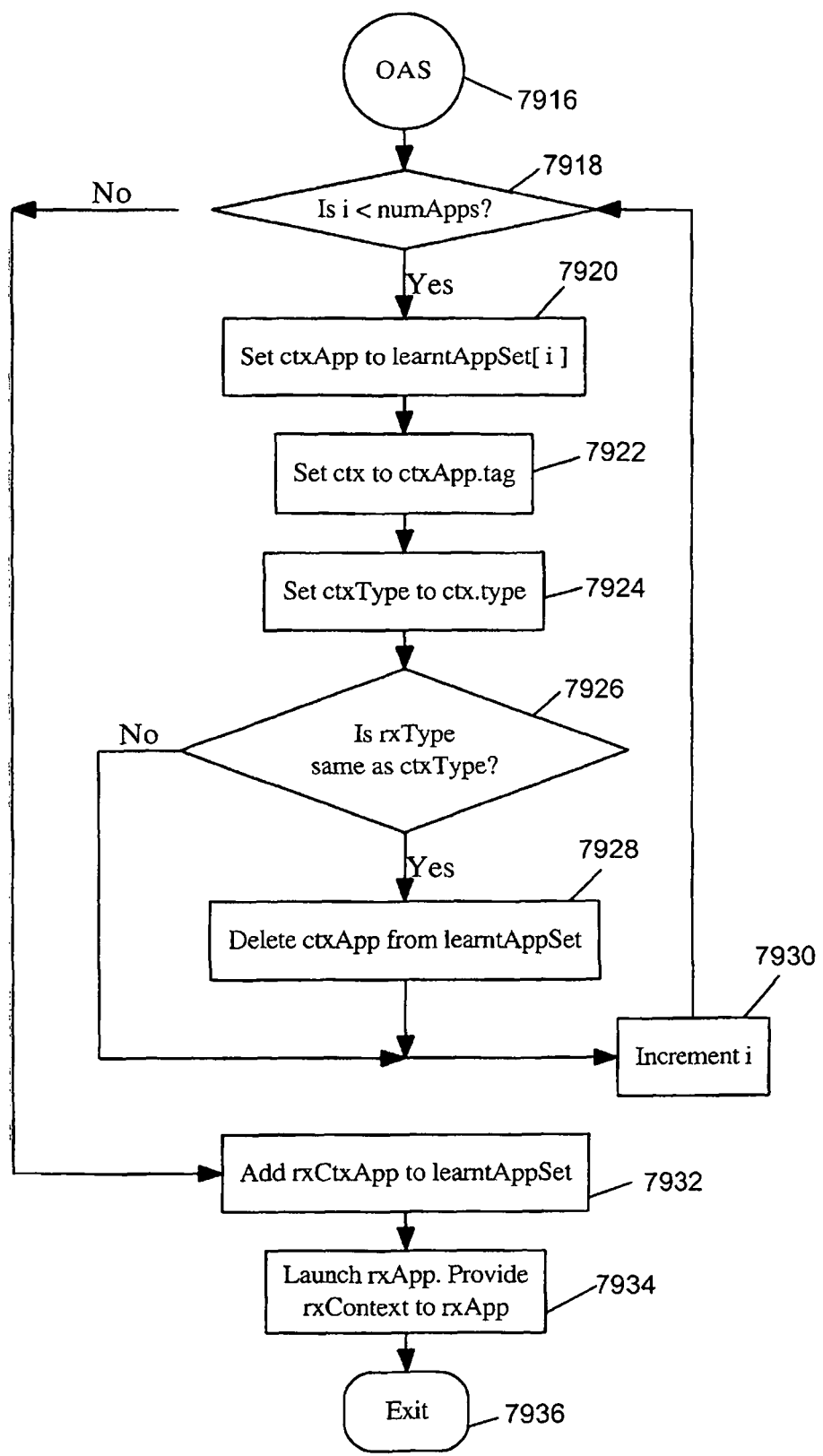

FIG. 79A-B illustrate the flow diagrams of a process followed by a CD in handling the selection of an application, according to an embodiment of the present invention. In the embodiment of the invention described here, the process illustrated in FIG. 79A-B can be followed by an instance of CD 102 when a user of CD 102 selects an application for a given tag. An application can be selected by a user of CD 102 from a list of applications for received tags, using UI 126. The method can also be used when an application is selected based on a user interaction that can determine the tags (and hence the resulting applications) received by CD 102. The method can also be used in embodiments wherein a user interaction can select tags instead of applications. The method of handling selection of applications and/or tags (which can indirectly imply the selection of applications, since tags are associated with applications) as described in this embodiment is illustrative. Other embodiments can choose to handle selection of applications and/or tags in a manner different from what is described here. The methods described here are not meant to be limiting the scope of the invention or any of its embodiments.

In the method described in FIG. 79A-B, the selection of an application and/or tags can involve updating the learntAppSet. This can be done to associate the type of tag to the application, which can be provided to the process. This can be useful in determining an application to be used for tags that can be received by the CD 102, in future. The application associated with the selection can be launched as well. When an application is launched, the tag can be provided to application, along with any other data that can be specific to the embodiment or the tag. Other methods of handling application or tag selection can be used in other embodiments.

The process starts at step 7902 and moves to step 7904. The process is provided with instance 'x' that can be associated with ctxApp field. The values associated with instance 'x' can be provided by a process that uses the method illustrated by FIG. 79. x.ctxApp is an instance of CA. A local copy of x.ctxApp is made in step 7904. The local copy is referred to as rxCtxApp for use in subsequent steps of the process. rxCtxApp includes a tag and an application. In some embodiments, the application associated with rxCtxApp can be the selected aspect, while in some other embodiments, the tag can be a selected aspect.

The process can then move to step 7906. At step 7906, rxContext is set to rxCtxApp.tag and rxApp is set to rxCtxApp.app. The process can then move to step 7908. At step 7908, an rxType is set to rxContext.type. The process can then move to step 7910. At step 7910, numApps is set to length of learntAppSet—the number of valid CA instances maintained in learntAppSet. The process can then move to step 7912. At step 7912, an i is set to 0. The process can then move to step 7914. Step 7914 indicates that the process can move to step 7916 of FIG. 79B.

Step 7916 of FIG. 79B indicates that the process can move to step 7918. At step 7918, a check is done to determine if i is less than numApps. If the check fails, the process can move to step 7932. If the check succeeds, the process can move to step 7920. At step 7920, i-th element of learntAppSet is retrieved and is copied to ctxApp for use in subsequent steps of the process. At step 7922, a ctx is set to ctxApp.tag. The process then moves to step 7924 where a ctxType is set to ctx.type. The process can then move to step 7926. At step 7926, a check is done to determine if rxType is same as ctxType. If the check passes, the process can move to step 7928. If the check fails the process can move to step 7930. At step 7930, i is incremented and the process moves to step 7918. Referring to step 7926, a check that passes can indicate that the i-th element in learntAppSet is associated with a tag whose type matches rxType. At step 7928, the i-th element is deleted from learntAppSet. This can be done to add the new CA instance to the set. In some embodiments, this can be done so that the application that can be selected for a tag based on learntAppSet can be the application that has been chosen last for a given type and/or tag. The process in step 7928 can then move to step 7930.

Referring to step 7932, the rxCtxApp determined in step 7904 can be added to learntAppSet. The process can then move to step 7934. At step 7934 the application rxApp as determined in step 7906 can be launched. The application can be provided with input that can include rxContext determined in step 7906. The application can also be provided with input that can include embodiment specific data and/or data specific to the tag that can be related to the embodiment. The input can be provided using interactive or non-interactive schemes. This can include mechanisms such as arguments that are provided to software written in programming languages such as C, Java, etc. Programs written in C are provided with parameters to a main( ) function in program, that can specify the arguments to the program. These arguments can be specified on command line when the program is invoked interactively. In other embodiments where programs are invoked non-interactively, parameters can be specified to programs in manner specific to the embodiment. For example, when a C program is invoked from a shell script, parameters can be specified to C programs in a manner similar to how the parameters are specified at command line. The parameters in such embodiment are provided by the script that invokes the program. Other methods can be used to provide parameters to the application. The process associated with FIG. 79A-B can then move to step 7936. Step 7936 indicates that the process associated with FIG. 79A-B is complete.

FIG. 80 illustrates the flow diagram of a process followed by a CD in determining an application that can be associated a given tag type, according to an embodiment of the present invention. In the embodiment of the invention described here, the process associated with FIG. 80 can be used by an instance of CD 102 in determining an application that can be associated with a given tag type. The determination can be done based on the associations between tags and applications maintained by cfgAppSet in STORE 118 of CD 102. In one embodiment, cfgAppSet maintains an association between tags and applications using an array of CA instances. The set of instances of CA in cfgAppSet can be managed by user interaction via UI 126 or some other configuration provisioning mechanisms. The method of associating a tag type to an application based on cfgAppSet configuration by CD 102, as described in FIG. 80 is illustrative only. Other embodiments can choose to use other methods and/or other configuration associated with CD 102 to help associate a given tag type to an application.

The process starts at step 8002 and moves to step 8004. The process is provided with instance 'x' that can be associated with ctxType field. The values associated with instance 'x' can be provided by a process that uses the method illustrated by FIG. 80. x.ctxType is an instance of type that can be associated with a tag, as illustrated in FIG. 4A-B. A local copy of x.ctxType is made in step 8004. The local copy is referred to as rxCtxType for use in subsequent steps of the process. The process can then move to step 8006. At step 8006, numApps is set to number of valid elements in cfgAppSet. The process then moves to step 8008. At step 8008, i is set to 0. The process can then move to step 8010. At step 8010 a check is made to determine if i is less than numApps. If the check succeeds, the process can move to step 8014. If not, the process can move to step 8026. Step 8026 indicates that the process associated with FIG. 80 is unable to determine an application for the given type. The process can then move to step 8012. Step 8012 indicates that the process associated with FIG. 80 is complete.

Returning to step 8014, i-th element of cfgAppSet is retrieved and ctx is set to the retrieved CA instance. The process can then move to step 8016. At step 8016, a check is made to determine if the type associated with ctx matches rxCtxType. If the check succeeds, the process can move to step 8018. If not, the process can move to step 8024. At step 8024, i is incremented and the process moves to step 8010. The incremented value of i can be used to access/retrieve the next element of cfgAppSet, if possible. Returning to step 8018, the element at index i can indicate that the application for a tag type matching rxCtxType has been found in cfgAppSet array. ctx.app is then associated with app. The process can then move to step 8020. At step 8020, a determination is made that 'app' as determined in step 8018 is the result of the process associated with FIG. 80. The process can then move to step 8022. Step 8022 indicates that the process associated with FIG. 80 is complete.

Figure 81:
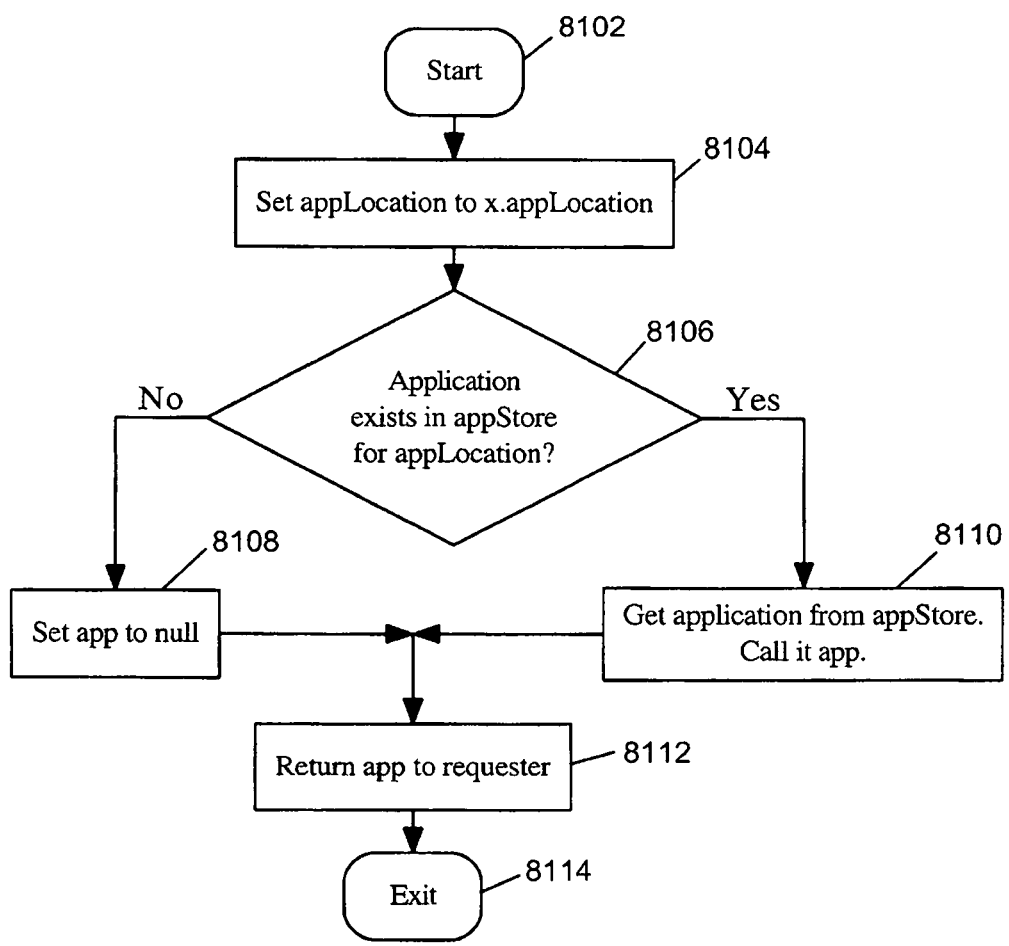
FIG. 81 illustrates the flow diagram of a process followed by a CD in accessing an application from the storage medium associated with the CD, according to an embodiment of the present invention.

FIG. 81 illustrates the flow diagram of a process followed by a CD in accessing or retrieving an application from the storage medium associated with the CD, according to an embodiment of the present invention. In the embodiment described here, an instance of CD 102 can store applications in APPSTORE associated with STORE 118. Applications can be stored in APPSTORE using STI 116. FIG. 81 is related to FIG. 82 in a way such that while the method illustrated in FIG. 82 is used to store applications in APPSTORE, the method illustrated in FIG. 81 is used to retrieve or access applications from APPSTORE. The notion of identifiers, association of applications to identifiers, appLocations, association of appLocations to applications, the association of appLocations to applications when application is stored in APPSTORE, the use of associative arrays for storing, the use of hash table for application management in other embodiments, etc. (and all related aspects and embodiments) as applicable to method of FIG. 82 are applicable to FIG. 81. The method illustrated by FIG. 81 is illustrative, meant to be used with the embodiment described here, and is not meant to limit the scope of the invention or any of its embodiments.

The process begins at step 8102 and moves to step 8104. The process is provided with instance 'x' that can be associated with appLocation. The values associated with instance 'x' can be provided by a process that uses the method illustrated by FIG. 81. In the embodiment described here, x.appLocation can be a URL. At step 8104, a local copy of x.appLocation is made in appLocation. The process then moves to step 8106. At step 8106, APPSTORE is examined to determine if an application associated with appLocation is stored in APPSTORE. If it is determined that an application associated with appLocation exists in APPSTORE, the process can move to step 8110. If not, the process can move to step 8108. At step 8110, the application associated with appLocation is retrieved from APPSTORE. The retrieved application is referred to as 'app'. The process can then move to step 8112.

Returning back to step 8108, where an application associated with appLocation does not exist, 'app' can be set to NULL. The NULL value for app can indicate that there is no application in APPSTORE that can be associated with appLocation. The process can then move to step 8112.

At step 8112, app determined either in steps 8108 or 8110 is provided as the result of the process described in FIG. 81. If the process described in FIG. 81 is used by other processes to retrieve applications from APPSTORE, 'app' can be returned to the process that uses FIG. 81. The process can then move to step 8114. Step 8114 indicates that the process associated with FIG. 81 is complete.

FIG. 82 illustrates the flow diagram of a process followed by a CD in storing an application in the storage medium associated with the CD, according to an embodiment of the present invention. In the embodiment described here, an instance of CD 102 can store applications in APPSTORE associated with STORE 118. Applications can be stored in APPSTORE using STI 116. Each application stored in APPSTORE can be associated with information that can include an identifier. In the embodiment described here, the identifier can be associated with an appLocation. In some embodiments, the appLocation can represent a URL from which the application is downloaded. In other embodiments, an appLocation associated with an application does not represent a URL from where the application is downloaded. The appLocation in some embodiments can be used to associate a unique identifier with an application among a set of applications. The use of appLocation for identifiers, URL for appLocation, etc. is illustrative only. Other identifiers can be used as well. Other methods of storing applications in and/or retrieving applications from APPSTORE can be used in other embodiments. The method illustrated by FIG. 82 is not meant to limit the scope of the invention or any of its embodiments.

In the method associated with FIG. 82, each application is associated with an appLocation. The appLocation can indicate the URL from where the application can be downloaded. When an application is provided to APPSTORE for storage, the APPSTORE can be provided with information that can include appLocation. The APPSTORE associated with STORE 118 can be used to store applications such that the applications can be retrieved from APPSTORE when the APPSTORE is presented with information that can include appLocation. The method of storage and retrieval can be implemented using an associative array. Associative arrays allow for storing elements in a way such that the array can be indexed using elements that need not be integers. Regular arrays, such as those provided with C programming languages can be indexed using integers only. The management of applications in APPSTORE can also be implemented using hash tables, with appLocation acting as the key for the hash table. Other methods of storing applications associated with appLocations can be implemented. In the embodiment described in FIG. 82, associative arrays are used to store the application.

The process begins at step 8202 and moves to step 8204. The process is provided with instance 'x' that can be associated with app and appLocation. The values associated with instance 'x' can be provided by a process that uses the method illustrated by FIG. 82. In the embodiment described here, x.app can be associated with an application as described in FIG. 19. x.appLocation can be associated with a URL. The values associated with instance 'x' are extracted and a local copy made for use in the process described in FIG. 82. The process then moves to step 8206. At step 8206, the app extracted from instance 'x' is stored in APPSTORE. Along with providing app to APPSTORE, APPSTORE is also provided with appLocation extracted from 'x'. The process can then move to step 8208. Step 8208 indicates that the process associated with FIG. 82 is complete.

Figure 83:
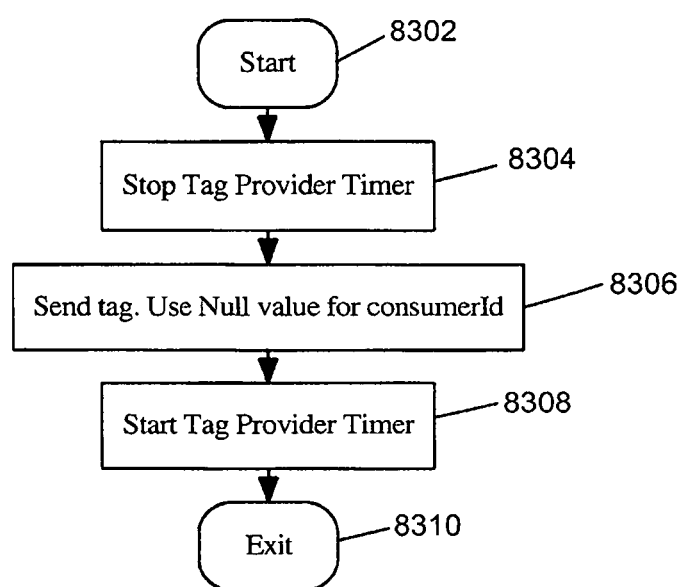
FIG. 83 illustrates the flow diagram of a process followed by a PD in providing tags according to an embodiment of the present invention.

FIG. 83 illustrates the flow diagram of a process followed by a PD in providing tags according to an embodiment of the present invention. In the embodiment of the invention described here, tag(s) can be provided by an instance of PD 202 upon expiry of a time interval. The tag(s) can be provided to instances of CD 102 in a manner that can be determined by information that can include information related to the type of tag, the association type of the tag or the like. The events that can trigger provisioning of tag by the PD can be specific to each embodiment. For the embodiment described here, tags can be provided by a PD upon expiry of a time interval. The events that trigger providing of tags, the information that can be used to trigger events, or the method of providing tags as described here is not meant to be limiting the scope of the invention or any of its embodiments. Other embodiments can trigger sending of tags by a PD due to events not described here. The methods used for providing tags can be different as well, in other embodiments. Other examples of events that trigger sending of tags are explained in context of other embodiments described in this application.

In some embodiments the process associated with FIG. 83 can be used whenever a time interval expires. A timer can be implemented in different ways in different embodiments. In some embodiments, the process associated with FIG. 83 can be invoked when a hardware timer provides an interrupt to a CPU once every time interval. In such embodiment, process associated with FIG. 83 can be implemented as an interrupt handler, in software. In other embodiments, an operating system such as Unix, Linux, Windows 7, etc. can provide mechanisms to register function handlers that can be invoked once every time interval. Other methods of implementing process of FIG. 83 once every time interval can be implemented.

Figure 84A:
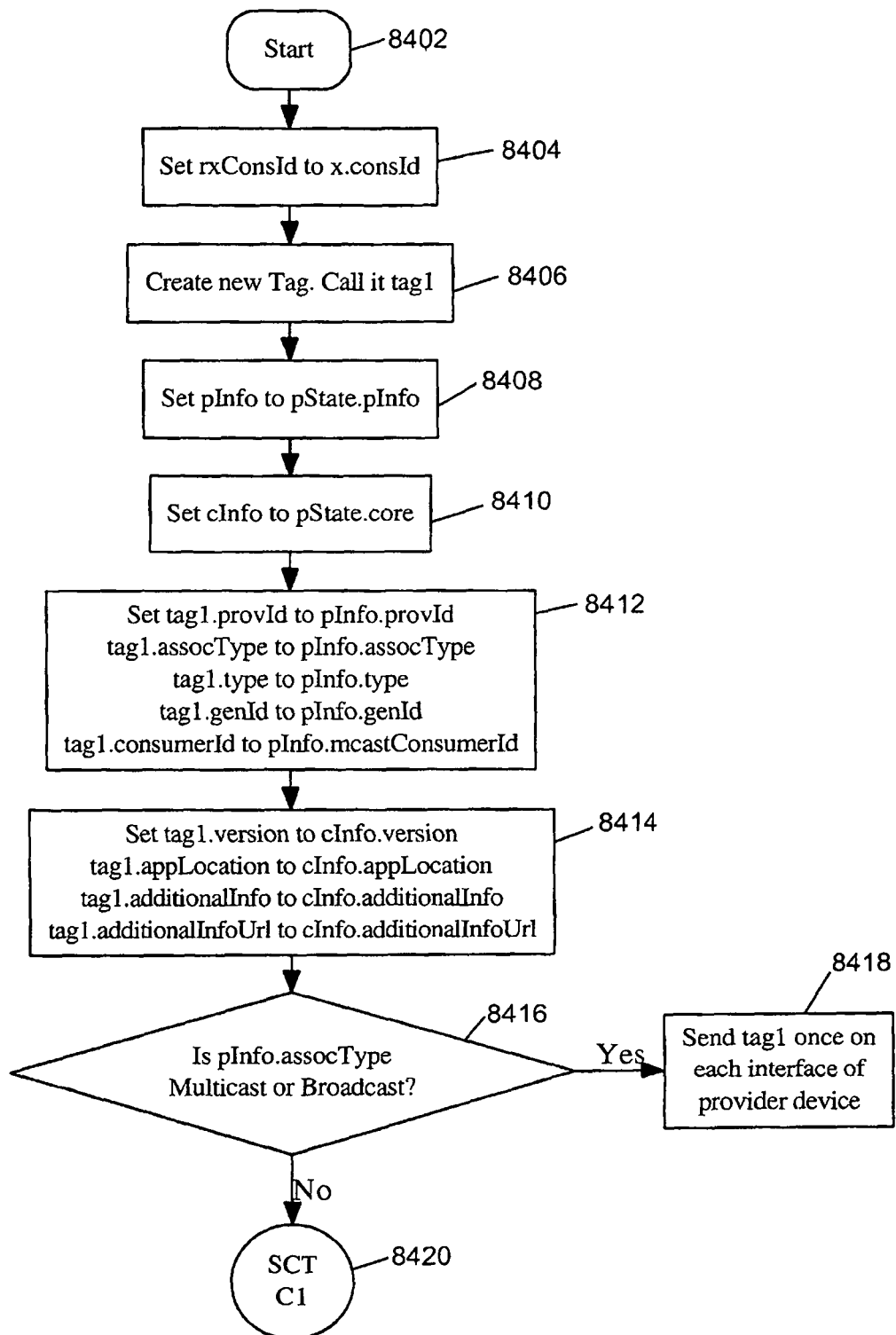
FIG. 84A-B illustrate the flow diagrams of a process followed by a PD in sending tags to CD(s) according to an embodiment of the present invention.
Figure 84B:
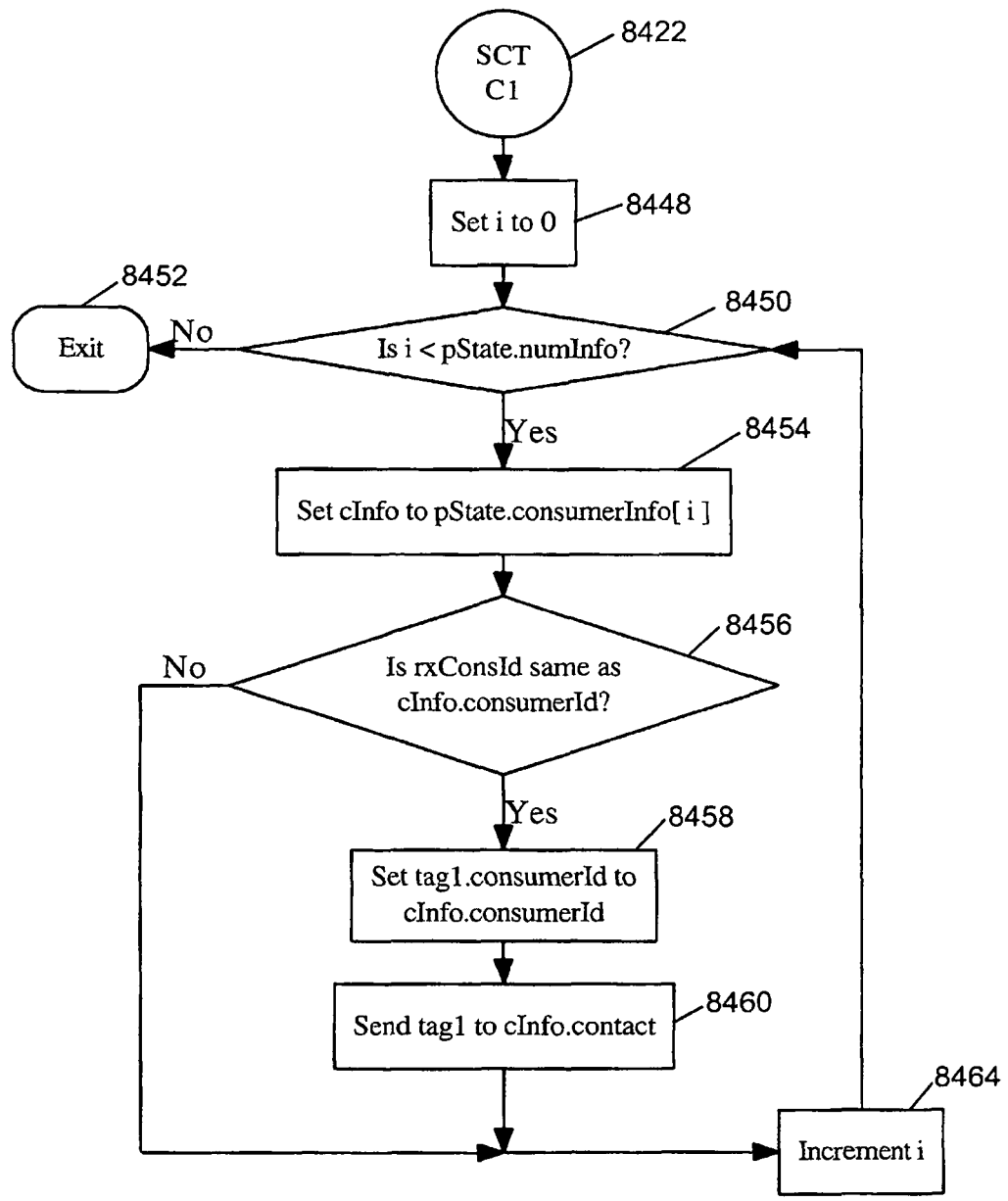

The process starts at step 8302 and can move to step 8304. The timer associated with invoking this process is referred to herein as a Tag Provider Timer. In some embodiments, the Tag Provider Timer can be stopped to allow for the process to provide tags. The timer can be stopped at step 8304. The process can then move to step 8306. At step 8306, the process can provide tags. In one embodiment, the process associated with FIG. 84A-B can be used to send/provide tags. Instance 'x' can be provided to process of FIG. 84A-B. Instance 'x' can be associated with field consumerId. x.consumerId can be set to Null (can be 0 in some embodiments) before using the process associated with FIG. 84A-B. The process associated with FIG. 83 can move to step 8308, after the process associated with FIG. 84A-B is complete. In some embodiments where the Tag Provider Timer is stopped at step 8304, the Tag Provider Timer can be started in step 8308. The process can then move to step 8310. Step 8310 indicates that the process associated with FIG. 83 is complete.

Figure 48A:
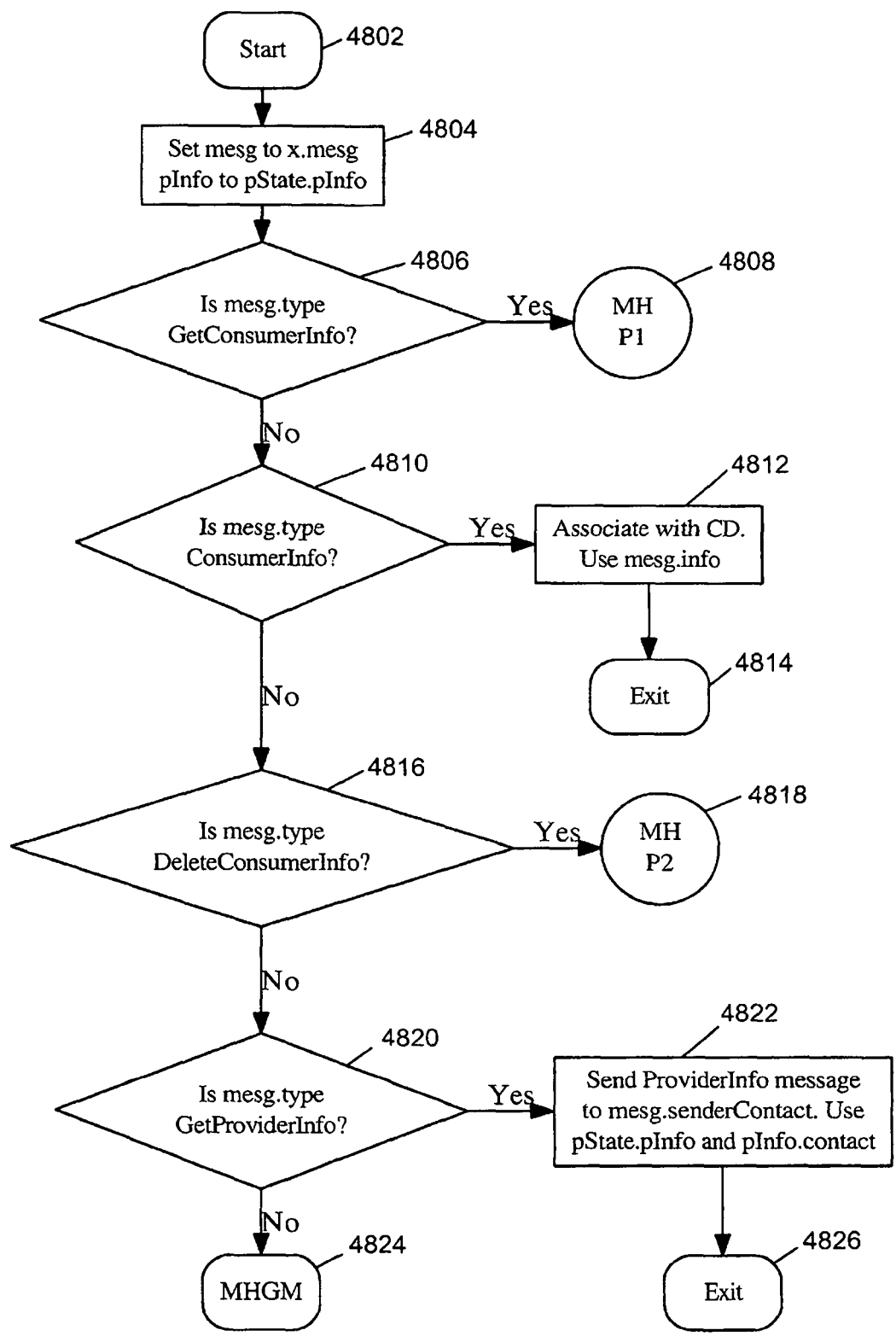
FIG. 48A-D illustrate the flow diagrams of a process followed by a PD in handling messages received by the PD, according to an embodiment of the present invention.
Figure 48B:
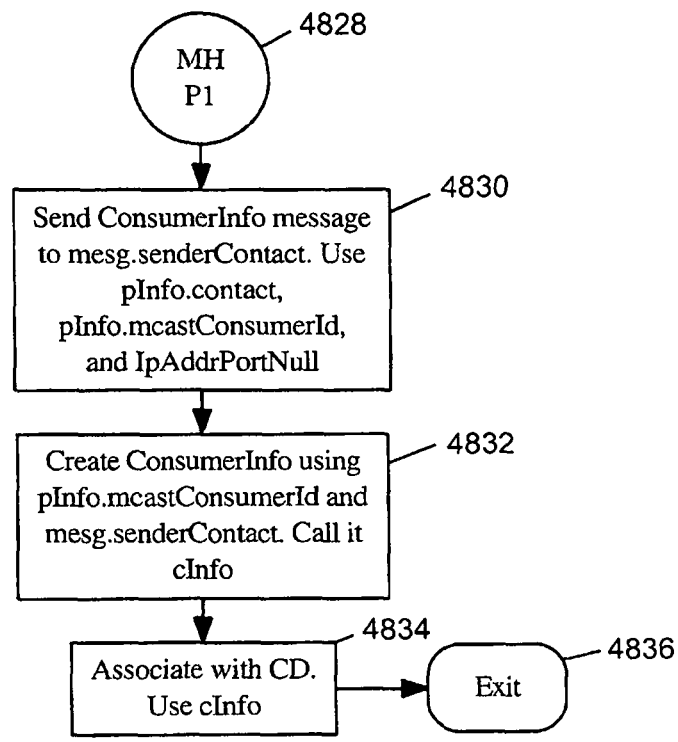
Figure 48C:
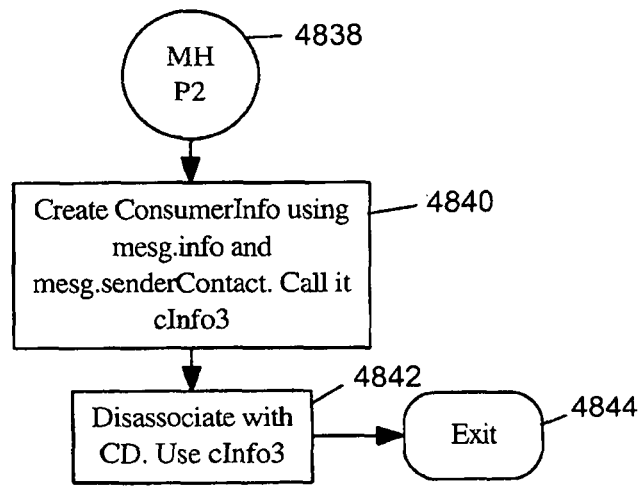
Figure 48D:
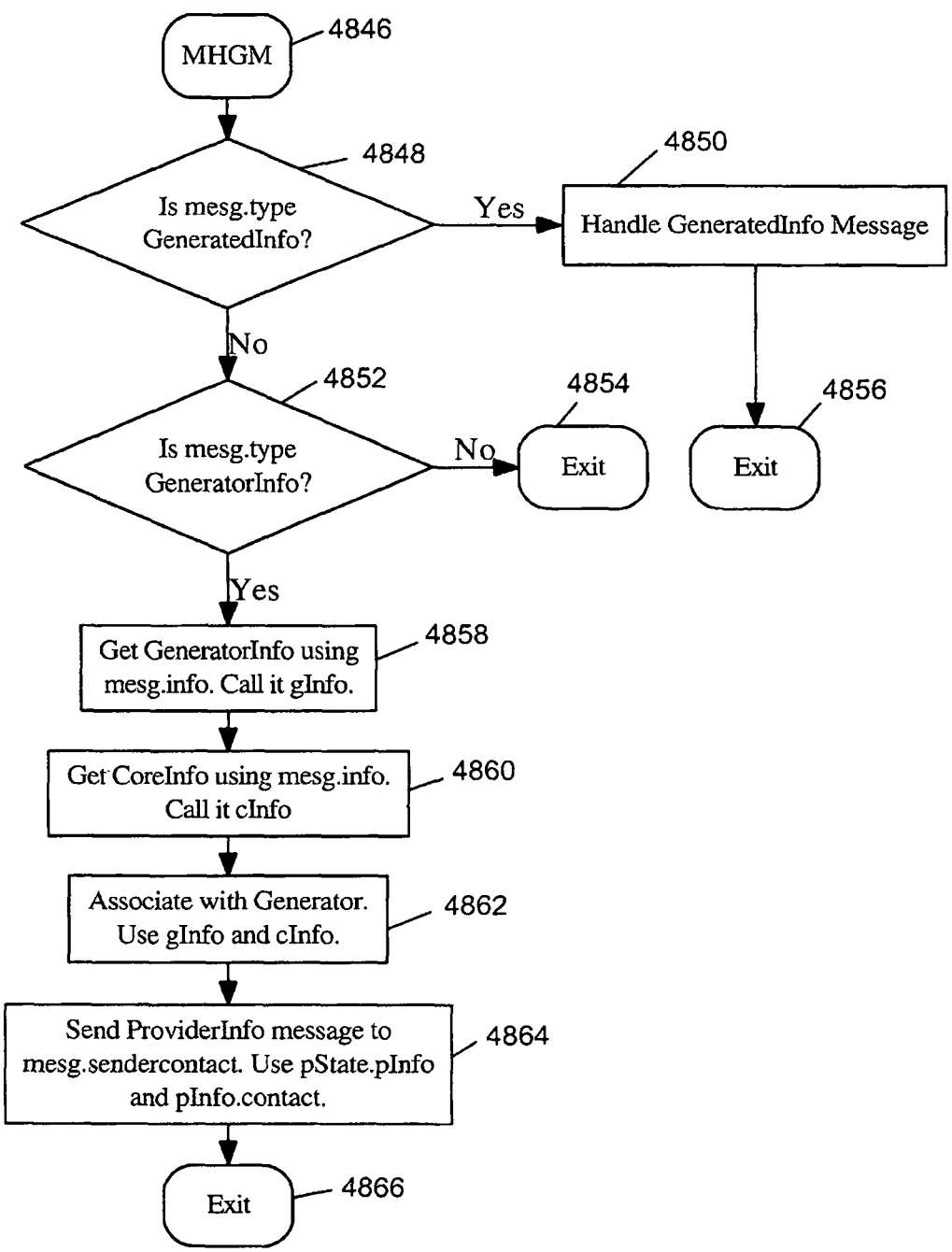

FIG. 84A-B illustrate the flow diagrams of a process followed by a PD in sending tags to CD(s) according to an embodiment of the present invention. In the embodiment of the invention described here, the process associated with FIG. 84A-B can be used by an instance of PD 202 in sending (or providing) tags. The process can be used in sending tags that can be associated with one of different association types. The sending of tags can also be related to the type of NI 206. NI 206 can be associated with different transport types as illustrated in FIG. 8, and described in related description. For tags that can be associated with Unicast association type, the process illustrated in FIG. 84A-B can be used once for every instance of CD 102 that the PD can choose to send tags for. For tags that can be associated with Multicast or Broadcast association type, the process illustrated by FIG. 84A-B can be used only once for all instances of CD 102 associated with the PD, when the PD chooses to send a tag. It can be noted that the method of sending tags, processes used for sending tags of different association types, the use of interface types, etc. in sending tags as described in FIG. 84A-B are specific to this embodiment. Other methods and/or processes can be used in sending the tags, and the methods described in FIG. 48A-B are not meant to be limiting the scope of the invention or any of its embodiments.

The process starts at step 8402 and moves to step 8404. The process is provided with instance 'x' that can be associated with a consId field. The values associated with instance 'x' can be provided by a process that uses the method illustrated by FIG. 84. x.consId is an identifier that can be associated with a CD. The identifier can also hold a special value such as Null that cannot be associated with any instance of CD 102. A local copy of x.consId is made in step 8404. The local copy is referred to as rxConsId for use in subsequent steps of the process. The process can then move to step 8406.

At step 8406, a new instance of Tag is created. The structure of information that can be stored in the created instance is illustrated in FIG. 5. The created instance is referred to as tag1 for use in subsequent steps of the process. The creation of a Tag instance can involve allocation of memory, control data structures, state handles, or the like. In some embodiments, the creation of a Tag instance can involve just allocation of memory. In yet other embodiments, the creation of a Tag instance can involve allocating state handles in addition to allocating sufficient memory for the Tag instance. The process can then move to step 8408.

At step 8408, a pInfo is set to pState.pInfo. The process can then move to step 8410. At step 8410, a cInfo is set to pState.core. The process can then move to step 8412. Various fields associated with tag1 are set, as illustrated in step 8412. The process can then move to step 8414. At step 8414, some other fields associated with tag1 are setup. The process can then move to step 8416. At step 8416, a check is done to determine if pInfo.assocType is one of Multicast or Broadcast. If the check fails, the process can move to step 8420. If the check passes, the process can move to step 8418. At step 8418, tag1 created and setup in earlier steps, is sent out, once on each of the NI 206 interfaces associated with the PD. In some embodiments, tag1 can be sent out on only some NI 206 interfaces associated with the PD. In some embodiments, tag1 can be sent out only on some NI 206 interfaces wherein a CD 102 can associate with the PD using that NI 206 interface. In some embodiments, tag1 can be sent out only on some NI 206 interfaces wherein a CD 102 is associated with the PD using that NI 206 interface. Other methods of determining NI 206 interfaces on which to send the tags are possible.

Returning to step 8420, this step indicates that the process can move to step 8422 of FIG. 84B. Step 8422 indicates that the process can move to step 8448. At step 8448, i is set to 0. The process can then move to step 8450. At step 8450 a check is made to determine if i is less than pState.numInfo. If the check succeeds, the process can move to step 8454. If not, the process can move to step 8452. Step 8452 indicates that the process associated with FIG. 84A-B is complete.

Returning to step 8454, i-th element of pState.consumerInfo is retrieved and cInfo is set to the retrieved CI. The process can then move to step 8456. At step 8456, a check is made to determine if the rxConsId matches cInfo.consumerId. If the check succeeds, the process can move to step 8458. If not, the process can move to step 8464. At step 8464, i is incremented and the process moves to step 8450. The incremented value of i can be used to access/retrieve the next element of pState.consumerInfo, if possible. Returning to step 8458, the element at index i can indicate that the CD 102 for which the tag needs to be sent, as specified by rxConsId, has been found in pState.consumerInfo array. The consumerId associated with tag1 is set to cInfo.consumerId. The process can then move to step 8460. At step 8460, tag1 is sent to the CD identified by rxConsId using cInfo.contact. The process can then move to step 8464.

Figure 85:
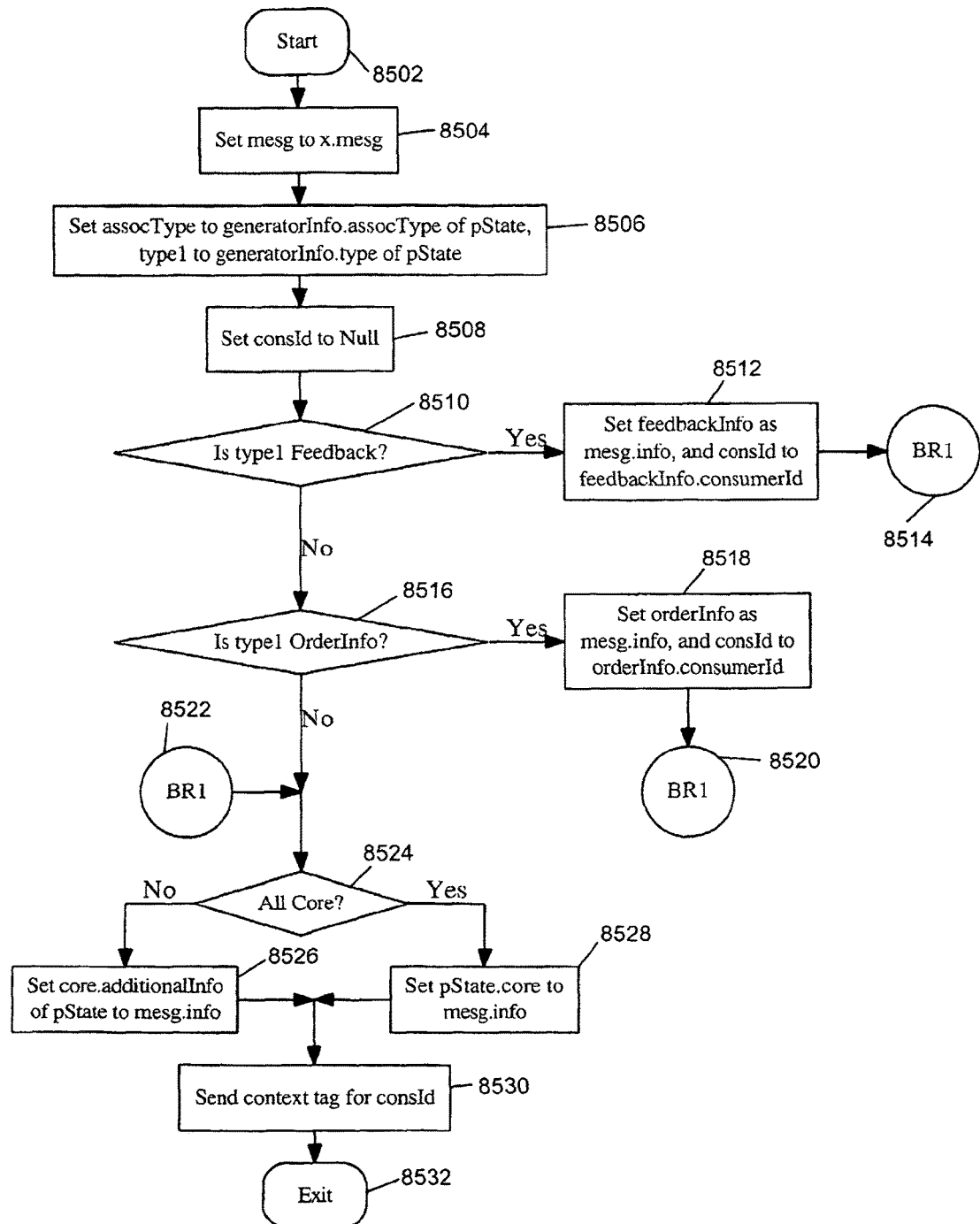
FIG. 85 illustrates the flow diagram of a process followed by a PD on receiving messages from GD that can include tag related information, according to an embodiment of the present invention.
Figure 86:
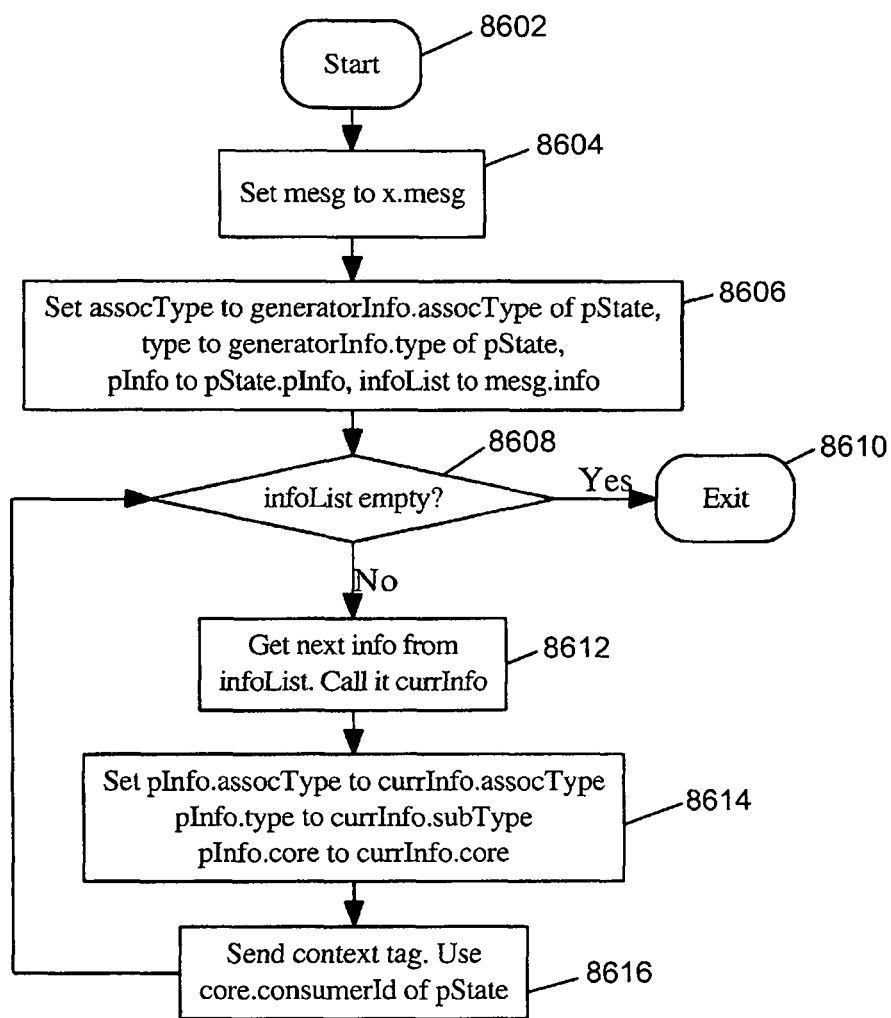
FIG. 86 illustrates the flow diagram of a process followed by a PD on receiving messages from GD, that include tag related information, according to another embodiment of the present invention.

FIG. 85 illustrates the flow diagram of a process followed by a PD on receiving messages from GD that can include tag related information, according to an embodiment of the present invention. In an embodiment of the present invention, an instance of PD 202 can use the process illustrated by FIG. 85 in handling messages that can include information related to a tag. In the embodiment described here, the type associated with such messages can be GeneratedInfo. The process followed by a PD 202 can use the information related to the tag in the message, to send tags to one or more instances of CD 102. In embodiments where the association type related to a tag can be Unicast, the message received by the PD can also include information related to the CD 102 that the tag can be associated to. In the process described in FIG. 85, the tag as determined by PD using information from the message, is sent or provided without any delay to instances of CD 102, upon receipt of a message. In other embodiments of the process, the information related to the tags can be stored by the PD in pState and sent to instances of CD 102 at a later time. The method illustrated in FIG. 85 is illustrative only and specific to the embodiment described here. Other methods of processing messages, that can include tag related information, received by PD 202, are possible. The content of messages carrying information related to tags, the methods followed in extracting information, and sending tags by PD described here specific to this embodiment and is illustrative only. The methods, content and the methods of using that content, described here is not meant to be limiting the scope of the invention or any of its embodiments.

In the flow diagram of FIG. 85, two types of tags can be handled differently from other types of tags. The types of tag are Feedback and OrderInfo. In relation to the values that can be associated with type of tags as described in FIG. 4A-B, tags associated with type Feedback and OrderInfo can have an association type of Unicast. Information specific to CD 102 that can associate the tags with specific instances of CD 102 can include a consumerId. This consumerId can be provided in tag-type specific information such as FeedbackInfo (FI) and OrderInfo (OI). The structure and content of this tag-type specific information is described in FIG. 118 and FIG. 119. The use of Feeback and OrderInfo tag types, and consumerId for these tags is illustrative only. Other types of tags can be of type Unicast. For these other Unicast tags, other methods and/or information can be used to associate tags with specific instance(s) of CD 102.

The process starts at step 8502 and moves to step 8504. The process is provided with instance 'x' that can be associated with mesg field. The values associated with instance 'x' can be provided by a process that uses the method illustrated by FIG. 85. The x.mesg field can be associated with a message of type GeneratedInfo, according to one embodiment of the present invention. At step 8504, x.mesg is extracted and a local copy is made. The local copy is referred to as mesg for use in subsequent steps of the process. The process can then move to step 8506.

At step 8506, an assocType is set to pState.generatorInfo.assocType, and type1 is set to pState.generatorInfo.type. The process can then move to step 8508. At step 8508, a consId is set to Null. The process can then move to step 8510. At step 8510, a check is done to determine if type1 determined at step 8506 is Feedback. If the check fails, the process can move to step 8516. If the check succeeds, the process can move to step 8512. At step 8512, mesg.info can be used as an instance of FI. This instance is referred to as feedbackInfo. consId can be set to feedbackInfo.consumerId. consId can be used to associate the tag provided by the PD to an instance of CD 102 whose cState.myConsumerId matches consId. The process can then move to step 8514. Step 8514 indicates that the process can move to step 8522. Step 8522 indicates that the process can move to step 8524.

Returning to step 8516, a check is done to determine if type1 determined at step 8506 is OrderInfo. If the check fails, the process can move to step 8524. If the check succeeds, the process can move to step 8518. At step 8518, mesg.info can be used as an instance of OI. This instance is referred to as orderInfo. consId can be set to orderInfo.consumerId. consId can be used to associate the tag to an instance of CD 102 whose cState.myConsumerId matches consId. The process can then move to step 8520. Step 8520 indicates that the process can move to step 8522. Step 8522 indicates that the process can move to step 8524.

At step 8524, a check is made to determine if the PD 202 is operating with instance(s) of GD 302 wherein the message provides all information related to a tag, or only partial information related to a tag. In some embodiments, messages that can include tag specific information can provide all information (CRI) related to a tag. In such embodiments, the process can move to step 8528 wherein pState.core is set to data in mesg.info. The process can then move to step 8530. Returning to step 8524, there can be embodiments wherein information related to tags that can be included in a message can be partial. In some embodiments, information included in a message can include additionalInfo field associated with the tag. In such embodiments, the process moves to step 8526. At step 8526, pState.core.additionalInfo can be set to mesg.info. The process can then move to step 8530.

In some embodiments, fields associated with a CRI, other than additionalInfo—such as appLocation, assocType, autoRun, etc. cannot change while an instance of GD is associated with an instance of PD. In such embodiments, messages including information related to tags generated by an instance of GD need not include information other than additionalInfo. In other embodiments, some or all fields associated with a CRI, other than additionalInfo can be implicit for the embodiment. The appLocation associated with a CRI for a tag of a given type, can be hard-coded in the system of methods related to CD 102. Such embodiments can use step 8526.

In some other embodiments, any field associated with a tag can change while an instance of GD is associated with an instance of PD. In such embodiments, all information related to a tag can be included in the GeneratedInfo message. Such embodiments can use step 8528.

At step 8530, a tag can be provided by PD to one or more instances of CD. In one embodiment, the process associated with FIG. 84A-B can be used to send the tag. Instance 'x' can be provided to process of FIG. 84A-B. Instance 'x' can be associated with field consumerId. x.consumerId can be set to consId as determined in earlier steps of the process, before using the process associated with FIG. 84A-B. The process associated with FIG. 85 can move to step 8532 after process associated with FIG. 84A-B is complete. Step 8532 indicates that the process associated with FIG. 85 is complete.

FIG. 86 illustrates the flow diagram of a process followed by a PD on receiving messages from GD that can include tag related information, according to another embodiment of the present invention. In the embodiment of the invention described here, the process associated with FIG. 86 can be used by an instance of PD 202 in handling messages that can include tag related information. In the embodiment described here, the type associated with such messages can be GeneratedInfo. The process followed by a PD 202 can use the information related to tag(s) in the message, to send tags to one or more instances of CD 102. In some embodiments, information related to tags can be associated with a type and a sub-type. An example of such embodiment is a tag associated with type MultiType. Messages of type GeneratedInfo can carry information related to tags of type MultiType. The info field of such a message can include a list of instances of MI as described in FIG. 20. Each instance of MI can be associated with information that can include an assocType, a type and an instance of CRI, among others. Each instance of MI can be used by a PD to provide a tag. This method of generating and/or providing tags can be used in embodiments wherein some or all of information related to tags that can include assocType, can be generated by a GD. An example of such embodiment is when information related to tags can be extracted from media. Another way of understanding the concept is that a tag of MultiType can be used to carry information related to a set of tags each of which can be associated with different tag types. In case of media embodiment, information extracted from media can help determine type, assocType and CRI associated with each instance of MI. The method of processing messages that can include information related to a variety of tags as illustrated in FIG. 86 is specific to the embodiment described here. Other embodiments can choose to handle messages containing information related to a number/variety of tags in a way not described here. Other embodiments can also choose to handle messages that can contain information related to tags generated by a GD due to information extracted from media, in a way not described here. The methods and processing illustrated in FIG. 86 is not meant to be limiting the scope of the invention or any of its embodiments.

The process starts at step 8602 and moves to step 8604. The process is provided with instance 'x' that can be associated with mesg field. The values associated with instance 'x' can be provided by a process that uses the method illustrated by FIG. 86. The x.mesg field can be associated with a message of type GeneratedInfo, according to one embodiment of the present invention. The process can then move to step 8606. At step 8606, an assocType can be set to pState.generatorInfo.assocType, a type can be set to pState.generatorInfo.type, a pInfo can be set to pState.pInfo and infoList can be set to mesg.info. In the embodiment of the invention described here, infoList can be a list of instances of MI. Each info can include information related to assocType, a type, a consumerId and an instance of CRI. The type field of MI can be associated with values of a tag type as illustrated in FIG. 4A-B. The process can then move to step 8608.

At step 8608, a check is made to determine if infoList is empty. If the list is empty, the process can move to step 8610. Step 8610 indicates that the process associated with FIG. 86 is complete. If the infoList as checked at step 8608 is not empty, the process can move to step 8612. At step 8612, an instance of info is retrieved from infoList. The instance of info is referred to as currInfo, for use in subsequent steps of the process. When an instance of info is retrieved from infoList, the number of instances of info in infoList reduces by 1. The process can then move to step 8614. At step 8614, pInfo.assocType can be set to currInfo.assocType, pInfo.type can be set to currInfo.type, and pInfo.core can be set to currInfo.core. The process can then move to step 8616. At step 8616 a tag can be provided by the PD. In one embodiment, the process associated with FIG. 84A-B can be used to send the tag. Instance 'x' can be provided to process of FIG. 84A-B. Instance 'x' can be associated with field consumerId. x.consumerId can be set to pState.core.consumerId, before using the process associated with FIG. 84A-B. The process associated with FIG. 86 can move to step 8608, after the process associated with FIG. 84A-B is complete.

FIG. 132 illustrates the flow diagram of a process followed by a GD in initializing part of state (GS) associated with the GD according to an embodiment of the present invention. In the embodiment of the invention described here, the process illustrated in FIG. 132 can be used by an instance of GD 302 in initializing some or all of gState associated with the GD. The embodiment of GD 302 as described here can generate tags that can be associated with type MultiType. gState.core associated with an instance of GD 302 can be used to maintain a list of instances of MI. The structure of MI, as used by this embodiment is illustrated in FIG. 7. Information related to tags generated by GD 302 can be determined using data extracted from media by TEXT 310 of FIG. 3A. In some embodiments of GD 302, information related to tags that can be generated by the GD can include derived information. An example of information derived by an instance of GD 302 is illustrated in FIG. 21. In some embodiments of GD 302, information related to tags that can be generated by the GD can include a sample of media as determined/captured by TEXT 310 and/or CEXT 320 of FIG. 3A. An example structure of information related to media samples is illustrated in FIG. 7. The method illustrated in FIG. 132 can be used by GD 302 before GD 302 can start associating with instances of PD 202, in some embodiments of the invention. The structure of information maintained in gState, the initialization of values associated with gState, the values associated with information maintained in gState, and the methods used in initialization as illustrated in FIG. 132 is specific to the embodiment described here, and is not meant to be limiting the scope of the invention or any of its embodiments.

The process starts at step 13202 and moves to step 13204. At step 13204, an instance of GeneratorInfo is created. The created instance is referred to as gInfo for use in subsequent steps of the process. The process can then move to step 13206. At step 13206, an instance of CoreInfo is created. The created instance is referred to as cInfo for use in subsequent steps of the process. The creation of an instance of GeneratorInfo in step 13204 and/or an instance of CoreInfo in step 13206, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 13208.

At step 13208, fields associated with gInfo can be initialized. gInfo.type is set to MultiType at this step, that can indicate that the tags generated by this embodiment of GD 302 can be associated with type of MultiType. gInfo.assocType can be set to Broadcast, which can indicate that the tags related to information generated by this GD, and provided by an instance of PD can be used by any instance of CD 102 that can receive the tag. gInfo.idProvider can be set to None and gInfo.mcastConsumerId can be set to Null. idProvider and mcastConsumerId fields can be used in embodiments where the assocType related to tags can be Multicast.

At step 13208, gInfo.genId is set to ipAddrPortGenId. gInfo.genId is an identifier that can be used to identify an instance of GD 302 among all GDs. In the embodiment of the present invention described here, the communication between the PD and GD happens using messages sent using UDP. In such embodiment, gInfo.genId can be set to a combination of the IP address and port number associated with the UDP port. The IP address and port number can be the IP address and port number of UDP port associated with GD 302. An ipAddrPortGenId can be determined by multiplying the IP address with 65536 and adding portId to the resulting value. The method of determining ipAddrPortGenId described here is illustrative only. Other methods can be used to determine gInfo.genId. Methods specific to the embodiments can also be used.

gInfo.contact can be set to information that can be used to send messages to the GD that is associated with the gInfo.

In the embodiment described here, gInfo.contact can be set to a combination of IP address and port number that the GD can use to communicate messages with instances of PD 202.

The process can then move to step 13210. At this step, cInfo.version is set to 1, cInfo.appLocation can be set to Null, cInfo.additonalInfoUrl can be set to Null. Null values for appLocation and additonalInfoUrl of cInfo can be used to indicate that these fields do not hold valid values. The process can then move to step 13212. At step 13212, gState.gInfo is set to gInfo, gState.core is set to cInfo and gState.numInfo is set to 0. A value of 0 for gState.numInfo can indicate that the GD is not associated (yet) with any instances of PD 202, and that gState.providerInfo list is empty. The process can then move to step 13214. Step 13214 indicates that the process associated with FIG. 132 is complete.

FIG. 87A-E illustrate the flow diagrams of a process followed by a GD in determining information that can be associated with tags, and communicating information that can be associated with tags to PDs, according to an embodiment of the present invention. In an embodiment of the invention, the process illustrated by FIG. 87A-E can be used by an instance of GD 302 in determining information that can be associated with tags, and communicating determined information, including other functionality. In the embodiment described here, an instance of GD 302 can determine information that can be associated with tags using information that can be extracted from tagged media content. An example of data that can be extracted from media is illustrated in FIG. 20. Information can be extracted from media that can help determine some or all information that can be included in a tag. In the example illustrated in FIG. 20, the information includes a subset of all the information that can be associated with a tag.

In some embodiments, information that can be associated with tags can be determined by GD 302 by deriving/determining some information which can be related to media content. An example of data that can be derived/determined by GD 302 is illustrated in FIG. 21. In embodiments wherein media is not tagged, or data cannot be extracted from tagged media, DerivedInfo (DI) as illustrated in FIG. 21 can be associated with a tag. A CD 102 receiving a tag that can include DI, can use the DI in tag to determine information related to the media associated with DI, using mechanisms that can include a service. The CD in such embodiments can present one or more instances of DI to a service, which can respond to the CD with information that can be related to media associated with the DI instances.

In some other embodiments, information that can be associated with tags can include a sample of media which can be captured/determined by GD 302. An example structure of information that can be associated with a sample of media is illustrated in FIG. 7. In some embodiments, a sample of media that can be associated with a tag that can be used by an instance of CD 102 to determine information related to the media sample. This can be used in embodiments wherein media is not tagged with information. An instance of CD 102 can determine information related to the media by submitting the media sample to a service (such as a service over internet) that can interpret the sample and help determine information related to the media, and/or associated tags.

GD 302, according to this embodiment can help generate information that can be associated with tags of type Multi-Type. The process associated with FIG. 87A-E can be used to update gState associated with GD 302, using the information that can be determined in the process.

The information that can be associated with a tag such as one illustrated in FIG. 20, FIG. 21, FIG. 7, and the information that can be updated by processes FIGS. 87A-E and the processes associated with FIG. 87A-E are illustrative, and meant for use by the embodiment of the invention described here. Some embodiments can choose to determine only part of the information, and/or include information not described here, and/or exclude some/all of the fields described here. The methods of determining the information, the information that can be associated with the tags, and the method of communicating the determined information as illustrated in FIG. 87A-E are not meant to be limiting the scope of the invention or any of its embodiments.

The process starts at step 8702 and moves to step 8704. At step 8704, a check is done to determine if GD 302 is currently associated with media content. In some embodiments, this can be determined by the presence of a signal associated with media at TEXT 310 and/or CEXT 320 of GD 302. If the GD is not associated with media, the process can move to step 8708. Step 8708 indicates that the process associated with FIG. 87A-E is complete. If the GD is associated with media, as determined at step 8704, the process can move to step 8710.

At step 8710, a check is done to determine if the media associated with GD 302 is tagged with information. TEXT 310 can determine this using the media that it can receive from RCV 308. In some embodiments, an instance of GD 302 can be capable of receiving media that is tagged. In such embodiments, the check associated with step 8710 can result in a success. In other embodiments, TEXT 310 can determine if the media is tagged using a variety of methods that can include the transmission mode and/or format of the media such as analog transmissions, digital transmissions, digital transmissions with content in MPEG4 format, or the like. Digital media can indicate that the media can be tagged. In some other embodiments, GD 302 can be provisioned with data that can specify if the media is tagged based on the frequency that RCV 308 is tuned to. In such embodiments, TEXT 310 can determine if the media is tagged using the provisioned data, and the frequency that RCV 306 is tuned to. Other methods of determining if the media is tagged, are possible.

If the media is tagged as determined in step 8710, the process can move to step 8712. Step 8712 indicates that the process can move to step 8762 of FIG. 87B. If it is determined at step 8710 that the media is not tagged, the process can move to step 8714. At step 8714, an alert can be indicated that information cannot be extracted from media. This can be done in some embodiments. An example of such an embodiment is when a set top box associated with television sets can include the functionality of GD 302. In this example embodiment, the set top box can be associated with multiple channel frequencies, each of which can indicate a channel of media as presented to users of set-top box and/or television set. Media associated with some channels can be tagged, while media associated with other channels cannot be tagged. In this example embodiment, UI 322 associated with the set top box such as an LED on the front panel can be set to a specific color like orange when the media channel processed by the set top box is not tagged. The LED can be set to another color, like green, when the media that is processed by the set top box is tagged. The process associated with FIG. 87A-E can then move to step 8718.

Referring to step 8762, the step indicates that the process can move to step 8764. At step 8764 an instance of CRI is created. The instance of CRI is referred to as cInfo for use in subsequent steps of the process. The process can then move to step 8766. At step 8766, an instance of MI is created. The instance of MI is referred to as mInfo for use in subsequent steps of the process. The creation of instances of CRI and MI can involve allocation of memory, control data structures, state handles, or the like. In some embodiments, the creation of instances of CRI and MI can involve just allocation of memory. In yet other embodiments, the creation of instances can involve allocating state handles in addition to allocating sufficient memory for the instances of CRI and MI. The process can then move to step 8768.

At step 8768, various fields associated with cInfo can be set to data extracted from media. Data extracted from media by TEXT 310 can be used to set cInfo.version, cInfo.appLocation, cInfo.additionalInfoUrl and cInfo.additionalInfo. In embodiments where some of the information related to cInfo cannot be extracted from media, the fields associated with cInfo (for which information cannot be determined from extracted data) can be set to Null. A Null value can indicate the unavailability of that field in the media. For example, in embodiment wherein the information associated with media does not include information related to additionalInfoUrl, cInfo.additionalInfoUrl can be set to Null. The process can then move to step 8770.

At step 8770, fields associated with mInfo are set. mInfo type can be set to a type that can be determined using data extracted from the media. mInfo core can be set to cInfo. The process can then move to step 8772.

At step 8772, GD 302 can determine if the information generated by GD 302 can be associated with a tag that can be used by any instance of CD 102 or a specific instance of CD 102. In some embodiments, UI 322 of GD 302 can be used to indicate to the GD that the information generated by GD 302 can be associated with a specific instance or all instances of CD 102 which can be associated with a PD 202 (The PD can in turn be associated with the GD). An example of such embodiment is a set top box (such as ones that can be used with television sets) that can include functionality associated with GD 302. The set top box can also be associated with a remote device. The remote device can communicate with set-top box using technologies such as RF, infrared, or the like. In this example embodiment, the remote device can be associated with keys, one of which when pressed, can indicate to the GD to generate information that can be provided in tags to a specific instance of CD 102. In some embodiments, each instance of CD 102 can be associated with a separate user interface element of UI 322. In the example embodiment, each instance of CD 102 can be associated with a separate key on the remote device. UI 322 of GD 302 can also be associated with user interface elements that indicate to the GD that information generated by GD can be associated with tags that can be used by all instances of CD 102 (that can receive the tag).

When UI 322 of GD 302 can be associated with elements that can indicate the association of information generated by GD with tags for a specific instance of CD 102, UI 322 can also allow for elements that can specify an identifier associated with the CD 102. The association of user interface elements to identifiers of CD 102 can be stored by GD 302 in STORE 318. In the example set-top box embodiment, each key on the remote device can be associated with an instance of CD 102. In the example embodiment, a smart phone can include the functionality associated with CD 102. The smart phone can be associated with wifi interface for NI 106, and the Ethernet address associated with NI 106 can be used as a an identifier of CD 102. The Ethernet address associated with the wifi interface can be provided to GD 302 using UI 322, along with information that can specify the key on the remote device that is associated with the Ethernet address. In some embodiments, as in the smart phone example illustrated earlier, a phone number associated with the voice service of smart phone can be used as an identifier of CD 102 included in the smart phone.

Referring to step 8772, a check is made to determine if the information generated by GD 302 can be associated with a specific instance of CD 102. If the check succeeds, the process can move to step 8778. If not, the process can move to step 8776. At step 8776, mInfo consumerId can be set to Null and mInfo assocType can be set to Broadcast. A Null value for mInfo consumerId can indicate that the consumerId is not associated with any instance of CD 102. A value of Broadcast for mInfo assocType can indicate that tags generated using the determined information can be used by any instance of CD 102 that can receive the tag. The process can then move to step 8774. Step 8774 indicates that the process can then move to step 8734 of FIG. 87C. Step 8734 indicates that the process can then move to step 8736.

Returning to step 8778, mInfo consumerId can be associated to the consumerId of CD 102 that the tag including the information generated by GD 302 can be associated with. mInfo assocType can be set to Unicast. A Unicast value for mInfo assocType can indicate that a tag generated using information determined by GD 302 can be associated with a specific instance of CD 102. The process can then move to step 8774.

Various embodiments of GD 302 can make available the information extracted from media, differently in different embodiments. In some embodiments, all instances of information extracted by GD 302 can be made available for association with tags. In other embodiments, GD 302 can make available the extracted information when the information can be associated with one of a set of types, each of which can indicate the type associated with a tag. In the set top box example illustrated earlier, the set top box can make available the extracted information when the extracted information can be related to ProgramSchedule tags. The set top box cannot make available the extracted information when the extracted information can be related to SaleSchedule tags, in some embodiments. The information specifying the set of types for which extracted information can be made available for association with tags, can be provisioned to instance of GD 302 in a variety of ways that can include using UI 322. In other embodiments, information generated by GD 302 can be made available for association with a tag upon a request that can include user interaction with UI 322 of GD 302. In the set top box example embodiment illustrated earlier, a request for making the information extracted by GD available, can be indicated by pressing a key on the remote device associated with the set top box. In some other embodiments, an instance of GD 302 can be capable of extracting tags associated with one or all of channels that can be received by the RCV 308 of GD 302. In such embodiments, the GD can extract information from all the channels and make the information available for association with one or more tags.

Returning to step 8736, a check is made at this step to determine if all information extracted from media can be made available for use in associating with tags. If the check fails, the process can move to step 8742. If the check passes, the process can move to step 8738. At step 8738, mInfo determined in earlier steps of the process can be added to gState.core.additionalInfo. The process can then move to step 8740. Step 8740 indicates that the process can move to step 8716 of FIG. 87A. Step 8716 indicates that the process can move to step 8718.

Returning to step 8742, a check is made at this step to determine if the information extracted can be made available for association with a tag, based on a match of mInfo type against a list of types. In an embodiment of the invention, the list of types can indicate some or all of values that can be associated with type of a tag, for which the extracted information can be made available. If the check fails, the process can move to step 8748. If the check passes, the process can move to step 8744. At step 8744, mInfo determined in earlier steps of the process can be added to gState.core.additionalInfo. The process can then move to step 8746. Step 8746 indicates that the process can move to step 8716 of FIG. 87A.

Returning to step 8748, a check is made at this step to determine if there is a request to make available, the information extracted, for association with a tag. In some embodiments, request for allowing the information to be made available can be indicated by a user interaction that can involve UI 322 of FIG. 3A. If the check fails, the process can move to step 8754. If the check passes, the process can move to step 8750. At step 8750, mInfo determined in earlier steps of the process can be added to gState.core.additionalInfo. The process can then move to step 8752. Step 8752 indicates that the process can move to step 8716 of FIG. 87A.

Returning to step 8754, a check is made at this step to determine if information can be extracted from all channels that can be available to RCV 308 and/or TEXT 310, and make all the extracted information available for association with one or more tags. If the check fails, the process can move to step 8758. If the check passes the process can move to step 8756. At step 8756, mInfo and cInfo can be determined using processes similar to steps 8768 and 8770 once for each channel, and mInfo determined for each channel can be added to gState.core.additionalInfo. The process can then move to step 8760. Step 8760 indicates that the process can move to step 8716 of FIG. 87A.

In embodiments where information can be extracted from one channel associated with RCV 308 and/or TEXT 310 at any given time, step 8754 can be skipped and the process can move from step 8748 to step 8758.

Step 8758 indicates that the process can move to step 8716.

Returning to step 8718, a check is made at this step to determine if GD 302 can include information that can be derived/determined, with information that can be associated with a tag. In some embodiments, media received by GD 302 cannot be tagged. This can be due to reasons that can include lack of support for tagging as in case of analog transmissions. In some embodiments, GD 302 can generate information that can be used to determine information related to the media that the generated information is associated with. In an example embodiment, generated information can include telecast time, telecast date, channel frequency and channel name associated with media that is processed by the GD 302. This generated information can be used in association with a service which can provide information related to the media. In some embodiments, a database can maintain information related to media, in relation to the channel on which the media is telecast, the day and time of telecast, the frequency with which the media can be telecast or the like. The database system which can include other functionality, can be used to determine information related to the media, given the day and time of a telecast, the frequency of telecast, and channel name. In one embodiment, the information that can be determined/generated by an instance of GD 302 is illustrated in FIG. 21. Other embodiments can choose to determine information not described here, and/or can choose to exclude some or all of the information described here. The information as described in FIG. 21 is not meant to be limiting the scope of the invention or any of its embodiments.

In embodiments where the determined information can be included, the process can move to step 8720. Step 8720 indicates that the process can move to step 8780 of FIG. 87D. If information cannot be determined by GD 302, or in embodiments where GD 302 can choose to not include the determined information, the process can move to step 8722.

Figure 87A:
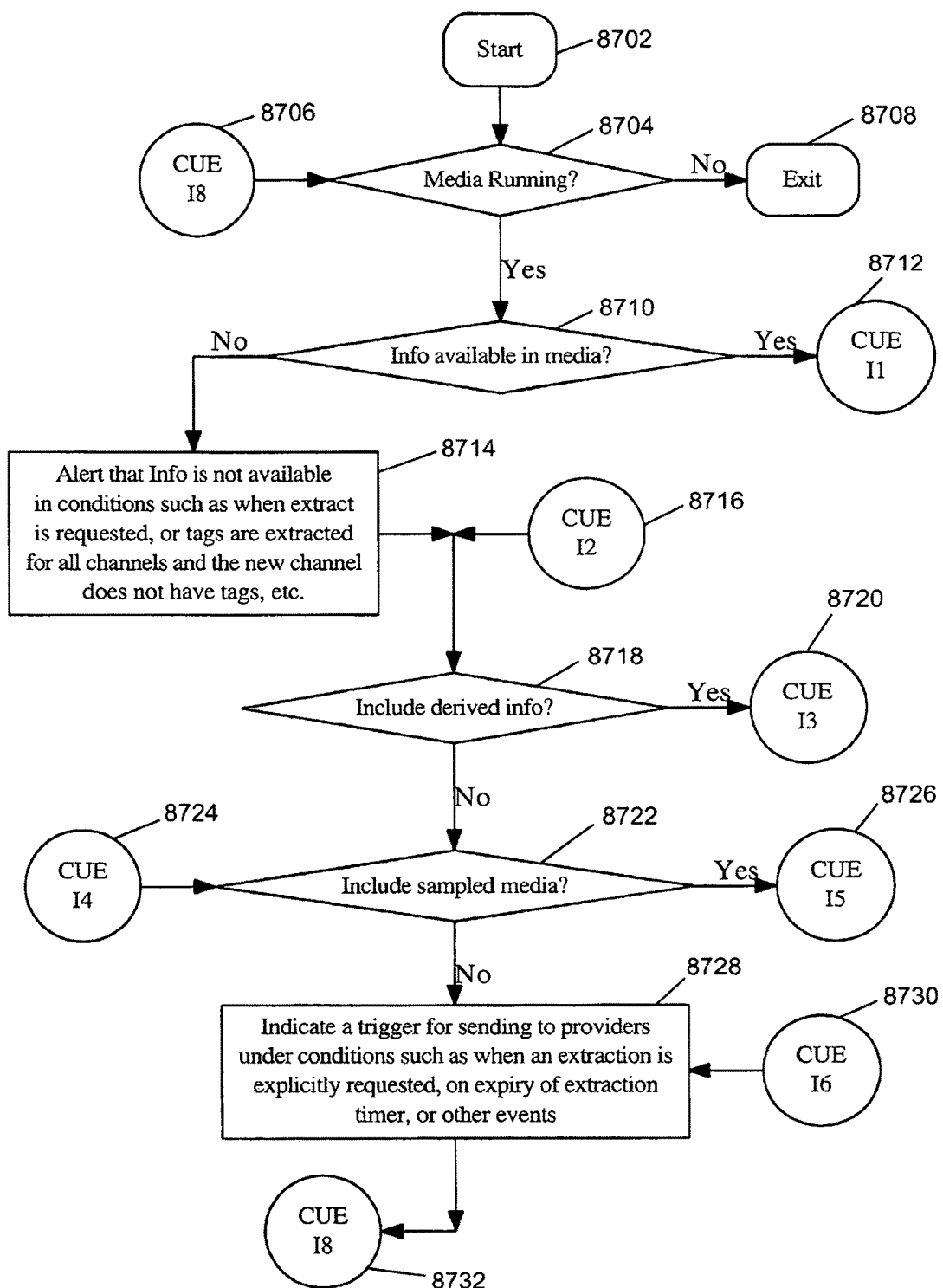
FIG. 87A-E illustrate the flow diagrams of a process followed by a GD in determining information that can be associated with tags, and communicating information related to tags to PDs, according to an embodiment of the present invention.
Figure 87B:
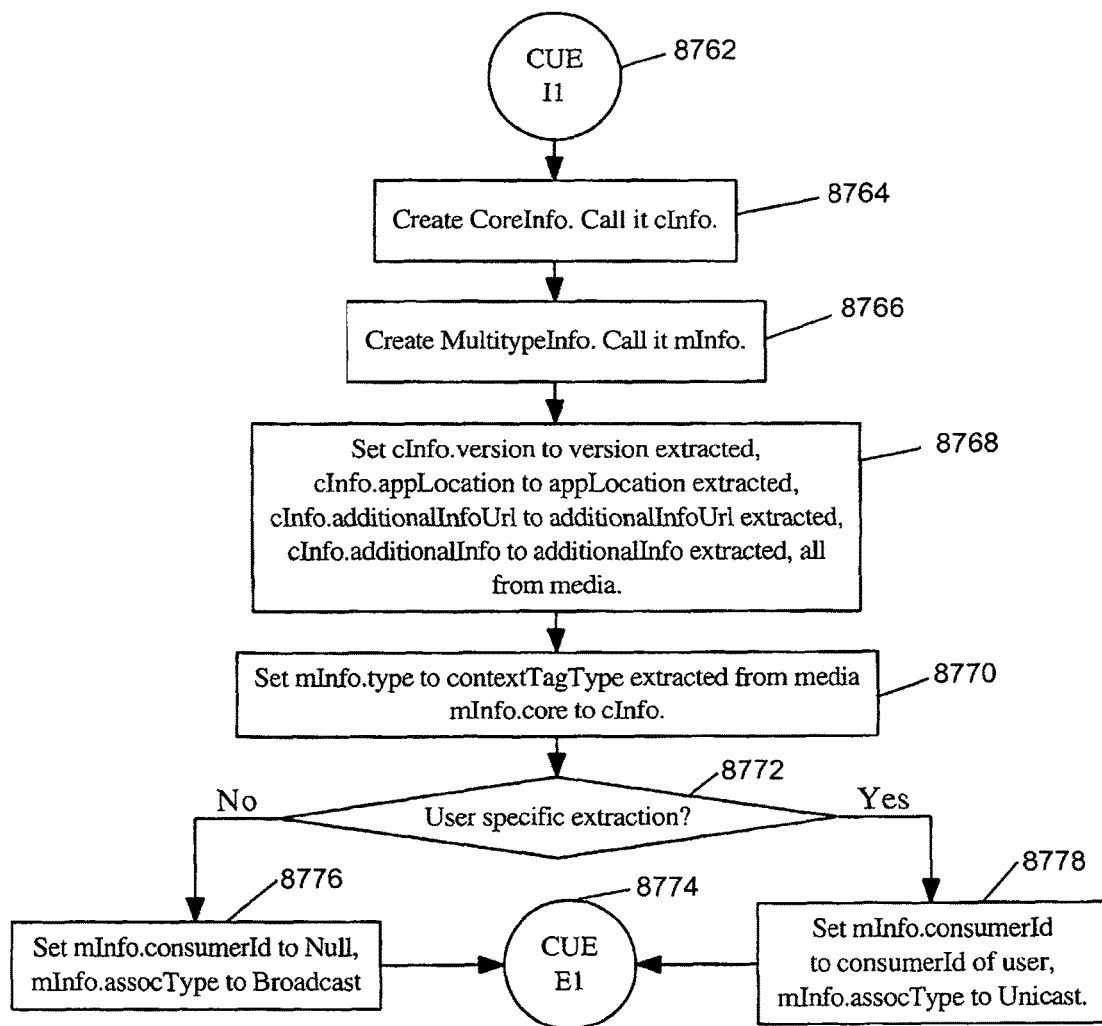
Figure 87C:
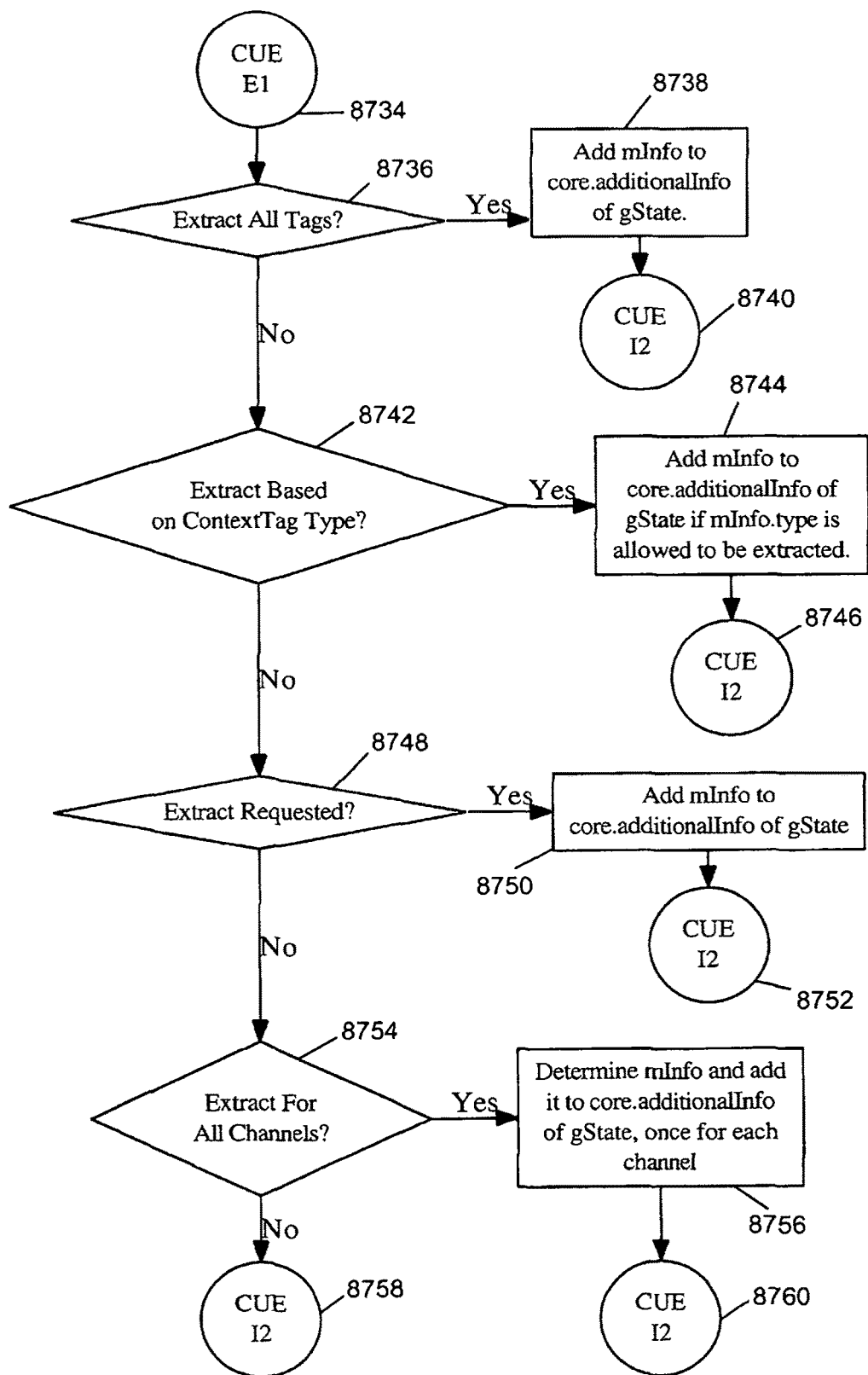
Figure 87D:
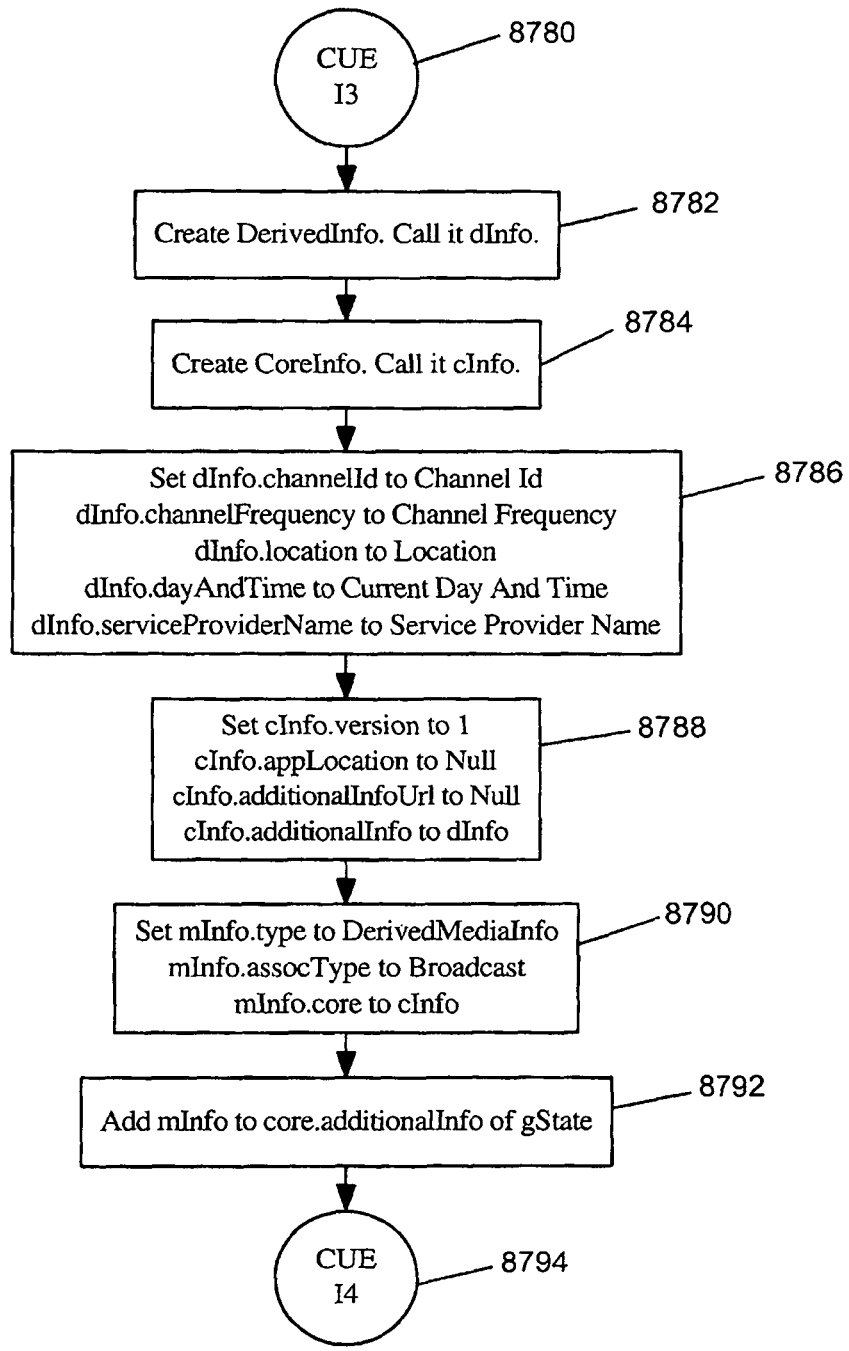
Figure 87E:
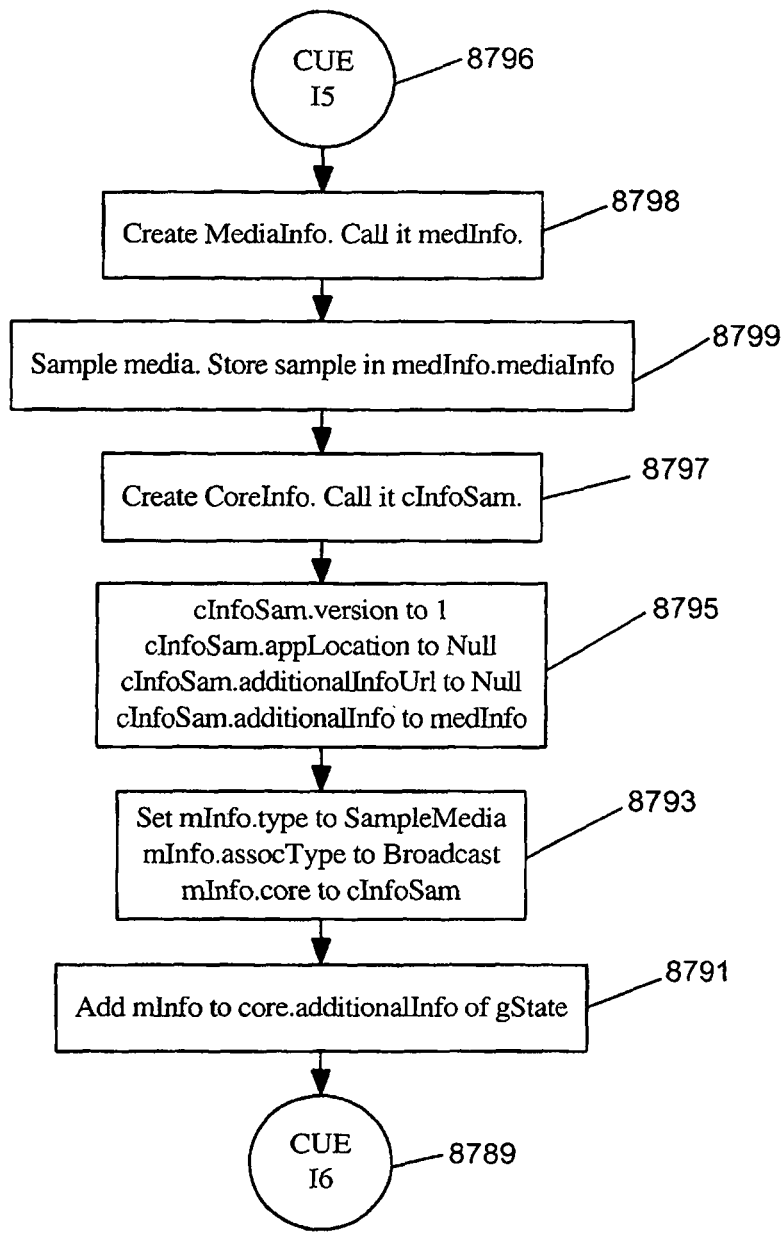

Step 8780 of FIG. 87D indicates that the process can move to step 8782. At step 8782 an instance of DerivedInfo (DI) as illustrated in FIG. 21, can be created. The instance can be referred to as dInfo for use in subsequent steps of the process. The process can then move to step 8784. At step 8784, an instance of CRI can be created. The instance can be referred to as cInfo for use in subsequent steps of the process. The creation of instances of DI and CRI can involve allocation of memory, control data structures, state handles, or the like. In some embodiments, the creation of instances of CRI and DI can involve just allocation of memory. In yet other embodiments, the creation of instances can involve allocating state handles in addition to allocating sufficient memory for the instances of CRI and DI. The process can then move to step 8786.

At step 8786, various fields associated with dInfo can be set. The method of determining values that can be associated with these fields can be specific to the embodiment of GD 302. In some embodiments, the channelId and channelFrequency associated with dInfo can be determined using information that can be derived from analog signaling used for content by CEXT 320 OF GD 302. In some embodiments, the location associated with dInfo can be set to a pre-determined value. In embodiments wherein the functionality of GD 302 can be included in a set top box such as those associated with television sets, the location can be set to one of locations such as UsEastCoast, UsWestCoast, UsMidWest, or the like. The set top boxes provided for use in East coast states in United States of America, can be constructed in a way such that they always include UsEastCoast as the location in dInfo. In other embodiments, a GPS (global positioning system) device (not shown) that can be included in GD 302 can be used to determine the location which can be associated with dInfo.location. Other methods of determining location are possible. The dayAndTime of dInfo can be determined using a clock device/chip (not shown) that can be included in and/or associated with GD 302. The serviceProviderName of dInfo can be set to a pre-determined value, in some embodiments. In embodiments where set-top boxes associated with television sets are made available for use by a service provider such as Comcast, the serviceProviderName can be set to Comcast. The process can then move to step 8788.

At step 8788, cInfo.version can be set to 1, cInfo.appLocation can be set to Null, cInfo.addiontalInfoUrl can be set to Null, and cInfo.additionalInfo can be set to dInfo. A Null value for fields appLocation and addiontalInfoUrl can be used to indicate that they are not associated with valid values. In some other embodiments, cInfo.appLocation can be set to a pre determined URL. The URL can provide information related to a location on Internet wherein an application that can handle tags associated with type DerivedMediaInfo can be downloaded. The process can then move to step 8790.

At step 8790, mInfo type can be set to DerivedMediaInfo, mInfo assocType can be set to Broadcast and mInfo core can be set to cInfo. A value of Broadcast for mInfo assocType can indicate that any CD 102 that can receive a tag associated with information generated by the GD, can use the tag. The process can then move to step 8792. At step 8792, mInfo can be added to gState.core.additionalInfo. The process can then move to step 8794. Step 8794 indicates that the process can move to step 8724 of FIG. 87A. Step 8724 indicates that the process can move to step 8722.

At step 8722, a determination can be made whether to include a sample of media that can be currently processed by CEXT 320 of GD 302. In some embodiments, a sample of media currently received/processed by GD 302 can be included in a tag. This can be used by instances of CD 102 in a variety of ways. In embodiments wherein a smart phone can include functionality associated with CD 102, the media sample can be used as a ring tone. In other embodiments, the sample can be submitted by an instance of CD 102 to a service that can determine information associated with the sample by analyzing the media sample. The service can provide the result of analysis to the CD. This can be useful in embodiments wherein media received/processed by GD 302 is not tagged. If it is determined that a sample can be associated with information that can be included in a tag, the process can move to step 8726. If not, the process can move to step 8728. Step 8726 indicates that the process can move to step 8796 of FIG. 87E.

Step 8796 indicates that the process can move to step 8798. At step 8798, an instance of MediaInfo (MEDI) can be created. In one embodiment of the invention, an instance of MEDI can contain information that is illustrated in FIG. 7. The created instance is referred to as medInfo for use in subsequent steps of the process. The creation of MEDI instance can involve allocation of memory, control data structures, state handles, or the like. In some embodiments, the creation of MEDI instance can involve just allocation of memory. In yet other embodiments, the creation of instances can involve allocating state handles in addition to allocating sufficient memory for the MEDI instance. The process can then move to step 8799.

At step 8799, a sample of media is extracted and stored in medInfo.mediaInfo. A sample of media can be extracted by CEXT 320. The structure and content of the sample can be specific to the embodiment. In some embodiments, the sample can be associated with MPEG4 format. The process can then move to step 8797.

At step 8797, an instance of CRI can be created. The created instance is referred to as cInfoSam for use in subsequent steps of the process. The creation of CRI instance can involve allocation of memory, control data structures, state handles, or the like. In some embodiments, the creation of CRI instance can involve just allocation of memory. In yet other embodiments, the creation of instances can involve allocating state handles in addition to allocating sufficient memory for the CRI instance. The process can then move to step 8795.

At step 8795, cInfoSam.version can be set to 1, cInfoSam.appLocation can be set to Null, cInfoSam.addiontalInfoUrl can be set to Null, and cInfoSam.additionalInfo can be set to medInfo determined in step 8798. A Null value for fields appLocation and addiontalInfoUrl can be used to indicate that the fields do not hold valid values. In some other embodiments, cInfoSam.appLocation can be set to a pre determined URL. The URL can provide information related to a location on Internet wherein an application that can handle tags associated with type SampleMedia can be downloaded. The process can then move to step 8793.

At step 8793, mInfo type can be set to SampleMdia, mInfo assocType can be set to Broadcast and mInfo core can be set to cInfoSam. A value of Broadcast for mInfo assocType can indicate that any CD 102 that can receive a tag associated with information generated by the GD, can use the tag. The process can then move to step 8791. At step 8791, mInfo can be added to gState.core.additionalInfo. The process can then move to step 8789. Step 8789 indicates that the process can move to step 8730 of FIG. 87A. Step 8730 indicates that the process can move to step 8728.

Returning to step 8728, a trigger can be indicated for sending messages to instances of PD 202. The messages can include information relating to tags generated in earlier steps of the process. The messages can be sent to instances of PD 202 that can be associated with the GD. The trigger indicated in step 8728 can be used in some embodiments to send messages to PDs at step 8728. In other embodiments, a check can be made at this step for expiry of a timer interval. If the timer interval has expired, GD 302 can send the messages to PDs. Other embodiments can choose to send messages including tag related information due to other events not described here. The process can then move to step 8732. Step 8732 indicates that the process can move to step 8706.

Figure 88A:
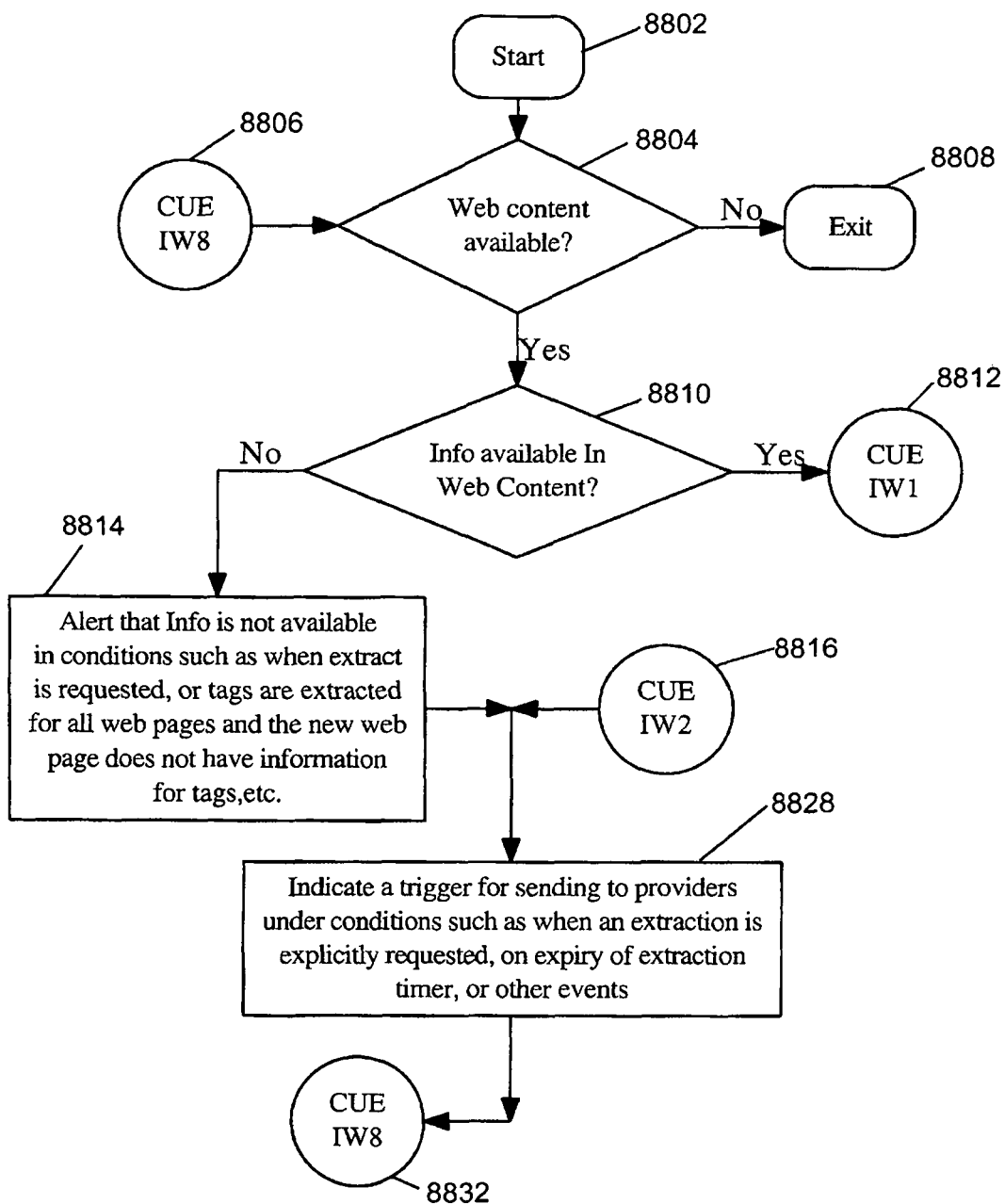
FIG. 88A-C illustrate the flow diagrams of a process followed by a GD in determining information that can be associated with tags, and communicating information related to tags to PDs, according to an embodiment of the present invention.
Figure 88B:
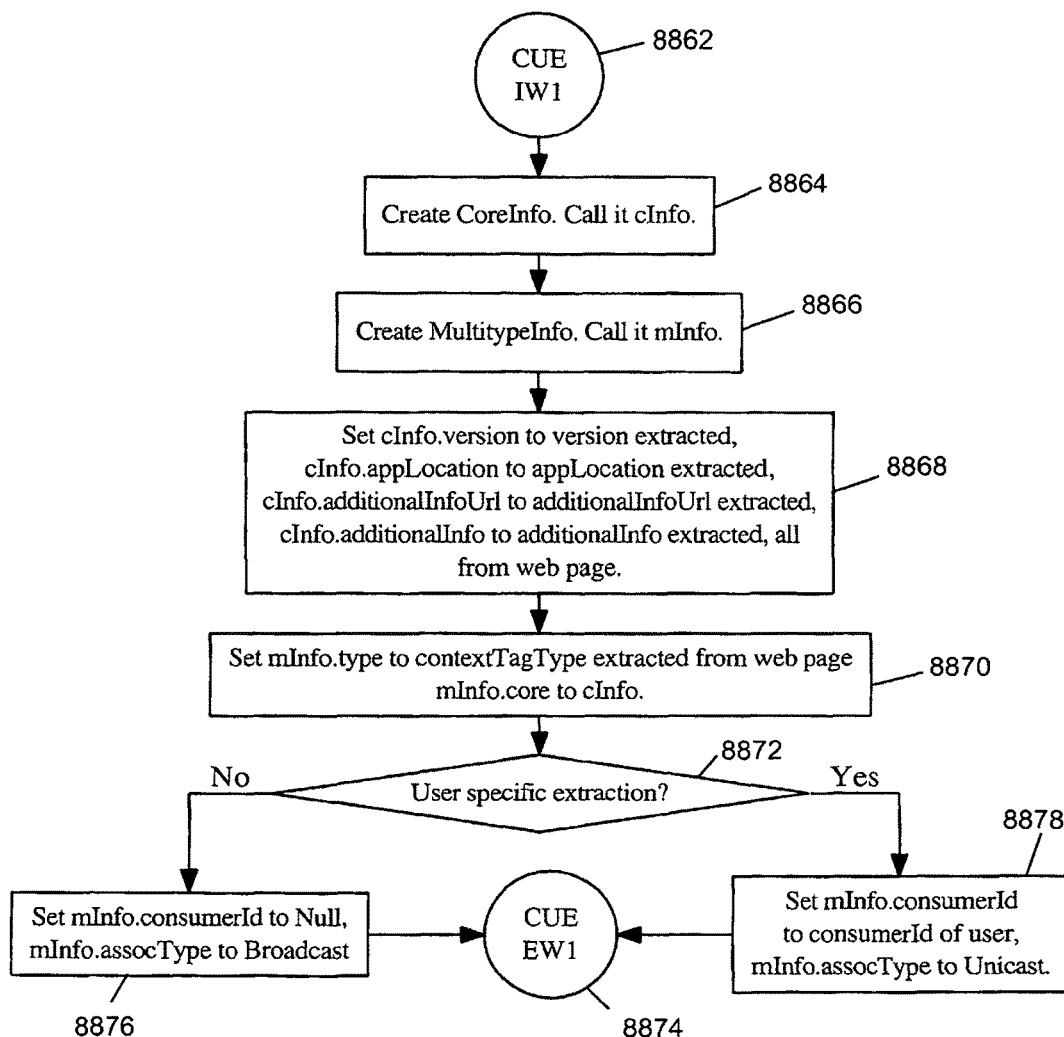
Figure 88C:
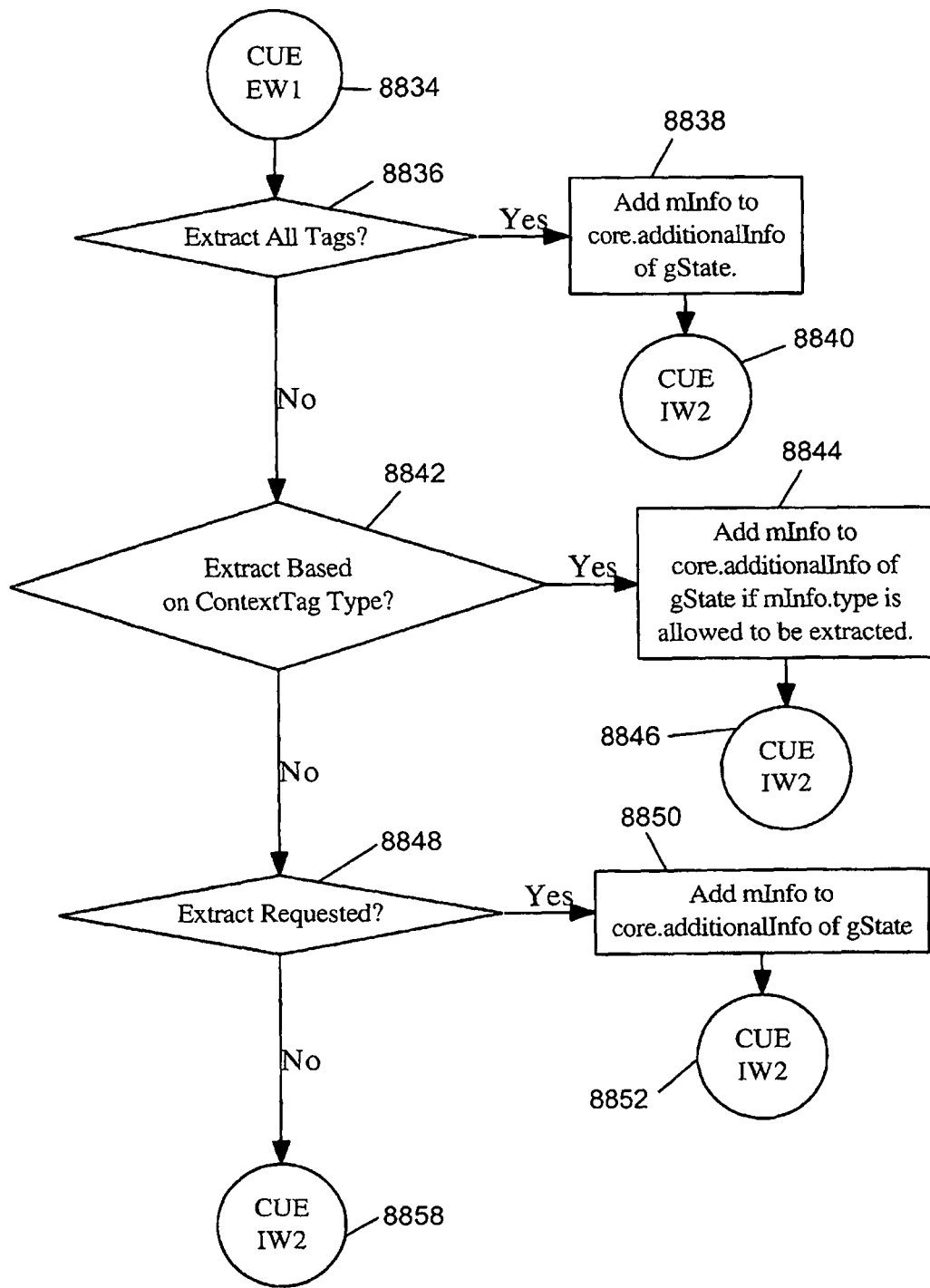

FIG. 88A-C illustrate the flow diagrams of a process followed by a GD in determining information that can be associated with tags, and communicating information related to tags to PDs, according to an embodiment of the present invention. In an embodiment of the invention described here, an instance of GD 360 (of FIG. 3C) can use the process illustrated in FIG. 88A-C in determining information that can be associated with tags. An instance of GD 360 can determine some/all of information associated with tags, using data retrieved from web content. An instance of GD 360 can access web content in a variety of formats that can include audio, video, html pages, xml documents, java scripts, multipart mime based email messages, or the like.

In one embodiment of the present invention, HTML pages can be associated with information that can help determine information related to one or more tags. When such a HTML page is rendered or retrieved by a browser, in the example embodiment, information related to the tags can be extracted from HTML page (and any other related pages/files) and make the information available for providing tags to instances of CD 102. In the embodiment wherein information extracted from HTML pages can be used for determining information associated with tags, information related to tags can be embedded in HTML pages using EMBED HTML tag. Each instance of EMBED tag in a HTML page can be used to represent information that can be associated with a single tag. Parameters associated with EMBED tag can be used to represent the information. The EMBED tag can, for example, be associated with a APPLOCATION attribute that can be used to determine appLocation field associated with a tag. Some or all of the steps associated with FIG. 88A-C can be implemented using a browser plugin. The browser plugin and EMBED tags can, in such case be associated with the same mime type. The mime type associated with EMBED tags and browser plugin in this embodiment can be tag/embed. A HTML page containing an advertisement indicating a sale, can for example include a html EMBED tag that can be associated with information specific to SaleSchedule tag. In such a case, the EMBED tag can be associated with a mime type of tag/embed, a TAG-TYPE attribute with a value of 'SaleSchedule', an APPLOCATION attribute specifying a URL where an application can be downloaded from, and, DATE, and TIME attributes that can specify the date and time of sale.

In some embodiments, all information extracted from web content (such as html, java scripts, audio, video, etc.) can be made available for associating with one or more tags. In the HTML web page embodiment described earlier, information extracted from each EMBED html tag included in the web page and associated with tag/embed mime type can be made available for associating with a tag.

In other embodiments, information extracted from web content and which can be associated with one among a list of types, each type related to the type of a tag, can be made available for association with a tag. If information extracted from web content can be associated with a type not included in the list, the information cannot be made available for association with a tag. In the HTML web page embodiment illustrated earlier, an example embodiment can allow making the information associated with an EMBED tag available if the TAGTYPE attribute of EMBED html tag can be associated with a value of 'ProgramSchedule'. Information extracted from an EMBED tag with TAGTYPE attribute of 'SaleSchedule' cannot be made available for association with a tag. The list of tag types for which information can be made available from EMBED tags can be provisioned. In the HTML web page embodiment, the list of types can be configured using a configuration option associated with the browser.

In yet other embodiments, information extracted from web content can be made available upon explicit requests which can include user interaction. In the HTML web page example illustrated earlier, some/all information associated with a HTML page (and/or related files) can be made available for associating with a tag, when a user clicks on a button associated with the HTML page in a web browser. The HTML web page embodiment can achieve this functionality by including information associated with a tag in a file and referring to the file from the web page using <A HREF> html tag. The tag file can be associated with a mime type of tag/href in one embodiment. An example file called fileTag.href can contain attributes related to the tag. Information that can be included in the file, in the example embodiment, can include TAGTYPE, APPLOCATION, including others. The browser can also be associated with a plugin that can handle mime type tag/href. The plugin can then make the information retrieved from fileTag.href available for association with the tag. In one example embodiment, HTML page can include the following tag snippet: <a href="tag1.href">Click Here!</a>. In this example, content of tag1.href file is associated with tag/href mime type. When a user clicks on the "Click Here!" link displayed on the web page, the browser plugin associated with tag/href mime type can retrieve information from tag1.href file and make the information from tag1.href available for association with a tag. In the HTML web page embodiment, more than one file (of mime type tag/href) can be associated with a web page. Each file associated with a web page can be associated with different tag types as illustrated in FIG. 4A-B. Each file associated with a web page can be made available due to different events that can include user clicking on different links, or the like.

It can be noted that the method of representing the information in web content (that can be associated with the tag), the method of extracting information, the method of making the information available, the events that can result in making the information available, and others as illustrated above are meant for use by the embodiment described here. Other embodiments can choose to perform the functions differently, in a way not described here. The methods, events, information, mechanisms, and others as illustrated above are not meant to be limiting the scope of the invention or any of its embodiments. For example, tag related information can be included in emails, in a multipart mime type email message. Information from emails can be made available for association with tags due to events that can include opening the email, opening the attachments of email, including others.

The process starts at step 8802 and moves to step 8804. At step 8804, a check is done to determine if GD 360 is currently associated with web content. In some embodiments, GD 360 can determine if it is associated with web content when WDR 364 of GD 360 retrieves web related content. GD 360 cannot be associated with web content when WDT 364 cannot have web content associated with it. If the GD is not associated with web content, the process can move to step 8808. Step 8808 indicates that the process associated with FIG. 88A-C is complete. If the GD is associated with web content, as determined at step 8804, the process can move to step 8810.

At step 8810, a check is done to determine if the web content associated with GD 360 is tagged with information. TEXT 310 can determine this using the web content that it can receive from WDR 364. In some embodiments, an instance of GD 360 can be capable of receiving web content that is tagged. When the instance of GD 360 receives tagged web content, the check associated with step 8810 can result in a success. In other embodiments, TEXT 310 can determine if the web content is tagged using a variety of methods that can include retrieving any files/data related to web content currently associated with GD 360. Other methods of determining if the media is tagged, are possible. For the HTML example embodiment illustrated earlier, the availability of information related to tags in a web page can be indicated by the presence of EMBED tags with an associated mime type of tag/embed. Presence of tags can also be indicated when files related to <a href> html tags can be associated with tag/href mime type.

If the web content is tagged as determined in step 8810, the process can move to step 8812. Step 8812 indicates that the process can move to step 8862 of FIG. 88B. If it is determined at step 8810 that the web content is not tagged, the process can move to step 8814. At step 8814, an alert can be indicated that information cannot be extracted from web content. This can be done in some embodiments. An example of such embodiment can include a web browser that can indicate the presence of tags in a web page by placing a "tag" icon on browsers UI that cannot be related to the display of web content. Lack of information related to tags in a web page can be indicated by not displaying the "tag" icon on browsers UI. This can be similar to a "lock" icon displayed by a browser when the connectivity established by the web page displayed by the browser, is secure.

The process associated with FIG. 88A-C can then move to step 8828.

Referring to step 8862, the step indicates that the process can move to step 8864. At step 8864 an instance of CRI is created. The instance of CRI is referred to as cInfo for use in subsequent steps of the process. The process can then move to step 8866. At step 8866, an instance of MI is created. The instance of MI is referred to as mInfo for use in subsequent steps of the process. The creation of instances of CRI and MI can involve allocation of memory, control data structures, state handles, or the like. In some embodiments, the creation of instances of CRI and MI can involve just allocation of memory. In yet other embodiments, the creation of instances can involve allocating state handles in addition to allocating sufficient memory for the instances of CRI and MI. The process can then move to step 8868.

At step 8868, various fields associated with cInfo can be set to data extracted from web content. Data extracted from web content by TEXT 310 can be used to set cInfo.version, cInfo.appLocation, cInfo.additionalInfoUrl and cInfo.additionalInfo. In embodiments where some of the information related to cInfo cannot be extracted from web content, the fields associated with cInfo (for which information cannot be determined from extracted data) can be set to Null. A Null value can indicate the unavailability of that field in the web content. For example, in embodiment wherein the information associated with web content does not include information related to additionalInfoUrl, cInfo.additionalInfoUrl can be set to Null. In the embodiment of HTML web page with EMBED tags illustrated earlier, attributes associated with EMBED tags can be used to determine fields that can include version, appLocation, additionalInfoUrl and additionalInfo. In the example HTML web page embodiment with EMBED html tags, attributes associated with EMBED html tags can include VERSION, TAGTYPE, APPLOCATION, ADDITIONALINFOURL and ADDITIONALINFO, among others. The process can then move to step 8870.

At step 8870, fields associated with mInfo are set. mInfo type can be set to a type that can be determined using data extracted from the web content. For the HTML web page embodiment with EMBED tags, the TAGTYPE attribute associated with EMBED HTML tag can be used to determine value associated with mInfo type. mInfo core can be set to cInfo. The process can then move to step 8872.

At step 8872, GD 360 can determine if the information generated by GD 360 can be associated with a tag that can be used by any instance of CD 102 or a specific instance of CD 102. In some embodiments, UI 322 of GD 360 can be used to indicate to the GD that the information generated by GD 360 can be associated with tags which can be associated a specific instance or all instances of CD 102.

An example of such embodiment is a web browser (and associated components that can include hardware and/or firmware and/or instructions components) that can include functionality associated with GD 360. The browser can also be associated with a user interface that can allow associating a mode with the browser. The mode can be used by the browser to generate information related to a tag, which can be made available to an instance of CD 102. This mode can be referred to as Unicast mode. This can be used in embodiments wherein the information related to tags can include private and/or confidential information related to the user of CD 102 that the tags can be associated with. The browser can also be associated with a different mode (called Broadcast) wherein information generated by the browser can be associated with tags that can be used by any CD 102 that receives it.

When UI 322 of GD 360 can be associated with elements that can indicate the association of information generated by GD with tags for a specific instance of CD 102, UI 322 can also allow for elements that can be used to specify an identifier associated with the CD 102. The association of user interface elements to identifiers of CD 102 can be stored by GD 360 in STORE 318. In the example web browser embodiment, when the mode associated with the browser can be set to Unicast, the browser can provide user interfaces that can allow for specifying the identifier associated with CD 102. In the example embodiment, a smart phone can include the functionality associated with CD 102. The smart phone can be associated with wifi interface for NI 106, and the Ethernet address associated with NI 106 can be used as a an identifier of CD 102. The Ethernet address associated with the wifi interface can be provided to GD 360 using UI 322, along with changing the mode of browser to Unicast. In some embodiments, as in the smart phone example illustrated earlier, a phone number associated with the voice service of smart phone can be used as an identifier of CD 102 included in the smart phone.

Referring to step 8872, a check is made to determine if the information generated by GD 360 can be associated with a specific instance of CD 102. If the check succeeds, the process can move to step 8878. If not, the process can move to step 8876. At step 8876, mInfo consumerId can be set to Null and mInfo assocType can be set to Broadcast. A Null value for mInfo consumerId can indicate that the consumerId is not associated with any instance of CD 102. A value of Broadcast for mInfo assocType can indicate that tags generated using the determined information can be used by any instance of CD 102 that can receive the tag. The process can then move to step 8874. Step 8874 indicates that the process can then move to step 8834 of FIG. 88C. Step 8834 indicates that the process can then move to step 8836.

Returning to step 8878, mInfo consumerId can be associated to the consumerId of CD 102 that the tag including the information generated by GD 360 can be associated with. mInfo.assocType can be set to Unicast. A Unicast value for mInfo.assocType can indicate that a tag generated using information determined by GD 360 can be associated with a specific instance of CD 102. The process can then move to step 8874.

Returning to step 8836, a check is made at this step to determine if all information extracted from web content can be made available for use in associating with tags. If the check fails, the process can move to step 8842. If the check passes, the process can move to step 8838. At step 8838, mInfo determined in earlier steps of the process can be added to gState.core.additionalInfo. The process can then move to step 8840. Step 8840 indicates that the process can move to step 8816 of FIG. 88A. Step 8816 indicates that the process can move to step 8828.

Returning to step 8842, a check is made at this step to determine if the information extracted can be made available for association with a tag, based on a match of mInfo type against a list of types. In an embodiment of the invention, the list of types can indicate some or all of values that can be associated with type of a tag, for which the extracted information can be made available. If the check fails, the process can move to step 8848. If the check passes, the process can move to step 8844. At step 8844, mInfo determined in earlier steps of the process can be added to gState.core.additionalInfo. The process can then move to step 8846. Step 8846 indicates that the process can move to step 8816 of FIG. 88A.

Returning to step 8848, a check is made at this step to determine if there is a request to make available, the information extracted, for association with a tag. In some embodiments, request for allowing the information to be made available can be indicated by a user interaction that can involve UI 322 of FIG. 3A. If the check fails, the process can move to step 8858. If the check passes, the process can move to step 8850. At step 8850, mInfo determined in earlier steps of the process can be added to gState.core.additional- Info. The process can then move to step 8852. Step 8852 indicates that the process can move to step 8816 of FIG. 88A.

Returning to step 8858, the step indicates that the process can move to step 8816.

Returning to step 8828, a trigger can be indicated for sending messages to instances of PD 202. The messages can include information relating to tags generated in earlier steps of the process. The messages can be sent to instances of PD 202 that can be associated with the GD. The trigger indicated in step 8828 can be used in some embodiments to send messages to PDs at step 8828. In other embodiments, a check can be made at this step for expiry of a timer interval. If the timer interval has expired, GD 302 can send the messages to PDs. Other embodiments can choose to send messages including tag related information due to other events not described here. The process can then move to step 8832. Step 8832 indicates that the process can move to step 8806.

Figure 89:
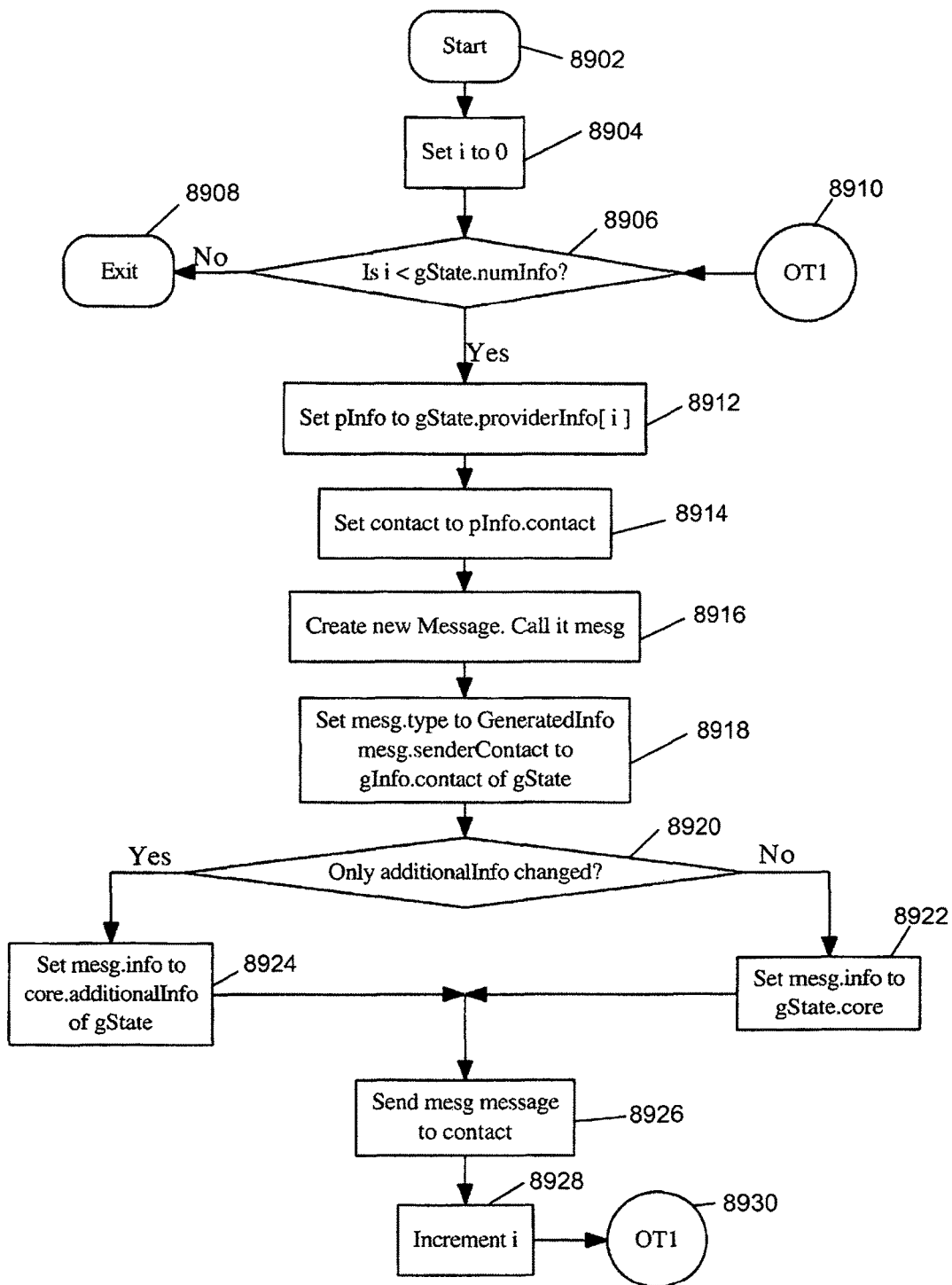
FIG. 89 illustrates the flow diagram of a process followed by a GD in sending TRIs to PD(s) according to an embodiment of the present invention.

FIG. 89 illustrates the flow diagram of a process followed by a GD in sending tags to PD(s) according to an embodiment of the present invention. In the embodiment of the invention described here, the process illustrated in FIG. 89 can be followed by an instance of GD 302 in sending messages that can include information related to tags, to instances of PD 202. In the embodiment described here, information related to tags, generated/maintained by GD 302 can be communicated to one or more instances of PD 202 in messages associated with type GeneratedInfo.

In some embodiments, information related to tags generated by GD can include changes to additonalInfo field associated with a tag, while a GD is associated with one or more PDs. In such embodiments, the value/data associated with additionalInfo field in a tag can be different from the value/data associated with the same field in another tag generated by an instance of GD 302. The additionalInfo field associated with a tag can include embodiment specific information. Examples of the information that can be associated with additionalInfo in different embodiments are illustrated in FIG. 7, FIG. 20, FIG. 21, FIG. 99-102, FIG. 118-120.

In some other embodiments, information related to a tag generated by a GD can include changes to fields such as appLocation, additionalInfoUrl, version, and additionalInfo, while a GD is associated with one or more PDs. In such embodiments, the value/data associated with appLocation, additionalInfoUrl, version, and additionalInfo fields associated with a tag can be different from the value/data associated with the respective fields in another tag generated by an instance of GD 302. In other embodiments, tags generated by an instance of GD can include changes to other fields associated with the tags. Two or more tags generated by a GD in other embodiments can include changes to some or all or none of the fields associated with the tag.

The process starts at step 8902 and moves to step 8904. At step 8904, an i is set to 0. The process can then move to step 8906. At step 8906, a check is done to see if i is less than gState.numInfo gState numInfo can indicate the number of instances of PD 202 that can be associated with the GD. If the check succeeds, the process can move to step 8912. If the check fails, the process can move to step 8908. Step 8908 indicates that the process associated with FIG. 89 is complete.

Returning to step 8912, a pInfo is set to i-th element of gState.providerInfo array. pInfo is an instance of PI. The process can then move to step 8914. At step 8914, the contact associated with pInfo is retrieved and a local copy made for use by subsequent steps of the process. The contact determined at this step can specify an address at which an instance of PD referred to by pInfo can have messages sent to. The process can then move to step 8916.

At step 8916, a Message can be created. The created message is referred to as mesg for use in subsequent steps of the process. The creation of a message can involve allocation of memory, control data structures, message handles, or the like. In some embodiments, the creation of a message can involve just allocation of memory. In yet other embodiments, the creation of a message can involve allocating message handles in addition to allocating sufficient memory for the message. The process can then move to step 8918. At step 8918, the type associated with mesg is set to GeneratedInfo, and mesg.senderContact is set to gState.gInfo.contact. The process can then move to step 8920

At step 8920, a check is done to determine if the information related to tags generated by GD results in changes to only additionalInfo field associated with the tag. If the check succeeds the process can move to step 8924. If the check fails, the process can move to step 8922. Step 8922 indicates embodiments wherein information generated by a GD can result in changes to fields appLocation, additionalInfoUrl, version, and additionalInfo associated with the tag. Step 8922 indicates that mesg.info can be set to gState.core. The process can then move to step 8926.

Returning to step 8924, mesg.info can be set to gState.core.additionalInfo. The process can then move to step 8926.

In other embodiments, information related to tags generated by a GD can include changes to other fields associated with a tag. In such embodiments, mesg.info can include information related to all the fields that can change. The set of fields that can change, and the method of including the information related to changed fields, and the method of communicating the changed fields, as described in FIG. 89, is illustrative, for use in the embodiment of the invention described here. The set of fields that can change, the method of including information related to changed fields and the method of communicating the changed fields in other embodiments can be different. The methods/process illustrated in FIG. 89 is not meant to be limiting the scope of the invention or any of its embodiments.

Returning to step 8926, the mesg message is sent to the contact as determined in step 8914. The process can then move to step 8928. At step 8928 i is incremented and the process can move to step 8930. Step 8930 indicates that the process can move to step 8910. Step 8910 indicates that the process can move to step 8906.

Figure 90A:
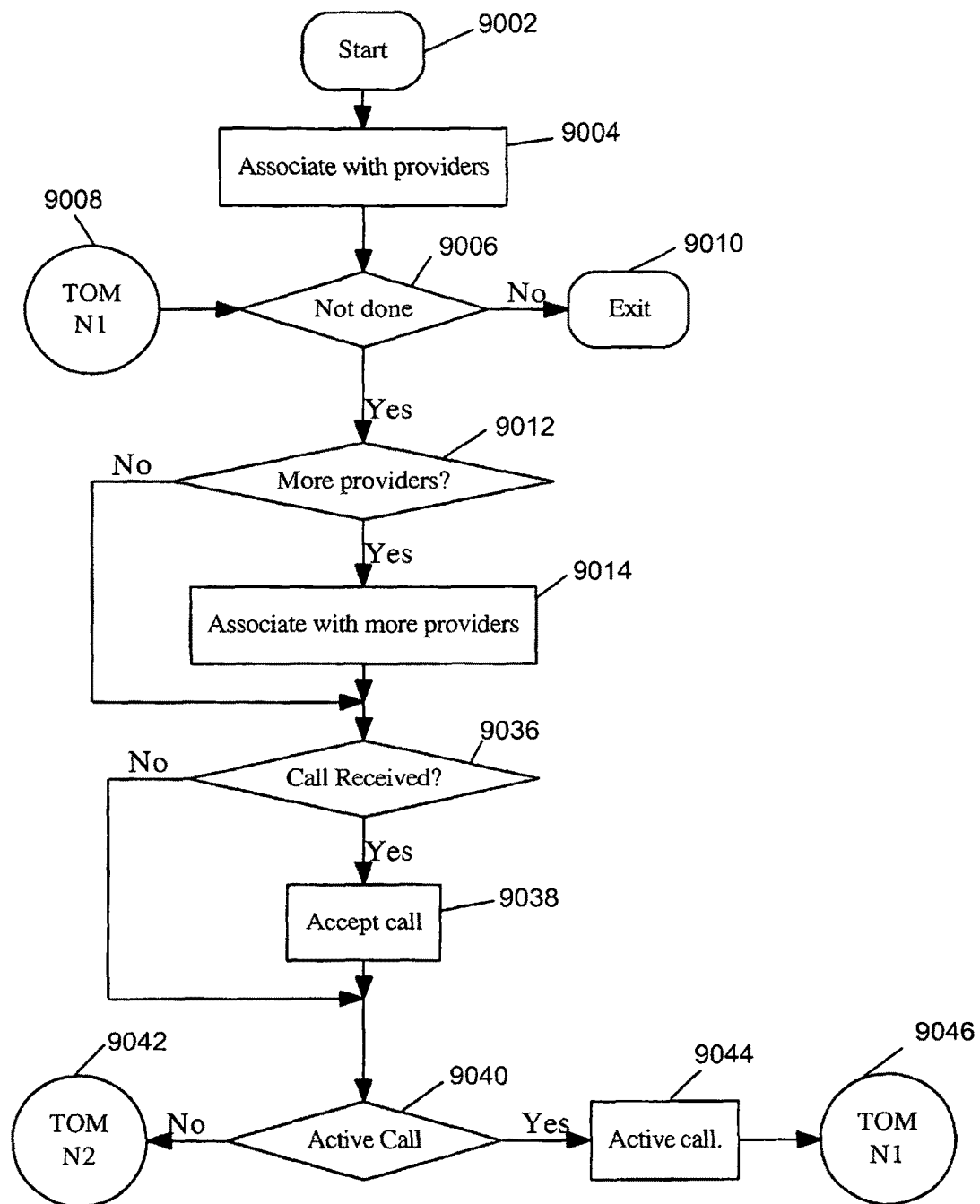
FIG. 90A-B illustrate the flow diagrams of a process followed by a CD in handling tags, when the CD is providing services, according to an embodiment of the present invention.
Figure 90B:
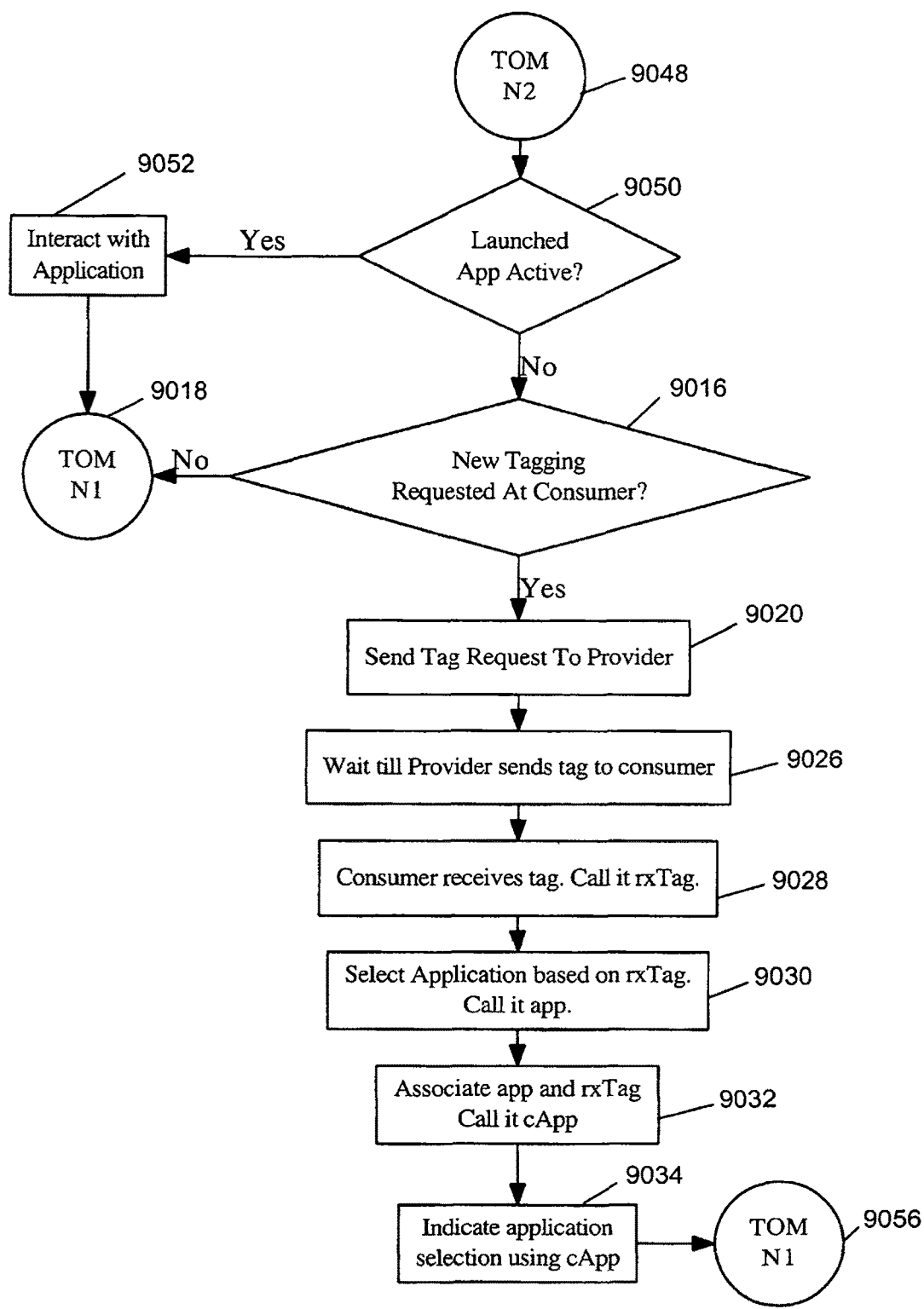

FIG. 90A-B illustrate the flow diagrams of a process followed by a CD in handling tags, when the CD is providing services, according to an embodiment of the present invention. In one embodiment of the invention, an instance of CD 172 can use the process illustrated in FIG. 90A-B in processing tags, while providing other services. The services that can be provided can include a voice service that can be similar to service provided by telephones. An example of such embodiment can include a smart phone such as G1 phone from HTC running Android Operating System, iPhone from Apple, Inc., or the like. In other embodiments, instances of CD 172 can provide services not illustrated here. An example could be a device that as an iPad that can allow users to browse web, read news online, or the like. The iPad device can at the same time allow for processing of tags. The functionality associated with CD 172 can be included in devices such as computers, laptops, PCs, desktops, or the like. In such embodiments, the computers can provide other services not described here. The set of services, the method of processing tags, the method of providing services and processing tags, and other functionality as illustrated in FIG. 90A-B is illustrative only, and meant for use by the embodiment described here. Other embodiments can choose to provide services not described here, provide services and process tags in ways not described here. The methods and processes associated with FIG. 90A-B are not meant to be limiting the scope of the invention or any of its embodiments.

In the embodiment described here, an instance of CD 172 can provide voice services that can be related to telephony, along with processing tags. The CD can allow for accepting phone calls, receiving tags, interacting with applications associated with tags, and the like. In one embodiment the CD, can allow for interacting with applications and/or can process tags while the CD is not associated with an active phone call. The CD can also allow for interacting with applications and/or process tags while a phone call is on hold. The CD can also allow for accepting phone calls, while the CD is processing tags and/or allowing a user to interact with applications associated with tags. The method of processing tags in relation to phone calls as described here is illustrative, and specific to an embodiment described here.

The process starts at step 9002 and moves to step 9004. At step 9004, the CD 172 can first associate with any instances of PD 240. The method(s) illustrated in FIG. 33-36 can be used by an instance of CD 172 in detecting instances of PD 240 and/or associating with them. The process associated with FIG. 90A-B can then move to step 9006. At step 9006 a determination can be done if the process associated with FIG. 90A-B needs to be terminated. If the process needs to be terminated, the process can move to step 9010. Step 9010 indicates that the process associated with FIG. 90A-B is complete. In some embodiments as in case of smart phones or tablet computers running Android operating system, the process associated with FIG. 90A-B can be used when an Android service related to processing tags is activated. The process associated with FIG. 90A-B can be stopped when the Android service is stopped.

If the check at step 9006 determines that the process does not need to be terminated, the process can move to step 9012. At step 9012, a determination can be made if the CD 172 can detect and/or associate with any new instances of PD 240. In the smart phone embodiment of CD 172 illustrated earlier, the CD can be detecting and/or associating with new instances of PD 240, processing tags and/or running applications associated with tags, and providing services related to phone calls. In some other embodiments, it can be possible to stop detection and/or association with new instances of PD 240. In an embodiment wherein the process associated with FIG. 90A-B can be implemented using Android service mechanism, an Activity in Android, associated with the service can notify the service to stop associations with new instances of PD 240. In some other embodiments, new instances of PD 240 cannot be detected because of other reasons that can include disabling of PI 146 on CD 172. A disable of PI 146 of CD 172 can result in CD 172 not being able to detect and/or associate with new instances of PD 240. In some embodiments, a disable of PI 146 can be achieved using UI 126 of CD 172. When the process associated with FIG. 90A-B is implemented on a device such as a smart phone or tablet computer running Android operating system, a user of the device can choose to disable interfaces associated with the devices such as Wifi interfaces, or Bluetooth devices, or the like, while the service associated with FIG. 90A-B is active.

If the check at step 9012 determines that the CD can associate with new instances of PD 240, the process can move to step 9014. At step 9014, the CD can detect and associate with any new instances of PD 240. The method(s) illustrated in FIG. 33-36 can be used by an instance of CD 172 in detecting instances of PD 240 and/or associating with them. The process can then move to step 9036. If the check at step 9012 determines that the CD cannot detect/associate with new instances of PD 240, the process can move to step 9036.

At step 9036, a check is made to determine if CD 172 is receiving a phone call. If the CD is receiving a phone call, the process can move to step 9038. At step 9038, the phone call can be accepted. In some embodiments, the phone call can be accepted if a user has indicated a willingness to accept the phone call using UI 126 of CD 172. A user of CD 172 can indicate a willingness to accept the phone call by pressing a physical key, or selecting a soft key associated with a touch screen, or the like. The phone call can be accepted at step 9038. The process can then move to step 9040. If at step 9036, it is determined that no phone call is being received, the process can move to step 9040.

At step 9040, a check is made to determine if the CD 172 is associated with a phone call that is active. Phone calls on hold are not considered active, in this embodiment. If there is no active call as determined at step 9040, the process can move to step 9042. Step 9042 indicates that the process can move to step 9048 of FIG. 90B. If the CD is associated with an active phone call as determined at step 9040, the process can move to step 9044. Step 9044 indicates that the CD 172 is associated with an active phone call. At this step, CD 172 can provide services related to the active phone call. The process can then move to step 9046. Step 9046 indicates that the process can move to step 9008.

Returning to step 9050, a check is made to determine if an application is active at this step. In some embodiments, an application can be active, if the application is activated prior to an active phone call, and the process moves to step 9050, after the phone call is deactivated. If an application is active as determined at step 9050, the process can move to step 9052. If the active application is interactive in nature, user of CD 172 can interact with the application at step 9052. If the active application is not interactive, CD 172 cannot perform a function at step 9052. The process can then move to step 9018. Step 9018 indicates that the process can move to step 9008 of FIG. 90A.

Returning to step 9050, if the check at this step determines that there is no active application, the process can move to step 9016. At step 9016, a check is made to determine if the user of the CD 172 has indicated a request for getting tags from instances of PD 240. If the user did not indicate a request for getting tags, the process can move to step 9018. Step 9018 indicates that the process can move to step 9008. Returning to step 9016, if it is determined that the user has indicated to request tags from an instance of PD 240, the process can move to step 9020. At step 9020, CD 172 can send a message to the PD that can be associated with user selection, indicating that the CD 172 needs a copy of a tag from the PD 240. The contact information associated with PI of the PD 240 can be used by the CD to send a message. The process can then move to step 9026. At step 9026, the CD 172 waits for a tag from the PD. A PD 240 receiving a message indicating a request for a tag from CD 172 can provide a tag to the CD. CD 172 at step 9026 moves to step 9028 when it receives a tag from the PD.

At step 9028, the tag sent by the PD is retrieved. The retrieved tag is referred to as rxTag for use in subsequent steps of the process. The process can then move to step 9030.

At step 9030, an application can be selected for association with rxTag. The application associated with rxTag can be referred to as app, for use in subsequent steps of the process. In some embodiments of the invention, the process associated with FIG. 76A-C can be used to select an application. In other embodiments, the process associated with FIG. 77 can be used to select an application. The process can then move to step 9032.

At step 9032, rxTag can be associated with app. The association can be setup by creating an instance of CA. The instance of CA can be referred to as cApp for use in subsequent steps of the process. The cApp.tag can be set to rxTag, and cApp.app can be set to app. The process can then move to step 9034. At step 9034, a determination is made that the application app has been associated with rxTag, and that the app has been selected. In some embodiments, the app can be activated (launched or run) at this step. In the embodiment described here, the process associated with FIG. 79A-B can be used to handle the selection. The process can then move to step 9056. Step 9056 indicates that the process can move to step 9008 of FIG. 90A.

Systems of First Embodiment

FIG. 126 illustrates a system of connectivity and association between a GD and PDs according to an embodiment of the present invention. The system includes a GD 13402, PD 13404, PD 13406, PD 13408, and PD 13410. GD 13402 can include any of the embodiments of GD illustrated in FIG. 3A (GD 302), FIG. 3B (GD 340), FIG. 3C (GD 360), FIG. 95 (GD 9502), FIG. 98 (GD 9802), FIG. 115 (GD 11502), FIG. 116 (GD 11602), FIG. 117 (GD 11702), or the like. PDs 13404, 13406, 13408 and 13410 can each include any of the embodiments illustrated in FIG. 2A (PD 202), FIG. 2B (PD 240), FIG. 2C (PD 260), or the like. It is to be noted that the embodiments of GD and PD illustrated for use in FIG. 126 is specific to the related embodiments. Other embodiments can have GDs or PDs that are different from the embodiments illustrated herein, and the illustration of FIG. 126 is not meant to be limiting the scope of the invention or any of its embodiments.

GD 13402 is associated with PDs in the system using various forms of connectivity—wired and wireless. GD 13402 is connected to PD 13404, and PD 13406 using wired forms of connectivity—13412 and 13414 respectively. Wired forms of connectivity can include various technologies Ethernet, firewire, cable modem interface, USB or the like. Other custom forms of connectivity are also possible. Each PD connected to GD can be connected using a different technology. In one embodiment of FIG. 126, 13412 can be associated with Ethernet technology, while 13414 can be associated with USB. GD 13402 can be connected to PDs using wireless technology. Wireless technology can include technologies such as Bluetooth, WiFi, cellular communication network or the like. Other custom wireless technologies are also possible. GD 13402 in FIG. 126 is connected to PD 13408 and PD 13410 using wireless communication—13416 and 13418 respectively. The wireless communication technologies used by a GD in connecting to each PD can be different. In the embodiment of FIG. 126, GD 13402 can be connected to PD 13408 using Bluetooth technology, while GD 13402 can be connected to PD 13410 using wifi technology.

It is to be noted that the embodiment illustrated in FIG. 126 is meant to illustrate the connectivity and association between a GD and one or more PDs. Other embodiments can have a different number of PDs. Some embodiments can allow only for wired connectivity, while some others can allow for wireless only connectivity. Other embodiments can choose to have GDs and/or PDs that are different from the ones illustrated herein, and the illustration associated with FIG. 126 is not meant to be limiting the scope of the invention or any of its embodiments.

FIG. 127 illustrates a system of connectivity and association between a PD and CDs according to an embodiment of the present invention. The system includes a PD 13502, CD 13506, CD 13508, CD 13504, and CD 13510. PD 13502 can include any of the embodiments illustrated in FIG. 2A (PD 202), FIG. 2B (PD 240), FIG. 2C (PD 260), or the like. CDs 13506, 13508, 13504, and 13510 can include any of the embodiments illustrated in FIG. 1A (CD 102), FIG. 1B (CD 140), FIG. 1D (CD 166), FIG. 1E (CD 170), FIG. 1C (CD 172), or the like. It is to be noted that the embodiments of PD and CD illustrated for use in FIG. 127 is specific to the related embodiments. Other embodiments can have CDs or PDs that are different from the embodiments illustrated herein, and the illustration of FIG. 127 is not meant to be limiting the scope of the invention or any of its embodiments.

PD 13502 is associated with CDs in the system using various forms of connectivity—wired and wireless. PD 13502 is connected to CD 13504, and CD 13506 using wired forms of connectivity—13512 and 13514 respectively. Wired forms of connectivity can include various technologies Ethernet, firewire, cable modem interface, USB or the like. Other custom forms of connectivity are also possible. Each CD connected to PD can be connected using a different technology. In one embodiment of FIG. 127, 13512 can be associated with Ethernet technology, while 13514 can be associated with USB. PD 13502 can be connected to CDs using wireless technology. Wireless technology can include technologies such as Bluetooth, WiFi, cellular communication network or the like. Other custom wireless technologies are also possible. PD 13502 in FIG. 127 is connected to CD 13508 and CD 13510 using wireless communication—13516 and 13518 respectively. The wireless communication technologies used by a PD in connecting to each CD can be different. In the embodiment of FIG. 127, PD 13502 can be connected to CD 13508 using Bluetooth technology, while PD 13502 can be connected to CD 13510 using wifi technology.

It is to be noted that the embodiment illustrated in FIG. 127 is meant to illustrate the connectivity and association between a PD and one or more CDs. Other embodiments can have a different number of CDs. Some embodiments can allow only for wired connectivity, while some others can allow for wireless only connectivity. Other embodiments can choose to have PDs and/or CDs that are different from the ones illustrated herein, and the illustration associated with FIG. 127 is not meant to be limiting the scope of the invention or any of its embodiments.

FIG. 128 illustrates a system of connectivity and association among GD, PDs and CDs according to an embodiment of the present invention. The embodiment of FIG. 128 includes a GD 13602, PD 13604, PD 13606, CD 13608, CD 13610, and CD 13612. GD 13602 can include any of the embodiments of GD illustrated in FIG. 3A (GD 302), FIG. 3B (GD 340), FIG. 3C (GD 360), FIG. 95 (GD 9502), FIG. 98 (GD 9802), FIG. 115 (GD 11502), FIG. 116 (GD 11602), FIG. 117 (GD 11702), or the like. PD 13604 and PD 13606 can each include any of the embodiments illustrated in FIG. 2A (PD 202), FIG. 2B (PD 240), FIG. 2C (PD 260), or the like. CDs 13608, 13612, and 13610 can include any of the embodiments illustrated in FIG. 1A (CD 102), FIG. 1B (CD 140), FIG. 1D (CD 166), FIG. 1E (CD 170), FIG. 1C (CD 172), or the like. It is to be noted that the embodiments of GD, PD and CD illustrated for use in FIG. 128 is specific to the related embodiments. Other embodiments can have GDs, CDs or PDs that are different from the embodiments illustrated herein. The illustration of FIG. 128 is not meant to be limiting the scope of the invention or any of its embodiments. In the embodiment illustrated in FIG. 128, a GD can be associated with zero or more PDs, the association between GD and each PD using one of several embodiments of communication—that can include wired and wireless communication. In the embodiment illustrated in FIG. 128, each PD can be associated with zero or more CDs, the association between each PD and each associated CDs using one of several embodiments of communication—that can include wired and wireless communication.

GD 13602 is associated with PDs in the system using various forms of connectivity—wired and wireless. GD 13602 is communicatively coupled to PD 13604 using 13614—a wired form of connectivity. Wired forms of connectivity can include various technologies Ethernet, firewire, cable modem interface, USB or the like. Other custom forms of connectivity are also possible. Each PD associated to a GD can use a different technology for communication. GD 13602 can be communicatively coupled to PDs using wireless technology. Wireless technology can include technologies such as Bluetooth, WiFi, cellular communication network or the like. Other custom wireless technologies are also possible. GD 13602 in FIG. 128 is communicatively coupled to PD 13604 using 13620—a wireless form of communication. The wireless communication technologies used by a GD in associating with each PD can be different. In the embodiment of FIG. 128, GD 13602 can be communicatively coupled to PD 13606 using Bluetooth technology.

Each PD—PD 13604 and PD 13606 can be associated with CDs in the system using various forms of connectivity—wired and wireless. PD 13604 is communicatively coupled to CD 13608, and PD 13606 is communicatively coupled to CD 13612 using wired forms of connectivity—13616 and 13622 respectively. Wired forms of connectivity can include various technologies Ethernet, firewire, cable modem interface, USB or the like. Other custom forms of connectivity are also possible. Each CD communicatively coupled to PD can be use a different technology for communication. In one embodiment of FIG. 128, 13616 can be associated with Ethernet technology, while 13622 can be associated with USB connectivity. PDs can be communicatively coupled to CDs using wireless technology. In the embodiment of FIG. 128, PD 13604 is communicably coupled to CD 13610 using wireless technology. Wireless technology can include technologies such as Bluetooth, WiFi, cellular communication network or the like. Other custom wireless technologies are also possible. PD 13604 in FIG. 128 is communicatively coupled to CD 13610 using wireless communication—13618. The wireless communication technologies used by a PD in associating with each CD can be different. In the embodiment of FIG. 128, PD 13604 can be communicatively coupled to CD 13610 using Bluetooth technology.

It is to be noted that the embodiment illustrated in FIG. 128 is meant to illustrate the communication modes and association among a GD, PDs and CDs. Other embodiments can have a different number of PDs and/or different number of CDs. Some embodiments can allow only for wired connectivity, while some others can allow for wireless only connectivity. Other embodiments can choose to have PDs and/or CDs that are different from the ones illustrated herein, and the illustration associated with FIG. 128 is not meant to be limiting the scope of the invention or any of its embodiments.

FIG. 129 illustrates a system of connectivity and association among GDs, PDs and CDs according to yet another embodiment of the present invention. The embodiment of FIG. 129 includes a GD 13652, GD 13662, PD 13654, PD 13664, CD 13656, CD 13658, and CD 13666. Each of GD 13652 and GD 13662 can include any of the embodiments of GD illustrated in FIG. 3A (GD 302), FIG. 3B (GD 340), FIG. 3C (GD 360), FIG. 95 (GD 9502), FIG. 98 (GD 9802), FIG. 115 (GD 11502), FIG. 116 (GD 11602), FIG. 117 (GD 11702), or the like. PD 13654 and PD 13664 can each include any of the embodiments illustrated in FIG. 2A (PD 202), FIG. 2B (PD 240), FIG. 2C (PD 260), or the like. CDs 13656, 13658, and 13666 can include any of the embodiments illustrated in FIG. 1A (CD 102), FIG. 1B (CD 140), FIG. 1D (CD 166), FIG. 1E (CD 170), FIG. 1C (CD 172), or the like. It is to be noted that the embodiments of GD, PD and CD illustrated for use in FIG. 129 is specific to the related embodiments. Other embodiments can have GDs, CDs or PDs that are different from the embodiments illustrated herein. The illustration of FIG. 129 is not meant to be limiting the scope of the invention or any of its embodiments. In the embodiment of FIG. 129, each GD can be associated with zero or more PDs, each PD can be associated with zero or more CDs, and each CD can be associated with zero or more PDs. The association among embodiments of GDs, PDs and CDs can use various forms of communication that can include wired and/or wireless communication. Each CD can be processing tags provided by PDs that the CD can be associated with.

In one embodiment of FIG. 129, a CD can be only be associated with PDs that are associated with a GD. This can be used where CD can be associated with PDs that can generate tags. A PD can generate tags when it is associated with a GD in such embodiments.

GD 13652 and GD 13662 are associated with PDs in the system using various forms of connectivity that can include wired and wireless connectivity. GD 13652 is communicatively coupled to PD 13654 using 13668—a wired form of connectivity. Wired forms of connectivity can include various technologies Ethernet, firewire, cable modem interface, USB or the like. Other custom forms of connectivity are also possible. Each PD associated to a GD can use a different technology for communication. A GD can be communicatively coupled to PDs using wireless technology. Wireless technology can include technologies such as Bluetooth, WiFi, cellular communication network or the like. Other custom wireless technologies are also possible. GD 13662 in FIG. 129 is communicatively coupled to PD 13664 using 13670—a wireless form of communication. The wireless communication technologies used by a GD in associating with each PD can be different. In the embodiment of FIG. 129, GD 13662 can be communicatively coupled to PD 13664 using Bluetooth technology.

Each CD—CD 13656, CD 13658 and CD 13666 can be associated with PDs in the system using various forms of connectivity—that can include wired and wireless connectivity. Each CD can be associated with more than one PD in the system. CD 13658 in system of FIG. 129 is associated with PDs 13654 and 13664. When a CD is associated with a multiple of PDs, the CD can be associated with each PD using communication technologies that can included wired and/or wireless. Wired forms of communication can include various technologies such as Ethernet, firewire, cable modem interface, USB or the like. Wireless technology can include technologies such as Bluetooth, WiFi, cellular communication network or the like. Other custom technologies are also possible. In the embodiment of FIG. 129, CD 13658 is associated with PD 13654 using wifi technology, while CD 13658 is associated with PD 13664 using Bluetooth technology. While it is not illustrated, CD 13658 can also be associated with PDs using wired forms of communication.

In the embodiment of FIG. 129, CD 13656 is associated with PD 13654 using wired communication—13672, and CD 13666 is associated with PPD 13664 using wired communication. Each of the wired communications—13672 and 13678 can include technologies such as Ethernet, firewire, cable modem interface, USB or the like. Other custom technologies are also possible.

It is to be noted that while the CDs illustrated in FIG. 129 is associated with one or two PDs, other embodiments can have CDs that can be associated with more or less PDs, the association with each PD can use one of several forms of communication—that can include wired and/or wireless technologies.

When a CD is associated with more than one PD, the CD can be processing tags provided by each associated PD. In the embodiment of FIG. 129, CD 13658 can process tags provided by PD 13654 and PD 13664. When a CD is associated with one PD, the CD can be processing tags provided by the associated PD. In the embodiment of FIG. 129, CD 13656 can process tags provided by PD 13654, while CD 13666 can process tags provided by PD 13664. In some embodiments, instances of CD not associated with any PDs do not process any tags.

While a CD is associated with, and processing tags provided by some PDs, the CD can detect and associate with more PDs. Once the CD is associated with more PDs, the CD can start processing tags from the newly associated PDs. In the embodiment of FIG. 129, CD 13656 can be processing tags provided by PD 13654. While CD 13656 is associated with, and processing tags provided by PD 13654, CD 13656 can detect and associate with PD 13664. Once the CD is associated with PD 13664, the CD can process tags provided by both PDs—PD 13664 and PD 13654.

While a CD is associated with some PDs, the CD can disassociate with some or all of the PDs. When the CD is disassociated with some PDs, the CD can stop processing tags provided by the disassociated PDs. In the embodiment of FIG. 129, CD 13658 can disassociate with PD 13654. Once CD 13658 is disassociated with PD 13654, CD 13658 can stop processing tags provided by PD 13654.

In yet other embodiments, CDs can associate with PDs that are associated with GDs.

It is to be noted that the embodiment illustrated in FIG. 129 is meant to illustrate the communication modes and association among GDs, PDs and CDs. Other embodiments can have a different number of PDs and/or different number of CDs and/or different number of GDs. Some embodiments can allow only for wired connectivity, while some others can allow for only wireless connectivity. Yet other embodiments can allow for a PD to be associated with more than one GD. Other embodiments can choose to have PDs and/or CDs and/or GDs that are different from the ones illustrated herein, and the illustration associated with FIG. 129 is not meant to be limiting the scope of the invention or any of its embodiments.

FIG. 130 illustrates a system consisting of a GenProvider device (GPD) and association of GPD with CDs according to an embodiment of the present invention. A GPD, as illustrated in this embodiment, includes functionality associated with a GD and a PD. The PD aspect of GPD is associated with GD aspect of GPD. The association between the PD and GD aspects of GPD, in the GPD can be implemented using a variety of mechanisms. PD can be associated to GD using communication channels that can be implemented using a variety of mechanisms that can include—wired communication, wireless communication, logic circuits, software based communication, other custom methods, or the like. Wired communication can include technologies such as Ethernet, usb, or the like. Wireless communication can include technologies such as Bluetooth, wifi, or the like. Communication between aspects of GD and PD in GPD, can also be implemented in hardware and/or firmware using logic circuits or any other hardware mechanisms. When some/all aspects of GD and PD are implemented using software, the communication between aspects of GD and PD can include software based mechanisms such as function calls from GD to PD and vice versa, or the like. Other communication methods are possible in various embodiments.

Each CD—CD 13704 and CD 13706 can be associated with GPD in the system using various forms of connectivity—that can include wired and wireless connectivity. Each CD can be associated with more than one GPD in the system (not shown). When a CD is associated with a multiple of GPDs, the CD can be associated with each GPD using communication technologies that can include wired and/or wireless communication. Wired forms of communication can include various technologies such as Ethernet, firewire, cable modem interface, USB or the like. Wireless technology can include technologies such as Bluetooth, WiFi, cellular communication network or the like. Other custom technologies are also possible.

In the embodiment of FIG. 130, CD 13704 is associated with GPD 13702 using wired communication—13708. Wired communications 13708 can include technologies such as Ethernet, firewire, cable modem interface, USB or the like. Other custom technologies are also possible.

In the embodiment of FIG. 130, CD 13706 is associated with GPD 13702 using wireless communication—13710. Wireless communications 13710 can include technologies such as Bluetooth, WiFi, cellular communication network or the like. Other custom technologies are also possible.

When a CD is associated with more than one GPD, the CD can be processing tags provided by each associated GPD. When a CD is associated with one GPD, the CD can be processing tags provided by the associated GPD. In some embodiments, instances of CD not associated with any GPDs do not process tags provided by GPDs.

While a CD is associated with, and processing tags provided by some GPDs, the CD can detect and associate with more GPDs. Once the CD is associated with more GPDs, the CD can start processing tags provided by the newly associated GPDs. A CD in such case can process tags from some/all of GPDs that the CD is associated with.

While a CD is associated with some GPDs, the CD can disassociate with some or all of the GPDs. When the CD is disassociated with some GPDs, the CD can stop processing tags provided by the disassociated GPDs.

It is to be noted that the embodiment illustrated in FIG. 130 is meant to illustrate the communication modes and association among GPDs, and CDs. Other embodiments can have a different number of GPDs and/or different number of CDs. Some embodiments can allow only for wired connectivity, while some others can allow for only wireless connectivity, while others can allow a mix of wired and wireless communication.

In yet other embodiments, the system can include a mix of CDs, GPDs, GDs and, PDs. In such embodiments, a CD can associate with GPDs and/or PDs. The CD can process tags provided by the GPDs and/or PDs that the CD is associated with.

Other embodiments can choose to have GPDs and/or CDs that are different from the ones illustrated herein, and the illustration associated with FIG. 130 is not meant to be limiting the scope of the invention or any of its embodiments.

FIG. 131 illustrates a GenProvCons device (GPCD) according to an embodiment of the present invention. In the embodiment of FIG. 131, GPCD 13802 includes functionality associated with a GD, PD and CD. Aspects of GD, PD and CD can be implemented using a combination of hardware, firmware and software. The association and communication between aspects of GD and PD of GPCD; aspects of PD and CD of GPCD can be implemented using a variety of mechanisms that can be specific to the embodiment. Mechanisms can include—wired communication, wireless communication, logic circuits, software based communication, other custom methods, or the like. Wired communication can include technologies such as Ethernet, usb, or the like. Wireless communication can include technologies such as Bluetooth, wifi, or the like. Communication between aspects of GD and PD in GPCD, PD and CD in GPCD can also be implemented in hardware and/or firmware using logic circuits or any other hardware mechanisms. When some/all aspects of GD, PD and CD are implemented using software, the communication between aspects of GD and PD; aspects of PD and CD can include mechanisms specific to software based communication such as function calls or the like. Other methods of communication are also possible.

CD 140, PD 240 and GD 302 can be realized in a variety of devices having varying form factors, components, and connections. FIG. 1-7 illustrate a few of the many possible configurations.

In FIG. 133, Plug computer 14104 embodies aspects of PD 240, set top box 14106 embodies aspects of GD 302 and portable media device (PMD) 14102 embodies aspects of CD 140.

PMD 14102 can connect to plug computer 14104 via cable 14112. In this embodiment, PMD 14102 includes connector 14138 adapted to connect to one end 14140 of cable 14112, while plug computer 14104 includes connector 14136 adapted to connect to the other end 14134 of cable 14112. Connectors 14138 and 14136 might or might not have the same form factor, number of pins, etc. For example, connector 14138 can be a 30-pin connector such as is used on iPod media players while connector 14136 can be a Universal Serial Bus ("USB") or firewire connector or other standard or custom connector. In still other embodiments, PMD 14102 and plug computer 14104 can each include a wireless interface (e.g., Bluetooth) allowing PMD 14102 and plug computer 14104 to communicate with each other without a physical connection.

Plug computer (PC) 14104 can connect to set top box (STB) 14106 via cable 14114. In this embodiment, PC 14104 includes connector 14130 adapted to connect to one end 14132 of cable 14114, while STB 14106 includes connector 14128 to connect to other end 14126 of cable 14114. Connectors 14130 and 14128 might or might not have the same form factor, number of pins, etc. For example connector 14130 can be a Universal Serial Bus ("USB"), and connector 14128 can be firewire connector or other standard or custom connector. In still other embodiments, PC 14104 and STB 14106 can each include a wireless interface (e.g., WiFi or Bluetooth) allowing PC 14104 and STB 14106 to communicate with each other without a physical connection.

STB 14106 can connect to a media player such as a television set (TV) 14108 via cable 14116. In this embodiment STB includes connector 14118 adapted to connect to one end 14120 of cable 14116, while TV 14108 includes connector 14124 adapted to connect to other end 14122 of cable 14116. Connectors 14118 and 14122 might or might not have the same form factor, number of pins, etc. For example connector 14118 can be a High-Definition Multimedia Interface (HDMI) connector, and connector 14124 can be a RCA connector (also called as phono connector or cinch connector), or other standard or custom connector. In still other embodiments, STB 14106 and TV 14108 can each include a wireless interface such as those supporting IEEE 802.15.3 Wireless Personal Area Network (WPAN) or any other custom wireless interface that can allow STB 14106 and TV 14108 to communicate with each other without a physical connection.

STB 14106 can be associated with an antenna 14148 that can allow STB 14106 in receiving media broadcasts. An example of such embodiment includes a dish antenna such as those supported by Dish Networks, Direct TV, or the like, in providing video services (including any others). In some embodiments, STB 14106 can include a cable that delivers media broadcasts to STB 14106. An example of such embodiment includes media delivered by cable such as the ones delivered by Comcast Inc.

PMD 14102 can include a connector 14144 adapted to connect to one end 14142 of cable 14146. Cable 14146 can allow for PMD 14102 to communicate with entities (e.g, computers, servers, media players, portable media devices, routers, switches, firewalls, or the like) in network 14110. Network 14110 can include a network of entities such as the internet. In some embodiments, cable 14146 can be an Ethernet cable. In other embodiments, PMD 14102 can include a wireless interface (eg., 802.11b, Wifi, Bluetooth, etc.) that can allow PMD 14102 to communicate with entities in a network without a physical connection.

FIG. 134 illustrates another configuration in which PMD 14202 can be connected to STB 14204 using cable 14206. In this embodiment, STB 14204 embodies aspects of PD 240 and GD 302. Aspects of PD 240 are illustrated by PD 14208 of STB 14204. In such embodiment, aspects of PD 14208 can communicate with aspects of STB 14204 using connectivity and/or interfaces that can be standard (such as PCIe, Ethernet, USB, etc.) or custom. In some embodiments, aspects of communication between aspects of PD 14208 and other aspects of STB 14204 can be implemented using software. PMD 14202 and STB 14204 can each include a wireless interface (e.g., Wifi) allowing PMD 14202 and STB 14204 to communicate with each other without a physical connection.

STB 14204 can be associated with antenna 14210 that can allow STB 14204 in receiving media broadcasts. An example of such embodiment includes a dish antenna such as those supported by Dish Networks, Direct TV, or the like, in providing video services (including any others). In some embodiments, STB 14204 can include a cable that delivers media broadcasts to STB 14204. An example of such embodiment includes media delivered by cable such as the ones delivered by Comcast Inc.

STB 14204 can connect to a media player such as a television set (TV) 14216 via cable 14212 using standard and/or custom interfaces. In other embodiments, STB 14204 and TV 14216 can each include a wireless interface such as those supporting IEEE 802.15.3 Wireless Personal Area Network (WPAN) or any other custom wireless interface that can allow STB 14204 and TV 14216 to communicate with each other without a physical connection.

PMD 14202 can also be associated with cable 14214 can allow for PMD 14202 to communicate with entities (e.g, computers, servers, media players, portable media devices, routers, switches, firewalls, or the like) in network 14210. Network 14210 can include a network of entities such as the internet. In some embodiments, cable 14214 can be an Ethernet cable. In other embodiments, PMD 14202 can include a wireless interface (eg., 802.11b, Wifi, Bluetooth, etc.) that can allow PMD 14202 to communicate with entities in a network without a physical connection.

FIG. 91 illustrates a yet another configuration, in which PMD 14302 embodies aspects of CD 140, plug computer 14304 embodies aspects of PD 240, and television (TV) set 14306 embodies aspects of GD 302 and a television/media player.

PMD 14302 can connect to plug computer 14304 via cable 14314. In some embodiments, PMD 14302 and plug computer 14304 can each include a wireless interface (e.g., Bluetooth) allowing PMD 14302 and plug computer 14304 to communicate with each other without a physical connection.

PMD 14302 can also be associated with cable 14316 can allow for PMD 14302 to communicate with entities (e.g, computers, servers, media players, portable media devices, routers, switches, firewalls, or the like) in network 14318. Network 14318 can include a network of entities such as the internet. In some embodiments, cable 14316 can be an Ethernet cable. In other embodiments, PMD 14302 can include a wireless interface (eg., 802.11b, Wifi, Bluetooth, etc.) that can allow PMD 14302 to communicate with entities in a network without a physical connection.

Plug computer (PC) 14304 can be connected to TV 14306 via cable 14312. GD 14308 of TV 14306 can also communicate with PC 14304 using cable 14312. In some embodiments, PC 14304 and TV 14306 can each include a wireless interface (e.g., Bluetooth, Wifi, etc.) that can allow PC 14304 and TV 14306 to communicate with each other without a physical connection.

TV 14306 embodies aspects of GD 302 as illustrated by GD 14308 of TV 14306. In this embodiment, aspects of GD 14308 can communicate with media playing aspects of TV 14306 using connectivity and/or interfaces that can be standard (such as PCIe, Ethernet, USB, etc.) or custom. Such interfaces and/or connectivity can be internal to TV 14306. In other embodiments, aspects of communication between aspects of GD 14308 and other aspects of TV 14306 can be implemented using software.

TV 14306 can be associated with antenna 14310 that can allow TV 14306 in receiving media broadcasts. An example of such embodiment includes a dish antenna such as those supported by Dish Networks, Direct TV, or the like, in providing video services (including any others). In some embodiments, TV 14306 can include a cable that delivers media broadcasts to TV 14306. An example of such embodiment includes media delivered by cable such as the ones delivered by Comcast Inc. GD 14308 of TV 14306 can receive media broadcasts as captured by antenna 14310. GD 14308 can extract content from captured broadcasts and communicate the content to media playing aspects of TV 14306. Tag related information extracted from captured media broadcasts can be communicated by GD 14308 to PC 14304 using cable 14312.

FIG. 92 illustrates a yet another configuration wherein, PMD 14402 includes aspects associated with CD 140 and PD 240, including others. Television (TV) 14406 embodies aspects associated with GD 302, and aspects associated with a television set such as a display, audio controls, video controls, or the like.

PMD 14402 can be connected to TV 14406 via cable 14412. Aspects of TV 14406 can communicate with aspects of PMD 14402 using cable 14412. GD 14408 of TV 14406 can communicate with PD 14404 of PMD 14402 using cable 14412. In some embodiments, PMD 14402 and TV 14406 can each include a wireless interface (e.g., Bluetooth, Wifi, etc.) that can allow aspects of PMD 14402 and aspects of TV 14406 to communicate with each other without a physical connection.

TV 14406 embodies aspects of GD 302 as illustrated by GD 14408 of TV 14406. In this embodiment, aspects of GD 14408 can communicate with media playing aspects of TV 14406 using connectivity and/or interfaces that can be standard (such as PCIe, Ethernet, USB, etc.) or custom. Such interfaces and/or connectivity can be internal to TV 14406. In other embodiments, aspects of communication between aspects of GD 14408 and other aspects of TV 14406 can be implemented using software.

TV 14406 can be associated with antenna 14410 that can allow TV 14406 in receiving media broadcasts. An example of such embodiment includes a dish antenna such as those supported by Dish Networks, Direct TV, or the like, in providing video services (including any others). In some embodiments, TV 14406 can include a cable that delivers media broadcasts to TV 14406. An example of such embodiment includes media delivered by cable such as the ones delivered by Comcast Inc. GD 14408 of TV 14406 can receive media broadcasts as captured by antenna 14410. GD 14408 can extract content from captured broadcasts and communicate the content to media playing aspects of TV 14406. Tag related information extracted from captured media broadcasts can be communicated by GD 14408 to PD 14404 of PMD 14402 using cable 14412.

PMD 14402 embodies aspects of PD 240 as illustrated by PD 14404 of PMD 14402. In this embodiment, aspects of PD 14404 can communicate with other aspects of PMD 14402 (such as user interfaces, services [e.g., telephony] associated with PMD, aspects associated with communication to entities outside of PMD, or the like) using connectivity and/or interfaces that can be standard (such as PCIe, Ethernet, USB, etc) or custom. Such interfaces and/or connectivity can be internal to PMD 14402. In other embodiments, aspects of communication between aspects of PD 14404 and other aspects of PMD 14402 can be implemented using software.

PD 14404 of PMD 14402 can receive tag related information from GD 14408 of TV 14406 using cable 14412. PD 14404 can provide tags associated with information generated by GD 14408, to aspects of PMD 14402. Aspects of PMD 14402 that can receive the tags can relate to selection, determination, downloads, launching, and other aspects of applications. Other aspects of PMD 14402 can also receive tags provided by PD 14404 of PMD 14402. In some embodiments, aspects of PMD 14402 that can receive the tags provided by PD 14404 can be changing (or different) based on mechanisms that can be specific to the embodiment. When some aspects of PD 14404 and PMD 14402 are implemented using software, aspects of PMD 14402 receiving the tags provided by PD 14404 can be determined by means of registration mechanisms that can be specific to a software implementation.

PMD 14402 can also be associated with cable 14414 can allow for PMD 14402 to communicate with entities (e.g., computers, servers, media players, portable media devices, routers, switches, firewalls, or the like) in network 14418. Network 14418 can include a network of entities such as the internet. In some embodiments, cable 14414 can be an Ethernet cable. In other embodiments, PMD 14402 can include a wireless interface (eg., 802.11b, Wifi, Bluetooth, etc.) that can allow PMD 14402 to communicate with entities in a network without a physical connection.

FIG. 93 illustrates yet another configuration wherein television (TV) set 14502 can include aspects associated with CD 140, PD 240, GD 302, media related aspects associated with television sets such as a video display, audio devices, audio/video controls, including others. GD 14504 of TV 14502 embodies aspects associated with GD 302, PD 14506 of TV 14502 embodies aspects associated with PD 240, and CD 14508 embodies aspects associated with CD 140.

TV 14502 can be associated with antenna 14512 that can allow TV 14502 in receiving media broadcasts. An example of such embodiment includes a dish antenna such as those supported by Dish Networks, Direct TV, or the like, in providing video services (including any others). In some embodiments, TV 14502 can include a cable that delivers media broadcasts to TV 14502. An example of such embodiment includes media delivered by cable such as the ones delivered by Comcast Inc. GD 14504 of TV 14502 can receive media broadcasts as captured by antenna 14512. GD 14504 can extract content from captured broadcasts and communicate the content to media playing aspects of TV 14502. Tag related information extracted from captured media broadcasts can be communicated by GD 14504 to PD 14506.

PD 14506 can provide tags using information generated by GD 14504. The tags provided by PD 14506 can be received by CD 14508 of TV 14502. Aspects of CD 14508 that can receive the tags can relate to selection, determination, downloads, launching, and other aspects of applications. Other aspects of CD 14508 can also receive tags provided by PD 14506. In some embodiments, aspects of CD 14508 that can receive the tags provided by PD 14506 can be changing (or different) based on mechanisms that can be specific to the embodiment. When some aspects of PD 14506 and CD 14508 are implemented using software, aspects of CD 14508 receiving the tags provided by PD 14506 can be determined by means of registration mechanisms that can be specific to a software implementation.

GD 14504 can communicate tag related information to PD 14506 using interfaces and connectivity that can be specific to the embodiment. In some embodiments, the connectivity can be provided by interfaces that can be standard (such as PCIe, Ethernet, USB, etc) or custom. Such interfaces and/or connectivity can be internal to TV 14502. In other embodiments, aspects of communication between aspects of GD 14504 and PD 14506 can be implemented using software.

PD 14506 can provide tags CD 14508 using interfaces and connectivity that can be specific to the embodiment. In some embodiments, the connectivity can be provided by interfaces that can be standard (such as PCIe, Ethernet, USB, etc) or custom. Such interfaces and/or connectivity can be internal to TV 14502. In other embodiments, aspects of communication between aspects of CD 14508 and PD 14506 can be implemented using software.

TV 14502 can also be associated with cable 14510 can allow for TV 14502 to communicate with entities (e.g., computers, servers, media players, portable media devices, routers, switches, firewalls, or the like) in network 14514. Network 14514 can include a network of entities such as the internet. In some embodiments, cable 14510 can be an Ethernet cable. In other embodiments, TV 14502 can include a wireless interface (eg., 802.11b, Wifi, Bluetooth, etc.) that can allow TV 14502 to communicate with entities in a network without a physical connection.

In this embodiment, aspects of user interface related to CD 14508 can be associated with audio/video controls of TV 14502. User input for CD 14508 can be associated with user controls of TV 14502. User controls of TV 14502 can be located physically on TV 14502 (not shown) or be associated with a remote device. The remote device can communicate with TV 14502 using a variety of communication technologies that can include one or more of RF, WiFi, or the like.

FIG. 94 illustrates yet another configuration wherein a television (TV) set 14602 is used in association with a set top box (STB) 14604. TV 14602 is associated with aspects related to a television set such as a video display, audio/video controls, or the like. STB 14604 can be associated with aspects of CD 140, PD 240 and GD 302. GD 14606 of STB 14604 embodies aspects associated with GD 302, PD 14608 of STB 14604 embodies aspects associated with PD 240, and CD 14610 embodies aspects associated with CD 140.

STB 14604 can be associated with antenna 14612 that can allow STB 14604 in receiving media broadcasts. An example of such embodiment includes a dish antenna such as those supported by Dish Networks, Direct TV, or the like, in providing video services (including any others). In some embodiments, STB 14604 can include a cable that delivers media broadcasts to STB 14604. An example of such embodiment includes media delivered by cable such as the ones delivered by Comcast Inc. GD 14606 of STB 14604 can receive media broadcasts as captured by antenna 14612. GD 14606 can extract content from captured broadcasts and communicate the content to TV 14602. Tag related information extracted from captured media broadcasts can be communicated by GD 14606 to PD 14608.

PD 14608 can provide tags using information generated by GD 14606. The tags provided by PD 14608 can be received by CD 14610 of STB 14604. Aspects of CD 14610 that can receive the tags can relate to selection, determination, downloads, launching, and other aspects of applications. Other aspects of CD 14610 can also receive tags provided by PD 14608. In some embodiments, aspects of CD 14610 that can receive the tags provided by PD 14608 can be changing (or different) based on mechanisms that can be specific to the embodiment. When some aspects of PD 14608 and CD 14610 are implemented using software, aspects of CD 14610 receiving the tags provided by PD 14608 can be determined by means of registration mechanisms that can be specific to a software implementation.

GD 14606 can communicate tag related information to PD 14608 using interfaces and connectivity that can be specific to the embodiment. In some embodiments, the connectivity can be provided by interfaces that can be standard (such as PCIe, Ethernet, USB, etc) or custom. Such interfaces and/or connectivity can be internal to STB 14604.

In other embodiments, aspects of communication between aspects of GD 14606 and PD 14608 can be implemented using software.

PD 14608 can provide tags CD 14610 using interfaces and connectivity that can be specific to the embodiment. In some embodiments, the connectivity can be provided by interfaces that can be standard (such as PCIe, Ethernet, USB, etc) or custom. Such interfaces and/or connectivity can be internal to STB 14604. In other embodiments, aspects of communication between aspects of CD 14610 and PD 14608 can be implemented using software.

STB 14604 can also be associated with cable 14614 can allow for STB 14604 to communicate with entities (e.g, computers, servers, media players, portable media devices, routers, switches, firewalls, or the like) in network 14616. Network 14616 can include a network of entities such as the internet. In some embodiments, cable 14614 can be an Ethernet cable. In other embodiments, STB 14604 can include a wireless interface (eg., 802.11b, Wifi, Bluetooth, etc.) that can allow STB 14604 to communicate with entities in a network without a physical connection.

In this embodiment, aspects of user interface related to CD 14610 can be associated with audio/video controls of STB 14604 and/or TV 14602. User input for CD 14610 can be associated with user controls of STB 14604 and/or TV 14602. User controls of STB 14604 can be located physically on STB 14604 (not shown) or be associated with a remote device. The remote device can communicate with STB 14604 using a variety of communication technologies that can include one or more of RF, WiFi, or the like. User controls of TV 14602 can be located physically on TV 14602 (not shown) or be associated with a remote device. The remote device can communicate with TV 14602 using a variety of communication technologies that can include one or more of RF, WiFi, or the like.

Figure 56:
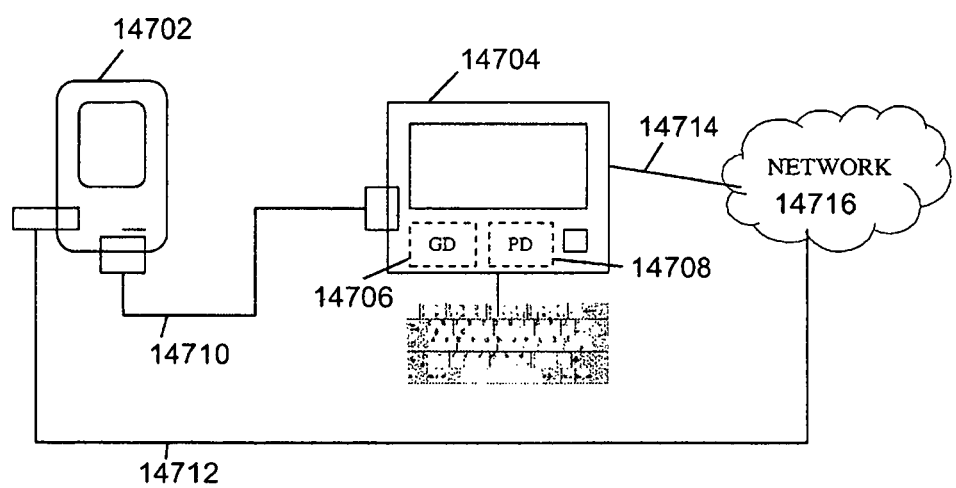
FIG. 56 illustrates a system showing a CD associated with, a computer system that includes aspects associated with a PD and a GD, according to an embodiment of the present invention.

FIG. 56 illustrates another configuration wherein a PMD 14702 embodies aspects of CD 140. Computer system (CS) 14704 embodies aspects associated with PD 240 and GD 302, including other aspects.

GD 14706 of CS 14704 embodies aspects associated with GD 302, while PD 14708 of CS 14704 embodies aspects associated with PD 240. CS 14704 can include aspects that can allow communication with entities in network 14716 using cable 14714. CS 14704 can communicate with network 14716 to access media related content. CS 14704 can be associated with wireless interfaces that can allow CS 14704 to communicate with entities in network 14716 without using a physical connection. Some entities in network 14716 can provide tagged media content that can be accessed by CS 14704. GD 14706 of CS 14704 can retrieve the tag related information associated with tagged media accessed by CS 14704 and provide it to PD 14708. Media extracted by GD 14706 can be used by aspects of CS 14704 in displaying the media using display of CS 14704, output audio using audio devices associated with CS 14704, or the like.

Tags can be provided by PD 14708 to PMD 14702 using cable 14710. In some embodiments, CS 14704 and PMD 14702 can be associated with wireless interfaces (e.g., Bluetooth, Wifi, etc.) that can allow CS 14704 and PMD 14702 to communicate with each other without using a physical connection. Other aspects of CS 14704 and PMD 14702 can also communicate using 14710.

PMD 14702 can also be associated with cable 14712 can allow for PMD 14702 to communicate with entities (e.g, computers, servers, media players, portable media devices, routers, switches, firewalls, or the like) in network 14716. Network 14716 can include a network of entities such as the internet. In some embodiments, cable 14712 can be an Ethernet cable. In other embodiments, PMD 14702 can include a wireless interface (eg., 802.11b, Wifi, Bluetooth, etc.) that can allow PMD 14702 to communicate with entities in a network without a physical connection.

GD 14706 can communicate tag related information to PD 14708 using interfaces and connectivity that can be specific to the embodiment. In some embodiments, the connectivity can be provided by interfaces that can be standard (such as PCIe, Ethernet, USB, etc) or custom. Such interfaces and/or connectivity can be internal to CS 704. In other embodiments, aspects of communication between aspects of GD 14706 and PD 14708 can be implemented using software.

It is to be noted that the methods, apparatus, systems, messages, content/structure of information, and others associated with FIG. 4A-B-21, 22-38, 39A-C, 40A-C, 41-47, 48A-D, 49-55, 57-67, 68A-B, 69A-B, 70A-B, 71A-B, 72A-B, 73A-B, 74A-B, 75A-B, 76A-B, 76C, 77-78, 79A-B, 80-83, 84A-B, 85-86, 90A-B, 112, 126-127, 128-129, 130-131 are used in association with apparatus, methods, information, messages, systems and others, described in other (second, third, fourth) embodiments of the invention described below.

Second Embodiment

The subsequent paragraphs describe another embodiment of the present invention. While the description is with respect to specific embodiments, one skilled in the art will recognize that numerous modifications are possible and elements of different embodiments can be combined and associated with each other as and where necessary.

Structure of Second Embodiment

Figure 95:
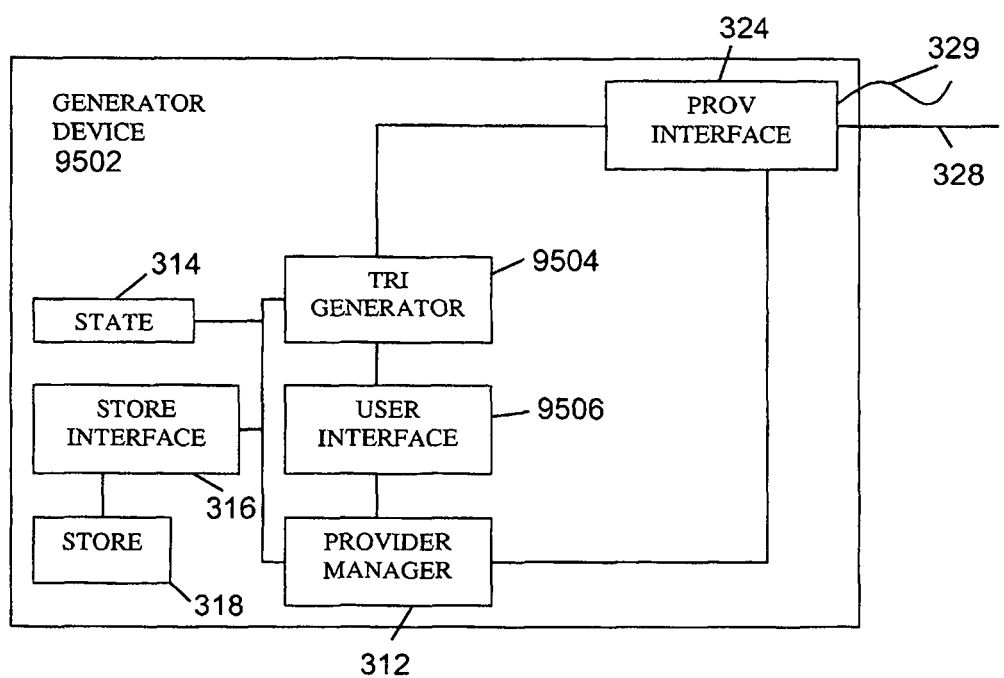
FIG. 95 illustrates a GD for generating tags according to a yet another embodiment of the present invention.

FIG. 95 illustrates a Generator Device (GD) 9502 for generating tag related information according to another exemplary embodiment of the present invention. In the embodiment illustrated in FIG. 95, GD 9502 can include state (STATE) 314, store interface (SI) 316, store (STORE) 318, TRI generator (TGEN) 9504, user interface (UI) 9506, provider manager (PMAN) 312, provider interface (PINT) 324, antenna 328 and network cable 329. Embodiments of GD 9502 can generate tag related information using information retrieved from STORE 318. This can be used in embodiments where tag related information can change infrequently. Examples of such embodiments can include GDs used in store aisles generating tag related information related to groceries located in the aisle. Tag related information generated by the GD can change when the groceries located in the aisle change. Information stored in STORE 318 can be provisioned in one embodiment using UI 9506.

Aspects of GD 9502 such as STATE 314, SI 316, STORE 318, PMAN 312, PINT 324, antenna 328 and cable 329 can be similar to the respective aspects associated with GD 302 illustrated in FIG. 3A.

TGEN 9504 can include any combination of circuitry and/or instructions that can enable GD 9502 in providing tag related information using information stored in STORE 318. In some embodiments, TGEN 9504 can be implemented using software that can retrieve information from STORE 318, and communicate the information to PD 202 instances associated with the GD, once every time interval. In some embodiments, STORE 318 can store more than one instance of tag related information. TGEN 9504 in such embodiments can retrieve all the instances of tag related information from STORE 318. When TGEN 9504 has multiple instances of tag related information, TGEN 9504 can provide one instance of information for a given time interval. TGEN 9504 can provide the second instance of information for the next time interval. Other methods of providing multiple sets of tag related information stored in STORE 318 are possible. For example, a GD located in a store can be providing tag related information related to coffee in morning, while the GD can be providing tag related information related to food at breakfast or lunch time. The number of instances of information stored in STORE 318 and the methods of providing that information to PDs can be specific to each embodiment. TGEN 9504 can use PINT 324 in communicating the generated tag related information to PDs associated with the GD.

UI 9506 can include any combination of circuitry and/or instructions that can allow for storing information or changing information stored in STORE 318. UI 9506 can also allow for changing the rules to be used by TGEN 9504 in communicating the information stored in STORE 318. In some embodiments, UI 9506 can include a hardware aspect such as a touch screen, keyboard, or buttons associated with GD 9502. In some other embodiments, UI 9506 can include software aspect that can allow for interaction in a remote way. For example, UI 9506 can be associated with a web interface that can be accessed using a computer using a network interface (not shown) on GD 9502. UI 9506 can be associated with "burning" the information in STORE 318, when STORE 318 can be implemented using programmable ROMs. Other methods of controlling GD 9502 using different mechanisms related to UI 9506, are possible.

Aspects of STATE 314, SI 316, STORE 318, PMAN 312, PINT 324, TGEN 9504, ui 9506 can be implemented e.g., using instructions of the computer program product executing on one or more suitably configured microprocessors or microcontrollers (not explicitly shown). Other implementations are also possible.

GD 9502 can also include other aspects in addition to or instead of those shown here. For example, an embodiment of GD 9502 can be included in (or associated with) a set top box that can allow for playing DVDs or storing media. The set top box can be playing media, while at the same time providing tag related information to instances of PD.

Operation of Second Embodiment

Figure 96:
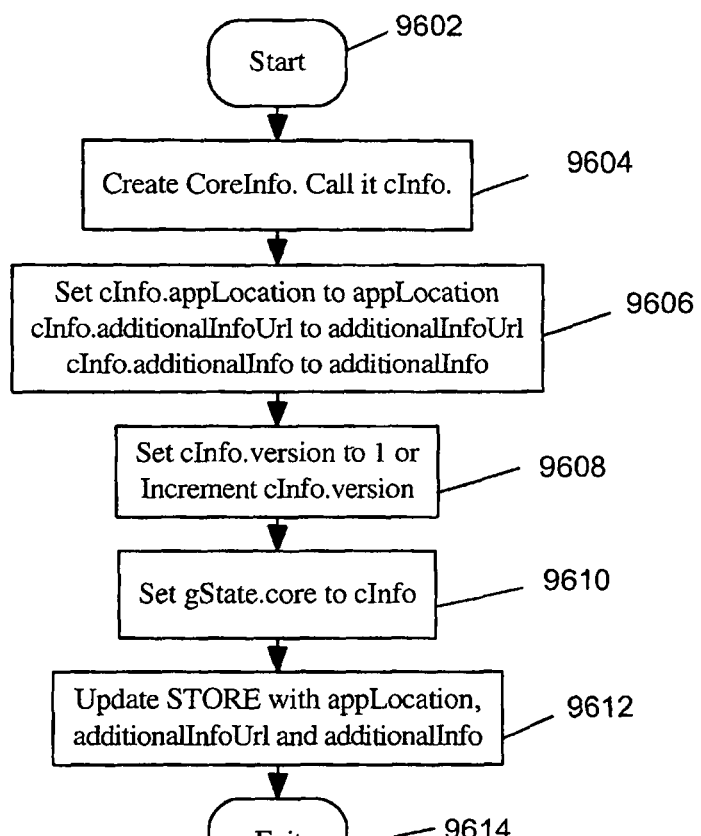
FIG. 96 illustrates the flow diagram of a process followed by a GD in determining TRI, according to an embodiment of the present invention.

FIG. 96 illustrates the flow diagram of a process followed by a GD in determining information that can be included in the tags generated by the GD, according to an embodiment of the present invention. In the embodiment illustrated here, an instance of GD 9502 of FIG. 95 can use the process associated with FIG. 96 in determining the tag related information. The process illustrated in FIG. 96 can be used when information related to tags can be provisioned to GD 9502 using UI 322 or any other provisioning mechanisms. The process can also be used when GD 9502 can start providing tag related information, as when GD 9502 is powered on. In embodiments where GD 9502 can be implemented using software, the process associated with FIG. 95 can be started when the software is launched or running or activated. The method followed in updating tag related information, the information that can be updated by the process, and other methods as illustrated in FIG. 95 are illustrative and meant for use by the embodiment described here. Other methods can choose to include/update information not described here, can choose to exclude some or all of information described here, can use methods not described here, and the process/methods illustrated by FIG. 95 are not meant to be limiting the scope of the invention or any of its embodiments.

The process starts at step 9602 and moves to step 9604. At step 9604, an instance of CRI is created. The created instance is referred to as cInfo for use in subsequent steps of the process. The creation of an instance of CRI can involve allocation of memory, control data structures, state handles, or the like. In some embodiments, the creation of a CRI instance can involve just allocation of memory. In yet other embodiments, the creation of a CRI instance can involve allocating state handles in addition to allocating sufficient memory for the CRI. The process can then move to step 9606.

At step 9606, cInfo.appLocation can be set to appLocation, cInfo.additionalInfoUrl can be set to additionalInfoUrl and cInfo.additionalInfo can be set to additionalInfo appLocation, additionalInfoUrl and additionalInfo can be determined using provisioning mechanisms—such as user input associated with UI 322. In embodiments where the process associated with FIG. 96 is used when GD 9502 starts to provide tags (as when GD is powered on), the information retrieved from STORE 318 using SI 316 can be used. The process can then move to step 9608.

At step 9608, cInfo.version can be set to 1 or incremented. cInfo.version can be incremented if the process associated with FIG. 96 is used as a result of provisioning of new information. cInfo.version can be set to 1 if the process associated with FIG. 96 is used as a result of GD starting up. The process can then move to step 9610. At step 9610, gState.core can be set to cInfo. The process can then move to step 9612. At step 9612, information associated with appLocation, additionalInfoUrl and additionalInfo can be stored in STORE 318 using SI 316. This can be needed if the process associated with FIG. 96 is used in association with a provisioning mechanism that can involve UI 322 of GD 9502. The process can then move to step 9614. Step 9614 indicates that the process associated with FIG. 96 is complete.

In one embodiment that can use GD 9502, information related to tags can be provided by GD to instances of PD associated with the GD, upon expiry of a time interval. GD can provide tag related information to PDs associated with the GD once every time interval. In other embodiments other events can be used by GD in providing tag related information to instances of PD.

System of Second Embodiment

Figure 97:
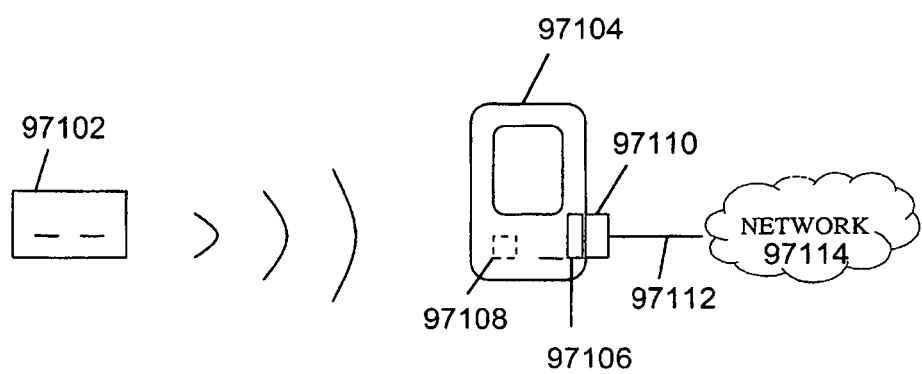
FIG. 97 illustrates a system showing the usage of GD, and a CD that includes aspects associated with a PD, according to an embodiment of the present invention.

FIG. 97 illustrates an embodiment of a system wherein a plug computer (PC) 97102 is used to generate tag related information that can be received by a portable media device (PMD) 97104. PC 97102 embodies aspects of GD 9502, while PMD 97104 embodies aspects of CD 140, PD 240, including others. System illustrated in FIG. 97 can be associated with static embodiments wherein information generated by PC 97102 is relatively static. Examples of such embodiments can include GDs used in store aisles generating tag related information related to groceries located in the aisle. Tag related information generated by the GD can change when the groceries located in the aisle change. It is to be noted that while the system illustrated in FIG. 97 demonstrates the use of one GD, and one PMD, other embodiments can have a different number of instances of each of these devices. For example, tag related information generated by a GD in an aisle can be received by more than one instance of PMD in the aisle. In other embodiment, a PMD can be receiving tag related information from more than one GD. The number of instances of each devices, their association and communication illustrated in FIG. 97 is illustrative only and is not meant to limit the scope of the invention or any of its embodiments.

PC 97102 and PMD 97104 include wireless interfaces that can allow aspects of PC 97102 and PMD 97104 in communicating with each other. The wireless interfaces can be used by PC 97102 in communicating tag related information generated by the PC. In other embodiments, PC and PMD can be associated with connectors that can allow using a cable plugged into the connectors of PC and PMD in order to have aspects of PC and PMD communicate with each other. In the embodiment illustrated here, the wireless connectivity can be used by PD 97108 of PMD 97104 in receiving tag related information.

PMD 97104 can include aspects of PD 240 as illustrated by PD 97108 of PMD 97104. PD 97108 can receive tag related information communicated by PC 97102 and provide tags to aspects of PMD 97104. Aspects of PMD 97104 that can receive the tags can relate to selection, determination, downloads, launching, and other aspects of applications. Other aspects of PMD 97104 can also receive tags provided by PD 97108 of PMD 97104. In some embodiments, aspects of PMD 97104 that can receive the tags provided by PD 97108 can be changing (or different) based on mechanisms that can be specific to the embodiment. When some aspects of PD 97108 and PMD 97104 are implemented using software, aspects of PMD 97104 receiving the tags provided by PD 97108 can be determined by means of registration mechanisms that can be specific to a software implementation.

PMD 97104 can include a connector 97106 adapted to connect to one end 97110 of cable 97112. Cable 97112 can allow for PMD 97104 to communicate with entities (e.g, computers, servers, media players, portable media devices, routers, switches, firewalls, or the like) in network 97114. Network 97114 can include a network of entities such as the internet. In some embodiments, cable 97146 can be an Ethernet cable. In other embodiments, PMD 97104 can include a wireless interface (eg., 802.11b, Wifi, Bluetooth, etc.) that can allow PMD 97104 to communicate with entities in a network without a physical connection.

Third Embodiment

The subsequent paragraphs describe another embodiment of the present invention. While the description is with respect to specific embodiments, one skilled in the art will recognize that numerous modifications are possible and elements of different embodiments can be combined and associated with each other as and where necessary.

Structure of Third Embodiment

Figure 98:
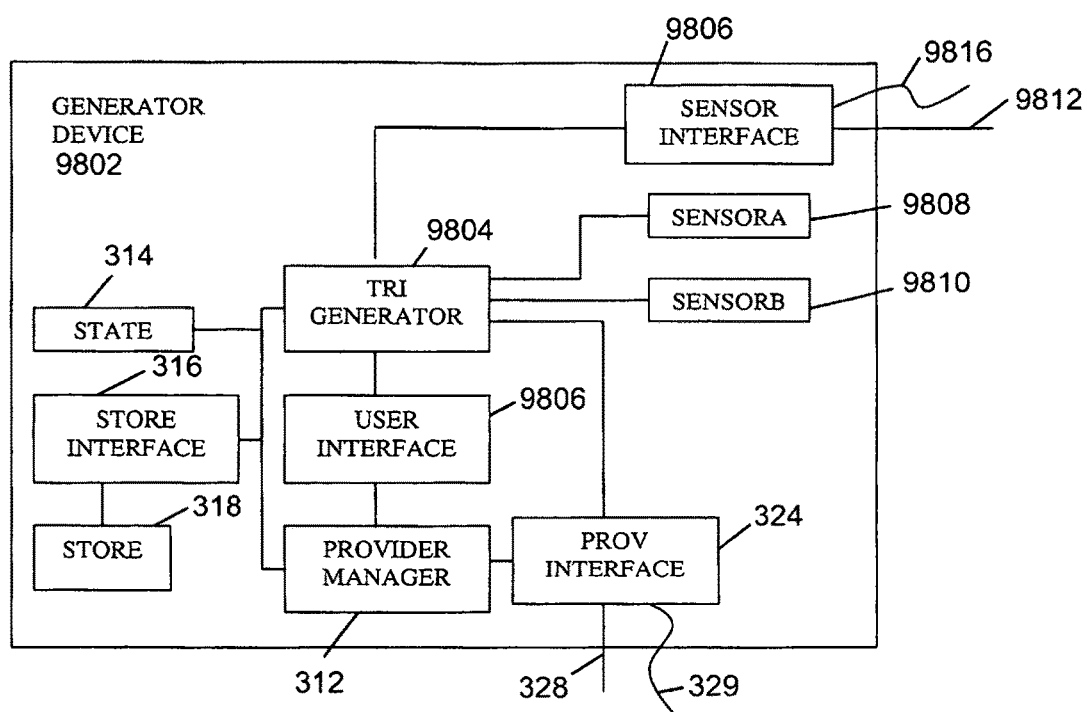
FIG. 98 illustrates a GD for generating TRIs according to a yet another embodiment of the present invention.

FIG. 98 illustrates a Generator Device (GD) 9802 for generating tag related information according to an embodiment of the present invention. In the embodiment illustrated in FIG. 98, GD 9802 can include state (STATE) 314, store interface (SI) 316, store (STORE) 318, TRI generator (TGEN) 9804, user interface (UI) 9818, provider manager (PMAN) 312, provider interface (PINT) 324, antenna 328, network cable 329, sensor a (SENA) 9808, sensor b (SENB) 9810 and sensor interface (SINT) 9806. GD 9802 can be used in some embodiments to generate tag related information using information provided by one or more sensors. In some embodiments, tag related information can include information generated by sensors such as the ones generated by temperature sensors, acceleration sensors, orientation sensors or the like.

Sensors that can be used by GD 9802 to generate tag related information can include hardware based sensors such as acceleration sensor, orientation sensor, temperature sensor or the like, wherein one or more of components can interact to generate data related to the functionality of the sensor.

Sensors that GD 9802 can retrieve data from can also include those that generate data using systems that can be a combination of one or more of hardware, firmware and software. An example of such a sensor is a parking lot sensor that can generate data related to availability of spaces in a parking lot. The parking lot sensor can generate data using video/web cameras that take pictures of parking lot at regular intervals. The parking lot sensor can also be associated with a software aspect that can identify spaces in parking lot that are free, by processing the pictures taken by the camera(s).

Sensors can be associated physically with GD 9802 as illustrated by SENA 9808 and SENB 9810. These sensors are referred to as local sensors herein. Sensors can be located outside of GD 9802 (remotely) and be communicably coupled to GD 9802 using one or more sensor interfaces, such as the one illustrated by SINT 9806. Such sensors are referred to herein, as remote sensors. An embodiment of GD 9802 can be associated with sensors or sensor interfaces different in number, than the number illustrated in FIG. 98. Some embodiments may not have any local sensors, while some can have more number of sensors interfaces (more than one). Other configurations are also possible.

Aspects of GD 9802 such as STATE 314, SI 316, STORE 318, PMAN 312, PINT 324, antenna 328 and cable 329 can be similar to the respective aspects associated with GD 302 of FIG. 3A.

TGEN 9804 can include any combination of circuitry and/or instructions that can be used to generate tag related information using data retrieved from sensors. TGEN 9804 can communicate with local sensors such as SENA 9808 and SENB 9810 using mechanisms that can be specific to the sensor and/or the embodiment of GD. In some embodiments, TGEN 9804 can retrieve information available from sensors like temperature sensors, acceleration sensors, orientation sensors, etc. using inter-integrated circuit or SMBus protocols. Inter-integrated circuit and SMBus are serial buses that can allow communication between one or more entities using a defined protocol. TGEN 9804 can retrieve information available from sensors using other mechanisms. TGEN 9804 can communicate with remote sensors using SINT 9806. The method of retrieving data from remote sensors can be specific to the embodiment of SINT 9806, and/or embodiment of remote sensor and/or embodiment of GD 9802. In some embodiments aspects of SINT 9806 can be implemented using software interfaces such as API, CORBA, RPC, or the like. In such embodiments, aspects of TGEN 9804 that involve communication with SINT 9806, can be implemented in software. In such embodiments, TGEN 9804 can retrieve data provided by remote sensors by having communication related aspects of TGEN 9804 make a function call into the software associated with SINT 9806. For example, SINT 9806 associated with parking lot sensor can provide software based mechanisms (API) to retrieve data generated by the associated parking lot sensor. Aspects of TGEN 9804 in such embodiment can retrieve data generated by parking lot sensor by making a function call into aspects of SINT 9806. TGEN 9804 can retrieve data from sensors due to events that can be specific to the embodiment. In one embodiment, TGEN 9804 can retrieve data from sensors, once every time interval. At the expiry of a time interval, TGEN 9804 can retrieve data from sensors and generate tag related information. The generated tag related information can be provided to PDs associated with the GD.

Other events can also be used by TGEN 9804 to retrieve data generated by sensors, in various embodiments.

SINT 9806 can include any combination of circuitry and/or instructions that can allow for aspects of GD 9802 in communicating with and/or retrieving data from remote sensors, according to an embodiment of the present invention. In one embodiment, SINT 9806 can include a software aspect. The software aspect can be related to providing a software interface such as an API, a class declaration, or the like. Software interface can be provided by SINT 9806 to allow for communicating with and/or retrieving data from sensor associated with SINT 9806. The remote sensor can be a hardware sensor like a temperature sensor. The remote sensor can also include a combination of one or more of software, firmware and hardware. SINT 9806 can include components such as TCP sockets, UDP sockets, etc. SINT 9806 can also include components such as NICs, USB interface, or the like. SINT 9806 can also include a connector (not shown) providing mechanical and/or electrical coupling to connect to antenna 9812 capable of sending/receiving messages to/from remote sensor. SINT 9806 can also include a connector (not shown) providing mechanical and/or electrical coupling to cable 9816 capable of receiving/sending messages from/to a remote sensor. The connectivity between SINT 9806 and remote sensor can include wired communication medium such as Ethernet, firewire, cable modem interface, USB or the like. The connectivity can also include wireless medium such as Bluetooth, WiFi, cellular communication network or the like. The communication channel between SINT and remote sensor can also include communication over internet, local area network, wide area network, cellular communication network, 3G communications, or the like. SINT 9806 can be connected to antenna 9812 and/or cable 9816 with or without a connector. Referring to the parking lot sensor described earlier, SINT 9806 in such embodiment can include a software API that can enable TGEN 9804 in retrieving data from the parking lot sensor. SINT 9806 can be associated with cellular communication networks using antenna 9812 to allow for communication with remote sensor. The remote sensor in this embodiment includes a combination of one or more cameras in association with a computer that is capable of processing images captured by cameras to determine the vacancy of spaces in a parking lot. SINT 9806 can also be associated with the remote sensor using wired communication such as Ethernet.

UI 9818 can include any combination of circuitry and/or instructions that can allow for aspects of GD 9802 in controlling aspects of TGEN 9804, PMAN 312 and others. UI 9818 can be used in some embodiments to enable/disable generation of tag related information by TGEN 9804 for some or all of sensors associated with GD 9802. For example, in an embodiment of GD 9802 that is associated with temperature, orientation and parking lot sensors, UI 9818 can allow for enabling/disabling generation of tag related information for some/all of the sensors associated with the GD. A user can use UI 9818 to disable generation of tag related information associated with parking lot sensor, while having the generation of information related to temperature and orientation sensors active. UI 9818 can also be used to control the rate at which data is retrieved from sensors, rate at which tag related information is generated, the events that can be used to trigger generation of tag related information, or the like. UI 9818 can also be used for other aspects associated with GD 9802

Aspects of STATE 314, SI 316, STORE 318, PMAN 312, PINT 324, TGEN 9804, UI 9818, SINT 9806, SENA 9808, SENB 9810 can be implemented e.g., using instructions of the computer program product executing on one or more suitably configured microprocessors or microcontrollers (not explicitly shown). Other implementations are also possible.

GD 9802 can also include other aspects in addition to or instead of those shown here. For example, an embodiment of GD 9802 can be included in (or associated with) a set top box that can allow for playing DVDs or storing media. The set top box can be playing media, while at the same time providing tag related information to instances of PD.

Content of Information

FIG. 99 illustrates fields associated with information determined by a GD in association with temperature sensors, according to an embodiment of the present invention. The set of information described in FIG. 99 is referred to as TemperatureInfo (TI). The instance of GD described in FIG. 98 can be used to determine information described in FIG. 99. GD 9802 can determine information related to TI using temperature sensor associated with the GD. Some fields of TI, such as currTemp can be determined using information provided by temperature sensors. Other fields of TI such as minTemp, maxTemp, avgTemp can be determined by GD 9802 using temperatures provided by temperature sensors over a period of time. In some embodiments information associated with an instance of TI can be associated with a tag of type Temperature. Some embodiments can choose to include fields not described in FIG. 99, while some other embodiments can choose to exclude some or all of the fields described in FIG. 99. The set of fields associated with a TI as described in FIG. 99 is illustrative—for use in the embodiment described here, and is not meant to limit the scope of the invention or any of its embodiments.

FIG. 100 illustrates fields associated with information determined by a GD in association with acceleration sensors, according to an embodiment of the present invention. The set of information described in FIG. 100 is referred to as AccelerationInfo (AI). The instance of GD described in FIG. 98 can be used to determine information described in FIG. 100. GD 9802 can determine information related to AI using acceleration sensor (AS). Some fields of AI, such as acceleration can be determined using information provided by AS. Other fields of AI such as timeCaptured and deviceName can be determined or provided by GD 9802. In some embodiments information associated with an instance of AI can be associated with a tag of type Acceleration. Some embodiments can choose to include fields not described in FIG. 100, while some other embodiments can choose to exclude some or all of the fields described in FIG. 100. The set of fields associated with a AI as described in FIG. 100 is illustrative—for use in the embodiment described here, and is not meant to limit the scope of the invention or any of its embodiments.

FIG. 101 illustrates fields associated with information determined by a GD in association with orientation sensors, according to an embodiment of the present invention. The set of information described in FIG. 101 is referred to as OrientationInfo (OI). The instance of GD described in FIG. 98 can be used to determine information described in FIG. 101. GD 9802 can determine information related to OI using orientation sensor (OS). Some fields of OI, such as azimuth, pitch and roll can be determined using information provided by OS. Other fields of OI such as deviceName can be determined or provided by GD 9802. In some embodiments information associated with an instance of OI can be associated with a tag of type Orientation. Some embodiments can choose to include fields not described in FIG. 101, while some other embodiments can choose to exclude some or all of the fields described in FIG. 101. The set of fields associated with OI as described in FIG. 101 is illustrative—for use in the embodiment described here, and is not meant to limit the scope of the invention or any of its embodiments.

FIG. 102 illustrates fields associated with information determined by a GD in association with ParkingLot sensors, according to an embodiment of the present invention. The set of information described in FIG. 102 is referred to as ParkingLotInfo (PLI). The instance of GD described in FIG. 98 can be used to determine information described in FIG. 102. GD 9802 can determine information related to PLI using ParkingLot sensor (PLS). In some embodiments, PLS can be accessed using SI 9808. Some fields of PLI, such as spotFree can be determined using information provided by PLS. Other fields of PLI such as numSpotsTotal, numSpotsFree, spotLatitude, spotLongitude, level and timeDetermined can be determined or provided by GD 9802. In some embodiments information associated with an instance of PLI can be associated with a tag of type ParkingLot. Some embodiments can choose to include fields not described in FIG. 102, while some other embodiments can choose to exclude some or all of the fields described in FIG. 102. The set of fields associated with PLI as described in FIG. 102 is illustrative—for use in the embodiment described here, and is not meant to limit the scope of the invention or any of its embodiments.

Operation of Third Embodiment

Figure 103:
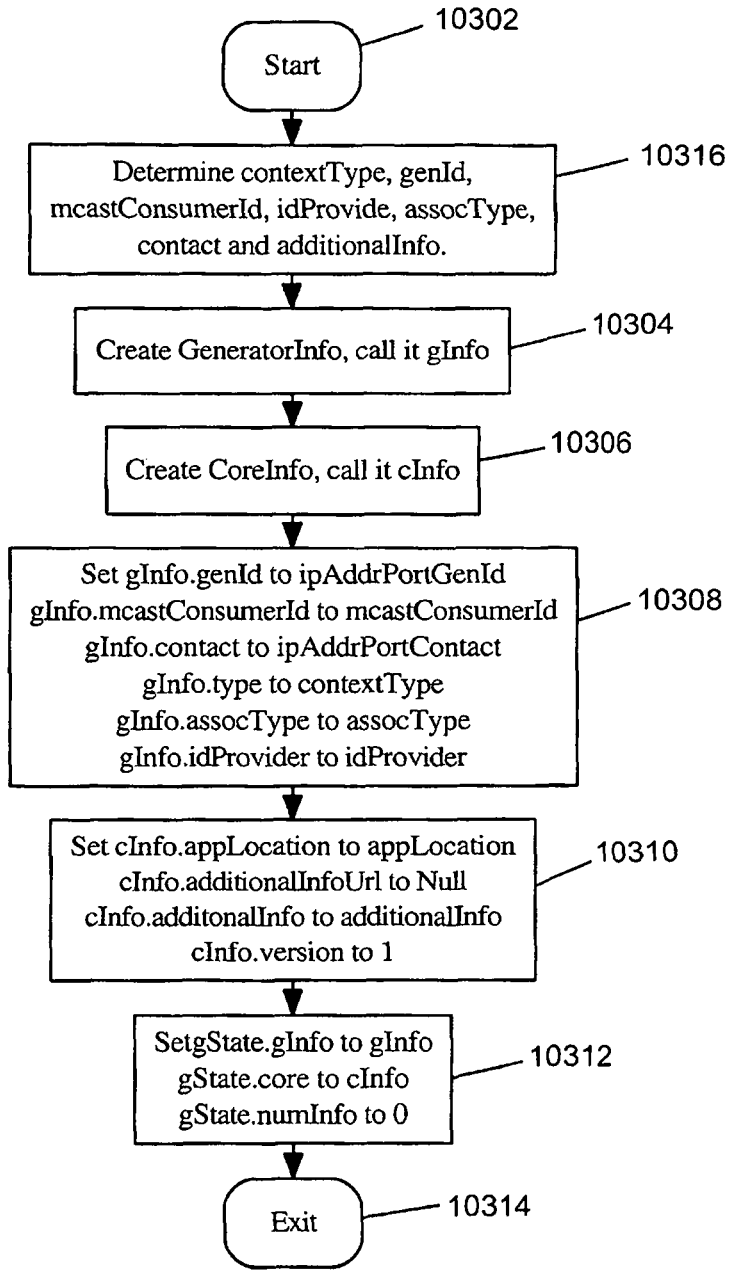
FIG. 103 illustrates the flow diagram of a process followed by a GD in initializing part of gState associated with the GD, according to an embodiment of the present invention.

FIG. 103 illustrates the flow diagram of a process followed by a GD in initializing part of state (gState) associated with the GD according to an embodiment of the present invention. In the embodiment of the invention described here, the process illustrated in FIG. 103 can be used by an instance of GD 9802 in initializing some or all of gState associated with the GD. The embodiment of GD 9802 as described here can be used in various environments. Embodiments of GD 9802 can determine tag related information that can be associated with tags of type ParkingLot, TemperatureSensor, AccelerationSensor, OrientationSensor, or other embodiments which can include retrieving data from sensors. gState.core associated with an instance of GD 9802 can be used to maintain information specific to each embodiment. The structure of information that can be associated with gState.core.additionalInfo in various embodiments is illustrated in FIG. 99-102. Tag related information can be determined by GD 9802 using data generated by TGEN 9804. TGEN 9804 of GD 9802 can generate data by communicating with sensors using SENI 9806, or SENSOR 9808, SENSOR 9810, or the like. The method illustrated in FIG. 103 can be used by GD 9802 before GD 9802 can start associating with instances of PD 240, in some embodiments of the invention. The structure of information maintained in gState, the initialization of fields associated with gState, the values associated with information maintained in gState, and the methods used in initialization as illustrated in FIG. 103 is specific to the embodiments described here, and is not meant to be limiting the scope of the invention or any of its embodiments.

Figure 104:
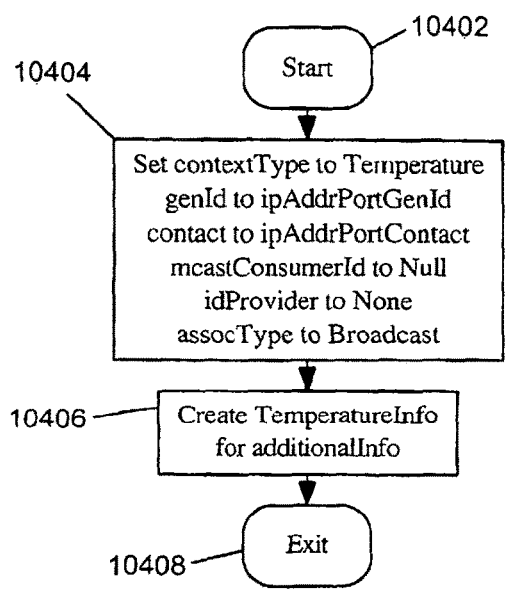
FIG. 104 illustrates the flow diagram of a process followed by a GD associated with temperature sensors, in determining information that can be used for initializing part of gState associated with the GD, according to an embodiment of the present invention.
Figure 105:
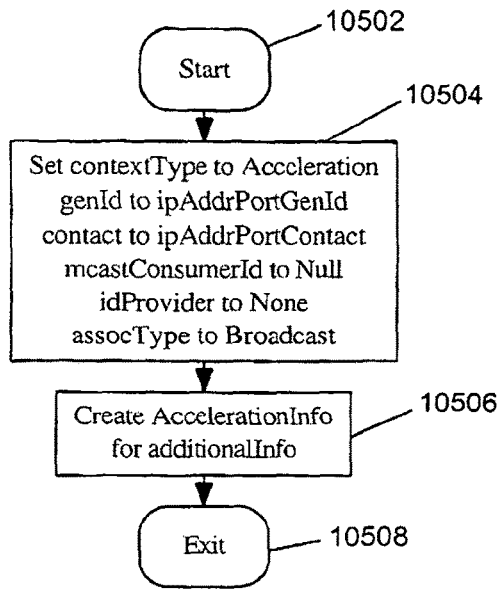
FIG. 105 illustrates the flow diagram of a process followed by a GD associated with acceleration sensors, in determining information that can be used for initializing part of gState associated with the GD, according to an embodiment of the present invention.
Figure 106:
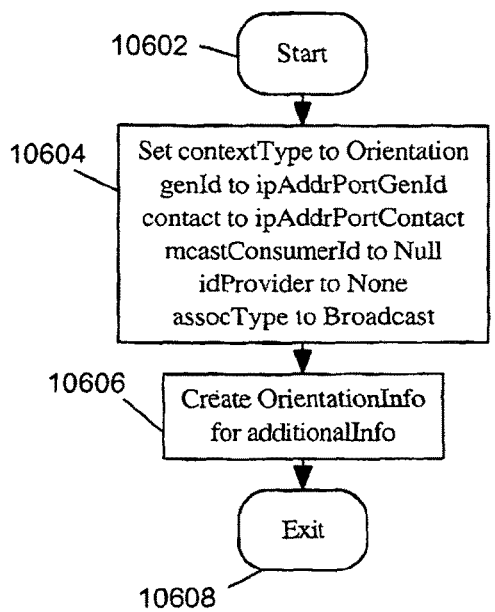
FIG. 106 illustrates the flow diagram of a process followed by a GD associated with orientation sensors, in initializing part of gState associated with the GD, according to an embodiment of the present invention.
Figure 107:
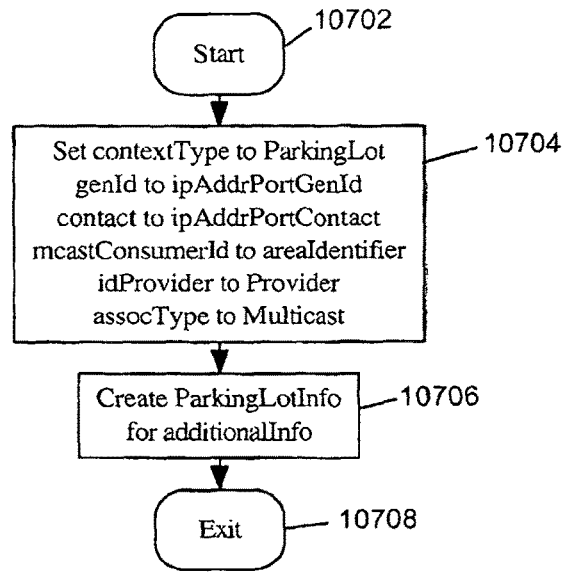
FIG. 107 illustrates the flow diagram of a process followed by a GD associated with ParkingLot sensors, in initializing part of gState associated with the GD, according to an embodiment of the present invention.

The process starts at step 10302 and moves to step 10316. At step 10316, various data that can be used to initialize gState associated with GD 9802 can be determined. The value associated with various fields of gState can be specific to the embodiment. For the ParkingLot embodiment, values associated with various fields can be determined as illustrated in FIG. 107. For the Temperature Sensor embodiment, values associated with various fields can be determined as illustrated in FIG. 104. For the Acceleration Sensor embodiment, values associated with various fields can be determined as illustrated in FIG. 105. For the Orientation Sensor embodiment, values associated with various fields can be determined as illustrated in FIG. 106. Values determined at step 10316 for various embodiments can include contextType, genId, mcastConsumerId, idProvider, assocType, contact and additionalInfo. The process can move to step 10304.

At step 10304, an instance of GeneratorInfo is created. The created instance is referred to as gInfo for use in subsequent steps of the process. The process can then move to step 10306. At step 10306, an instance of CoreInfo is created. The created instance is referred to as cInfo for use in subsequent steps of the process. The creation of an instance of GeneratorInfo in step 10304 and/or an instance of CoreInfo in step 10306, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10308.

At step 10308, various values associated with gInfo can be set to values determined in step 10316. Values associated with gInfo can be different in different embodiments that can be based on the values determined in step 10316. The values determined in step 10316 can be specific to each embodiment. Other embodiments can choose to determine these values in a way specific to each embodiment.

The process can then move to step 10310. At this step, cInfo.version is set to 1, cInfo.appLocation can be set to a location that can be a URL, cInfo.additionalInfo can be set to additionalInfo determined in step 10316, and cInfo.additonalInfoUrl can be set to Null. Null value for additonalInfoUrl of cInfo can be used to indicate that this field does not hold a valid value. The URL associated with cInfo.appLocation can be related to a URL where application that can process tags of type contextType, can be downloaded from. The additionalInfo determined in step 10316 can indicate the set and structure of information that can be generated in each embodiment. The structure and information generated in each embodiment is illustrated in FIG. 99-102. The process can then move to step 10312.

At step 10312, gState.gInfo is set to gInfo, gState.core is set to cInfo and gState.numInfo is set to 0. A value of 0 for gState numInfo can indicate that the GD is not associated (yet) with any instances of PD 240, and that gState.providerInfo list is empty. The process can then move to step 10314. Step 10314 indicates that the process associated with FIG. 103 is complete.

FIG. 104 illustrates the flow diagram of a process followed by a GD associated with temperature sensors, in determining information that can be used for initializing part of gState associated with the GD, according to an embodiment of the present invention. In an embodiment of the invention that can be associated with GD 9802, GD 9802 can be associated with temperature sensors. The embodiment of GD can be used in generating tag related information that can be associated with tags of type Temperature. The process associated with FIG. 104 can be used in determining information that can be used for initialization of gState associated with the GD. In one embodiment, the information determined by the process in FIG. 104 can be used in step 10316 of FIG. 103 to help initialize gState associated with the GD. In the Temperature Sensor embodiment illustrated here, the structure of information that can be associated with gState.core.additionalInfo is illustrated in FIG. 99. The information maintained, the values associated with initialization, the method of initialization, and other aspects as illustrated in FIG. 104 can be specific to the embodiment illustrated here. Other embodiments can choose to include information not described here, exclude some or all of information described here, can choose to initialize state with values different from what is described here, or can choose to follow a different method for initializing the state. The methods and processes followed here are not meant to be limiting the scope of the invention or any of its embodiments.

The process starts at step 10402 and moves to step 10404. At step 10404, various values are determined. At step 10404, contextType is set to Temperature indicating that the tag related information that generated by the GD can be associated with tags of type Temperature. Next, genId is set to ipAddrPortGenId. genId is an identifier that can be used to identify an instance of GD among all GDs. In the embodiment of the present invention described here, the communication between the PD and GD happens using messages sent using UDP. In such embodiment, genId can be set to a combination of the IP address and port number associated with the UDP port. The IP address and port number can be the IP address and port number of UDP port associated with GD. An ipAddrPortGenId can be determined by multiplying the IP address with 65536 and adding portId to the resulting value. The method of determining ipAddrPortGenId described here is illustrative only. Other methods can be used to determine genId. Methods specific to the embodiments can also be used.

At step 10404, contact can be set to information that can be used to send messages to the GD. In the embodiment described here, contact can be set to a combination of IP address and port number that the GD can use to communicate messages with instances of PD.

For this embodiment, assocType is set to value Broadcast, mcastConsumerId is set to Null and idProvider to None. idProvider and mcastConsumerId fields can be used in embodiments where the assocType related to tags can be Multicast. A value of Broadcast for assocType indicates that tags generated using information generated by the GD can be used by any CD 102 that can receive the tag. The process can then move to step 10406.

At step 10406, an instance of TemperatureInfo can be created. The created instance is referred to as additionalInfo. An example structure of information that can be represented by TemperatureInfo is illustrated in FIG. 99. The creation of an instance of TemperatureInfo in step 10406 can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10408. Step 10408 indicates that the process associated with FIG. 104 is complete.

FIG. 105 illustrates the flow diagram of a process followed by a GD associated with acceleration sensors, in determining information that can be used for initializing part of gState associated with the GD, according to an embodiment of the present invention. In an embodiment of the invention that can be associated with GD 9802, GD 9802 can be associated with acceleration sensors. The embodiment of GD can be used in generating tag related information that can be associated with tags of type Acceleration. The process associated with FIG. 105 can be used in determining information that can be used for initialization of gState associated with the GD. In one embodiment, the information determined by the process in FIG. 105 can be used in step 10316 of FIG. 103 to help initialize gState associated with the GD. In the Acceleration Sensor embodiment illustrated here, the structure of information that can be associated with gState.core.additionalInfo is illustrated in FIG. 100. The information maintained, the values associated with initialization, the method of initialization, and other aspects as illustrated in FIG. 105 can be specific to the embodiment illustrated here. Other embodiments can choose to include information not described here, exclude some or all of information described here, can choose to initialize state with values different from what is described here, or can choose to follow a different method for initializing the state. The methods and processes followed here are not meant to be limiting the scope of the invention or any of its embodiments.

The process starts at step 10502 and moves to step 10504. At step 10504, various values are determined. At step 10504, contextType is set to Acceleration indicating that the tag related information that generated by the GD can be associated with tags of type Acceleration. Next, genId is set to ipAddrPortGenId. genId is an identifier that can be used to identify an instance of GD among all GDs. In the embodiment of the present invention described here, the communication between the PD and GD happens using messages sent using UDP. In such embodiment, genId can be set to a combination of the IP address and port number associated with the UDP port. The IP address and port number can be the IP address and port number of UDP port associated with GD. An ipAddrPortGenId can be determined by multiplying the IP address with 65536 and adding portId to the resulting value. The method of determining ipAddrPortGenId described here is illustrative only. Other methods can be used to determine genId. Methods specific to the embodiments can also be used.

At step 10504, contact can be set to information that can be used to send messages to the GD. In the embodiment described here, contact can be set to a combination of IP address and port number that the GD can use to communicate messages with instances of PD.

For this embodiment, assocType is set to value Broadcast, mcastConsumerId is set to Null and idProvider to None. idProvider and mcastConsumerId fields can be used in embodiments where the assocType related to tags can be Multicast. A value of Broadcast for assocType indicates that tags generated using information generated by the GD can be used by any CD 102 that can receive the tag. The process can then move to step 10506.

At step 10506, an instance of AccelerationInfo can be created. The created instance is referred to as additionalInfo. An example structure of information that can be represented by AccelerationInfo is illustrated in FIG. 100. The creation of an instance of AccelerationInfo in step 10506 can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10508. Step 10508 indicates that the process associated with FIG. 105 is complete.

FIG. 106 illustrates the flow diagram of a process followed by a GD associated with orientation sensors, in determining information that can be used for initializing part of gState associated with the GD, according to an embodiment of the present invention. In an embodiment of the invention that can be associated with GD 9802, GD 9802 can be associated with orientation sensors. The embodiment of GD can be used in generating tag related information that can be associated with tags of type Orientation. The process associated with FIG. 106 can be used in determining information that can be used for initialization of gState associated with the GD. In one embodiment, the information determined by the process in FIG. 106 can be used in step 10316 of FIG. 103 to help initialize gState associated with the GD. In the Orientation Sensor embodiment illustrated here, the structure of information that can be associated with gState.core.additionalInfo is illustrated in FIG. 101. The information maintained, the values associated with initialization, the method of initialization, and other aspects as illustrated in FIG. 106 can be specific to the embodiment illustrated here. Other embodiments can choose to include information not described here, exclude some or all of information described here, can choose to initialize state with values different from what is described here, or can choose to follow a different method for initializing the state. The methods and processes followed here are not meant to be limiting the scope of the invention or any of its embodiments.

The process starts at step 10602 and moves to step 10604. At step 10604, various values are determined. At step 10604, contextType is set to Orientation indicating that the tag related information that generated by the GD can be associated with tags of type Orientation. Next, genId is set to ipAddrPortGenId. genId is an identifier that can be used to identify an instance of GD among all GDs. In the embodiment of the present invention described here, the communication between the PD and GD happens using messages sent using UDP. In such embodiment, genId can be set to a combination of the IP address and port number associated with the UDP port. The IP address and port number can be the IP address and port number of UDP port associated with GD. An ipAddrPortGenId can be determined by multiplying the IP address with 65536 and adding portId to the resulting value. The method of determining ipAddrPortGenId described here is illustrative only. Other methods can be used to determine genId. Methods specific to the embodiments can also be used.

At step 10604, contact can be set to information that can be used to send messages to the GD. In the embodiment described here, contact can be set to a combination of IP address and port number that the GD can use to communicate messages with instances of PD.

For this embodiment, assocType is set to value Broadcast, mcastConsumerId is set to Null and idProvider to None. idProvider and mcastConsumerId fields can be used in embodiments where the assocType related to tags can be Multicast. A value of Broadcast for assocType indicates that tags generated using information generated by the GD can be used by any CD 102 that can receive the tag. The process can then move to step 10606.

At step 10606, an instance of OrientationInfo can be created. The created instance is referred to as additionalInfo. An example structure of information that can be represented by OrientationInfo is illustrated in FIG. 101. The creation of an instance of OrientationInfo in step 10606 can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10608. Step 10608 indicates that the process associated with FIG. 106 is complete.

FIG. 107 illustrates the flow diagram of a process followed by a GD associated with Parking Lot sensors, in determining information that can be used for initializing part of gState associated with the GD, according to an embodiment of the present invention. In an embodiment of the invention that can be associated with GD 9802, GD 9802 can be associated with Parking Lot sensors. The embodiment of GD can be used in generating information that can be associated with tags of type ParkingLot. The process associated with FIG. 107 can be used in determining information that can be used for initialization of gState associated with the GD. In one embodiment, the information determined by the process in FIG. 107 can be used in step 10316 of FIG. 103 to help initialize gState associated with the GD. In the Parking Lot Sensor embodiment illustrated here, the structure of information that can be associated with gState.core.additionalInfo is illustrated in FIG. 102. The information maintained, the values associated with initialization, the method of initialization, and other aspects as illustrated in FIG. 107 can be specific to the embodiment illustrated here. Other embodiments can choose to include information not described here, exclude some or all of information described here, can choose to initialize state with values different from what is described here, or can choose to follow a different method for initializing the state. The methods and processes followed here are not meant to be limiting the scope of the invention or any of its embodiments.

The process starts at step 10702 and moves to step 10704. At step 10704, various values are determined. At step 10704, contextType is set to ParkingLot indicating that the tag related information that is generated by the GD can be associated with tags of type ParkingLot. Next, genId is set to ipAddrPortGenId. genId is an identifier that can be used to identify an instance of GD among all GDs. In the embodiment of the present invention described here, the communication between the PD and GD happens using messages sent using UDP. In such embodiment, genId can be set to a combination of the IP address and port number associated with the UDP port. The IP address and port number can be the IP address and port number of UDP port associated with GD. An ipAddrPortGenId can be determined by multiplying the IP address with 65536 and adding portId to the resulting value. The method of determining ipAddrPortGenId described here is illustrative only. Other methods can be used to determine genId. Methods specific to the embodiments can also be used.

At step 10704, contact can be set to information that can be used to send messages to the GD. In the embodiment described here, contact can be set to a combination of IP address and port number that the GD can use to communicate messages with instances of PD.

For this embodiment, assocType is set to value Multicast, mcastConsumerId is set to areaId and idProvider to Provider. A value of Multicast for assocType can be used to indicate that the tag associated with information generated by the GD can be consumed by a group of CD 102 instances. The value of 'Provider' for idProvider can be used to indicate that the PD 240 instances that can be associated with the GD can provide an identifier for instances of CD that associate with the PDs. The value associated with mcastConsumerId can specify the identifier that can be provided to CD instances associating with the PD instances. In one embodiment, mcastConsumerId can be set to an areaId. areaId can indicate the area of a parking lot that the data generated by the GD can be associated with. An example method of determining an areaId can include using the street address number associated with parking lot (as in 310 from street address: 310, Elan Village Lane), parking building number (the number of a building when there are multiple buildings each of which have parking lots—say building A(1), building B(2), or the like), floor level (the floor level of parking lot—floor 1, 2, etc.) and location (one among, say, 4 locations—East(0), West(1), North (2), South (4)—the numbers in parenthesis indicate the values for location). An example of determining areaId can include taking values associated with these fields, and placing them side by side to form the areaId. For example, the areaId associated with a GD that can generate information related to the South side of $2^{nd}$ floor in building 5 of parking lot located at street address "310, Elan Village Lane" can be 310524 (310 for street addr, 5 for building number, 2 for floor level, and 4 for location). Other methods can include expanding each of the individual numbers to include say 5 digits. When a number is less than 5 digits, the number can be prefixed with zeros. For example the areaId using such method for the example illustrated, can be 00310 00005 00002 00004. Other methods of determining areaId are possible.

At step 10706, an instance of ParkingLotInfo can be created. The created instance is referred to as additionalInfo. An example structure of information that can be represented by ParkingLotInfo is illustrated in FIG. 102. The creation of an instance of ParkingLotInfo in step 10706 can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10708. Step 10708 indicates that the process associated with FIG. 107 is complete.

Figure 108:
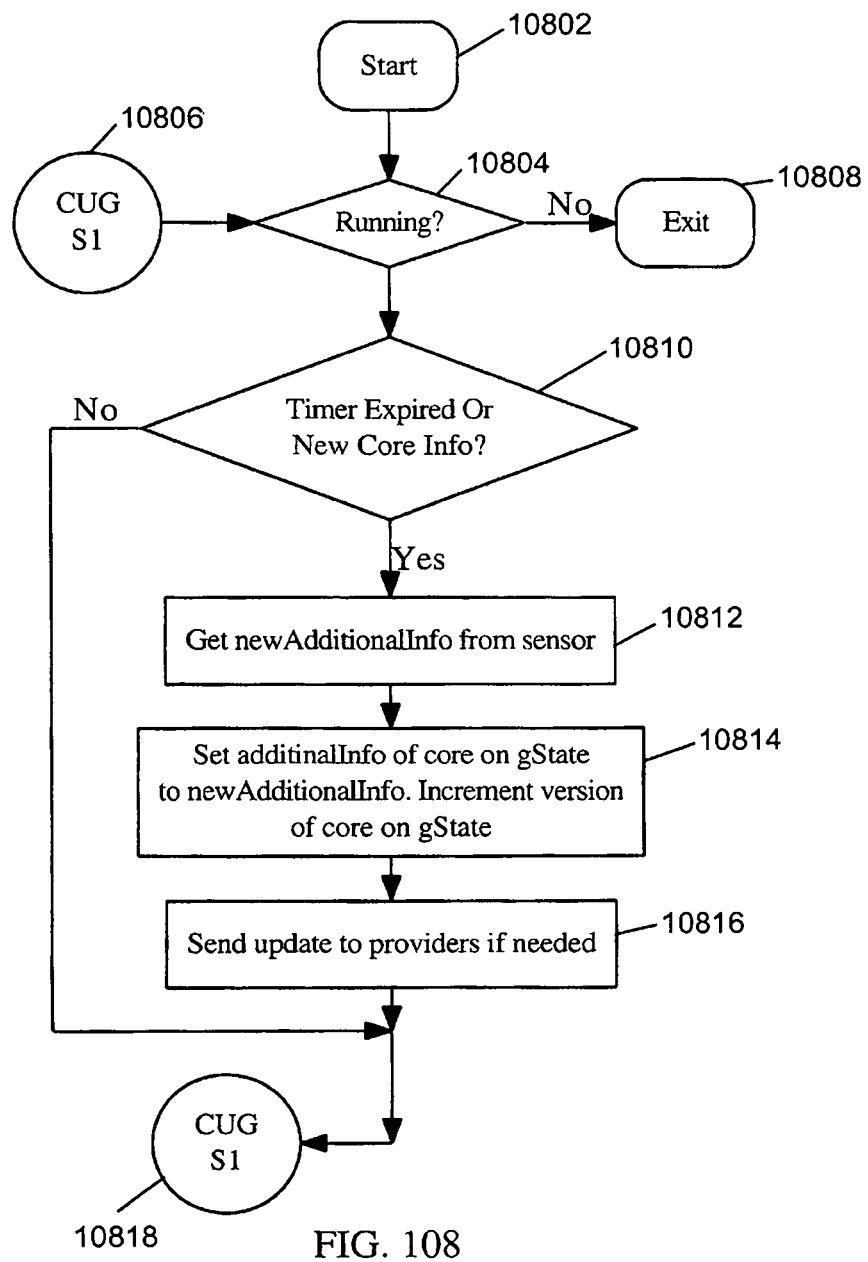
FIG. 108 illustrates the flow diagram of a process followed by a GD in determining TRI, and communicating TRI, according to an embodiment of the present invention.

FIG. 108 illustrates the flow diagram of a process followed by a GD in determining information that can be included in tags, and communicating the generated information to PDs, according to an embodiment of the present invention. In one embodiment of the invention, an instance of GD 9802 as illustrated in FIG. 98 can use the process in FIG. 108 in determining information related to tags by communicating with sensors. The sensors can be associated with GD 9802 as illustrated in by SENSOR 9808 and SENSOR 9810 of GD 9802. The sensors can also be located outside the GD and aspects of GD can communicate with such sensors using an interface as illustrated by SENI 9806. Embodiments of the invention can use sensors such as temperature sensors, acceleration sensors or orientation sensors that can be associated with instances of SENSOR 9808. Embodiments of the invention can use sensors such as a parking lot sensor based on video cameras located outside of GD 9802. In such embodiments, GD 9802 can communicate with the video cameras using SENI 9806.

In the embodiment of the invention described here, GD 9802 can retrieve information determined by sensors, to determine information that can be associated with gState.core.additionalInfo. The structure and content of gState.core.additionalInfo can be embodiment specific. Examples of embodiment specific information that can be associated with gState.core.additionalInfo are illustrated in FIG. 99-102. Information associated with gState can be used by the GD to send messages including tag related information to PDs associated with the GD. The methods used in retrieving data from sensors, the information determined by sensors, the method of determining information related to gState.core.additionalInfo, the methods of communicating the determined information to PDs and other functionality as illustrated in FIG. 108 is meant for use by the embodiment(s) described here. Other embodiments can communicate with other types of sensors, can determine information different from what is described here, and communicate the tag related information to PDs in ways not described here. The methods and processes illustrated in FIG. 108 are not meant to be limiting the scope of the invention or any of its embodiments.

The process starts at step 10802 and moves to step 10804. At step 10804, a check is done to determine if GD 9802 is currently active. GD 9802 can be generating tag related information and communicating the information to PDs while it is active, in some embodiments. In some embodiments, some/all of methods illustrated in FIG. 108 can be implemented using software. In such embodiments, GD 9802 can be generating and communicating tag related information while the software is active or running. If GD 9802 and/or related processes are not active, the process can move to step 10808. Step 10808 indicates that the process associated with FIG. 108 is complete.

If at step 10804, it is determined that the GD (and/or any processes related to FIG. 108) is active, the process can move to step 10810. At step 10810, a check is made to determine if new information needs to be determined for one or more sensors, or if information generated by the GD needs to be communicated to instances of PD associated with the GD. In some embodiments tag related information can be generated by GD 9802 by retrieving data from sensors once every time interval. In some embodiments, information generated by the GD can be communicated to instances of PD once every time interval. In such embodiments, a check can be made at this step to see if any timer interval has expired. Other embodiments can choose to generate new information or communicate the generated information under circumstances not described here. If the check at step 10810 succeeds, the process can move to step 10812.

At step 10812, TGEN 9804 of GD 9802 can determine the information that can be associated with gState.core.additionalInfo. The method of determining information can be specific to each embodiment. FIGS. 109-111 and FIG. 113 illustrate methods of determining information in different embodiments. Information determined at this step is referred to as newAdditionalInfo for use in subsequent steps of the process. The process can then move to step 10814. At step 10814, TGEN 9804 can set gState.core.additionalInfo to newAdditionalInfo determined at step 10812. gState.core.version can be incremented in this step. The process can then move to step 10816. At step 10816, messages including information determined in earlier steps can be sent to PDs associated with the GD. Tag related information generated by the GD can be communicated to PDs differently in different embodiments. In the embodiment illustrated here, tag related information can be communicated to PDs every time information is generated by the GD. The method illustrated in FIG. 89 can be used by the GD in communicating the tag related information. The process can then move to step 10818. Step 10818 indicates that the process can move to step 10806. Step 10806 indicates that the process can move to step 10804. Returning to step 10810, if the check at this step fails, the process can move to step 10818.

FIG. 109 illustrates the flow diagram of a process followed by a GD in determining information that can be included in tags wherein GD is associated with temperature sensors, according to an embodiment of the present invention. In the embodiment of the invention described here, GD 9802 can be associated with sensors which can provide information related to a temperature. GD 9802 in such embodiments can use the information provided by temperature sensors to determine tag related information, an example structure of which is illustrated in FIG. 99. The information determined in FIG. 109 can be associated with gState.core.additionalInfo. In one embodiment, GD 9802 can use the process illustrated in FIG. 108 to determine tag related information associated with tags of type Temperature. In such embodiment, the process illustrated in FIG. 109 can be used as part of determining information in step 10812 of FIG. 108. The methods of retrieving information from temperature sensors, and the method of determining information associated with gState.core.additionalInfo, and other methods/processes illustrated in FIG. 109 are meant for use by the embodiment described here. Other embodiments can use other methods, can choose to include/determine information not described here, can choose to exclude some/all of the information described here, and the process of FIG. 109 is not meant to be limiting the scope of the invention or any of its embodiments.

The process starts at step 10902 and moves to step 10904. At step 10904, a new instance of TemperatureInfo (TI) the structure of which is illustrated in FIG. 99, is created. The new instance is referred to as tInfo for use in subsequent steps of the process. The creation of an instance of TI in step 10904, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 10906.

At step 10906, TGEN 9804 of GD 9802 can communicate with temperature sensor SENSOR 9808 (in this embodiment, SENSOR 9808 is a temperature sensor) to retrieve the latest temperature from sensor. The method of retrieving temperature from temperature sensor can be specific to the type/embodiment of sensor. In some embodiments mechanism including a combination of one or more of software, firmware and hardware can be used to retrieve temperature from the sensor. tInfo.currTemp can be set to the temperature provided by the sensor. minTemp, maxTemp and avgTemp of tInfo can be determined by using the current read temperature and a number of previously read temperatures.

tInfo determined at this step is the result of the process illustrated in FIG. 109. In the process illustrated by FIG. 108, gState.core.additionalInfo can be set to tInfo. tInfo is referred to as newAdditionalInfo in step 10812 of FIG. 108. The process associated with FIG. 109 can then move to step 10908. Step 10908 indicates that the process associated with FIG. 109 is complete.

FIG. 110 illustrates the flow diagram of a process followed by a GD in determining information that can be included in tags wherein GD is associated with acceleration sensors, according to an embodiment of the present invention. In the embodiment of the invention described here, GD 9802 can be associated with sensors which can provide information related to a acceleration. GD 9802 in such embodiments can use the information provided by acceleration sensors to determine tag related information, an example structure of which is illustrated in FIG. 100. The information determined in FIG. 110 can be associated with gState.core.additionalInfo. In one embodiment, GD 9802 can use the process illustrated in FIG. 108 to determine tag related information associated with tags of type Acceleration. In such embodiment, the process illustrated in FIG. 110 can be used as part of determining information in step 10812 of FIG. 108. The methods of retrieving information from acceleration sensors, and the method of determining information associated with gState.core.additionalInfo, and other methods/processes illustrated in FIG. 110 are meant for use by the embodiment described here. Other embodiments can use other methods, can choose to include/determine information not described here, can choose to exclude some/all of the information described here, and the process of FIG. 110 is not meant to be limiting the scope of the invention or any of its embodiments.

The process starts at step 11002 and moves to step 11004. At step 11004, a new instance of AccelerationInfo (AI) the structure of which is illustrated in FIG. 100, is created. The new instance is referred to as aInfo for use in subsequent steps of the process. The creation of an instance of TI in step 11004, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 11006.

At step 11006, TGEN 9804 of GD 9802 can communicate with acceleration sensor SENSOR 9808 (in this embodiment, SENSOR 9808 is a acceleration sensor) to retrieve the latest acceleration from sensor. The method of retrieving acceleration from acceleration sensor can be specific to the type/embodiment of sensor. In some embodiments mechanism including a combination of one or more of software, firmware and hardware can be used to retrieve acceleration from the sensor. aInfo.timeCaptured can be set to a time at which the data is retrieved from the sensor. aInfo.acceleration can be set to the acceleration value provided by sensor. aInfo.deviceName can be set to a name associated with the sensor.

aInfo determined at this step is the result of the process illustrated in FIG. 110. In the process illustrated by FIG. 108, gState.core.additionalInfo can be set to aInfo. aInfo is referred to as newAdditionalInfo in step 10812 of FIG. 108. The process associated with FIG. 110 can then move to step 11008. Step 11008 indicates that the process associated with FIG. 110 is complete.

FIG. 111 illustrates the flow diagram of a process followed by a GD in determining information that can be included in tags wherein GD is associated with orientation sensors, according to an embodiment of the present invention. In the embodiment of the invention described here, GD 9802 can be associated with sensors which can provide information related to orientation. GD 9802 in such embodiments can use the information provided by orientation sensors to determine tag related information, an example structure of which is illustrated in FIG. 101. The information determined in FIG. 111 can be associated with gState.core.additionalInfo. In one embodiment, GD 9802 can use the process illustrated in FIG. 108 to determine tag related information associated with tags of type Orientation. In such embodiment, the process illustrated in FIG. 111 can be used as part of determining information in step 10812 of FIG. 108. The methods of retrieving information from orientation sensors, and the method of determining information associated with gState.core.additionalInfo, and other methods/processes illustrated in FIG. 111 are meant for use by the embodiment described here. Other embodiments can use other methods, can choose to include/determine information not described here, can choose to exclude some/all of the information described here, and the process of FIG. 111 is not meant to be limiting the scope of the invention or any of its embodiments.

The process starts at step 11102 and moves to step 11104. At step 11104, a new instance of OrientationInfo (OI) the structure of which is illustrated in FIG. 101, is created. The new instance is referred to as oInfo for use in subsequent steps of the process. The creation of an instance of OI in step 11104, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 11106.

At step 11106, TGEN 9804 of GD 9802 can communicate with orientation sensor SENSOR 9808 (in this embodiment, SENSOR 9808 is a orientation sensor) to retrieve the latest orientation from sensor. The method of retrieving orientation from orientation sensor can be specific to the type/embodiment of sensor. In some embodiments mechanism including a combination of one or more of software, firmware and hardware can be used to retrieve orientation from the sensor. oInfo.azimuth can be set to the azimuth provided by the orientation sensor. oInfo.pitch can be set to the pitch provided by the orientation sensor. oInfo.roll can be set to the roll provided by the orientation sensor. oInfo.deviceName can be set to a name associated with the orientation sensor.

oInfo determined at this step is the result of the process illustrated in FIG. 111. In the process illustrated by FIG. 108, gState.core.additionalInfo can be set to oInfo. oInfo is referred to as newAdditionalInfo in step 10812 of FIG. 108. The process associated with FIG. 111 can then move to step 11108. Step 11108 indicates that the process associated with FIG. 111 is complete.

Figure 113:
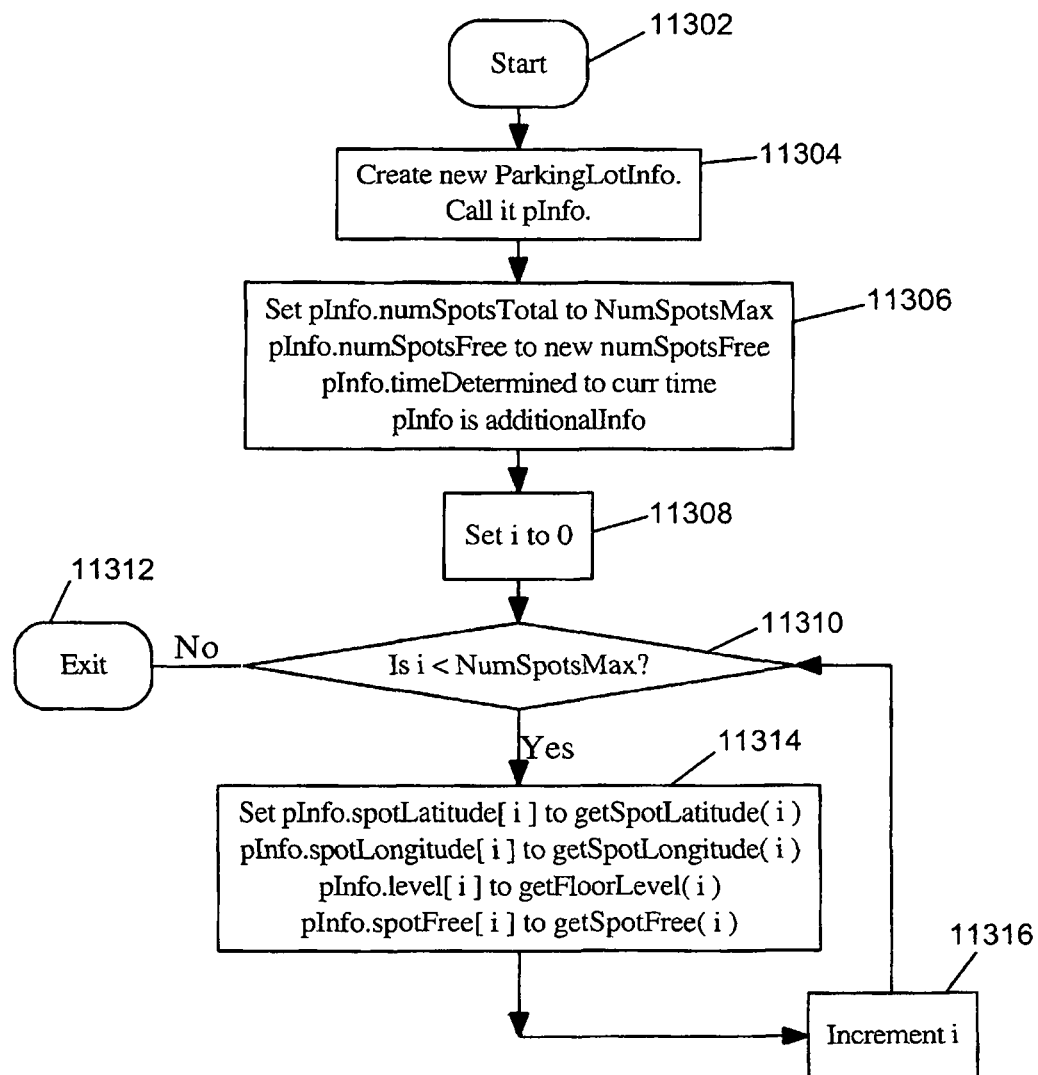
FIG. 113 illustrates the flow diagram of a process followed by a GD in determining TRI wherein GD is associated with ParkingLot sensors, according to an embodiment of the present invention.

FIG. 113 illustrates the flow diagram of a process followed by a GD in determining information that can be included in tags wherein GD is associated with parking lot sensors, according to an embodiment of the present invention. In the embodiment of the invention described here, GD 9802 can be associated with sensors which can provide information related to spaces in a parking lot. GD 9802 can be communicating with these sensors using SENI 9806. The sensors can provide information related to the occupancy of each parking space—occupied or free. Each sensor can provide information related to the occupancy of one or more parking spaces. GD 9802 can be communicating with one or more sensors using SENI 9806. When more than one sensor can be associated with SENI 9806, GD 9802 can identify the sensor (say by using the address associated with a sensor) when it is communicating with the sensor. Each sensor can be associated with one or more parking spaces. The set of parking spaces, the location of each parking space (latitude, longitude, etc.) associated with each sensor can be provisioned to GD 9802 via UI 322, and stored in STORE 318.

An example of such a sensor can be implemented using a computer and one or more web cams associated to the computer. The web cam can be capturing pictures of the parking lot every time interval. Software associated with the computer can process the pictures of parking spaces taken by the web cams to determine if a space is free. Image processing techniques can be used to determine if a parking space is free. In one embodiment, each parking space can be painted with a specific pattern. Software associated with the computer can compare the picture of a parking space to determine if the space is associated with the pattern. If the space is not associated with a pattern, the spot can be considered to be occupied. If the space is associated with the pattern, the spot can be considered to be free. Embodiment of GD 9802 can be communicating with computer based sensors such as the ones described here. In one embodiment, GD 9802 can be communicating with computer based sensors using an IP network. Each computer based sensor can be associated with an IP address. The IP address associated with the computer based sensor can be used as the identifier of the sensor. In such embodiment, GD 9802 can maintain an association of each IP address (associated with computer based sensors) with information related to the set of parking spaces that the computer based sensor related to the IP address, can provide information about. Such information can be provisioned to GD 9208 using UI 322, or any other provisioning mechanisms.

GD 9802 in these embodiments can use the information provided by parking lot sensors to determine tag related information, an example structure of which is illustrated in FIG. 102. The information determined in FIG. 113 can be associated with gState.core.additionalInfo. In one embodiment, GD 9802 can use the process illustrated in FIG. 108 to determine tag related information associated with tags of type ParkingLot. In such embodiment, the process illustrated in FIG. 113 can be used as part of determining information in step 10812 of FIG. 108. The methods of retrieving information from parking lot sensors, the methods of determining information related to each parking space, and the method of determining information associated with gState.core.additionalInfo, and other methods/processes illustrated in FIG. 113 are meant for use by the embodiment described here. Other embodiments can use other methods, can choose to include/determine information not described here, can choose to exclude some/all of the information described here, and the process of FIG. 113 is not meant to be limiting the scope of the invention or any of its embodiments.

The process starts at step 11302 and moves to step 11304. At step 11304, a new instance of ParkinglotInfo (PLI) the structure of which is illustrated in FIG. 102, is created. The new instance is referred to as pInfo for use in subsequent steps of the process. The creation of an instance of PLI in step 11304 can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 11306.

At step 11306, TGEN 9804 of GD 9802 can communicate with Parking Lot sensors using SENI 9806 (in this embodiment, SENI 9806 can be used to communicate with the parking lot sensor) to retrieve the latest information related to parking lot spaces, from the sensors. The method of retrieving information from parking lot sensors can be specific to the type/embodiment of sensor. In some embodiments mechanism including a combination of one or more of software, firmware and hardware can be used to retrieve information from the sensors. In embodiments where GD 9802 can communicate with computer based parking lot sensors as illustrated earlier, GD can send messages to each sensor requesting information regarding the parking spaces that they are associated with. The process associated with FIG. 113 can wait in step 11306 till TGEN receives information from all the sensors. After TGEN receives occupancy information from each sensor, TGEN can process the information from all sensors to determine numSpotsFree which indicates the total number of parking spaces that are free.

pInfo.numSpotsFree can be set to numSpotsFree, pInfo.numSpotsTotal can be set to the total number of parking spaces that are associated with all the sensors that GD 9802 can be communicating with. pInfo.timeDetermined can be set to the time at which the GD has retrieved information from the sensors.

The process can then move to step 11308. At step 11308, an i is set to 0. The process can then move to step 11310. At step 11310, a check is done to determine if i is less than NumSpotsMax. NumSpotsMax can indicate the total number of spaces that can be associated with the sensors that GD is associated with. If the check fails, the process can move to step 11312. pInfo at this step is the result of the process illustrated in FIG. 113. In the process illustrated by FIG. 108, gState.core.additionalInfo can be set to pInfo. pInfo is referred to as newAdditionalInfo in step 10812 of FIG. 108. Step 11312 indicates that the process associated with FIG. 113 is complete.

If the check at step 11310 fails, the process can move to step 11314. At step 11314, information related to each space can be retrieved from STORE 318 and associated with pInfo. In the embodiment described here, i-th element of pInfo.spotLatitude, pInfo.spotLongitude, pInfo.level, and pInfo.spotFree can indicate the latitude, longitude, floor level and occupancy of a parking space. i-th element of pInfo.spotLatitude, pInfo.spotLongitude and pInfo.level of a parking space can be determined using information stored in STORE 318, while i-th element of pInfo.spotFree can be determined using information provided by the parking lot sensor. The process can then move to step 11316. At step 11316, i is incremented and the process moves to step 11310.

System of Third Embodiment

Figure 114:
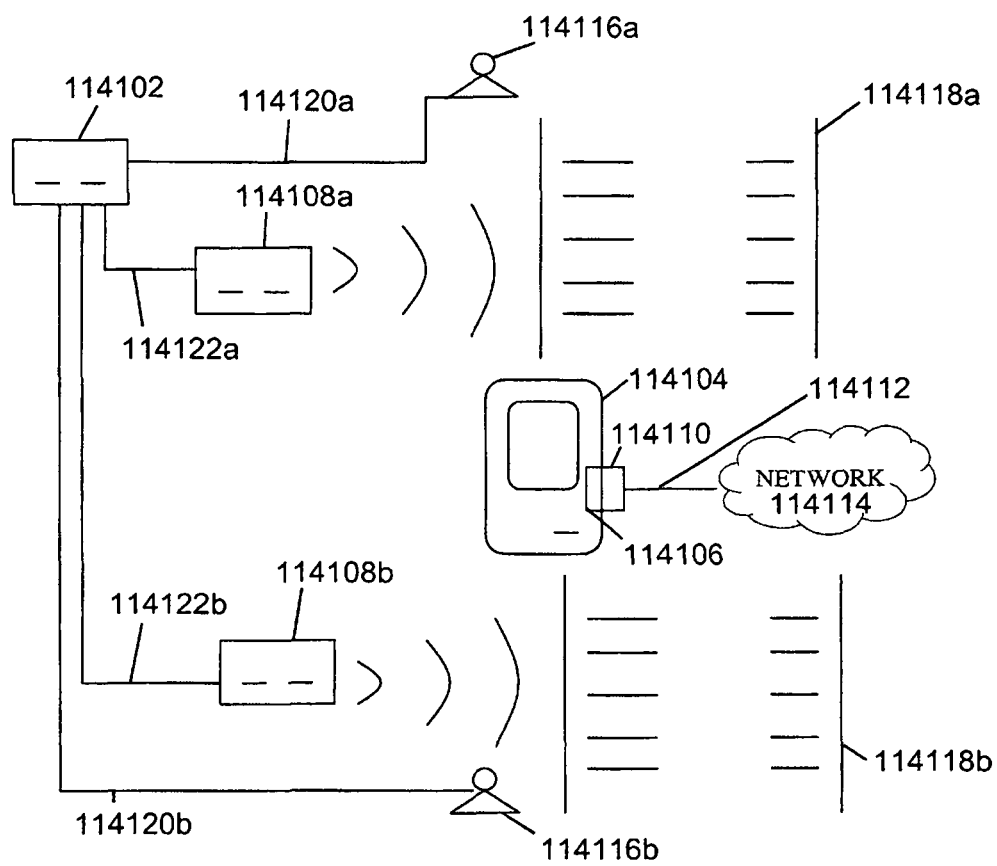
FIG. 114 illustrates a system showing the usage of a GD, PDs, and a CD for a parking-lot system according to an embodiment of the present invention.

FIG. 114 illustrates an embodiment of a system wherein GD 114102 embodies aspects of GD 9802. PD 114108a and PD 114108b each embody aspects associated with PD 240. PMD 114104 embodies aspects associated with CD 140. The system illustrated in FIG. 114 allows for a GD to generate tag related information (related to vacancy of parking spaces) that is communicated to one or more instances of PD. Tags provided by PDs can be used by instances of PMD to provide information related to vacancy of parking spaces to users of PMD. It is to be noted that while the system illustrated in FIG. 114 shows one instance of GD, two instances of PDs, two instances of cameras and one instance of PMD, a different number of each of these devices can be used in other embodiments. In one embodiment, there can be a multiple instances of PMD receiving tags provided by each PD. The system illustrated by FIG. 114 is not meant to be limiting the scope of the invention or any of its embodiments.

In this embodiment, cameras 114116a and 114116b are used by GD 114102 in generating tag related information. GD 114102 generates tag related information that can provide information related to vacancy of parking spaces. GD 114102 uses camera 114116a to generate information related to spaces in parking lot 114118a, while the camera 114116b is used by the GD to generate information related to spaces in parking lot 114118b. GD 114102 can retrieve images captured by camera 114116a using cable 114120a connected to GD 114102 and camera 114116a. GD 114102 can also retrieve images captured by camera 114116b using cable 114120b connected to GD 114102 and camera 114116b. In other embodiments, GD 114102 and some or all of cameras associated with the GD can include wireless interfaces (e.g., Wifi, etc.) that can allow GD 114102 in communicating with the cameras.

Tag related information generated by GD 114102 can be communicated by the GD to PD 114108a and/or PD 114108b. GD 114102 can communicate tag related information to PD 114108a using cable 114122a, and to PD 114108b using cable 114122b. Two ends of cable 114122a can be connected to GD 114102 and PD 114108a using connectors (not shown) on GD 114102 and PD 114108a. Two ends of cable 114122b can be connected to GD 114102 and PD 114108b using connectors (not shown) on GD 114102 and PD 114108b. In other embodiments GD 114102 and some or all of PDs can include wireless interfaces (e.g., Wifi, etc.) that can allow GD 114102 in communicating tag related information.

In one embodiment, PD 114108a and PD 114108b are each located near parking lots 114118a and 114118b respectively. Tags provided by the PDs can be received by instances of PMDs located in the parking lots. In one embodiment, instance of PMD 114104 located in parking lot 114118a can receive tags provided by PD 114108a, and another instance of PMD 114104 located in parking lot 114118b can receive tags provided by PD 114108b.

Instances of PMD 114104 can include a connector 114106 adapted to connect to one end 114110 of cable 114112. Cable 114112 can allow for PMD 114104 to communicate with entities (e.g, computers, servers, media players, portable media devices, routers, switches, firewalls, or the like) in network 114114. Network 114114 can include a network of entities such as the internet. In some embodiments, cable 114112 can be an Ethernet cable. In other embodiments, PMD 114104 can include a wireless interface (eg., 802.11b, Wifi, Bluetooth, etc.) that can allow PMD 114104 to communicate with entities in a network without a physical connection.

Fourth Embodiment

The subsequent paragraphs describe another embodiment of the present invention. While the description is with respect to specific embodiments, one skilled in the art will recognize that numerous modifications are possible and elements of different embodiments can be combined and associated with each other as and where necessary.

Structure of Fourth Embodiment

Figure 115:
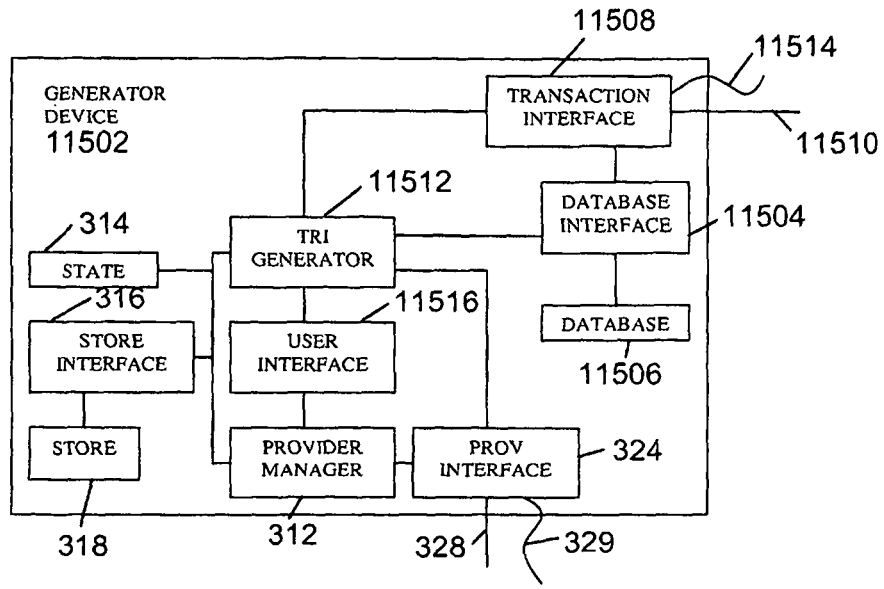
FIG. 115 illustrates a GD for generating tags according to a yet another embodiment of the present invention.

FIG. 115 illustrates a Generator Device (GD) 11502 for generating tag related information according to an embodiment of the present invention. In the embodiment illustrated in FIG. 115, GD 11502 can include STATE 314, SI 316, STORE 318, PMAN 312, PINT 324, antenna 328, cable 329, TRI Generator (TGEN) 11512, user interface (UI) 11516, transaction interface (TINT) 11508, antenna 11510, cable 11514, database interface (DBI) 11504, and database (DB) 11506. In some embodiments of the invention, GD 11502 can be used to generate tag related information using information related to transactions.

Transactions can include events such as purchase of products/services such as at stores, malls, restaurants, etc.; acceptance/provisioning of services such as borrowing books at a library; making payments as in case of rents, bills, etc.; person/entity presenting an identification card; person/entity presenting a club card, a person/entity logging in to a website, or the like. Transactions can be associated with any event that can be distinguished from other events, the distinguishing factors can include information that can be associated with each event. Information related to the events described earlier that can be used for differentiating one event from others, can include one or more of transaction identifier, club card number, user identifier, payment number, account number, credit card number, or the like.

In the embodiment illustrated in FIG. 11502, information related to transaction can be stored in DB 11506 by systems that process transactions. Information related to transactions can also be provided to TGEN 11512 that can associate the transaction with information related to the transaction stored in DB 11506. TGEN 11512 can use the transaction related information provided to it, including any information related to transaction from DB 11506, in generating tag related information. In one embodiment, each purchase made at a store can be associated with an orderId. Information related to the purchase, such as the items purchased, the price of each item, the number of items, including others, can be stored in DB 11506. In such embodiment, each purchase can be associated with a unique orderId. orderId can be provided to TGEN 11512. TGEN 11512 can retrieve information related to orderId from DB 11506 and generate a tag using information retrieved from DB 11506.

DB 11506 can include any combination of circuitry and/or instructions that can allow for storing information related to transactions. An example of a database system can include database systems supported by MySql, Oracle databases, or the like. DB 11506 can be accessed using DBI 11504. DB 11506 can also include a storage aspect that can be implemented using nonvolatile storage (e.g., magnetic or optical disk, flash memory or other storage media) and can thus store database records related to transactions indefinitely, regardless of whether power is continuously supplied to GD 11502. DBI 11504 can include any combination of circuitry and/or instructions that can allow for accessing contents of DB 11506. In one embodiment, DBI 11504 can be implemented in software using JDBC (Java Data Base Connectivity). Other methods of implementing DBI 11504 are possible.

TINT 11508 can include any combination of circuitry and/or instructions that can allow for storing information related to transactions in DB 11506, providing information related to transactions to TGEN 11512, including others.

TINT 11508 can include an aspect that can allow storing information related to transactions in DB 11506. In one embodiment TINT 11508 can allow for storing transaction related information in DB 11506 by providing a software interface that can be implemented using mechanisms such as CORBA, Java RPC, or the like. The software interface can be used by transaction systems to store transaction related information for some/all transactions in DB 11506.

In one embodiment of the invention, transactions can be associated with purchases. Each purchase can be uniquely identified using an orderId, that can be a sequence of digits. Each purchase can result in TINT 11508 receiving information related to the purchase such as orderId, items purchased, number of items, prices of each time, etc., that can be stored in DB 11506 by TINT 11508. In some embodiments of the invention, TINT 11508 can be related to aspects that can include communicating with purchase order systems. Purchase order systems such as Cash Register Express sold by International Point of Sale, Microsoft Dynamic Point of Sale 2009 from Microsoft Corp., Microsoft Retail Management System from Microsoft Corp., etc. can be used in Grocery stores to help facilitate purchases made by customers, including other functionality. Purchase order systems similar to the ones illustrated above can communicate with TINT 11508 in providing information related to each purchase. TINT 11508 in such embodiment can store information related to purchases, provided by purchase order systems, in DB 11506 using DBI 11504.

TINT 11508 can include another aspect that can allow for providing transaction related information to TGEN 11512. In some embodiments, TINT 11508 can be used to provide information related to one or more transactions to TGEN 11512. In one embodiment TINT 11508 can allow for providing some/all of transaction related information to TGEN 11512 by providing a software interface that can be implemented using mechanisms such as CORBA, Java RPC, or the like. The software interface can be used by transaction systems to provide transaction related information for some/all transactions in the system.

In the embodiment of purchase order system described earlier, Purchase order systems can use TINT 11508 to provide information related to the purchase such as the orderId to TGEN 11512.

TINT 11508 can also be associated with aspects that can allow for communication between aspects of GD 11502 and other systems/devices that can include transaction systems. In one embodiment, TINT 11508 can include components such as TCP sockets, UDP sockets, etc. TINT 11508 can also include components such as NICs, USB interface, or the like. TINT 11508 can also include a connector (not shown) providing mechanical and/or electrical coupling to connect to antenna 11510 capable of sending/receiving messages over a network. TINT 11508 can also include a connector (not shown) providing mechanical and/or electrical coupling to cable 11514 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. TINT 11508 can be connected to antenna 11510 and/or cable 11514 with or without a connector.

TGEN 11512 can include any combination of circuitry and/or instructions that can allow for generating tag related information, related to transactions associated with a transaction system. In the purchase order embodiment, TGEN 11512 can use the orderId provided by TINT 11508 to retrieve transaction related information from DB 11506. Information generated by TINT 11508 can include some or all of information related to transaction retrieved from DB 11506. Tag related information generated by TINT 11508 can also include an orderId. In other embodiments, TINT 11508 can provide additional/other information not illustrated here. The structure of tag related information generated by TGEN 11512 can be specific to the embodiment. An example of tag related information generated by TGEN 11512 is illustrated in FIG. 119. TGEN 11512 can generate tag related information for some/all transactions whose information can be communicated to TGEN 11512 by TINT 11508. Tag related information generated by TGEN 11512 can be communicated to instances of PD associated with the GD.

User interface (UI) 11516 can include any combination of circuitry and/or instructions that can allow for controlling aspects of GD 11502. In some embodiments, UI 11516 can be used to control aspects related to TINT 11514 and/or DB 11506 and/or TGEN 11512. In some embodiments UI 11516 can be used to associate GD 11502 with transaction systems. UI 11516 can also be used to manage DB 11506. UI 1516 can also be used to manage TGEN 11512 that can include specifying the information that can be included in tag related information generated by TGEN 11512. UI 11516 can also be used for controlling and managing aspects of GD 11502 not described here.

Aspects of STATE 314, SI 316, STORE 318, PMAN 312, PINT 324, TGEN 11512, UI 11516, DBI 11504, DB 11506, TINT 11508 can be implemented e.g., using instructions of the computer program product executing on one or more suitably configured microprocessors or microcontrollers (not explicitly shown). Other implementations are also possible.

GD 11502 can also include other aspects in addition to or instead of those shown here. For example, an embodiment of GD 11502 can be included in (or associated with) a set top box that can allow for playing DVDs or storing media. The set top box can be playing media, while at the same time providing tag related information to instances of PD.

Figure 116:
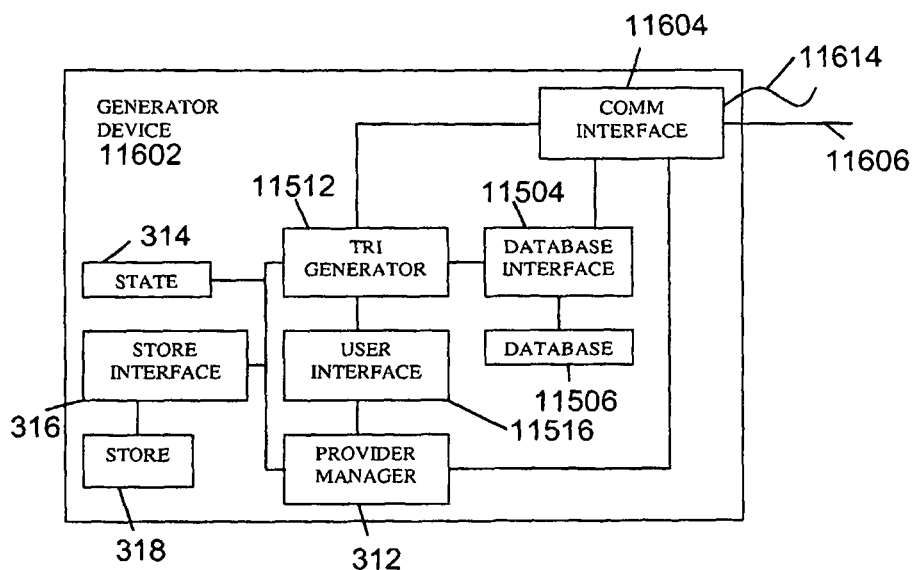

FIG. 116 illustrates a Generator Device (GD) 11602, an embodiment of GD 11502, for generating tag related information according to an embodiment of the present invention. In the embodiment illustrated in FIG. 116, GD 11602 can include STATE 314, SI 316, STORE 318, PMAN 312, TRI Generator (TGEN) 11512, user interface (UI) 11516, communication interface (CINT) 11604, antenna 11606, cable 11614, database interface (DBI) 11504, and database (DB) 11506. In some embodiments of the invention, GD 11602 can be used to generate tag related information using information related to transactions. Aspects of GD 11602 including, STATE 314, SI 316, STORE 318, PMAN 312, TGEN 11512, UI 11516, DBI 11504, and DB 11506 can be similar to the respective aspects associated with GD 11502. In the embodiment illustrated in FIG. 116, GD 11602 can associate with PDs and communicate with transaction systems using CINT 11604.

CINT 11604 can include any combination of circuitry and/or instructions that can allow for GD 11602 in associating with PDs, communicating with transaction systems to store information related to transactions in DB 11506, communicating with transaction systems to provide transaction related information to TGEN 11512, including others. CINT 11604 can include some/all of the functionality/aspects associated with PINT 324 and TINT 11508 of GD 11502. CINT 11604 can include components such as TCP sockets, UDP sockets, etc. CINT 11604 can also include components such as NICs, USB interface, or the like. CINT 11604 can also include a connector (not shown) providing mechanical and/or electrical coupling to connect to antenna 11606 capable of sending/receiving messages over a network. CINT 11604 can also include a connector (not shown) providing mechanical and/or electrical coupling to cable 11614 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. CINT 11604 can be connected to antenna 11606 and/or cable 11614 with or without a connector.

Aspects of STATE 314, SI 316, STORE 318, PMAN 312, TGEN 11512, UI 11516, DBI 11504, DB 11506, CINT 11604 can be implemented e.g., using instructions of the computer program product executing on one or more suitably configured microprocessors or microcontrollers (not explicitly shown). Other implementations are also possible.

GD 11602 can also include other aspects in addition to or instead of those shown here. For example, an embodiment of GD 11602 can be included in (or associated with) a set top box that can allow for playing DVDs or storing media. The set top box can be playing media, while at the same time providing tag related information to instances of PD.

Figure 117:
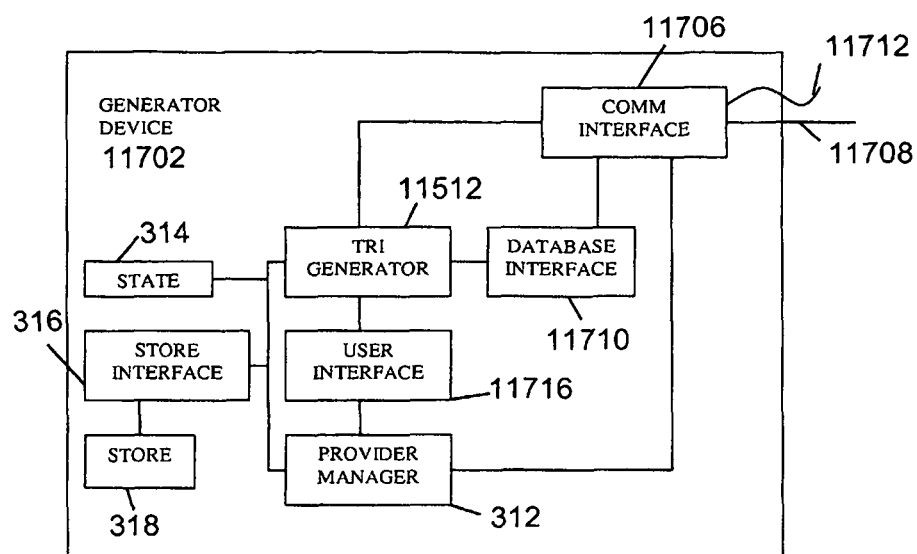

FIG. 117 illustrates a Generator Device (GD) 11702, an embodiment of GD 11602, for generating tag related information according to an embodiment of the present invention. In the embodiment illustrated in FIG. 117, GD 11702 can include STATE 314, SI 316, STORE 318, PMAN 312, TRI Generator (TGEN) 11512, user interface (UI) 11516, communication interface (CINT) 11706, antenna 11708, cable 11712, and database interface (DBI) 11710. In some embodiments of the invention, GD 11702 can be used to generate tag related information using information related to transactions. Aspects of GD 11702 including, STATE 314, SI 316, STORE 318, PMAN 312, TGEN 11512, and UI 11516 can be similar to the respective aspects associated with GD 11602. In the embodiment illustrated in FIG. 117, the database storing information related to transactions is not associated with GD 11702. In this embodiment, database can be stored/managed by systems external to GD 11702. Databases can be managed by a variety of computer systems. Information related to transactions can be accessed from such external databases using DBI 11710. In this embodiment, GD 11702 can associate with PDs and communicate with transaction systems using CINT 11706.

CINT 11706 can include any combination of circuitry and/or instructions that can allow for GD 11702 in associating with PDs, communicating with transaction systems to provide transaction related information to TGEN 11512, communicating with external databases by DBI 11710, including others. Aspect of CINT 11706 in associating with PDs can be similar to the respective aspect associated with CINT 11604 of FIG. 115. Aspect of CD 11706 in communicating transaction related information to TGEN 11512 can be similar to the respective aspect associated with CINT 11604. CINT 11706 can also be associated with aspects that can allow for DBI 11710 to communicate with external databases. In some embodiments, this can be implemented using software aspects such as TCP sockets, UDP sockets, etc. Other methods of allowing DBI 11710 to communicate with external databases are possible. CINT 11706 can include components such as TCP sockets, UDP sockets, etc. CINT 11706 can also include components such as NICs, USB interface, or the like. CINT 11706 can also include a connector (not shown) providing mechanical and/or electrical coupling to connect to antenna 11708 capable of sending/receiving messages over a network. CINT 11706 can also include a connector (not shown) providing mechanical and/or electrical coupling to cable 11712 capable of receiving/sending messages over a network. The network can include wired communication medium such as Ethernet, firewire, cable modem interface, USB or the like. The network can also include wireless medium such as Bluetooth, WiFi, cellular communication network or the like. The network over which the messages are sent can include internet, local area network, wide area network, cellular communication network, 3G communications, or the like. CINT 11706 can be connected to antenna 11708 and/or cable 11712 with or without a connector.

DBI 11710 can include any combination of circuitry and/or instructions that can allow aspects of GD 11702 to communicate with databases external to GD 11702. TGEN 11512 can use DBI 11710 to retrieve information related to a transaction from the external database system. In one embodiment, DBI 11710 can be implemented using software. DBI 11710 can be implemented in software in some embodiments using JDBC (Java DataBase Connectivity). Other methods of implementing DBI 11710 are possible. DBI 11710 can use CINT 11706 in communicating with the external database.

User interface (UI) 11716 can include any combination of circuitry and/or instructions that can allow for controlling aspects of GD 11702. In some embodiments, UI 11716 can be used to control aspects related to TGEN 11512 and/or CINT 11706 and/or DBI 11710. In some embodiments UI 11716 can be used to associate GD 11702 with transaction systems. UI 11716 can also be used to manage DBI 11710. In some embodiments UI 11716 can be used to associate DBI 11710 with an external database. In embodiments where CINT can be associated with IP networks, information related to external database such as an IP address or an IP address and a port number or the like, can be associated with DBI 11710 using UI 11716. DBI 11710 can use such information to associate with external database. UI 11716 can also be used to manage TGEN 11512 that can include specifying the information that can be included in tag related information generated by TGEN 11512. UI 11716 can also be used for controlling and managing aspects of GD 11702 not described here.

Aspects of STATE 314, SI 316, STORE 318, PMAN 312, TGEN 11512, UI 11716, DBI 11710, CINT 11706 can be implemented e.g., using instructions of the computer program product executing on one or more suitably configured microprocessors or microcontrollers (not explicitly shown). Other implementations are also possible.

GD 11702 can also include other aspects in addition to or instead of those shown here. For example, an embodiment of GD 11702 can be included in (or associated with) a set top box that can allow for playing DVDs or storing media. The set top box can be playing media, while at the same time providing tag related information to instances of PD.

Content of Information

FIG. 118 illustrates fields associated with information determined by a GD according to an embodiment of the present invention. The set of information described in FIG. 118 is referred to as FeedbackInfo (FI). The instance of GD described in FIG. 115 can be used to determine information described in FIG. 118. GD 11502 can determine some/all information related to FI using a service that can be implemented using a combination of hardware and/or instructions and/or firmware. Some fields associated with FI such as Questions and submissionLocation can be determined using information provided to GD 11502 (by using various provisioning schemes that can include configuration described in XML, or the like). In some embodiments, a consumerId and an orderId can be provided to GD 11502. The consumerId and orderId fields can be provided by GD 11502 to a service which can provide submissionLocation and Questions associated with FI. An example of such a service is a database system that allows looking up a database using information that can include an orderId, a consumerId and any other information. The consumerId and orderId provided to GD 11502 can be used to determine consumerId and orderId fields of FI, respectively. In other embodiments, GD 11502 can be provided with an orderId and other fields of FI can be determined by GD 11502 using the provided orderId and a service that can be implemented using a combination of hardware and/or instructions and/or firmware. An example of such a service is a database system that allows looking up the database using an orderId. In some embodiments, an instance of FI can be associated with the additionalInfo field of a tag of type Feedback. Some embodiments can choose to include fields not described in FIG. 118, while some other embodiments can choose to exclude some or all of the fields described in FIG. 118. The set of fields associated with FI as described in FIG. 118 is illustrative—for use in the embodiment described here, and is not meant to limit the scope of the invention or any of its embodiments.

FIG. 119 illustrates fields associated with information determined by a GD according to an embodiment of the present invention. The set of information described in FIG. 119 is referred to as OrderInfo (ORI). The instance of GD described in FIG. 115 can be used to determine information described in FIG. 119. GD 11502 can determine some/all information related to ORI using a service that can be implemented using a combination of hardware and/or instructions and/or firmware. Some fields associated with ORI such as numItems and itemInfo can be determined using information provided to GD 11502. In the embodiment described here, a consumerId and an orderId are provided to GD 11502. GD 11502 can then provide the consumerId and orderId fields to a service which can provide numItems and itemInfo associated with ORI to the GD. An example of such a service is a database system that allows looking up a database using information that can include an orderId, a consumerId and any other information. The consumerId and orderId provided to GD 11502 can be used to determine consumerId and orderId fields of ORI, respectively. In other embodiments, GD 11502 can be provided with an orderId and other fields of ORI can be determined by GD 11502 using the provided orderId and a service that can be implemented using a combination of hardware and/or instructions and/or firmware. An example of such a service is a database system that allows looking up the database using an orderId. In some embodiments, an instance of ORI can be associated with the additionalInfo field of a tag of type UserOrderinStore. Some embodiments can choose to include fields not described in FIG. 119, while some other embodiments can choose to exclude some or all of the fields described in FIG. 119. The set of fields associated with ORI as described in FIG. 119 is illustrative—for use in the embodiment described here, and is not meant to limit the scope of the invention or any of its embodiments.

FIG. 120 illustrates fields associated with information determined by a GD according to an embodiment of the present invention. The set of information described in FIG. 120 is referred to as DerivedRatingInfo (DRI). The instance of GD described in FIG. 115 can be used to determine information described in FIG. 120. GD 11502 can determine some of the information related to DRI using one or more services that can be implemented using a combination of hardware and/or instructions and/or firmware.

Some fields associated with DRI such as itemId can be determined by the GD. Some fields associated with DRI such as consumerId can be provided to the GD. Some other fields associated with DRI such as groupId, consIdInGroup and groupAvgRating can be determined using a service that can be implemented using a combination of hardware and/or instructions and/or firmware. The service can also be provided using a network of computer systems, PCs, servers, etc.

An example of such an embodiment is where consumerId represents a user-identifier of a user of CD. consumerId can be provided by the CD to the GD. The itemId is a list of items available at a restaurant. groupId can be associated with an identifier that can be used to identify a list of friends associated with the user of CD on a social networking website such as facebook. consIdInGroup can represent the user-id of the user on social networking website (SNW) and which can be provided to GD 11502 by the CD. groupAvgRating associated with DRI can be determined by GD using rating of each item provided by friends of the user. GD 11502 can be associated with a system of software and/or hardware and/or firmware that can help access services provided by SNW, in retrieving the list of friends associated with a user. Information regarding rating of items as provided by the friends can be determined using a service associated with the GD. An example of such a service is a database system that can be looked up using an identifier that can identify a user on SNW. The result of the database lookup can be the ratings provided by the user (friends in the example embodiment) for the items available at the restaurant.

Some embodiments can choose to include fields not described in FIG. 120, while some other embodiments can choose to exclude some or all of the fields described in FIG. 120. The set of fields associated with DRI as described in FIG. 120 is illustrative—for use in the embodiment described here, and is not meant to limit the scope of the invention or any of its embodiments. The set of services used to determine the fields, the order and/or method of using the services, the information used to lookup the services, and the services themselves are all illustrative. Other embodiments can use other services and can use other information to determine the information associated with DRI. In some embodiments, an instance of DRI can be associated with the additionalInfo field of a tag of type DerivedRating.

Methods of Fourth Embodiment

Figure 121:
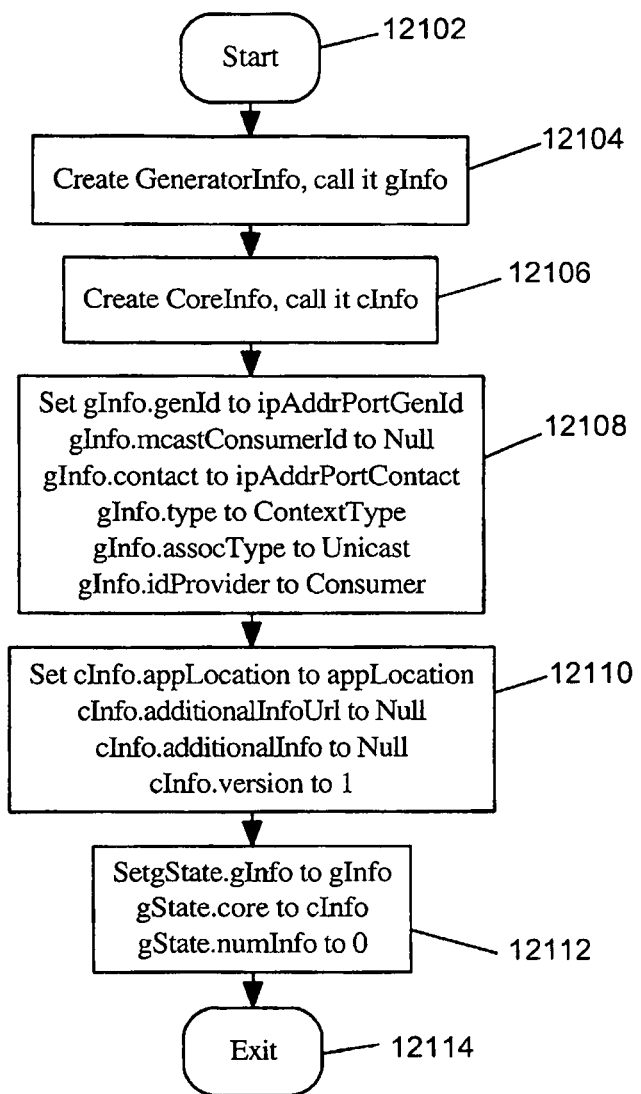

FIG. 121 illustrates the flow diagram of a process followed by a GD in initializing part of state (gState) associated with the GD according to an embodiment of the present invention. In the embodiment of the invention described here, the process illustrated in FIG. 121 can be used by an instance of GD 11502 (illustrated in FIG. 115) in initializing some or all of gState associated with the GD. The embodiment of GD 11502 as described here can be used in various environments. Embodiments of GD 11502 can determine tag related information that can be associated with tags of type OrderInfo or Feedback, or other embodiments which can include generating information that can be associated with transactions.

gState.core associated with an instance of GD 11502 can be used to maintain information specific to each embodiment. The structure of information that can be associated with gState.core.additionalInfo in some of the embodiments is illustrated in FIG. 118-119

Information related to tags generated by GD 11502 can be determined using data generated by TGEN 11512. The method illustrated in FIG. 121 can be used by GD 11502 before GD 11502 can start associating with instances of PD 240, in some embodiments of the invention. The structure of information maintained in gState, the initialization of values associated with gState, the values associated with information maintained in gState, and the methods used in initialization as illustrated in FIG. 121 is specific to the embodiment described here, and is not meant to be limiting the scope of the invention or any of its embodiments.

The process starts at step 12102 and moves to step 12104. At step 12104, an instance of GeneratorInfo is created. The created instance is referred to as gInfo for use in subsequent steps of the process. The process can then move to step 12106. At step 12106, an instance of CoreInfo is created. The created instance is referred to as cInfo for use in subsequent steps of the process. The creation of an instance of GeneratorInfo in step 12104 and/or an instance of CoreInfo in step 12106, can involve allocation of memory, control data structures, state handles, or the like. In some embodiments, the creation of these instances can involve just allocation of memory. In yet other embodiments, the creation of instances can involve allocating state handles in addition to allocating sufficient memory for the instances. The process can then move to step 12108.

At step 12108, fields associated with gInfo can be initialized. gInfo.type is set to type associated with tags, that the information generated by GD 11502 can be used for. In one embodiment, the type can be set to FeedbackInfo. In other embodiment the type can be set to OrderInfo. gInfo.assocType can be set to Unicast, which can indicate that the tags related to information generated by this GD, and provided by an instance of PD can be used by an instance of CD 102. gInfo.idProvider can be set to Consumer and gInfo.mcastConsumerId can be set to Null. A value of Consumer for gInfo.idProvider can indicate that a CD 102 associating with a PD 240 is the provider of identifier associated with CD 102, the identifier that can be used in relation to association with the PD. A value of Null for gInfo.mcastConsumerId can indicate that it does not hold a valid value.

At step 12108, gInfo.genId is set to ipAddrPortGenId. gInfo.genId is an identifier that can be used to identify an instance of GD 11502 among all GDs. In the embodiment of the present invention described here, the communication between the PD and GD happens using messages sent using UDP. In such embodiment, gInfo.genId can be set to a combination of the IP address and port number associated with the UDP port. The IP address and port number can be the IP address and port number of UDP port associated with GD 11502. An ipAddrPortGenId can be determined by multiplying the IP address with 65536 and adding portId to the resulting value. The method of determining ipAddrPortGenId described here is illustrative only. Other methods can be used to determine gInfo.genId. Methods specific to the embodiments can also be used.

gInfo.contact can be set to information that can be used to send messages to the GD that is associated with the gInfo. In the embodiment described here, gInfo.contact can be set to a combination of IP address and port number that the GD can use to communicate messages with instances of PD 240.

The process can then move to step 12110. At this step, cInfo.version is set to 1, cInfo.appLocation can be set to a location that can be a URL, cInfo.additionalInfoUrl can be set to Null. Null value for additonalInfoUrl of cInfo can be used to indicate that the field does not hold valid value. The URL associated with cInfo.appLocation can be related to a URL where application that can process tags of type gInfo.type, can be downloaded from. The process can then move to step 12112. At step 12112, gState.gInfo is set to gInfo, gState.core is set to cInfo and gState.numInfo is set to 0. A value of 0 for gState.numInfo can indicate that the GD is not associated (yet) with any instances of PD 240, and that gState.providerInfo list is empty. The process can then move to step 12114. Step 12114 indicates that the process associated with FIG. 121 is complete.

Figure 122:
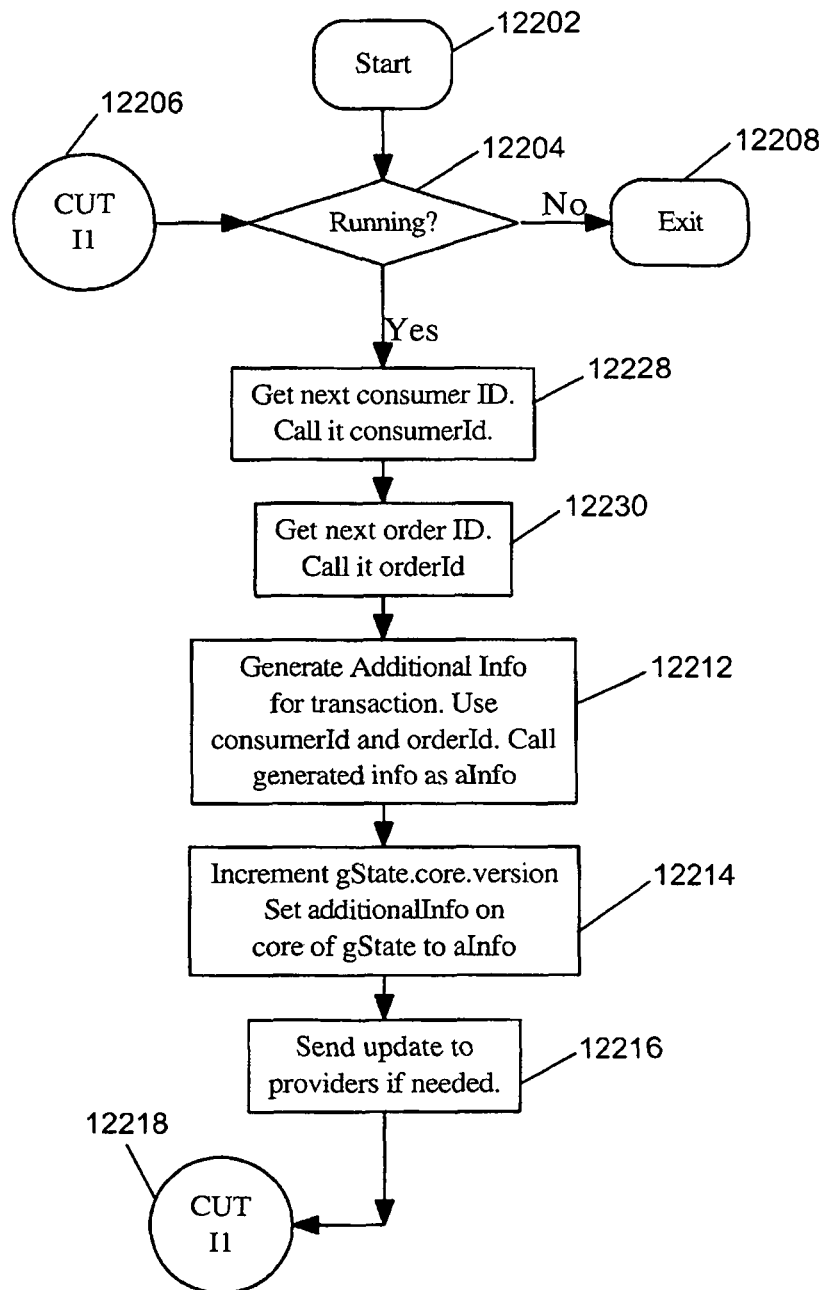

FIG. 122 illustrates the flow diagram of a process followed by a GD in determining information that can be included in tags, and communicating the tag related information according to an embodiment of the present invention.

In one embodiment of the invention, an instance of GD 11502 as illustrated in FIG. 115 can use the process illustrated in FIG. 122 in determining tag related information, using mechanisms that can include communicating with transaction related systems. In the embodiment of the invention described here, GD 11502 can communicate with transaction related systems and/or services to determine gState.core.additionalInfo. The structure and content of gState.core.additionalInfo can be embodiment specific. Examples of embodiment specific information that can be associated with gState.core.additionalInfo are illustrated in FIG. 118-119. Information associated with gState can be used by the GD to send messages including tag related information to PDs associated with the GD.

In one embodiment of the invention GD 11502 can be associated with, a transaction system which can be used to collect feedback from users of CD 102, in relation to orders placed by users associated with instances of CD 102. Orders can be placed by users for purchases and/or services. The transaction system can help collect feedback from users placing orders. In some embodiments, GD 11502 can facilitate collection of feedback by generating tag related information that can help in providing tags to instances of CD, the tag related information including order identifier, consumer identifier, a list of questions associated with feedback, and the like. In one embodiment, the tag related information generated by GD 11502 is illustrated in FIG. 118.

In other embodiment of the invention GD 11502 can be associated with a transaction system that can be used by the GD to determine some/all orders associated with the transaction system. Orders can be placed by users for purchases and/or services. The transaction system can help communicate order placement information to GD 11502. Order placement information communicated by transaction system can include an order identifier and a consumer identifier. In one embodiment of the invention described here, transaction related information can be used by GD 11502 to determine tag related information that can provide information related to an order. Information related to an order can include items purchased, services delivered, the price associated with the products/services, the date and time of the order, or the like. In one embodiment, the tag related information generated by GD 11502 is illustrated in FIG. 119.

Transaction interface (TINT) 11508 associated with GD 11502 of FIG. 115 can provide an order identifier and a consumer identifier related to each of the placed order, to TGEN 11512 of GD 11502. Aspects of TINT can be implemented in software. In embodiments wherein aspects of TINT can be associated with software, TINT can be associated with software interfaces that can be used by the purchase order system to communicate order identifier and consumer identifier for each order associated with the transaction system. Consumer and order identifiers associated with orders can be provided by the purchase order system to GD 11502 using TINT 11508, for all orders placed with the purchase order system, in one embodiment. In other embodiments, purchase order systems can provider order identifier and consumer identifier for a selected set of orders associated with the system. When a consumer identifier is provided to TGEN 11512 by TINT 11508, the identifier can be associated with the consumer-id of CD 102 associated with the user placing the order. In some embodiments, wherein smart phones can include functionality associated with CD 102, consumer identifier can be the phone number associated with voice service of smart phone. In some embodiments, purchase order systems can use DATABASE 11506 to store order related information before communicating order identifier and consumer identifier to TINT 11508. In such embodiments, the order identifier associated with information provided to TGEN 11512 by TINT 11508, can be associated with an order maintained/stored in DATABASE 11506.

The methods used in communicating with transaction systems, the information provided by transaction systems, the method of determining information related to gState.core.additionalInfo, the methods of communicating the determined information to PDs and other functionality as illustrated in FIG. 122 is meant for use by the embodiment(s) described here. Other embodiments can communicate with other types of transaction systems, can determine information different from what is described here, and communicate the tag related information to PDs in ways not described here. The methods and processes illustrated in FIG. 122 are not meant to be limiting the scope of the invention or any of its embodiments.

The process starts at step 12202 and moves to step 12204. At step 12204, a check is done to determine if GD 11502 is currently active. GD 11502 can be determining tag related information and communicating the information to PDs while it is active, in some embodiments. In some embodiments, some/all of methods illustrated in FIG. 122 can be implemented using software. In such embodiments, GD 11502 can be determining and communicating tag related information while the software is active or running. If GD 11502 and/or related processes are not active, the process can move to step 12208. Step 12208 indicates that the process associated with FIG. 122 is complete.

If at step 12204, it is determined that the GD (and/or any processes related to FIG. 122) is active, the process can move to step 12228. At step 12228, TGEN 11512 gets consumer identifier related to an order from TINT 11508. The identifier is referred to as consumerId for use in subsequent steps of the process. The process can then move to step 12230. At step 12230, TGEN 11512 gets order identifier related to the order from TINT 11508. The identifier is referred to as orderId for use in subsequent steps of the process. The process can then move to step 12212.

Figure 123:
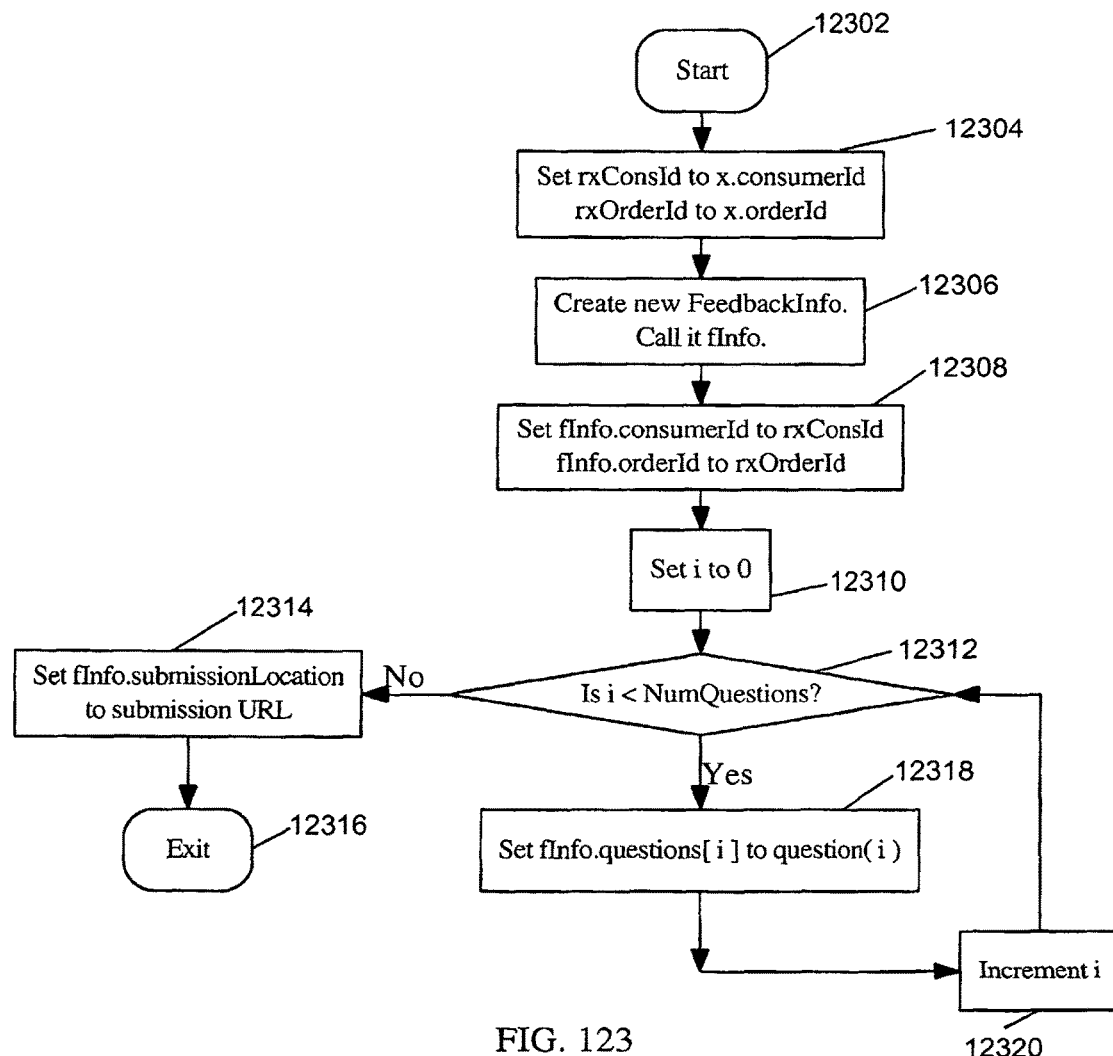
Figure 124:
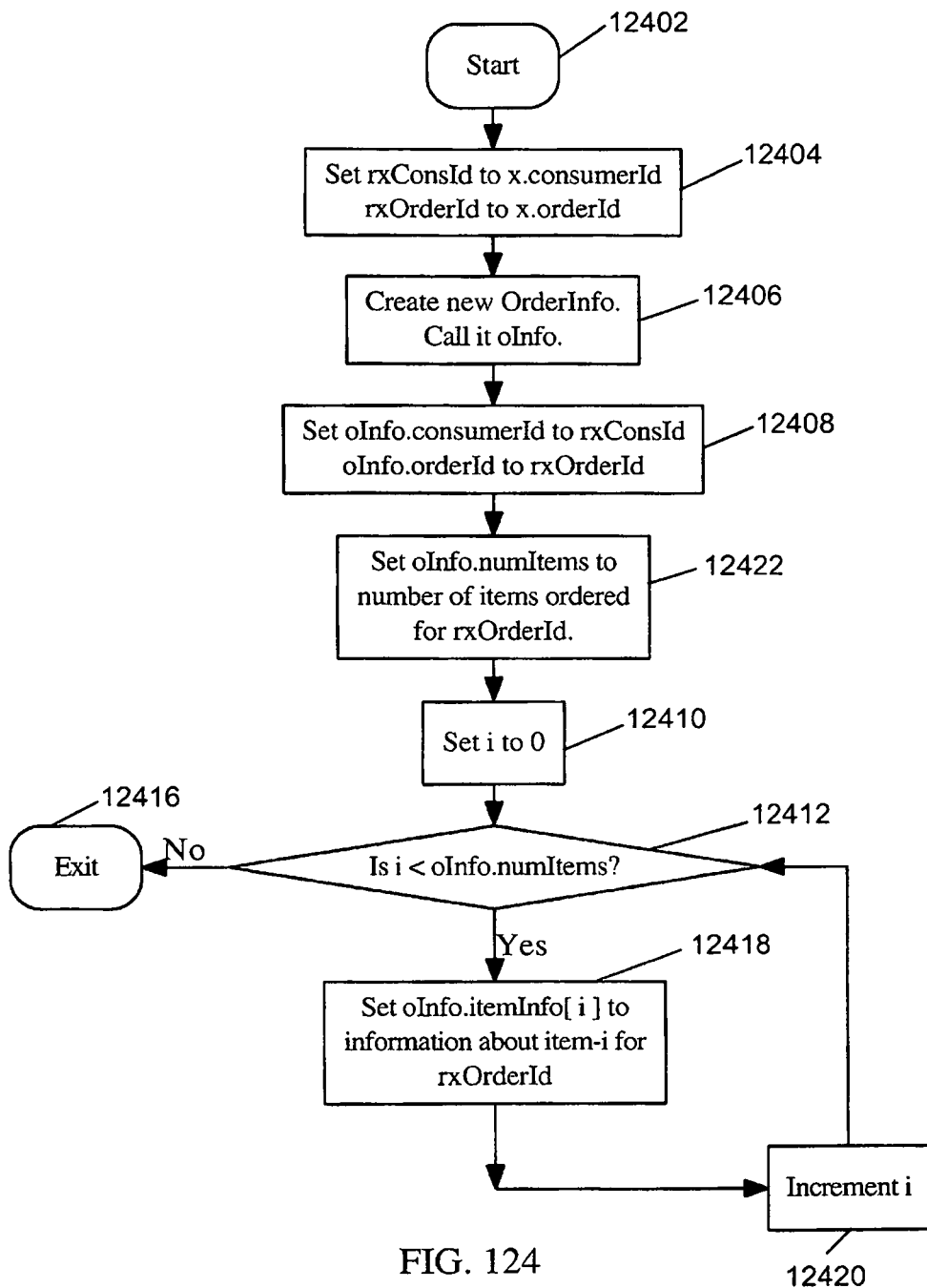

At step 12212, TGEN 11512 of GD 11502 can determine the information that can be associated with gState.core.additionalInfo. The method of determining information can be specific to each embodiment. FIG. 123-124 illustrate methods of determining information in different embodiments. Information determined at this step is referred to as newAdditionalInfo for use in subsequent steps of the process. Embodiments of the invention can use consumerId and orderId determined in earlier steps to determine newAdditionalInfo. The process can then move to step 12214. At step 12214, TGEN 11512 can set gState.core.additionalInfo to newAdditionalInfo determined at step 12212. gState.core.version can be incremented in this step. The process can then move to step 12216. At step 12216, messages including information determined in earlier steps can be sent to PDs associated with the GD. Tag related information generated by the GD can be communicated to PDs differently in different embodiments. In the embodiment illustrated here, tag related information can be communicated to PDs every time information is generated by the GD. The method illustrated in FIG. 89 can be used by the GD in communicating the tag related information. The process can then move to step 12218. Step 12218 indicates that the process can move to step 12206. Step 12206 indicates that the process can move to step 12204.

FIG. 123 illustrates the flow diagram of a process followed by a GD in determining part of information that can be included in tags associated with Feedback type, according to an embodiment of the present invention. In the embodiment of the invention described here, GD 11502 can be associated with a transaction system.

Transactions can include events such as purchase of products/services such as at stores, malls, restaurants, etc.; acceptance/provisioning of services such as borrowing books at a library; making payments as in case of rents, bills, etc.; or the like. Transactions can be associated with any event that can be distinguished from other events, the distinguishing factors can include information that can be associated with each event. Information related to the events described here that can be used for differentiating one event from others, can include one or more of transaction or order identifier, club card number, user identifier, payment number, account number, credit card number, or the like.

In the embodiment described here, transactions can be associated with a purchase and each transaction can be differentiated from other using an order identifier. GD 11502 in this embodiment can use the information presented by the transaction system to determine tag related information, an example structure of which is illustrated in FIG. 118. The information illustrated in FIG. 118 can be associated with gState.core.additionalInfo. In one embodiment, GD 11502 can use the process illustrated in FIG. 122 to determine tag related information associated with tags of type Feedback. In such embodiment, the process illustrated in FIG. 123 can be used as part of determining information in step 12212 of FIG. 122. The process illustrated in FIG. 123 can be used to determine information associated with gState.core.additionalInfo. The methods of communicating information from transaction systems to TGEN 11512, and the method of determining information associated with gState.core.additionalInfo, and other methods/processes illustrated in FIG. 123 are meant for use by the embodiment described here. Other embodiments can use other methods, can choose to include/determine information not described here, can choose to exclude some/all of the information described here, and the process of FIG. 123 is not meant to be limiting the scope of the invention or any of its embodiments.

The process starts at step 12302 and move to step 12304. At step 12304, information associated with instance x is extracted. x.consumerId provided to this process is extracted and a local copy made for use in subsequent steps of the process. The local copy is referred to as rxConsId. x.orderId provided to this process is extracted and a local copy made for use in subsequent steps of the process. The local copy is referred to as rxOrderId. The process can then move to step 12306.

At step 12306, an instance of FeedbackInfo (FI) illustrated in FIG. 118 is created. The created instance is referred to as fInfo for use in subsequent steps of the process. The creation of an instance of FI in step 12306, can involve allocation of memory, control data structures, state handles, or the like. In some embodiments, the creation of instance can involve just allocation of memory. In yet other embodiments, the creation of instance can involve allocating state handles in addition to allocating sufficient memory for the instances. The process can then move to step 12308.

At step 12308, fInfo.consumerId is set to rxConsId, and fInfo.orderId set to rxOrderId. The process can then move to step 12310. At step 12310, an i is set to 0. The process can then move to step 12312. At step 12312, a check is made to determine if i is less than the number of questions that can be associated with fInfo. If the check passes, the process can move to step 12318. If not, the process can move to step 12314.

At step 12314, fInfo.submissionLocation can be set to submission URL. Submission URL can indicate a URL where the results of the feedback can be submitted. fInfo is the result of process illustrated in FIG. 123. The process can then move to step 12316. Step 12316 indicates that the process associated with FIG. 123 is complete.

Returning to step 12318, i-th element of fInfo.quesiton can be set to a feedback question. The feedback question for each of the elements of fInfo.question can be different. The set of feedback questions associated with fInfo.question list can be same for all instances of FI created by this process. In other embodiments, the set of questions can be determined based on information that can be related to one or more of order identifier, consumer identifier, or any other information related to the order. In an example embodiment wherein the phone number associated with a voice service is used as consumer identifier, the set of questions associated with fInfo.question can be determined based on the area code associated with the phone number. Other methods of determining questions are possible. The process can move to step 12320. At step 12320, is incremented and the process can move to step 12312.

FIG. 124 illustrates the flow diagram of a process followed by a GD in determining part of information that can be included in tags associated with OrderInfo type, according to an embodiment of the present invention. In the embodiment of the invention described here, GD 11502 can be associated with a transaction system.

Transactions can include events such as purchase of products/services such as at stores, malls, restaurants, etc.; acceptance/provisioning of services such as borrowing books at a library; making payments as in case of rents, bills, etc., or the like. Transactions can be associated with any event that can be distinguished from other events, the distinguishing factors can include information that can be associated with each event. Information related to the events described here that can be used for differentiating one event from others, can include one or more of transaction or order identifier, club card number, user identifier, payment number, account number, credit card number, or the like.

In the embodiment described here, transactions can be associated with a purchase and each transaction can be differentiated from other using an order identifier. GD 11502 in this embodiment can use the information presented by the transaction system to determine tag related information, an example structure of which is illustrated in FIG. 119. The information illustrated in FIG. 119 can be associated with gState.core.additionalInfo. In one embodiment, GD 11502 can use the process illustrated in FIG. 122 to determine tag related information associated with tags of type OrderInfo. In such embodiment, the process illustrated in FIG. 124 can be used as part of determining information in step 12212 of FIG. 122. The process illustrated in FIG. 124 can be used to determine information associated with gState.core.additionalInfo. The methods of communicating information from transaction systems to TGEN 11512, and the method of determining information associated with gState.core.additionalInfo, and other methods/processes illustrated in FIG. 124 are meant for use by the embodiment described here. Other embodiments can use other methods, can choose to include/determine information not described here, can choose to exclude some/all of the information described here, and the process of FIG. 124 is not meant to be limiting the scope of the invention or any of its embodiments.

The process starts at step 12402 and move to step 12404. At step 12404, information associated with instance x is extracted. x.consumerId provided to this process is extracted and a local copy made for use in subsequent steps of the process. The local copy is referred to as rxConsId. x.orderId provided to this process is extracted and a local copy made for use in subsequent steps of the process. The local copy is referred to as rxOrderId. The process can then move to step 12406.

At step 12406, an instance of OrderInfo (OI) illustrated in FIG. 118 is created. The created instance is referred to as oInfo for use in subsequent steps of the process. The creation of an instance of OI in step 12406, can involve allocation of memory, control data structures, state handles, or the like. In some embodiments, the creation of instance can involve just allocation of memory. In yet other embodiments, the creation of instance can involve allocating state handles in addition to allocating sufficient memory for the instances. The process can then move to step 12408.

At step 12408, oInfo.consumerId is set to rxConsId, and oInfo.orderId set to rxOrderId. The process can then move to step 12422. At this step, TGEN 11512 can access information related to the order from DATABASE 11506 using DBI 11504. Information related to the order can be associated with the database by purchase order system using TINT 11508 and DBI 11504, before the process associated with FIG. 122 and FIG. 124 are used for the order. At step 12422, information related to the order can be accessed by providing information to the database that can include rxOrderId. Other information specific to the embodiment can be provided. Information related to the order retrieved from DATABASE 11506 can include number of items associated with the order, information related to each item in the order, among others. Information related to each item associated with an order can include the item name, the price of the item, the category of the item, or the like. Other information related to the order can be retrieved from the database in other embodiments. At step 12422, oInfo.numItems can be set to the number of items associated with the order related to rxOrderId as determined using information retrieved from database. The process can then move to step 12410.

At step 12410, an i is set to 0. The process can then move to step 12412. At step 12412, a check is made to determine if i is less than oInfo.numItems. If the check passes, the process can move to step 12418. If not, the process can move to step 12416. oInfo is the result of process illustrated in FIG. 124. In embodiments where process associated with FIG. 124 is used in determining newAdditionalInfo at step 12212 of FIG. 122, oInfo can be used as newAdditionalInfo at step 12212 of FIG. 122. Step 12416 indicates that the process associated with FIG. 124 is complete.

Returning to step 12418, i-th element of oInfo.itemInfo can be set to information retrieved from database in relation to the i-th item associated with the order. The process can move to step 12420. At step 12420, i is incremented and the process can move to step 12412.

System of Fourth Embodiment

Figure 125:
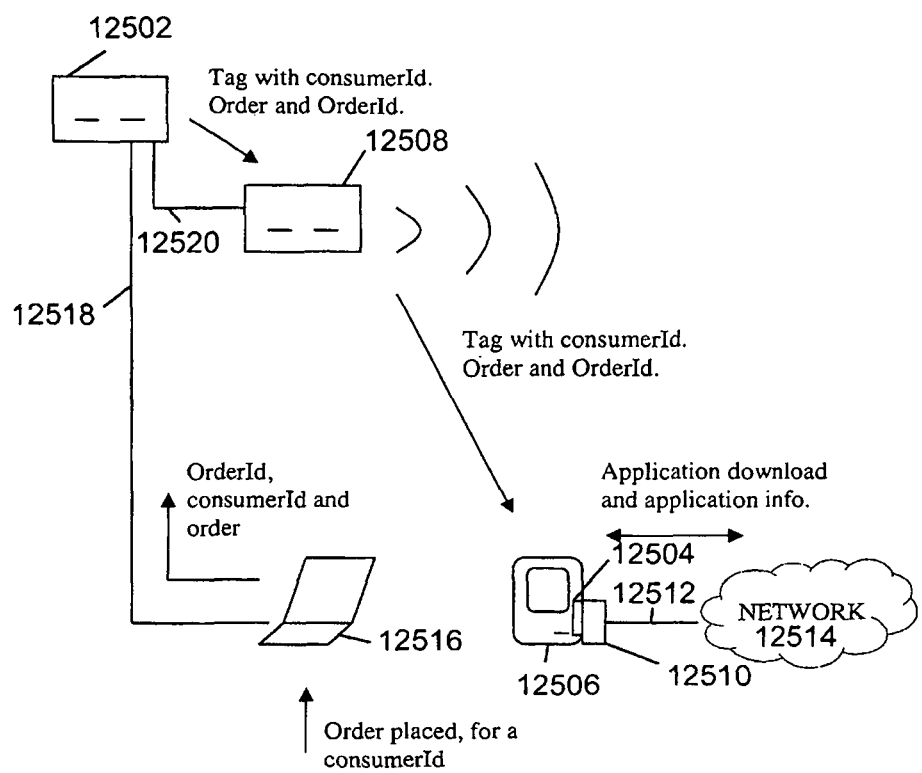

FIG. 125 illustrates an embodiment of a system wherein GD 12502 embodies aspects of GD 11602 in generating tag related information associated with transactions. PD 12508 of FIG. 125 embodies aspects related to PD 240, and PMD 12506 embodies aspects related to CD 140. In one embodiment, system illustrated in FIG. 125 can be used to provide tags to instances of PMD 12506 wherein the tags can provide information related to transactions—such as in a grocery store, restaurant, coffee shops, libraries or the like. Aspect 12516 of the embodiment relates to performing transactions in the embodiment. In one embodiment, aspect 12516 can be associated with a computer system. In other embodiment, aspect 12516 can be associated with a system of one or more computers. In yet other embodiments, computer systems associated with aspect 12516 can be connected to each other using networks, connected to database systems, or the like. Aspect 12516 can also be associated with accessories that can include a card reader (such as a credit card reader), bar code scanner, keyboards or the like. In some embodiments, aspect 12516 can relate to purchases made at a store, booked checked out at a library, order placed at a restaurant, or the like.

In the embodiment illustrated in FIG. 125, aspect 12516 relates to performing transactions that relate to 'orders associated with purchases' placed with 12516. For a user associated with a consumerId, an order can be placed with aspect 12516. Aspect 12516 can then provide an orderId associated with the order, consumerId associated with the consumer placing the order, and other information related to the order, including others, to GD 102.

consumerId in one embodiment can be a code associated with a club card of the user placing the order. In other embodiment, consumerId can represent the telephone number associated with the telephone service of PMD 12506. In yet other embodiment, consumerId can represent a random number generated by PMD 12506. consumerId can be provided to aspect 12516 using a variety of mechanisms. In one embodiment consumerId representing a code associated with a club card can be provided to aspect 12516 by swiping the club card in a card reader (such as those associated with credit card swipe-readers) associated with aspect 12516. In other embodiment, a telephone number associated with telephone service of PMD 12506 can be provided to aspect 12516 using the user interface (such as a keyboard, touch screen, or the like) of aspect 12516. In yet other embodiment, a random number generated by PMD 12506 can be provided to aspect 12516, wherein the PMD 12506 can display a bar code associated with the random number on the display of PMD 12506, and a bar code scanner associated with aspect 12516 can scan the bar code displayed by PMD to determine the consumerId. Other consumerIds and methods of providing consumerId to aspect 12516 are possible. In one embodiment, aspect 12516 can provide consumerId, orderId and order related information to GD 12502 using cable 12518. In some embodiments, aspect 12516 and GD 12502 can include wireless interfaces that can allow aspect 12516 and GD 12502 to communicate with each other without using a physical connection. In yet other embodiments, aspect 12516 and GD 12502 can communicate with each other using a network of entities such as a network (e.g., Internet).

GD 12502, upon receiving information related to a transaction, can generate information related to the transaction. Tag related information generated by GD can include consumerId, orderId and information related to the order. Tag related information can include other information not described here. The information generated by GD 12502 can be provided by the GD to PD 12508 using cable 12520. In other embodiments GD 12502 and PD 12508 can include wireless interfaces (e.g., Wifi, etc.) that can allow GD 12502 and PD 12508 in communicating tag related information.

PD 12508 can provide tags using information communicated by GD 12502, to PMD 12506. In the embodiment described here, PD provides tags to PMDs using wireless communication. Wireless communication can include mechanism such as Bluetooth, wifi, or the like. The tags provided to PD can include consumerId, orderId and order related information. A tag is provided by PD to a PMD wherein the consumerId included in the tag can be same as the consumerId of PMD 12506, or user associated with PMD 12506.

In some embodiments, more than one instance of PMD 12506 can receive the tag provided by PD 12508. PMD 12506 upon receiving a tag, can check the consumerId included in the tag against the consumerId associated with user of PMD 12506 before accepting the tag for further processing. In embodiments where consumerId represents a telephone number associated with telephone service of PMD 12506, the PMD can accept the tag when the consumerId included in the tag matches the telephone number associated with PMD 12506. In embodiments where consumerId represents a club card number associated with user of PMD 12506, PMD 12506 can compare the consumerId included in the tag against a list of club card numbers that can be stored in the storage included in PMD 12506. Other methods of comparing/verifying consumerIds are possible.

In other embodiments, PD 12508 can provide tag to only one PMD 12506. This can be possible in embodiments wherein the wireless communication can allow for only one transmitter and one receiver at a given time. A form of Bluetooth communication can be used to implement such communication scheme. With passage of time, the PMD 12506 that can be receiving the tag provided by PD 12508 can change. For example, a user associated with PMD 12506, placing an order can associate PMD 12506 using Bluetooth technology to a PD 12508 to receive the tag. In such embodiment, PMD 12506 can be disassociated from PD 12508 once the PMD receives the tag.

In yet other embodiments, PD 12508 can be associated with PMD 12506 using a cable such as USB, Ethernet, firewire, or the like. In other embodiments, PD 12508 can communicate tags to PMD 12506 over a network of entities that can include switches, routers, bridges, hubs, computer systems, or the like. An example of such embodiment can include the internet.

Instances of PMD 12506 can include a connector 12504 adapted to connect to one end 12510 of cable 12512. Cable 12512 can allow for PMD 12506 to communicate with entities (e.g, computers, servers, media players, portable media devices, routers, switches, firewalls, or the like) in network 12514. Network 12514 can include a network of entities such as the internet. In some embodiments, cable 12512 can be an Ethernet cable. In other embodiments, PMD 12506 can include a wireless interface (eg., 802.11b, Wifi, Bluetooth, etc.) that can allow PMD 12506 to communicate with entities in a network without a physical connection.

It is to be noted that while the embodiment illustrated in FIG. 125, illustrates the use of one GD 12502, one PD 12508 and one PMD 12506, other embodiments can include more than one GD and/or more than one PD and/or more than one CD. The number of devices of each type, the aspects (such as 12516) as illustrated in FIG. 125 is not meant to be limiting the scope of the invention or any of its embodiments. Other embodiments can choose to use methods of communication not described here.

Further Embodiments

While the invention has been described with respect to specific embodiments, one skilled in the art will recognize that numerous modifications are possible. For instance, the information exchanged in messages and/or the set of messages and/or state maintained by different aspects can be different from what is described in the embodiments. One or more of the methods of association among GDs and PDs, methods of association among PDs and CDs, methods of communicating or determining TRI, methods of communicating or determining tags, methods of application selection, methods of executing/managing/retrieving/accessing applications, the user interfaces associated with GDs and/or PDs and/or CDs can be different in various embodiments. In some embodiments, a PD can be adapted to be capable of associating with more than one GD either at the same time or different times. Each instance of GD can be adapted to provide TRI associated with tags of different types in some embodiments. In some embodiments, PD can be adapted to provide tags of different types.

In some embodiments, a CD can be associated with user interface that can allow the CD to indicate the association of CDs to PDs, receipt of tags from PDs, or the like. User interfaces can include one or more of notification bar such as one associated with Android Operating System, an application such as one associated with Android Operating System, or the like. In some embodiments, some or all of functionality associated with CD such as determination of application, retrieving of application, and others, as described in various embodiments can be embedded in one or more applications or aspects associated with the CD. For example, the aspect of determining and retrieving an application can be included in an application that allows for making phone calls. In some embodiments, GDs can associate with PDs, PDs can associate with CDs, etc. using methods and/or technologies different from what is described in the embodiments illustrated with the invention.

In some embodiments, the tag can be communicated to a user of CD, which the user can manually provide to the CD via the user interface of the CD. An example of such embodiment is where a telephone number is used as a tag. A telephone number can be conveyed to a user of CD, and the user can provide the telephone number to the CD using the user interface of CD. Other embodiments can choose to provide tags using mechanisms different from what are described in various embodiments of the invention.

CDs, PDs, GDs and other devices described in various embodiments can have additional functionality. For example, a portable media device that is an instance of CD, can include functionality to make telephone calls, voice recorder capability, personal information management capability (e.g., calendar, contacts list, e-mail, etc.). Further, in some embodiments, some or all of the functionality described in connection with an PD and/or GD could be included in a CD. For example, the CD might be configured to receive tags from PDs in a manner consistent with the methods described in various embodiments, while at the same time providing tags to other CDs. PD and/or GD could be packaged with a CD and sold as a unit. Various other combinations of CD, PD and GD are possible.

Embodiments of the present invention can be applied to a wide variety of services that can include services related to provisioning/consumption of media such as audio, video, etc. as in case of watching video, listening to audio, etc.; browsing of web; services at grocery stores, restaurants, malls, theatres, other stores, etc.; services at places such as parking lots, ticket counters, etc.; transaction services such as borrowing of books in a library, purchase of products, etc.; or the like. Embodiments of the invention can be used in association with systems and/or services different from the above listed set of systems and/or services.

Embodiments of the present invention can be realized using any combination of dedicated components and/or programmable processors and/or other programmable devices. While the embodiments described above may make reference to specific hardware and components, those skilled in the art will appreciate that different combinations of hardware and/or firmware and/or instructions components may also be used and that particular operations described as being implemented in hardware might also be implemented in software and/or firmware and vice versa. Functions described as being implemented in firmware can be implemented in hardware and/or instructions and vice versa. Similarly functions described as being implemented in software can be implemented in hardware and/or firmware and vice versa.

Computer program products incorporating various features of the present invention may be encoded on various computer readable storage media, suitable media include magnetic disk or tape, optical storage media such as compact disk or DVD (digital versatile disk), flash memory, and the like. Computer readable media encoded with the program code may be packaged with a compatible device or provided separately from other devices Program code may also be encoded and transmitted using carrier signals (e.g., via Internet download) adapted for transmission via wired, optical, and/or wireless networks conforming to a variety of protocols, including the Internet.

While the invention has been disclosed in connection with the embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A non-transitory computer-readable storage medium having at least a computer-readable program stored therein, said computer-readable program comprising a first set of instructions, at least one or more of accessing and executing said first set of instructions by a processor associated with a generator device enables said generator device to at least:
   a. enabling a determination of an audio-visual content comprising at least one or more of a sample of an audio content and a sample of a visual content, wherein said determination is enabled due to at least a capture of a portion of a one or more of the sample of the audio content and the sample of the visual content, by at least a one or more sensors associated with said generator device;
   b. determining a tag related information based on at least a portion of one or more of:
   the sample of the audio content;
   the sample of the video content;
   c. enabling transmission of at least said tag related information on a communication interface associated with said generator device, wherein said transmission enables a one or more computing devices to at least:
      i. determining a first contextual tag, wherein said first contextual tag comprises information determined based on at least a portion of said tag related information;
      ii. determining an application identification information based on at least
   a portion of said first contextual tag, said application identification information
   identifying an application, wherein at least a portion of at least one of said application and said application identification information can be one or
   more of identified, determined and selected based on at least a portion of information in an application repository, said application repository allows
   data associated with at least one or more of an application and an application identification information to be:
      i. added to said application repository;
      ii. updated in the said application repository;
      iii. modified in the said application repository;
      iv. deleted from said application repository;
      iii. enabling an activation of said application, wherein said activation
   comprises enabling a first execution of a second set of instructions associated with said application;
   d. receiving a first plurality of information on said communication interface associated with said generator device;
   e. determining, based on at least a portion of said first plurality of information, at least a one or more of:
      i. a second contextual tag; and
      ii. a context value;
   f. determining a third set of instructions based on at least a portion of said second contextual tag; and
   g. enabling a second execution of at least said third set of instructions on said processor associated with said generator device, wherein said second execution enables said processor to at least one or more of processing and accessing at least a portion of said context value.

2. The non-transitory computer-readable storage medium of claim 1, wherein said context value comprises at least a portion of at least one or more of:
   i. a URL;
   ii. a URI;
   iii. an audio content;
   iv. a visual content; and
   v. an audio-visual content.

3. The non-transitory computer-readable storage medium of claim 1, wherein at least one or more of accessing and executing a set of instructions by said processor, further enables said generator device to at least determining a media content based on at least a portion of said context value.

4. The non-transitory computer-readable storage medium of claim 3, wherein at least one or more of accessing and executing a set of instructions by said processor, further enables said generator device to at least playing at least a portion of said media content on at least one or more of:
   an audio output device associated with said generator device;
   a display associated with said generator device; and
   an audio-visual device associated with said generator device.

5. The non-transitory computer-readable storage medium of claim 1, wherein at least one or more of accessing and executing a set of instructions by said processor, further enables said generator device to at least:
   i. determining a second plurality of information based on at least a portion of said first plurality of information; and
   ii. enabling display of at least a portion of said second plurality of information on an output device associated with said generator device.

6. The non-transitory computer-readable storage medium of claim 1, wherein said non-transitory computer-readable storage medium is associated with one of a smart phone, a tablet, a smart device, a mobile device, a laptop, a desktop, a server computer, a media player, an audio player, a video player and a gaming console.

7. The non-transitory computer-readable storage medium of claim 1, wherein said communication interface is one of a:
   a. wired communication interface;
   b. wireless communication interface;

c. Bluetooth communication interface;
d. cellular communication interface;
e. RF communication interface; and
f. Wi-Fi communication interface.

8. The non-transitory computer-readable storage medium of claim 1, wherein said generator device comprises at least a one or more of:
   a. an accessory for said generator device;
   b. an audio device;
   c. a display;
   d. an audio speaker;
   e. a headphone set;
   f. a microphone;
   g. a computer-readable storage medium; and
   h. a communication interface.

9. The non-transitory computer-readable storage medium of claim 1, wherein at least one of said one or more computing devices is determined by a web service on the internet.

10. The non-transitory computer-readable storage medium of claim 1, wherein at least one of said one or more computing devices is one of one or more communicatively associated computer devices.

11. The non-transitory computer-readable storage medium of claim 1, wherein said first contextual tag comprises information determined based on at least a portion of a second plurality of information, wherein said second plurality of information is determined by at least a one or more communicatively associated computer devices.

12. The non-transitory computer-readable storage medium of claim 11, wherein at least said second plurality of information comprises information received by said computing device on a communication interface associated with said computing device.

13. The non-transitory computer-readable storage medium of claim 1, wherein said one or more sensors associated with said generator device comprises at least a one or more of:
   a. an accessory for said generator device;
   b. an audio device;
   c. an audio speaker;
   d. a headphone set;
   e. a microphone;
   f. a camera capable of enabling capture of a one or more of still visual content and video content; and
   g. a communication interface.

14. The non-transitory computer-readable storage medium of claim 1, wherein said first plurality of information comprises information determined based on at least said first execution of said second set of instructions.

* * * * *